United States Patent [19]

Osder et al.

[11] 4,115,847

[45] Sep. 19, 1978

[54] AUTOMATIC FLIGHT CONTROL SYSTEM WITH OPERATIVELY MONITORED DIGITAL COMPUTER

[75] Inventors: Stephen S. Osder, Scottsdale; David C. Mossman, Phoenix, both of Ariz.

[73] Assignee: Sperry Rand Corporation, New York, N.Y.

[21] Appl. No.: 756,467

[22] Filed: Jan. 3, 1977

Related U.S. Application Data

[63] Continuation-in-part of Ser. No. 485,862, Jul. 5, 1974, abandoned.

[51] Int. Cl.[2] .......................... G06F 15/50; G05B 1/00

[52] U.S. Cl. .................................... 364/101; 244/194; 318/564; 235/307; 364/119; 364/424

[58] Field of Search ...... 235/150.2, 153 AE, 153 AK; 244/77 M; 318/562–565

[56] References Cited

U.S. PATENT DOCUMENTS

| | | | |
|---|---|---|---|
| 3,379,951 | 4/1968 | Franchi et al. | 244/77 M X |
| 3,444,528 | 5/1969 | Lovell et al. | 235/153 AE X |
| 3,551,776 | 12/1970 | Tawfik et al. | 318/564 |
| 3,688,099 | 8/1972 | Buscher | 244/77 M X |
| 3,781,627 | 12/1973 | Binnig et al. | 318/562 |

*Primary Examiner*—Jerry Smith

*Attorney, Agent, or Firm*—Howard P. Terry; Albert B. Cooper

[57] ABSTRACT

A dual channel, fail-operative automatic flight control system is disclosed in which each channel includes a totally monitored digital computer for operating upon sensor input data to provide command signals to the aircraft surface control actuators. The operative program for each computer is repetitively executed to effectively provide continuous control. The program is organized into a plurality of tasks to be performed by the computer with program segments associated with the respective tasks and a program routine for determining that all of the tasks have been completed for each program iteration. If non-completion of a task is detected, the program enters a failure routine which stops execution of the program. The program also includes a routine for generating a dynamically varying pattern in accordance with the continuously reiterated execution of the program. The system includes a detector for determining that the correct pattern is being generated and shuts down the system upon detecting a failure of the computer to generate the correct pattern. All of the instructions of the computer instruction repertoire operatively utilized in the system are employed to control the program flow whereby failure of an instruction to operate properly will cause the program to flow into an abnormal path thus causing the task completion program routine to indicate failure and stop the computer. Additionally, the system utilizes further techniques such as dual data and program memory banks to perform redundant computations, all of the techniques in combination providing an automatic flight control system with two autonomous fail-passive channels, the two channels providing a fail-operative system.

25 Claims, 9 Drawing Figures

AUTOMATIC FLIGHT CONTROL SYSTEM WITH OPERATIVELY MONITORED DIGITAL COMPUTER

CROSS REFERENCE TO RELATED APPLICATION

This is a continuation-in-part of application Ser. No. 485,862, filed July 5, 1974, now abandoned, in the names of Stephen S. Osder and David C. Mossman entitled "Automatic Flight Control System With Operatively Monitored Digital Computer" and assigned to the present assignee.

BACKGROUND OF THE INVENTION

1. Field of the Invention

The invention relates to automatic flight control systems and particularly to a dual channel fail operative computer controlled configuration.

2. Description of the Prior Art

Conventional fail passive automatic flight control systems normally require dual redundant channels with cross channel comparison monitors to shut the system down in the event of a failure in either channel. Conventional fail operative systems normally require a minimum of triply redundant channels with cross channel comparison monitors to detect a failure in one of the channels and to shut down the failed channel. It is a desideratum in the flight control art to retain either the fail passive or fail operative characteristic but to reduce the number of channels required therefor.

Flight control systems are known that utilize a digital computer in each of the channels of the system to process the input sensor data and provide surface control signals to the surface servo mechanisms in accordance therewith. In order to render each such channel fail passive and hence provide a dual channel fail operative system, such prior art automatic flight control systems have incorporated external test signal sources and test programs stored in memory for operating on the test signal to provide a predetermined output in accordance with the result of the test program. The predetermined output is then compared to a reference signal to detect failure. Such test programs utilize all of the instructions of the computer instruction repertoire and are repeated during each iteration of the operative program for the system. In sophisticated computers with large instruction repertoires, considerable time is utilized by the computer to execute the test program during which time the computer is executing operations that are not directly related to the primary function of controlling the aircraft. In addition to the time required to perform the test program, valuable memory space is occupied thereby and additional hardware such as a test signal source, a reference signal source and an associated comparator are required.

In such prior art systems, the operative programs normally comprise thousands or tens of thousands of instruction words where the execution of the program is under control of a program counter. A prior art test program can verify that the computer repertoire is functioning properly but cannot determine whether each instruction of the main flight program is free of malfunctions or whether the program counter can properly sequence through the operative program as well as the test program. Thus, a faulty stage of the program counter that is not utilized during the test program but is utilized during the operative program may not be detected by such a procedure, or a faulty memory bit in any one of the stored instructions of the operative program will not be detected, thereby precipitating a potentially dangerous system failure when the operative program is executed.

SUMMARY OF THE INVENTION

The above disadvantages of the prior art are obviated by segmenting the operative program into a plurality of tasks, each task program segment having a task completion indicium associated therewith. The program further includes a task completion test segment that determines whether or not all of the task completion indicia have been set after an iteration of the program. In steering through the operative program all of the instructions of the operative instruction repertoire of the computer are exercised by utilizing the instructions in the determination of the addresses that determine the proper program flow. Thus, a failure of a computer instruction causes the program to follow an abnormal path, therefore not setting all of the task completion indicia. When a failure occurs and the computer has at least a partial capability to continue operating, the task completion test program segment upon detecting an unset task completion indicium steers the program into a failure logic computation routine which, inter alia, stops the execution of the program. The program also includes a segment that generates a dynamically varying validity pattern in accordance with the continuous iterations of the program. The flight control system hardware includes a validity pattern detector that detects a static state or an incorrect dynamic state of the validity pattern indicating that the computer is no longer executing the program.

Thus it is appreciated that failures including catastrophic failures of the computer itself are detectable by this unique combination of software and hardware.

The flight control system of the present invention includes additional features such as dual data and program memory banks and some redundant computation execution to provide for a totally self-monitored automatic flight control system channel thereby providing single channel fail passive operation and dual channel fail operative capabilities.

DESCRIPTION OF THE PREFERRED EMBODIMENT

Figure 1:
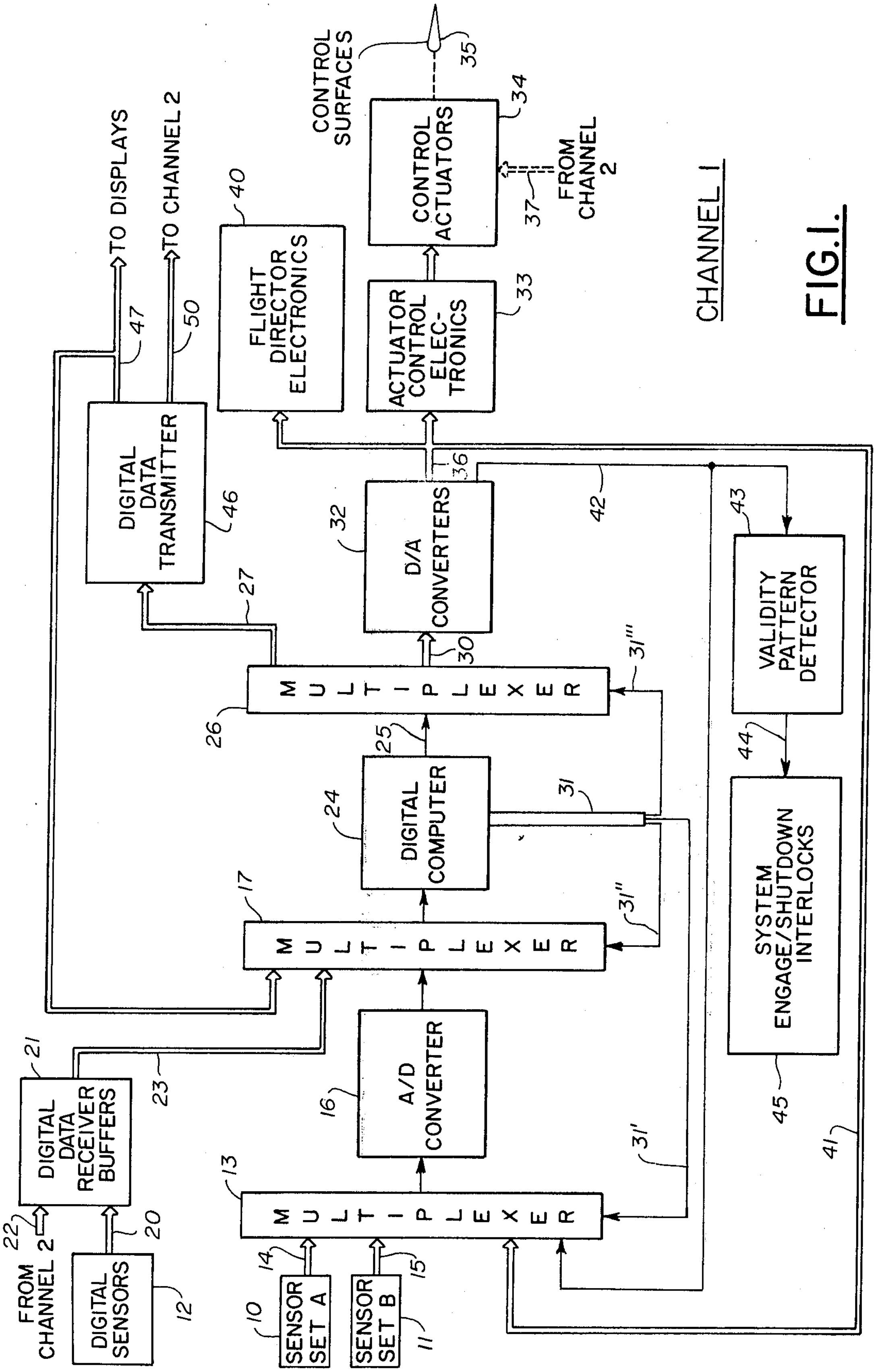
FIG. 1 is a schematic block diagram of one channel of a dual channel automatic flight control system.

Referring to FIG. 1, a block schematic diagram of one channel, designated as channel 1, of a dual channel automatic flight control system is illustrated. The channel 1 illustrated in FIG. 1 is itself organized into two channels designated as channels A and B in a manner and for reasons to be later described. The second channel of the system, designated as channel 2, is identical to that illustrated in FIG. 1.

Channel 1 of the automatic flight control system includes identical sensor sets 10 and 11, the sensor set 10 being utilized for the channel A computations, and the sensor set 11 being used for the channel B computations in a manner to be described. Each sensor set 10 and 11 includes the conventional attitude, rate and acceleration sensors as well as other devices such as control wheel force sensors that are conventionally utilized in modern jet transports. These sensors may include such devices as directional and vertical gyroscopes, rate gyroscopes and accelerometers. Each of the sensor sets 10 and 11 may additionally include conventional radio guidance equipment such as VOR and ILS receivers and the like. The sensor sets 10 and 11 may also include inputs from the aircraft control surface position transducers as well as engine sensors and inputs from such devices as radio altimeters and the like. The sensor sets 10 and 11 each include the required complement of sensors that provide analog signals for use in controlling the aircraft. It will be appreciated that included within the sensor set blocks 10 and 11 are conventional analog signal processing circuits for preparing the sensor signals for entry into the system. Such processing circuits include demodulators for synchro data and the like.

The channel 1 of the automatic flight control system also includes a complement of digital sensors 12. The sensors 12 may include a conventional digital air data computer for providing such parameters as barometric altitude, total air temperature, and the like. The digital sensors 12 may also include other equipment such as a digital DME receiver.

The outputs of the analog sensor sets 10 and 11 are applied to a conventional multiplexer 13 via electrical conductor cables 14 and 15 respectively. The output of the multiplexer 13 is applied to a conventional analog-to-digital converter 16 whose output is in turn applied to another multiplexer 17.

The outputs of the digital sensors 12 are applied via an electrical conductor cable 20 to a digital data receiver 21 that includes buffers for entering the digital data into the system. The digital data receiver buffers 21 also receive digital data from channel 2 of the automatic flight control system via electrical conductor cable 22. The output of the digital data receiver buffers 21 are applied as an input to the multiplexer 17 via a cable 23.

The multiplexer 13 is of a conventional type that is designed to receive a plurality of analog inputs and to provide at its output a selected analog input. The multiplexer 17 is of conventional design of the type that accepts a plurality of digital inputs providing a selected digital input at its output.

The output of the multiplexer 17 is applied as an input to a digital computer 24. The digital computer 24 is of conventional architecture and is of the general purpose, medium scale design, a variety of which are commercially procurable and specifically constructed for real-time airborne analysis and control. Preferably, a series 1819 type computer commercially procurable from the Sperry Flight Systems Division of the Sperry Rand Corporation, may be utilized in implementing the system.

A data output 25 of the computer 24 is connected as an input to a conventional multiplexer 26 which selectively applies the digital signal on the computer output 25 to one of its digital outputs 27 and 30. The digital computer 24 provides control signals via an electrical conductor cable 31 to control the multiplexers 13, 17 and 26. An electrical conductor 31′ from the cable 31 controls the multiplexer 13 to selectively provide one of its inputs to the analog-to-digital converter 16. Similarly, an electrical conductor 31″ from the cable 31 controls the multiplexer 17 to selectively apply one of its inputs to the digital computer 24. Additionally, an electrical conductor 31‴ from the cable 31 controls the multiplexer 26 to selectively apply the digital signals on the computer output 25 to one of the multiplexer outputs 27 or 30. Further details with regard to the internal arrangement of the digital computer 24 and its stored program will be discussed hereinbelow with regard to the ensuing figures.

The output 30 from the multiplexer 26 is connected to a plurality of digital-to-analog converters 32. The output 30 of the multiplexer 26 is an electrical conductor cable providing a plurality of selectively controlled outputs from the multiplexer 26 to the respective digital-to-analog converters 32, selectively receiving data from the digital computer output 25 in accordance with control signals applied on the electrical conductor 31‴.

The digital-to-analog converters 32 provide analog signals to the aircraft surface actuator control electronics 33 which, in turn, provide control signals to the surface control actuators 34. The control actuators 34 position the aerodynamic control surfaces of the aircraft, schematically represented at 35. The analog signals from the converters 32 to the actuator control electronics 33 are provided via electrical cable 36. It will be appreciated that the blocks 33, 34 and 35 are schematically representative of the conventional complete three-axis control apparatus for the aircraft control surfaces commonly utilized in modern jet transports. Such apparatus may be of the well known electromechanical or electrohydraulic variety. The control actuators 34 are schematically representative of the total aircraft surface actuator system which may, in modern jet transports, be of the redundant variety and thus receives an input at 37 from channel 2 (not shown) of the automatic flight control system. Such redundant actuator controls and electronics may, for example, be of the type described in Applicant's assignee's U.S. Pat. No. 3,504,248 issued Mar. 31, 1970.

The outputs from the digital-to-analog converters 32 on the cable 36 are also applied to conventional flight director instrumentation 40. The flight director instrumentation 40 provides visual commands to the pilot via attitude director instruments in a well known manner.

The outputs of the digital-to-analog converters 32 are also applied via an electrical conductor cable 41 as respective inputs to the multiplexer 13. This connection provides "end-around" feedback in a well known manner permitting the computer 24 to compare each D/A output from the block 32 against the associated signal from the computer output 25 thereby verifying the operability of each of the D/A elements in the block 32. The "end-around" feedback technique is well known in the automatic flight control system art and will be further discussed hereinbelow.

In accordance with the invention and in a manner to be later described in detail, the digital computer 24 stores a program that operates upon the signals from the sensors 10, 11 and 12 and provides output commands via the converters 32 to position the control surfaces 35 and to actuate the flight director 40. A real-time clock (not shown) within the computer 24, controls continuous repetitions of the stored program so as to effectively provide continuous control of the aircraft. When the system is functioning properly, the program stored in the computer 24 generates a validity pattern that varies dynamically in accordance with the continuous executions of the program. In a manner to be further described, the validity pattern is generated and provided at the computer output 25 and selected via the multiplexer 26 for application to one of the digital-to-analog converters 32. The output of this selected converter is applied via a lead 42 to a validity pattern detector 43. The validity pattern detector 43 is conventionally configured in a manner to be described to detect departures of the validity pattern from the computer 24 from that provided during normal operation of the system. When the computer 24 fails to provide the normal validity pattern indicative of proper system operation, the validity pattern detector 43 provides a failure signal via a lead 44 to engage/shutdown interlocks 45 of the system, the interlocks 45 being conventional and well known components of an automatic flight control system. When the validity pattern detector 43 provides a failure signal on the electrical conductor 44, which signal is indicative of a failure in channel 1 of the system, the interlocks 45 shut down channel 1 and continue operative control of the aircraft via channel 2.

The validity pattern signal on the conductor 42 is also applied as an input to the multiplexer 13 for the purpose of "end-around" checking of the associated D/A converter in the manner described above.

The outputs 27 from the multiplexer 26 are applied as inputs to a conventional digital data transmitter 46 which provides digital signals via an electrical conductor cable 47 to the displays of the system as well as to the other sub-systems of the aircraft. The signals on the cable 47 are also applied as inputs to the multiplexer 17 for "end-around" monitoring of the type described above. The digital data transmitter 46 also provides digital signals on an electrical conductor cable 50 to channel 2 (not shown) of the automatic flight control system, so that in conjunction with the signals received from channel 2 on the cable 22, the two autonomous channels 1 and 2 of the system may communicate with one another for such purposes as signal equalization and the like. It will be appreciated that although this inter-channel communication is utilized, each channel is an autonomous fully self-monitored configuration capable of detecting internal channel failures and accordingly shutting down the channel.

Figure 2:
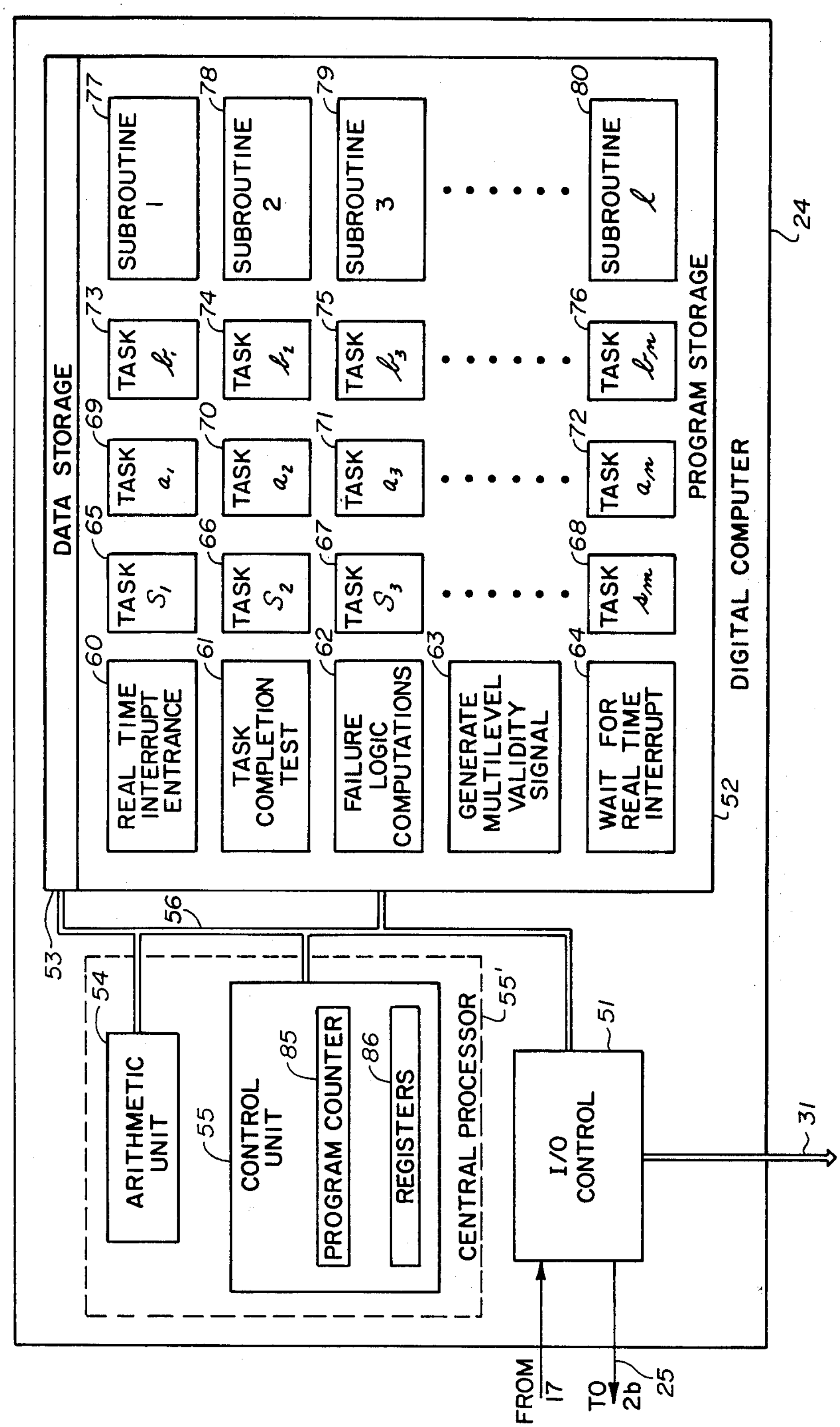
FIG. 2 is a schematic block diagram showing in greater detail the digital computer of FIG. 1.

Referring now to FIG. 2 in which like reference numerals indicate like components with respect to FIG. 1, the digital computer 24 is illustrated depicting the basic internal construction thereof. The digital computer 24 includes an input/output (I/O) control unit 51 that accepts the digital input signals from the multiplexer 17 of FIG. 1 and provides digital output signals on the output 25 to the multiplexer 26 of FIG. 1. The I/O control unit 51 also provides the multiplexer controlling signals on the cable 31. The computer 24 includes program storage 52, data storage 53 and an arithmetic unit 54 as well as a control unit 55, all interconnected for two-way communication therebetween via a bus 56. It will be appreciated that the internal configuration of the computer 24 is of a conventional nature and will therefore be only briefly described to facilitate an understanding of the invention.

The program memory 52 has stored therein the operative program for performing all of the functions required by channel 1 of the automatic flight control system illustrated in FIG. 1. The program is generally arranged in segments or routines as schematically illustrated by the blocks 60 through 80. The detailed structure and operation of the program stored in the program memory 52 will be described herein below with respect to subsequent figures.

The data memory or storage 53 is utilized for storing the constants used by the program as well as containing predetermined locations for the storage of the various types of data provided by the sensors 10, 11 and 12 of FIG. 1.

The control unit 55 includes a program counter 85 and a plurality of registers, one of which being designated at 86. The arithmetic unit 54 includes the circuits for performing the arithmetic and logical operations for the computer 24 and includes an accumulator (not shown) which may comprise a double length accumulator for performing double precision arithmetic operations as is well known in the computer art. The double length accumulator is designated as comprising upper accumulator (A.U.) and a lower accumulator (A.L.). In a manner well understood in the art, the program counter 85 sequentially fetches the instructions of the program from the program memory 52 and controls the computer 24 to perform the instructions, fetching data from the data memory 53 when required. The combination of the control unit 55 and the arithmetic unit 54 is often referred to as the central processor unit which is designated by reference numeral 55' of the digital computer 24. The arithmetic unit 54 is utilized under control of the control unit 55 to perform the conventional arithmetic and logical operations as required by the program. The I/O control unit 51 accepts data from the multiplexer 17 of FIG. 1 and provides data to the multiplexer 26 of FIG. 1 and additionally provides the timing control signals for the multiplexers 13, 17 and 26 under control of the control unit 55 as commanded by the sequence of program instructions stored in the program memory 52.

Although instruction repertoires generally vary from computer to computer, the computer 24 includes instructions for entering data from addressed locations in the data storage 53 into the accumulator of the arithmetic unit 54. Additionally, the computer 24 generally has a class of instructions for storing data in addressed locations in the data memory 53 from the accumulator in the arithmetic unit 54 as well as storing zero and constants. The computer 24 also includes a class of arithmetic instructions for performing arithmetic operations on data stored in addressed locations in the data memory 53 with respect to data stored in the accumulator of the arithmetic unit 54. Additionally, the computer 24 includes a class of address transfer instructions for causing the program counter 85 to transfer control to an addressed location in the program memory 52. These instructions generally are designed as "jump" instructions and are particularly used in transferring from a main program to a sub-routine stored elsewhere in memory. These "jump" instructions are of an unconditional nature; that is, when a particular "jump" instruction is encountered in the program, control always transfers to the new address.

In addition to the above described instructions, the computer 24 also has a class of conditional transfer instructions which cause the control to transfer to a specified address if certain conditions are met. For example, the conditional transfer instructions test the contents of the accumulator with regard to the upper and lower portions thereof to determine if the contents are equal to zero, not equal to zero, positive or negative and either jumps to the specified address or proceeds to the next sequential instruction in accordance with the result of the test. Conditional transfer instructions are also included for comparing the contents of an addressed location in the data memory 53 with the contents of the accumulator and performing the conditional jump upon equality, inequality, less than or equal to, or greater than with regard to the two quantities. The computer 24 additionally has the usual complement of logical instructions as well as shift instructions with regard to the accumulator. Additionally, the instruction repertoire of the computer 24 includes the usual complement of input/output instructions as well as interrupt instructions including an instruction to wait for an interrupt, i.e., to place the processor into a hold condition until the interrupt occurs. The computer 24 also includes a real time clock (not shown) which is used to generate real time interrupts for program timing.

Thus it will be appreciated that the computer 24 includes an instruction repertoire that provides it with the capability of inputting data from the automatic flight control system sensors, operating upon the data in accordance with the required control laws and outputting signals appropriate for positioning the control surfaces of the aircraft. It will furthermore be appreciated that to an extent the instruction repertoire is configured in accordance with the manner in which the automatic flight control system is utilized and the aircraft in which it is installed. To a greater extent the specific program stored in the program memory 52 will be determined by these conditions and the dynamic characteristics of the particular aircraft. It is specifically appreciated, however, that the operative program may be reiterated under control of the real time clock by utilizing the "wait for interrupt" instruction in combination with the real time clock. In a practical jet transport control environment the operative program may be repeated every fifty milliseconds to effectively provide continuous control of the aircraft.

As previously described, the program flow is directed through the variety of tasks to be performed as generally indicated by the blocks 60 through 76 stored in the program memory 52. As the program is executed, program jumps are performed to the various sub-routines 77 through 80 during which transfers the instructions of the computer repertoire may be utilized, for the purpose of exercising and hence testing them, in establishing the addresses at which the sub-routines are located. Therefore, if a failure should occur with regard to those portions of the computer 24 associated with the execution of the instruction, control will transfer to an abnormal location and the program flow will continue along an abnormal path. For example, a jump instruction may be utilized in conjunction with an arithmetic instruction that manipulates the desired address so that in effect the program "gets lost" if the arithmetic instruction utilized should fail. This concept will be further clarified with regard to the discussion of the ensuing figures.

Before discussing the ensuing figures, however, the following provisions within the data storage memory 53 should be appreciated. As previously discussed, the operative program is structured as a plurality of tasks to be performed. Accordingly, one or more words in the storage 53 are reserved as task list words, each bit thereof representing a particular one of the tasks. Correspondingly, another group of words is reserved in the memory 53 to provide task completion indicia wherein each bit of the task completion words represents completion or non-completion of the associated task. The bit positions of the task list words correspond to the bit positions of the associated bit completion words for convenience.

Figure 3A:
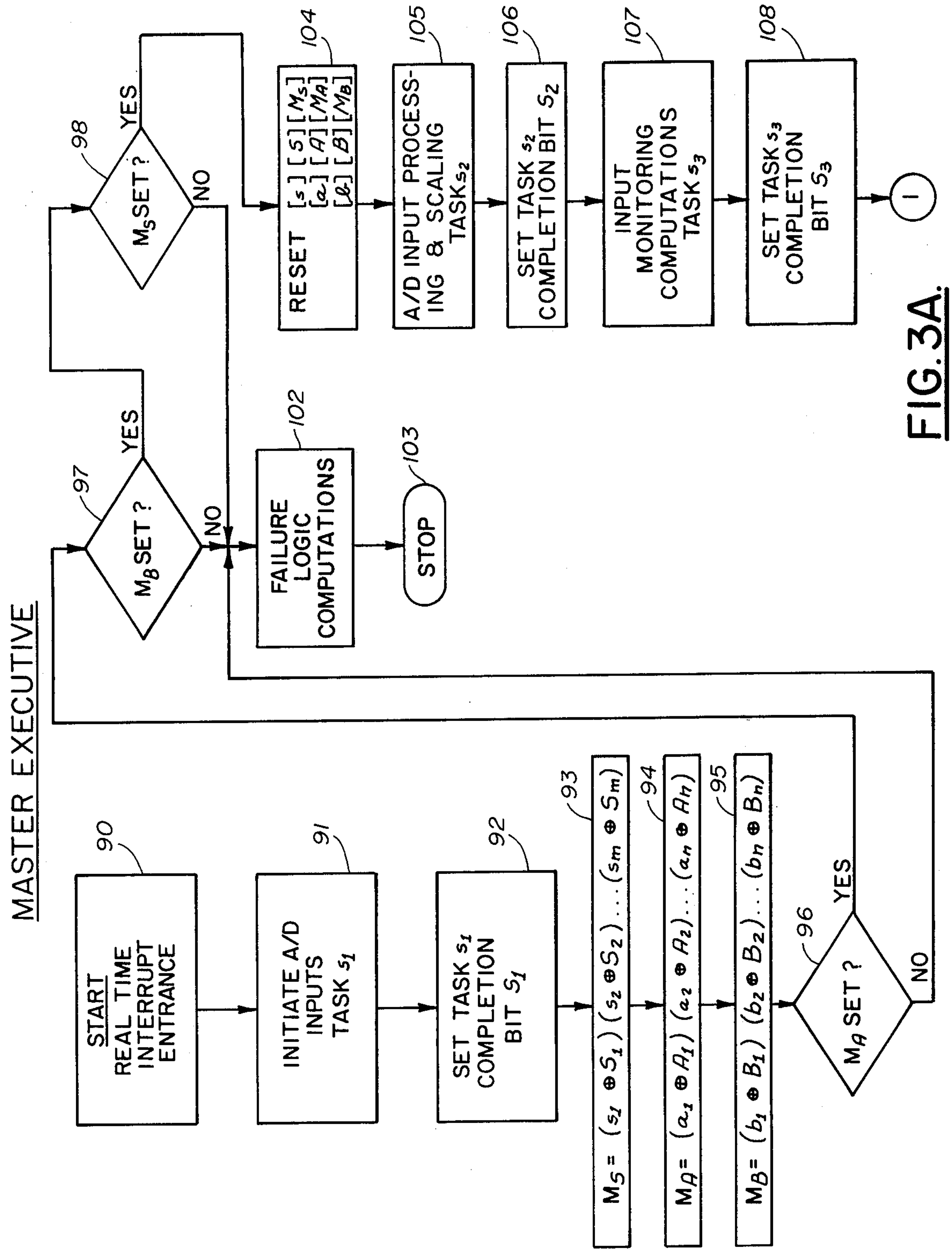
FIG. 3 is a flow chart of the master executive program stored in the program memory of the digital computer of FIG. 2.
Figure 3B:
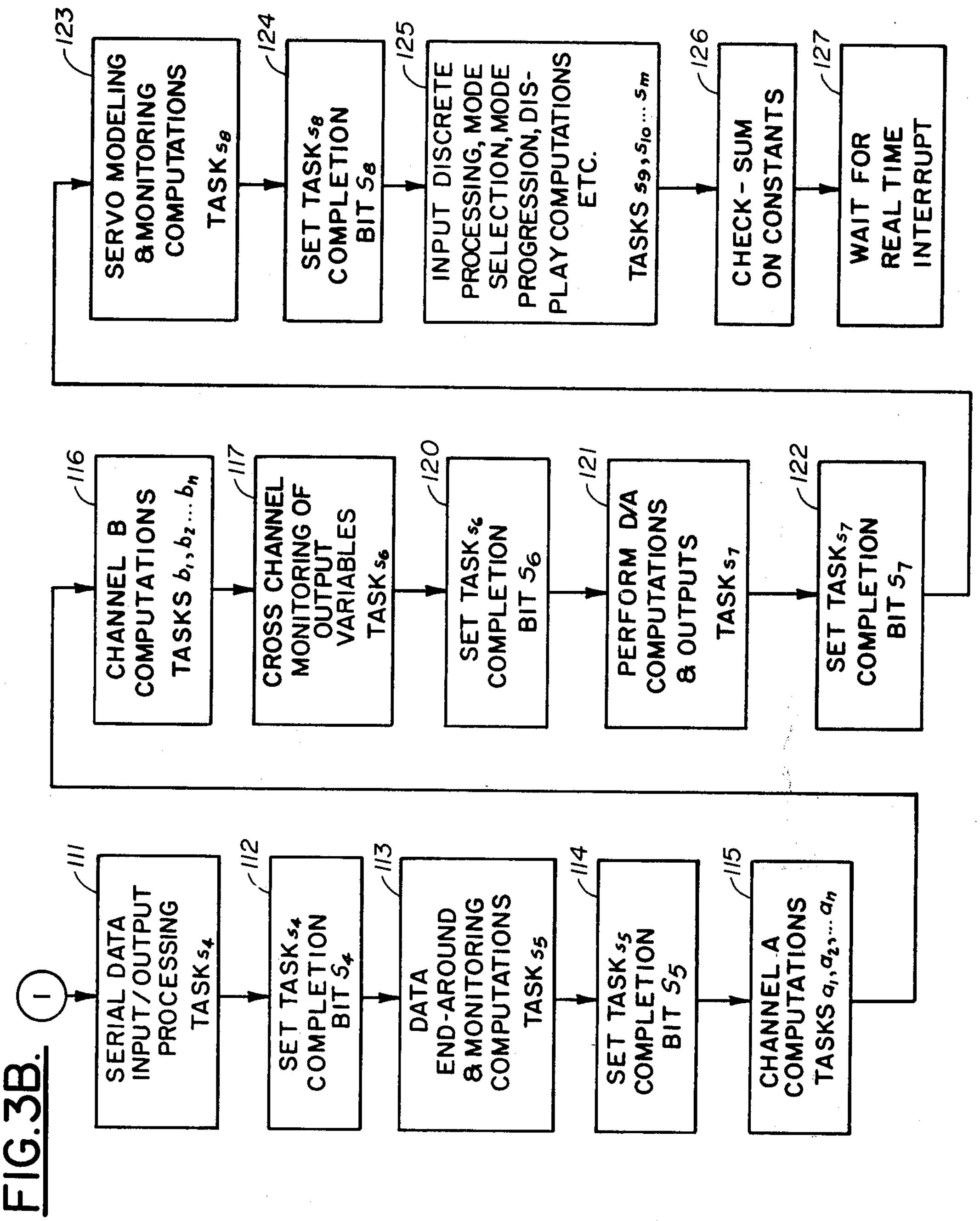

Referring now to FIG. 3 with continued reference to FIGS. 1 and 2, the master executive flow chart for the programs stored in the program memory 52 of FIG. 2 is illustrated. Block 90 of the master executive flow chart is selected as the start thereof in accordance with the occurrence of the real time clock interrupt. The real time clock causes an interrupt to occur at the end of a predetermined interval of time typically 50 milliseconds for modern jet transport aircraft. The interrupt occurs during normal operation of the system independently of what point in the program, i.e., position on the master executive flow chart it occurs. When the real time clock interrupt occurs, the control unit 55 of the computer 24 transfers control to a predetermined location in the program memory 52 which is schematically illustrated at 60.

The next block 91 on the master executive flow chart indicates performance of task $s_1$ which initiates the analog-to-digital inputs. The program segment corresponding to the flow chart block 91 is schematically represented at 65 in the program memory 52. Conveniently the real time interrupt entrance 60 in the program memory 52 may be selected as the location of the first instruction for the task $s_1$ program segment 65. Alternatively the real time interrupt entrance location may contain a jump instruction which would transfer control to the first location of the task $s_1$ program segment 65. In so transferring the address may be manipulated by utilizing, for example, arithmetic or logical instructions from the instruction repertoire so that in the event of failure of the so utilized instructions, control will transfer to an erroneous location and hence the program flow would follow an abnormal path.

The task $s_1$ program segment 65 as indicated by the flow chart block 91 initiates the acquisition of data from the sensors 10, 11 and 12 of FIG. 1. In the program segment 65, instructions are utilized to cause the computer 24 to provide signals on the cable 31 that control the multiplexers 13 and 17 to transfer the data from the appropriate sensor inputs to the multiplexers into the computer 24. This data is transmitted through the I/O control unit 51 along the cable 56 into the data storage 53. Since preferably the computer 24 may be configured as a direct memory access machine, the signals on the cable 31 merely initiate the transferring of the data which will thereafter occur on a "cycle steal" basis as the program continues through the flow chart. This is a conventional and well understood technique in the digital computer art. The A/D inputs are initiated at the block 91 and the timing of the system is such that the transferring of the data will be complete at the point in the computations where it will be utilized and the data will be as recent as possible.

After initiating the A/D inputs in accordance with the block 91 of the master executive flow chart, the program counter 85 (FIG. 2) will sequence control to the next following instructions which will provide a routine for setting the task $s_1$ completion bit to a binary ONE as indicated in block 92 of the flow chart. The task completion bits are designated with capital letters and sub numerals corresponding to the associated task designations. It will be appreciated that the actual program steps utilized in performing, for example, the functions of the block 92 may readily be prepared as a routine matter by normally skilled digital computer programmers and will, of course, depend on the specific instruction repertoire and programming language of the machine utilized. It will further be appreciated that the present description is provided with regard to a particular iteration of the master executive program. During the previous iteration the task list bits were established in a manner to be later described and the task completion bits were all set to binary ZERO. It will be appreciated from the foregoing that if in transferring between the blocks 90 and 91 of the master executive flow chart, instructions of the repertoire had been utilized in establishing the transfer addressing and a failure had occurred in the so utilized instructions that the program would have followed an abnormal path and would not have arrived at the block 92 in order to set the task completion bit $S_1$. If during the previous iteration of the program, other task completion bits had not been set, this would then be detected in the next portion of the program to be described.

In the preferred embodiment of the invention, the tasks to be performed are sub-divided into three categories. One category includes all of the tasks that are done on a single channel basis, i.e., related to the entire channel 1 or the entire channel 2. Another category includes all of those tasks done on a dual channel basis related to the channel A portion of channel 1, for example, and the other category includes all of the dual channel tasks related to channel B.

The blocks 93 through 98 of the master executive flow chart of FIG. 3 indicate the manner in which the program determines that all of the assigned tasks were completed on the previous iteration through the program. When the program segment indicated by block 92 of the master executive flow chart is completed, the program counter 85 of FIG. 2 causes control to be transferred to the program segment related to the block 93 of the flow chart. In the block 93 the single channel tasks are tested for completion by taking the EXCLUSIVE OR logical function between the corresponding bits of the task list words and those of the task completion bit words. For example, the single bit task $s_1$ as performed in accordance with the block 91 in the flow chart is logically combined by means of the EXCLUSIVE OR instruction with the task completion bit $S_1$ to provide a binary ONE if the bits are the same and a binary ZERO if the bits are different. In this manner all of the single channel tasks $s_1 \ldots s_m$ are tested for completion and a new word $M_S$ is formed. If all of the bits of the $M_S$ word are binary ONE, then all of the single channel tasks were performed during the previous iteration of the program. If, however, there is a single ZERO in the word, then at least one task was not performed during the previous iteration. The manner in which the non-completion of all of the single channel tasks is detected and the nature of the single channel tasks will be further described with regard to FIGS. 3, 4 and 5.

After establishing the $M_S$ word, the control unit 55 transfers to the next sequential instruction under control of the program counter 85 to enter the program segment corresponding to the block 94 on the master executive flow chart. In this program segment the $M_A$ word is computed wherein the channel A task list is logically compared to the channel A task completion bits in the manner described above with regard to the block 93. After completing the establishment of the $M_A$ word, control transfers to the program segment associated with the block 95 to establish the $M_B$ word in the manner described above with respect to the blocks 93 and 94 for the channel B tasks.

Figure 4A:
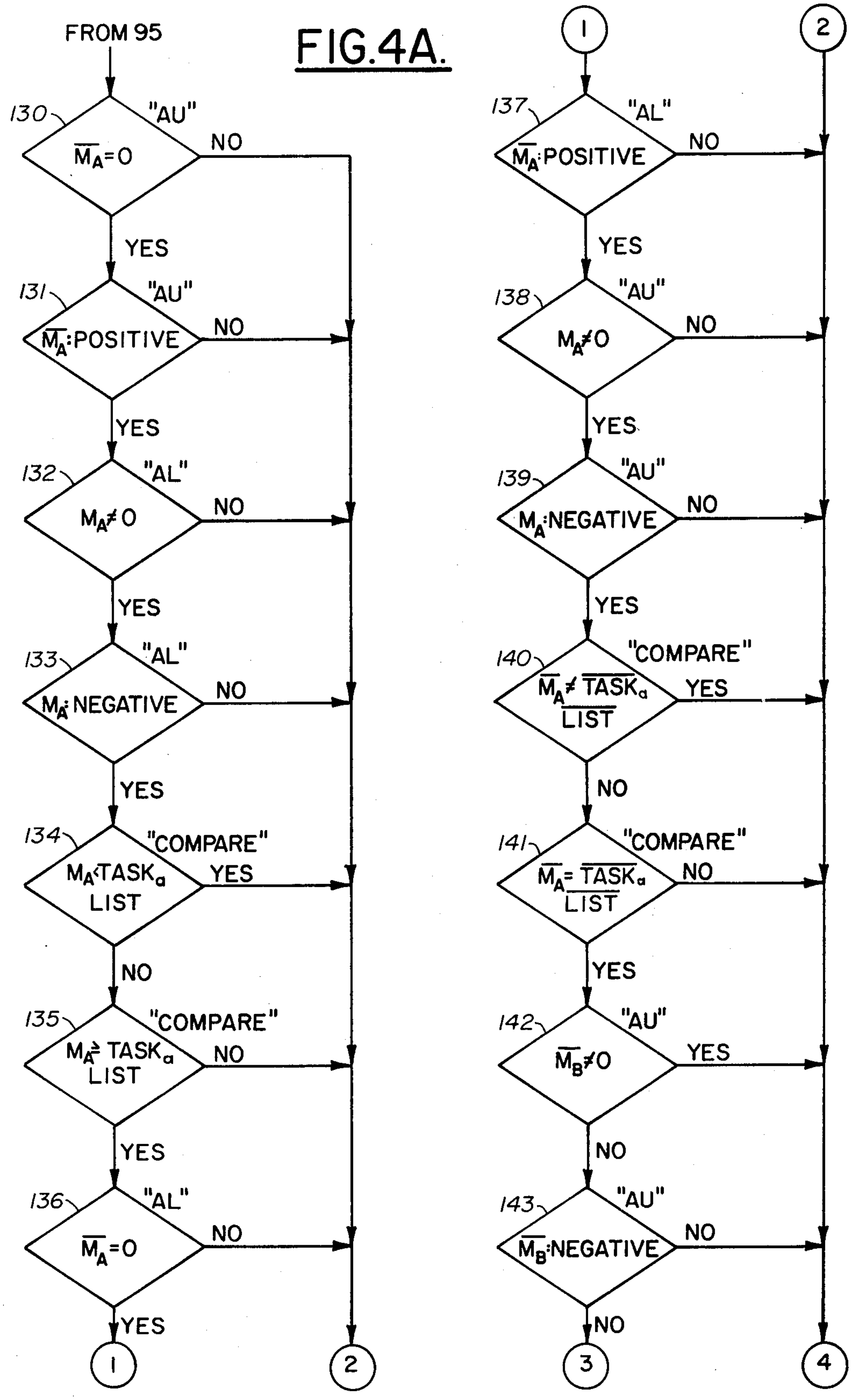
FIG. 4 is a flow chart illustrating in greater detail a portion of FIG. 3.
Figure 4B:
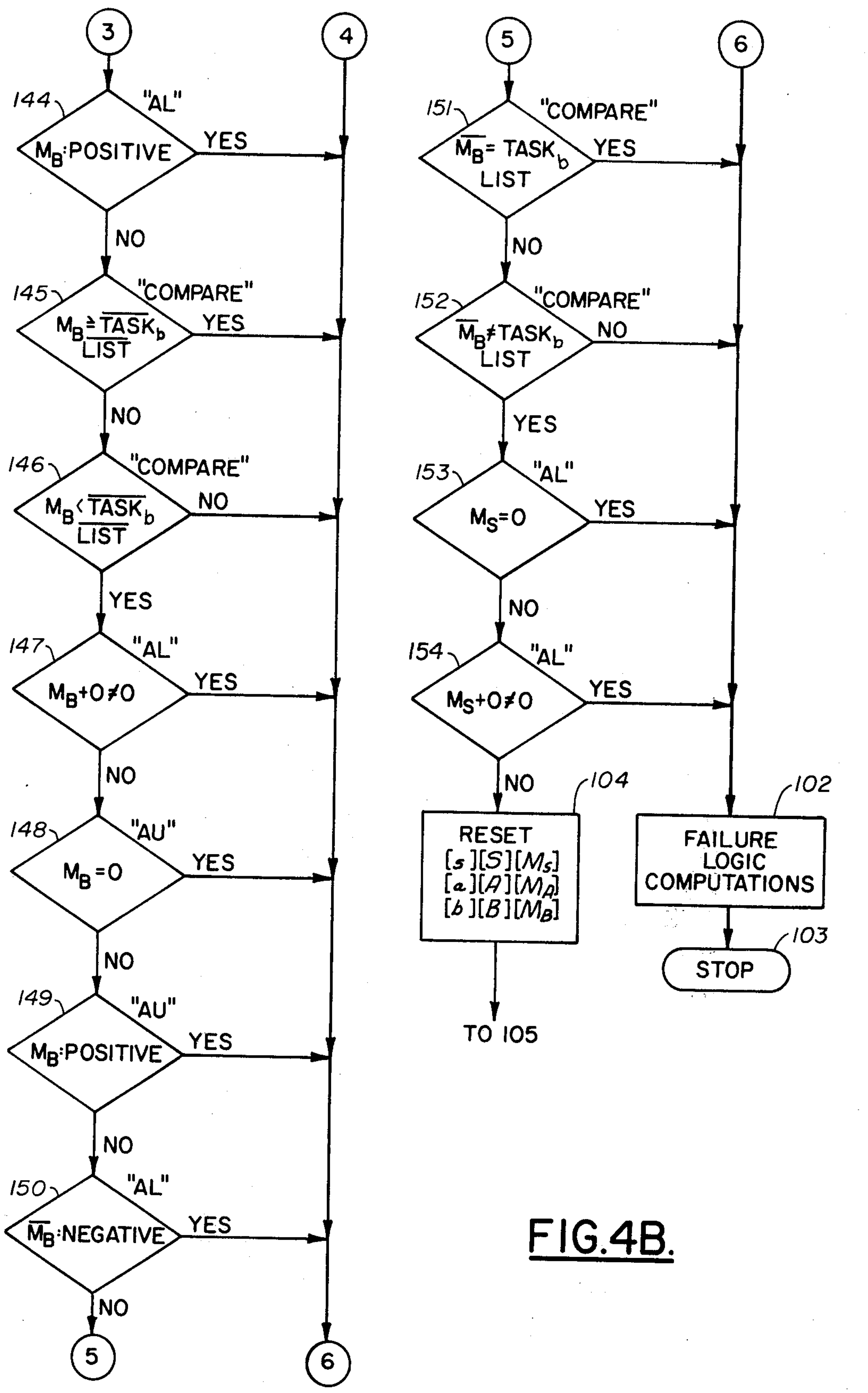

Upon completion of the block 95 instructions, control is transferred to the block 96 in which a routine to be later described in greater detail with respect to FIG. 4 is performed to determine if all of the bits in the $M_A$ word have been set to binary ONE. If, in fact, the $M_A$ word has been properly set, indicating completion of all of the channel A tasks, then control is transferred to the block 97 via the program branch labeled YES, in which block the $M_B$ word is tested in a manner similar to the tests performed in the block 96. If again the $M_B$ word is properly set, indicating completion of the channel B tasks, then control is transferred to the block 98 via the program branch labeled YES. Similarly within the block 98 comparable tests are performed on the $M_S$ word as were performed with regard to the previous blocks 96 and 97 and if again the $M_S$ word is properly set, indicating completion of all of the single channel tasks, then the program continues along the associated branch labeled YES.

If, however, a task is not completed, program control will transfer from the appropriate one of the test blocks 96-98 along the appropriate NO program branch into a failure logic routine 102 which leads to a computer step instruction as indicated in block 103. The programming stored in the program memory 52 of the computer 24 (FIG. 2) for the blocks 93 through 98 is schematically indicated as the program segment 61. The failure logic computations as indicated by the flow chart blocks 102 and 103, are illustrated schematically as stored in the program memory 52 at the segment 62. The specific programming for the failure logic computations will depend on the specific machine utilized and the software is readily derivable by normally skilled computer programmers to attempt to have the computer come to an orderly halt with regard to the automatic flight control system that it is controlling. Routines are utilized within the failure logic computation block 102 to transfer control to the properly operating channel and to provide instrument panel display indications informing the pilot that one of the two automatic flight control system channels 1 and 2 has failed and that it has been shut down. Such failure indication procedures and apparatus are well known in the flight control art and will not be further described herein for brevity.

If after completing the tests of the flow chart blocks 96, 97 and 98, program control arrives at the branch labeled YES from the block 98, this signifies that the system operated properly during the preceding iteration of the program and control is transferred to a block 104. In this block all of the task lists, task completion words and task completion test words are reset in preparation for the next iteration of the program after which the program control sequentially enters the task $s_2$ program block 66 stored in the program memory 52 to perform the instructions stored therein in accordance with flow chart block 105.

When the program control arrives at the block 105 all of the A/D inputs initiated at the block 91 will have been completed and stored in a predetermined buffer portion of the data memory 53 (FIG. 2). The programming instructions associated with the block 105 of the flow chart and stored at 66 in the program memory 52 will sequentially extract the data words from the buffer portion of the data memory 53 and enter these words into predetermined locations in memory after being identified as to what the data signifies. For example, the computer 24 controls the multiplexers 13 and 17 of FIG. 1 to enter the data into the buffer storage in an orderly manner so that when the block 105 instructions are executed, the data may be transferred to the appropriate memory locations. For example, the first word may be reserved for pitch rate, the second word for pitch attitude, etc., which quantities will all have assigned locations in the data storage 53 so that they may be later extracted to perform computations thereon. The block 105 also includes instructions for scaling the data so as to have the proper scaling for the computations, i.e., bits per degrees, etc.

It will be appreciated that the block 105 is in itself a sub-executive routine in that control frequently branches to one or more of the numerous sub-routines 77 through 80 (FIG. 2) so as to perform the required computations. After executing a sub-routine, control returns to the point in the program from which the branch took place to subsequently continue the program under control of the program counter 85. During such branching points in the program the numerous instructions of the computer instruction repertoire are utilized in establishing the branching addresses such that should an instruction fail, the program will not transfer to the proper address but will follow an abnormal path and thus not complete the assigned tasks. When the assigned tasks are not completed, the associated task completion bits are not set and the program enters the failure logic block 102 as described above to bring the computer to an orderly halt providing the computer has the residual capability to so perform. An example of such programming to cause the program flow to "get lost" and hence indicate failure will be later described.

If the processing required by the block 105 is properly performed, the program counter 85 (FIG. 2) causes control to sequentially enter block 106 of the master executive flow chart wherein the associated task completion bit $S_2$ is set in a manner similar to that described above with regard to the block 92 of the flow chart.

After performing the instructions associated with the block 106, control sequentially enters the program segment 67 in the program memory 52 (FIG. 2) to perform the task $s_3$ input monitoring computation functions indicated by block 107 of the flow chart. The task $s_3$ program segment 67 contains instructions for comparing the outputs of independent identical sensors of, for example, the sensor sets A and B indicated as blocks 10 and 11 in FIG. 1, to determine that they compare to within a predetermined tolerance. These sensor comparison computations are well known functions normally performed in conventional fail-safe/fail-operational automatic flight control systems.

As previously discussed with regard to the block 105, numerous branches are taken to the sub-routines 77–80 (FIG. 2) to perform standard calculations such as signal filtering and the like. When branching to a sub-routine from a particular point of the program segment represented by the block 107, a return address is stored in a conventional manner at the end of the sub-routine to which control is transferred so that control may return to the proper point in the program. When instructions of the computer repertoire are exercised in the branching and fail, the return address is never encountered and the program follows an abnormal flow thereby never arriving at the task completion point where the associated task completion bit is set. If, however, the program properly completes the program segment 67 (FIG. 2) associated with the task $s_3$, then the program counter 85 (FIG. 2) sequentially causes control to enter block 108 of the master executive flow chart wherein the associated task completion bit $S_3$ is set in the manner previously described with regard to the block 106.

During proper operation of the system, the program control will sequentially flow through blocks 111, 112, 113 and 114 to perform the tasks $s_4$ and $s_5$ setting the task completion bits $S_4$ and $S_5$ upon proper completion of these tasks. It will be appreciated that respective portions of the program memory 52 (FIG. 2) will contain the instructions for performing the functions required by these blocks 111–114.

In block 111, all of the processing required for generation of serial digital data for data reception or transmission from one digital device to another and for cross channel communication with the computer of channel 2 of the system is performed. It will be appreciated that the I/O control block 51 (FIG. 2) via the cable 31 will control the multiplexers 17 and 26 so as to receive data from the digital data receiver 21 (FIG. 1) and transmit data through the digital data transmitter 46 (FIG. 1). Additionally, the program instructions associated with the block 111 of the master executive flow chart will direct the data in and out of the data memory 53 utilizing the arithmetic unit 54, all under control of the control unit 55 to perform the necessary data transformations for the required data reception and transmission. It will be appreciated that the specific processing will depend on the detailed specific instrumentation of a particular automatic flight control system for a particular aircraft. Preparation of software for such program segments is a routine matter for normally skilled programmers and will not be further described herein for brevity.

The program segment associated with the block 113 provides data end-around and monitoring computations of a type that are well known in the automatic flight control system art. As previously described with regard to FIG. 1, each of the digital-to-analog converter outputs on the cable 36 is applied to the multiplexer 13 so that the conversion interfaces 16 and 32 as well as the input/output functions performed by the computer 24 may be tested for proper operation. Additionally, as previously described with regard to FIG. 1, an end-around connection is made from the digital data transmitter 46 to the input of the multiplexer 17 to check the operational integrity thereof in a well known manner. The computations and comparisons required within the computer 24 to provide these functions are specifically related to the particular sensors and interfaces utilized and are of a routine nature so that the specific detailed software for implementing the block 113 may be readily provided by a normally skilled computer programmer.

If the tasks $s_4$ and $s_5$ of the respective blocks 111 and 113 are properly performed, then the associated task completion bits $S_4$ and $S_5$ of the respective blocks 112 and 114 will be set in a manner similar to that described above with regard to the block 106.

As was previously discussed, the automatic flight control system computations are performed twice utilizing separate memory banks to store the separate, although identical, software for the computations and with separate memory banks utilized for the storage of the data associated therewith. These independent data banks and computations as well as independent and identical sensor sets have been designated as channel A and channel B of channel 1 of the dual redundant automatic flight control system. The dual sensor sets were indicated at 10 and 11 of FIG. 1 and the dual program memory banks are indicated schematically by the blocks 69–72 and the blocks 73–76 respectively. The duality of computation and of memory banks provides a complete verification of memory operability which will detect the failure of even a single bit of memory. The dual memory banks may be skewed with respect to each other, i.e., the address locations of identical programming being offset from one another by a constant number of locations, thereby avoiding common failure modes in the read/write circuitry of the computer which might have caused a symmetrical or identical read or write error in both channels A and B.

Referring again to FIG. 3, blocks 115 and 116 designate all of the channel A and channel B automatic flight control system computational tasks respectively, the channel A tasks being denoted as tasks $a_1, a_2, \ldots a_n$ and the channel B tasks being designated as tasks $b_1, b_2, \ldots b_n$. It is appreciated that these identical channel A and channel B computations are performed sequentially as indicated by the sequential flow from the block 115 to the block 116. The channel A computations which are identical to the channel B computations will be described in greater detail herein below with regard to FIG. 5.

After performance of the channel A and channel B computation tasks, the control unit 55 (FIG. 2) transfers control to the task $s_6$ block 117 of the master executive flow chart of FIG. 3. In this block a program segment stored in the program memory 52 (FIG. 2) compares the results of the channel A and channel B computations to vertify that they are identical. If identity within a predetermined tolerance is established, program control enters block 120 where the $S_6$ task completion bit is set in the manner described above. If a discrepancy should be detected between the output computations from the blocks 115 and 116, the block 120 may be by-passed by a simple programming routine so that the task completion bit $S_6$ will remain unset or control may be transferred to the failure logic computations of block 102.

After completion of the block 120 computations, control transfers to the block 121 to perform task $s_7$ wherein the computer 24 controls the multiplexer 26 to provide the digital output data from the results of the channel A and channel B computations to the digital-to-analog converters 32 which in turn provide the required analog signals to the system as discussed above with regard to FIG. 1. The program segment stored in the program memory 52 (FIG. 2) associated with the flow chart block 121 performs scaling and data packing computations and, in addition, provides the system discrete outputs. The output transmission of the data is initiated by the computations in the block 121 which data transmission continues simultaneously with further processing by the computer 24 in a manner well known in the art. After successfully performing the functions required by the block 121, control transfers to block 122 wherein the associated task completion bit $S_7$ is set in the manner previously described.

After completion of the computations of the block 122, the program transfers control to the task $s_8$ block 123 wherein servo modeling and monitoring computations are performed to assure that the aircraft surface servos are performing in the proper manner to within a specified tolerance. Since the specific mathematical models utilized to simulate the servo operation depend on the specific servo mechanisms of the aircraft and such modeling and monitoring is well known in the automatic flight control system art, further details thereof will not be provided herein for brevity. It is appreciated, however, that in performing the associated program segment stored in the program memory 52 (FIG. 2), transfers and returns to and from the sub-routines 77–80 will be required during which transfers the instructions of the computer repertoire may be exercised in the manner described above. If the task $s_8$ is properly performed, program control transfers to block 124 in accordance with which the associated task completion bit $S_8$ is set in the manner described above.

After completion of the computations associated with the block 124, the master executive program transfers control to a block 125 in which the remainder of the single channel tasks $s_9, s_{10}, \ldots s_m$ are performed. As previolsy described, the programming segments associated with these single channel tasks $s_1$ through $s_m$ are stored within the program memory 52 (FIG. 2) as schematically represented at 65 through 68. The block 125 represents remaining tasks to be performed by the executive program such as scanning the input discretes for information content and processing same for mode selection, mode progression, failure indication and the like. The signals for the aircraft displays are generated and stored in preparation for the repetition of the block 111 wherein the digital data output is provided during the next reiteration of the master executive program.

After all of the single channel tasks are performed and the associated task completion bits set in accordance with the block 125, program control transfers to a block 126 wherein all of the constants utilized for the various single channel computations are formed into a check sum and compared to a reference sum to detect memory failures. After the test in block 126 is performed, control is transferred to a block 127 to wait for the next occurring real time interrupt. Control transfers to the location in the program memory 52 schematically represented at 64 which contains the appropriate WAIT FOR INTERRUPT instruction. The computer 24 processor then stops and waits for the next occurrence of the real time clock interrupt at which time control is transferred to the program memory location 60 in accordance with the start block 90 of the master executive flow chart. In this manner, continuous reiteration of the executive program occurs resulting in effectively continuous control of the aircraft.

It will be appreciated from the foregoing that the tasks are performed sequentially in the order illustrated in FIG. 3. The program segments 60 through 80 schematically illustrated in the program memory 52 of FIG. 2, corresponding to the blocks of FIG. 3, are arranged in the drawing for convenience of illustration and it is appreciated that the order in which the program segments appear in the drawing is not necessarily the order in which the program segments are stored in the physical memory.

The master executive flow chart illustrated in FIG. 3 is designed to provide orderly control of a particular type of modern jet transport. It will be appreciated that other executive program arrangements may be utilized to practice the invention as herein described. The foregoing description was explained in terms of performing each of the blocks of FIG. 3 during each iteration of the program. In a practical system it is not necessary to perform all of the blocks during each iteration. For example, some of the tasks may need only be performed every other iteration or every third iteration. Thus additional programming would conveniently be included between the blocks 92 and 93 for so controlling the executive program flow. This additional programming would set the bits in the task list words corresponding to those tasks that are to be performed during the current iteration. It will be appreciated that the logic performed in the blocks 93–95 will still yield the proper result for the $M_S$, $M_A$ and $M_B$ words since the unset task list bits will correspond to unset task completion bits thereby yielding the required binary ONE.

Referring now to FIG. 4 in which like reference numerals refer to like blocks with regard to FIG. 3, further details of the blocks 96, 97 and 98 are illustrated. As discussed above, these blocks of the master executive flow chart are utilized to verify that the computer 24 has accomplished all of those tasks assigned to it by the software. The manner in which the task completion test is performed verifies that all of the conditional transfer or program branching instructions of the computer are operating properly. As indicated by the legends, the logical complementing instruction is also utilized and the upper and lower accumulator functional integrity is also tested in accordance with the legends "AU" and "AL" representing the upper and lower accumulator portions (not shown) of the arithmetic unit 54 (FIG. 2). As explained above, the conditional transfer instructions cause program branching in accordance with the contents of the upper and lower accumulator being equal to or not equal to zero as well as being positive or negative. Additionally, the conditional transfer instructions operate on the contents of an addressed word being equal to, not equal to, less than or equal to, or greater than the lower accumulator. Each of the conditional transfer instructions is exercised for both the branch and don't branch conditions such that when the flow chart of FIG. 4 is completed, all of the conditional transfer instructions are verified as operating properly and all of the assigned tasks are verified as having been accomplished. This repertoire exercise is required because devices such as flip-flops within the computer 24 are set as a result of a compare instruction and the state of the flip-flop determines the direction of the branch. If a flip-flop associated with the logical transfer instructions or the associated logic should fail, the failure may result in an incorrect branch command to the program. That is, if the task completion verification words $M_A$, $M_B$ and $M_S$ are compared to the criteria as indicated by the legends in the blocks of FIG. 4 and a failure were to result, the branch instructions should direct the program to the failure routine address. However, if a computer hardware failure associated with the compare state had occurred, a branch in a wrong direction might occur indicating an incorrect valid state. For this reason all of the branching instructions are exercised in both directions in order to reach a final task completion validation point in the program at the block 104. It will be appreciated that the flow chart of FIG. 4 would be varied in accordance with the specific conditional transfer instruction repertoire of the particular computer utilized. It will further be appreciated that the various words $M_A$, $M_B$ and $M_S$, as well as their complements must be transferred to the upper and lower accumulators as indicated by the legends by suitable data enter instructions from the computer repertoire.

The flow chart of FIG. 4 is comprised of blocks 130 through 154 in addition to the blocks 102, 103 and 104 which are identical to the similarly numbered blocks from FIG. 3. It will be appreciated that the block 96 of FIG. 3 is comprised of the blocks 130 through 141 of FIG. 4; that the block 97 of FIG. 3 is comprised of the blocks 142 through 152 of FIG. 4 and that the block 98 of FIG. 3 is comprised of the blocks 153 and 154 of FIG. 4. The block 130 is entered from the block 95 of FIG. 3 and after complementing the $M_A$ word and transferring the complement to the upper accumulator, the program utilizes the conditional transfer instruction to jump if the contents of the upper accumulator is equal to zero. Since under normal operation all of the bits of the $M_A$ word (as well as of the $M_B$ and $M_S$ words) should be equal to ONE, the complement thereof should be equal to zero and control should jump to the next block 131. If, however, a failure should occur and the complement of $M_A$ is not equal to zero, then the jump will not occur and the subsequent instructions will transfer control to the failure logic computations 102. In a similar manner as illustrated, all of the conditional transfer instructions of the computer 24 are tested for proper operation.

It will be appreciated that in the specific preferred embodiment of the automatic flight control system, when the computer performs the programming associated with FIG. 4 all of the tasks are established and must be accomplished each computation cycle. Thus each task list word is a fixed constant of all ONES designating the tasks to be completed.

Specific attention is directed toward blocks 147 and 154 in which zero is added to the M word. Since the specific computer utilized in the preferred embodiment of the invention is a one's complement machine, the all ONES condition of the M word is equivalent to $-0$ and the addition of $+0$ to $-0$ results in $+0$. The particular logical instructions of the machine only recognize $+0$. Hence the requirement for the blocks 147 and 154 of FIG. 4.

Figure 5A:
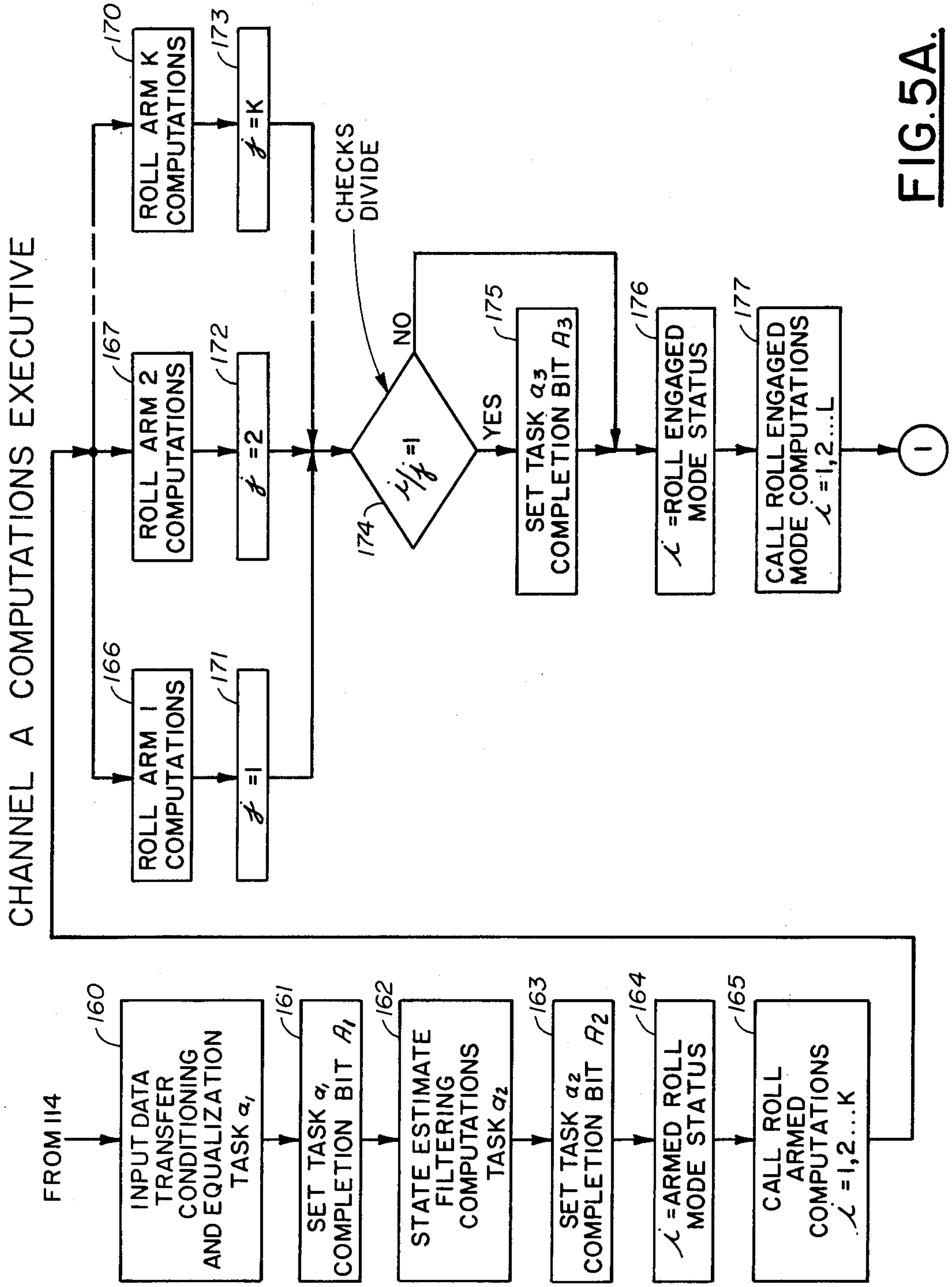
FIG. 5 is a flow chart illustrating in greater detail another portion of FIG. 3.
Figure 5B:
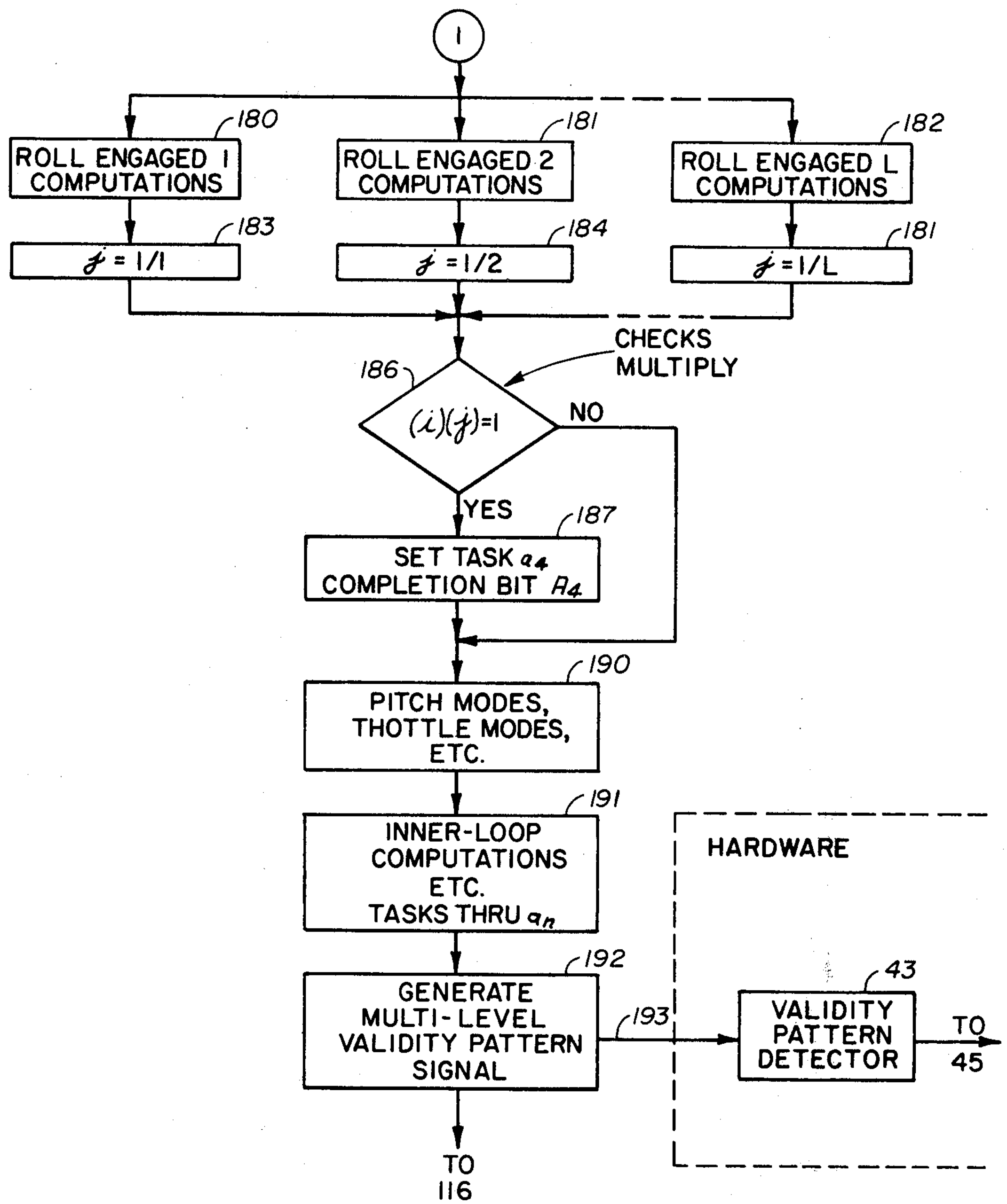

As previously described, blocks 115 and 116 of FIG. 3 depict the channel A and channel B computations of the system. Referring now to FIG. 5, a detailed flow chart of the channel A computations is illustrated, the channel B computations being identical thereto. The channel A executive computations comprise that portion of the software system that actually performs the automatic flight control system computations. Control is transferred from the block 114 of FIG. 3 to a task $a_1$ block 160 where the associated program segment is illustrated as schematically stored at 69 in the program memory 52 (FIG. 2). This program segment transfers the data that was placed in predetermined locations during performance of the block 105 of FIG. 3 as explained above, to the computation portion of the software system wherein the data is conditioned such as by utilizing filtering routines and is equalized with regard to the comparable computations from the channel 2 portion of the automatic flight control system. As described above, numerous transfers to and from the subroutine 77–80 to provide the conditioning and equalization functions may be performed utilizing the instructions of the computer repertoire to manipulate the transfer addresses thereby assuring that if these so utilized instructions fail to operate properly the program will enter an abnormal path and not set the associated task completion bit. During normal operation after the functions required in the block 160 are performed, control transfers to a block 161 in which a task completion bit $A_1$ is set corresponding to the completion of the task $a_1$. The task completion bit setting procedure is similar to that described above with regard to FIG. 3.

After performing the instructions associated with the block 161, the control unit 55 (FIG. 2) transfer control to a task $a_2$ block 162 with the associated program segment schematically illustrated as stored at 70 in the program memory 52 (FIG. 2). The state estimate computations combine the data as processed above utilizing known filtering techniques in order to obtain the best state estimate to be utilized in the ensuing control law and other flight control and guidance computations. The state estimate filtering is well known in the automatic flight control system art, an example of which being conventional complementary filtering. After the state estimate computations are performed, control is transferred to a block 163 in which the associated task completion bit $A_2$ is set.

With the data processed and the best estimates thereof computed, the software system is then ready to perform the computations for controlling and guiding the aircraft. As is well known in the automatic flight control system art, armed modes and engaged modes are utilized in the various flight regimes of the aircraft. Thus for each of the roll, pitch and yaw axes as well as the throttle modes and the like, armed and engaged computations are selectively performed in accordance with the existing conditions of the aircraft and the modes engaged by the automatic flight control system mode selector, these modes include the appropriate control law computations for effecting the desired aircraft control.

After the computations required by the block 163 of FIG. 5 are performed, control is transferred to an armed roll mode status block 164. In this block a variable $i$ is set to a number from $l$ to $k$ in accordance with the roll armed computations to be performed. The variable $i$ is set in accordance with the automatic flight control system mode selector in conjunction with the extant condition of the aircraft. The program selects one of the many paths to the appropriate armed roll mode computations in accordance with the task selection code assigned to the variable $i$. Program control transfers from block 164 to a block 165 from which the appropriate roll arm computation sub-routine is entered. The roll arm computation sub-routines are indicated at 166, 167 and 170 on the channel A computations executive flow chart. At the completion of each of the roll arm computation sub-routines, a variable $j$ is set to equal the value of the variable $i$ which controlled entry into the particular roll arm computation sub-routine. These blocks are indicated at 171, 172 and 173 on the channel A computations executive flow chart.

Irrespective of the path taken through the roll arm computations, control returns to a block 174 in which the input variable $i$ and the output variable $j$ are compared for validity. The comparison is performed by dividing $i$ by $j$ which additionally tests the divide instruction of the computer instruction repertoire. If the test of the block 174 fails the next block 175 is by-passed and control transfers to a block 176. If, however, under normal operating conditions of the system, the test is successful, control passes to the block 175 wherein the task completion bit $A_3$ is set in accordance with the successful completion of the task $a_3$ which related to the roll armed computations. A similar procedure is performed with regard to the block 176 in which the roll engaged mode status variable $i$ is set to a number from 1 through L in order that upon entering block 177 control may be transferred through the appropriate roll engaged computation sub-routine which sub-routines are indicated at 180, 181 and 182. In a manner similar to that described above with regard to the blocks 171–173, blocks 183, 184 and 185 set an output variable $j$ as indicated by the legend in accordance with the roll engaged computation sub-routine performed. Irrespective of the path chosen through the roll engaged computations, control arrives at a block 186 wherein the logic determines that the correct task was performed by checking that the task completion code $j$ equals the task selection code $i$. In the block 186 this test is performed so as to check the operability of the multiply instruction of the instruction repertoire of the computer. In a manner similar to that described above with regard to the blocks 174 and 175, failure of the test in the block 186 causes the task completion block 187 to be by-passed whereas proper operation causes the task completion bit $A_4$ to be set.

After control passes through the blocks 186 and 187, a block 190 is entered which represents a similar flow chart programming arrangement for the remaining modes of the system such as the pitch modes, the throttle modes, the yaw modes and the like.

Control passes from the block 190 to the block 191 in which all of the inner loop computations and the like for the automatic flight control system are performed. The inner loop computations relate to the basic attitude stabilization of the aircraft as opposed to the guidance or command computations performed as described above. The inner loop computations transfer to and from sub-routines for the basic roll, pitch and yaw stabilization equations for the aircraft to control and hold existing attitudes in accordance with angular displacement and rate signals filtered and combined in accordance with the appropriate equations to provide the control signals to the control surfaces of the aircraft. Each of the tasks represented within the block 191 has an associated task completion bit which is set in the manner described above.

After the computations required by the block 191 are performed, the program counter 85 of the control unit 55 (FIG. 2) transfers control to a block 192 in which a multi-level validity pattern signal is generated. It is essential that the pattern be dynamically varying and is generated by changing the state of the output signal on a lead 193 for each iteration of the executive program. Thus should the computer stop functioning either by entering the failure logic computations block 102 of FIG. 3, or if the computer should fail catastrophically by being unable to execute instructions, the signal on the lead 193 would remain in a static state. This static condition may be detected by the validity pattern detector 43 as described above with regard to FIG. 1. It will be appreciated that the dynamically varying validity pattern may be varied in amplitude, in pulse width or both, in order to provide the failure detection function described above. Conveniently, however, the preferred embodiment of the invention is described in terms of varying the amplitude of the pattern.

Figure 6:
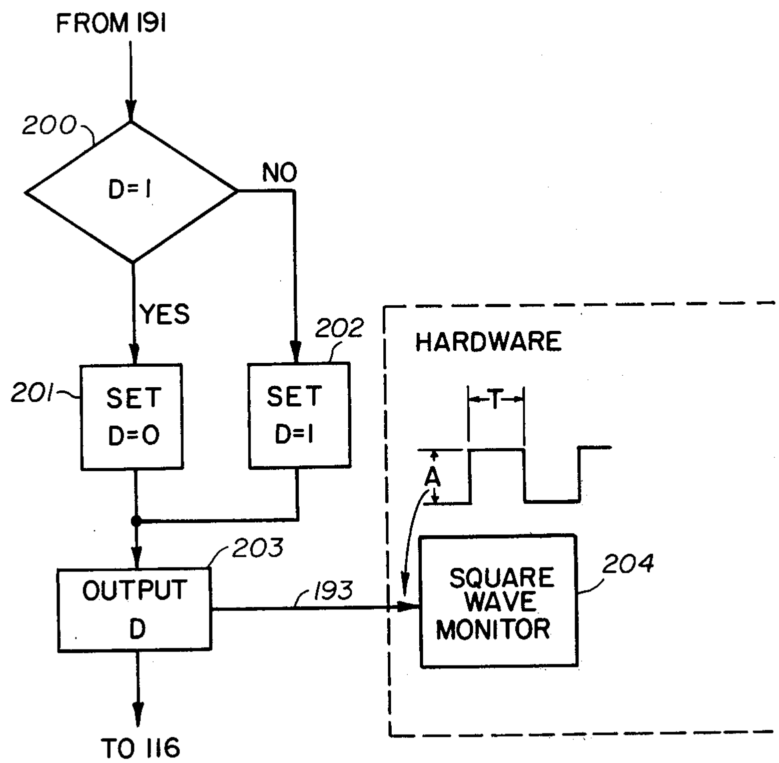
FIG. 6 is a partial schematic block diagram and flow chart illustrating a particular validity pattern generation routine.

A specific example of the generation of the validity pattern signal is illustrated in FIG. 6. Referring now to FIG. 6, a computer word designated as D is utilized to provide a square wave of amplitude "A" and width "T"

having a period equal to 2T where T is the iteration time of the program. Control is transferred from the block 191 of FIG. 5 into a block 200 which examines the state of the D variable. If D is equal to 1 during a particular iteration, D is set to 0 in a block 201. If, however, during an iteration, D is equal to 0, then D is set to the opposite state 1 in a block 202. The final state of the D variable during the iteration is transmitted to the output in a block 203 to the lead 193 which transmits the D variable to the hardware portion of the system as illustrated in FIG. 1. It is thus appreciated that as the program is reiterated, the amplitude of the D variable is changed from 0 to 1 and when this varying binary state is converted by the associated digital-to-analog converter in the block 32 (FIG. 1), whose output is applied to the lead 42 (FIG. 1), then a squarewave of amplitude A and duration T is generated. As previously stated, if the computer should stop continuously executing the executive program, the signal on the lead 193 would remain in a static state indicative of the failure. The validity pattern signal is applied to a square wave monitor 204 which in this particular example is representative of the validity pattern detector 43 of FIG. 1. The square wave monitor is of conventional design constructed from amplitude discriminator circuits, one-shot multivibrator timers and simple logic networks to detect that the square wave signal is no longer being provided and a static signal indicative of failure is instead being provided by the computer 24 (FIG. 1).

It will be appreciated that in a failure mode of the computer 24, the validity pattern signal may not necessarily fail in a static state but may fail by being other than a precisely defined dynamically varying signal. The computer 24 may fail such that the validity pattern will exhibit an incorrect dynamic state such as one resembling noise.

In accordance with fail-safe and fail-operative techniques, two such monitors 204 are utilized so that a valid signal will be provided only when each of the monitors is generating a valid signal output.

It will be appreciated that in the operation of the system of FIG. 1 in accordance with the master executive program, that the block 125 of FIG. 3 has access to the results of the armed and engaged computations of FIG. 5 and in combination with the mode selector of the automatic flight control system performs the mode progression and regression functions for the system. When the automatic flight control system is in a disengaged mode one of the possible paths for the armed and engaged computations of FIG. 5 is one in which no operations are performed. For example, with regard to the block 176 of FIG. 5, when the automatic flight control system is disengaged, *i* is set equal to 1 indicating no roll mode. Similarly, when the automatic flight control system is engaged, *i* may be set equal to 2 for the localizer capture mode and *i* may be set equal to 3 for the heading hold mode, etc.

From the foregoing description of the preferred embodiment of the invention, it will be appreciated that the automatic flight control system of FIG. 1 is controlled by the real time clock within the computer 24 to continuously execute the master executive program of FIG. 3 thereby continuously transmitting the sensor signals from the blocks 10, 11 and 12 to the input, operating upon the signals in accordance with the computations executive flow chart of FIG. 5 and providing the signals to the surface control actuators of the aircraft via the digital-to-analog converters of the system. The program is arranged in tasks to be performed with associated task completion indicia that are set upon successful completion of the tasks. The instructions of the computer instruction repertoire that are utilized in the programming for the aircraft are interspersed throughout the program to control the branching addressing so as to detect a failure in the instruction repertoire by causing the program flow to follow an abnormal path thereby not setting all of the task completion indicia. Additionally, the program includes a dynamic validity pattern generator program segment which provides a normal output signal only when the computer is continuously executing the master executive program. When the computer stops executing the program either due to entry into the failure logic computations 102 or because of catastrophic failure of the computer 24, an external hardware monitor 43 (204 on FIG. 6) detects the abnormal validity pattern signal shutting down the failed channel.

Examples were given above of the unique programming technique for causing the program to follow an abnormal path, i.e., to "get lost". Further examples of such failure detecting operative programming will now be described specially with regard to the above referenced 1819 computer, it being appreciated that similar techniques may be readily applied to automatic flight control systems utilizing other computer designs. The examples are given with regard to the control law computations performed in accordance with the blocks 115 and 116 of FIG. 3 as shown in greater detail in FIG. 5.

As generally described above, the computer 24 utilizes dual memory banks designated as bank 1 and bank 2 wherein the locations in each bank have octal address designations. For example, address 2-0662 designates locations 0662 in memory bank 2. In the specific computer, the program counter 85 of FIG. 2 is designated by the mnemonic P and the index registers of the computer 24 are generally designated mnemonically as B. Generally an instruction word of the computer 24 has an instruction portion (Op code) and an operand portion. The instruction portion and operand portion may be designated octally to provide the actual binary designation stored in memory as well as mnemonically as is conventional in assembly language programming. The operand portion of the instruction word is designated mnemonically as Y which generally indicates an address in memory, the contents of that address location being designated as (Y). Parentheses utilized in this nature will indicate the contents of the associated element. For example, (P) indicates the contents of the program counter 85.

In the examples to be given, the following functions will be performed. Within the channel A or channel B computations, blocks 115 and 116 respectively of the master executive program of FIG. 3, a control law will be utilized which computes a pitch increment $\Delta\ \theta$ which is a function of bank angle $\phi$, weight W, flap deflection $\delta_F$ and $\int(\dot{V}/V)dt$. A sub-routine such as schematically represented at 77–80 in FIG. 2 called THETLC (Theta lift command) provides this computation. After the THETLC is called and utilized command returns to the address stored when the sub-routine was entered.

The index register B is set with a number that corresponds to an "armed" mode designation. Any roll mode that has been armed and is awaiting satisfaction of additional criteria to activate engagement is given a unique number that is called ROLAIB stored at memory location 2-4327.

As is conventional in computers of the type described, flag locations are included. RAPSIB is a first pass flag which when set calls for special initialization during the first pass of the sub-routine that checks for the satisfaction of the "armed" criteria. After completion of the initialization task, the flag is reset so that in subsequent passes into the sub-routine to check the "armed" criteria, the initialization will not be performed.

AROLIB is the first address of the table of addresses of the sub-routines which check the criteria that enable enter AL with (Y) instruction (ENTAL) with the octal designation 12 transfers (Y) to the lower accumulator AL. The indirect return jump instruction modified by the index register B (IRJPB) designated octally as 31 transfers (P)+1 to (Y) and (Y)+1 to P where (B) is added to the operand.

It will be appreciated that in these specific examples given, the computer 24 utilizes 18 bit instruction and data words and 12 bit index register words. Associated with the above-described functions, the following table indicates the specific instructions stored at the specific locations in the program memory 52 (FIG. 2) with the resulting response of the computer 24.

| | LOCATION | INSTR | INSTR' OPERAND | COMPUTER RESPONSE | FUNCTION OF INSTRUCTION |
|---|---|---|---|---|---|
| I | 2-0662 | 76 4057 | RJP'THETLC | . THETLC is subroutine in location 2-4057<br>. GO TO LOCATION 2-4057<br>. STORE (P + 1) = 0663 in 4057<br>. SET P TO Y + 1 = 4057 + 1 = 4060<br>. EXECUTION OF THETLC STARTS AT 4060 | Computes a pitch increment $\Delta\Theta$ which is a function of bank angle $\phi$, weight W, flap deflection $\delta_F$ and $\int (\dot{V}/V)dt$ |
| | 2 4060 | ... | ... | | THETLC subroutine |
| | 2 40XY | 55 4057 | IJP'THETLC | . Set P register to contents stored in location 2-4057...that is, 2-0663 | Ends THETLC subroutine and commands return to address stored when subroutine was entered. |
| II | 2 0663 | 32 4327 | ENTB'ROLAIB | . Set B (index) register to value stored in location 2-4327 (ROLAIB) | The index register is set with a number that corresponds to an "armed" mode designation. Any roll mode that has been armed and is awaiting satisfaction of additional criteria to activate engagement is given a unique number that is called ROLAIB (location 2-4327). |
| III | 2 0664 | 12 4335 | ENTAL'RAPSIB | . Enter Lower Accumulator with contents of location 2-4335 (RAPSIB) | RAPSIB is a first pass flag...when set, it asks for special initialization during the first pass of the subroutine that checks for satisfaction of the "armed" criteria. After completion of the initialization task, the flag is reset so that in subsequent passes into the subroutine to check "armed" criteria, the initialization will not be performed. |
| IV | 2 0665 | 31 5175 | IRJPB'AROLIB | . Go to location 5175 + B AROLIB+ B)<br>. This location contains an address... call that address M<br>. Store the next location of the P register (P + 1) which is 2-0666 in address M. "M" is an address whose contents is "M-NAME"<br>. Set P to M + 1<br>. Execution of the "M-NAME" subroutine starts at location M + 1 | AROLIB is the first address of the table of address of the subroutines which check the criteria that enable transition of an armed roll mode to an engaged mode. The index number stored in index register B converts AROLIB to a table of addresses. B was previously set by the recognition of which specific roll mode was armed. A specific address for each armed mode thereby defines a different subroutine for checking engage criteria. |

transition of an armed roll mode to an engaged mode. The index number stored in index register B converts AROLIB to a table of addresses, the index register B having been previously set by the recognition of which specific roll mode was armed, reference being had to the block 164 of FIG. 5. A specific address for each armed mode thereby defines a different sub-routine for checking the engage criteria.

Generally, five instructions are exemplified in the specific operations performed which in the operation of these instructions, other instructions of the repertoire are also utilized. For example, the return jump instruction (RJP) with the octal designation 76 transfers (P)+1 to Y and transfers Y+1 to P. The indirect jump (IJP) with the octal designation 55 transfers (Y) to P. The enter B with (Y) instruction (ENTB) with the octal designation 32 transfers (Y) to the index register B. The With regard to failures that may occur referring to Section I of the Table, it is assumed that the instruction in location 2-0662 does not execute at all, i.e., the computer instruction decoding apparatus (not shown) considers the instruction as one calling for no operation. This results in the subroutine THETLC not being called which results in a task not being accomplished, thereby resulting in the failure to set a task completion bit.

Another failure may occur if the instruction in memory location 2-0662 which should be 76 4057 is erroneously equal to 76 4017 because a single bit at the memory location cannot be set to a 1. The 18 bit number 76 4057 (octal) is in binary form:

1 1 1 1 1 0 1 0 0 0 0 0 1 0 1 1 1 1 = 764057

1 1 1 1 1 0 1 0 0 0 0 0 0 0 1 1 1 1 = 764017, where the underlined bit represents the erroneously operating bit. The computer 24 will then attempt to execute instructions in the following manner. The program counter 85 will go to location 2-0662 whereat it finds the return jump (RJP) instruction (76) but to an erroneous address 4017, rather than to the correct address 4057. The desired subroutine THETLC is stored in the program memory 52 (FIG. 2) starting at location 4057. The computer executes the return jump instruction (76) by storing the contents of the program counter 85 incremented by 1 [(P+1) = 2-0662 + 1 = 2-0663] in the erroneous address 4017. The program counter 85 is then set to Y + 1 = 4017 + 1 = 4020 (conventional computer octal arithmetic). Thus the computer begins executing at location 4020 but this is not the THETLC subroutine but another subroutine.

The program has now "gotten lost" and the normal flow of the program has been destroyed. There are two alternative paths for the program to take. The erroneous subroutine entered may exit upstream or downstream of the normal program flow. If it exits upstream of the call location 2-0662, the program sequence forms a loop and will be repeatedly executed until the timing cycle expires in accordance with the real time interrupt described above. If it exits downstream, a large portion of the program will be skipped. In either event, there will be a number of tasks which were not accomplished and the associated task completion bits would not have been set.

In another manner of failure with reference to section II of the above table, assume failure in the index register B, e.g., the inability to reset a bit in the B register. Thus, the index register B is set with the quantity ROLAIB which is the contents of location 4327. Assuming that ROLAIB (or the contents of location 4327) is zero but that one of the bits of the B index register is "stuck" in the binary ONE state. Thus instead of a 12 bit index register number equal to

| | | | |
|---|---|---|---|
| 000 | 000 | 000 | 000 |

the index register instead provides

| | | | |
|---|---|---|---|
| 100 | 000 | 000 | 000 = 4000 octal |

Referring to Section IV on the above table, the value set in the B register is utilized to find the address of a subroutine. In this portion IV of the Table the program is steered to location 5175 +B (actually 2-5175 indicating location 5175 in memory bank 2). If (B) were properly zero, control would have gone to location 2-5175 to find the address M. However, because of the erroneous value in B, control goes to 2-5175 + 4000 = 31175 (octal). At this erroneous location 31175 the program erroneously attempts to read the address M. The instruction stores the next count of the P counter 85 (P÷1) at this erroneous address M (contents of 31175). The program then sets the P counter 85 to M + 1. Hence, execution starts at the erroneous M + 1 address.

A failure of this type may transfer program execution to any location of memory within the addressing capability of the P counter 85. In an actual mechanization of the above described preferred embodiment of the invention the effect of the specific failure described was traced through the program which actually steered program control to location 31175. Specifically that erroneous location was actually used to store a control variable. Thus the address M was the value of that variable. Since in the specific situation encountered that variable was usually near zero and assuming that at the time of the failure M was equal to zero, the location 00000 would have the contents 20666 and the location 0001 would have the contents 300505 with execution starting at location 00001 transferring the program to a failure routine. This occurs since in the particular computer utilized, the low memory addresses contain indirect return jumps to system failure routines which, in turn, stop the machine. Thus the routine in 0505 was of this type and hence the machine would have entered a failure routine indicating a fault and then would have stopped. In the particular embodiment described nonused memory locations contain zeros which are utilized as fault codes which indirectly cause the same result (i.e., a fault interrupt causes transfer to a system failure routine). If the executive program would have transferred to an active area of the program memory, then the failure mode operations would occur as described above in the example given above with regard to a memory bit failure.

With regard to the failure response of the computer 24 to an index register failure as described above, the program would "get lost" if an arithmetic instruction should fail. For example, the failure described above with regard to the index register failure could have occurred if the ADD instruction were not operating properly. The indirect return jump B modified instruction (IRJPB) indicated in section IV of the above table, executes by using the arithmetic unit 54 ADD apparatus and associated routine to add the contents of the B index register 86 (FIG. 2) to the address called by the indirect return jump instruction. Thus in section IV of the above table the computer 24 should add 2-5175 + B. If the addition is not accomplished properly the program is steered in an erroneous address in the manner described above when the contents of the index register B were incorrect. The program will, therefore, be steered to one of three regions. The program may enter a region at a lower location than its exit location so that the program will form a loop and "hang-up" which fault will eventually be identified by the next occurring real time interrupt and the check of the task completion bits as described above. Alternatively the program may enter a region at a higher location than its exit location and it therefore skips task completion bit setting program segments so that the task completion test will detect the failure. The program may also enter a region where it is transferred into fault routines that stop the computer and indicate a failure as described above.

From the foregoing it is appreciated that a totally monitored automatic flight control system is achieved using a single digital computer and appropriate interfacing sensors and electronics in each of the two channels of the system. Because of the novel hardware and software monitoring techniques described above 100% failure detection capability is assured followed by a safe shutdown of the failed channel. Two such channels operating simultaneously provide a fail operative capability and with only one such channel operating the automatic flight control system provides "fail-passive" performance. Because of the hardware and software techniques described above it is assured that no failure or equipment anomoly will go undetected, including any malfunction in the ability of the computer to execute instructions. The fault detection capability provided by the above described system operates down to a single erroneous bit in a stored program of thousands of words. The above described structuring of the program is such that digital computer instruction repertoire failures of any type result in incorrect branching of the program flow. Failure of the program flow to progress in the specified manner is determined by both the computer program which detects the absence of a proper sequence of task completion indicia and by an external hardware monitor which detects an error in a dynamic signal pattern which pattern will only be correct if the computer performs its specified task properly. In addition to these monitoring techniques, computer redundancy in the stored program is utilized to detect failures in individual bits of the data storage portion of the computer memory. Thus the continuously refreshed value of a sensed control parameter is stored in two memory locations and the control law computations utilizing that sensor output are calculated twice with the results compared to confirm integrity of the data flow and storage. There are, however, no comparison monitors required between the computers of the two channels as are utilized in conventional fail-passive systems since only one computer is required to achieve the desired monitoring capability of detecting any equipment failure.

The above described system detects and shuts down the failed channel in the event of a computer failure. Two basic types of failure of the computer are possible, i.e., the machine may lose part or it may lose all of its intelligence. If the computer loses all of its intelligence it will not be capable of generating the validity pattern signal and thus this condition is detected externally and the system shut down. If the computer suffers only a partial loss of intelligence, this loss may be detected internally by the computer itself. Thus, by the above-described rigid structure of the software system, the computer retains the capability to detect a partial loss of intelligence. There are generally two causes for a partial loss of computer intelligence. The central processor unit may fail causing a particular instruction or class of instructions to function improperly. A memory or memory addressing failure may cause a particular memory location or class of memory locations to contain improper data or instructions. As described above, and in summary, the following techniques are utilized to detect a partial loss of intelligence.

1. Critical computations are performed in a dual manner providing an essentially perfect memory checking system. This technique is primarily utilized to detect all associated particular memory failures or other computation anomolies.

2. Task list checking is utilized to insure that the program is flowing as prescribed, i.e., verifying that the main program flow is being followed as specified.

3. The novel programming technique described hereinabove is utilized which must yield the correct results in order for the program flow to continue correctly. By utilizing this technique it can be verified that every instruction used by the program executes properly in a generic sense. This programming technique forces the detection of anomolous conditions by reason of utilization of the technique described above in sub-paragraph 2.

This programming technique has been characterized as forcing the program to "get lost". When this happens the computer may attempt to execute program where no memory exists and hence the computer will fail to function properly. Generally the getting lost technique is that the program branches when it shouldn't and doesn't branch when it should or branches to a non-specified address. This technique may be further characterized as forcing the program to take the proper flow only when all instructions are functioning properly. By utilizing this novel programming technique in combination with the task list checking procedure discussed in sub-paragraph 2 above the program checks for the proper execution of the computer instruction repertoire and various computer hardware elements such as the arithmetic instructions, the enter instructions, the store instructions, the conditional and unconditional transfer instructions, the logical instructions, the shift instructions, the register transfer instructions and the software accessible registers.

4. A check sum is performed on all constants utilized by the computations that are performed on a single channel basis. This technique has an extremely high probability of detecting memory failures associated with the single channel constants.

5. The program is organized in the computer memory in dual memory banks as described above so as to render memory addressing failures readily detectable. This technique utilized in conjunction with the above described techniques insure that all generic memory addressing failures are detected.

The above described novel programming technique of exercising the computer instruction repertoire by using the instructions to manipulate branching addresses such that if an instruction should fail the program flow follows an abnormal path and cannot complete the specified program, is the opposite programming philosophy to that utilized in the prior art in what are known as fault tolerant computers wherein the programming is designed such that if a failure should occur, branching into alternate paths will take place to complete the program. In the present invention the program is structured so that if such failure should take place the program will "get lost" and hence the failure will be detectable so that appropriate shut down procedures may be effected.

In summary it is believed that for the first time a fail operative, dual channel automatic flight control system utilizing a single digital computer in each channel has been achieved for practical utilization in modern aircraft. Although this concept has been generally considered in the prior art and systems described that attempt to achieve this desideratum, it is believed that by the above described novel combination of techniques, this desideratum has actually been achieved in a practical flight environment.

The program coding for executing the above described program utilizing the above referenced 1819 computer is provided in the appendix hereto. The program is written in 1819 SCAMP assembly language suitable for execution by the computer.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An automatic flight control system for aircraft having aerodynamic control surfaces and associated servo means coupled therewith for positioning said control surfaces and having sensor means for providing sensor signals in accordance with flight conditions experienced by said aircraft, comprising digital computer means having computer input means responsive to said sensor signals, program memory means, a repertoire of instructions operative in said flight control system and computer output means, computer input coupling means for coupling said sensor means to said computer input means, said computer means having a program stored in said program memory means comprising a plurality of first program segments structured for sequential execution by said computer means for controlling said computer means to operate on said sensor signals by sequentially performing a plurality of tasks respectively, to provide surface command signals to said computer output means, said program further including a plurality of second program segments associated with said first program segments, respectively, for switching task completion indicia in said computer means to a set state in accordance with completion of said tasks, respectively, said program further including a third program segment for testing said indicia for said set state thereby testing said indicia for completion of said tasks, said program utilizing all of said instructions of said repertoire within at least one of said first, second and third program segments in a manner to cause at least one of said indicia to remain unset upon failure of an instruction to function properly, said program further including a failure program segment that is entered from said third program segment when one of said indicia remains unset, said failure program segment including instructions for stopping the execution of said program, means for controlling repeated executions of said program, said program further including a fourth program segment for generating a precisely defined dynamically varying validity pattern by controlling a validity pattern signal at said computer output means to exhibit one level during an execution of said program and a different level during a subsequent execution thereof, validity pattern detector means coupled to said computer output means to receive said validity pattern signal for detecting said validity pattern signal being in a state different from said precisely defined state during a time interval in which said repeated executions of said program would normally provide said precisely defined dynamically varying validity pattern signal and for providing a failure signal in accordance therewith, and computer output coupling means said computer output means to said surface servo means for providing said surface command signals thereto.

2. The system of claim 1 in which said program segments are arranged as an executive program with program sub-routines and linking instructions controlling transferring between said executive program and said sub-routines, where the associated transfer addresses are derived utilizing said instructions of said repertoire to cause said program to follow an abnormal path upon failure of any one of the so utilized instructions thereby causing at least one of said indicia to remain unset.

3. The system of claim 1 in which said repertoire includes an instruction to wait for an interrupt and said means for controlling repeated executions of said program comprises a real time clock means, and a program segment in said program responsive to said real time clock means for controlling said computer to wait for a real time interrupt.

4. The system of claim 1 in which said program memory means comprises dual program memory banks, said plurality of first program segments being stored in one of said program memory banks and a plurality of program segments identical to said first program segments being stored in the other of said program memory banks, thereby providing computational redundancy to test the proper operation of said program memory means.

5. The system of claim 4 in which said computer means further includes dual data memory banks for storing identical sets of said sensor signals for operation thereon by said first program segments and said identical program segments, respectively, thereby providing data storage redundancy to test the proper operation of said data memory banks.

6. The system of claim 5 in which said task completion indicia comprise the bits respectively of a word stored in said data memory.

7. The system of claim 4 in which said computer means includes read/write circuitry means associated with said program memory means and in which said first program segments and said identical program segments are stored in said dual program memory banks, respectively, in a skewed manner with respect to the address locations of each other, thereby testing the proper operation of said read/write circuitry means.

8. The system of claim 1 in which said computer means includes a computer I/O control unit including said computer input means and said computer output means for providing control signals to said computer input and output coupling means.

9. The system of claim 8 in which said computer input coupling means comprises input multiplexer means coupled to receive said sensor signals from said sensor means and coupled to receive said control signals from said I/O control unit and having a multiplexer output for selectively applying said sensor signals to said multiplexer output in accordance with said control signals, and analog to digital converter means coupled to said multiplexer output for converting said selectively applied sensor signals to digital form for application to said computer input means.

10. The system of claim 9 in which said computer output coupling means comprises output multiplexer means coupled to said computer output means and coupled to receive said control signals from said I/O control unit and having a plurality of multiplexer outputs for selectively coupling said computer output means to said plurality of multiplexer outputs in accordance with said control signals, and a plurality of digital to analog converter means coupled to said plurality of multiplexer outputs respectively for converting said surface command signals from said computer output means from digital form to analog form for application to said surface servo means.

11. The system of claim 10 further including means coupling said digital to analog converter means to said input multiplexer means for transmitting said surface command signals in analog form thereto for end-around testing of proper operation of said digital to analog converter means.

12. The system of claim 1 in which said different state of said validity pattern signal comprises remaining in a static state.

13. The system of claim 1 in which said different state of said validity pattern signal comprises responding in an incorrect dynamic state.

14. A dual channel fail operative automatic flight control system for aircraft having aerodynamic control surfaces and associated servo means coupled therewith for positioning said control surfaces, each channel comprising sensor means for providing sensor signals in accordance with flight conditions experienced by said aircraft, a digital computer having computer input means responsive to said sensor signals, program memory means, a repertoire of instructions operative in said flight control system and computer output means, computer input coupling means for coupling said sensor means to said computer input means, said computer having a program stored in said program memory means comprising a plurality of first program segments structured for sequential execution by said computer for controlling said computer to operate on said sensor signals by sequentially performing a plurality of tasks, respectively, to provide surface command signals to said computer output means, said program further including a plurality of second program segments associated with said first program segments, respectively, for switching task completion indicia in said computer to a set state in accordance with completion of said tasks, respectively, said program further including a third program segment for testing and indicia for said set state thereby testing said indicia for completion of said tasks, said program utilizing all of said instructions of said repertoire within at least one of said first, second and third program segments in a manner to cause at least one of said indicia to remain unset upon failure of an instruction to function properly, said program further including a failure program segment that is entered from said third program segment when one of said indicia remains unset, said failure program segment including instructions for stopping the execution of said program, means for controlling repeated executions of said program, said program further including a fourth program segment for generating a precisely defined dynamically varying validity pattern by controlling a validity pattern signal at said computer output means to exhibit one level during an execution of said program and a different level during a subsequent execution thereof, a validity pattern detector coupled to said computer output means to receive said validity pattern signal for detecting said validity pattern signal being in a state different from said precisely defined state during a time interval in which said repeated executions of said program would normally provide said precisely defined dynamically varying validity pattern signal and for providing a failure signal in accordance therewith, and computer output coupling means coupling said computer output means to said surface servo means for providing said surface command signals thereto.

15. The system of claim 14 in which said program segments are arranged as an executive program with program sub-routines and linking instructions controlling transferring between said executive program and said sub-routines, where the associated transfer addresses are derived utilizing said instructions of said repertoire to cause said program to follow an abnormal path upon failure of any one of the so utilized instructions thereby causing at least one of said indicia to remain unset.

16. The system of claim 14 in which said repertoire includes an instruction to wait for an interrupt and said means for controlling repeated executions of said program comprises a real time clock means, and a program segment in said program responsive to said real time clock means for controlling said computer to wait for a real time interrupt.

17. The system of claim 14 in which said program memory means comprises dual program memory banks, said plurality of first program segments being stored in one of said program memory banks and a plurality of program segments identical to said first program segments being stored in the other of said program memory banks, thereby providing computational redundancy to test the proper operation of said program memory means.

18. The system of claim 17 in which said computer further includes dual data memory banks for storing identical sets of said sensor signals for operation thereon by said first program segments and said identical program segments, respectively, thereby providing data storage redundancy to test the proper operation of said data memory banks.

19. The system of claim 18 in which said computer includes read/write circuitry means associated with said program memory means and in which said first program segments and said identical program segments are stored in said dual program memory banks, respectively, in a skewed manner with respect to the address locations of each other, thereby testing the proper operation of said read/write circuitry means.

20. The system of claim 19 in which said computer includes a computer I/O control unit including said computer input means and said computer output means for providing control signals to said computer input and output coupling means.

21. The system of claim 20 in which said computer input coupling means comprises input multiplexer means coupled to receive said sensor signals from said sensor means and coupled to receive said control signals from said I/O control unit and having a multiplexer output for selectively applying said sensor signals to said multiplexer output in accordance with said control signals, and analog to digital converter means coupled to said multiplexer output for converting said selectively applied sensor signals to digital form for application to said computer input means.

22. The system of claim 21 in which said computer output coupling means comprises output multiplexer means coupled to said computer output means and coupled to receive said control signals from said I/O control unit and having a plurality of multiplexer outputs for selectively coupling said computer output means to said plurality of multiplexer outputs in accordance with said control signals, and a plurality of digital to analog converter means coupled to said plurality of multiplexer outputs respectively for converting said surface command signals from said computer output means from digital form to analog form for application to said surface servo means.

23. The system of claim 22 further including means coupling said digital to analog converter means to said input multiplexer means for transmitting said surface command signals in analog form thereto for end-around testing of proper operation of said digital to analog converter means.

24. The system of claim 14 in which said different state of said validity pattern signal comprises responding in an incorrect dynamic state.

25. The system of claim 14 in which said different state of said validity pattern signal comprises remaining in a static state.

* * * * *

UNITED STATES PATENT AND TRADEMARK OFFICE

CERTIFICATE OF CORRECTION

PATENT NO. : 4,115,847

DATED : September 19, 1978

INVENTOR(S) : Stephen S. Osder, et al

It is certified that error appears in the above-identified patent and that said Letters Patent are hereby corrected as shown below:

The attached computer program (Columns 33 thru 584), referred as an appendix in Column 26, lines 57-61, should be added to the above-identified patent.

Signed and Sealed this

*Twenty-sixth* Day of *June 1979*

[SEAL]

*Attest:*

RUTH C. MASON
*Attesting Officer*

DONALD W. BANNER
*Commissioner of Patents and Trademarks*

DC-10F

APPENDIX

```
DC-10 DIGITAL FLIGHT GUIDANCE  AND CONTROL SYSTEM

MEMORY STORAGE USED       11804

SECTION      3   03 0000 - 03 3207 :  1672      77 4476
SECTION      4   03 4000 - 03 7002 :  1539      51 7145
SECTION      5   00 0200 - 00 1355 :  622       26 2114
SECTION      6   00 1356 - 00 1370 :  11        10 0351
SECTION      7   00 1371 - 00 1413 :  19        50 7300
SECTION      8   00 1414 - 00 1757 :  228       00 0000
SECTION      9   00 2000 - 00 2110 :  73        46 1030
SECTION     10   00 2111 - 00 2137 :  23        13 1102
SECTION     11   00 2140 - 00 2154 :  13        67 2154
SECTION     12   00 2155 - 00 2165 :  9         15 0013
SECTION     13   00 2166 - 00 2344 :  111       74 1522
SECTION     14   00 2345 - 00 2407 :  35        61 2315
SECTION     15   00 2410 - 00 3132 :  339       22 0212
SECTION     16   00 3133 - 00 3174 :  34        70 2153
SECTION     17   00 3175 - 00 3236 :  34        47 6333
SECTION     18   00 3237 - 00 3271 :  27        71 0643
SECTION     19   00 3272 - 00 3332 :  33        72 6723
SECTION     20   00 3333 - 00 3357 :  21        51 5664
SECTION     21   00 3360 - 00 4136 :  367       62 3407
SECTION     22   00 4137 - 00 4146 :  8         50 0003
SECTION     23   00 4147 - 00 4154 :  6         50 0002
SECTION     24   00 4155 - 00 4164 :  8         61 5106
SECTION     25   00 4165 - 00 4174 :  8         50 0003

 18196 SCAMP                          SECTION       2          PAGE       1
 DC-10 DIGITAL FLIGHT GUIDANCE  AND CONTROL SYSTEM

SECTION     26   00 4175 - 00 4202 :  6         50 0002
SECTION     27   00 4203 - 00 4210 :  6         50 4212
SECTION     28   00 4211 - 00 4225 :  13        52 1610
SECTION     29   00 4226 - 00 4243 :  14        74 7776
SECTION     30   00 4244 - 00 4261 :  14        10 4257
SECTION     31   00 4262 - 00 4323 :  34        31 4325
SECTION     32   00 4324 - 00 4346 :  19        13 4457
SECTION     33   00 4347 - 00 4356 :  8         07 4356
SECTION     34   00 4357 - 00 4360 :  2         55 0000
SECTION     35   00 4361 - 00 4407 :  23        54 3257
```

18150 SCAMP SECTION 2 PAGE 1
DC-10 DIGITAL FLIGHT GUIDANCE AND CONTROL SYSTEM

-continued

| | | | | | | | | |
|---|---|---|---|---|---|---|---|---|
| SECTION | 36 | 00 4410 | - | 00 4417 | : | 8 | 10 | 6142 |
| SECTION | 37 | 00 4420 | - | 00 4442 | : | 19 | 54 | 2252 |
| SECTION | 38 | 00 4443 | - | 00 4460 | : | 14 | 13 | 0022 |
| SECTION | 39 | 00 4461 | - | 00 4502 | : | 18 | 10 | 6266 |
| SECTION | 40 | 00 4503 | - | 00 4512 | : | 8 | 10 | 6330 |
| SECTION | 41 | 00 4513 | - | 00 4524 | : | 10 | 56 | 6735 |
| SECTION | 42 | 00 4525 | - | 00 4542 | : | 14 | 43 | 6754 |
| SECTION | 43 | 00 4543 | - | 00 4555 | : | 11 | 27 | 4026 |
| SECTION | 44 | 00 4556 | - | 00 4571 | : | 12 | 52 | 0357 |
| SECTION | 45 | 00 4572 | - | 00 4601 | : | 8 | 01 | 5133 |
| SECTION | 46 | 00 4602 | - | 00 4611 | : | 8 | 03 | 5107 |
| SECTION | 47 | 00 4612 | - | 00 4621 | : | 8 | 01 | 5107 |
| SECTION | 48 | 00 4622 | - | 00 4631 | : | 8 | 03 | 5123 |
| SECTION | 49 | 00 4632 | - | 00 4644 | : | 11 | 51 | 1753 |
| SECTION | 50 | 00 4645 | - | 00 4674 | : | 24 | 03 | 7142 |
| SECTION | 51 | 00 4675 | - | 00 4712 | : | 14 | 01 | 2211 |

18150 SCAMP SECTION 2 PAGE 2
DC-10 DIGITAL FLIGHT GUIDANCE AND CONTROL SYSTEM

| | | | | | | | | |
|---|---|---|---|---|---|---|---|---|
| SECTION | 52 | 00 4713 | - | 00 4717 | : | 5 | 53 | 0002 |
| SECTION | 53 | 00 4720 | - | 00 4725 | : | 6 | 21 | 0004 |
| SECTION | 54 | 00 4726 | - | 00 4732 | : | 5 | 50 | 4734 |
| SECTION | 55 | 00 4733 | - | 00 4741 | : | 7 | 50 | 4742 |
| SECTION | 56 | 00 4742 | - | 00 4754 | : | 11 | 60 | 1730 |
| SECTION | 57 | 00 4755 | - | 00 4766 | : | 10 | 51 | 0005 |
| SECTION | 58 | 00 4767 | - | 00 4773 | : | 5 | 15 | 0002 |
| SECTION | 59 | 00 4774 | - | 00 5005 | : | 10 | 44 | 5004 |
| SECTION | 60 | 00 5006 | - | 00 5050 | : | 35 | 15 | 0002 |
| SECTION | 61 | 00 5051 | - | 00 5071 | : | 17 | 01 | 0012 |
| SECTION | 62 | 00 5072 | - | 00 5366 | : | 189 | 23 | 5400 |
| SECTION | 63 | 00 5367 | - | 00 5422 | : | 28 | 22 | 2521 |
| SECTION | 64 | 00 5423 | - | 00 5445 | : | 19 | 41 | 0032 |
| SECTION | 65 | 00 5446 | - | 00 5672 | : | 149 | 00 | 5336 |
| SECTION | 66 | 00 5673 | - | 00 5677 | : | 5 | 73 | 0001 |
| SECTION | 67 | 00 5700 | - | 00 5733 | : | 28 | 53 | 6467 |
| SECTION | 68 | 00 5734 | - | 00 6120 | : | 117 | 25 | 3432 |
| SECTION | 69 | 00 6121 | - | 00 6165 | : | 37 | 17 | 3131 |

18198 SCAMP SECTION 2 PAGE 2
DC-10 DIGITAL FLIGHT GUIDANCE AND CONTROL SYSTEM
-continued

| | | | | | | | | | |
|---|---|---|---|---|---|---|---|---|---|
| SECTION | 70 | 00 6166 | - | 00 6211 | : | 20 | 72 4714 |
| SECTION | 71 | 02 0000 | - | 02 1556 | : | 879 | 34 3471 |
| SECTION | 72 | 02 4000 | - | 02 4276 | : | 191 | 12 7670 |
| SECTION | 73 | 02 4277 | - | 02 4305 | : | 7 | 73 7126 |
| SECTION | 74 | 02 4306 | - | 02 4321 | : | 12 | 14 0205 |
| SECTION | 75 | 02 4322 | - | 02 4333 | : | 10 | 04 6104 |
| SECTION | 76 | 02 4334 | - | 02 4345 | : | 10 | 31 0772 |
| SECTION | 77 | 02 4346 | - | 02 4504 | : | 95 | 32 6337 |

18198 SCAMP SECTION 2 PAGE 3
DC-10 DIGITAL FLIGHT GUIDANCE AND CONTROL SYSTEM

| | | | | | | | |
|---|---|---|---|---|---|---|---|
| SECTION | 78 | 02 4505 | - | 02 4605 | : | 65 | 06 6325 |
| SECTION | 79 | 02 4606 | - | 02 4632 | : | 21 | 10 1653 |
| SECTION | 80 | 02 4633 | - | 02 4721 | : | 55 | 67 7241 |
| SECTION | 81 | 02 4722 | - | 02 4742 | : | 17 | 65 2007 |
| SECTION | 82 | 02 4743 | - | 02 5073 | : | 89 | 70 4756 |
| SECTION | 83 | 02 5074 | - | 02 5141 | : | 38 | 74 4737 |
| SECTION | 84 | 02 5142 | - | 02 5151 | : | 8 | 16 4324 |
| SECTION | 85 | 01 0000 | - | 01 0140 | : | 97 | 07 4454 |
| SECTION | 86 | 01 0141 | - | 01 0226 | : | 54 | 23 2062 |
| SECTION | 87 | 01 0227 | - | 01 0756 | : | 344 | 20 0224 |
| SECTION | 88 | 01 0757 | - | 01 1022 | : | 36 | 00 0000 |
| SECTION | 89 | 01 1023 | - | 01 1163 | : | 97 | 13 6084 |
| SECTION | 90 | 01 1164 | - | 01 1173 | : | 8 | 45 0003 |
| SECTION | 91 | 01 1174 | - | 01 1203 | : | 8 | 63 0003 |
| SECTION | 92 | 01 1204 | - | 01 1337 | : | 92 | 71 0160 |
| SECTION | 93 | 01 1340 | - | 01 1447 | : | 72 | 01 5646 |
| SECTION | 94 | 01 1450 | - | 01 1457 | : | 8 | 63 0002 |
| SECTION | 95 | 01 1460 | - | 01 1574 | : | 77 | 01 6030 |
| SECTION | 96 | 01 1575 | - | 01 1640 | : | 36 | 04 2323 |
| SECTION | 97 | 01 1641 | - | 01 1644 | : | 4 | 57 0001 |
| SECTION | 98 | 01 1645 | - | 01 1721 | : | 45 | 57 4342 |
| SECTION | 99 | 01 1722 | - | 01 1732 | : | 9 | 34 0003 |
| SECTION | 100 | 01 1733 | - | 01 2165 | : | 155 | 43 0657 |
| SECTION | 101 | 01 2166 | - | 01 2332 | : | 101 | 36 1014 |
| SECTION | 102 | 01 2333 | - | 01 2513 | : | 113 | 53 0425 |
| SECTION | 103 | 01 2514 | - | 01 2603 | : | 56 | 46 2175 |

1019B SCAMP SECTION 2 PAGE 4
DC-10 DIGITAL FLIGHT GUIDANCE AND CONTROL SYSTEM

| | | | | |
|---|---|---|---|---|
| SECTION | 104 | 01 2604 - 01 2630 : | 21 | 14 3440 |
| SECTION | 105 | 01 2631 - 01 2656 : | 22 | 64 0440 |
| SECTION | 106 | 01 2657 - 01 2761 : | 67 | 63 6642 |
| SECTION | 107 | 01 2762 - 01 3021 : | 32 | 43 3257 |
| SECTION | 108 | 01 3022 - 01 3064 : | 35 | 62 6123 |
| SECTION | 109 | 01 3065 - 01 3114 : | 24 | 47 1740 |
| SECTION | 110 | 01 3115 - 01 3144 : | 24 | 47 1741 |
| SECTION | 111 | 01 3145 - 01 3207 : | 35 | 07 2071 |
| SECTION | 112 | 01 3210 - 01 3257 : | 40 | 34 7460 |
| SECTION | 113 | 01 3260 - 01 3327 : | 40 | 34 7601 |
| SECTION | 114 | 01 3330 - 01 3377 : | 40 | 37 0516 |
| SECTION | 115 | 01 3400 - 01 3454 : | 45 | 31 6343 |
| SECTION | 116 | 01 3455 - 01 3465 : | 9 | 02 4323 |
| SECTION | 117 | 01 3466 - 01 3650 : | 115 | 36 2540 |
| SECTION | 118 | 01 3651 - 01 3674 : | 20 | 25 3136 |
| SECTION | 119 | 01 3675 - 01 3707 : | 11 | 10 0005 |
| SECTION | 120 | 01 3710 - 01 3765 : | 46 | 01 7733 |
| SECTION | 121 | 01 3766 - 01 4004 : | 15 | 37 3264 |
| SECTION | 122 | 01 4005 - 01 4021 : | 13 | 67 0004 |
| SECTION | 123 | 01 4022 - 01 4037 : | 14 | 72 0006 |
| SECTION | 124 | 01 4040 - 01 4073 : | 28 | 36 0014 |
| SECTION | 125 | 01 4074 - 01 4130 : | 29 | 32 0064 |
| SECTION | 126 | 01 4131 - 01 4133 : | 3 | 45 0001 |
| SECTION | 127 | 01 4134 - 01 4215 : | 50 | 76 2523 |
| SECTION | 128 | 01 4216 - 01 4223 : | 6 | 53 0007 |
| SECTION | 129 | 01 4224 - 01 4250 : | 21 | 63 0723 |

1019B SCAMP SECTION 2 PAGE 5
DC-10 DIGITAL FLIGHT GUIDANCE AND CONTROL SYSTEM

| | | | | |
|---|---|---|---|---|
| SECTION | 130 | 01 4251 - 01 4361 : | 73 | 77 4251 |
| SECTION | 131 | 01 4362 - 01 4460 : | 63 | 70 5377 |
| SECTION | 132 | 01 4461 - 01 4542 : | 50 | 42 0467 |
| SECTION | 133 | 01 4543 - 01 4622 : | 48 | 46 5770 |
| SECTION | 134 | 01 4623 - 01 4634 : | 10 | 53 0004 |
| SECTION | 135 | 01 4635 - 01 4672 : | 30 | 77 6237 |
| SECTION | 136 | 01 4673 - 01 4704 : | 10 | 27 0526 |
| SECTION | 137 | 01 4705 - 01 4743 : | 31 | 71 1121 |
| SECTION | 138 | 01 4744 - 01 4760 : | 13 | 45 1616 |

```
18158 SCAMP                                   SECTION      2        PAGE      5
DC-10 DIGITAL FLIGHT GUIDANCE  AND CONTROL SYSTEM
```

-continued

```
SECTION        139  01 4761 - 01 5006 :  22        03 6712
SECTION        140  01 5007 - 01 5032 :  20        60 0006
SECTION        141  01 5033 - 01 5035 :  3         45 0001
SECTION        142  01 5036 - 01 5053 :  14        76 0056
SECTION        143  01 5054 - 01 5073 :  16        72 6141
SECTION        144  01 5074 - 01 5275 :  130       32 4662
SECTION        145  01 5276 - 01 5352 :  45        27 1126
SECTION        146  01 5353 - 01 5372 :  16        03 1172
SECTION        147  01 5373 - 01 5636 :  164       76 1523
SECTION        148  01 5637 - 01 5746 :  72        01 3321
SECTION        149  01 5747 - 01 6021 :  43        15 6706
SECTION        150  01 6022 - 01 6423 :  258       74 7400
SECTION        151  01 6424 - 01 6511 :  54        06 5650
SECTION        152  01 6512 - 01 6602 :  57        32 3745
SECTION        153  01 6603 - 01 6667 :  53        50 4732
SECTION        154  01 6670 - 01 6716 :  23        16 3650
SECTION        155  01 6717 - 01 7120 :  130       01 0121

18158 SCAMP                                   SECTION      2        PAGE      6
DC-10 DIGITAL FLIGHT GUIDANCE  AND CONTROL SYSTEM

SECTION        156  04 0000 - 04 0055 :  46        05 3232
SECTION        157  04 0056 - 04 0073 :  14        54 1777
SECTION        158  04 0074 - 04 0155 :  50        45 7024
SECTION        159  04 3000 - 04 3014 :  13        00 0000
SECTION        160  04 4000 - 04 4361 :  242       46 4603

SOFTWARE DOCUMENTATION AND LISTING
544P-DCM-S-001


SKIP KEYS
   1      TO UTILITY
   2      AUTOMATIC MODE SEQUENCING
   3      AUTOMATIC FLAP DEPLOYMENT - ON=REDUCED FLAP APPROACH
   4      AUTOMATIC SEQUENCE - BASELINE OPTIMAL CRUISE

18158 SCAMP                                   SECTION      3        PAGE      7
DC-10 DIGITAL FLIGHT GUIDANCE  AND CONTROL SYSTEM

                        LIMMOD 030000
                 ****************************************************

                        OUTPUT BUFFER - D/A

03 0000   00 0000   DTOACT   0
03 0001   00 0000   DTOAC1   0
03 0002   00 0000   DTOAC2   0
03 0003   00 0000   DTOAC3   0
03 0004   00 0000   DTOAC4   0
```

```
18198 SCAMP                                            SECTION        3          PAGE        7
DC-10 DIGITAL FLIGHT GUIDANCE  AND CONTROL SYSTEM

                              LIMMOD 030000
                   *************************************************

                            OUTPUT BUFFER = D/A
```

-continued

```
03 0005   00 0000   DTDAC5   0
03 0006   00 0000   DTDAC6   0
03 0007   00 0000   DTDA07   0
03 0010   00 0000   DTDAC8   0
03 0011   00 0000   DTDA09   0
03 0012   00 0000   DTDA10   0
03 0013   00 0000   DTDA11   0


                    ****************************************


                    PLOTTER DATA ADDRESSES
03 0014   00 0000   PLTADR   RESERV 8


                    **************************************


                    D/D INPUT BUFFER

03 0024   00 0000   DTDINP   RESERV 32


                    *************************************


                    D/D INPUTS FOR SIMULATED SENSORS

03 0064   00 0000   VSELIN   0                    PILOT SELECT IAS*2**4 BITS/FT/SEC
03 0065   00 0000   STABPS   0                    STABILIZER POSITION (DEG)
03 0066   00 0000   N1ACTL   0                    N-1 FAN SPEED*2**10 BITS/PER CENT
03 0067   00 0000   VORBTI   0                    VOR BETA INPUT (DEG)
03 0070   00 0000   VORRGI   0                    VOR RANGE (2**8 BITS/N.M.)
03 0071   00 0000   HDGSDD   0                    HEADING SELECT ERROR
03 0072   00 0000   HDESRD   0                    DESIRED CRUISE ALTITUDE (1 BIT/FT)
03 0073   00 0000   DHDSRD   0                    DISTANCE FROM VOR TO DESIRED
                                                   ALTITUDE (2**8 BITS/N.M.)
                                                   POSITIVE = BETWEEN A/C AND VOR
                                                   NEGATIVE = OTHER SIDE OF THE VOR
03 0074   00 0000   VORENF   0                    1=VOR, 0=LOCAL
03 0075   00 0000   MACHDS   0                    DESIRED MACH
03 0076   00 0000   ANSWER   0                    0 = NO ANSWER
                                                   + = YES, VERIFY
                                                   - = NO, SKIP
03 0077   00 0000   MODE     0                    0 = NONE
                                                   +1 = PREFLIGHT

18198 SCAMP                                            SECTION        3          PAGE        8
DC-10 DIGITAL FLIGHT GUIDANCE  AND CONTROL SYSTEM

                                                  -1 = FAILURE MESSAGES
03 0100   00 0000   THRENG   0
03 0101   00 0000   VORHER   0                    VOR COURSE SELECT ERROR
03 0102   00 0000   VORFLG   0                    VOR TRANSITION FLAG
03 0103   00 0000   ALTGND   0                    RUNWAY ELEVATION
03 0104   00 0000            RESERV 16            SPARE INPUTS
```

```
                    ***************************************************

                      DUAL INPUTS

                    ******************************

                      CONTINUOUSLY MONITORED "GENERAL"

03 0124  00 0000  YAWRTA  0            0   YAW RATE A (DEG/SEC)
03 0125  00 0000  YAWRTB  0            1   YAW RATE B
03 0126  00 0000  PHIDTA  0            2   ROLL RATE A (DEG/SEC)
03 0127  00 0000  PHIDTB  0            3   ROLL RATE B
03 0130  00 0000  THTDTA  0            4   PITCH RATE A (DEG/SEC)
03 0131  00 0000  THTDTB  0            5   PITCH RATE B
03 0132  00 0000  THETAA  0            6   PITCH ANGLE A (1770 BITS/F.S.)
03 0133  00 0000  THETAB  0            7   PITCH ANGLE B
03 0134  00 0000  PHIA    0            8   BANK ANGLE A (1770 BITS/F.S.)
03 0135  00 0000  PHIB    0            9   BANK ANGLE B
03 0136  00 0000  ACCLXA  0            10  LONG. ACCEL. A
                                        (2**7 BITS/F.P.S.S.)
03 0137  00 0000  ACCLXB  0            11  LONG. ACCEL. B
03 0140  00 0000  ACCLYA  0            12  LAT. ACCEL. A
                                        (2**7 BITS/F.P.S.S.)
03 0141  00 0000  ACCLYB  0            13  LAT. ACCEL. B
03 0142  00 0000  ACCLZA  0            14  NORM. ACCEL. A
                                        (2**7 BITS/F.P.S.S.)
03 0143  00 0000  ACCLZB  0            15  NORM. ACCEL. B

                    ***********************

                      NOT CONTINUOUSLY MONITORED "SPECIAL"

03 0144  00 0000  BETLCA  0            16  LOC. DEV. A (DEG)
03 0145  00 0000  BETLCB  0            17  LOC. DEV. B
03 0146  00 0000  LAMGSA  0            18  G/S DEV. A (DEG)
03 0147  00 0000  LAMGSB  0            19  G/S DEV. B
03 0150  00 0000  HRADFA  0            20  RAD. ALT. A "FINE" (4 BITS/FT)
03 0151  00 0000  HRADFB  0            21  RAD. ALT. B "FINE"
03 0152  00 0000  HRADCA  0            22  RAD. ALT. A "COARSE" (1 BIT/FT)
03 0153  00 0000  HRADCB  0            23  RAD. ALT. B "COARSE"
03 0154  00 0000  CRSERL  0            24  COURSE SEL. ERROR LEFT
                                        (1770 BITS/F.S.)
03 0155  00 0000  CRSERR  0            25  COURSE SEL. ERROR RIGHT

                    ***********************

                      COMMAND RELATED INPUTS

03 0156  00 0000  RDSACA  0            26  RUD SERVO AMP A (DEG)
03 0157  00 0000  RDSACB  0            27  RUD SERVO AMP B
```

```
03 0160  00 0000  ALSACA  0            28  AIL. SERVO AMP. A (DEG)
03 0161  00 0000  ALSACB  0            29  AIL. SERVO AMP. B
03 0162  00 0000  ELSACA  0            30  ELV. SERVO AMP. A (DEG)
03 0163  00 0000  ELSACB  0            31  ELV. SERVO AMP. B
03 0164  00 0000  RDRAMA  0            32  RUD. RAM POS A (DEG)
03 0165  00 0000  RDRAMB  0            33  RUD. RAM POS B
03 0166  00 0000  ALRAMA  0            34  AIL. RAM. POS. A (DEG)
03 0167  00 0000  ALRAMB  0            35  AIL. RAM. POS. B
03 0170  00 0000  ELRAMA  0            36  ELV. RAM POS. A (DEG)
03 0171  00 0000  ELRAMB  0            37  ELV. RAM POS. B
03 0172  00 0000  RDMODA  0            38  RUD. MOD. PISTON POS. A (DEG)
03 0173  00 0000  RDMODB  0            39  RUD. MOD. PISTON POS. B
03 0174  00 0000  AILAVA  0            40  AVG. AIL. POS. A (DEG)
03 0175  00 0000  AILAVB  0            41  AVG. AIL. POS. B
03 0176  00 0000  ELVAVA  0            42  ELV. AVG. POS. A (DEG)
03 0177  00 0000  ELVAVB  0            43  ELV. AVG. POS. B

                    ************************
```

```
16196 SCAMP                         SECTION      3       PAGE      10
```

-continued

```
                        SINGLE SOURCE INPUTS

03 0200   00 0000   PSIHCL   0              44  CLUTCHED HEADING
                                                (1770 BITS/F.S.)
03 0201   00 0000   FLAPOS   0              45  FLAP POS. (1770 BITS/F.S.)
03 0202   00 0000   WHLCAP   0              46  CAPT. WHEEL (2**7 BITS/LB)
03 0203   00 0000   COLCAP   0              47  CAPT. COLUMN (2**7 BITS/LB)
03 0204   00 0000   WHL1ST   0              48  1 ST. OFC. WHEEL (2**7 BITS/LB)
03 0205   00 0000   COL1ST   0              49  1 ST. OFC. COLUMN (2**7 BITS/LB)

03 0206   00 0000   HDGSER   0              50  HDG. SEL. ERROR (1770 BITS/F.S.)

                     ***********************************************

                        AIRDATA INPUTS

03 0207   00 0000   ALTNCR   0              203  H, NOT COR (1 BIT/FT)
03 0210   00 0000   ALTBCR   0              204  H, BARO (1 BIT/FT)
03 0211   00 0000   MACHAD   0              205  MACH (2**14 BITS/MACH)
03 0212   00 0000   VCASAD   0              206  CAS (2**4 BITS/FT/SEC)
03 0213   00 0000   VMOAID   0              207  VMO (2**4 BITS/FT/SEC)
03 0214   00 0000   VTASAD   0              210  TAS (2**4 BITS/FT/SEC)
03 0215   00 0000   TOTEMP   0              211  TOT (2**8 BITS/DEG C)
03 0216   00 0000   ALTRTE   0              212  HDOT (2**7 BITS/FT/SEC)
03 0217   00 0000   STATMP   0              213  SAT (2**8 BITS/DEG C)

16196 SCAMP                         SECTION      3       PAGE      11

                     *************************************
                     *************************************

                      A CHANNEL VARIABLES & VOTED SENSORS

                     *************************************

                      OUTPUTS - COMMAND

03 0220   00 0000   RUDC1A   0
03 0221   00 0000   ELVC1A   0
03 0222   00 0000   AILC1A   0
03 0223   00 0000   RFDC1A   0
03 0224   00 0000   PFDC1A   0
03 0225   00 0000   YFDC1A   0

                     *************************************

                      OUTPUTS - DISCRETE

03 0226   00 0000   DISA01   0
03 0227   00 0000   DISA02   0
03 0230   00 0000   DISA03   0
03 0231   00 0000   DISA04   0
03 0232   00 0000   DISA05   0
03 0233   00 0000   DISA06   0
03 0234   00 0000   DISA07   0
03 0235   00 0000   DISA08   0
03 0236   00 0000   DISA09   0
03 0237   00 0000   DISA10   0
03 0240   00 0000   DISA11   0
03 0241   00 0000   DISA12   0

                     **************************************

                     VOTED SENSORS

03 0242   00 0000   YAWR1A   0              0  728.18 BITS/DEG/SEC
03 0243   00 0000   PHID1A   0              1  728.18 BITS/DEG/SEC
```

```
 18196 SCAMP                              SECTION       3        PAGE      11
                                          -continued

                    VOTED SENSORS

03 0244   00 0000   THTD1A   0            2  728.18 BITS/DEG/SEC
03 0245   00 0000   THET1A   0            3  728.18 BITS/DEG
03 0246   00 0000   PHI1A    0            4  728.18 BITS/DEG
03 0247   00 0000   ACCX1A   0            5  128(2**7) BITS/FT./SEC**2
03 0250   00 0000   ACCY1A   0            6  128(2**7) BITS/FT./SEC**2
03 0251   00 0000   ACCZ1A   0            7  128(2**7) BITS/FT./SEC**2
03 0252   00 0000   BETA1A   0            8  728.18 BITS/DEG
03 0253   00 0000   LAMD1A   0            9  728.18 BITS/DEG
03 0254   00 0000   HRDF1A   0            10 4 BITS/FT
03 0255   00 0000   HRDC1A   0            11 1 BIT/FT
03 0256   00 0000   CRSL1A   0            12 728.18 BITS/DEG

 18196 SCAMP                              SECTION       3        PAGE      12


                    ****************************************

                     COMPUTER STATE INFORMATION

03 0257   00 0000   MSPENG   0            0 MANUAL
03 0260   00 0000   AUTENG   0            1 COMMAND
03 0261   00 0000   FLTDIR   0            2 FLIGHT DIRECTOR
03 0262   00 0000   RLANDA   0            3
03 0263   00 0000   ROLENG   0            4
03 0264   00 0000   PLANDA   0            5
03 0265   00 0000   PITENG   0            6
03 0266   00 0000   ROLFLG   0            7
03 0267   00 0000   PITFLG   0            8
03 0270   00 0000   RLAPS1   0            9
03 0271   00 0000   PTAPS1   0            10
03 0272   00 0000   THRPS1   0            11
03 0273   00 0000   RCPFLG   0            12
03 0274   00 0000   PCPFLG   0            13
03 0275   00 0000   LNDFLG   0            14
03 0276   00 0000   CMDNOT   0            15
03 0277   00 0000   STATE0   0            16
03 0300   00 0000   STATE1   0            17
03 0301   00 0000   STATE2   0            18
03 0302   00 0000   STATE3   0            19
03 0303   00 0000   STATE4   0            20
03 0304   00 0000   MONVLD   0            21
03 0305   00 0000   YDENGF   0            22
03 0306   00 0000   YDNOT    0            23
03 0307   00 0000   CWSNCT   0            24
03 0310   00 0000   DUALFG   0            25
03 0311   00 0000   MKIT1A   0
03 0312   00 0000   MKIT2A   0


                    ****************************************


                    ENG1A    EQUALS MSPENG
                    AUTO1A   EQUALS AUTENG
                    FDIR1A   EQUALS FLTDIR
                    ROLA1A   EQUALS RLANDA
                    ROLE1A   EQUALS ROLENG
                    PITA1A   EQUALS PLANDA
                    PITE1A   EQUALS PITENG
                    RSYNFA   EQUALS ROLFLG
                    PSYNFA   EQUALS PITFLG
                    RAPS1A   EQUALS RLAPS1
                    PAPS1A   EQUALS PTAPS1
                    RCPFGA   EQUALS RCPFLG
                    PCPFGA   EQUALS PCPFLG
                    LNDFGA   EQUALS LNDFLG
                    CMDNTA   EQUALS CMDNOT
```

```
 1815B SCAMP                                   SECTION      3      PAGE     13

                         ****************************************

 03 0313   00 0000   SPDBRK   0
 03 0314   00 0000   ENGOCD   0
 03 0315   00 0000   LNDTIM   0
 03 0316   00 0000   TDFLAG   0

                         ****************************************

                          TOGGLE FLAG

 03 0317   00 0000   TOGF1A   0

                         ****************************************************

                          EULER ANGLE TRANSFORMATION (TO LOCAL AXIS SYSTEM)

                           MATRIX

 03 0320   00 0000   DMTX11   0
 03 0321   00 0000   DMTX12   0
 03 0322   00 0000   DMTX13   0
 03 0323   00 0000   DMTX21   0
 03 0324   00 0000   DMTX22   0
 03 0325   00 0000   DMTX23   0
 03 0326   00 0000   DMTX31   0
 03 0327   00 0000   DMTX32   0
 03 0330   00 0000   DMTX33   0

 03 0331   00 0000   PHIIC    0              INTEGRAL COMMAND(DEG)
 03 0332   00 0000   PHIC     0              ROLL COMMAND(DEG)
 03 0333   00 0000   PHIP     0              ROLL PREDICT(DEG)
 03 0334   00 0000   PHICOM   0              TOTAL COMMAND(DEG)
 03 0335   00 0000   RWHLCD   0              ROLL CWS CMD(DEG)
 03 0336   00 0000   DELAIL   0              DELTA AILERON(DEG)

                         ************************

                           PITCH COMMANDS

 03 0337   00 0000   THETIC   0              INTEGRAL COMMAND(DEG)
 03 0340   00 0000   THETAC   0              PITCH COMMAND(DEG)
 03 0341   00 0000   THETAP   0              PITCH PREDICT(DEG)
 03 0342   00 0000   THTCOM   0              TOTAL PITCH COMMAND(DEG)
 03 0343   00 0000   PWHLCD   0              PITCH CWS CMD(DEG/4)
 03 0344   00 0000   FPAIFG   0              FLIGHT PATH ANGLE INTEGRAL FLAG

                         ************************

 1815B SCAMP                                   SECTION      3      PAGE     14

                           YAW COMMANDS

 03 0345   00 0000   DELRUD   0              DELTA RUDDER(DEG)
                         ****************************************

                            ROLL CONTROL WHEEL STEERING

                           VARIABLES AND FLAGS

 03 0346   00 0000   WOW      0
 03 0347   00 0000   RCWS     0              L8*2^7
 03 0350   00 0000   WOW4     0
 03 0351   00 0000   RTOCWS   0
 03 0352   00 0000   COUNTR   0
 03 0353   00 0000   RCWSFG   0              ROLL CWS FLAG
 03 0354   00 0000   FLAGCR   0

                         ******************************************
```

```
                    PITCH C.W.S. VARIABLES AND FLAGS

03 0355  00 0000  PCWS     0          LB*2^7
03 0356  00 0000  PTOCWS   0
03 0357  00 0000  PCWSFG   0          PITCH CWS FLAG
                  **************************************

                    SPEED HOLD VARIABLES

03 0360  00 0000  MACHRF   0          MACH REFERENCE *2^14
03 0361  00 0000  VCASRF   0          VCAS REFERENCE *2^4
03 0362  00 0000  KVSPIT   0          POSITION GAIN VCAS
03 0363  00 0000  KVMPIT   0          POSITION GAIN MACH
03 0364  00 0000  KVSPDP   0          POSITION GAIN TEMPORARY
03 0365  00 0000  SERRCF   0          SPEED ERROR C.F. *2^4
03 0366  00 0000  VDCFLG   0          VDOT C.F. LAG
03 0367  00 0000  SPTCNT   0          SPEED CAPTURE DELAY COUNTER

                  **************************************

                    ALTITUDE HOLD AND PRE-SELECT VARIABLES

03 0370  00 0000  ALTREF   0          ALTITUDE HOLD REF.
03 0371  00 0000  ALTERC   0          VARO CORRECTED ALT SELECT ERROR

                  **************************************

                    FLARE VARIABLES AND FLAGS

03 0372  00 0000  FLINTT   0
03 0373  00 0000  PITDWN   0
```

```
03 0374  00 0000  HDZERO   0
03 0375  00 0000  FLRIGN   0
                  **************************************

                    G0-AROUND TAKEOFF

03 0376  00 0000  GAGFLG   0
03 0377  00 1000  TOGARI   512

                  **************************************

                    HEADING HOLD VARIABLES AND FLAGS

03 0400  00 0000  PHCOLD   0
03 0401  00 0000  HDGHDF   0
03 0402  00 0000  RTOGAF   0

                  ******************************************

                    LOCALIZER VARIABLES AND FLAGS

03 0403  00 0000  LOCTIM   0          LOCALIZER TIMER
03 0404  00 0000  YLOC     0          LOC ERROR *2**4
03 0405  00 0000  YDTLOC   0          LOCALIZER RATE (1/128 FT/SEC/BIT)
03 0406  00 0000  YDDLOC   0          LOCALIZER ACCELERATION
03 0407  00 0000  LOCVAL   0          LOC VALID FLAG

                  **************************************

                    VOR VARIABLES AND FLAGS

03 0410  00 0000  YVOR     0          VOR ERROR *2**1
03 0411  00 0000  YDTVOR   0          VOR RATE (2**7 BITS/FT/SEC)
```

```
 18198 SCAMP                                     SECTION        3           PAGE        15
```

-continued

```
                         VOR VARIABLES AND FLAGS

03 0412  00 0000  YODVOR  0              VOR ACCEL (2**7 BITS/FT/SEC**2)
03 0413  00 0000  VORRNG  0              DME RANGE (2***4 BITS/FT)
03 0414  00 0000  VORBET  0              VOR ANGULAR ERROR (DEG)
03 0415  00 0000  VORTIM  0              VOR TIMER
03 0416  00 0000  VORINF  0              VOR INITIALIZATION FLAG

                  *****************************************

                         ALIGN VARIABLES AND FLAGS

03 0417  00 0000  DELPSI  0              DEG
03 0420  00 0000  DELRSS  0              DEG
03 0421  00 0000  DCRFLG  0

                  ******************************************

 18198 SCAMP                                     SECTION        3           PAGE        16

                         ALTITUDE/ ALTITUDE RATE
                         COMPLEMENTARY FILTERS VARIABLES

03 0422  00 0000  HRADRW  0
03 0423  00 0000  HDDTRD  0
03 0424  00 0000  HDDOT   0              1/128 FT/SEC**2/BIT
03 0425  20 0000  ALTRNG  0              2***4 BITS/FT DIST TO DESIRED ALT
03 0426  00 0000  HDTOLD  0
03 0427  00 0000  RALTFG  0
03 0430  00 0000  HRDRW1  0
03 0431  00 0000  HDTHLD  0
03 0432  00 0000  HDCONT  0
03 0433  30 0000  ALTCOR  0              BARO CORRECTED FILTERED ALT.

                  ******************************************

                         TRUE AIRSPEED COMPLEMENTARY
                         FILTER VARIABLES AND FLAGS

03 0434  00 0000  VDTLNG  0              1/128 FT/SEC**2/BIT
03 0435  00 0000  VDTTCF  0              2**7 BITS/FT/SEC**2
03 0436  02 0000  LATACC  0              1/128 FT/SEC**2/BIT
03 0437  03 0000  VTASHD  0              2**7 BITS/FT/SEC**2

                  ******************************************

                         LIFT COMPENSATION VARIABLES AND CONSTANTS

03 0440  02 0000  ELVCCM  0              DEG/4
03 0441  00 0000  AILCOM  0              DEG
03 0442  00 0000  ALFAZ   0              ALPHA ZERO (DEG)
03 0443  30 0000  GNDYPR  0              LIMITED DYNAMIC PRESSURE (*2A7)
03 0444  00 0000  THTCFD  0              FLIGHT DIRECT THETA COMMAND (DEG)
03 0445  00 0000  PHICFD  0              F/D ROLL COMMAND (DEG)
03 0446  00 0000  VAPTCG  0              TOGA AIR SPEED, AND APPROACH (*2A4)
                  ************************************************

                          LOCALIZER RANGE

                         COMPUTATIONS: CONSTANTS

                         AND VARIABLES

03 0447  00 0000  YDTLM1  0
03 0450  00 0000  YDDTLM  0
03 0451  00 0000  RNGRAW  0

                  **************************************************
```

```
1815B SCAMP                              SECTION        3        PAGE      17

                         GLIDE SLOPE DEVIATION

                         COMPLEMENTARY FILTER

                         VARIABLE AND CONSTANTS

03 0452   00 0000   HEDTGS   0                   HDOT ERROR *2**7
03 0453   00 0000   HERATL   0                   HERROR RATE LIMIT/ITERATION*2**7
03 0454   00 0000   HDGSRF   0                   HDOT REF *2**7
03 0455   00 0000   HERRGS   0                   HERROR *2**7

                   ************************

                         MISCELANEOUS VARIABLES

03 0456   00 0000   ALIN1    0
03 0457   00 0000   ACCELZ   0
03 0460   00 0000   GAMMA    0                   FLIGHT PATH ANGLE (DEG)
03 0461   00 0000   ALPHA    0                   ANGLE OF ATTACK (DEG)
03 0462   00 0000   DYNPRS   0                   DYNAMIC PRESSURE *2**7 LB/FT**2
03 0463   00 0000   DEGPMX   0                   THETA LIMIT (DEG)
03 0464   00 0000   THTDMX   0                   THETA DOT LIMIT (DEG/SEC)
03 0465   00 0000   THTDLM   0                   THETA DOT LIMIT (DEG/CYCLE)
03 0466   00 0000   PHIMAX   0                   ROLL LIMIT (DEG)
03 0467   00 0000   PHIDMX   0                   ROLL RATE LIMIT (DEG/SEC)
03 0470   00 0000   PHIDLM   0                   ROLL RATE LIMIT (DEG/CYCLE)
03 0471   00 0000   THETAL   0
03 0472   00 0000   COSPHC   0                   COS(PHI COMMAND)
03 0473   00 0000   SINPHC   0                   SIN(PHI COMMAND)
03 0474   00 0000   COSTHT   0                   COS (THETA)
03 0475   00 0000   SINTHT   0                   SIN (THETA)
03 0476   00 0000   COSPHI   0                   COS (PHI)
03 0477   00 0000   SINPHI   0                   SIN (PHI)
03 0500   00 0000   COSPSI   0                   COS (PSI)
03 0501   00 0000   SINPSI   0                   SIN (PSI)
03 0502   27 7022   NZMAX    97810
03 0503   00 0024            20

1815B SCAMP                              SECTION        3        PAGE      18

                   ********************

                   THROTTLE VARIABLES

                               OUTPUTS

03 0504   00 0000   THRCMD   0                   THROTTLE RATE COMMAND (DEG/SEC)
03 0505   00 0000   THTFGS   0                   THETA FGS PITCH COMMAND (DEG)

                               INTERNAL

03 0506   00 0000   VSELEC   0                   PILOT SELECT IAS*2**4 BITS/FT/SEC
                                                 EQUALS VSELIN WHEN AUTO-THROTTLE
                                                 IS OFF, NOT UPDATED AFTER AUTO-
                                                 THROTTLE IS ENGAGED
03 0507   00 0000   VTCDCT   0                   2**7 BITS/FT/SEC**2
03 0510   00 0000   FLAPPW   0                   FLAPS/50 DEG * 2**17
03 0511   00 0000   DLOVRW   0                   DELTA L/W * 2**16
03 0512   00 0000   TOVRW    0                   T/W *2**16
03 0513   00 0000   CLREF    0                   *2**15
03 0514   00 0000   THTMPL   0                   MIN PITCH LIMIT (DEG)
03 0515   00 0000   CL       0                   COEFFICIENT OF LIFT *2**15
03 0516   00 0000   VASERR   0                   A/S ERROR
03 0517   00 0000   AZALPH   0                   ACCEL(Z) * ALPHA/ 57.3 DEG
03 0520   00 0000   THRMCD   0                    0=OFF
                                                  1=RETARD
                                                  2=ALPHA
                                                  3=SPEED
                                                  4=N1 LIMIT
                                                  5=MACH
```

```
1R15B SCAMP                              SECTION        3          PAGE       18
```

-continued

```
                              INTERNAL

03 0521   00 0000   APTOGA   0                0=NOT ANY
                                               1=T/O MODE
                                               2=APPROACH MODE
                                               3=G/A MODE
03 0522   00 0000   LIFTOF   0                 1=AFTER LIFTOFF
03 0523   00 0000   SPDFLG   0                MACH OR VCAS MODE FLAG
03 0524   00 0000   N1TIMR   0

                    ************************************


1R15B SCAMP                              SECTION        3          PAGE       19

                         Z-TRANSFORM VARIABLES


                              INPUTS (T-1) FOR Z(S/S+A)

03 0525   00 0000   ZTFIPA   0
03 0526   00 0000   ZTFIP1   0
03 0527   00 0000   ZTFIP2   0
03 0530   00 0000   ZTFIP3   0
03 0531   00 0000   ZTFIP4   0
03 0532   00 0000   ZTFIP5   0
03 0533   00 0000   ZTFIP6   0
03 0534   00 0000   ZTFIP7   0
03 0535   00 0000   ZTFIP8   0
03 0536   00 0000   ZTFIP9   0
03 0537   00 0000   ZTFI10   0
03 0540   00 0000   ZTFI11   0
03 0541   00 0000   ZTFI12   0
03 0542   00 0000   ZTFI13   0
03 0543   00 0000   ZTFI14   0
03 0544   00 0000            RESERV 5

                              OUTPUTS FOR Z(S/S+A)

03 0551   00 0000   ZTWORA   0                0. G.S. COMP. FILTER
03 0552   00 0000   ZTWO1    0                1. GRD ROLL
03 0553   00 0000   ZTWO2    0                2. YAW SAS
03 0554   00 0000   ZTWO3    0                3. SPEED
03 0555   00 0000   ZTWO4    0                4. PITCH F.D.
03 0556   00 0000   ZTWO5    0                5. LIFT COMP
03 0557   00 0000   ZTWO6    0                6. HDDOT FOR G/A
03 0560   00 0000   ZTWO7    0                7. BETA LOC. RATE
03 0561   00 0000   ZTWO8    0                8. GROUND ROLL PSI
03 0562   00 0000   ZTWO9    0                9. YAW RATE REV
03 0563   00 0000   ZTWO10   0                10. VCAS
03 0564   00 0000   ZTWO11   0                11. SPARE
03 0565   00 0000   ZTWO12   0                12. THROTTLE CONTROLLER
03 0566   00 0000   ZTWO13   0                13. THROTTLE PITCH
03 0567   00 0000   VCASDT   0                14. THROTTLE VCAS RATE
03 0570   00 0300            RESERV 5

                              OUTPUTS FOR Z(A/S+A)

03 0575   00 0000   ZTFORA   0                0. LIFT COMP
03 0576   00 0000   LOCOVF   0                1. LOCALIZER
03 0577   00 0000   ZTFO2    0                2. RADIO ALT FILTER
03 0600   00 0000   ZTFO3    0                3. ROLL F.D.
03 0601   00 0000   HGSECF   0                4. GLIDESLOPE
03 0602   00 0000   ZTFO5    0                5. PITCH F.D.

1R15B SCAMP                              SECTION        3          PAGE       20


03 0603   00 0000   KYLOC    0                6. LOCALIZER GAIN
03 0604   00 0000   ZTFO7    0                7. ROLL CWS
03 0605   00 0000   ZTFO8    0                8. PITCH CWS
```

```
1815B SCAMP                                  SECTION        3        PAGE      20
-continued

03 0606  00 0000  ZTF09    0             9. HDDOT
03 0607  00 0000  ZTF010   0            10. FLARE F.F.
03 0610  00 0000  ZTF011   0            11. FLARE
03 0611  00 0000  ZTF012   0            12. FLARE F.F.
03 0612  00 0000  ZTF013   0            13. RADIO H-DOT
03 0613  00 0000  HRADIO   0            14. RADIO ALT (4 BITS/FT)
03 0614  00 0000  ZTF015   0            15. R-CWS
03 0615  00 0000  ZTF016   0            16. P-CWS
03 0616  00 0000  ZTF017   0            17. HDG SELECT
03 0617  00 0000  ZTF018   0            18. YAW SAS
03 0620  00 0000  ZTF019   0            19. A-Y/YAW SAS
03 0621  00 0000  ZTF020   0            20. HDDT
03 0622  00 0000  ZTF021   0            21. FLARE
03 0623  00 0000  ZTF022   0            22. THETA DOT LIMIT
03 0624  00 0000  ZTF023   0            23. YSAS C.F.
03 0625  00 0000  RNGEST   0            24. LOC RANGE (2**-1)
03 0626  00 0000  KYDVOR   0            25. VOR GAIN
03 0627  00 0000  ZTF026   0            26. VDTTCF LAG CAS
03 0630  00 0000  ZTF027   0            27. VDTTCF LAG MACH
03 0631  00 0000          RESERV 3

                          REMAINDER(T-1) : INTEGRATOR

03 0634  00 0000  ZTRNRA  RESERV 40

                          OUTPUTS : INTEGRATOR

03 0704  00 0000  INTO0A   0             0. PITCH MODES
03 0705  00 0000  INTOT1   0             1. ROLL MODES
03 0706  00 0000  INTOT2   0             2. YAW RATE REVERSION
03 0707  00 0000  THETP1   0             3. PITCH THETA PREDICT
03 0710  00 0000  PHIP1    0             4. ROLL PHI PREDICT
03 0711  00 0000  HDOTF    0             5. ALT C.F. 2**-7 FT/SEC/BIT
03 0712  00 0000  ALTITO   0             6. ALT C.F. 1 BIT/FT
03 0713  00 0000  INTOT7   0             7. ALT C.F.
03 0714  00 0000  VTASCF   0             8. T.A.S. C.F. 2**4 BITS/FT/SEC
03 0715  00 0000  INTOT9   0             9. T.A.S. C.F.
03 0716  00 0000  HDTRAD   0            10. RAD. ALT RATE 2**7 BITS/FT
03 0717  00 0000  HDOTF1   0            11. ALT C.F. FOR G/A
03 0720  00 0000  INTO12   0            12. RAD. ALT C.F.
03 0721  00 0000  INTO13   0            13. FEED FORWARD LIFT/UDOT
03 0722  00 0000  VGRDRL   0            14. GROUND ROLL VTAS
03 0723  00 0000  YLOCFL   0            15. FILTERED LOC. DEV.
03 0724  00 0000  INTO16   0            16. FLARE WASHOUT
03 0725  00 0000  VTASCT   0            17. THROTTLE TAS CF*2**4
03 0726  00 0000  INTO18   0            18. THROTTLE TAS CF
03 0727  00 0000  INTO19   0            19. VOR C.F.
03 0730  00 0000  YVORFL   0            20. VOR C.F.
03 0731  00 0000  PSIPRO   0            21. DECRAB

1815B SCAMP                                  SECTION        3        PAGE      21

03 0732  00 0000  INTO22   0            22. ROLL SAS
03 0733  00 0000  INTO23   0            23. DECRAB
03 0734  00 0000  INTO24   0            24. LOC C.F.
03 0735  00 0000  VCOMND   0            25. THROTTLE CMD SPD *2**4
03 0736  00 0000  RTRDRM   0            26. RETARD RAMP(DEG)
03 0737  00 0000  INTO27   0            27. VOR C.F.
03 0740  00 0000  RNGGRL   0            28. GROUND ROLL RANGE
03 0741  00 0000  INTO29   0            29. VCAS W/O THROTTLE
03 0742  00 0000  INTO30   0            30. VERR-VTCDOT W/O THRT
03 0743  00 0000  INTO31   0            31. THETA W/O THROTTLE
03 0744  00 0000  INTO32   0            32. TOGA
03 0745  00 0000  WEIGHT   0            33. LAGGED WEIGHT 2**-2 BITS/LB
03 0746  00 0000  INTO34   0            34. MACH ON PITCH C.F.
03 0747  00 0000  INTO35   0            35. A/S ON PITCH C.F.
03 0750  00 0000  VERRCF   0            36. A/S ON PITCH C.F.
03 0751  00 0000  MERRCF   0            37. MACH ON PITCH C.F.
03 0752  00 0000          RESERV 2

                 ************************
```

```
1819H SCAMP                        SECTION      3        PAGE      21
                                   -continued

                   CONSTANTS FOR Z(S/S+A)

                   E**(-AT)
03 0754  37 6315  KWOEAA  0.99375*2**17    0 A=0.125 G/S C.F.
03 0755  37 7271          0.997503B17      1 A=0.05, GRND ROLL
03 0756  37 7445          0.99833*2**17    2 A=0.0333 YAW SAS C.F.
03 0757  37 6315          0.99375*2**17    3 A=0.125 SPEED
03 0760  37 7270  KWOEA4  0.9975*2**17     4 A=0.05, PIT. F.D.
03 0761  37 7445          0.99833*2**17    5 A=0.0333, LIFT COMP
03 0762  37 7270          0.9975*2**17     6 A=0.05, HDOOT FOR G/A
03 0763  36 3410          0.95123*2**17    7 A=1 BETA LOC. RATE
03 0764  37 7271          0.997503B17      8 A=0.05 PSI GROUND ROLL
03 0765  37 7445          0.99833*2**17    9 A=0.0333 YAW RATE REV
03 0766  36 3410          0.95123*2**17    10 VCAS
03 0767  00 0000          0                11 SPARE
03 0770  33 0546          0.84648B17       12  A=3.33  THROTTLE
03 0771  34 1727  KWOE13  0.88250B17       13  A=2.5  THROTTLE PITCH
03 0772  37 1534          0.97531B17       14  A=0.5  THROTTLE CAS FILT.
03 0773  00 0000          RESERV 5

1819H SCAMP                        SECTION      3        PAGE      22

                   CONSTANTS FOR Z(A/S+A)

                   -E**(-AT)

03 1000  40 6314  KFGEAA  -0.975*2**17     0 A=0.5 LIFT COMP
03 1001  45 6316          -0.81873*2**17   1 A=4, LOCALIZER
03 1002  42 5032          -0.91776*2**17   2 A=1.5, RADIO ALT. FILT.
03 1003  44 3520          -0.86071*2**17   3 A=3, ROLL F.D.
03 1004  41 4367          -0.95123*2**17   4 A=1, GLIDE SLOPE
03 1005  44 3520          -0.86071*2**17   5 A=3, PIT F.D.
03 1006  40 3145          -0.9875*2**17    6 A=.25 LOCALIZER GAIN
03 1007  45 6316  KFGEA7  -0.81873*2**17   7 A=VAR., ROLL CWS
03 1010  45 6316  KFGEA8  -0.81873*2**17   8 A=VAR., PIT. CWS
03 1011  41 4367          -0.95123*2**17   9 A=1, H DOUBLE DOT
03 1012  40 6314          -0.975*2**17     10 A=0.5, FLARE F.F.
03 1013  00 0000          0                11 A=INF., FLARE
03 1014  40 1462          -0.99375*2**17   12 A=0.125, FLARE F.F.
03 1015  54 4564          -0.60653*2**17   13 A=10, R.H-DOT
03 1016  45 6316          -0.81873*2**17   14 A=4, RADIO ALT.
03 1017  45 6316          -0.81873*2**17   15 A=4 R-CWS
03 1020  45 6316          -0.81873*2**17   16 A=4 P-CWS
03 1021  41 4367          -0.95123*2**17   17 A=1 HDG. SEL.
03 1022  54 4564          -0.60653*2**17   18 A=10, YAW SAS
03 1023  54 4564          -0.60653*2**17   19 A=10, A-YY YAW SAS
03 1024  41 4367          -0.95123*2**17   20 HDOT
03 1025  00 0000          0                21 A=INF., FLARE
03 1026  45 6316          -0.81873*2**17   22 A=4 THETA DOT LIMIT
03 1027  40 0332          -0.99833*2**17   23 A=.0333 YAW SAS C.F.
03 1030  40 1216          -0.995*2**17     24 A=.1 LOC RANGE
03 1031  40 3145          -0.9875*2**17    25 A=0.25 VOR GAIN
03 1032  40 4166          -0.98347*2**17   26 A=.333
03 1033  40 4166          -0.98347*2**17   27 A=.333
03 1034  00 0000          RESERV 3

                   ***********************************************

03 1037  00 0024  FREQSA  20               0 PITCH MODES
03 1040  00 0024          20               1 ROLL MODES
03 1041  00 0024          20               2 YAW RATE REVERSION
03 1042  00 0024          20               3 PIT. THETA PRED.
03 1043  00 0024          20               4 ROLL PHI PRED.
03 1044  00 0024          20               5 ALT. C.F.
03 1045  00 5000          20.0*2**7        6 ALT C.F.
03 1046  00 5000          20.0*2**7        7 ALT C.F.
03 1047  00 0240          20.0*2**3        8 T.A.S. C.F.
03 1050  00 0024          20               9 T.A.S. C.F.
03 1051  00 0024          20               10 RAD. ALT. C.F.
03 1052  00 0240          20.0*2**3        11 ALT C.F. FOR G.A.
03 1053  00 0024          20               12 RAD. ALT. C.F.
03 1054  00 0240          20.0*2**3        13 F.F. LIFT
```

```
1R198 SCAMP                                   SECTION        3          PAGE        23

03 1055   00 0240            20.0*2**3          14 GROUND ROLL VTAS
03 1056   00 0240            20.0*2**3          15 FILT LOC DEV
03 1057   00 0310            200                16 FLARE WASH OUT
03 1060   00 0240            20.0*2**3          17 THROTTLE TAS CF
03 1061   00 0024            20                 18 THROTTLE TAS CF
03 1062   00 0024            20                 19 VOR C.F.
03 1063   00 2400            20.0*2**6          20 VOR C.F.
03 1064   00 0024            20                 21 DECRAB
03 1065   00 0024            20                 22 ROLL SAS
03 1066   00 0024            20                 23 DECRAB
03 1067   00 0024            20                 24 LOC. C.F.
03 1070   00 0024            20                 25 THROTTLE COMND SPD
03 1071   00 0024            20                 26 THROTTLE RETARD RAMP
03 1072   10 3400            34560              27 VOR C.F. (G=64/10592)
03 1073   00 1200            20.0*2**5          28 GRDRL RANGE+K-PROGRAM=1/2
03 1074   00 0144            100                29 VCAS W/O THROTTLE
03 1075   00 0242            162                30 VERR-VTCDOT W/O THRT
03 1076   00 0120            80                 31 THETA W/O THROTTLE
03 1077   00 0144            100                32 TOGA
03 1100   00 1200            640                33 WEIGHT LAG T=32SEC.
03 1101   00 1750            1000               34. MACH ON PITCH C.F.
03 1102   00 1750            1000               35. A/S ON PITCH C.F.
03 1103   00 0240            160                36. A/S ON PITCH C.F.
03 1104   00 0240            160                37. MACH ON PITCH C.F.
03 1105   00 0000            RESERV 2

1R198 SCAMP                                   SECTION        3          PAGE        24

                    ***************************************
                    ***************************************

                    B CHANNEL VARIABLES & Z-XFRM CONSTANTS

                    ***************************************

                    OUTPUTS - COMMAND

03 1107   00 0000   RUDC1B   0
03 1110   00 0000   ELVC1B   0
03 1111   00 0000   AILC1B   0
03 1112   00 0000   RFDC1B   0
03 1113   00 0000   PFDC1B   0
03 1114   00 0000   YFDC1B   0

                    ***************************************

                    OUTPUTS - DISCRETE

03 1115   00 0000   DISB01   0
03 1116   00 0000   DISB02   0
03 1117   00 0000   DISB03   0
03 1120   00 0000   DISB04   0
03 1121   00 0000   DISB05   0
03 1122   00 0000   DISB06   0
03 1123   00 0000   DISB07   0
03 1124   00 0000   DISB08   0
03 1125   00 0000   DISB09   0
03 1126   00 0000   DISB10   0
03 1127   00 0000   DISB11   0
03 1130   00 0000   DISB12   0

                    ***************************************

                    VOTED SENSORS

03 1131   00 0000   YAWR1B   RESERV 13

                    ***************************************
```

```
 1H196 SCAMP                               SECTION      3       PAGE      24
                                          -continued

                         COMPUTER STATE INFORMATION

23 1146  00 0020  ENG1B   RESERV 26
23 1200  00 0000  MKIT1B  0
23 1201  00 0000  MKIT2B  0

                         VARIABLES & FLAGS

03 1202  00 0000          RESERV 138

 1H196 SCAMP                               SECTION      3       PAGE      25

                        **************************************
                        Z-TRANSFORM VARIABLES
                                 INPUTS (T-1) FOR Z(S/S+A)
23 1414  00 0000  ZTFIPB  RESERV 20
                                 OUTPUTS FOR Z(S/S+A)
03 1440  00 0000  ZTWO0B  RESERV 20
                                 OUTPUTS FOR Z(A/S+A)
03 1464  00 0000  ZTFO0B  RESERV 31
                                 REMAINDER (T-1) : INTEGRATOR
03 1523  00 0000  ZTRNRB  RESERV 40
                                 OUTPUTS : INTEGRATOR
03 1573  00 0000  INTO0B  RESERV 40

                         Z-TRANSFORM CONSTANTS
                                 WASHOUTS
03 1643  00 0000  KWOEAB  RESERV 20
                                 LAGS
03 1667  00 0000  KFGEAB  RESERV 31
                                 INTEGRATORS
03 1726  00 0000  FREQSB  RESERV 40

 1H196 SCAMP                               SECTION      3       PAGE      26

                        ******************************
                         TEMPORARIES
23 1776  00 0000  TEMP1   0
03 1777  00 0000  TEMP1A  0
03 2000  00 0000  TEMP2   0
03 2001  00 0000  TEMP2A  0
03 2002  00 0000  TEMP3   0
03 2003  00 0000  TEMP3A  0
03 2004  00 0000  TMPFIL  0
03 2005  00 0000          0

                        **************************************
```

ARITHMETIC TEMPORARIES

```
03 2006   00 0000   TPA0     0

03 2007   00 0000   TPA1     0
03 2010   00 0000            0
03 2011   00 0000   TPA2     0
03 2012   00 0000            0
03 2013   00 0000   TPA3     0
03 2014   00 0000   TPA3A    0
                    ********************
```

THRUST RATING VARIABLES

INPUTS

```
03 2015   00 0002   NACPKS   2              NUMBER OF AIR COND PACKS ON
03 2016   00 0003   NBLSRC   3              NUMBER OF BLEED SOURCES ON
03 2017   00 0000   ISOV2    0              ISOL VALVE 1-2 FLAG (OPEN = 0)
03 2020   00 0000   ISOV3    0              ISOL VALVE 1-3 FLAG (OPEN = 0)
03 2021   00 0000   ACPCK2   0              A/C PACK 2 FLAG (ON = 0)
03 2022   00 0001   ACPCK3   1              A/C PACK 3 FLAG (ON = 0)
03 2023   00 0001   EAIFL    1              ENGINE ANTI-ICE FLAG (ON = 0)
03 2024   00 0000   WAIFL    0              WING ANTI-ICE FLAG (OFF = 0)
03 2025   00 0000   THRTLM   0              THROTTLE MODE
                                              0 = TAKE-OFF
                                             20 = MAXIMUM CLIMB
                                             40 = MAXIMUM CRUISE
                                             60 = MAXIMUM CONTINUOUS
                                             80 = GO-AROUND
```

OUTPUT

```
03 2026   00 0000   N1LIMT   0              *2**10
                    ******************************************
```

AUTO-SEQUENCING VARIABLES

```
03 2027   00 0000   AUTMOD   0              AUTOMATIC SEQUENCE MODE
                                             0=NONE
                                             1=TAKE OFF
                                             2=CLIMB OUT
                                             3=CRUISE
                                             4=ENROUTE CLIMB
                                             5=ENROUTE DESCENT
                                             6=APPROACH
03 2030   00 0000   AUTPS1   0              AUTO MODE PASS 1 FLAG
03 2031   00 0000   MACHCM   0              THROTTLE MACH COMMAND
03 2032   00 0000   GAMCMD   0              GAMMA COMMAND
03 2033   00 0000   ALTCMD   0              ALTITUDE COMMAND
03 2034   01 5137   VCASCL   421.9584       CLIMB AIRSPEED = 250 KNTS
03 2035   01 2431   VFLPDP   337.5684       FLAP DEPLOYMENT V=200 KNTS
03 2036   00 5671   HSPDCR   3001           FEET - ALTITUDE TO DECREASE SPEED
03 2037   00 7305   VAPPRC   236.2984       APPROACH SPEED = 140 KNOTS
03 2040   00 0000   ALTFLG   0
03 2041   00 0000   APRFLG   0
03 2042   00 0000   DELTAV   0              TAKE-OFF ADDITION TO V2
03 2043   00 0000   MOPHAS   0              MODE PHASE
03 2044   00 0000   HOTCKF   0              CHECK ALT RATE FLAG
03 2045   00 0000   PROFIL   0              0=BASE LINE
                                            1=OPTIMAL NUMBER 1
03 2046   00 0000   HDTCNT   0              HDOT RATE CHECK COUNTER
03 2047   00 0000   MINTRM   0              MACHCM INTEGRAL REMAINDER
03 2050   00 0000   VORFSV   0              VOR TRANSITION FLAG SAVE
```

```
18196 SCAMP                                   SECTION        3        PAGE      28

                        ******************************

                         DELAYED FLAP DEPLOYMENT VARIABLES

03 2051  00 0000  F50FLG  0                   FINAL FLAPS FLAG
03 2052  00 0000  DVPXFA  0                   PRESENT DV/DX KTS/FT B24
03 2053  00 0000  FGAMAP  0                   PREDICTED F(GAMMA) B=1
03 2054  00 0000  FLCMIX  0                   FLAP COMMAND INDEX
03 2055  00 0000  PLMFLG  0                   PLACARD LIMIT FLAG, 0=EXCEEDED
03 2056  00 0000  DVH50F  0                   DV/DH FOR FLAPS = 50 B18
03 2057  00 0000  DVH40F  0                   KTS/FT FOR FLAPS = 40
03 2060  00 0000  DVH30F  0                   FOR FLAPS = 30
03 2061  00 0000  DVH20F  0                   FOR FLAPS = 20
03 2062  00 0000  DVH10F  0                   FOR FLAPS = 10
03 2063  00 0000  DALT50  0                   DELTA ALT. FOR FLAPS = 50
03 2064  00 0000  DALT40  0                   FOR FLAPS = 40
03 2065  00 0000  DALT30  0                   FOR FLAPS = 30
03 2066  00 0000  DALT20  0                   FOR FLAPS = 20
03 2067  00 0000  DALT10  0                   FOR FLAPS = 10
03 2070  00 0000  ALTF50  0                   ALTITUDE AGL FOR FLAPS = 50
03 2071  00 0000  ALTF40  0                   FOR FLAPS = 40
03 2072  00 0000  ALTF30  0                   FOR FLAPS = 30
03 2073  00 0000  ALTF20  0                   FOR FLAPS = 20
03 2074  00 0000  ALTF10  0                   FOR FLAPS = 10
03 2075  00 0000  FLPOSP  0                   FLAP POSITION FOR NEXT DEPLOYMENT
03 2076  00 0000  FLPCNT  0                   COMPUTATION DELAY COUNTER


18196 SCAMP                                   SECTION        3        PAGE      29


                        ************************************************

                          AIR DATA FLAG/COUNTERS


03 2077  00 0000  ADFGCN  RESERV 9
                  ************************

                         VARIABLES FOR AIR DATA REASONABLENESS CHECKS

                         PREVIOUS GOOD AIR DATA INPUT, ALSO
                         PREVIOUS INPUT TO RATE TAKER,

03 2110  00 0000  ARGOCD  RESERV 6

                         PREVIOUS RATE TAKER OUTPUT, SCALED 2.5
                         TIMES ORIGINAL SCALING,

03 2116  00 0000  AIRSV1  RESERV 6

                         PREVIOUS OUTPUT OF INDEPENDENT RATE FILTER

03 2124  00 0000  AIRSV2  RESERV 6

                         COUNTERS FOR CYCLES SINCE TOLERANCE LAST ACCEPTABLE

03 2132  00 0000  ADRSCN  RESERV 6

                  ************************************************

                         PREVIOUS DISCRETE: HOLD

03 2140  00 0000  DISCT0  0
03 2141  00 0000  DISCT1  0
03 2142  00 0000  DISCT2  0
03 2143  00 0000  DISCT3  0
03 2144  00 0000  DISCT4  0
03 2145  00 0000  DSCTOG  0
                  ************************************************
```

```
                    HALF SECOND OLD INPUTS

03 2146  00 0000  DISCH0  0
03 2147  00 0000  DISCH1  0
03 2150  00 0000  DISCH2  0
03 2151  00 0000  DISCH3  0
03 2152  00 0000  DISCH4  0
                  ******************************************

                    HALF SECOND COUNTER
```

```
03 2153  00 0012  COUNH0  10
03 2154  00 0012  COUNH1  10
03 2155  00 0012  COUNH2  10
03 2156  00 0012  COUNH3  10
03 2157  00 0012  COUNH4  10
03 2160  00 0012  CHSCNT  10
```

```
                  ************************************************

                    Z(A/S+A) OUTPUT

                    USED FOR INPUT

                    MONITORING

03 2161  00 0000  LAGOUT  0
03 2162  00 0000  LAGOU1  RESERV 20
03 2206  00 0000  LAGOU2  RESERV 21

                  ************************************************

                    Z(1/S)

                    USED FOR INPUT

                    MONITORING

                  ************************************************

                    Z(1/S) OUTPUTS (ABOVE INPUTS)

03 2233  00 0000  INTOUT  RESERV 8
03 2243  00 0000  INTOU8  RESERV 4
03 2247  00 0000  INTU12  RESERV 4
03 2253  00 0000  INTOU2  RESERV 5

                  ************************************************

                    REMAINDERS

03 2260  00 0000  REMINT  RESERV 21

                  ************************************************

                    COUNTERS - DETECTION

03 2305  00 0000  TOGCNT  0

                  ************************************************

                    END AROUND FLAGS

03 2306  00 0000  EATHRF  RESERV 12
```

```
18198 SCAMP                          SECTION      3        PAGE      32

                   ***************************************************

                      INTEGRATOR OUTPUTS
                     FOR SERVO EQUALIZATION
                     AND SYNCHRONIZATION

Ø3 2322   ØØ ØØØØ  RDSM1A  Ø          Ø
Ø3 2323   ØØ ØØØØ  RDSM1B  Ø          1
Ø3 2324   ØØ ØØØØ  ALSM1A  Ø          2
Ø3 2325   ØØ ØØØØ  ALSM1B  Ø          3
Ø3 2326   ØØ ØØØØ  ELSM1A  Ø          4
Ø3 2327   ØØ ØØØØ  ELSM1B  Ø          5
Ø3 233Ø   ØØ ØØØØ  RDEQ1A  Ø          6
Ø3 2331   ØØ ØØØØ  RDEQ1B  Ø          7
Ø3 2332   ØØ ØØØØ  ALEQ1A  Ø          8
Ø3 2333   ØØ ØØØØ  ALEQ1B  Ø          9
Ø3 2334   ØØ ØØØØ  ELEQ1A  Ø          1Ø
Ø3 2335   ØØ ØØØØ  ELEQ1B  Ø          11
                   *************************************************

                     REMAINDERS

Ø3 2336   ØØ ØØØØ  REMSER  RESERV 12
                   ***************************************************

                     SERVC SYNC VARIABLES

Ø3 2352   ØØ ØØØØ  MEMRDA  Ø
Ø3 2353   ØØ ØØØØ  MEMRDB  Ø
Ø3 2354   ØØ ØØØØ  MEMALA  Ø
Ø3 2355   ØØ ØØØØ  MEMALB  Ø
Ø3 2356   ØØ ØØØØ  MEMELA  Ø
Ø3 2357   ØØ ØØØØ  MEMELB  Ø
Ø3 236Ø   ØØ ØØØØ  SYNTIM  Ø
Ø3 2361   ØØ ØØØØ  SLNDTM  Ø
Ø3 2362   ØØ ØØØØ  LAGTMP  Ø
Ø3 2363   ØØ ØØØØ  SERMDØ  Ø
Ø3 2364   ØØ ØØØØ  SERMD1  Ø
Ø3 2365   ØØ ØØØØ  SERMD2  Ø
Ø3 2366   ØØ ØØØØ  SERMD3  Ø
Ø3 2367   ØØ ØØØØ  SERMD4  Ø
Ø3 237Ø   ØØ ØØØØ  RUDDRA  Ø
Ø3 2371   ØØ ØØØØ  RUDDRB  Ø
Ø3 2372   ØØ ØØØØ  AILRNA  Ø
Ø3 2373   ØØ ØØØØ  AILRNB  Ø
Ø3 2374   ØØ ØØØØ  ELEVTA  Ø
Ø3 2375   ØØ ØØØØ  ELEVTB  Ø
Ø3 2376   ØØ ØØØØ  RDMDC1  Ø
Ø3 2377   ØØ ØØØØ  RDMDC2  Ø
Ø3 24ØØ   ØØ ØØØØ  ALMDC1  Ø
Ø3 24Ø1   ØØ ØØØØ  ALMDC2  Ø
Ø3 24Ø2   ØØ ØØØØ  ELMDC1  Ø


18198 SCAMP                          SECTION      3        PAGE      33

Ø3 24Ø3   ØØ ØØØØ  ELMDC2  Ø


18198 SCAMP                          SECTION      3        PAGE      34

                   *************************************************

                     FAILURE MESSAGE STORAGE
Ø3 24Ø4   ØØ ØØØØ  FIRSTP  Ø
Ø3 24Ø5   ØØ ØØØØ  FAUPNM  Ø
Ø3 24Ø6   ØØ ØØØØ  FAILNM  Ø
Ø3 24Ø7   ØØ ØØØØ  FAILSV  RESERV 5Ø
                   *************************************************
```

```
18196 SCAMP                          SECTION        3        PAGE      35

                   VARIABLES

03 2471   00 0000   LATCHY   0
03 2472   00 0000   TEMPB3   0
03 2473   00 0000   TEMPB4   0
03 2474   00 0000   INFLG    0
03 2475   00 0000   EAFLAG   0
03 2476   00 0000   LOCBAD   0
03 2477   00 0000   GSBAD    0
03 2500   00 0000   POWFLG   0
                    *****************************

                   SERIAL INPUT CONDITIONING

                   VARIABLES

03 2501   00 0000   SEAFLG   0
03 2502   00 0000   SEAPNT   0
03 2503   00 0000   SEACNT   0
03 2504   00 0000   SEAFCT   0
03 2505   00 0000   TRYCNT   0
03 2506   00 0000   DISOKF   0
03 2507   00 0000   WORDNO   0
03 2510   00 0000   IDXTMP   0
                    ********************************

                    BANK 0 EXECUTIVE FLAGS AND VARIABLES

03 2511   00 0000   MAKEIT   0
03 2512   00 0000   OFFPAS   0
03 2513   00 0000   SUMTIM   0
03 2514   00 0000   NOTICK   0
03 2515   00 0000   CKSUMF   0
03 2516   00 0000   INFLAG   0
03 2517   00 0000   VARIDX   0              INCREMENT FOR A OR B COMPUTATIONS
03 2520   00 0000   DUOFFS   0
03 2521   00 0000   DUOFF1   0

18196 SCAMP                          SECTION        3        PAGE      36

                    ****************************************************

                      PREFLIGHT BANK 3 VARIABLES

03 2522   00 0000   CLOCK    0
03 2523   00 0000   TEMPFT   0
03 2524   00 0000   TMPPF1   0
03 2525   00 0000   TMPPF2   0
03 2526   00 0000   DIAGNO   0
03 2527   00 0000   PFTFLG   0
03 2530   00 0000   PFSTRT   0              =1 WHEN PRE-FLIGHT STARTED
03 2531   00 0000   PFHLDB   0
03 2532   00 0000   PFTOGF   0
03 2533   00 0000   OPTPFT   0
03 2534   00 0000   MSGSAV   0

18196 SCAMP                          SECTION        3        PAGE      37

                    ****************************************

                    MAINTENANCE ASSESSMENT PANEL VARIABLES

03 2535   00 0000   MSGTIM   0
03 2536   00 0000   ANSCK?   0
03 2537   00 0000   TEMPDC   0
03 2540   00 0000   PLTMSG   0
03 2541   00 0000   NPINDS   0              NUMBER OF POWER INT. DISPLAYED

                    *****************************************
```

```
18198 SCAMP                                 SECTION        3         PAGE        37
```
-continued

```
                        MODE ANNUNCIATOR STORAGE

03 2542   00 0000   THRMSG   0
03 2543   00 0000   ARMMSG   0
03 2544   00 0000   VRTMSG   0
03 2545   00 0000   LATMSG   0
03 2546   00 0000   MODMSG   0
03 2547   00 0000   RBLINK   0
03 2550   00 0000   PBLINK   0
03 2551   00 0000   INDXMS   0
03 2552   00 0000   MESFLG   0
03 2553   00 0000   PBLKTI   0
03 2554   00 0000   RBLKTI   0
03 2555   00 0000   FMAFLG   0

                    ****************************************

                    PLOTTER OUTPUTS TO SIMULATION

03 2556   00 0000   PLOTER   RESERV 8

                    **************************************

                     THRUST RATING OUTPUT TO SIMULATION

03 2566   00 0000   TSTDAT   0


                    **************************************

                     THROTTLE OUTPUTS TO SIMULATION

03 2567   00 0000   THRCOM   0                THROTTLE RATE COMMAND
03 2570   00 0000   FLAPCM   0                FLAPS COMMAND
03 2571   00 0000            RESERV 5         SPARES
```

```
18198 SCAMP                                 SECTION        3         PAGE        38
```

```
                    ****************************************************

                      DC-10 FLIGHT DEMO
                     SERIAL OUTPUT DATA


03 2576   75 0000   FMABUF   0750000           024.
03 2577   00 0000   FMABF1   0
03 2600   75 2000            0752000           025.
03 2601   00 0000            0
03 2602   75 4000            0754000           026.
03 2603   00 0000            0
03 2604   75 6000            0756000           027.
03 2605   00 0000            0
03 2606   76 0000            0760000           030.
03 2607   00 0000            0
03 2610   76 2000            0762000           031.
03 2611   00 0000            0
03 2612   76 4000            0764000           032.
03 2613   00 0000            0
03 2614   76 6000            0766000           033.
03 2615   00 0000            0
03 2616   77 0000            0770000           034.
03 2617   00 0000            0
03 2620   77 2000            0772000           035.
03 2621   00 0000            0
03 2622   77 4000            0774000           036.
03 2623   00 0000            0
03 2624   77 6000            0776000           037.
03 2625   00 0000            0
03 2626   61 0000   LATFLD   0610000           04.
03 2627   00 0000            0
```

```
18198 SCAMP                                   SECTION     3        PAGE      38
                                              -continued

03 2630   61 2000              0612000          05.
03 2631   00 0000              0
03 2632   61 4000              0614000          06.
03 2633   00 0000              0
03 2634   61 6000              0616000          07.
03 2635   00 0000              0
03 2636   62 0000              0620000          010.
03 2637   00 0000              0
03 2640   32 2000              0322000          011.
03 2641   00 0000              0
03 2642   32 4000              0324000          012.
03 2643   00 0000              0
03 2644   32 6000              0326000          013.
03 2645   00 0000              0
03 2646   63 0000   VRTFLD     0630000          014.
03 2647   00 0000              0
03 2650   63 2000              0632000          015.
03 2651   00 0000              0
03 2652   63 4000              0634000          016.
03 2653   00 0000              0


18198 SCAMP                                   SECTION     3        PAGE      39

03 2654   63 6000              0636000          017.
03 2655   00 0000              0
                    *******************************

                     CAB OUTPUTS TEMPORARY BUFFER

03 2656   00 0000   CABBUF    RESERV 156


18198 SCAMP                                   SECTION     3        PAGE      40

                    **************************************

                     MAINTENANCE ASSESMENT PANEL

                     OUTPUT BUFFER

03 3112   00 0000   MSGC00   0
03 3113   00 0000   MSGC01   0
03 3114   00 0000   MSGC02   0
03 3115   00 0000   MSGC03   0
03 3116   00 0000   MSGC04   0
03 3117   00 0000   MSGC05   0
03 3120   00 0000   MSGC06   0
03 3121   00 0000   MSGC07   0
03 3122   00 0000   MSGC08   0
03 3123   00 0000   MSGC09   0
03 3124   00 0000   MSGC10   0
03 3125   00 0000   MSGC11   0
03 3126   00 0000   MSGC12   0
03 3127   00 0000   MSGC13   0
03 3130   00 0000   MSGC14   0
03 3131   00 0000   MSGC15   0
03 3132   00 0000   MSGC16   0
03 3133   00 0000   MSGC17   0
03 3134   00 0000   MSGC18   0
03 3135   00 0000   MSGC19   0
03 3136   00 0000   MSGC20   0
03 3137   00 0000   MSGC21   0
03 3140   00 0000   MSGC22   0
03 3141   00 0000   MSGC23   0
03 3142   00 0000   MSGC24   0
03 3143   00 0000   MSGC25   0
03 3144   00 0000   MSGC26   0
03 3145   00 0000   MSGC27   0
```

```
18198 SCAMP                              SECTION    3      PAGE    40
                                         -continued

03 3146  00 0000  MSGC28  0
03 3147  00 0000  MSGC29  0
03 3150  00 0000  MSGC30  0
03 3151  00 0000  MSGC31  0
                  ******************************

                  PUSH-DOWN STACK

03 3152  20 0000  STACK   RESERV 30


18198 SCAMP                              SECTION    3      PAGE    41


18198 SCAMP                              SECTION    4      PAGE    42

                         LIMREF 034000
                  **************************************

                         REFER
                  ACCLXA
                  ACCLXB
                  ACCLYA
                  ACCLYB
                  ACCLZA
                  ACCLZB
                  AILAVA
                  AILAVB
                  ALRAMA
                  ALRAMB
                  ALSADA
                  ALSADB
                  ALTBCR
                  ALTNCR
                  ALTRTE
                  ATODM1
                  ATODIN
                  ATODI1
                  ATODI2
                  ATODI3
                  ATODI4
                  ATODI5
                  ATODI6
                  ATODI7
                  ATODI8
                  ATODI9
                  ATOD10
                  ATOD11
                  ATOD12
                  ATOD13
                  ATOD14
                  ATOD15
                  ATOD16
                  ATOD17
                  ATOD18
                  ATOD19
                  ATOD20
                  ATOD21
                  ATOD22
                  ATOD23
                  ATOD24
                  ATOD25
                  ATOD26
                  ATOD27
                  ATOD28
                  ATOD29
                  ATOD30
                  ATOD31
```

ATOD32
ATOD33
ATOD34
ATOD35
ATOD36
ATOD37
ATOD38
ATOD39
ATOD40
ATOD41
ATOD42
ATOD43
ATOD44
ATOD45
ATOD46
ATOD47
ATOD48
ATOD49
ATOD50
ATOD51
ATOD52
ATOD53
ATOD54
ATOD55
ATOD56
ATOD57
ATOD58
ATOD59
ATOD60
ATOD61
ATOD62
ATOD63
ATOD64
ATOD65
ATOD66
ATOD67
ATOD68
ATOD69
ATOD70
ATOD71
ATOD72
ATOD73
ATOD74
ATOD75
ATOD76
ATOD77
BETLCA
BETLCB
COLCAP
COL1ST
CRSERL
CRSERR

ELRAMA
ELRAMB
ELSADA
ELSADB
ELVAVA
ELVAVB
FLAPDS
FLAP1
FLAP2
HDDOT
HDGSER
HRADCA
HRADCB
HRADFA
HRADFB
K11

```
18198 SCAMP                                   SECTION     4        PAGE     44
                                              -continued

                        K12
                        K21
                        K22
                        LAMGSA
                        LAMGSB
                        MACHAD
                        PHIA
                        PHIB
                        PHIDTA
                        PHIDTB
                        PSIHCL
                        RDMODA
                        RDMODB
                        RDRAMA
                        RDRAMB
                        RDSADA
                        RDSADB
                        SCLTB0
                        SCLTB1
                        SCLTB2
                        SCLTB3
                        SCLTB4
                        SERBUF
                        THETAA
                        THETAB
                        THTDTA
                        THTDTB
                        VCASAD
                        VDTLNG
                        VTASAD
                        WHLCAP
                        WHL1ST
                        YAWRTA
                        YAWRTB

18198 SCAMP                                   SECTION     4        PAGE     45


                        *************************

                          ROLL GAINS C.A.S.

03 4000   30 0000   KRDUAL  1.5*2**16
03 4001   04 0000   KPHI1A  1.0*2**14          K PHI *2**14
03 4002   04 0000   KPHD1A  1.0*2**14          KPHI RATE *2**14
03 4003   06 3146   KAILI   0.1*2**18

                        *************************


                          PITCH GAINS C.A.S.

03 4004   53 5543   KTD21A  -1.268*2**16
03 4005   24 0000   KTHT1A  2.5*2**15          K THETA *2**15
03 4006   24 0000   KTHD1A  2.5*2**15          KTHETA RATE *2**15
03 4007   01 7000   MINDYN  60.0*2**7
03 4010   04 5400   MAXDYN  150.0*2**7
03 4011   03 6000   QZERO   120.0*2**7

                        *************************


                          YAW GAINS S.A.S.

03 4012   70 2715   KYAY    -244.39*2**7       0.33562 DEG/FT/SEC^2
03 4013   57 7777   KR1A    -4.0*2**14         K R *2**14
03 4014   11 0000   KYAWGR  2.25*2**14
03 4015   01 2631   KYFF    345.56*2**4

                        *************************
```

```
18198 SCAMP                              SECTION        4        PAGE      45
```

-continued

```
                          ROLL FLIGHT DIRECTOR GAINS

03 4016  00 1360  KPHIFD  0.00287*2**18   K PHI F.D. *2**18

                         ************************

                          PITCH FLIGHT DIRECTOR GAINS

03 4017  00 2511  KTHTFD  0.00516*2**18   K THETA F.D. *2**18

                         ************************************

                         ROLL CONTROL WHEEL STEERING
                         CONSTANTS

03 4020  04 0000  KRTKOF  1.0*2**14
03 4021  00 0315  RDEADZ  1.6*2**7
03 4022  00 3632  RCWSHO  15.2*2**7
03 4023  00 2063  RDETNT  8.4*2**7        ROLL DETENT
03 4024  14 0000  KRCW1A  1.5*2**15       ROLL CWS GAIN IN DEG/SEC/LB


18198 SCAMP                              SECTION        4        PAGE      46

03 4025  02 4366  KRFF1A  0.04*2**18      K R F.F. *2**18
03 4026  45 6316  KDNR1A  -0.81873*2**17
03 4027  42 0404  KUPR1A  -0.93551*2**17


18198 SCAMP                              SECTION        4        PAGE      47


                         *****************************************

                          PITCH CONTROL WHEEL STEERING

                         CONSTANTS


03 4030  14 1047  KPTKOF  1.5168*2**15
03 4031  00 0522  PDEADZ  1.64*2**7
03 4032  01 0456  PCWSHO  34.36*2**7
03 4033  00 5000  PDETNT  20.0*2**7       PITCH DETENT
03 4034  14 6315  KPCW1A  0.20*2**18      PITCH CWS GAIN IN GS/LB
03 4035  76 2376  KCWSPC  -0.02837*2**18
03 4036  04 0000  KPFF1A  0.5*2**15       K P F.F. *2**15
03 4037  45 6316  KDNP1A  -0.81873*2**17
03 4040  43 6314  KUPP1A  -0.975*2**17
                  ***********************************************

                          TOGA CONSTANTS

03 4041  20 0000  KVDOTC  2.0*2**15       TOGA A/S RATE DISP. RATIO
03 4042  13 2056  KGAGAM  1.4079*2**15    G/A GAMMA GAIN
03 4043  20 5075  KTOGA   16.64*2**12     TOGA A/S GAIN
03 4044  31 4632  KTOGA1  0.4*2**18       TOGA A/S INT/DISP RATIO
03 4045  35 1341  KCPGAG  14.59*2**13

                  *****************************************

                          ALTITUDE HOLD AND PRE-SELECT CONSTANTS

03 4046  04 0000  KGAMH   1.0*2**14
03 4047  22 1463  KALT1A  72.8*2**10      K ALT. HLD. 0 * (2*10) * 728.17
03 4050  33 1463  KALTHI  0.05*2**18      K ALT. INT. *2**18
03 4051  00 0011  KALTPR  9               (57.3/20)**2*HDDMAX/2
03 4052  00 0045  KALTP2  37              (57.3/20)**2*HDDMAX*2
03 4053  00 1473  HDDTCG  6.457787        (57.3/20)*HDDMAX

                  ************************************
```

16196 SCAMP SECTION 4 PAGE 47
-continued

FLIGHT PATH ANGLE HOLD CONSTANTS

```
03 4054  20 0000  KGMERR  1.0B16
03 4055  06 3146  KGAMI   0.1B18          INTEGRAL GAIN
**************************************
```

SPEED HOLD CONSTANTS

```
03 4056  01 1741  KVSPTK  0.3106*2**14     POSITION GAIN-TRACK
03 4057  00 0775  KVSPCP  0.03106*2**14    POSITION GAIN-CAP
03 4060  02 3702  KVDSPT  0.6212*2**14     RATE GAIN
03 4061  03 1463  KVISPT  0.05*2**18       INTEGRAL GAIN
```

16196 SCAMP SECTION 4 PAGE 48

```
03 4062  06 3146  KVERCF  0.1*2**18        C.F. 1/TAU
```

16196 SCAMP SECTION 4 PAGE 49

```
******************************
```

GLIDE SLOPE CAPTURE/TRACK

VARIABLES AND CONSTANTS

```
03 4063  77 4121  GAMGSN  -1966            NOMINAL GLIDE SLOPE
03 4064  14 6315  KGGS1A  0.8*2**16
03 4065  02 6432  KTGS1A  0.17618*2**16
03 4066  03 1463  KTHTGI  0.05*2**18       K=0.0388
03 4067  72 5017  KHDDGS  -0.3357*2**16
**************************************************
```

FLARE COMPUTATION CONSTANTS

```
03 4070  73 7377  HFLRF1  -130.0*2**7
03 4071  00 1010  HFLREF  130.0*2**2
03 4072  17 1060  KFLRH   0.23651*2**18
03 4073  25 3702  KFLRIN  0.3357*2**18
03 4074  14 6567  KFLRWO  0.20065*2**18
03 4075  13 7550  KHDERR  0.74768*2**16
03 4076  00 0000  KHDCMD  0
03 4077  66 6603  KHDDFL  -0.57220*2**16
03 4100  00 0000  KTDFLR  0
03 4101  06 3146  KINTPD  0.1*2**18
******************************
```

HEADING HOLD & HEADING SELECT & ROLL TOGA

CONSTANTS

```
03 4102  13 4122  KROLRT  0.18*2**18
03 4103  14 6315  KPSI0   0.8*2**16        K PSI0 *2**16
******************************
```

LOCALIZER CAPTURE/TRACK CONSTANTS

```
03 4104  25 2524  KYILCC  0.33333*2**18
03 4105  10 3453  KYLC1A  0.0165*2**21
```

```
23 4106  20 7126  KYLT1A  0.033*2**21
03 4107  37 5341  KYDL1A  0.495*2**18
03 4110  26 6027  KSCALE  728.18*2**7
03 4111  01 3133  TANGSN  0.04366*2**17

                  *************************************

                  VOR COMPLEMENTARY FILTER AND
                  CAPTURE/TRACK CONSTANTS
```

```
03 4112  20 0000  K1VORF  .0625B20
03 4113  05 2324  K2VORF  0.001302B24     C.F.
03 4114  10 2464  KYVOR   0.00813B22      POSITION GAIN
03 4115  17 6561  KYVORC  0.2475B18       RATE GAIN-CAPTURE
03 4116  07 6340  KYVORT  0.12195B18      RATE GAIN-TRACK
03 4117  12 5254  KYIVOR  0.16667B18

                  ****************************************************

                     ALIGN CONSTANTS

03 4120  14 6315  FRCDDU  0.2*2**18
03 4121  21 0510  KALR1A  4.27*2**14
03 4122  10 5075  KDRP1A  2.16*2**14
03 4123  52 7447  KPHPDR  -0.6579*2**17
03 4124  74 6570  KDAP1A  -0.78947*2**14
03 4125  06 3146  KAPS1A  0.1*2**18

                  ****************************************************

                    GROUND ROLL CONSTANTS
                    AND VARIABLE

03 4126  00 0210  XLOCSN  136             FT. FROM TAIL TO NOSE WHEEL
03 4127  06 3122  INVKDG  102.32188       57.3/DISP. GAIN (0.56)
03 4130  24 3556  INVKRG  327.42988       (57.3)*TAUWO/RATE GAIN (3.5)

                  ****************************************************

                    ALTITUDE/ALTITUDE RATE

                    COMPLEMENTARY FILTERS

                    CONSTANTS

03 4131  00 0620  HDTLIM  12.5*2**5
03 4132  12 5251  K2HDRD  0.08333*2**19
03 4133  02 3003  KHCF3   0.00029*2**25
03 4134  00 1551  KHCF4   0.00333*2**18
03 4135  06 3146  KHCF2   0.1*2**18
03 4136  06 3146  KHCF1   0.1*2**18

                  ****************************************************

                    TRUE AIRSPEED COMPLEMENTARY

                    FILTER CONSTANTS

03 4137  06 3146  KVCF1   0.1*2**18
```

```
03 4140  00 1217  KVCF2   0.0025*2**18
03 4141  00 0634  VCFLIM  3.22*2**7

                  ****************************************************
```

```
1R196 SCAMP                                  SECTION        4         PAGE       51
                                             -continued

                               AIR DENSITY TABLE

                               FOR DYNAMIC PRESSURE

                               COMPUTATION

                               VALUE = 100 * RHO * 2**18

03 4142   17 1550   RHOTBL   0.2377*2**18
03 4143   15 0657   RHOTB1   0.2048*2**18
03 4144   13 1720            0.1756*2**18
03 4145   11 4461            0.1496*2**18
03 4146   10 3676            0.1267*2**18
03 4147   05 5451            0.1066*2**18
03 4150   05 5465            0.08907*2**18
03 4151   04 5622            0.07380*2**18
03 4152   03 6034            0.05870*2**18
03 4153   02 7517            0.04520*2**18
03 4154   02 2506            0.03640*2**18
                    ***************************************

                             THETA LIFT COMPENSATION CONSTANTS

03 4155   22 2370   WGTNOM   75000              *2**-2

                    ******************************

03 4156   62 6415   KTKOFF   -0.206*2**18
03 4157   67 2273            -0.136*2**18


03 4160   77 7004   INCPT1   -1.4DEG            -1.4*728.17
03 4161   77 4010            -2.8DEG            -3.8*728.17

                    ************************

                               MISCELLANEOUS CONSTANTS

03 4162   00 3024   FREQ     20                 1/0.050 SEC.
03 4163   24 4005   G573     115.320DEG         32.2*57.3*728.17/16
03 4164   00 6200   VT200    3200               200 FT./SEC. *16
03 4165   01 0032   ONEG     32.2*2**7          32.2 *128 FT./SEC**2
03 4166   12 1375   SCD573   57.3DEG
03 4167   04 2700   SPDSND   1116.0*2**4
03 4170   70 2435   ABSTMP   0702435            DBL PRECISION ABSOLUTE
03 4171   01 0422            010422             TEMPERATURE (273.18 DEG) *2*22

1R196 SCAMP                                  SECTION        4         PAGE       52

03 4172   00 0416   TENKTS   16.878184          FT/SEC
03 4173   00 2277   V45KTS   75.951584          FT/SEC
03 4174   00 6722   KNT131   221.1B4            FT/SEC
03 4175   01 3671   V168KT   283.55B4
03 4176   01 1012   V171KT   288.62B4
03 4177   01 5137   V250KT   421.95258B4        FT/SEC
03 4200   01 5555   V260KT   438.83B4
03 4201   01 7227   V290KT   489.464984         FT/SEC
03 4202   02 1736   V340KT   573.855484         FT/SEC
03 4203   03 2173   MP82     0.82B14            0.82 MACH
03 4204   00 4125   HDTMIN   16.66767           1000 FT/MIN
03 4205   00 3352   FULL1A   1770
03 4206   00 4557   FUL21A   2415
03 4207   37 7402   BITSET   0377402
03 4210   00 7777   ADRMSK   07777              12 BIT ADDRESS MASK
03 4211   00 5736   SWINGA   3550               WING AREA
03 4212   27 5702   FTPNM    6076.12B4          FEET/N.M.
03 4213   12 5252   KPFDGN   0.33333*2**17      1
03 4214   26 3146            0.7*2**17          2
03 4215   12 5252            0.33333*2**17      3
03 4216   37 7777            0377777            4
```

```
03 4217   37 7777           0377777          5
03 4220   37 7270  KWOPFD   0.9975*2**17     1
03 4221   37 7270           0.9975*2**17     2
03 4222   37 7270           0.9975*2**17     3
03 4223   37 2703           0.98*2**17       4
03 4224   00 0000           0                5
03 4225   00 6216  VAPPTA   200.85*2**4
```

```
                  ***********************************************

                     ANALOG TO DIGITAL

                     CONVERSION CROSS REFERENCING

03 4226   75 1460  ATODAD   075,ATOD36       0  YAW RATE A
03 4227   75 1416  ATODA2   075,ATODI2       1  YAW RATE B
03 4230   75 1456           075,ATOD34       2  ROLL RATE A
03 4231   75 1526           075,ATOD74       3  ROLL RATE B
03 4232   75 1457           075,ATOD35       4  PITCH RATE A
03 4233   75 1525           075,ATOD73       5  PITCH RATE B
03 4234   75 1422           075,ATODI6       6  PITCH ANGLE A
03 4235   75 1425           075,ATODI9       7  PITCH ANGLE B
03 4236   75 1426           075,ATOD10       8  BANK ANGLE A
03 4237   75 1427           075,ATOD11       9  BANK ANGLE B
03 4240   75 1502           075,ATOD54      10  LONG. ACCEL. A
03 4241   75 1417           075,ATODI3      11  LONG. ACCEL. B
03 4242   75 1521           075,ATOD69      12  LAT. ACCEL. A
03 4243   75 1435           075,ATOD17      13  LAT. ACCEL. B
03 4244   75 1517           075,ATOD67      14  NORM. ACCEL. A
03 4245   75 1520           075,ATOD68       15 NORM. ACCEL. B
03 4246   75 1423           075,ATODI7      16  LOC. DEV. A
03 4247   75 1432           075,ATOD14      17  LOC. DEV. B
03 4250   75 1424           075,ATODI8      18  G/S DEV. A
03 4251   75 1436           075,ATOD18      19  G/S DEV. B
03 4252   75 1434           075,ATOD16      20  RAD. ALT. A "FINE"
03 4253   75 1431           075,ATOD13      21  RAD. ALT. B "FINE"
03 4254   75 1522           075,ATOD70      22  RAD. ALT. A "COARSE"
03 4255   75 1433           075,ATOD15      23  RAD. ALT. B "COARSE"
03 4256   75 1444  ATODA1   075,ATOD24      24  COURSE SEL. ERROR LEFT
03 4257   75 1451           075,ATOD29      25  COURSE SEL. ERROR RIGHT
03 4260   75 1467           075,ATOD43      26  RUD. SERVO AMP. A
03 4261   75 1470           075,ATOD44      27  RUD. SERVO AMP. B
03 4262   75 1477           075,ATOD51      28  AIL. SERVO AMP. A
03 4263   75 1500           075,ATOD52      29  AIL. SERVO AMP. B
03 4264   75 1473           075,ATOD47      30  ELV. SERVO AMP. A
03 4265   75 1474           075,ATOD48      31  ELV. SERVO AMP. B
03 4266   75 1471           075,ATOD45      32  RUD. RAM. POS. A
03 4267   75 1476           075,ATOD50      33  RUD. RAM. POS. B
03 4270   75 1475           075,ATOD49      34  AIL. RAM. POS. A
03 4271   75 1472           075,ATOD46      35  AIL. RAM. POS. B
03 4272   75 1523           075,ATOD71      36  ELV. RAM. POS. A
03 4273   75 1524           075,ATOD72      37  ELV. RAM. POS. B
03 4274   75 1501           075,ATOD53      38  RUD. MOD. PISTON POS. A
03 4275   75 1527           075,ATOD75      39  RUD. MOD. PISTON POS. B
03 4276   75 1446           075,ATOD26      40  AVG. AIL. POS. A
03 4277   75 1445           075,ATOD25      41  AVG. AIL. POS. B
03 4300   75 1462           075,ATOD38      42  ELV. AVG. POS. A
03 4301   75 1463           075,ATOD39      43  ELV. AVG. POS. B
03 4302   75 1413           075,ATODM1      44  CLUTCHED HEADING
03 4303   75 1414           075,ATODIN      45  FLAP POS.
```

```
03 4304   75 1450           075,ATOD28      46  CAPT. WHEEL
03 4305   75 1447           075,ATOD27      47  CAPT. COLUMN
03 4306   75 1465           075,ATOD41      48  1ST. OFC. WHEEL
03 4307   75 1464           075,ATOD40      49  1ST. OFC. COLUMN
03 4310   75 1454           075,ATOD32      50  HDG. SEL. ERROR
```

```
                    *******************************************

                         ANALOG TO DIGITAL SCALE

                       FACTORS FOR 100 * 2 ** 7 BITS/VOLT

03 4311  27 2555  ADKFCT  46.678*2**11     0  728.18 BIT/DEG/SEC
03 4312  27 2555  ADKFC2  46.678*2**11     1  728.18 BITS/DEG/SEC
03 4313  20 7167          33.808*2**11     2  728.18 BITS/DEG/SEC
03 4314  20 7167          33.808*2**11     3  728.18 BITS/DEG/SEC
03 4315  20 7167          33.808*2**11     4  728.18 BITS/DEG/SEC
03 4316  20 7167          33.808*2**11     5  728.18 BITS/DEG/SEC
03 4317  76 7777          -2.0*2**11       6  1770 BITS/FULL SCALE
03 4320  76 7777          -2.0*2**11       7  1770 BITS/FULL SCALE
03 4321  76 7777          -2.0*2**11       8  1770 BITS/FULL SCALE
03 4322  76 7777          -2.0*2**11       9  1770 BITS/FULL SCALE
03 4323  67 6034          -16.486*2**11    10 128(2**7) BITS/FT/SEC**2
03 4324  67 6034          -16.486*2**11    11 128(2**7) BITS/FT/SEC**2
03 4325  67 6034          -16.486*2**11    12 128(2**7) BITS/FT/SEC**2
03 4326  67 6034          -16.486*2**11    13 128(2**7) BITS/FT/SEC**2
03 4327  10 1743          16.486*2**11     14 128(2**7) BITS/FT/SEC**2
03 4330  10 1743          16.486*2**11     15 128(2**7) BITS/FT/SEC**2
03 4331  74 2676          -7.2818*2**11    16 728.18 BITS/DEG
03 4332  74 2676          -7.2818*2**11    17 728.18 BITS/DEG
03 4333  76 5616          -2.555*2**11     18 728.18 BITS/DEG
03 4334  76 5616          -2.555*2**11     19 728.18 BITS/DEG
03 4335  76 7777          -2.0*2**11       20 4 BITS/FOOT
03 4336  76 7777          -2.0*2**11       21 4 BITS/FOOT
03 4337  76 7777          -2.0*2**11       22 1 BIT/FOOT
03 4340  76 7777          -2.0*2**11       23 1 BIT/FOOT
03 4341  00 6117  ADKFC1  1.5385*2**11     24 1770 BITS/FULL SCALE
03 4342  00 6117          1.5385*2**11     25 1770 BITS/FULL SCALE
03 4343  04 4321          9.1022*2**11     26 728.18 BITS/DEG
03 4344  04 4321          9.1022*2**11     27 728.18 BITS/DEG
03 4345  66 7135          -18.204*2**11    28 728.18 BITS/DEG
03 4346  66 7135          -18.204*2**11    29 728.18 BITS/DEG
03 4347  66 7135          -18.204*2**11    30 728.18 BITS/DEG
03 4350  66 7135          -18.204*2**11    31 728.18 BITS/DEG
03 4351  64 2511          -23.339*2**11    32 728.18 BITS/DEG
03 4352  64 2511          -23.339*2**11    33 728.18 BITS/DEG
03 4353  11 0642          +18.204*2**11    34 728.18 BITS/DEG
03 4354  11 0642          +18.204*2**11    35 728.18 BITS/DEG
03 4355  66 7135          -18.204*2**11    36 728.18 BITS/DEG
03 4356  66 7135          -18.204*2**11    37 728.18 BITS/DEG
03 4357  75 3154          -5.1968*2**11    38 728.18 BITS/DEG
03 4360  75 3154          -5.1968*2**11    39 728.18 BITS/DEG
03 4361  00 0000          0                40 728.18 BITS/DEG
03 4362  00 0000          0                41 728.18 BITS/DEG
03 4363  00 0000          0                42 728.18 BITS/DEG
03 4364  00 0000          0                43 728.18 BITS/DEG
03 4365  01 0000          +2.0*2**11       44 1770 BITS/FULL SCALE
```

```
03 4366  76 7777          -2.0*2**11       45 1770 BITS/FULL SCALE
03 4367  75 2524          -5.3333*2**11    46 128(2**7) BITS/LB.
03 4370  72 2221          -11.4286*2**11   47 128(2**7) BITS/LB.
03 4371  75 2524          -5.3333*2**11    48 128(2**7) BITS/LB.
03 4372  72 2221          -11.4286*2**11   49 128(2**7) BITS/LB.
03 4373  00 6117          1.5385*2**11     50 1770 BITS/FULL SCALE
```

```
                    ***************************************************8

                         CONSTANTS

03 4374  77 7777  ZERON   0777777
03 4375  00 0377  LSB8    0000377
```

-continued

```
03 4376   70 0000  AIRDCD   0700000
03 4377   03 0000  ST0MSK   0030000
03 4400   23 6400  ST1MSK   0236400
03 4401   02 3002  ST2MSK   023002
03 4402   00 1500  ST3MSK   001500
03 4403   20 1300  ST4MSK   0201300
03 4404   11 0000  NSWLMS   0110000
03 4405   14 0000  WHLMSK   0140000
03 4406   76 0000  MKTMSK   0760000
03 4407   00 3777  APMKTM   03777
03 4410   77 6000  SERB2M   0776000
03 4411   00 0046  OCTL46   046
03 4412   00 0001  BIT00    1
03 4413   00 0002  BIT01    2
03 4414   00 0004  BIT02    4
03 4415   00 0010  BIT03    010
03 4416   00 0020  BIT04    020
03 4417   00 0040  BIT05    040
03 4420   00 0100  BIT06    0100
03 4421   00 0200  BIT07    0200
03 4422   00 0400  BIT08    0400
03 4423   00 1000  BIT09    01000
03 4424   00 2000  BIT10    02000
03 4425   00 4000  BIT11    04000
03 4426   01 0000  BIT12    010000
03 4427   02 0000  BIT13    020000
03 4430   04 0000  BIT14    040000
03 4431   10 0000  BIT15    0100000
03 4432   20 0000  BIT16    0200000
03 4433   40 0000  BIT17    0400000
03 4434   77 7776  BIT00N   0777776
03 4435   77 7775  BIT01N   0777775
03 4436   77 7773  BIT02N   0777773
03 4437   77 7767  BIT03N   0777767
03 4440   77 7757  BIT04N   0777757
03 4441   77 7737  BIT05N   0777737
03 4442   77 7677  BIT06N   0777677
03 4443   77 7577  BIT07N   0777577
03 4444   77 7377  BIT08N   0777377
03 4445   77 6777  BIT09N   0776777
03 4446   77 5777  BIT10N   0775777
03 4447   77 3777  BIT11N   0773777
03 4450   76 7777  BIT12N   0767777
03 4451   75 7777  BIT13N   0757777
03 4452   73 7777  BIT14N   0737777
```

```
03 4453   67 7777  BIT15N   0677777
03 4454   57 7777  BIT16N   0577777
03 4455   37 7777  BITN17   0377777
                   BIT0     EQUALS BIT00
                   BIT1     EQUALS BIT01
                   BIT2     EQUALS BIT02
                   BIT3     EQUALS BIT03
                   BIT4     EQUALS BIT04
                   BIT5     EQUALS BIT05
                   BIT6     EQUALS BIT06
                   BIT7     EQUALS BIT07
                   BIT8     EQUALS BIT08
                   BIT9     EQUALS BIT09
                   BIT17N   EQUALS BITN17
03 4456   77 7777  ADADCT   0777777           0
03 4457   00 0005           5                 1    "210"
03 4460   00 0001           1                 2    "204"
03 4461   77 7777           0777777           3
03 4462   77 7777           0777777           4
03 4463   00 0007  SEVEN1   7                 5    "212"
03 4464   00 0003           3                 6    "206"
03 4465   77 7777           0777777           7
03 4466   77 7777           0777777           10
```

```
1819B SCAMP                                      SECTION      4        PAGE     58
                                                 -continued

03 4467   00 0006              6                11 "211"
03 4470   00 0002              2                12 "205"
03 4471   77 7777              0777777          13
03 4472   00 0000              0                14 "203"
03 4473   00 0010              8                15 "213"
03 4474   00 0004              4                16 "207"
03 4475   77 7777              0777777          17
03 4476   00 1777   OUTMSK     01777
03 4477   00 0777   SERIAM     0777
                    MSGMSK     EQUALS SERIAM
03 4500   00 0000   ZERO       0
                    ONE        EQUALS BIT00
                    TWO        EQUALS BIT01
03 4501   00 0003   THREE      3
                    FOUR       EQUALS BIT02
03 4502   00 0005   FIVE       5
03 4503   00 0006   SIX        6
                    SEVEN      EQUALS SEVEN1
03 4504   00 0017   D15        15
03 4505   00 0024   TWENTY     20
03 4506   00 0062   D50        50
03 4507   00 0063   D51        51
03 4510   00 0120   EIGHTY     80
03 4511   00 0225   D149       149
03 4512   00 0310   D200       200
03 4513   00 0334   D220       220
03 4514   00 0416   D270       270
03 4515   00 0620   D400       400
03 4516   00 0764   D500       500

1819B SCAMP                                      SECTION      4        PAGE     59

03 4517   00 1130   D600       600
03 4520   00 2373   D1275      1275
03 4521   00 3410   D1800      1800
03 4522   00 3720   D2000      2000
03 4523   00 5670   D3000      3000
03 4524   00 6200   D3200      3200
03 4525   00 7400   D3840      3840
03 4526   01 1610   D5000      5000
03 4527   02 7340   D12000     12000
03 4530   03 0324   D12500     12500
03 4531   06 0650   D25000     25000
03 4532   15 1400   D54016     54016
03 4533   00 4211   TRIMAX     2185
03 4534   00 4146   CWSRHO     16.8*2**7
03 4535   01 1000   CWSPHO     36.0*2**7
                    AIRMSK     EQUALS D15
                    NULMSK     EQUALS THREE
03 4536   20 1000   BLKMSK     0201000

                    ***********************************

                      DOUBLE LENGTH CONSTANTS

03 4537   52 0777   TLAPCN     -89600
03 4540   77 7777              0777777
03 4541   00 0352   NZP5       234              0.5 G
03 4542   00 0051              41
03 4543   27 7022   NZP25      97810            0.25 G
03 4544   00 0024              20
03 4545   14 6423   NZP10      DBLDAT 2149651    0.10 G
03 4546   00 0010

                    ***********************************

                      ANGLES

03 4547   00 0554   DEGHLF     0.5DEG
03 4550   00 1330   DEGONE     1.0DEG
03 4551   00 2104   DEG1P5     1.5DEG
```

```
16198 SCAMP                                    SECTION      4        PAGE      59
                                               -continued

03 4552   00 2660   DEG2      2.0DEG
03 4553   00 3434   DEG2P5    2.5DEG
03 4554   00 4211   DEG3      3.0DEG
03 4555   00 5541   DEG4      4.0DEG
03 4556   00 7071   DEG5      5.0DEG
03 4557   01 2421   DEG6      6.0DEG
03 4560   01 1175   DEG6P5    6.5DEG
03 4561   01 6162   DEG10     10.0DEG
03 4562   02 5253   DEG15     15.0DEG
03 4563   03 1463   DEG18     18.0DEG
03 4564   03 4344   DEG20     20.0DEG
03 4565   03 7224   DEG22     22.0DEG
03 4566   04 2104   DEG24     24.0DEG

16196 SCAMP                                    SECTION      4        PAGE      60

03 4567   04 3434   DEG25     25.0DEG
03 4570   04 7645   DEG28     28.0DEG
03 4571   05 2525   DEG30     30.0DEG
03 4572   05 1042   DG34P5    34.5DEG
03 4573   06 1616   DEG35     35.0DEG
                    DEG45     EQUALS BIT15
03 4574   10 7071   DEG50     50.0DEG
                    DEG180    EQUALS BITM17
03 4575   76 1615   DG10M     -10.0DEG
03 4576   75 2524   DG15M     -15.0DEG

                              APPROACH SPEED SCHEDULE TABLES

03 4577   00 4601   FLAPIX    00,FLAP1
03 4600   00 4607             00,FLAP2
03 4601   00 0000   FLAP1     0.0DEG
03 4602   00 7071             5.0DEG
03 4603   01 6162             10.0DEG
03 4604   02 5253             15.0DEG
03 4605   03 4344             20.0DEG
03 4606   04 3434             25.0DEG
03 4607   00 0000   FLAP2     0.0DEG
03 4610   02 5253             15.0DEG
03 4611   03 7224             22.0DEG
03 4612   04 3434             25.0DEG
03 4613   06 1616             35.0DEG
03 4614   10 7071             50.0DEG
03 4615   00 4621   K1INDX    00,K11
03 4616   00 4627             00,K12
03 4617   00 4635   K2INDX    00,K21
03 4620   00 4643             00,K22
03 4621   00 5037   K11       161.9484
03 4622   00 4717             156.9484
03 4623   00 4456             146.8884
03 4624   00 4472             147.6384
03 4625   00 4414             144.7584
03 4626   00 4321             141.0684
03 4627   00 5536   K12       181.8884
03 4630   00 4242             138.1384
03 4631   00 4052             130.6384
03 4632   00 3744             126.2384
03 4633   00 3550             118.5084
03 4634   00 3431             113.5784
03 4635   13 2100   K21       .0003438827
03 4636   13 0400             .0003376827
03 4637   12 4737             .000324827
03 4640   12 1330             .0003106827
03 4641   11 7766             .0003051827
03 4642   11 7246             .0003026827
03 4643   22 1426   K22       .0005552827
03 4644   15 7616             .0004264827
03 4645   15 1371             .0004024827
```

```
 18196 SCAMP                                  SECTION        4          PAGE       61

03 4646   15 0017             .0003997827
03 4647   13 5244             .0003598827
03 4650   13 3407             .0003491827

                     VMCG

03 4651   00 7204   VMCGBI   232.24*2**4       15 DEG FLAP
03 4652   00 7204   VMCGB1   232.24*2**4       20 DEG FLAP
03 4653   00 7133            229.70*2**4       25 DEG FLAP

                     MISCELLANEOUS TOGA CONSTANTS

03 4654   77 4747   VMCGSL   -0.00595*2**18
03 4655   17 5750   WGT260   65000             *2**(-2)
03 4656   22 2370   WGT300   75000

 18198 SCAMP                                  SECTION        4          PAGE       62

                    ******************************************

                      SCALE FACTORS

                     POWERS OF TEN

03 4657   00 0001   FCTR10   1
03 4660   00 0012   TEN      10
03 4661   00 0144   D100     100
03 4662   00 1750   D1000    1000
03 4663   02 3420   D10000   10000
03 4664   30 3240   D10E5    100000
03 4665   03 6411            15625
03 4666   23 0455            78125

 18198 SCAMP                                  SECTION        4          PAGE       63

                    ***************************************************

                      AIRDATA INPUT CONVERSION

                     FACTORS

03 4667   20 0000   AIDCON   1.0*2**16           0 ALTNCR
03 4670   20 0000            1.0*2**16           1 ALTBCR
03 4671   10 1416            0.51194*2**16       2 MACHAD
03 4672   03 2777            0.21092*2**16       3 VCASAD
03 4673   03 2777            0.21092*2**16       4 VMOAID
03 4674   06 5766            0.42172*2**16       5 VTASAD
03 4675   06 1747            0.39024*2**16       6 TOTEMP
03 4676   05 2500            0.33301*2**16       7 ALTRTE
03 4677   06 1747            0.39024*2**16       8 STATMP

                     AIR DATA REASONALBENESS CHECKS

                     ADDRESS TABLE OF AIR DATA TERMS

03 4700   00 0207   AIRADD   00,ALTNCR
03 4701   00 0210            00,ALTBCR
03 4702   00 0211            00,MACHAD
03 4703   00 0212            00,VCASAD
03 4704   00 0214            00,VTASAD
03 4705   00 0216            00,ALTRTE

                     ADDRESS TABLE OF RATE TERMS FOR COMPARISON
                     OF AIR DATA

03 4706   00 0216   ADRTAD   00,ALTRTE
03 4707   00 0216            00,ALTRTE
03 4710   00 2434            00,VOTLNG
```

```
03 4711   00 0434           00,VDTLNG
03 4712   00 0434           00,VDTLNG
03 4713   00 0424           00,HDDOT

                  TOLERANCE TABLE
                  SCALING IS 2.5 ORIGINAL AIR DATA SCALING

03 4714   00 0005  ADRSTL   5
03 4715   00 0005           5
03 4716   00 0111           73
03 4717   00 0120           80
03 4720   00 0120           80
03 4721   00 1200           640

                  GAIN CONVERSION FACTOR FOR COMPARING
                  INDEPENDENT RATE WITH 2.5(RATE OF AIR DATA SIGNAL)

03 4722   00 1200  ADRSGN   0.01953*2**15    2.5/128
```

```
03 4723   00 1200           0.01953*2**15    2.5/128
03 4724   02 2253           0.28648*2**15    2**14/1117/128*2.5
03 4725   02 4000           0.3125*2**15     2.5*16/128
03 4726   02 4000           0.3125*2**15     2.5*16/128
03 4727   24 0000           2.5*2**15        2.5

                  MISCELLANEOUS AIR DATA REASONABLENESS CONSTANTS

03 4730   37 5341  ZTFAC1   0.99*2**17       E**(-.05/5)
03 4731   40 2436  ZTFAC2   -0.99*2**17      -E**(-.05/5)
03 4732   00 0012  ADRSMX   10
03 4733   44 7231  KSERMD   -0.84648*2**17   A=3.333 AIL A
03 4734   44 7231           -0.84648*2**17   A=3.33 AIL B
03 4735   47 0500           -0.77880*2**17   A=5 ELV A
03 4736   47 0500           -0.77880*2**17   A=5 ELV B
03 4737   43 3171           -0.89360*2**17   A=2.25 RUD A
03 4740   00 1532  SERBFA   00,SERBUF
```

```
                  ****************************************************

                  MONITORING GAINS

                  FOR SENSOR INPUTS

03 4741   10 0000  KINMON   0.25*2**17       0  YAW RATE
03 4742   10 0000           0.25*2**17       1  ROLL RATE
03 4743   10 0000           0.25*2**17       2  PITCH RATE
03 4744   03 1463           0.1*2**17        3  PITCH ANGLE
03 4745   03 1463           0.1*2**17        4  BANK ANGLE
03 4746   03 1463           0.10*2**17       5  LONG. ACCEL.
03 4747   03 1463           0.10*2**17       6  LAT. ACCEL.
03 4750   03 1463           0.10*2**17       7  NORM. ACCEL.
03 4751   03 1463           0.1*2**17        8  LOC. DEV.
03 4752   03 1463           0.1*2**17        9  G/S. DEV.
03 4753   01 4632           0.05*2**17       10 RAD. ALT FINE
03 4754   01 4632           0.05*2**17       11 RAD. ALT. COARSE
03 4755   01 4632           0.05*2**17       12 COURSE SEL ERROR
03 4756   00 0000           0                13 SPARE
03 4757   00 0000           0                14 SPARE
03 4760   00 0000           0                15 SPARE
03 4761   00 0000           0                16 SPARE
03 4762   10 0000           0.25*2**17       17 DEL. AIL. DUAL
03 4763   10 0000           0.25*2**17       18 DEL. ELV. DUAL
03 4764   00 0000           0                19 SPARE
03 4765   00 0000           0                20 SPARE
```

```
1819B SCAMP                                SECTION      4      PAGE      66

                        ************************************************

                          MONITORING THRESHOLDS

                         FOR SENSOR INPUTS

Ø3 4766   ØØ 133Ø   MINTHR  728             Ø  YAW RATE
Ø3 4767   ØØ 133Ø           728             1  ROLL RATE
Ø3 477Ø   ØØ 133Ø           728             2  PITCH RATE
Ø3 4771   ØØ Ø144           1ØØ             3  PITCH ANGLE
Ø3 4772   ØØ Ø144           1ØØ             4  BANK ANGLE
Ø3 4773   ØØ Ø634           3.22*2**7       5  LONG. ACCEL
Ø3 4774   ØØ Ø634           3.22*2**7       6  LAT. ACCEL.
Ø3 4775   ØØ Ø634           3.22*2**7       7  NORM. ACCEL.
Ø3 4776   ØØ Ø113           75              8  LOC DEV.
Ø3 4777   ØØ ØØ55           45              9  G/S DEV.
Ø3 5ØØØ   ØØ ØØ5Ø           4Ø              1Ø RAD. ALT FINE
Ø3 5ØØ1   ØØ ØØ12           1Ø              11 RAD. ALT COARSE
Ø3 5ØØ2   ØØ 2135           93              12 COURSE SEL ERROR
Ø3 5ØØ3   ØØ ØØØØ           Ø               13 SPARE
Ø3 5ØØ4   ØØ ØØØØ           Ø               14 SPARE
Ø3 5ØØ5   ØØ ØØØØ           Ø               15 SPARE
Ø3 5ØØ6   ØØ ØØØØ           Ø               16 SPARE
Ø3 5ØØ7   ØØ 4211           2185            17 DEL. AIL. DUAL
Ø3 5Ø1Ø   ØØ 4211           2185            18 DEL. ELV DUAL
Ø3 5Ø11   ØØ ØØØØ           Ø               19 SPARE
Ø3 5Ø12   ØØ ØØØØ           Ø               2Ø SPARE

1819B SCAMP                                SECTION      4      PAGE      67

                        ************************************************

                         E**(-AT) FOR

                         SENSOR INPUT

                         MONITORING

Ø3 5Ø13   23 3213   KLAG    Ø.6Ø653*2**17   Ø
Ø3 5Ø14   23 3213   KLAG1   Ø.6Ø653*2**17   1
Ø3 5Ø15   23 3213           Ø.6Ø653*2**17   2
Ø3 5Ø16   23 3213           Ø.6Ø653*2**17   3
Ø3 5Ø17   23 3213           Ø.6Ø653*2**17   4
Ø3 5Ø2Ø   23 3213           Ø.6Ø653*2**17   5
Ø3 5Ø21   23 3213           Ø.6Ø653*2**17   6
Ø3 5Ø22   23 3213           Ø.6Ø653*2**17   7
Ø3 5Ø23   23 3213           Ø.6Ø653*2**17   8
Ø3 5Ø24   23 3213           Ø.6Ø653*2**17   9
Ø3 5Ø25   36 341Ø           Ø.95123*2**17   1Ø
Ø3 5Ø26   36 341Ø           Ø.95123*2**17   11
Ø3 5Ø27   36 341Ø           Ø.95123*2**17   12
Ø3 5Ø3Ø   36 341Ø           Ø.95123*2**17   13
Ø3 5Ø31   36 341Ø           Ø.95123*2**17   14
Ø3 5Ø32   36 341Ø           Ø.95123*2**17   15
Ø3 5Ø33   23 3213           Ø.6Ø653*2**17   16
Ø3 5Ø34   23 3213           Ø.6Ø653*2**17   17
Ø3 5Ø35   23 3213           Ø.6Ø653*2**17   18
Ø3 5Ø36   23 3213           Ø.6Ø653*2**17   19
Ø3 5Ø37   23 3213           Ø.6Ø653*2**17   2Ø
Ø3 5Ø4Ø   23 3213           Ø.6Ø653*2**17   21
Ø3 5Ø41   23 3213           Ø.6Ø653*2**17   22
Ø3 5Ø42   23 3213           Ø.6Ø653*2**17   23
Ø3 5Ø43   23 3213           Ø.6Ø653*2**17   24
Ø3 5Ø44   23 3213           Ø.6Ø653*2**17   25
Ø3 5Ø45   ØØ ØØØØ           Ø               26 SPARE
Ø3 5Ø46   ØØ ØØØØ           Ø               27 SPARE
Ø3 5Ø47   ØØ ØØØØ           Ø               28 SPARE
Ø3 5Ø5Ø   ØØ ØØØØ           Ø               29 SPARE
Ø3 5Ø51   ØØ ØØØØ           Ø               3Ø SPARE
```

```
1B19B SCAMP                          SECTION      4        PAGE      67
                                     -continued

03 5052   00 0000           0                  31 SPARE
03 5053   00 0000           0                  32 SPARE
03 5054   00 0000           0                  33 SPARE
03 5055   37 5341           0.99*2**17         34
03 5056   37 5341           0.99*2**17         35
03 5057   37 5341           0.99*2**17         36
03 5060   37 5341           0.99*2**17         37
03 5061   00 0000           0                  38 SPARE
03 5062   00 0000           0                  39 SPARE
03 5063   00 0000           0                  40 SPARE
03 5064   00 0000           0                  41 SPARE
```

```
1B19B SCAMP                          SECTION      4        PAGE      68

                  *******************************

03 5065   00 3434  TIMEHO   2.5DEG             0 YAW RATE
03 5066   00 3434           2.5DEG             1 ROLL RATE
03 5067   00 3434           2.5DEG             2 PITCH RATE
03 5070   00 0261           0.243DEG           3 PITCH RATE
03 5071   00 0261           0.243DEG           4 BANK ANGLE
03 5072   00 0634           3.22*2**7          5  LONG. ACCEL.
03 5073   00 0634           3.22*2**7          6  LAT. ACCEL
03 5074   00 0634           3.22*2**7          7  NORM. ACCEL
03 5075   00 0222           0.2DEG             8  LOC. DEV.
03 5076   00 0111           0.1DEG             9  G/S DEV.
03 5077   00 0050           40                 10 RAD. ALT. "FINE"
03 5100   00 0024           20                 11 RAD. ALT. "COARSE"
03 5101   00 0554           0.5DEG             12 COURSE SEL. ERROR
03 5102   37 7777           0377777            13 SPARE
03 5103   37 7777           0377777            14 SPARE
03 5104   37 7777           0377777            15 SPARE
03 5105   37 7777           0377777            16 SPARE
03 5106   00 6647           4.8DEG             17 DEL. AIL. DUAL
03 5107   00 6647           4.8DEG             18 DEL. ELV. DUAL
03 5110   37 7777           0377777            19 SPARE
03 5111   37 7777           0377777            20 SPARE
```

```
1B19B SCAMP                          SECTION      4        PAGE      69

                  SERVO DRIVE CONSTANTS

03 5112   02 1042  AILLM    12.0DEG
03 5113   02 1042           12.0DEG
03 5114   01 6162           10.0DEG
03 5115   01 6162           10.0DEG
03 5116   00 0776  EQLODZ   0.7DEG
03 5117   00 0020  KEQULZ   0
03 5120   01 0041  KSFCOT   0.02747*2**18
03 5121   00 0022  SYWORT   18
03 5122   15 0510  KSYNCH   0.22*2**18
                   RDSERL   EQUALS DEGS
03 5123   30 0000  KREQ18   1.5*2**16

                   ****************************************

                    SERVO MODEL MONITORING CONSTANTS

03 5124   00 0001  RAMSGN   1                   AILRNA
03 5125   77 7776           -1                  AILRNB
03 5126   00 0001           1                   ELEVTA
03 5127   00 0001           1                   ELEVTB

03 5130   00 0247  MODFCD   167                 FAILURE CODES
03 5131   00 0247           167
03 5132   00 0250           168
03 5133   00 0250           168
                   ****************************************
```

```
18196 SCAMP                                   SECTION        4          PAGE        69
```
-continued

```
                         THROTTLE CONTROLLER CONSTANTS AND GAINS

                                   MISCELLANEOUS CONSTANTS
03 5134   77 6252   HDTHRS   -6.656787            FEET PER SECOND
03 5135   00 7723   CASTHR   253.1784             FT/SEC
03 5136   01 1463   P15B15   0.15B15
03 5137   02 3146   P30B15   0.30B15
03 5140   00 0310   RTRALT   50.0B2               RETARD ALTITUDE FEET

                                   CONTROLLER GAINS

03 5141   06 0422   KFOFAE   0.023699B20          SLOPE OF GAIN AS
                                                  F(A/S ERROR)
03 5142   06 3146   K0DFAE   0.2B17               VALUE AT 0 A/S ERROR
03 5143   34 3412   KFOFHD   14.220B13
03 5144   46 0722   KFOFAS   -0.0031599B25        SLOPE OF GAIN AS
                                                  F(A/S, HDOT) *2**25
03 5145   07 7154   KTHRCF   0.123457B18          A/S C.F GAIN 1/8.1
03 5146   03 5076   KTHRDS   931.9B4              A/S DISP. GAIN 1.28 DEG/FT/SEC
03 5147   51 7353   KCASDT   -86.27B10            A/S RATE GAIN

18196 SCAMP                                   SECTION        4          PAGE        70

                                                  0.12122 DEG/SEC/FT/SEC**2
03 5150   05 5232   KTHRTI   45.30B9              A/S INTEGRAL GAIN
                                                  0.0622 DEG/SEC/FT/SEC
03 5151   35 3005   KTHTHR   120325               THETA COMPENSATION
                                                  20.53 DEG/FT/SEC**2*G/4
03 5152   46 1731   KN1ERR   -412.149B8           N1ERROR GAIN (0.566DEG)
03 5153   77 1515   KN1DTE   -4.463DEG            N1ERROR DOT GAIN
03 5154   77 5172   KRTRD    -1.94DEG             RETARD GAIN
03 5155   00 7756   THRLIM   5.6DEG               THROTTLE LIMIT

                                   VARIABLE COMPUTATION CONSTANTS

03 5156   01 1565   K1AZAL   0.0760B16            DELTA L/W CONSTANTS
03 5157   01 2735   K2AZAL   0.0854B16
03 5160   00 3146   KACCX    0.025B16
03 5161   14 7676   K1LOVW   1.623B15             T/W CONSTANTS
03 5162   30 7462   K2LOVW   0.04873B21
03 5163   64 1767   K1CL     -1.469B15
03 5154   65 7334   K2CL     -0.01967B21
03 5165   13 3615   CLREF0   1.434B15             CLREF CONSTANTS
03 5166   03 1055   TWOFST   0.196B16
03 5167   57 5210   KTOVRW   -1.02135B16
03 5170   55 4237   KCLFLP   -75616               -728.17**2/(2.14*10**-4*2**15)
03 5171   00 7470   KTCMCL   5.35DEG              PITCH COMMAND CONSTANTS
03 5172   35 2212   KTCMV    234.27B9             0.543 DEG/1.68781
03 5173   17 6152   KTHTWO   0.493B17             GAIN OF THETA W/O
03 5174   37 1411   THTWOF   0.97468B17           FLIGHT W/O (A = 1/1.95)
03 5175   34 1727   THTWOP   0.88250B17           PRE-FLIGHT W/O (A = 1/0.4)
03 5176   00 2046   K1VCMD   2.363B4              +1.4 KNOTS
                                                   PLACARD LIMIT CONSTANTS
03 5177   67 6620   K1PLIM   -0.0079611B22        (SLOPE #1) FT/SEC**2/DEG
03 5200   01 6173   K2PLIM   455.71B4             FT/SEC**2 (270 KNOTS)
03 5201   77 1730   K3PLIM   -0.00074171B22       (SLOPE #2) FT/SEC**2/DEG
03 5202   01 0757   K4PLIM   286.93B4             FT/SEC**2 (170 KNOTS)

                                   CLIFT CONSTANTS

03 5203   20 5731   CLAEXT   0.00012772B29        SLATS EXT (.093/728.178)
03 5204   17 6561   CLARET   0.00012085B29        SLATS RET  (.088/728.178)
03 5205   03 4634   CLIH     0.00002747B29        STAB POS   (.020/728.178)
03 5206   02 2557   CLDE     0.00001785B29        ELEV POS   (.013/728.178)
03 5207   01 2047   K1CL0    0.00000961B29        F(FLAPS)   (.007/728.178) SLOPES
03 5210   03 5411            0.00002815B29                   (.0205/728.178)
03 5211   03 0370            0.00002335B29                   (.0170/728.178)
03 5212   01 4632   K2CL0    0.2B15               F(FLAPS) INTERCEPTS
03 5213   00 4122            0.065B15
03 5214   01 2703            0.170B15
```

```
                    ****************************

                    BLEED AIR CORRECTION FACTOR CONSTANTS

03 5215   00 0000   CBXY3   0
03 5216   00 0000           0
03 5217   00 0000           0
03 5220   00 0000           0
03 5221   57 5452           -0.00796B23
03 5222   13 0506           0.00541B23
03 5223   73 0406           -0.00241B23
03 5224   76 6376           -0.00058B23
03 5225   00 0000           0
03 5226   00 0000           0
03 5227   04 3433           0.00217B23
03 5230   00 7662           0.000479B23
03 5231   00 7277           0.00045B23
03 5232   77 4435           -0.00021B23
03 5233   77 2603           -0.00032B23
03 5234   77 2503           -0.00032B23
03 5235   02 2407           0.00113B23
03 5236   76 5656           -0.00052B23
03 5237   76 6002           -0.00061B23
03 5240   76 5406           -0.00064B23
03 5241   72 7543           -0.00246B23
03 5242   04 7640           0.00243B23
03 5243   76 0336           -0.00095B23
03 5244   76 6126           -0.00060B23

                    THRUST RATING EQUATION COEFFICIENTS

03 5245   00 0000   CNHX5   0                     CNHX5
03 5246   00 0000           0                     CNHX4
03 5247   00 0000           0                     CNHX3
03 5250   00 0000           0                     CNHX2
03 5251   02 0270           0.031950*2**18        CNHX1
03 5252   05 7535           0.09313*2**18         CNHX0
03 5253   00 2223           0.004467*2**18        ANHX3
03 5254   00 1331           0.002782*2**18        ANHX2
03 5255   00 7777           0.015620*2**18        ANHX1
03 5256   06 4431           0.102635*2**18        ANHX0
03 5257   05 6575           0.091297*2**18        CNTX5
03 5260   16 6326           0.231287*2**18        CNTX4
03 5261   04 6716           0.075981*2**18        CNTX3
03 5262   75 2607           -0.041475*2**18       CNTX2
03 5263   75 5550           -0.035731*2**18       CNTX1
03 5264   06 0453           0.094890*2**18        CNTX0
03 5265   77 7776           -1                    CHPX2
03 5266   00 0000           0                     CHPX0
03 5267   73 0737           -20000                CHPX1
03 5270   76 3377           -25.0*2**8            CTTX0
```

```
03 5271   00 5111           0.010043*2**18
03 5272   77 4710           -0.00607*2**18
03 5273   77 3460           -0.008601*2**18
03 5274   00 1427           0.003019*2**18
03 5275   00 6421           0.012761*2**18
03 5276   06 1614           0.097213*2**18
03 5277   00 7146           0.014061*2**18
03 5300   77 4547           -0.006441*2**18
03 5301   77 7500           -0.000730*2**18
03 5302   06 3034           0.10118*2**18
03 5303   50 6325           -0.362463*2**18
03 5304   50 3153           -0.36873*2**18
03 5305   77 4635           -0.006232*2**18
03 5306   01 6367           0.028285*2**18
03 5307   75 2133           -0.042517*2**18
03 5310   05 2731           0.083834*2**18
```

```
18198 SCAMP                                    SECTION     4       PAGE      72
                                              -continued
03 5311   10 6371          36089
03 5312   71 5157          -26000
03 5313   70 5317          -30000
03 5314   75 1377          -45.0*2**8

03 5315   75 2761          -0.041069*2**18
03 5316   75 7307          -0.032439*2**18
03 5317   00 6131          0.012057*2**18
03 5320   00 4650          0.009431*2**18
03 5321   00 7007          0.0137*2**18
03 5322   05 7152          0.092202*2**18
03 5323   01 2001          0.019534*2**18
03 5324   77 1074          -0.01344*2**18
03 5325   00 0316          0.000787*2**18
03 5326   06 2600          0.099121*2**18
03 5327   00 1224          0.002516*2**18
03 5330   04 7446          0.077294*2**18
03 5331   03 7301          0.061285*2**18
03 5332   76 7635          -0.015998*2**18
03 5333   75 2161          -0.042533*2**18
03 5334   05 4747          0.087796*2**18
03 5335   10 6371          36089
03 5336   72 5017          -22000
03 5337   70 2363          -31500
03 5340   76 0777          -30.0*2**8

03 5341   02 0515          0.032521*2**18
03 5342   00 6103          0.011976*2**18
03 5343   76 5470          -0.020290*2**18
03 5344   77 2140          -0.01135*2**18
03 5345   00 7120          0.013977*2**18
03 5346   06 2174          0.09813*2**18
03 5347   74 1175          -0.060068*2**18
03 5350   02 1576          0.034662*2**18
03 5351   77 2073          -0.011488*2**18
03 5352   06 4427          0.102625*2**18

18198 SCAMP                                    SECTION     4       PAGE      73

03 5353   55 3700          -0.289302*2**18
03 5354   23 1655          0.300465*2**18
03 5355   75 5455          -0.035957*2**18
03 5356   74 2150          -0.058192*2**18
03 5357   77 0363          -0.014696*2**18
03 5360   06 3605          0.101094*2**18
03 5361   10 6371          36089
03 5362   73 0737          -20000
03 5363   70 2363          -31500
03 5364   00 7400          15.0*2**8

03 5365   03 3710          0.054472*2**18
03 5366   05 5251          0.088536*2**18
03 5367   76 5367          -0.020540*2**18
03 5370   70 7365          -0.110388*2**18
03 5371   74 6056          -0.050601*2**18
03 5372   06 0467          0.094938*2**18
03 5373   00 0000          0
03 5374   00 0000          0
03 5375   00 0000          0
03 5376   06 3226          0.10018*2**18
03 5377   65 7537          -0.156617*2**18
03 5400   13 5131          0.181981*2**18
03 5401   77 3360          -0.008846*2**18
03 5402   75 0454          -0.045725*2**18
03 5403   76 4025          -0.023354*2**18
03 5404   06 4243          0.102184*2**18
03 5405   03 7200          16000
03 5406   70 5317          -30000
03 5407   00 0000          0
03 5410   00 2400          5.0*2**8

                 ****************************************
```

```
1R19B SCAMP                          SECTION        4        PAGE       73
                                     -continued

                      THRUST RATING MATRIX CODES

03 5411  14 0000  MTRXCD  6.0*2**13        T/O
03 5412  04 0000          2.0*2**13        MAX CLIMB
03 5413  02 0000          1.0*2**13        CRUISE
03 5414  06 0000          3.0*2**13        MAX CONT
03 5415  10 0000          4.0*2**13        G/A

                     ************************************

                      AUTO-MATIC SEQUENCING CONSTANTS

03 5416  03 6250  KHEQUV  15528            (1000)**2/(2*32.2)
03 5417  05 0000  KINTMC  20.0*2**10       MACHCM INTEGRAL CONST.

1R19B SCAMP                          SECTION        4        PAGE       74

                     ********************************

                     DELAYED FLAP DEPLOYMENT CONSTANTS

03 5420  00 0012  DVFLAP  10
03 5421  00 0012          10
03 5422  00 0024          20
03 5423  00 0036          30
03 5424  00 0000          0
03 5425  00 6667  V0FLAP  219.4284
03 5426  00 7305  V0FLP1  236.2984
03 5427  00 7723          253.1784
03 5430  01 0757          286.9384
03 5431  01 2431          337.5684
03 5432  22 7532  FPSTKM  0.592483817
03 5433  40 6243  KGAMLG  -0.97531817
03 5434  22 2366  KVX50F  0.017881822     FLAPS=50
03 5435  07 2462          0.007153822     FLAPS=40
03 5436  06 0646          0.00596822      FLAPS=30
03 5437  04 7036          0.004768822     FLAPS=20
03 5440  01 1610          0.001192822     FLAPS=10
03 5441  07 0707  FLPSTP  40.0DEG
03 5442  05 2525          30.0DEG
03 5443  03 4344          20.0DEG
03 5444  01 6162          10.0DEG
03 5445  00 0000          0
03 5446  74 0361  MFLPLC  -0.2463816
03 5447  40 3145          -1.975816
03 5450  03 3613  BFLPLC  111.08787
03 5451  23 0423          610.02587
03 5452  00 3600  MINFGM  7.588
03 5453  00 7076  V50FLP  227.8584

1R19B SCAMP                          SECTION        4        PAGE       75

                     ************************************************

                     SINE-COSINE TABLES

03 5454  00 0000  SIN0    0
03 5455  00 6221  SIN01   0.02454*2**17
03 5456  01 4440          0.04907*2**17
03 5457  02 2652          0.07356*2**17
03 5460  03 1060          0.09802*2**17
03 5461  03 7255          0.12241*2**17
03 5462  04 5440          0.14673*2**17
03 5463  05 3610          0.17096*2**17
03 5464  06 1743          0.19509*2**17
```

```
**************************************************

SINE-COSINE TABLES
```

-continued

```
03 5465   07 0056          0.21910*2**17
03 5466   07 6150          0.24298*2**17
03 5467   10 4216          0.26671*2**17
03 5470   11 2240          0.29028*2**17
03 5471   12 0233          0.31368*2**17
03 5472   12 6175          0.33689*2**17
03 5473   13 4105          0.35990*2**17
03 5474   14 1757          0.38268*2**17
03 5475   14 7574          0.40524*2**17
03 5476   15 5351          0.42756*2**17
03 5477   16 3063          0.44961*2**17
03 5500   17 0533          0.47140*2**17
03 5501   17 6135          0.49290*2**17
03 5502   20 3470          0.51410*2**17
03 5503   21 0754          0.53500*2**17
03 5504   21 6164          0.55557*2**17
03 5505   22 3321          0.57581*2**17
03 5506   23 0400          0.59570*2**17
03 5507   23 5377          0.61523*2**17
03 5510   24 2317          0.63439*2**17
03 5511   24 7154          0.65317*2**17
03 5512   25 3727          0.67155*2**17
03 5513   26 0413          0.68954*2**17
03 5514   26 5012          0.70711*2**17
03 5515   37 7777  COS0    0377777
03 5516   37 7731  COS01   0.99970*2**17
03 5517   37 7543          0.99880*2**17
03 5520   37 7235          0.99729*2**17
03 5521   37 6610          0.99518*2**17
03 5522   37 6046          0.99248*2**17
03 5523   37 5166          0.98918*2**17
03 5524   37 4167          0.98528*2**17
03 5525   37 3052          0.98079*2**17
03 5526   37 1617          0.97570*2**17
03 5527   37 0250          0.97003*2**17
03 5530   36 6565          0.96378*2**17
03 5531   36 4764          0.95694*2**17
03 5532   36 3051          0.94953*2**17
```

```
03 5533   36 1022          0.94154*2**17
03 5534   35 5661          0.93299*2**17
03 5535   35 4407          0.92388*2**17
03 5536   35 2023          0.91421*2**17
03 5537   34 7530          0.90399*2**17
03 5540   34 4524          0.89322*2**17
03 5541   34 1613          0.88192*2**17
03 5542   33 6574          0.87009*2**17
03 5543   33 3450          0.85773*2**17
03 5544   33 0220          0.84485*2**17
03 5545   32 4666          0.83147*2**17
03 5546   32 1232          0.81758*2**17
03 5547   31 5476          0.80321*2**17
03 5550   31 1643          0.78835*2**17
03 5551   30 5710          0.77301*2**17
03 5552   30 1661          0.75721*2**17
03 5553   27 5536          0.74095*2**17
03 5554   27 1371          0.72425*2**17
03 5555   26 5012          0.70711*2**17
```

```
                          ************************************

                          ARCSIN TABLES

03 5556   00 0000   ASIN0    0
03 5557   00 1214   ASIN01   0.8953DEG
03 5560   00 2430            1.7908DEG
03 5561   00 3644            2.6867DEG
03 5562   00 5061            3.5833DEG
03 5563   00 6277            4.4808DEG
03 5564   00 7515            5.3794DEG
03 5565   01 0734            6.2793DEG
03 5566   01 2155            7.1808DEG
03 5567   01 3377            8.0840DEG
03 5570   01 4622            8.9893DEG
03 5571   01 6047            9.8969DEG
03 5572   01 7275            10.8069DEG
03 5573   02 0526            11.7197DEG
03 5574   02 1761            12.6356DEG
03 5575   02 3216            13.5547DEG
03 5576   02 4456            14.4775DEG
03 5577   02 5721            15.4041DEG
03 5600   02 7167            16.3348DEG
03 5601   03 0446            17.2700DEG
03 5602   03 1714            18.2100DEG
03 5603   03 3174            19.1550DEG
03 5604   03 4460            20.1055DEG
03 5605   03 5751            21.0618DEG
03 5606   03 7246            22.0243DEG
03 5607   04 0547            22.9934DEG
03 5610   04 2056            23.9695DEG
03 5611   04 3372            24.9530DEG
03 5612   04 4714            25.9445DEG
03 5613   04 6244            26.9444DEG
03 5614   04 7603            27.9532DEG
03 5615   05 1150            28.9715DEG
03 5616   05 2525            30.0000DEG
03 5617   05 4112            31.0392DEG
03 5620   05 5507            32.0900DEG
03 5621   05 7115            33.1529DEG
03 5622   06 0535            34.2288DEG
03 5623   06 2166            35.3188DEG
03 5624   06 3633            36.4235DEG
03 5625   06 5313            37.5443DEG
03 5626   06 7007            38.6821DEG
03 5627   07 0521            39.8384DEG
03 5630   07 2252            41.0145DEG
03 5631   07 4022            42.2119DEG
03 5632   07 5613            43.4325DEG
03 5633   07 7426            44.6782DEG
03 5634   10 1265            45.9514DEG
```

```
03 5635   10 3152            47.2544DEG
03 5636   10 5066            48.5904DEG
03 5637   10 7036            49.9626DEG
03 5640   11 1042            51.3752DEG
03 5641   11 3110            52.8327DEG
03 5642   11 5222            54.3409DEG
03 5643   11 7406            55.9066DEG
03 5644   12 1652            57.5383DEG
03 5645   12 4206            59.2465DEG
03 5646   12 6644            61.0450DEG
03 5647   13 1420            62.9519DEG
03 5650   13 4336            64.9922DEG
03 5651   13 7447            67.2018DEG
03 5652   14 3023            69.6359DEG
03 5653   14 6747            72.3875DEG
03 5654   15 3446            75.6384DEG
03 5655   16 1447            79.8582DEG
03 5656   20 0000   DEG90    90.0000DEG
```

```
                   ***************************************************************

                     CONSTANTS FOR
                    DC - 10 FLIGHT DEMO

03 5657  00 0000  ALPHBT  0                @ BLANK
03 5660  16 1306          0161306          A
03 5661  02 2747          0022747          B
03 5662  16 2044          0162044          C
03 5663  02 2745          0022745          D
03 5664  16 3046          0163046          E
03 5665  16 1006          0161006          F
03 5666  16 2146          0162146          G
03 5667  14 1302          0141302          H
03 5670  02 2445          0022445          I
03 5671  12 2405          0122405          J
03 5672  14 1030          0141030          K
03 5673  14 2040          0142040          L
03 5674  15 0310          0150310          M
03 5675  15 0320          0150320          N
03 5676  16 2344          0162344          O
03 5677  16 1206          0161206          P
03 5700  16 2364          0162364          Q
03 5701  16 1226          0161226          R
03 5702  06 3146          0063146          S
03 5703  02 0405          0020405          T
03 5704  14 2340          0142340          U
03 5705  14 4010          0144010          V
03 5706  14 4320          0144320          W
03 5707  01 4030          0014030          X
03 5710  04 3342          0043342          Y
03 5711  02 6054          0026054          Z
03 5712  16 2000          0162000          [
03 5713  01 0020          0010020
03 5714  00 0344          0000344          ]
03 5715  00 4214          0004214          ^
03 5716  00 2040          0002040          ← UNDERLINE
03 5717  00 0000          0                SPACE
03 5720  03 0414          0030414          !
03 5721  04 0001          0040001          "
03 5722  16 6354          0166354          # BOX
03 5723  17 7777          0177777          $ ALL SEGMENTS
03 5724  06 5553          0065553          %
03 5725  17 2364          0172364          &
03 5726  00 0010          0000010
03 5727  16 2000          0162000          (
03 5730  00 0344          0000344          )
03 5731  01 5433          0015433          *
03 5732  00 1403          0001403          +
03 5733  00 4000          0004000          ,
03 5734  00 1002          0001002          -
```

```
03 5735  03 6400          0036400          .
03 5736  00 4010          0004010          /
03 5737  16 2401          0162401          0
03 5740  00 0401          0000401          1
03 5741  12 3001          0123001          2
03 5742  02 3401          0023401          3
03 5743  04 1401          0041401          4
03 5744  06 3400          0063400          5
03 5745  16 3400          0163400          6
03 5746  02 0401          0020401          7
03 5747  16 3401          0163401          8
03 5750  06 3401          0063401          9
03 5751  03 6401          0036401          :
03 5752  03 4001          0034001          ;
03 5753  00 0030          0000030          <
03 5754  00 3042          0003042          =
03 5755  01 4000          0014000          >
03 5756  00 0606          0000606          ?
03 5757  40 4040  BLANKS  RESERV 4,0404040
```

MODE ANNUNCIATOR PANEL MESSAGES

```
03 5763  40 2327  MAPMES  TEXT   CWS
03 5764  23 0000
03 5765  06 1401          TEXT  FLAR
03 5766  22 0000
03 5767  40 2757          TEXT   G/S
03 5770  23 0000
03 5771  40 0114          TEXT   ALT
03 5772  24 0000
03 5773  40 0757          TEXT   G/A
03 5774  01 0000
03 5775  40 2457          TEXT   T/C
03 5776  17 0000
03 5777  40 0620          TEXT   FPA
03 6000  01 0000
03 6001  40 0301          TEXT   CAS
03 6002  23 0000
03 6003  15 0103          TEXT  MACH
03 6004  10 0000
03 6005  40 1706  OFFPIT  TEXT   OFF
03 6006  06 0000
03 6007  03 2723  LATMES  TEXT  CWS
03 6010  40 4000
03 6011  07 1604          TEXT  GNDRL
03 6012  22 1400
03 6013  01 1407          TEXT  ALGN
03 6014  16 4000
03 6015  14 1703          TEXT  LCC
03 6016  40 4000
03 6017  26 1722          TEXT  VOR
03 6020  40 4000
03 6021  10 0407          TEXT  HDG-S
03 6022  55 2300
03 6023  24 1707          TEXT  TCGA
03 6024  01 4000
03 6025  40 4040  ARMMES  TEXT        OFF
03 6026  40 4017
03 6027  06 0600
03 6030  40 4040          TEXT       LAND
03 6031  40 1401
03 6032  16 0400
03 6033  40 4040          TEXT        ILS
03 6034  40 4011
03 6035  14 2300
03 6036  40 4040          TEXT        VOR
03 6037  40 4026
03 6040  17 2200
03 6041  40 4040          TEXT        ALT
03 6042  40 4001
03 6043  14 2400
```

```
03 6044  14 0116          TEXT  LAND-ALT
03 6045  04 5501
03 6046  14 2400
03 6047  40 1114          TEXT   ILS-ALT
03 6050  23 5501
03 6051  14 2400
03 6052  40 2617          TEXT   VOR-ALT
03 6053  22 5501
03 6054  14 2400
03 6055  40 4040          TEXT      MACH
03 6056  40 1501
03 6057  03 1000
03 6060  26 1722          TEXT  VOR-MACH
03 6061  55 1501
03 6062  03 1000
```

-continued

```
03 6063   40 4040            TEXT     CAS
03 6064   40 4003
03 6065   01 2300
03 6066   40 2617            TEXT     VOR-CAS
03 6067   22 5503
03 6070   01 2300
03 6071   23 1607            TEXT     SNGL LND
03 6072   14 4014
03 6073   16 0400
03 6074   17 0606   THROTL   TEXT     OFF
03 6075   40 4000
03 6076   22 0524            TEXT     RETD
03 6077   04 0000
03 6100   01 1420            TEXT     ALPH
03 6101   10 0000
03 6102   23 2004            TEXT     SPD
03 6103   40 0000
03 6104   16 5501            TEXT     N-1
03 6105   40 0000
03 6106   15 0103            TEXT     MACH
03 6107   10 0000
                    OFFLAT   EQUALS   THROTL
03 6110   40 0340   CMD      TEXT     C
03 6111   40 1740   MAN      TEXT     C
03 6112   40 1540   CWS      TEXT     M
```

```
                    *************************************
03 6113   00 6157   SCADTB   00,SCLTB0
03 6114   00 6151            00,SCLTB1
03 6115   00 6145            00,SCLTB2
03 6116   00 6135            00,SCLTB3
03 6117   00 6125            00,SCLTB4
03 6120   00 0016   NUMDCK   14
03 6121   00 0005            5
03 6122   00 0003            3
03 6123   00 0007            7
03 6124   00 0007            7
03 6125   77 7777   SCLTB4   -0              23 SPEED BRAKES DEPL.
03 6126   77 7776            -1              22  CWS SWITCH
03 6127   77 7775            -2              21 R.I. WHEEL SPIN
03 6130   77 7774            -3              20 L.O. WHEEL SPIN
03 6131   77 7773            -4              19 FLAPS > 30 DEG
03 6132   00 0005            +5              18 V.G. VALID B
03 6133   77 7771            -6              17 R.O WHEEL SPIN
03 6134   77 7767            -8              16 CAPT F/D ON
03 6135   00 0002   SCLTB3   2               31 A/C ON GND B
03 6136   77 7774            -3              30 L.I. WHEEL SPIN
03 6137   77 7773            -4              29 FLAPS OUT OF DETENT
03 6140   00 0005            5               28 A/C ON GND A
03 6141   77 7766            -9              27 CMD SWITCH
03 6142   77 7764            -11             26 F.O. F/D ON
03 6143   77 7763            -12             25 LOC VALID B
03 6144   00 0015            13              24 ROLL 2 & 3 AGREE
03 6145   00 0006   SCLTB2   6               35 GYRO EXC VALID B
03 6146   00 0011            9               34 LAU VALID A
03 6147   00 0016            14              33 LAU VALID B
03 6150   00 0017            15              32 GYRO EXC VALID A
03 6151   00 0002   SCLTB1   2               41 YAW RATE VALID B
03 6152   00 0013            11              40 YAW RATE VALID A
03 6153   77 7763            -12             39 G/S VALID A
03 6154   77 7762            -13             38 LOC VALID A
03 6155   00 0020            16              37 RAD ALT VALID B
03 6156   00 0021            17              36 MOTOR SPEED B
03 6157   00 0001   SCLTB0   1               56 V.G. AUX VALID A
03 6160   00 0002            2               55 MOTOR SPEED A
03 6161   00 0003            3               54 MAN TRIM NOT
03 6162   77 7773            -4              53 Y/D SWITCH B
03 6163   77 7772            -5              52 Y/D SWITCH A
```

```
18198 SCAMP                              SECTION      4        PAGE      83
```

-continued

```
03 6164   77 7767         -8          51 ILS TUNED NOT
03 6165   00 0011         9           50 ROLL 1 & 2 AGREE
03 6166   00 0012         10          49 PITCH 2 & 3 AGREE
03 6167   00 0013         11          48 HDG VALID
03 6170   00 0014         12          47 MACH VALID
03 6171   00 0015         13          46 RAD ALT VALID A
03 6172   77 7761         -14         45 G/S VALID B
03 6173   00 0017         15          44 ALT VALID
03 6174   00 0020         16          43 A/S VALID

18198 SCAMP                              SECTION      4        PAGE      84

03 6175   00 0021         17          42 PITCH 1 & 2 AGREE

18198 SCAMP                              SECTION      4        PAGE      85

                  ****************************************

                   SENSOR ADDRESS TABLE

03 6176   23 0124   SENADR   2,YAWRTA 0
03 6177   23 0125            2,YAWRTB 1
03 6200   23 0126            2,PHIDTA 2
03 6201   23 0127            2,PHIDTB 3
03 6202   23 0130            2,THTDTA 4
03 6203   23 0131            2,THTDTB 5
03 6204   23 0132            2,THETAA 6
03 6205   23 0133            2,THETAB 7
03 6206   23 0134            2,PHIA 8
03 6207   23 0135            2,PHIB 9
03 6210   23 0136            2,ACCLXA 10
03 6211   23 0137            2,ACCLXB 11
03 6212   23 0140            2,ACCLYA 12
03 6213   23 0141            2,ACCLYB 13
03 6214   23 0142            2,ACCLZA 14
03 6215   23 0143            2,ACCLZB 15
03 6216   73 0144            7,RETLCA 16
03 6217   73 0145            7,RETLCB 17
03 6220   73 0146            7,LAMGSA 18
03 6221   73 0147            7,LAMGSB 19
03 6222   13 0150            1,HRADFA 20
03 6223   13 0151            1,HRADFB 21
03 6224   13 0152            1,HRADCA 22
03 6225   13 0153            1,HRADCB 23
03 6226   63 0154            6,CRSERL 24
03 6227   63 0155            6,CRSERR 25
03 6230   63 0174            6,AILAVA 26
03 6231   63 0175            6,AILAVB 27
03 6232   63 0166            6,ALRAMA 28
03 6233   63 0167            6,ALRAMB 29
03 6234   63 0160            6,ALSADA 30
03 6235   63 0161            6,ALSADB 31
03 6236   63 0176            6,ELVAVA 32
03 6237   63 0177            6,ELVAVB 33
03 6240   63 0170            6,ELRAMA 34
03 6241   63 0171            6,ELRAMB 35
03 6242   63 0162            6,ELSADA 36
03 6243   63 0163            6,ELSADB 37
03 6244   63 0164            6,RDRAMA 38
03 6245   63 0165            6,RDRAMB 39
03 6246   63 0156            6,RDSADA 40
03 6247   63 0157            6,RDSADB 41
03 6250   23 0172            2,RDMODA 42
03 6251   23 0173            2,RDMODB 43
03 6252   23 0200            2,PSIHCL 44
03 6253   23 0201            2,FLAPOS 45
03 6254   23 0203            2,COLCAP 46
03 6255   23 0202            2,WHLCAP 47
```

```
18190 SCAMP                          SECTION      4        PAGE      86

03 6256  23 0205          2,COL1ST 48
03 6257  23 0204          2,WHL1ST 49
03 6260  63 0206          6,HDGSER 50

18190 SCAMP                          SECTION      4        PAGE      87

               *********************************************

                 PREFLIGHT

03 6261  00 1330  SENSCL  1.0DEG          0 YAWRT. A
03 6262  00 1330          1.0DEG          1 YAWRT. B
03 6263  00 1330          1.0DEG          2 ROLLRT. A
03 6264  00 1330          1.0DEG          3 ROLLRT. B
03 6265  00 1330          1.0DEG          4 PITCHRT. A
03 6266  00 1330          1.0DEG          5 PITCHRT. B
03 6267  00 1330          1.0DEG          6 PITCH ANGLE A
03 6270  00 1330          1.0DEG          7 PITCH ANGLE B
03 6271  00 1330          1.0DEG          8 ROLL ANGLE A
03 6272  00 1330          1.0DEG          9 ROLL ANGLE B
03 6273  00 0200          128             10 A-X A
03 6274  00 0200          128             11 A-X B
03 6275  00 0200          128             12 A-Y A
03 6276  00 0200          128             13 A-Y B
03 6277  00 0200          128             14 A-Z A
03 6300  00 0200          128             15 A-Z B
03 6301  00 1330          1.0DEG          16 LOC A
03 6302  00 1330          1.0DEG          17 LOC B
03 6303  00 1330          1.0DEG          18 G/S A
03 6304  00 1330          1.0DEG          19 G/S B
03 6305  00 0004          4               20 H.R. FINE A
03 6306  00 0004          4               21 H.R. FINE B
03 6307  00 0001          1               22 H.R. COARSE A
03 6310  00 0001          1               23 H.R. COARSE B
03 6311  00 1330          1.0DEG          24 CRS. ERR. L
03 6312  00 1330          1.0DEG          25 CRS. ERR. R
03 6313  00 1330          1.0DEG          26 AIL AVG A
03 6314  00 1330          1.0DEG          27 AIL AVG B
03 6315  00 1330          1.0DEG          28 AIL RAM A
03 6316  00 1330          1.0DEG          29 AIL RAM B
03 6317  00 1330          1.0DEG          30 AIL S.A. A
03 6320  00 1330          1.0DEG          31 AIL S.A. B
03 6321  00 1330          1.0DEG          32 ELV AVG A
03 6322  00 1330          1.0DEG          33 ELV AVG B
03 6323  00 1330          1.0DEG          34 ELV. RAM A
03 6324  00 1330          1.0DEG          35 ELV. RAM B
03 6325  00 1330          1.0DEG          36 ELV. S.A. A
03 6326  00 1330          1.0DEG          37 ELV. S.A. B
03 6327  00 1330          1.0DEG          38 RUD RAM A
03 6330  00 1330          1.0DEG          39 RUD RAM B
03 6331  00 1330          1.0DEG          40 RUD S.A. A
03 6332  00 1330          1.0DEG          41 RUD S.A. B
03 6333  00 1330          1.0DEG          42 RUD MOD A
03 6334  00 1330          1.0DEG          43 RUD MOD B
03 6335  00 1330          1.0DEG          44 HDG HOLD
03 6336  00 1330          1.0DEG          45 FLAP POS.
03 6337  00 0200          128             46 CAPT. COL.
03 6340  00 0200          128             47 CAPT WHL.

18190 SCAMP                          SECTION      4        PAGE      88

03 6341  00 0200          128             48 1ST OFC COL
03 6342  00 0200          128             49 1ST OFC WHL.
03 6343  00 1330          1.0DEG          50 HDG. SEL. ERR.
               *********************************************
```

-continued

NOMINAL SENSOR NULLS

```
03 6344  00 0554  NOMNUL  0.5DEG      0 YAW RT. A
03 6345  00 0554          0.5DEG      1 YAW RT. B
03 6346  00 0554          0.5DEG      2 ROLL RT. A
03 6347  00 0554          0.5DEG      3 ROLL RT. B
03 6350  00 0554          0.5DEG      4 PITCH RT. A
03 6351  00 0554          0.5DEG      5 PITCH RT. B
03 6352  00 4414          3.18DEG     6 PITCH ANGLE A
03 6353  00 4414          3.18DEG     7 PITCH ANGLE B
03 6354  00 3000          2.11DEG     8 ROLL ANGLE A
03 6355  00 3000          2.11DEG     9 ROLL ANGLE B
03 6356  00 0400          256         10 A-X A
03 6357  00 0400          256         11 A-X B
03 6360  00 0400          256         12 A-Y A
03 6361  00 0400          256         13 A-Y B
03 6362  00 0400          256         14 A-Z A
03 6363  00 0400          256         15 A-Z B
03 6364  00 0044          0.05DEG     16 LOC A 1.0V/DEG
03 6365  00 0044          0.05DEG     17 LOC B
03 6366  00 0044          0.05DEG     18 G/S A 2.85V/DEG
03 6367  00 0044          0.05DEG     19 G/S B
03 6370  00 0144          100         20 H.R. FINE A
03 6371  00 0144          100         21 H.R. FINE B
03 6372  00 0031          25          22 H.R. COARSE A
03 6373  00 0031          25          23 H.R. COARSE B
03 6374  00 2660          2.0DEG      24 CRS. ERR. L
03 6375  00 2660          2.0DEG      25 CRS. ERR. R
03 6376  00 1330          1.0DEG      26 AVG. AIL. A
03 6377  00 1330          1.0DEG      27 AVG. AIL. B
03 6400  00 1330          1.0DEG      28 AIL. RAM A
03 6401  00 1330          1.0DEG      29 AIL. RAM B
03 6402  01 3301          8.0DEG      30 AIL. S.A. A
03 6403  01 3301          8.0DEG      31 AIL. S.A. B
03 6404  00 1330          1.0DEG      32 AVG. ELV. A
03 6405  00 1330          1.0DEG      33 AVG. ELV. B
03 6406  00 1330          1.0DEG      34 ELV. RAM A
03 6407  00 1330          1.0DEG      35 ELV. RAM B
03 6410  01 3301          8.0DEG      36 ELV. S.A. A
03 6411  01 3301          8.0DEG      37 ELV. S.A. B
03 6412  00 1330          1.0DEG      38 RUD. RAM A
03 6413  00 1330          1.0DEG      39 RUD. RAM B
03 6414  01 3301          8.0DEG      40 RUD. S.A. A
03 6415  01 3301          8.0DEG      41 RUD. S.A. B
03 6416  00 0222          0.2DEG      42 RUD MOD A
03 6417  00 0222          0.2DEG      43 RUD MOD B
03 6420  00 0554          0.5DEG      44 HDG HOLD ERR.
```

1R19B SCAMP SECTION 4 PAGE 89

```
03 6421  00 7071          5.0DEG      45 FLAP POS.
03 6422  00 0200          128         46 CAPT COL.
03 6423  00 0200          128         47 CAPT WHL.
03 6424  00 0200          128         48 1ST OFC. COL.
03 6425  00 0200          128         49 1ST OFC. WHL.
03 6426  00 0554          0.5DEG      50 HDG. SEL. ERR.
03 6427  00 0000  FAIADR  0           DIAGNOSTIC NUMBERS
03 6430  00 1013          01013       1. RETRACT FLAPS, V
03 6431  00 2070          02070       2. A/P OFF, V
03 6432  00 3070          03070       3. Y/D OFF, V
03 6433  00 4071          04071       4. ILS NOT, V
03 6434  00 5072          05072       5. PUSH MAN TRIM
03 6435  00 6070          06070       6. PUSH HDG SELECT
03 6436  00 7070          07070       7. PUSH ALT HOLD
03 6437  01 0070          010070      8. PUSH ILS/LAND
03 6440  01 1070          011070      9. PUSH PITCH CWS
03 6441  01 2070          012070      10. PUSH DIS-ARM
03 6442  01 3073          013073      11. PUSH TO/GA
03 6443  01 4074          014074      12. ENG 1ST OFF F/D
03 6444  01 5074          015074      13. DIS - ENG F/D
```

-continued

```
03 6445  01 6074          016074          14. ENG CAPT F/D
03 6446  01 7074          017074          15. DIS-ENG F/D
03 6447  02 0074          020074          16. DISCRETE CHECKS
03 6450  02 1075          021075          17. THROUGH DIAG. NO.
03 6451  02 2047          022047          18. 56.
03 6452  02 3013          023013          19.
03 6453  02 4075          024075          20.
03 6454  02 5075          025075          21.
03 6455  02 6070          026070          22.
03 6456  02 7076          027076          23.
03 6457  03 0060          030060          24.
03 6460  03 1031          031031          25.
03 6461  03 2074          032074          26.
03 6462  03 3070          033070          27.
03 6463  03 4102          034102          28.
03 6464  03 5013          035013          29.
03 6465  03 6075          036075          30.
03 6466  03 7102          037102          31.
03 6467  04 0077          040077          32.
03 6470  04 1050          041050          33.
03 6471  04 2050          042050          34.
03 6472  04 3077          043077          35.
03 6473  04 4052          044052          36.
03 6474  04 5062          045062          37.
03 6475  04 6031          046031          38.
03 6476  04 7032          047032          39.
03 6477  05 0051          050051          40.
03 6500  05 1051          051051          41.
03 6501  05 2056          052056          42.
03 6502  05 3100          053100          43.
03 6503  05 4065          054065          44.
03 6504  05 5032          055032          45.
```

```
03 6505  05 6062          056062          46.
03 6506  05 7101          057101          47.
03 6507  06 0054          060054          48.
03 6510  06 1055          061055          49.
03 6511  06 2057          062057          50.
03 6512  06 3071          063071          51.
03 6513  06 4070          064070          52.
03 6514  06 5070          065070          53.
03 6515  06 6072          066072          54.
03 6516  06 7052          067052          55.
03 6517  07 0071          070071          56.
03 6520  07 1021          071021          57. YAW RT. A
03 6521  07 2021          072021          58. YAW RT. B
03 6522  07 3022          073022          59. PHI DOT A
03 6523  07 4022          074022          60. PHI DOT B
03 6524  07 5023          075023          61. THETA DOT A
03 6525  07 6023          076023          62. THETA DOT B
03 6526  07 7024          077024          63. THETA A
03 6527  10 0024          0100024         64. THETA B
03 6530  10 1025          0101025         65. PHI A
03 6531  10 2025          0102025         66. PHI B
03 6532  10 3026          0103026         67. ACC-X A
03 6533  10 4026          0104026         68. ACC-X B
03 6534  10 5027          0105027         69. ACC-Y A
03 6535  10 6027          0106027         70. ACC-Y B
03 6536  10 7030          0107030         71. ACC-Z A
03 6537  11 0030          0110030         72. ACC-Z B
03 6540  11 1031          0111031         73. LOC A
03 6541  11 2031          0112031         74. LOC B
03 6542  11 3032          0113032         75. G/S A
03 6543  11 4032          0114032         76. G/S B
03 6544  11 5033          0115033         77. H-RAD F A
03 6545  11 6033          0116033         78. H-RAD F B
03 6546  11 7033          0117033         79. H-RAD C A
03 6547  12 0033          0120033         80. H-RAD C B
```

```
1019B SCAMP                    SECTION      4        PAGE      90
```

-continued

```
03 6550  12 1034          0121034        81. CRS. ERR. L
03 6551  12 2034          0122034        82. CRS. ERR. R
03 6552  12 3035          0123035        83. AIL AVG A
03 6553  12 4035          0124035        84. AIL AVG B
03 6554  12 5036          0125036        85. AIL RAM A
03 6555  12 6036          0126036        86. AIL RAM B
03 6556  12 7037          0127037        87. AIL S.A. A
03 6557  13 0037          0130037        88. AIL S.A. A
03 6560  13 1040          0131040        89. ELV AVG A
03 6561  13 2040          0132040        90. ELV AVG B
03 6562  13 3041          0133041        91. ELV RAM A
03 6563  13 4041          0134041        92. ELV RAM B
03 6564  13 5042          0135042        93. ELV S/A A
03 6565  13 6042          0136042        94. ELV S/A B
03 6566  13 7043          0137043        95. RUD RAM A
03 6567  14 0043          0140043        96. RUD RAM B
03 6570  14 1044          0141044        97. RUD S/A A
```

```
1019B SCAMP                    SECTION      4        PAGE      91

03 6571  14 2044          0142044        98. RUD S/A B
03 6572  14 3045          0143045        99. RUD MOD A
03 6573  14 4045          0144045       100. RUD MOD B
03 6574  14 5012          0145012       101. PSI CLUTCHED
03 6575  14 6013          0146013       102. FLAPS
03 6576  14 7014          0147014       103. CAPT. COL
03 6577  15 0015          0150015       104. CAPT. WHEEL
03 6600  15 1016          0151016       105. 1ST OFC COL
03 6601  15 2017          0152017       106. 1ST OFC WHL
03 6602  15 3020          0153020       107. HDG SEL. ERROR
03 6603  15 4000          0154000       108. SPARE
03 6604  15 5044          0155044       109. RUD S/A A
03 6605  15 6044          0156044       110. RUD S/A B
03 6606  15 7042          0157042       111. ELV S/A A
03 6607  16 0042          0160042       112. ELV S/A B
03 6610  16 1037          0161037       113. AIL S/A A
03 6611  16 2037          0162037       114. AIL S/A B
03 6612  16 3013          0163013       115. FLAPS FAIL
03 6613  16 4104          0164104       116. Y/D ENG FAIL
03 6614  16 5104          0165104       117. Y/D I.D. FAIL B
03 6615  16 6104          0166104       118. Y/D I.D. FAIL A
03 6616  16 7104          0167104       119. CWS ENG FAIL
03 6617  17 0104          0170104       120. CMD I.D. FAIL
03 6620  17 1104          0171104       121. CWS I.D. FAIL
03 6621  17 2064          0172064       122. ILS TUNED
03 6622  17 3064          0173064       123. ILS TUNED I.D. FAIL
03 6623  17 4013          0174013       124. FLAPS OUT OF DET
03 6624  17 5013          0175013       125. FLAPS > 30 DEG
03 6625  17 6013          0176013       126. FLPAS /= 22 DEG
03 6626  17 7104          0177104       127. CMD ENG FAIL
03 6627  20 0246          0200246       128. RUDDER SERVO A
03 6630  20 1246          0201246       129. RUDDER SERVO B
03 6631  20 2246          0202246       130. RUDDER SERVO A
03 6632  20 3246          0203246       131. RUDDER SERVO B
03 6633  20 4246          0204246       132. RUD. PAR. SERVO A
03 6634  20 5246          0205246       133. RUD. PAR. SERVO B
03 6635  20 6246          0206246       134. RUD. PAR. SERVO A
03 6636  20 7246          0207246       135. RUD. PAR. SERVO B
03 6637  21 0246          0210246       136. RUD. PAR. SERVO A
03 6640  21 1246          0211246       137. RUD. PAR. SERVO B
03 6641  21 2013          0212013       138. FLAPS = 45 DEG
03 6642  21 3247          0213247       139. AIL SERVO A
03 6643  21 4247          0214247       140. AIL SERVO B
03 6644  21 5250          0215250       141. ELV SERVO A
03 6645  21 6250          0216250       142. ELV SERVO B
03 6646  21 7247          0217247       143. AIL SERVO A
03 6647  22 0247          0220247       144. AIL SERVO B
03 6650  22 1250          0221250       145. ELV SERVO A
03 6651  22 2250          0222250       146. ELV SERVO B
03 6652  22 3247          0223247       147. AIL SERVO A
03 6653  22 4247          0224247       148. AIL SERVO B
03 6654  22 5250          0225250       149. ELV SERVO A
```

```
1R198 SCAMP                                SECTION        4        PAGE       92

03 6655   22 0250            0226250         150. ELV SERVO B
03 6656   22 7104            0227104         151. CWS-CMD LEVER
03 6657   23 0245            0230245         152. Y/D INOP LIGHT
03 6660   23 1245            0231245         153. Y/D SWITCH
03 6661   23 2104            0232104         154. CMD DISC
03 6662   23 3104            0233104         155. CWS DISC
03 6663   23 4245            0234245         156. Y/D OFF DISC
03 6664   23 5013            0235013         157. FLAPS O.D. DISC
03 6665   23 6013            0236013         158. FLAPS>30 DISC
03 6666   23 7013            0237013         159. FLAP POSITION
03 6667   24 0244            0240244         160. F/D NOM FAIL
03 6670   24 1244            0241244         161. F/D DISP. FAIL
03 6671   24 2026            0242026         162. ACC-X A
03 6672   24 3026            0243026         163. ACC-X B
03 6673   24 4027            0244027         164. ACC-Y A
03 6674   24 5027            0245027         165. ACC-Y B
03 6675   24 6030            0246030         166. ACC-Z A
03 6676   24 7030            0247030         167. ACC-Z B
03 6677   25 0021            0250021         168. YAW RT A
03 6700   25 1021            0251021         169. YAW RT B
03 6701   25 2014            0252014         170. CAPT COL
03 6702   25 3014            0253014         171. CAPT COL
03 6703   25 4015            0254015         172. CAPT WHL
03 6704   25 5015            0255015         173. CAPT WHL
03 6705   25 6016            0256016         174. 1ST OFC COL
03 6706   25 7016            0257016         175. 1ST OFC COL
03 6707   26 0017            0260017         176. 1ST OFC WHL
03 6710   26 1017            0261017         177. 1ST OFC WHL
                 ****************************************

                  VALID FAIL MESSAGES

03 6711   00 0047  VALMSG   39             V.G.
03 6712   00 0050           40             LAU
03 6713   00 0051           41             YAW RATE
03 6714   00 0052           42             SPIN MOTOR
03 6715   00 0053           43             FMA
03 6716   00 0000           0              SPARE
03 6717   00 0053           43             FMA
03 6720   00 0000           0              SPARE
03 6721   00 0054           44             HEADING
03 6722   00 0024           20             PITCH
03 6723   00 0025           21             ROLL
03 6724   00 0007           7              AIR DATA
03 6725   00 0046           38             CWS HARD OVER
03 6726   00 0061           49             FLAPS NOT OUT OF DET.
03 6727   00 0062           50             RAD ALT
03 6730   00 0063           51             G/S
03 6731   00 0064           52             ILS NOT TUNED
03 6732   00 0065           53             ALT
03 6733   00 0066           54             TO/GA
03 6734   00 0067           55             LOC

1R198 SCAMP                                SECTION        4        PAGE       93

                 ********************************

                 BANK 0 EXECUTIVE CONSTANTS

03 6735   00 0001  INPCOD   1
03 6736   25 2525  RMODIV   R7381
03 6737   00 0003  RMODCK   3              0 OFF
03 6740   00 0006           6              1 GRD ROLL
03 6741   00 0011           9              2 ALIGN
03 6742   00 0014           12             3 LOC
03 6743   00 0017           15             4 VOR
03 6744   00 0022           18             5 HDG SEL
03 5745   00 0025           21             6 ROLL TOGA
03 6746   00 0030           24             7 A/S HOLD
```

BANK 0 EXECUTIVE CONSTANTS

-continued

```
03 6747  00 0033             27                8 MACH HOLD
03 6750  00 0036             30                9 SPARE
03 6751  00 0041             33                10 SPARE
03 6752  00 0042             34                11 SPARE
03 6753  00 0473   PMODPR    315
03 6754  23 5400   PMODCK    315.0*2**8        0 OFF
03 6755  11 6600             157.500*2**8      1 FLARE
03 6756  06 4400             105.000*2**8      2 G/S
03 6757  04 7300             78.750*2**8       3 ALT HLD
03 6760  03 7400             63.000*2**8       4 G/A
03 6761  03 2200             52.500*2**8       5 T/O
03 6762  02 5400             45.000*2**8       6 FPAMOD
03 6763  02 3540             39.375*2**8       7 CAS HOLD
03 6764  02 1400             35.000*2**8       8 MACH HOLD
03 6765  77 7777   TICKET    -0
03 6766  00 2000   TOGBIT    02000

           ********************************************

           PREFLIGHT CONSTANTS

03 6767  01 1751   DEGP7     7.0DEG
                   DEGP10    EQUALS DEG10
                   DEGM10    EQUALS DG10M
03 6770  00 1330   TSTLOC    1.0DEG            1 V
03 6771  00 0377   TSTGS     0.35DEG           1 V
03 6772  02 3420   TSTALT    10000             FEET
03 6773  32 6010   TSTIAS    704.49*2**4       418 KNTS
03 6774  00 4125   TSTHDT    2133              1000 FPM
03 6775  03 0032   TSTTAS    769.63*2**4       456 KNTS
03 6776  02 7676   TSTMCH    0.746*2**14       0.746 MACH
03 6777  00 6341   TSTACC    25.76*2**7
03 7000  77 3556   TSTYRT    -3.0DEG           -3 DEG/SEC
03 7001  02 2675   NUMCCN    02675             LASTK-034001
03 7002  03 7354   LASTK     037354
                   FIRSTK    EQUALS KRDUAL

                   NO REF:       ATOD77
```

```
NO REF:       ATOD76
NO REF:       ATOD66
NO REF:       ATOD65
NO REF:       ATOD64
NO REF:       ATOD63
NO REF:       ATOD62
NO REF:       ATOD61
NO REF:       ATOD60
NO REF:       ATOD59
NO REF:       ATOD58
NO REF:       ATOD57
NO REF:       ATOD56
NO REF:       ATOD55
NO REF:       ATOD42
NO REF:       ATOD37
NO REF:       ATOD33
NO REF:       ATOD31
NO REF:       ATOD30
NO REF:       ATOD23
NO REF:       ATOD22
NO REF:       ATOD21
NO REF:       ATOD20
NO REF:       ATOD19
NO REF:       ATOD12
NO REF:       ATOD15
NO REF:       ATOD14
NO REF:       ATOD11
```

PRIVLG 0200
****************************************

START-UP & CONTROL EXECUTIVE

MODIFY
ADR0
ALPOWR
ANSCK?
ANSWER
ASAVE
ATODIN
AUTENG
BITEPS
B0SAVE
B1SAVE
B2SAVE
B3SAVE
B4SAVE
B5SAVE
B6SAVE
B7SAVE
CKSUMF
CLKINT
DTDINP
DTOA05
DUOFFS
DUOFF1
EXTIN7
FAILNM
FAUPNM
FIRSTP
FLAPCM
FLSAVE
INFLG
MAKEIT
MKIT1A
MKIT1B
MKIT2A
MKIT2B
MSGCOD
MSGTIM
MSPENG
NPINDS
NPOWIN
OFFPAS
PFSTRT
PFTFLG
PFTOGF
PLTMSG

POWERI
POWFLG
POWIFL
RUDC1B
SERBUF
SRPOWR
STACK1
SUMTIM
TSAVE
VARIDX
VSELIN

REFER
ATOD17
ATOD19
BIT12

```
                        BIT15
                        CABBUF
                        CALPIN
                        CH7INT
                        DISCT3
                        DTOAOT
                        D1000
                        FAILJP
                        GOBTRT
                        INPCOD
                        MODE
                        NOTICK
                        PLIM1
                        PLOTER
                        PSAVE
                        RUDC1A
                        SERBFA
                        STACK2
                        TICKET
                        TIMECA
                        TOGBIT

00 0200   50 3477   STRTUP  TIL     077
00 0201   50 2515           EXTI    13
00 0202   50 7201           R(1)=29
00 0203   36 0035
00 0204   50 7343           SETSR   3
00 0205   70 0061   STRTP1  C=49
00 0206   50 1006
00 0207   12 0005           DTOA05=DTOA05:XOR:TOGBIT
00 0210   53 6760
00 0211   44 0005
00 0212   50 2702           EXFOV   2
00 0213   50 1102           PUFIN   2,N,0116,ATODIN
00 0214   00 1531
00 0215   00 1414
```

```
00 0216   50 1202           BUFOUT 2,N,014,DTOAOT
00 0217   03 2013
00 0220   33 2000
00 0221   50 4000           L=C
00 0222   63 0221           IF      L:/=10   THEN LOK=1
00 0223   73 0205           BJP     STRTP1
00 0224   50 5001           SKIP    1
00 0225   34 0227           GO      LOK+2
00 0226   34 0355           GO      TKILL+3
00 0227   40 2540           PLTMSG=0
00 0230   50 7300           CLRSR
00 0231   12 1373           IF      POWIFL:=10 THEN NORSTT
00 0232   61 0274
00 0233   01 1375           INCRM   NPOWIN
00 0234   50 7343           SETSR   3
00 0235   70 0001           POWFLG=1
00 0236   44 2500
00 0237   50 7300           CLRSR
00 0240   12 1374           IF      PSAVE:<:PLIM1 THEN NORSTT
00 0241   02 1370
00 0242   67 0274
00 0243   50 4216           L=L+2A-14
00 0244   61 0247           IF      L:=10    THEN PFTCHK
00 0245   40 1373           POWIFL=0
00 0246   34 0355           GO      TKILL+3
00 0247   50 7343   PFTCHK  SETSR   3
00 0250   12 2527           IF      PFTFLG:/=10 THEN NORSTT
00 0251   63 0274
00 0252   12 0257           IF      MSPENG:<=10 THEN NORSTT
00 0253   61 0274
00 0254   67 0274
```

```
00 0255  12 0260          IF     AUTENG1<=10 THEN CWSTST
00 0256  61 0265
00 0257  67 0265
00 0260  50 7300          CLRSR
00 0261  12 1435          L=ATOD17*2*5
00 0262  50 4005
00 0263  65 1252          IF     L1>=10   THEN POWRST
00 0264  50 7343          SETSR  3
00 0265  40 0250  CWSTST  AUTENG=0
00 0266  50 7300          CLRSR
00 0267  12 1437          L=ATOD19*2*5
00 0270  50 4005
00 0271  65 1252          IF     L1>=10   THEN POWRST
00 0272  50 7343          SETSR  3
00 0273  40 0257          MSPENG=0
00 0274  50 7343  NORSTT  SETSR  3
00 0275  72 0024          OFFPAS=20
00 0276  44 2512
00 0277  40 2527          PFTFLG=0
00 0300  40 2530          PFSTRT=0
00 0301  36 0062          B=50
```

```
00 0302  41 2406          FAILNM(B)=0
00 0303  73 0302          BJP    LCK-1
00 0304  70 7776          FLAPCM=-1
00 0305  44 2570
00 0306  70 0220          FNTALK RUDC1A
00 0307  50 6100          CPAL
00 0310  71 1107          ADDALK RUDC1B
00 0311  44 2520          DUOFFS=L
00 0312  71 7776          DUOFF1=L-1
00 0313  44 2521
00 0314  40 2532          PFTOGF=0
00 0315  44 2515          CKSUMF=L
00 0316  50 6400          CLRFL  0
00 0317  50 7300          CLRSR
00 0320  40 1373          POWIFL=0
00 0321  12 1356          L=FAILJP
00 0322  36 0177          B=0177
00 0323  45 0000          ADR0(B)=L
00 0324  73 0323          BJP    LCK-1
00 0325  12 1360          CLKINT=TIMECA
00 0326  44 0016
00 0327  12 1362          POWERI=CALPIN
00 0330  44 0012
00 0331  12 1364          EXTIN7=CH7INT
00 0332  44 0116
00 0333  12 1366          PITEPS=GCBTRT
00 0334  44 0026
00 0335  12 1367          STACK1=STACK2
00 0336  44 1413
00 0337  50 7343          SETSR  3
00 0340  70 0000          C=0
00 0341  50 1000
00 0342  40 0312          MKIT2A=0
00 0343  40 1201          MKIT2B=0
00 0344  70 7777          MKIT1A=-0
00 0345  44 0311
00 0346  44 1200          MKIT1B=L
00 0347  44 2511          MAKEIT=L
00 0350  40 2474          INFLG=0
00 0351  50 3003          PIL    03
00 0352  50 3040  TKILL   PIL    040
00 0353  50 5001          SKIP   1
00 0354  34 0352          GO     TKILL
00 0355  50 1400          IOSTP
00 0356  55 0357          IJP    LCK+1
00 0357  06 0000          060000
```

```
                        ****************************************
                        CLOCK INTERUPT ANSWER ROUTINE

00 0360   00 0000   ANSCLK   SUBRTN
00 0361   75 0413            PUSHI   STACK1,ANSCLK
00 0362   42 0414
00 0363   72 0415
00 0364   32 1413
00 0365   50 7340
00 0366   45 0000
00 0367   47 0001
00 0370   50 7540
00 0371   45 0004
00 0372   47 0005
00 0373   50 2400
00 0374   00 0413
00 0375   47 0002
00 0376   45 0003
00 0377   12 0017
00 0400   45 0010
00 0401   50 7300
00 0402   12 0360
00 0403   10 0415
00 0404   50 7340
00 0405   45 0006
00 0406   47 0007
00 0407   50 7300
00 0410   37 0011
00 0411   42 1413
00 0412   34 0416
00 0413   50 7300
00 0414   00 0000
00 0415   52 7200
00 0416   70 7777             FNTALK  =0
00 0417   50 5100             SKPNFL  0
00 0420   71 7776             ADDALK  =1
00 0421   50 5101             SKPNFL  1
00 0422   71 7775             ADDALK  =2
00 0423   50 5102             SKPNFL  2
00 0424   71 7773             ADDALK  =4
00 0425   50 5103             SKPNFL  3
00 0426   71 7767             ADDALK  =8
00 0427   50 5104             SKPNFL  4
00 0430   71 7757             ADDALK  =16
00 0431   50 5105             SKPNFL  5
00 0432   71 7737             ADDALK  =32
00 0433   50 5106             SKPNFL  6
00 0434   71 7677             ADDALK  =64
00 0435   50 5107             SKPNFL  7
00 0436   71 7577             ADDALK  =128
```

```
00 0437   32 1413             B=STACK1
00 0440   45 0000             ADR0(B)=L
00 0441   37 0001             B=B+1
00 0442   42 1413             STACK1=B
00 0443   50 7343             SETSR   3
00 0444   50 7201             ENTICR  1
00 0445   12 2474             IF      INFLG1=10 THEN INKEEP
00 0446   61 0620
00 0447   40 2474             INFLG=0
00 0450   70 0036             C=30
00 0451   50 1000
00 0452   76 0711             CALL    TKCHEK    TICKET CHECKS
00 0453   50 3040             RIL     040
00 0454   57 2512             ISK     OFFPAS
00 0455   30 1351             ICALL   CLRCOM    INITIALIZATION
00 0456   76 3360             CALL    DSCRET    DISCRETE PROCESSING
```

```
00 0457  30 1347          ICALL  SENMNA   MONITORING & A/D SCALING
00 0460  76 2166          CALL   SERINC   SERIAL INPUT & CONV.
00 0461  76 1024          CALL   MAPCNT
00 0462  76 2345          CALL   EAMCNT   END-AROUND CHECKS
00 0463  30 1355          ICALL  THRUST
00 0464  50 2702          EXFOV  2        RESET FOR A/DS AND D/AS
00 0465  76 0703          CALL   STATIN
00 0466  50 6403          CLRFL  3
00 0467  40 2517          VARIDX=0
00 0470  30 1346          ICALL  EXC1A
00 0471  50 6503          SETFL  3
00 0472  12 2520          VARIDX=DUOFFS
00 0473  44 2517
00 0474  30 1346          ICALL  EXC1B
00 0475  76 1004          CALL   STATCK
00 0476  30 1350          ICALL  OUTRDY   LOAD & MONITOR OUTPUT
00 0477  76 1014          CALL   DAOUTP
00 0500  76 2410          CALL   MCDISC   DISCRETE & DISPLAY
00 0501  30 1354          ICALL  TLOCIN   PRE-FLIGHT TIMING
00 0502  30 1353          ICALL  SRMCDL   SERVO MODELING
00 0503  76 2155          CALL   DIGBUF   LOAD PLOTTER OUTPUT BUFFER
00 0504  50 3740          SIL    040
00 0505  57 2513          ISK    SUMTIM
00 0506  34 0514          GO     CHKPFT
00 0507  70 0023          SUMTIM=19
00 0510  44 2513
00 0511  50 3040          RIL    040
00 0512  76 2140          CALL   SUMCHK    ONCE/SECOND
00 0513  50 3740          SIL    040
00 0514  12 2530  CHKPFT  IF     PFSTRT1/=10 THEN CLKOUT
00 0515  63 0525
00 0516  12 2527          IF     PFTFLG1=10 THEN CLKOUT
00 0517  61 0525
00 0520  44 2530          PFSTRT=L
00 0521  50 0000          NOOP            IJP BITADD
00 0522  50 0000  BITADD  NOOP            0200400
```

```
00 0523  50 3040  PFTSTR  RIL    040      BITE RETURN
00 0524  30 1352          ICALL  PREFLT    START PREFLIGHT
00 0525  50 3740  CLKOUT  SIL    040
00 0526  50 7340          SETSR  0
00 0527  32 1413          B=STACK1-1
00 0530  37 7776
00 0531  42 1413          STACK1=B
00 0532  13 0000          L=ADR0(B)
00 0533  50 6400          CLRFL  0
00 0534  50 6401          CLRFL  1
00 0535  50 6402          CLRFL  2
00 0536  50 6403          CLRFL  3
00 0537  50 6404          CLRFL  4
00 0540  50 6405          CLRFL  5
00 0541  50 6406          CLRFL  6
00 0542  50 6407          CLRFL  7
00 0543  50 5707          SKPALO 7
00 0544  50 6507          SETFL  7
00 0545  50 5706          SKPALO 6
00 0546  50 6506          SETFL  6
00 0547  50 5705          SKPALO 5
00 0550  50 6505          SETFL  5
00 0551  50 5704          SKPALO 4
00 0552  50 6504          SETFL  4
00 0553  50 5703          SKPALO 3
00 0554  50 6503          SETFL  3
00 0555  50 5702          SKPALO 2
00 0556  50 6502          SETFL  2
00 0557  50 5701          SKPALO 1
00 0560  50 6501          SETFL  1
00 0561  50 5700          SKPALO 0
```

```
00 0562  50 5500          SETFL  0
00 0563  50 7300          PULLI  STACK1
00 0564  32 1413
00 0565  37 7766
00 0566  42 1413
00 0567  50 7340
00 0570  13 0004
00 0571  11 0005
00 0572  50 7400
00 0573  13 0006
00 0574  11 0002
00 0575  50 2600
00 0576  00 0616
00 0577  13 2010
00 0600  44 0017
00 0601  13 0003
00 0602  11 0027
00 0603  50 7300
00 0604  44 0614
00 0605  46 0612
00 0606  50 7340
```

```
00 0607  13 0000
00 0610  11 0001
00 0611  50 7300
00 0612  50 7220
00 0613  32 0617
00 0614  50 7300
00 0615  54 0616
00 0616  00 0000
00 0617  00 0000

                  ****************************************************

                  TIMER

00 0620  70 0001  INKEEP  INFLG=1
00 0621  44 2474
00 0622  50 1502          INSTP  2
00 0623  50 1102          PUFIN  2,N,0116,ATODIN
00 0624  00 1531
00 0625  00 1414
00 0626  12 2511          MAKEIT=MAKEIT!OR!INPCOD
00 0627  51 6735
00 0630  44 2511
00 0631  50 1607          OUTSTP 7
00 0632  50 1507          INSTP  7
00 0633  50 2707          EXFOV  7
00 0634  50 2507          EXT1   7
00 0635  70 0022          C=18
00 0636  50 1000
00 0637  34 0525          GO     CLKOUT
                  ***************************************

                   BITE PASS RETURN INITIALIZATION

00 0640  50 3474  BITERT  TIL    074
00 0641  50 7300          CLRSR
00 0642  36 0177          B=0177
00 0643  12 1356          L=FAILJP
00 0644  45 0000          ADR0(B)=L
00 0645  73 0644          BJP    LCK-1
00 0646  12 1360          CLKINT=TIMECA
00 0647  44 0016
00 0650  12 1362          POWERI=CALPIN
00 0651  44 0012
00 0652  12 1364          EXTIN7=CH7INT
```

```
00 0653   44 0116
00 0654   12 1366          RITEPS=GCBTRT
00 0655   44 0006
00 0656   50 7343          SETSR   3
00 0657   70 0002          C=2
00 0660   50 1000
```

```
00 0661   34 0523          GO      PFTSTR

                   ****************************

                   SERIAL DATA INPUT

00 0662   00 0040  SERINP  SUBRTN
00 0663   50 1001          OUTSTP  1
00 0664   50 1501          INSTP   1
00 0665   50 3101          INBA    1
00 0666   02 4740          IF      L!=!SERBFA THEN EXFOV1
00 0667   61 0673
00 0670   50 3201          OUTBA   1
00 0671   50 0060          IF      L!=!U    THEN SERIN1
00 0672   61 0674
00 0673   50 2701  EXFOV1  EXFOV   1        RESET INPUT
00 0674   50 1101  SERIN1  BUFIN   1,N,0226,SERBUF
00 0675   00 1757
00 0676   03 1532
00 0677   50 1201          BUFOUT  1,N,0234,CABBUF
00 0700   03 3111
00 0701   03 2656
00 0702   55 0662          RETURN  SERINP
                   ************************************

                    STATE INFORMATION INTERFACE
                            BETWEEN DUAL AND SINGLE COMPUTATIONS

00 0703   00 0030  STATIN  SUBRTN
00 0704   32 2521          B=DUOFF1
00 0705   13 0220  STATI1  RUDC1B(B)=RUDC1A(B)
00 0706   45 1107
00 0707   73 0705          BJP     STATI1
00 0710   55 0703          RETURN  STATIN



                   ***************************************

                   TICKET CHECKS CH. A

00 0711   00 0000  TKCHEK  SUBRTN
00 0712   50 0400          ENTA    MKIT1A
00 0713   03 0311
00 0714   60 0716          JPAUZ   LCK+2
00 0715   76 2000          CALL    FAILIT
00 0716   64 0720          JPAUP   LCK+2
00 0717   76 2000          CALL    FAILIT
00 0720   63 0722          JPALNZ  LCK+2
00 0721   76 2000          CALL    FAILIT
00 0722   67 0724          JPALNG  LCK+2
00 0723   76 2000          CALL    FAILIT
```

```
00 0724   02 6765          CMAL    TICKET
00 0725   65 0727          JPMGR   LCK+2
00 0726   64 0730          JPMLEQ  LCK+2
00 0727   76 2000          CALL    FAILIT
```

-continued

```
00 0730  50 0001          XCNGUL
00 0731  61 0733          JPALZ  LCK+2
00 0732  76 2000          CALL   FAILIT
00 0733  65 0735          JPALP  LCK+2
00 0734  76 2000          CALL   FAILIT
00 0735  62 0737          JPAUNZ LCK+2
00 0736  76 2000          CALL   FAILIT
00 0737  66 0741          JPAUNG LCK+2
00 0740  76 2000          CALL   FAILIT
00 0741  02 2514          CMAL   NCTICK
00 0742  62 0744          JPNOT  LCK+2
00 0743  60 0745          JPEQ   LCK+2
00 0744  76 2000          CALL   FAILIT
00 0745  50 0400          ENTA   MKIT1B      CH. B
00 0746  03 1200
00 0747  62 0755          JPAUNZ FAIL1C
00 0750  66 0755          JPAUNG FAIL1C
00 0751  65 0755          JPALP  FAIL1C
00 0752  02 2514          CMAL   NCTICK
00 0753  64 0755          JPMLEQ FAIL1C
00 0754  66 0756          JPMGR  LCK+2
00 0755  76 2000  FAIL1C  CALL   FAILIT
00 0756  71 0000          ADDALK 0
00 0757  63 0755          JPALNZ FAIL1C
00 0760  50 0201          XFRUL
00 0761  10 1200          ENTAU  MKIT1B
00 0762  60 0755          JPAUZ  FAIL1C
00 0763  64 0755          JPAUP  FAIL1C
00 0764  67 0755          JPALNG FAIL1C
00 0765  02 6765          CMAL   TICKET
00 0766  60 0755          JPEQ   FAIL1C
00 0767  62 0771          JPNOT  LCK+2
00 0770  76 2000          CALL   FAILIT

00 0771  12 2511  SNGLCH  ENTAL  MAKEIT      SINGLE CHANNEL TASK LIST
00 0772  61 0755          JPALZ  FAIL1C
00 0773  71 0000          ADDALK 0
00 0774  63 0755          JPALNZ FAIL1C
00 0775  40 0311          STRZ   MKIT1A
00 0776  40 1200          STRZ   MKIT1B
00 0777  40 2511          STRZ   MAKEIT
00 1000  70 7777          ENTALK -0
00 1001  44 0312          STRAL  MKIT2A
00 1002  44 1201          STRAL  MKIT2B
00 1003  55 0711          RETURN TKCHEK
                  ****************************************

                   COMPUTER STATE INFORMATION CHECKS
```

```
00 1004  00 0000  STATCK  SUBRTN
00 1005  32 2521          B=DUOFF1
00 1006  13 0220  STATC1  IF     RUDC1A(B)I=IRUDC1B(B)  THEN STATC2
00 1007  03 1107
00 1010  61 1012
00 1011  76 2000          CALL   FAILIT
00 1012  73 1006  STATC2  BJP    STATC1
00 1013  55 1004          RETURN STATCK


                  ********************************************

                   D/A OUTPUT

00 1014  00 0000  DAOUTP  SUBRTN
00 1015  50 1202          BUFOUT 2,N,014,DTOAOT
00 1016  03 2013
```

```
                    D/A OUTPUT

00 1017  03 2000
00 1020  12 2511          MAKEIT=MAKEIT+040
00 1021  71 0040
00 1022  44 2511
00 1023  55 1014          RETURN DAOUTP
                   **************************************

                    MAINTENANCE ASSESSMENT PANEL CONTROL

00 1024  00 0000   MAPCNT SUBRTN
00 1025  12 0077          IF     MODE:/=:0 THEN MAPCN1
00 1026  63 1040
00 1027  40 3112          MSGCOD=0
00 1030  40 2536          ANSCK?=0
00 1031  40 2405          FAUPNM=0
00 1032  40 2404          FIRSTP=0
00 1033  40 2535          MSGTIM=0
00 1034  12 2527          IF     PFTFLG:=:0 THEN MAPCXT
00 1035  61 1150
00 1036  50 3477          TIL    077
00 1037  34 0200          GO     STRTUP   CLEAR PREFLIGHT
00 1040  67 1075   MAPCN1 IF     L:<:0    THEN LSTFAL
00 1041  71 7776          L=L-1
00 1042  63 1110          IF     L:/=:0   THEN MONFAL
00 1043  12 2143          L=DISCT3:AND:BIT12  NOSE OLEO A
00 1044  52 4426
00 1045  61 1056          IF     L:=:0    THEN MAPCN2
00 1046  12 2143          L=DISCT3:AND:BIT15  NOSE OLEO B
00 1047  52 4431
00 1050  61 1056          IF     L:=:0    THEN MAPCN2
00 1051  12 2527          IF     PFTFLG:/=:0 THEN MAPCXT
00 1052  63 1150
00 1053  70 0001          PFTFLG=1
```

```
00 1054  44 2527
00 1055  34 1150          GO     MAPCXT
00 1056  12 2527   MAPCN2 IF     PFTFLG:/=:0 THEN STRTUP
00 1057  63 0200
00 1060  12 2536   MAPCN3 IF     ANSCK?:/=:0 THEN MAPCN4
00 1061  63 1070
00 1062  70 0260          MSGCOD=176
00 1063  44 3112
00 1064  44 2536          ANSCK?=L
00 1065  70 0144          MSGTIM=100
00 1066  44 2535
00 1067  34 1150          GO     MAPCXT
00 1070  57 2535   MAPCN4 ISK    MSGTIM
00 1071  34 1150          GO     MAPCXT
00 1072  72 7777   MAPCN5 MSGCOD=-0
00 1073  44 3112
00 1074  34 1150          GO     MAPCXT
00 1075  12 2536   LSTFAL IF     ANSCK?:/=:0 THEN MAPCN7
00 1076  63 1105
00 1077  40 0076   MAPCN6 ANSWER=0
00 1100  76 4262          CALL   FAILUP
00 1101  12 2404          IF     FIRSTP:=:0 THEN MAPCN5
00 1102  61 1072
00 1103  44 2536          ANSCK?=L
00 1104  34 1150          GO     MAPCXT
00 1105  12 0076   MAPCN7 IF     ANSWER:=:0 THEN MAPCXT
00 1106  61 1150
00 1107  34 1077          GO     MAPCN6
00 1110  57 2535   MONFAL ISK    MSGTIM
00 1111  34 1150          GO     MAPCXT
00 1112  12 2406          IF     FAILNM:=:FAUPNM THEN MAPCN8
00 1113  02 2405
```

-continued

```
00 1114   61 1120
00 1115   70 0144           MSGTIM=100
00 1116   44 2535
00 1117   34 1147           GO      MAPCN9+1
00 1120   50 7300   MAPCN8  CLRSR
00 1121   12 1375           L=NPOWIN
00 1122   50 7343           SETSR  3
00 1123   02 2541           IF      L:=:NPINDS THEN MAPC10
00 1124   61 1137
00 1125   44 2541           NPINDS=L
00 1126   02 4662           IF      L:<:D1000 THEN LOK+2
00 1127   67 1131
00 1130   70 1747           L=999
00 1131   76 3333           CALL    INTGR3
00 1132   70 3261           MSGCOD=03261
00 1133   44 3112
00 1134   70 0144           MSGTIM=100
00 1135   44 2535
00 1136   34 1150           GO      MAPCXT
00 1137   12 2540   MAPC10  IF      PLTMSG:=:0 THEN MAPCN9
```

```
00 1140   61 1146
00 1141   44 3112           MSGCOD=L
00 1142   40 2540           PLTMSG=0
00 1143   70 0144           MSGTIM=100
00 1144   44 2535
00 1145   34 1150           GO      MAPCXT
00 1146   40 2404   MAPCN9  FIRSTP=0
00 1147   76 4262           CALL    FAILUP
00 1150   55 1024   MAPCXT  RETURN MAPCNT

                    ****************************************

                    DIGITAL TO DIGITAL COMMUNICATION
                    LINK TO SIMULATION COMPUTER:
                    (CALLED FROM INTERRUPT)

00 1151   00 0000   DIGINT  SUBRTN
00 1152   50 1107           BUFIN  7,N,040,DTDINP
00 1153   03 0063
00 1154   03 3024
00 1155   50 1207           BUFOUT 7,N,020,PLUTER
00 1156   03 2575
00 1157   03 2556
00 1160   50 2517           EXTI   017
00 1161   54 1151           INTRTN DIGINT

                    ************************************

                    POWER INTERRUPT HANDLING

00 1162   00 7000   POWINT  SUBRTN
00 1163   50 3477           TIL     077
00 1164   50 1400           IOSTP
00 1165   75 1371           STRSR  SRPOWR
00 1166   44 1372           ALPOWR=L
00 1167   12 1373           IF      POWFL:/=:0 THEN SKPSAV
00 1170   63 1250
00 1171   12 1372           L=ALPOWR
00 1172   50 0600           ASAVE=A
00 1173   00 1376
00 1174   50 7500           TSAVE=T
00 1175   50 0600
00 1176   00 1400
00 1177   50 0000           NOOP            STRICR ICRSAV
00 1200   12 1371           L=SRPOWR
00 1201   50 0000           NOOP            STRAL SRSAVE
00 1202   50 0000           NOOP            ENTAL POWINT
```

-continued

POWER INTERRUPT HANDLING

```
00 1203  44 1374           PSAVE=L
00 1204  50 7200           B0SAVE=B(0)
00 1205  42 1402
00 1206  50 7201           B1SAVE=B(1)
00 1207  42 1403
```

```
00 1210  50 7202           B2SAVE=B(2)
00 1211  42 1404
00 1212  50 7203           B3SAVE=B(3)
00 1213  42 1405
00 1214  50 7204           B4SAVE=B(4)
00 1215  42 1406
00 1216  50 7205           B5SAVE=B(5)
00 1217  42 1407
00 1220  50 7206           B6SAVE=B(6)
00 1221  42 1410
00 1222  50 7207           B7SAVE=B(7)
00 1223  42 1411
00 1224  70 7777           L=-0
00 1225  50 5100           SKPNFL 0
00 1226  71 7776           L=L-1
00 1227  50 5101           SKPNFL 1
00 1230  71 7775           L=L-2
00 1231  50 5102           SKPNFL 2
00 1232  71 7773           L=L-4
00 1233  50 5103           SKPNFL 3
00 1234  71 7767           L=L-8
00 1235  50 5104           SKPNFL 4
00 1236  71 7757           L=L-16
00 1237  50 5105           SKPNFL 5
00 1240  71 7737           L=L-32
00 1241  50 5106           SKPNFL 5
00 1242  71 7677           L=L-64
00 1243  50 5107           SKPNFL 7
00 1244  71 7577           L=L-128
00 1245  44 1412           FLSAVE=L
00 1246  70 0001           POWIFL=1         113.4 MICROSEC
00 1247  44 1373
00 1250  36 3202  SKPSAV   B=1666
00 1251  73 1251           HJP     LCK=0
```

******************************

POWER INTERRUPT RESTART ROUTINE

```
00 1252  12 1412  POWRST   L=FLSAVE
00 1253  50 6400           CLRFL  0
00 1254  50 6401           CLRFL  1
00 1255  50 6402           CLRFL  2
00 1256  50 6403           CLRFL  3
00 1257  50 6404           CLRFL  4
00 1260  50 6405           CLRFL  5
00 1261  50 6406           CLRFL  6
00 1262  50 6407           CLRFL  7
00 1263  50 5707           SKPALU 7
00 1264  50 6507           SETFL  7
00 1265  50 5706           SKPALU 6
00 1266  50 6506           SETFL  6
00 1267  50 5705           SKPALU 5
00 1270  50 6505           SETFL  5
00 1271  50 5704           SKPALU 4
00 1272  50 6504           SETFL  4
```

-continued

POWER INTERRUPT RESTART ROUTINE

```
00 1273   50 5703          SKPALO 3
00 1274   50 6503          SETFL  3
00 1275   50 5702          SKPALO 2
00 1276   50 6502          SETFL  2
00 1277   50 5701          SKPALO 1
00 1300   50 6501          SETFL  1
00 1301   50 5700          SKPALO 0
00 1302   50 6500          SETFL  0
00 1303   50 7207          B(7)=B7SAVE
00 1304   50 7207
00 1305   32 1411
00 1306   50 7206          B(6)=B6SAVE
00 1307   50 7206
00 1310   32 1410
00 1311   50 7205          B(5)=B5SAVE
00 1312   50 7205
00 1313   32 1407
00 1314   50 7204          B(4)=B4SAVE
00 1315   50 7204
00 1316   32 1406
00 1317   50 7203          B(3)=B3SAVE
00 1320   50 7203
00 1321   32 1405
00 1322   50 7202          B(2)=B2SAVE
00 1323   50 7202
00 1324   32 1404
00 1325   50 7201          B(1)=B1SAVE
00 1326   50 7201
00 1327   32 1403
00 1330   50 7200          B(0)=B0SAVE
00 1331   50 7200
```

```
00 1332   32 1402
00 1333   70 0051          C=49
00 1334   50 1000
00 1335   50 7200   ICRSAV  ENTICR 0
00 1336   50 0400          T=TSAVE
00 1337   00 1400
00 1340   50 7400
00 1341   12 1376          A=ASAVE
00 1342   40 1373          POWIFL=0
00 1343   50 7300   SRSAVE  ENTSR  0
00 1344   50 3003          RIL    03
00 1345   50 0000          NOOP          INTRTN PSAVE
```

```
                    ********************************

                    INDIRECT SUBROUTINE CALLS

00 1346   01 0227   EXC1A   #EXEC1A
                    EXC1B   EQUALS EXC1A
00 1347   02 4346   SENMNA  #SENSRM
00 1350   02 4000   OUTRDY  #OUTSET
00 1351   02 4633   CLRCCM  #INZCLR
00 1352   02 4300   PREFLT  #PFT
00 1353   02 4743   SRMODL  #SERMOD
00 1354   02 1275   TLOCIN  #TLOC
00 1355   01 6717   THRUST  #THRSTR

                    NO REF:       VSELIN
```

```
                        LIMREF
                  ******************************

                  INTERRUPT ENTRANCE INITIALIZATION


                        REFER
                  STACK

 ØØ 1356   3Ø 1357  FAILJP  ICALL  FAILØ      FAILURE CODE
 ØØ 1357   ØØ 2ØØØ  FAILØ   @FAILIT
 ØØ 136Ø   3Ø 1361  TIMECA  ICALL  RTINAD     REAL TIME INTERRUPT
 ØØ 1361   ØØ Ø36Ø  RTINAD  @ANSCLK
 ØØ 1362   3Ø 1363  CALPIN  ICALL  POWIAD    POWER INTERRUPT
 ØØ 1363   ØØ 1152  POWIAD  @POWINT
 ØØ 1364   3Ø 1365  CH7INT  ICALL  DIGIN7    CH.7 EXT. INT.
 ØØ 1365   ØØ 1151  DIGIN7  @DIGINT
 ØØ 1366   5Ø ØØØØ  GOBTRT  NOOP             GO BITERT

                  OTHER BANK CONSTANTS

 ØØ 1367   Ø3 3152  STACK2  Ø,STACK          STACK POINTER INITIALIZATION
 ØØ 137Ø   ØØ Ø347  PLIM1   Ø347
```

```
                        LIMMOD
                  ******************************

                  BANK Ø VARIABLES


                        REFER
                  STACK

 ØØ 1371   5Ø 73ØØ  SRPOWR  Ø5Ø73ØØ
 ØØ 1372   ØØ ØØØØ  ALPOWR  Ø
 ØØ 1373   ØØ ØØØØ  POWIFL  Ø
 ØØ 1374   ØØ ØØØØ  PSAVE   Ø
 ØØ 1375   ØØ ØØØØ  NPOWIN  Ø
 ØØ 1376   ØØ ØØØØ  ASAVE   Ø                A REGISTER
 ØØ 1377   ØØ ØØØØ          Ø
 ØØ 14ØØ   ØØ ØØØØ  TSAVE   Ø                TEMP REGISTER
 ØØ 14Ø1   ØØ ØØØØ          Ø
 ØØ 14Ø2   ØØ ØØØØ  BØSAVE  Ø
 ØØ 14Ø3   ØØ ØØØØ  B1SAVE  Ø
 ØØ 14Ø4   ØØ ØØØØ  B2SAVE  Ø
 ØØ 14Ø5   ØØ ØØØØ  B3SAVE  Ø
 ØØ 14Ø6   ØØ ØØØØ  B4SAVE  Ø
 ØØ 14Ø7   ØØ ØØØØ  B5SAVE  Ø
 ØØ 141Ø   ØØ ØØØØ  B6SAVE  Ø
 ØØ 1411   ØØ ØØØØ  B7SAVE  Ø
 ØØ 1412   ØØ ØØØØ  FLSAVE  Ø                HARDWARE FLAGS
 ØØ 1413   Ø3 3152  STACK1  Ø,STACK
                    ADRØ    EQUALS Ø
                    ADR1    EQUALS 1
                    ADR2    EQUALS 2
                    CLKINT  EQUALS Ø16
                    POWERI  EQUALS Ø12
                    EXTIN7  EQUALS Ø114
                    BITEPS  EQUALS 6
```

LIMMOD

```
*****************************************

INPUT BUFFERS (A/D - SERIAL)

00 1414  00 0000  ATODIN  0
00 1415  00 0000  ATODI1  0
00 1416  00 0000  ATODI2  0
00 1417  00 0000  ATODI3  0
00 1420  00 0000  ATODI4  0
00 1421  00 0000  ATODI5  0
00 1422  00 0000  ATODI6  0
00 1423  00 0000  ATODI7  0
00 1424  00 0000  ATODI8  0
00 1425  00 0000  ATODI9  0
00 1426  00 0000  ATOD10  0
00 1427  00 0000  ATOD11  0
00 1430  00 0000  ATOD12  0
00 1431  00 0000  ATOD13  0
00 1432  00 0000  ATOD14  0
00 1433  00 0000  ATOD15  0
00 1434  00 0000  ATOD16  0
00 1435  00 0000  ATOD17  0
00 1436  00 0000  ATOD18  0
00 1437  00 0000  ATOD19  0
00 1440  00 0000  ATOD20  0
00 1441  00 0000  ATOD21  0
00 1442  00 0000  ATOD22  0
00 1443  00 0000  ATOD23  0
00 1444  00 0000  ATOD24  0
00 1445  00 0000  ATOD25  0
00 1446  00 0000  ATOD26  0
00 1447  00 0000  ATOD27  0
00 1450  00 0000  ATOD28  0
00 1451  00 0000  ATOD29  0
00 1452  00 0000  ATOD30  0
00 1453  00 0000  ATOD31  0
00 1454  00 0000  ATOD32  0
00 1455  00 0000  ATOD33  0
00 1456  00 0000  ATOD34  0
00 1457  00 0000  ATOD35  0
00 1460  00 0000  ATOD36  0
00 1461  00 0000  ATOD37  0
00 1462  00 0000  ATOD38  0
00 1463  00 0000  ATOD39  0
00 1464  00 0000  ATOD40  0
00 1465  00 0000  ATOD41  0
00 1466  00 0000  ATOD42  0
00 1467  00 0000  ATOD43  0
00 1470  00 0000  ATOD44  0
00 1471  00 0000  ATOD45  0
00 1472  00 0000  ATOD46  0
```

```
00 1473  00 0000  ATOD47  0
00 1474  00 0000  ATOD48  0
00 1475  00 0000  ATOD49  0
00 1476  00 0000  ATOD50  0
00 1477  00 0000  ATOD51  0
00 1500  00 0000  ATOD52  0
00 1501  00 0000  ATOD53  0
00 1502  00 0000  ATOD54  0
00 1503  00 0000  ATOD55  0
00 1504  00 0000  ATOD56  0
00 1505  00 0000  ATOD57  0
00 1506  00 0000  ATOD58  0
00 1507  00 0000  ATOD59  0
00 1510  00 0000  ATOD60  0
00 1511  00 0000  ATOD61  0
00 1512  00 0000  ATOD62  0
```

-continued

```
00 1513   00 0000  ATOD63  0
00 1514   00 0000  ATOD64  0
00 1515   00 0000  ATOD65  0
00 1516   00 0000  ATOD66  0
00 1517   00 0000  ATOD67  0
00 1520   00 0000  ATOD68  0
00 1521   00 0000  ATOD69  0
00 1522   00 0000  ATOD70  0
00 1523   00 0000  ATOD71  0
00 1524   00 0000  ATOD72  0
00 1525   00 0000  ATOD73  0
00 1526   00 0000  ATOD74  0
00 1527   00 0000  ATOD75  0
00 1530   00 0000  ATOD76  0
00 1531   00 0000  ATOD77  0
                   ATODM1  EQUALS STACK1

00 1532   00 0000  SERBUF  RESERV 150
```

```
                           PRIVLG 02000
                   **************************************

                   COMPUTER INTERRUPT FAILURES


                           MODIFY
                   DTOACT
                   DTOA03
                   FAUPNM
                   FIRSTP
                   IDXTMP
                   MSGCOD
                   MSGC01
                   MSGC02
                   MSGC03
                   MSGC04
                   WORDNO

                           REFER
                   BIT11
                   BIT12
                   EAFLAG
                   EATHRF
                   FAILNM

OPEN SUBROUTINES

00 2000   00 0000  FAILIT  SUBRTN
00 2001   50 3477          TIL    077
00 2002   52 7343          SETSR  3
00 2003   34 2011          GO     COMPTR
00 2004   55 2000          RETURN FAILIT


                   ******************************************

                   FAILURE REPORTING

00 2005   00 0000  FAISEN  SUBRTN
00 2006   50 3477          TIL    077
00 2007   12 2475          IF     EAFLAG:/=10 THEN FAILEA
00 2010   63 2054
00 2011   72 2010  COMPTR  L=A              COMP, FAIL
00 2012   76 1324  PRNTFL  CALL   FAILST
00 2013   70 7777          FIRSTP==0
00 2014   44 2434
```

```
00 2015  12 2406          FAUPNM=FAILNM-1
00 2016  71 7776
00 2017  44 2405
00 2020  76 4262          CALL   FAILUP
00 2021  50 2207  PRNTF1  SKPOIN 7
00 2022  34 2021          GO     LCK-1
00 2023  50 2107          SKPIIN 7
00 2024  34 2023          GO     LCK-1
00 2025  57 3435          TIL    035
00 2026  50 2707          EXFOV  7
00 2027  50 2507          EXTI   7
00 2030  50 2400          WTFI
00 2031  50 2207          SKPOIN 7
00 2032  34 2031          GO     LCK-1

00 2033  50 1400  CLROUT  IOSTP
00 2034  36 0013          B=11
00 2035  41 3000          DTOAOT(B)=0      CLEAR OUTPUTS
00 2036  73 2035          BJP    LCK-1
00 2037  12 4425          DTOA03=BIT11+BIT12
00 2040  14 4426
00 2041  44 2003
00 2042  50 2702          EXFOV  2
00 2043  50 1202          BUFOUT 2,W,014,DTOAOT
00 2044  03 0013
00 2045  03 3000
00 2046  50 2202
00 2047  34 2046
00 2050  50 2201          SKPOIN 1
00 2051  34 2050          GO     LCK-1
00 2052  55 2053          IJP    LCK+1
00 2053  06 0000          050000

          ****************************************

00 2054  36 0013  FAILEA  B=11
00 2055  70 0001          IDXTMP=1
00 2056  44 2310
00 2057  13 2300  CHKNXT  IF     EATHRF(B):=:0 THEN FALCHK
00 2060  61 2056
00 2061  42 2537          WORDNO=B
00 2062  57 2510          ISK    IDXTMP
00 2063  34 2066          GO     FALCHK
00 2064  70 0011          L=9
00 2065  34 2012          GO     PRNTFL
00 2066  73 2057  FALCHK  BJP    CHKNXT
00 2067  36 0000          B=0
00 2070  12 2537          L=WORDNO/10
00 2071  50 7112
00 2072  61 2076          IF     L:=:0    THEN FALCH1
00 2073  71 2060          MSGC01=L+02060
```

```
00 2074  44 3113
00 2075  36 0001          B=1
00 2076  50 0201  FALCH1  MSGC01(B)=L,U+02060
00 2077  71 2050
00 2100  45 3113
00 2101  70 1521          MSGC02(B)=01521
00 2102  45 3114
00 2103  70 1000          MSGC03(B)=01000
00 2104  45 3115
00 2105  70 1107  FALCH2  MSGC00=01107
00 2106  44 3112
00 2107  34 2021          GO     PRNTF1
00 2110  55 2005          RETURN FAISEN

          NO REF:     MSGC04
```

```
                              SECTOR
                       ****************************************************

                       SENSOR MONITORING FAILURE
                       ANNUNICATION


                              MODIFY
                       INFLAG
                       MONVLD

                              REFER
                       BIT0ON

 00 2111   00 0000   INMONF   SUBRTN
 00 2112   12 2516            IF      INFLAG:/=:0 THEN LOK+2
 00 2113   63 2115
 00 2114   76 2305            CALL    FAISEN
 00 2115   70 0021            L=17
 00 2116   50 0007            IF      L:/=:8   THEN LOK+2
 00 2117   63 2121
 00 2120   36 0016            B=14
 00 2121   70 0022            L=18
 00 2122   50 0007            IF      L:/=:8   THEN LOK+2
 00 2123   63 2125
 00 2124   36 0021            B=17
 00 2125   13 4434            MONVLD=BIT0ON(B):AND:MONVLD
 00 2126   52 0304
 00 2127   44 0304
 00 2130   40 2516            INFLAG=0
 00 2131   50 0203            L=B-11
 00 2132   71 7764
 00 2133   65 2135            IF      L:>=:0   THEN LOK+2
 00 2134   71 0001            L=L+1
 00 2135   71 0033            L=L+27
 00 2136   76 4324            CALL    FAILST
 00 2137   55 2111            RETURN INMONF
```

```
                              SECTOR
                       ****************************************

                       CHECK - SUM


                              MODIFY
                       CKSUMF

                              REFER
                       FIRSTK
                       LASTK
                       NUMCON

 00 2140   00 0000   SUMCHK   SUBRTN
 00 2141   12 2515            IF      CKSUMF:=:0 THEN SUMFAI
 00 2142   61 2152
 00 2143   40 2515            CKSUMF=0
 00 2144   32 7001            B=NUMCON
 00 2145   70 0000            L=0
 00 2146   15 4000            L=L+FIRSTK(B)
 00 2147   73 2146            BJP     LCK-1
 00 2150   02 7002            IF      L:=:LASTK THEN SUMFAI+1
 00 2151   61 2153
 00 2152   76 2000   SUMFAI   CALL    FAILIT
 00 2153   44 2515            CKSUMF=L
 00 2154   55 2140            RETURN SUMCHK
```

```
                        SECTOR

                   ***************************************************************

                   VARIOUS SINGLE CHANNEL FUNCTIONS

                   ****************************************************

                   PARALLEL DIGITAL OUTPUT DATA

                        MODIFY
                   PLOTER
                   TEMP1

                        REFER
                   ADR0
                   PLTADR

00 2155  00 0000  DIGBUF  SUBRTN          LOAD OUTPUT BUFFER
00 2156  36 0007          B=7
00 2157  42 1776  DIGBF1  TEMP1=B
00 2160  33 0014          B=PLTADR(B)
00 2161  13 0030          L=ADR0(B)
00 2162  32 1776          B=TEMP1
00 2163  45 2556          PLOTER(B)=L
00 2164  73 2157          BJP    DIGBF1
00 2165  55 2155          RETURN DIGBUF
```

```
                        SECTOR
                   *******************************************

                   SERIAL INPUT CONVERSION
                   FOR AIR DATA, AND SERIAL
                   OUTPUT DATA END - AROUND
                   CHECK.

                        MODIFY
                   ADFGCN
                   ALTNCR
                   DISOKF
                   MAKEIT
                   PLTMSG
                   SEACNT
                   SEAFCT
                   SEAFLG
                   SEAPNT
                   SERBUF
                   TRYCNT

                        REFER
                   ADADDT
                   AIDCON
                   AIRMSK
                   D149
                   PFTFLG

00 2166  00 0000  SERINC  SUBRTN
00 2167  70 0005          SEACNT=5
00 2170  44 2503
00 2171  36 0000          B=0
00 2172  50 6401          CLRFL  1
00 2173  13 1532  LOPAIR  A=SERBUF(B)
00 2174  63 2176          IF     L:/=10   THEN LOK+2
00 2175  60 2245          IF     U:=10    THEN INPUT
00 2176  50 4703          A=A*2^3
```

```
 1H198 SCAMP                                SECTION        13        PAGE       122
INDIRECTS
```

-continued

```
00 2177   50 5700            IF      A,0=0     THEN ENDACK
00 2200   34 2332
00 2201   66 2234            IF      U:<:0     THEN NXTWAD
00 2202   50 5500            SKPEVN            PARITY CHECK
00 2203   34 2234            GO      NXTWAD
00 2204   50 5706            IF      A,6=1     THEN NXTWAD
00 2205   34 2207
00 2206   34 2234
00 2207   50 4703            A=A*2^3           BINARY WORD
00 2210   66 2214            IF      U:<:0     THEN SERIN1
00 2211   50 5700            IF      A,0=0     THEN GDWORD
00 2212   34 2216
00 2213   34 2234            GO      NXTWAD     NOT GOOD WORD (INVALID)


 1H198 SCAMP                                SECTION        13        PAGE       123
INDIRECTS

00 2214   50 5700   SERIN1   IF      A,0=0     THEN NXTWAD BAD WORD
00 2215   34 2234
00 2216   50 4212   GDWORD   L=L*2^-10
00 2217   52 4504            L=L:AND:AIRMSK
00 2220   50 7202            B(2)=L
00 2221   50 2202
00 2222   13 4456            IF      ADACDT(B):<:0 THEN NXTWAD-1
00 2223   67 2233
00 2224   50 0202            B=L
00 2225   50 0201            L=U+AIDCON(B)*2^2
00 2226   25 4667
00 2227   50 4702
00 2230   47 0207            ALTNCR(B)=U
00 2231   70 0120            ADFGCN(B)=80
00 2232   45 2077
00 2233   50 7201            ENTICR 1
00 2234   70 0000   NXTWAD   L=0
00 2235   50 0200            U=L
00 2236   50 0700            SERBUF(B)=A
00 2237   00 1532
00 2240   37 0001            B=B+1
00 2241   56 4511            BSK     D149
00 2242   34 2173            GO      LCPAIR
00 2243   76 0662            CALL    SERINP
00 2244   34 2252            GO      INPSKP
00 2245   50 5101   INPUT    IF      F,1=1     THEN INPSKP
00 2246   34 2252
00 2247   76 0662            CALL    SERINP
00 2250   50 5501            SETFL   1
00 2251   34 2173            GO      LCPAIR
00 2252   12 2527   INPSKP   IF      PFTFLG:/=:0 THEN XITARN
00 2253   63 2315
00 2254   36 0010            B=8
00 2255   13 2077   CHKNAD   ADFGCN(B)=ADFGCN(B)-1
00 2256   71 7776
00 2257   45 2077
00 2260   67 2321            IF      L:<:0     THEN FAIRDT
00 2261   73 2255            BJP     CHKNAD
00 2262   12 2503            L=SEACNT-3
00 2263   71 7774
00 2264   65 2275            IF      L:>=:0    THEN SEAOK
00 2265   12 2501            IF      SEAFLG:=:0 THEN ADCK1
00 2266   61 2305
00 2267   12 2502            IF      SEAPNT:/=:0 THEN ADCK1
00 2270   63 2305
00 2271   70 0001            SEAPNT=1
00 2272   44 2502
00 2273   76 4324            CALL    FAILST
00 2274   34 2305            GO      ADCK1
00 2275   70 0024   SEAOK    SEAFCT=20
00 2276   44 2504
00 2277   40 2501            SEAFLG=0
```

```
 1R198 SCAMP                                  SECTION        13         PAGE        124
INDIRECTS

 20 2300   12 2502          IF      SEAPNT:=10 THEN ADCK1
 20 2301   61 2305
 20 2302   40 2502          SEAPNT=0
 20 2303   70 0005          PLTMSG=5
 20 2304   44 2540
 20 2305   57 2505  ADCK1   ISK     TRYCNT
 00 2306   34 2315          GO      XITARN
 20 2307   12 2506          IF      DISCKF:=10 THEN XITARN-1
 20 2310   61 2314
 30 2311   70 0006          PLTMSG=6
 20 2312   44 2540
 20 2313   40 2506          DISOKF=0
 20 2314   50 6400          CLRFL
 20 2315   12 2511  XITARN  MAKEIT=MAKEIT+4
 20 2316   71 0004
 20 2317   44 2511
 20 2320   55 2166          RETURN SERINC
 00 2321   12 2506  FAIRDT  IF      DISCKF:/=10 THEN LOK+3
 20 2322   63 2325
 00 2323   70 0007          L=7
 00 2324   76 4324          CALL    FAILST
 00 2325   50 6500          SETFL
 00 2326   70 0024          TRYCNT=20
 20 2327   44 2505
 20 2330   44 2506          DISOKF=L
 00 2331   34 2315          GO      XITARN

                    ************************************

                    SERIAL END - AROUND CHECK

 00 2332   64 2336  ENDACK  IF      U:>=10    THEN LOK+4
 00 2333   50 5500          SKPEVN
 00 2334   34 2336          GO      LOK+2
 20 2335   34 2234          GO      NXTWAD
 30 2336   57 2503          ISK     SEACNT
 30 2337   34 2234          GO      NXTWAD
 00 2340   57 2504          ISK     SEAFCT
 30 2341   34 2234          GO      NXTWAD
 00 2342   70 0001          SEAFLG=1
 20 2343   44 2501
 00 2344   34 2234          GO      NXTWAD

 1R198 SCAMP                                  SECTION        14         PAGE        125
INDIRECTS

                            SECTOR

                    ****************************************************

                    ENDAROUND MONITORING



                            MODIFY
                    EAFLAG
                    EATHRF
                    MAKEIT
                    TEMPB3

                            REFER
                    ATOD56
                    DTOADT


 20 2345   20 0000  EAMONT  SUBRTN
 00 2346   36 0013          B=11
 20 2347   50 7300  EANXT1  CLRSR
 00 2350   13 1504          L=ATOD56(B)+2^6+2^-8
 00 2351   50 4606
 00 2352   50 4210
 20 2353   50 7343          SETSR  3
```

-continued

```
00 2354  44 2472          TEMPB3=L
00 2355  13 0000          L=DTOADT(8)*2A8*2A-8+TEMPB3
00 2356  50 4610
00 2357  50 4210
00 2360  14 2472
00 2361  50 0301          ABSVAL
00 2362  71 7757          L=L-16
00 2363  67 2401          IF     L:<:0    THEN EAMON1
00 2364  70 0005          EAFLAG=5
00 2365  44 2475
00 2366  11 2306          IF     U,EATHRF(8):/=:0 THEN EAMON2
00 2367  62 2371
00 2370  34 2372          GO     LCK+2
00 2371  50 2200  EAMON2  U=L
00 2372  71 7776          EATHRF(8)=L-1
00 2373  45 2306
00 2374  67 2400          IF     L:<:0    THEN EAFAIL
00 2375  63 2402          IF     L:/=:0   THEN EAMON1+1
00 2376  50 6100          EATHRF(8)=-L
00 2377  45 2306
00 2400  76 2005  EAFAIL  CALL   FAISEN
00 2401  41 2306  EAMON1  EATHRF(8)=0
00 2402  73 2347          BJP    EANXT1
00 2403  40 2475          EAFLAG=0
00 2404  12 2511          MAKEIT=MAKEIT+0200
00 2405  71 0200
```

```
00 2406  44 2511
00 2407  55 2345          RETURN EAMONT
```

```
                          SECTOR
                  *****************************************

                  CHECK FOR ESSENTIAL VALIDS
                  OR DISCRETES


                          MODIFY
                  ARMMSG
                  CMDNOT
                  CWSCNT
                  CWSNOT
                  LATFLD
                  LATMSG
                  MAKEIT
                  MODMSG
                  PBLINK
                  PBLKTI
                  RBLINK
                  RBLKTI
                  THRMSG
                  VRTFLD
                  VRTMSG

                          REFER
                  ARMMES
                  AUTENG
                  BITSET
                  BIT00
                  BIT01
                  BIT02
                  BIT03
                  BIT04
```

-continued

```
                    BIT05
                    BIT06
                    BIT07
                    BIT08
                    BIT11
                    BIT12
                    BIT13
                    BIT14
                    BIT15
                    BIT16
                    BLANKS
                    BLKMSK
                    COLCAP
                    COL1ST
                    CMD
                    CWS
                    CWSPHD
                    CWSRHD
                    DISCH0
```

```
                    DISCH1
                    DISCH2
                    DISCH3
                    DISCH4
                    DISCT0
                    DUALFG
                    FLTDIR
                    FOUR
                    LATMES
                    LNDFLG
                    LSB8
                    MAN
                    MAPMES
                    MONVLD
                    MSPENG
                    OFFLAT
                    OFFPIT
                    PCPFLG
                    PITENG
                    PLANDA
                    RCPFLG
                    RLANDA
                    ROLENG
                    SEVEN
                    THREE
                    THRMOD
                    THROTL
                    TWO
                    WHLCAP
                    WHL1ST
                    YDENGF

00 2410   00 0000  MODSC1  SUBRTN
20 2411   12 2310          ENTAL   DUALFG
20 2412   63 2424          JPALNZ  VALCK1
90 2413   12 0263          ENTAL   RCLENG
30 2414   61 2417          JPALZ   LCK+3
20 2415   71 7774          ADDALK  -3
20 2416   67 2423          JPALNG  LCK+5
00 2417   12 0265          ENTAL   PITENG
30 2420   61 2424          JPALZ   LCK+4
30 2421   71 7775          ADDALK  -2
00 2422   65 2424          JPALP   LCK+2
00 2423   76 4755          CALL    ALLMOD
20 2424   12 0305  VALCK1  ENTAL   YDENGF
30 2425   14 0265          ADDAL   PITENG
```

```
 18198 SCAMP                          SECTION       15       PAGE      128
INDIRECTS
```

-continued

```
 20 2426   14 0263           ADDAL  RCLFNG
 30 2427   14 0264           ADDAL  PLANDA
 00 2430   14 0262           ADDAL  RLANDA
 20 2431   36 0000           ENTBK  0
 20 2432   61 2465           JPALZ  VALFL1+1

 18198 SCAMP                          SECTION       15       PAGE      129
INDIRECTS

 20 2433   36 0001           ENTBK  1
 00 2434   12 2146           ENTAL  DISCH0   V.G. VALID A
 00 2435   52 4432           SLCL   BIT16
 20 2436   61 2464           JPALZ  VALFL1
 00 2437   12 2152           ENTAL  DISCH4   V.G. VALID B
 20 2440   52 4426           SLCL   BIT12
 20 2441   61 2464           JPALZ  VALFL1
 00 2442   12 2150           ENTAL  DISCH2   GYRO EXC. VALID A
 00 2443   52 4414           SLCL   BIT02
 20 2444   61 2464           JPALZ  VALFL1
 00 2445   12 2150           ENTAL  DISCH2   GYRO EXC. VALID B
 20 2446   52 4425           SLCL   BIT11
 00 2447   61 2464           JPALZ  VALFL1
 00 2450   36 0002           ENTBK  2
 20 2451   12 2150           ENTAL  DISCH2   L.A.U. VALID A
 00 2452   52 4422           SLCL   BIT08
 20 2453   61 2464           JPALZ  VALFL1
 20 2454   12 2150           ENTAL  DISCH2   L.A.U. VALID B
 00 2455   52 4415           SLCL   BIT03
 30 2456   61 2464           JPALZ  VALFL1
 30 2457   36 0000           ENTBK  0
 00 2460   12 0304           ENTAL  MCNVLD
 30 2461   50 6100           CPAL
 00 2462   52 4375           SLCL   LSB8
 00 2463   61 2471           JPALZ  VALCK2
 00 2464   76 4720   VALFL1  CALL   YDFFAL
 30 2465   76 4713           CALL   YDFAIL
 20 2466   76 4726           CALL   FDFAIL
 30 2467   76 4347           CALL   VALFAL
 30 2470   34 2703           JP     MPDISP
 20 2471   36 0000   VALCK2  ENTBK  0
 00 2472   12 0305           ENTAL  YDENGF
 20 2473   61 2513           JPALZ  VALFL2+1
 30 2474   36 0003           ENTBK  3
 20 2475   12 2147           ENTAL  DISCH1   YAW RATE VALID A
 20 2476   52 4420           SLCL   BIT06
 20 2477   61 2512           JPALZ  VALFL2
 00 2500   12 2147           ENTAL  DISCH1   YAW RATE VALID B
 00 2501   52 4431           SLCL   BIT15
 20 2502   61 2512           JPALZ  VALFL2
 00 2503   36 0004           ENTBK  4
 00 2504   12 2146           ENTAL  DISCH0   MOTOR SPEED A
 20 2505   52 4431           SLCL   BIT15
 00 2506   61 2512           JPALZ  VALFL2
 00 2507   12 2147           ENTAL  DISCH1   MOTOR SPEED B
 00 2510   52 4412           SLCL   BIT00
 30 2511   63 2515           JPALNZ VALCK3
 00 2512   76 4720   VALFL2  CALL   YDFFAL
 00 2513   76 4713           CALL   YDFAIL
 30 2514   76 4347           CALL   VALFAL
 20 2515   36 0000   VALCK3  ENTBK  0
 20 2516   12 0261           ENTAL  FLTDIR

 18198 SCAMP                          SECTION       15       PAGE      130
INDIRECTS

 20 2517   61 2524           JPALZ  VALFL3
 20 2520   50 0000           NOOP
 20 2521   50 0000           NOOP            F.M.A. VALID
 20 2522   50 0000           NOOP
 30 2523   34 2526           JP     VALCK4
```

```
1819B SCAMP                                        SECTION    15    PAGE    130
INDIRECTS
```

-continued

```
00 2524  76 4726  VALFL3  CALL    FCFAIL
00 2525  76 4347          CALL    VALFAL
00 2526  36 0000  VALCK4  ENTBK   0
00 2527  12 0257          ENTAL   MSPENG
00 2530  61 2613          JPALZ   VALFL4+2
00 2531  12 2146          ENTAL   DISCH0
00 2532  10 2140          ENTAU   DISCT0
00 2533  50 0000          NOOP            JPAUNGLOK+2
00 2534  50 0000          NOOP            JPALPVALFL4-1
00 2535  52 4427          SLCL    BIT13
00 2536  61 2607          JPALZ   VALFL4-2
00 2537  12 0310          ENTAL   DUALFG
00 2540  63 2565          JPALNZ  VALC4P
00 2541  36 0015          ENTBK   13
00 2542  12 0202          ENTAL   WHLCAP
00 2543  14 0204          ADDAL   WHL1ST
00 2544  50 0301          ABSVAL
00 2545  02 4534          CMAL    CWSRHO
00 2546  64 2557          JPMLEQ  CWSFLQ
00 2547  12 0203          ENTAL   CCLCAP
00 2550  14 0205          ADDAL   CCL1ST
00 2551  50 0301          ABSVAL
00 2552  02 4535          CMAL    CWSPHO
00 2553  64 2557          JPMLEQ  CWSFLQ
00 2554  70 0012          ENTALK  10
00 2555  44 2160          STRAL   CWSCNT
00 2556  34 2560          JP      LCK+2
00 2557  57 2160  CWSFLQ  ISK     CWSCNT
00 2560  34 2562          JP      LCK+2
00 2561  34 2607          JP      VALFL4-2
00 2562  76 4420          CALL    AIRCCK
00 2563  50 5101          SKPNFL  1
00 2564  34 2607          JP      VALFL4-2
00 2565  12 0260  VALC4P  ENTAL   AUTENG
00 2566  61 2613          JPALZ   VALFL4+2
00 2567  12 2146          ENTAL   DISCH0  MANUAL TRIM
00 2570  52 4430          SLCL    BIT14
00 2571  61 2607          JPALZ   VALFL4-2
00 2572  50 0000          NOOP    ENTBK6
00 2573  50 0000          NOOP            ENTALDISCH2 P.P.S. VALID
00 2574  50 0000          NOOP            SLCLBIT15
00 2575  50 0000          NOOP            JPALZVALFL4
00 2576  50 0000          NOOP            ENTBK7
00 2577  50 0000          NOOP            ENTALDISCH2 F.M.A. VALID
00 2600  50 0000          NOOP            SLCLBIT14
00 2601  50 0000          NOOP            JPALZVALFL4
00 2602  50 0000          NOOP            ENTBK8
```

```
1819B SCAMP                                        SECTION    15    PAGE    131
INDIRECTS
```

```
00 2603  50 0000          NOOP            ENTALDISCH2 S.P. VALID
00 2604  50 0000          NOOP            SLCLBIT00
00 2605  50 0000          NOOP            JPALNZVALCK5
00 2606  34 2615          JP      VALCK5
00 2607  70 0001          ENTALK  1
00 2610  44 0307          STRAL   CWSNOT
00 2611  70 0001  VALFL4  ENTALK  1
00 2612  44 0276          STRAL   CPDNOT
00 2613  76 4733          CALL    CPFAIL
00 2614  76 4347          CALL    VALFAL
00 2615  12 0310  VALCK5  ENTAL   DUALFG
00 2616  61 2666          JPALZ   VALCK7
00 2617  12 0275          ENTAL   LNDFLG
00 2620  61 2641          JPALZ   VALCK6
00 2621  36 0012          ENTBK   10
00 2622  12 2146          ENTAL   DISCH0  PITCH 2 AND 3 AGREE
00 2623  52 4412          SLCL    BIT00
00 2624  63 2630          JPALNZ  LCK+4
00 2625  12 2146          ENTAL   DISCH0  PITCH 1 AND 2 AGREE
```

-continued

```
00 2626   52 4421            SLCL    BIT07
00 2627   61 2637            JPALZ   VALFL5
00 2630   36 0013            ENTBK   11
00 2631   12 2146            ENTAL   DISCH0    ROLL 1 AND 2 AGREE
00 2632   52 4422            SLCL    BIT08
00 2633   63 2641            JPALNZ  VALCK6
00 2634   12 2151            ENTAL   DISCH3    ROLL 2 AND 3 AGREE
00 2635   52 4416            SLCL    BIT04
00 2636   63 2641            JPALNZ  VALCK6
00 2637   76 4742  VALFL5    CALL    LNDFAL
00 2640   76 4347            CALL    VALFAL
00 2641   12 0310  VALCK6    ENTAL   DUALFG
00 2642   61 2666            JPALZ   VALCK7
00 2643   76 4155            CALL    ACONGD
00 2644   50 5101            SKPNFL  1
00 2645   34 2660            JP      VALC6P
00 2646   36 0017            ENTBK   15
00 2647   12 2146            ENTAL   DISCH0    RAD. ALT. A
00 2650   52 4416            SLCL    BIT04
00 2651   61 2664            JPALZ   VALFL6
00 2652   12 2147            ENTAL   DISCH1    RAD. ALT. B
00 2653   52 4413            SLCL    BIT01
00 2654   61 2664            JPALZ   VALFL6
00 2655   76 4632            CALL    RAMCHK    RAD. ALT MON.
00 2656   50 5101            SKPNFL  1
00 2657   34 2664            JP      VALFL6
00 2660   36 0016  VALC6P    ENTBK   14
00 2661   12 2151            ENTAL   DISCH3    FLAPS D.D.
00 2662   52 4427            SLCL    BIT13
00 2663   63 2666            JPALNZ  VALCK7
00 2664   76 4742  VALFL6    CALL    LNDFAL
00 2665   76 4347            CALL    VALFAL
00 2666   12 0262  VALCK7    ENTAL   RLANDA    ROLL ARM CHECK
```

```
00 2667   61 2675            JPALZ   LCK+6
00 2670   71 7773            ADDALK  -4
00 2671   63 2674            JPALNZ  LCK+3
00 2672   50 0000            NOOP              CALL VORCHK
00 2673   34 2675            JP      LCK+2
00 2674   76 4543            CALL    LATCHK
00 2675   32 0263            ENTB    ROLENG
00 2676   31 5013            ICALLB  RENGTB
00 2677   32 0264            ENTB    PLANDA
00 2700   31 5022  VALCK8    ICALLB  PARMTB
00 2701   32 0265            ENTB    PITENG
00 2702   31 5026  VALCK9    ICALLB  PENGTB

                   ***************************************************
                      MODE PROGRESS DISPLAYS


00 2703   70 0111  MPDISP    ENTALK  MAN
00 2704   10 0257            IF      U,MSPENG:<=:0 THEN MANCK1
00 2705   60 2710
00 2706   66 2710
00 2707   70 0112            ENTALK  CWS
00 2710   10 0250  MANCK1    IF      U,AUTENG:<=:0 THEN MANCK2
00 2711   60 2714
00 2712   66 2714
00 2713   70 0110            ENTALK  CMD
00 2714   02 2546  MANCK2    IF      L:=:MODMSG THEN ROLCK1
00 2715   61 2722
00 2716   44 2546            MODMSG=L
00 2717   10 4413            U=TWO
00 2720   36 0042            B=34
00 2721   76 3237            CALL    ANMESS    MAN/CMD MODE
```

-continued

```
                              MODE PROGRESS DISPLAYS

00 2722  12 0263  ROLCK1  IF      ROLENG:/=:0 THEN RMSGCP
00 2723  63 2730
00 2724  10 0257          IF      U,MSPENG:/=:0 THEN RMSGCP
00 2725  62 2730
00 2726  72 6074          ENTALK OFFLAT
00 2727  34 2732          GO      RMSGCK
00 2730  50 4601  RMSGCP  L=L*2A1
00 2731  71 6007          ADDALK LATMES
00 2732  02 2545  RMSGCK  IF      L:=:LATMSG THEN RBLNK?
00 2733  61 2743
00 2734  44 2545          LATMSG=L
00 2735  36 0030          B=24
00 2736  10 4414          U=FOUR
00 2737  76 3237          CALL    ANMESS   LATERAL MESSAGE
00 2740  40 2547          RBLINK=0
00 2741  70 0020          RBLKTI=16
00 2742  44 2554
00 2743  12 0273  RBLNK?  IF      RCPFLG:=:0 THEN ROFFCK
00 2744  61 2766
```

```
00 2745  57 2554          ISK     RBLKTI
00 2746  34 2770          GO      MPDIS1
00 2747  12 2547          IF      RBLINK:/=:0 THEN ONROLL
00 2750  63 2754
00 2751  70 0004          RBLINK=4
00 2752  44 2547
00 2753  34 2756          GO      ONROLL+2
00 2754  40 2547  ONROLL  RBLINK=0
00 2755  70 0020          L=16
00 2756  44 2554          RBLKTI=L
00 2757  36 0010          B=8
00 2760  13 2626  RBLNKT  LATFLD(B)=LATFLD(B):XOR:BLKMSK
00 2761  53 4536
00 2762  45 2626
00 2763  73 2764          BJP     LCK+1
00 2764  73 2760          BJP     RBLNKT
00 2765  34 2770          GO      MPDIS1
00 2766  12 2547  ROFFCK  IF      RBLINK:/=:0 THEN ONROLL
00 2767  63 2754
00 2770  12 0265  MPDIS1  IF      PITENG:/=:0 THEN PMSGCP
00 2771  63 3002
00 2772  10 0310          IF      U,DUALFG:/=:0 THEN PBLANK
00 2773  62 3000
00 2774  10 0257          IF      U,MSPENG:/=:0 THEN PMSGCP
00 2775  52 3002
00 2776  70 6005          ENTALK OFFPIT
00 2777  34 3004          GO      PMSGCK
00 3000  70 5757  PBLANK  ENTALK BLANKS
00 3001  34 3004          GO      PMSGCK
00 3002  50 4601  PMSGCP  L=L*2A1
00 3003  71 5763          ADDALK MAPMES
00 3004  02 2544  PMSGCK  IF      L:=:VRTMSG THEN PBLNK?
00 3005  61 3015
00 3006  44 2544          VRTMSG=L
00 3007  36 0050          B=40
00 3010  10 4501          U=THREE
00 3011  76 3237          CALL    ANMESS   VERTICAL MESSAGE
00 3012  40 2550          PBLINK=0
00 3013  70 0020          PBLKTI=16
00 3014  44 2553
00 3015  12 0274  PBLNK?  IF      PCPFLG:=:0 THEN POFFCK
00 3016  61 3040
00 3017  57 2553          ISK     PBLKTI
00 3020  34 3042          GO      MPDIS2
00 3021  12 2550          IF      PBLINK:/=:0 THEN ONPITC
```

```
   1819B SCAMP                               SECTION      15      PAGE     133
  INDIRECTS
```

-continued

```
00 3022  63 3026
00 3023  70 0004          PBLINK=4
00 3024  44 2550
00 3025  34 3030          GO      ONPITC+2
00 3026  40 2550  ONPITC  PBLINK=0
00 3027  70 0020          L=16
00 3030  44 2553          PBLKTI=L
```

```
   1819B SCAMP                               SECTION      15      PAGE     134
  INDIRECTS

00 3031  36 0006          B=6
00 3032  13 2646  PBLNKT  VRTFLD(B)=VRTFLD(B):XOR:BLKMSK
00 3033  53 4536
00 3034  45 2646
00 3035  73 3036          BJP     LOK+1
00 3036  73 3032          BJP     PBLNKT
00 3037  34 3042          GO      MPDIS2
00 3040  12 2550  POFFCK  IF      PBLINK:/=:0 THEN ONPITC
00 3041  63 3026
00 3042  70 0044  MPDIS2  L=36
00 3043  12 0310          IF      U.DUALFG:/=:0 THEN ARMDIS
00 3044  62 3105
00 3045  12 0252          IF      RLANDA:=:0 THEN MPDIS3
00 3046  61 3053
00 3047  71 7773          L=L-4
00 3050  36 0011          B=9
00 3051  61 3064          IF      L:=:0     THEN MPDIS5
00 3052  34 3060          GO      MPDIS4
00 3053  36 0000  MPDIS3  B=0
00 3054  12 0263          IF      ROLENG:=:0 THEN MPDIS5
00 3055  61 3064
00 3056  71 7773          L=L-4
00 3057  65 3064          IF      L:>=:0    THEN MPDIS5
00 3060  36 0003  MPDIS4  B=3
00 3061  12 0260          IF      AUTENG:/=:0 THEN MPDIS5
00 3062  63 3064
00 3063  36 0006          B=6
00 3064  12 0264  MPDIS5  L=PLANDA-3
00 3065  71 7774
00 3066  63 3070          IF      L:/=:0    THEN LOK+2
00 3067  37 0014          B=B+12
00 3070  71 7773          L=L-4
00 3071  63 3076          IF      L:/=:0    THEN MPDIS6
00 3072  50 0007          IF      L:/=:8    THEN LOK+2
00 3073  63 3075
00 3074  37 0006          B=B+6
00 3075  37 0030          B=B+24
00 3076  71 7776  MPDIS6  L=L-1
00 3077  63 3104          IF      L:/=:0    THEN ARMDIS-1
00 3100  50 0007          IF      L:/=:8    THEN LOK+2
00 3101  63 3103
00 3102  37 0006          B=B+6
00 3103  37 0022          B=B+18
00 3104  50 0203          L=B
00 3105  71 6025  ARMDIS  ADDALK ARMMES
00 3106  02 2543          IF      L:=:ARMMSG THEN THRMCK
00 3107  61 3114
00 3110  44 2543          ARMMSG=L
00 3111  36 0010          B=8
00 3112  10 4463          U=SEVEN
00 3113  76 3237          CALL    ANMESS
00 3114  12 0520  THRMCK  L=THRMOD+2*1
```

```
   1819B SCAMP                               SECTION      15      PAGE     135
  INDIRECTS

00 3115  50 4001
00 3116  71 6074          ADDALK THROTL
00 3117  02 2542          IF      L:=:THRMSG THEN XITMPD
```

-continued

```
00 3120  61 3125
00 3121  44 2542           THRMSG=L
00 3122  10 4501           U=THREE
00 3123  36 0000           B=0
00 3124  76 3237           CALL    ANMESS
00 3125  76 3175  XITMPD   CALL    FMATRN
00 3126  76 3133           CALL    TSTFMT    TAT/THRUST INDIC
00 3127  12 2511           MAKEIT=MAKEIT:XOR:BITSET
00 3130  53 4207
00 3131  44 2511
00 3132  55 2410           RETURN MCOSC1
                  MODISC   EQUALS MCOSC1

                  NO REF:       OFFLAT
                  NO REF:       BITS
                  NO REF:       FOUR
                  NO REF:       TWO
```

```
                           SECTOR
                  **************************************

                   TAT/THRUST INDICATOR OUTPUT FORMATTING


                           MODIFY
                  CABBUF
                  TEMP1
                  TSTDAT

                           REFER
                  FMAFLG
                  MTRXCD
                  N1LIMT
                  THREE
                  THRTLM

00 3133  00 0000  TSTFMT   SUBRTN
00 3134  12 2026           L=N1LIMT+1/2*2A8
00 3135  50 7012
00 3136  50 4710
00 3137  65 3142           IF      L:>=:0   THEN TSTFM1
00 3140  70 0001           L=1
00 3141  34 3143           GO      TSTFM1+1
00 3142  70 0000  TSTFM1   L=0
00 3143  50 0101           L=L+U            ROUNDED OFF TO 1/20
00 3144  36 0003           B=3              4 CHARACTERS
00 3145  50 7112  TSTFM2   L=L/10
00 3146  47 1776           TEMP1(B)=U
00 3147  73 3145           BJP     TSTFM2
00 3150  50 4004  TSTFM3   L=L*2A4
00 3151  15 1776           L=L+TEMP1(B)
00 3152  56 4501           BSK     THREE
00 3153  34 3150           GO      TSTFM3
00 3154  44 1776           TEMP1=L
00 3155  12 2025           L=THRTLM/22
00 3156  50 7124
00 3157  50 0202           B=L
00 3160  13 5411           TSTDAT=MTRXCD(B)+TEMP1*2A2
00 3161  14 1776
00 3162  50 4602
00 3163  44 2566
00 3164  12 2555           IF      FMAFLG:=:0 THEN N1EXIT
00 3165  61 3174
00 3166  36 0220           B=144
00 3167  10 4501           U=THREE
00 3170  12 2566           L=TSTDAT
00 3171  50 4716           CABBUF(B)=A*2A14
```

-continued

```
                TAT/THRUST INDICATOR OUTPUT FORMATTING

00 3172  50 0700
00 3173  03 2656
00 3174  55 3133  N1EXIT  RETURN TSTFMT
```

```
                          SECTOR
                  *****************************

                   FMA OUTPUT FORMATTING

                          MODIFY
                  CABBUF
                  FMABF1
                  FMAFLG

                          REFER
                  BIT16
                  FMABUF

00 3175  00 0000  FMATRN  SUBRTN
00 3176  50 7204          B(4)=155
00 3177  36 0233
00 3200  41 2656          CABBUF(B)=0
00 3201  73 3200          BJP    LCK-1
00 3202  36 0204          B=132
00 3203  50 7203          B(3)=22
00 3204  36 0026
00 3205  12 2555          IF     FMAFLG:/=:0 THEN FMABLN
00 3206  63 3212
00 3207  70 0001          FMAFLG=1
00 3210  44 2555
00 3211  34 3214          GO     FMACN1
00 3212  40 2555  FMABLN  FMAFLG=0
00 3213  37 0030          B=B+24
00 3214  50 7202  FMACN1  B(2)=22
00 3215  35 0026
00 3216  50 7203  FMACN2  FMABF1(B)=FMABF1(3):OR:BIT16
00 3217  13 2577
00 3220  51 4432
00 3221  45 2577
00 3222  13 2576          A=FMABUF(B)+2A-2
00 3223  50 4202
00 3224  50 7204          CABBUF(4)=A
00 3225  50 0700
00 3226  03 2656
00 3227  37 7763          B=B-12
00 3230  50 7203          B=B(3)-2
00 3231  37 7775
00 3232  50 7202          ENTICR 2
00 3233  73 3234          BJP    LCK+1
00 3234  73 3216          BJP    FMACN2
00 3235  50 7201          ENTICR 1
00 3236  55 3175          RETURN FMATRN
```

```
                    SECTOR

            *********************************************************

            ENTER WITH B=0 THROTTLE
                       B=8 ARMED STATE
                       B=24  LATERAL
                       B=34 MODE
                       B=40 PITCH

                  AND AU = 2 MANUAL OR COMMAND
                      AU = 3 THROTTLE, PITCH
                      AU = 4 LATERAL
                      AU = 7 ARMED MODE

                  AND AL = START ADDRESS OF MESSAGE


                    MODIFY
            FMABUF
            INDXMS
            MESFLG

                    REFER
            ADR0
            ADRMSK
            ALPHBT
            BIT09

00 3237   00 0000   ANMESS  SUBRTN
00 3240   50 7202           B(2)=L,L:AND:ADRMSK
00 3241   52 4210
00 3242   50 7202
00 3243   50 0202
00 3244   46 2551           INDXMS=U
00 3245   11 0000   NEXT3   U=ADR0(B)
00 3246   37 0001           B=B+1
00 3247   50 7202   REPETE  ENTICR 2
00 3250   60 3245           IF      U:=:0     THEN NEXT3
00 3251   70 0030           L=0
00 3252   50 4706           A=A+2A6
00 3253   46 2552           MESFLG=U
00 3254   50 0002           SWAP    L,B
00 3255   11 5657           U=ALPHBT(B)
00 3256   50 0202           B=L
00 3257   50 7201           L=FMABUF(1)
00 3260   13 2576
00 3261   50 5400           SKPODD
00 3262   53 4423           L=L:XOR:BIT09
00 3263   50 0700           FMABUF(B)=A
00 3264   03 2576
00 3265   37 0002           B=B+2
```

```
00 3266   10 2552           U=MESFLG
00 3267   57 2551           ISK     INDXMS
00 3270   34 3247           GO      REPETE
00 3271   55 3237           RETURN ANMESS
```

```
                    SECTOR
            *********************************************

              DECIMAL DISPLAY ROUTINE

                    MODIFY
            MSGC02
            MSGC03
            TEMPDC
```

```
  1819B SCAMP                                     SECTION        19        PAGE        141
INDIRECTS
                                                   -continued

                            DECIMAL DISPLAY ROUTINE

                                     REFER
                            FOUR

 00 3272   00 3000   DISDEC  SUBRTN
 20 3273   50 0200           U=L
 00 3274   65 3300           IF    L1>=10    THEN DISDC1
 00 3275   50 6200           CPAU
 00 3276   70 2055           L=02055         -SIGN
 20 3277   34 3301           GO    LOK+2
 00 3300   70 2053   DISDC1  L=02053         +SIGN
 20 3301   44 3114           MSGC02=L
 00 3302   46 2537           TEMPDC=U
 20 3303   50 7202           ENTICR 2
 00 3304   36 0005           B=5
 00 3305   50 7201   DISDC2  ENTICR 1        NO. OF DEC. PLACES
 00 3306   73 3312           RJP   DISDC3
 20 3307   70 2056           L=02056         DEC. PT.
 00 3310   50 0202           B=L             INSURES ONLY ONE D.P.
 30 3311   34 3317           GO    DISDC4
 00 3312   12 2537   DISDC3  TEMPDC=TEMPDC/10
 00 3313   50 7112
 00 3314   44 2537
 00 3315   50 0201           L=U+02060       ASCI #
 00 3316   71 2060
 00 3317   50 7202   DISDC4  ENTICR 2
 00 3320   45 3115           MSGC03(B)=L
 00 3321   73 3305           RJP   DISDC2
 00 3322   13 3115   DISDC5  L=MSGC03(B)-02060
 00 3323   71 5717
 20 3324   63 3331           IF    L1/=10    THEN DISDC6
 00 3325   71 2040           MSGC03(B)=L+02040
 20 3326   45 3115
 20 3327   55 4414           BSK   FOUR
 30 3330   34 3322           GO    DISDC5
 20 3331   50 7201   DISDC6  ENTICR 1
 30 3332   55 3272           RETURN DISDEC

  1819B SCAMP                                     SECTION        20        PAGE        142
INDIRECTS

                                     SECTOR
                          ***************************************

                            THREE DIGIT INTEGER DISPLAY

                                     MODIFY
                          MSGC0D
                          MSGC01
                          MSGC02
                          TMPPF1

 20 3333   00 0000   INTGR3  SUBRTN
 20 3334   36 0000           B=0
 00 3335   40 3112           MSGC0D=0
 00 3336   50 7112           L=L/10
 00 3337   46 2524           TMPPF1=U
 00 3340   61 3352           IF    L1=10     THEN DISDI2
 00 3341   36 0001           B=1
 00 3342   50 7112           L=L/10
 20 3343   61 3347           IF    L1=10     THEN DISDI1
 00 3344   36 0002           B=2
 00 3345   71 2060           MSGC01=L+02060
 00 3346   44 3113
 20 3347   50 0201   DISDI1  MSGC0D(B)=L,U+02060
 20 3350   71 2060
 00 3351   45 3112
```

-continued

THREE DIGIT INTEGER DISPLAY

```
00 3352  12 2524  DISDI2  MSGC01(B)=TMPPF1+02060
00 3353  71 2060
00 3354  45 3113
00 3355  70 1000          MSGC02(B)=01000
00 3356  45 3114
00 3357  55 3333          RETURN INTGR3
```

SECTOR
******************************************

INPUT DISCRETES PACKING,

CHANGE SENSING, AND

SPECIAL ACTION DIRECTION

```
        MODIFY
APTOGA
AUTENG
AUTMOD
AUTPS1
CMDNOT
COUNH0
COUNH1
COUNH2
COUNH3
COUNH4
CWSNOT
DISCH0
DISCH1
DISCH2
DISCH3
DISCH4
DISCT0
DISCT1
DISCT2
DISCT3
DISCT4
DSCTOG
DUALFG
FLAPCM
FLTDIR
LATCHY
LNDFLG
MSPENG
STATE0
STATE1
STATE2
STATE3
STATE4
TEMP1
THRMOD
THRPS1
THRTLM
TOGCNT
VORFSV
VORINF
YDENGF
```

```
                               REFER
                        AIRDCD
                        ATODIN
                        ATODI6
                        ATODI8
                        ATOD11
                        ATOD15
                        ATOD19
                        ATOD20
                        ATOD21
                        ATOD22
                        ATOD23
                        BIT00
                        BIT01
                        BIT02
                        BIT04
                        BIT05
                        BIT07
                        BIT09
                        BIT12
                        BIT13
                        BIT15
                        BIT16
                        BIT00N
                        BIT01N
                        HRADCA
                        HRADCB
                        PFTFLG
                        ROLENG
                        ST0MSK
                        ST1MSK
                        ST2MSK
                        ST3MSK
                        ST4MSK
                        TEN
                        THRENG
                        VORENF
                        VORFLG
                        VONOT

00 3360   00 0000   DSCRET   SUBRTN
00 3361   50 7300            CLRSR
00 3362   36 0005            B=5
00 3363   11 1414            U=ATODIN(B)
00 3364   50 4503            LRTAU  3
00 3365   50 4703            A=A+2^3
00 3366   73 3363            BJP    LCK-3
00 3367   50 6100            L=-L
00 3370   50 7343            SETSR  3
00 3371   76 4075            CALL   DSCTIM
```

```
00 3372   50 7300   DSCRT1   CLRSR
00 3373   36 0002            B=2
00 3374   11 1424            U=ATODI8(B)
00 3375   50 4502            LRTAU  2
00 3376   50 4704            A=A+2^4
00 3377   73 3374            BJP    LCK-3
00 3400   36 0001            B=1
00 3401   11 1422            U=ATODI6(B)+2^3
00 3402   50 4503
00 3403   50 4703            A=A+2^3
00 3404   73 3401            BJP    LCK-3
00 3405   50 5100            L=-L
00 3406   50 7343            SETSR  3
                    *********************************************
```

-continued

```
                        SYSTEM VALID TOGGLE
                        END - AROUND

00 3407  10 2527          IF      U,PFTFLG:/=:0 THEN DISCIN
00 3410  62 3426
00 3411  10 0306          IF      U,YDNOT:/=:0 THEN DISCIN
00 3412  62 3426
00 3413  50 0200          U=L
00 3414  53 2145          L=L:XOR:DSCTOG
00 3415  46 2145          DSCTOG=U
00 3416  52 4423          L=L:AND:BIT09
00 3417  61 3422          IF      L:=:0     THEN DSRT1B
00 3420  70 0024          TOGCNT=20
00 3421  44 2305
00 3422  57 2305  DSRT1B  ISK     TOGCNT
00 3423  34 3425          GO      LOK+2
00 3424  76 2000          CALL    FAILIT
00 3425  50 0201          L=U
00 3426  51 4423  DISCIN  L=L:OR:BIT09
00 3427  36 0001          B=1
00 3430  76 4075          CALL    DSCTIM
00 3431  50 7300  DSCRT2  CLRSR
00 3432  70 7777          L=-0
00 3433  36 0003          B=3
00 3434  11 1427          U=ATOD11(B)
00 3435  50 4502          LRTAU   2
00 3436  50 4704          A=A+2^4
00 3437  73 3434          BJP     LOK-3
00 3440  50 6100          L=-L
00 3441  50 7343          SETSR   3
00 3442  36 0002          B=2
00 3443  76 4075          CALL    DSCTIM
00 3444  50 7300  DSCRT3  CLRSR
00 3445  70 7777          L=-0
00 3446  36 0003          B=3
00 3447  11 1433          U=ATOD15(B)
00 3450  50 4502          LRTAU   2
```

```
00 3451  50 4704          A=A+2^4
00 3452  73 3447          BJP     LOK-3
00 3453  50 6100          L=-L
00 3454  50 7343          SETSR   3
00 3455  36 0003          B=3
00 3456  76 4075          CALL    DSCTIM
00 3457  50 7300  DSCRT4  CLRSR
00 3460  70 7777          L=-0
00 3461  10 1437          U=ATOD19
00 3462  50 4504          LRTAU   4
00 3463  50 4702          A=A+2^2
00 3464  10 1440          U=ATOD20
00 3465  50 4504          LRTAU   4
00 3466  50 4701          A=A+2^1
00 3467  10 1441          U=ATOD21
00 3470  50 4504          LRTAU   4
00 3471  50 4702          A=A+2^2
00 3472  10 1442          U=ATOD22
00 3473  50 4503          LRTAU   3
00 3474  50 4703          A=A+2^3
00 3475  10 1443          U=ATOD23
00 3476  50 4504          LRTAU   4
00 3477  50 4702          A=A+2^2
00 3500  50 4610          L=L+2^8
00 3501  50 6100          L=-L
00 3502  50 7343          SETSR   3
00 3503  10 0260          IF      U,AUTENG:=:0 THEN LOK+2
00 3504  60 3506
00 3505  51 4432          L=L:OR:BIT16
00 3506  10 0100          IF      U,THRENG:=:0 THEN LOK+2
```

```
 18198 SCAMP                                  SECTION        21        PAGE        146
INDIRECTS
```

-continued

```
00 3507   60 3511
00 3510   51 4421            L=L:OR:BIT7
00 3511   36 0004            B=4
00 3512   76 4075            CALL    DSCTIM
00 3513   12 0074  DSCRT5    IF      VCRENF:=:0 THEN DSCRXT
00 3514   61 3531
00 3515   12 0263            L=RULENG-4
00 3516   71 7773
00 3517   63 3531            IF      L:/=:0   THEN DSCRXT
00 3520   12 0102            IF      VCRFLG:=:VORFSV THEN DSCRXT
00 3521   02 2050
00 3522   61 3531
00 3523   44 2050            VORFSV=L
00 3524   44 0416            VORINF=L
00 3525   70 0000            L=0
00 3526   76 4165            CALL    RLESET
00 3527   70 0004            L=4
00 3530   76 4175            CALL    RLASET
00 3531   50 5002  DSCRXT    SKIP    2
00 3532   34 3537            GO      DSCRX1
00 3533   12 2030            L=AUTPS1
00 3534   32 2027            B=AUTMOD
```

```
 18198 SCAMP                                  SECTION        21        PAGE        147
INDIRECTS

00 3535   31 5037            ICALLB AUTTBL
00 3536   34 3541            GO      DSCRX2
00 3537   70 7776  DSCRX1    FLAPCM=-1
00 3540   44 2570
00 3541   55 3360  DSCRX2    RETURN DSCRET
```

```
 18198 SCAMP                                  SECTION        21        PAGE        148

                   ****************************************

                        SPECIAL TASKS FOR "STATE0"

                      YAW DAMPER : ENGAGE-DISENGAGE

00 3542   50 4504  STT0CK    LRTAU   4
00 3543   64 3552            IF      U:>=:0   THEN ST0XIT+1
00 3544   50 4501            LRTAU   1
00 3545   64 3552            IF      U:>=:0   THEN ST0XIT+1
00 3546   70 7776            YDENGF=-1
00 3547   44 0305
00 3550   40 2471            LATCHY=0
00 3551   34 3372  ST0XIT    GO      DSCRT1
00 3552   12 2527            IF      PFTFLG:/=:0 THEN LOK+2
00 3553   63 3555
00 3554   30 1351            ICALL   CLRCOM
00 3555   12 4376            LATCHY=AIRRCD
00 3556   44 2471
00 3557   55 3360            RETURN DSCRET
```

```
 18198 SCAMP                                  SECTION        21        PAGE        149

                   ****************************************

                        SPECIAL TASKS FOR "STATE 1 "

                   1.   M.S.P. ILS/LAND
                   2.   M.S.P. PITCH CWS
                   3.   M.S.P. ILS/LAND DISARM
                   4.   M.S.P. HDG. SEL.
```

```
                    SPECIAL TASKS FOR "STATE 1 "

                    5.  S.P.   PREFLIGHT
                    6.  M.S.P. ALT. HLD

20 3560  50 4701  STT1CK  A=A+2^1        ILS/LAND CHECK
20 3561  65 3621          IF     L:>=10  THEN STT1C2
20 3562  64 3621          IF     U:>=10  THEN STT1C2
                  **********************************************

                    ILS/LAND INTERLOCKING

20 3563  50 7400          T=A
00 3564  12 0260          IF     AUTENG:=10 THEN LOK+2
00 3565  61 3567
00 3566  65 3571          IF     L:>=10   THEN LOK+3
00 3567  12 0261          IF     FLTDIR:=10 THEN ILSXIT+1
00 3570  61 3620
00 3571  12 0074          IF     VCRENF:=10 THEN LOK+3
00 3572  61 3575
00 3573  70 0004          L=4
00 3574  34 3617          GO     ILSXIT
00 3575  12 0310          IF     DUALFG:/=10 THEN ILSXIT+1
00 3576  63 3620
20 3577  76 4155          CALL   ACONGD   IS A/C ON GROUND?
00 3600  50 5101          IF     F,1=1    THEN ILSXIT+1
00 3601  34 3617
00 3602  12 2151          L=DISCH3:AND:BIT05  LOC VAL B
00 3603  52 4417
00 3604  61 3620          IF     L:=10    THEN ILSXIT+1
20 3605  12 2147          L=DISCH1:AND:BIT04  LOC VAL A
00 3606  52 4416
00 3607  61 3620          IF     L:=10    THEN ILSXIT+1
00 3610  12 0152          L=HRADCA+HRADCB-600  BELOW 300 FT?
00 3611  14 0153
00 3612  71 6647
20 3613  67 3620          IF     L:<10    THEN ILSXIT+1
00 3614  70 7002          L=2
20 3615  76 4147          CALL   PTASET
00 3616  70 0003          L=3
20 3617  76 4175  ILSXIT  CALL   RLASET
00 3620  50 7500          A=T
20 3621  50 4703  STT1C2  A=A+2^3         PITCH CWS CHECK
00 3622  65 3636          IF     L:>=10   THEN STT1C3
00 3623  64 3636          IF     U:>=10   THEN STT1C3
```

```
                  ******************************

                    PITCH CWS

20 3624  50 7400          T=A
20 3625  12 0260          IF     AUTENG:<=10 THEN PCWXIT+1
00 3626  51 3635
20 3627  67 3635
20 3630  12 0310          IF     DUALFG:/=10 THEN PCWXIT
00 3631  63 3634
                                           SINGLE LAND?
20 3632  76 4244          CALL   LNDFGN
00 3633  70 0000          L=0
20 3634  76 4137  PCWXIT  CALL   PTESET
00 3635  50 7500          A=T
00 3636  50 4701  STT1C3  A=A+2^1
00 3637  65 3650          IF     L:>=10   THEN STT1C4
20 3640  64 3650          IF     U:>=10   THEN STT1C4

                  ********************************
```

```
                         ILS/LAND DIS-ARM

00 3641   50 7400                T=A
00 3642   12 0310                IF      DUALFG:/=:0 THEN ILDXIT+1
00 3643   63 3647

                                                 SINGLE LAND?
00 3644   76 4147                CALL    PTASET
00 3645   76 4175                CALL    RLASET
00 3646   76 4226       ILDXIT   CALL    LNDRGN
00 3647   50 7500                A=T
00 3650   50 4701       STT1C4   A=A+2A1          HDG. SEL. CHECK
00 3651   65 3672                IF      L:>=:0   THEN STT1C6
00 3652   64 3672                IF      U:>=:0   THEN STT1C6
                        ******************************

                        HEADING SELECT

00 3653   50 7400                T=A
00 3654   12 0260                IF      AUTENG:=:0 THEN LOK+2
00 3655   61 3657
00 3656   65 3661                IF      L:>=:0   THEN LOK+3
00 3657   12 0261                IF      FLTDIR:=:0 THEN HDGXIT+1
00 3660   61 3671
00 3661   12 0310                IF      DUALFG:/=:0 THEN HDGXIT+1
00 3662   63 3671
00 3663   76 4155                CALL    ACONGD
00 3664   50 5101                IF      F,1=1    THEN HDGXIT+1
00 3665   34 3670
00 3666   76 4226                CALL    LNDRGN
00 3667   70 0005                L=5
```

```
00 3670   76 4155       HDGXIT   CALL    RLESET
00 3671   50 7500                A=T
00 3672   50 4703       STT1C6   A=A+2A3          ALT. HLD. CHECK
00 3673   65 3717                IF      L:>=:0   THEN ST1XIT
00 3674   64 3717                IF      U:>=:0   THEN ST1XIT

                        ****************************

                        ALTITUDE HOLD

00 3675   12 0260                IF      AUTENG:=:0 THEN LOK+2
00 3676   61 3700
00 3677   65 3702                IF      L:>=:0   THEN LOK+3
00 3700   12 0261                IF      FLTDIR:=:0 THEN ALTXIT+1
00 3701   61 3717
00 3702   12 0310                IF      DUALFG:/=:0 THEN ALTXIT+1
00 3703   63 3717
00 3704   76 4155                CALL    ACONGD
00 3705   50 5101                IF      F,1=1    THEN ALTXIT+1
00 3706   34 3716
00 3707   12 2146                L=DISCH0:AND:BIT02
00 3710   52 4414
00 3711   61 3717                IF      L:=:0    THEN ALTXIT+1
00 3712   50 5100                IF      F,0=1    THEN ALTXIT+1
00 3713   34 3716
00 3714   76 4244                CALL    LNDRGN
00 3715   70 0003                L=3
00 3716   76 4137       ALTXIT   CALL    PTESET
00 3717   34 3431       ST1XIT   GO      DSCRT2
```

```
                        ********************************

                        SPECIAL TASKS FOR "STATE 2 "

00 3720   34 3444       STT2CK   GO      DSCRT3
```

```
                    ****************************************
                      SPECIAL TASKS FOR "STATE 3 "

00 3721  50 4710  STT3CK  A=A+2A8
00 3722  65 4010          IF     L:>=:0   THEN STT3C2
00 3723  64 4010          IF     U:>=:0   THEN STT3C2
00 3724  50 7400          T=A

                    ******************************************
                      PITCH MODE ENGAGE INTERLOCKING
                    **************************

                      TO/GA

00 3725  10 2151          U=DISCH3
00 3726  50 0201          L=U:AND:BIT13 FLAPS O.D.
00 3727  52 4427
00 3730  61 4007          IF     L:=:0    THEN TOGXIT+1
00 3731  12 0520          IF     THRMOD:=:0 THEN AUTOCH
00 3732  61 3737
00 3733  70 0004          THRMOD=4
00 3734  44 0520
00 3735  44 0272          THRPS1=L
00 3736  34 3744          GO     TOGACH
00 3737  12 0260  AUTOCH  IF     AUTENG:>:0 THEN TOGACH
00 3740  61 3742
00 3741  65 3744
00 3742  12 0261          IF     FLTDIR:=:0 THEN TOGXIT+1
00 3743  61 4007
00 3744  50 0201  TOGACH  L=U:AND:BIT12
00 3745  52 4426
00 3746  63 3757          IF     L:/=:0   THEN TOCHEK
00 3747  50 0201          L=U:AND:BIT15
00 3750  52 4431
00 3751  63 3757          IF     L:/=:0   THEN TOCHEK
00 3752  70 0003          APTOGA=3
00 3753  44 0521
00 3754  70 0120          THRTLM=80
00 3755  44 2025
00 3756  34 3767          GO     TOGAST
00 3757  12 0261  TOCHEK  IF     FLTDIR:=:0 THEN TOGXIT+1
00 3760  61 4007
00 3761  70 0001          APTOGA=1
00 3762  44 0521
00 3763  44 2027          AUTMOD=L
00 3764  40 2030          AUTPS1=0
00 3765  40 2025          THRTLM=0
00 3766  70 0005          L=5
```

```
00 3767  10 0260  TOGAST  IF     U,AUTENG:>:0 THEN TOGAS1
00 3770  63 3772
00 3771  64 3774
00 3772  10 0261          IF     U,FLTDIR:=:0 THEN TOGXIT+1
00 3773  60 4007
00 3774  76 4137  TOGAS1  CALL   PTESET
00 3775  40 0310          DUALFG=0
00 3776  40 0275          LNDFLG=0
00 3777  70 0000          L=0
00 4000  76 4147          CALL   PTASET
00 4001  76 4175          CALL   RLASET
00 4002  50 5002          SKIP   2
00 4003  34 4005          GO     LCK+2
00 4004  34 4007          GO     LCK+3
00 4005  70 0005          L=5
```

```
1819B SCAMP                       SECTION      21      PAGE      154
                                  -continued

00 4006  76 4165  TOGXIT  CALL    RLESET
00 4007  50 7500          A=T
00 4010  50 4701  STT3C2  A=A+2^1
00 4011  65 4030          IF      L:>=:0   THEN STT3C3
00 4012  50 7400          T=A
00 4013  64 4025          IF      U:>=:0   THEN STT3OF
00 4014  12 0276          L=CMONOT+CWSNOT
00 4015  14 0307
00 4016  63 4025          IF      L:/=:0   THEN STT3OF
00 4017  70 7776          L=-1
00 4020  10 2257          IF      U,MSPENG:/=:0 THEN LOK+2
00 4021  62 4023
00 4022  44 0257          MSPENG=L
00 4023  44 0260          AUTENG=L
00 4024  34 4007          GO      STT3C2-1
00 4025  40 0260  STT3OF  AUTENG=0
00 4026  40 0276          CMONOT=0
00 4027  50 7500          A=T
00 4030  50 4702  STT3C3  A=A+2^2
00 4031  65 4037          IF      L:>=:0   THEN ST3XIT
00 4032  12 0261          L=FLTDIR:AND:BIT01N
00 4033  52 4435
00 4034  64 4036          IF      U:>=:0   THEN LOK+2
00 4035  51 4413          L=L:OR:BIT01
00 4036  44 0261          FLTDIR=L
00 4037  34 3457  ST3XIT  GO      DSCRT4
```

```
1819B SCAMP                       SECTION      21      PAGE      155

                  *************************************
                     SPECIAL TASKS FOR "STATE 4 "

00 4040  50 4701  STT4CK  A=A+2^1
00 4041  65 4054          IF      L:>=:0   THEN STT4C2
00 4042  50 7400          T=A
00 4043  70 0000          L=0
00 4044  64 4050          IF      U:>=:0   THEN STT4C1
00 4045  10 0307          IF      U,CWSNOT:/=:0 THEN LOK+3
00 4046  62 4051
00 4047  70 7776          L=-1
00 4050  40 0307  STT4C1  CWSNOT=0
00 4051  40 0276          CMONOT=0
00 4052  44 0257          MSPENG=L
00 4053  50 7500          A=T
00 4054  50 4707  STT4C2  A=A+2^7
00 4055  65 4065          IF      L:>=:0   THEN STT4C3
00 4056  50 7400          T=A
00 4057  12 0261          L=FLTDIR:AND:BIT00N
00 4060  52 4434
00 4061  64 4063          IF      U:>=:0   THEN LOK+2
00 4062  51 4412          L=L:OR:BIT00
00 4063  44 0261          FLTDIR=L
00 4064  50 7500          A=T
00 4065  50 4702  STT4C3  A=A+2^2          AUTO-THROTTLE?
00 4066  65 4074          IF      L:>=:0   THEN ST4XIT
00 4067  70 0000          L=0
00 4070  64 4073          IF      U:>=:0   THEN LOK+3
00 4071  70 0003          L=3
00 4072  44 0272          THRPS1=L
00 4073  44 0520          THRMOD=L
00 4074  34 3513  ST4XIT  GO      DSCRT5
```

```
                    ****************************************

                    DISCRETE CHANGE SENSING SUBROUTINE

00 4075   00 0000   DSCTIM   SUBRTN
00 4076   50 0200            U=L
00 4077   03 2146            IF      L:=:DISCH0(B) THEN DSCTM1+1
00 4100   61 4107
00 4101   13 2153            IF      COUNH0(B):=:0 THEN DSCTM1
00 4102   61 4106
00 4103   71 7776            COUNH0(B)=L-1
00 4104   45 2153
00 4105   34 4111            GO      DSCTM2
00 4106   47 2146   DSCTM1   DISCH0(B)=U
00 4107   70 0012            COUNH0(B)=10
00 4110   45 2153
00 4111   50 0201   DSCTM2   L=U
00 4112   03 2140            IF      L:=:DISCT0(B) THEN DSCTM3
00 4113   61 4116
00 4114   45 2140            DISCT0(B)=L
00 4115   34 4131            GO      DSCTMX
00 4116   03 0277   DSCTM3   IF      L:=:STATE0(B) THEN DSCTMX
00 4117   61 4131
00 4120   44 1776            TEMP1=L
00 4121   13 0277            TEMP1=STATE0(B):XOR:TEMP1
00 4122   53 1776
00 4123   44 1776
00 4124   47 0277            STATE0(B)=U
00 4125   13 4377            L=ST0MSK(B):AND:TEMP1
00 4126   52 1776
00 4127   61 4131            IF      L:=:0     THEN DSCTMX
00 4130   35 4132            JPB     ST0CHK
00 4131   55 4075   DSCTMX   RETURN DSCTIM

00 4132   34 3542   ST0CHK   GO      STT0CK
00 4133   34 3560            GO      STT1CK
00 4134   34 3720            GO      STT2CK
00 4135   34 3721            GO      STT3CK
00 4136   34 4040            GO      STT4CK

                     NO REF:       TEN
                     NO REF:       ST4MSK
                     NO REF:       ST3MSK
                     NO REF:       ST2MSK
                     NO REF:       ST1MSK
                     NO REF:       STATE4
                     NO REF:       STATE3
                     NO REF:       STATE2
                     NO REF:       STATE1
                     NO REF:       DISCT4
                     NO REF:       DISCT3
```

```
                     NO REF:       DISCT2
                     NO REF:       DISCT1
                     NO REF:       DISCH4
                     NO REF:       DISCH2
                     NO REF:       COUNH4
                     NO REF:       COUNH3
                     NO REF:       COUNH2
                     NO REF:       COUNH1
```

```
18198 SCAMP                              SECTION      22      PAGE      158

                         SECTOR

                  ***************************

                          MODIFY
                  GSBAD
                  PCPFLG
                  PITENG
                  PITFLG

00 4137   00 0000   PTESET   SUBRTN
00 4140   02 0265            IF      L:=:PITENG THEN PTEST1
00 4141   61 4145
00 4142   44 0265            PITENG=L
00 4143   40 0274            PCPFLG=0
00 4144   40 2477            GSBAD=0
00 4145   44 0267   PTEST1   PITFLG=L
00 4146   55 4137            RETURN PTESET
```

```
18198 SCAMP                              SECTION      23      PAGE      159

                         SECTOR

                  ***************************

                          MODIFY
                  PLANDA
                  PTAPS1

00 4147   00 0000   PTASET   SUBRTN
00 4150   02 0264            IF      L:=:PLANDA THEN PTAST1
00 4151   61 4154
00 4152   44 0264            PLANDA=L
00 4153   44 0271            PTAPS1=L
00 4154   55 4147   PTAST1   RETURN PTASET
```

```
                                         SECTION      24      PAGE      160

                         SECTOR

                  *************************

                          REFER
                  BIT12
                  BIT15
                  DISCH3

00 4155   00 0000   ACONGD   SUBRTN
00 4156   53 6501            SETFL   1
00 4157   12 4426            L=BIT12+BIT15:AND:DISCH3
00 4160   14 4431
00 4161   52 2151
00 4162   63 4164            IF      L:/=:0   THEN ACOXIT
00 4163   53 6401            CLRFL   1
00 4164   55 4155   ACOXIT   RETURN ACONGD
```

```
                         SECTOR

                 **********************************

                          MODIFY
                 LOCBAD
                 RCPFLG
                 ROLENG
                 ROLFLG

00 4165   00 0000  RLESET   SUBRTN
00 4166   02 0263           IF      L!=!ROLENG THEN RLEST1
00 4167   61 4174
00 4170   44 0263           ROLENG=L
00 4171   44 0266           ROLFLG=L
00 4172   40 0273           RCPFLG=0
00 4173   40 2476           LOCBAD=0
00 4174   55 4165  RLEST1   RETURN RLESET
```

```
                         SECTOR

                 ************************************

                          MODIFY
                 RLANDA
                 RLAPS1

00 4175   00 0000  RLASET   SUBRTN
00 4176   02 0262           IF      L!=!RLANDA THEN RLAST1
00 4177   61 4202
00 4200   44 0262           RLANDA=L
00 4201   44 0270           RLAPS1=L
00 4202   55 4175  RLAST1   RETURN RLASET
```

```
                         SECTOR
                 *****************************************

                  THROTTLE MODE SET

                          MODIFY
                 THRMCD
                 THRPS1

00 4203   00 0000  THRSET   SUBRTN
00 4204   02 0520           IF      L!=!THRMOD THEN LOK+3
00 4205   61 4210
00 4206   44 0520           THRMOD=L
00 4207   44 0272           THRPS1=L
00 4210   55 4203           RETURN THRSET
```

```
                 SECTOR
       *************************************

        CALCULATES MINIMUM MAGNITUDE
        FLIGHT PATH ANGLE FROM CONSTRAINTS.

                 MODIFY
       GAMCMD
       TEMP1

                 REFER
       ALTCOR
       ALTRNG
       BIT17N
       HDESRD
       SC0573
       VORRNG

00 4211   00 0000  FPACMP  SUBRTN
00 4212   12 0413          L=VORRNG-ALTRNG
00 4213   16 0425
00 4214   56 5300          SKPNOV
00 4215   12 4455          L=BIT17N
00 4216   44 1776          TEMP1=L
00 4217   12 0072          L=HDESRD-ALTCOR*SC0573*2A-4
00 4220   16 0433
00 4221   24 4166
00 4222   52 4304
00 4223   26 1776          GAMCMD=A/TEMP1
00 4224   44 2032
00 4225   55 4211          RETURN FPACMP
```

```
                 SECTOR

       *************************************************

                 MODIFY
       PLANDA
       RLANDA

                 REFER
       PITENG
       ROLENG
00 4226   00 0000  LNDRGN  SUBRTN
00 4227   12 0253          IF     ROLENG!=10 THEN XITLRG
00 4230   61 4243
00 4231   71 7772          L=L-5
00 4232   65 4243          IF     L!>=10   THEN XITLRG
00 4233   40 0262          RLANDA=0
00 4234   40 0264          PLANDA=0
00 4235   76 5006          CALL   ROFFST
00 4236   12 0265          IF     PITENG!=10 THEN XITLRG
00 4237   61 4243
00 4240   71 7774          L=L-3
00 4241   65 4243          IF     L!>=10   THEN XITLRG
00 4242   76 4767          CALL   POFFST
00 4243   55 4226  XITLRG  RETURN LNDRGN
```

```
1819D SCAMP                                    SECTION        30        PAGE       166

                        SECTOR
                  ************************************************

                        MODIFY
                  PLANDA
                  RLANDA

                        REFER
                  PITENG
                  ROLENG

00 4244   00 0000 LNDPGN SUBRTN
00 4245   12 0265        IF      PITENG:=:0 THEN XITLPG
00 4246   61 4255
00 4247   71 7774        L=L-3
00 4250   65 4255        IF      L:>=:0    THEN XITLPG
00 4251   40 0264        PLANDA=0
00 4252   40 0262        RLANDA=0
00 4253   76 4767        CALL    POFFST
00 4254   76 5006        CALL    ROFFST
00 4255   12 0263 XITLPG L=ROLENG-6
00 4256   71 7771
00 4257   63 4261        IF      L:/=:0    THEN LOK+2
00 4260   76 5006        CALL    ROFFST
00 4261   55 4244        RETURN LNDPGN
```

```
1819B SCAMP                                    SECTION        31        PAGE       167

                        SECTOR
                  ************************************************
                     FAILURE CALL - UP

                        MODIFY
                  FAUPNM
                  FIRSTP
                  MSGCOD
                  MSGC01
                  MSGC02
                  MSGC03

                        REFER
                  FAILNM
                  MSGMSK

00 4262   00 0000 FAILUP SUBRTN
00 4263   40 3112        MSGCOD=0
00 4264   12 2404        IF      FIRSTP:<:0 THEN NXTFUP
00 4265   67 4312
00 4266   50 6100        FIRSTP=-L
00 4267   44 2424
00 4270   12 2446        IF      FAILNM:/=:0 THEN FAILP1
00 4271   63 4274
00 4272   70 0003        L=3               NO FAILURES
00 4273   34 4322        GO      FAILXT
00 4274   50 7112 FAILP1 L=L/10
00 4275   36 0000        B=0
00 4276   61 4303        IF      L:=:0     THEN FAILP2
00 4277   50 0001        SWAP    U,L
00 4300   71 2060        MSGC01=L+02060
00 4301   44 3113
00 4302   36 0001        B=1
00 4303   70 1522 FAILP2 MSGC01(B)=01522
00 4304   45 3113
00 4305   70 1000        MSGC02(B)=01000
00 4306   45 3114
00 4307   50 0201 FAILP3 L=U+02060
```

-continued

```
                  FAILURE CALL - UP

00 4310   71 2060
00 4311   34 4322            GO      FAILXT
00 4312   32 2405   NXTFUP   B=FAUPNM
00 4313   56 2406            BSK     FAILNM
00 4314   34 4317            GO      NXTFP1
00 4315   40 2404            FIRSTP=0
00 4316   34 4323            GO      FAILXT+1
00 4317   42 2405   NXTFP1   FAUPNM=B
00 4320   13 2406            L=FAILNM(B):AND:MSGMSK
00 4321   52 4477
00 4322   44 3112   FAILXT   MSGCOD=L
00 4323   55 4262            RETURN FAILUP
```

```
                    NO REF:       MSGC03
```

```
                             SECTOR
                    *****************************************

                     REMEMBER FAILURES

                             MODIFY
                    FAILNM

                             REFER
                    D50
                    ZERO
00 4324   00 0000   FAILST   SUBRTN
00 4325   10 4500            U=ZERO
00 4326   32 2406            B=FAILNM
00 4327   03 2406   FAILS1   IF      L:/=:FAILNM(B) THEN FAILS2
00 4330   63 4334
00 4331   50 0001            SWAP    U,L
00 4332   71 0001            L=L+1
00 4333   50 0001            SWAP    U,L
00 4334   73 4327   FAILS2   BJP     FAILS1
00 4335   36 7771            B=-6
00 4336   50 0105            U=U+B
00 4337   64 4346            IF      U:>=:0   THEN FAILXT
00 4340   32 2406            B=FAILNM
00 4341   56 4506            BSK     D50
00 4342   34 4344            GO      LCK+2
00 4343   34 4346            GO      FAILXT
00 4344   42 2406            FAILNM=B
00 4345   45 2406            FAILNM(B)=L
00 4346   55 4324   FAILXT   RETURN FAILST
```

```
                             SECTOR
                    *********************************

                     REPORT FAILURE ?

                             REFER
                    PFTFLG
                    VALMSG
```

-continued

```
                        REPORT FAILURE ?

00 4347  00 0000  VALFAL  SUBRTN
00 4350  73 4352          RJP    LCK+2
00 4351  34 4356          GO     VALXIT
00 4352  10 2527          IF     U,PFTFLG:/=10 THEN VALXIT
00 4353  62 4356
00 4354  13 4711          L=VALMSG(B)
00 4355  75 4324          CALL   FAILST
00 4356  55 4347  VALXIT  RETURN VALFAL
```

```
                          SECTOR
                  ***********************************

                        PITCH MODE VALID CHECKS

00 4357  00 0000  NOPCHK  SUBRTN
00 4360  55 4357          RETURN NOPCHK
```

```
                          SECTOR

                  ***********************************

                          MODIFY
                  GSBAD

                          REFER
                  BIT03
                  BIT05
                  DISCH0
                  DISCH1

00 4361  00 0000  GSECHK  SUBRTN
00 4362  36 2020          ENTBK  16
00 4363  12 2147          ENTAL  DISCH1   G/S VALID A
00 4364  52 4417          SLCL   BIT05
00 4365  61 4377          JPALZ  GSEFAL
00 4366  12 2146          ENTAL  DISCH0   G/S VALID B
00 4367  52 4415          SLCL   BIT03
00 4370  61 4377          JPALZ  GSEFAL
00 4371  76 4572          CALL   ILSTUN   ILS TUNED?
00 4372  50 5102          SKPNFL 2
00 4373  34 4377          JP     GSEFAL
00 4374  76 4602          CALL   GSMCHK   G/S MONITORING
00 4375  50 5101          SKPNFL 1
00 4376  34 4407          JP     GSEXIT
00 4377  12 2477  GSEFAL  ENTAL  GSBAD
00 4400  63 4407          JPALNZ LCK+7
00 4401  70 0001          ENTALK 1
00 4402  44 2477          STRAL  GSBAD
00 4403  76 4742          CALL   LKDFAL
00 4404  76 4347          CALL   VALFAL
00 4405  34 4407          JP     LCK+2
00 4406  40 2477          STRZ   GSBAD
00 4407  55 4361  GSEXIT  RETURN GSECHK
```

```
                        SECTOR

                 ***************************************

00 4410   00 0000  ALTCHK  SUBRTN
00 4411   76 4420          CALL    AIRDCK
00 4412   50 5101          SKPNFL  1
00 4413   34 4415          JP      LCK+2
00 4414   34 4417          JP      LCK+3
00 4415   76 4767          CALL    PCFFST
00 4416   76 4347          CALL    VALFAL
00 4417   55 4410          RETURN  ALTCHK
```

```
                        SECTOR

                 *****************************************

                   AIRDATA CHECKS

                        REFER
                 BIT01
                 BIT02
                 BIT05
                 DISCH0

00 4420   00 0000  AIRDCK  SUBRTN
00 4421   50 6501          SETFL   1
00 4422   36 0000          ENTBK   0
00 4423   50 5100          SKPNFL
00 4424   34 4442          JP      AIRDFC
00 4425   36 0022          ENTBK   18
00 4426   12 2146          ENTAL   DISCH0
00 4427   52 4414          SLCL    BIT02
00 4430   61 4442          JPALZ   AIRDFC
00 4431   36 0014          ENTBK   12
00 4432   12 2146          ENTAL   DISCH0
00 4433   52 4413          SLCL    BIT01
00 4434   63 4440          JPALNZ  AIRDOK
00 4435   12 2146          ENTAL   DISCH0
00 4436   52 4417          SLCL    BIT05
00 4437   61 4442          JPALZ   AIRDFC
00 4440   36 0000  AIRDOK  ENTBK   0
00 4441   50 6401          CLRFL   1
00 4442   55 4420  AIRDFC  RETURN  AIRDCK
```

```
                        SECTOR

                 ************************************

                        MODIFY
                 CWSNOT

                        REFER
                 AUTENG

00 4443   00 0000  GAECHK  SUBRTN
00 4444   76 4012          CALL    TOGAVA
00 4445   50 5101          SKPNFL  1
00 4446   34 4453          JP      GAEFAL
00 4447   36 0000          ENTBK   0
00 4450   50 5100          SKPNFL
```

```
18198 SCAMP                         SECTION      38      PAGE      175
                                    -continued

00 4451   34 4453            JP     LOK+2
00 4452   34 4460            JP     LOK+6
00 4453   12 0260  GAEFAL    ENTAL  AUTENG
00 4454   61 4456            JPALZ  LOK+2
00 4455   44 0307            STRAL  CWSNOT
00 4456   76 4755            CALL   ALLMOD
00 4457   76 4347            CALL   VALFAL
00 4460   55 4443            RETURN GAECHK

18198 SCAMP                         SECTION      39      PAGE      176

                             SECTOR
                   *************************************

                             MODIFY
                   PITENG
                   ROLENG

                             REFER
                   AUTENG

20 4461   00 0000  TOECHK    SUBRTN
00 4462   50 5002            SKIP   2
00 4463   34 4465            GO     LOK+2
00 4464   34 4471            GO     LOK+5
00 4465   12 0260            ENTAL  AUTENG
00 4466   61 4471            JPALZ  LOK+3
00 4467   40 0263            STRZ   ROLENG
00 4470   40 0265            STRZ   PITENG
00 4471   76 4612            CALL   TOGAVA
00 4472   50 5101            SKPNFL 1
00 4473   34 4500            JP     TOEFAL
00 4474   36 0000            ENTBK  0
00 4475   50 5100            SKPNFL
00 4476   34 4500            JP     LOK+2
00 4477   34 4502            JP     LOK+3
00 4500   76 4755  TOEFAL    CALL   ALLMOD
00 4501   76 4347            CALL   VALFAL
00 4502   55 4461            RETURN TOECHK

18198 SCAMP                         SECTION      40      PAGE      177

                             SECTOR
                   **********************************************

                     PITCH ARMED STATES

20 4503   00 0000  FLACHK    SUBRTN
00 4504   76 4632            CALL   RAMCHK
00 4505   50 5101            SKPNFL 1
00 4506   34 4510            JP     LOK+2
00 4507   34 4512            JP     LOK+3
00 4510   76 4742            CALL   LNDFAL
00 4511   76 4347            CALL   VALFAL
00 4512   55 4503            RETURN FLACHK

18198 SCAMP                         SECTION      41      PAGE      178

                             SECTOR
                   ******************************

20 4513   00 0000  GSACHK    SUBRTN
00 4514   76 4572            CALL   ILSTUN
```

```
18198 SCAMP                                   SECTION       41       PAGE      178
                                              -continued

00 4515   50 5102            SKPNFL 2
00 4516   34 4522            JP     GSAFAL
00 4517   76 4602            CALL   GSHCHK
00 4520   50 5101            SKPNFL 1
00 4521   34 4524            JP     LCK+3
00 4522   76 4774   GSAFAL   CALL   LNOAFL
00 4523   76 4347            CALL   VALFAL
00 4524   55 4513            RETURN GSACHK

18198 SCAMP                                   SECTION       42       PAGE      179

                             SECTOR
                    ******************************************

                      ROLL MODE VALID CHECKS

                             REFER
                    DUALFG

00 4525   00 0000   GNRCHK   SUBRTN
00 4526   76 4645            CALL   LCCHCK
00 4527   50 5101            SKPNFL 1
00 4530   34 4540            JP     GNRFAL
00 4531   76 4675            CALL   LATLND
00 4532   50 5101            SKPNFL 1
00 4533   34 4540            JP     GNRFAL
00 4534   36 0000            ENTBK  0
00 4535   12 0310            ENTAL  DUALFG
00 4536   61 4540            JPALZ  GNRFAL
00 4537   34 4542            JP     LCK+3
00 4540   76 4742   GNRFAL   CALL   LNOFAL
00 4541   76 4347            CALL   VALFAL
00 4542   55 4525            RETURN GNRCHK

18198 SCAMP                                   SECTION       43       PAGE      180

                             SECTOR
                    **********************************

00 4543   00 0000   LATCHK   SUBRTN
00 4544   76 4645            CALL   LCCHCK
00 4545   50 5101            SKPNFL 1
00 4546   34 4553            JP     LATFAL
00 4547   76 4675            CALL   LATLND
00 4550   50 5101            SKPNFL 1
00 4551   50 5040            SKIP
00 4552   34 4555            JP     LCK+3
00 4553   76 4742   LATFAL   CALL   LNOFAL
00 4554   76 4347            CALL   VALFAL
00 4555   55 4543            RETURN LATCHK

18198 SCAMP                                   SECTION       44       PAGE      181

                             SECTOR

                    *********************************

                             MODIFY
                    CWSNCT

00 4556   00 0000   HDGSCK   SUBRTN
00 4557   76 4622            CALL   HDGVLD
00 4560   50 5102            SKPNFL 2
00 4561   34 4567            JP     LCK+6
```

```
18198 SCAMP                         SECTION         44          PAGE        181
                                -continued

00 4562   50 5100           SKPNFL
00 4563   34 4565           JP      LCK+2
00 4564   34 4571           JP      LCK+5
00 4565   73 0001           ENTALK  1
00 4566   44 0307           STRAL   CWSNOT
00 4567   76 5006           CALL    ROFFST
00 4570   76 4347           CALL    VALFAL
00 4571   55 4556           RETURN  HDGSCK

18198 SCAMP                         SECTION         45          PAGE        182

                            SECTOR

                    *******************************************

                     ILS TUNED?

                            REFER
                    BIT09
                    DISCH0

00 4572   00 0000   ILSTUN  SUBRTN
00 4573   50 6402           CLRFL   2
00 4574   12 2146           ENTAL   DISCH0
00 4575   36 0021           ENTBK   17
00 4576   52 4423           SLCL    BIT09
00 4577   61 4601           JPALZ   XITILV
00 4600   50 6502           SETFL   2
00 4601   55 4572   XITILV  RETURN  ILSTUN

18198 SCAMP                         SECTION         46          PAGE        183

                            SECTOR

                    ****************************************************

                     CHECK FOR G/S MONITORING VALID

                            REFER
                    BIT09
                    MONVLD

00 4602   00 0000   GSMCHK  SUBRTN
00 4603   50 6501           SETFL   1
00 4604   36 0000           ENTBK   0
00 4605   12 0304           ENTAL   MONVLD
00 4606   52 4423           SLCL    BIT09
00 4607   63 4611           JPALNZ  XITGSV
00 4610   50 6401           CLRFL   1
00 4611   55 4602   XITGSV  RETURN  GSMCHK

18198 SCAMP                         SECTION         47          PAGE        184

                            SECTOR

                    *******************************************************

                     CHECK FOR TO/GA VALID

                            REFER
                    BIT08
                    DISCH4

00 4612   00 0020   TOGAVA  SUBRTN
00 4613   50 6401           CLRFL   1
```

```
 18198 SCAMP                          SECTION        47        PAGE       184
```
-continued

```
                       CHECK FOR TO/GA VALID

00 4614  34 4621             GO     XITTGA   ENTBK19
00 4615  12 2152             ENTAL  DISCH4
00 4616  52 4422             SLCL   BIT08
00 4617  63 4621             JPALNZ XITTGA
00 4620  50 6501             SETFL  1
00 4621  55 4612   XITTGA    RETURN TOGAVA

 18198 SCAMP                          SECTION        48        PAGE       185

                             SECTOR
                   *******************************************************

                       CHECK FOR HEADING VALIDS

                             REFER
                   BIT06
                   DISCH0

00 4622  00 0000   HDGVLD    SUBRTN
00 4623  50 6402             CLRFL  2
00 4624  36 0011             ENTBK  9
00 4625  12 2146             ENTAL  DISCH0
00 4626  52 4420             SLCL   BIT06
00 4627  63 4631             JPALNZ XITHVD
00 4630  50 6502             SETFL  2
00 4631  55 4622   XITHVD    RETURN HDGVLD

 18198 SCAMP                          SECTION        49        PAGE       186

                             SECTOR
                   *******************************************************

                       CHECK FOR RAD, ALT, MONITORING STATES

                             REFER
                   BIT10
                   BIT11
                   MONVLD

00 4632  00 0000   RAMCHK    SUBRTN
00 4633  50 6401             CLRFL  1
00 4634  36 0000             ENTBK  0
00 4635  12 0304             ENTAL  MONVLD
00 4636  52 4424             SLCL   BIT10
00 4637  61 4643             JPALZ  LCK+4
00 4640  12 0304             ENTAL  MONVLD
00 4641  52 4425             SLCL   BIT11
00 4642  63 4644             JPALNZ XITRAV
00 4643  50 6501             SETFL  1
00 4644  55 4632   XITRAV    RETURN RAMCHK

 18198 SCAMP                          SECTION        50        PAGE       187

                             SECTOR
                   *******************************************************

                       LOCALIZER VALID

                             MODIFY
                   LOCBAD

                             REFER
                   BIT04
                   BIT05
```

-continued

```
                           LOCALIZER VALID

                         BIT08
                         DISCH1
                         DISCH3
                         MONVLD

00 4645   00 0000   LOCHCK   SUBRTN
00 4646   50 5401            CLRFL   1
00 4647   76 4572            CALL    ILSTUN
00 4650   50 5102            SKPNFL  2
00 4651   34 4671            JP      LCCHFL+4
00 4652   36 0024            ENTBK   20
00 4653   12 2147            ENTAL   DISCH1    LOC VALID A
00 4654   52 4416            SLCL    BIT04
00 4655   61 4665            JPALZ   LCCHFL
00 4656   12 2151            ENTAL   DISCH3    LOC. VALID B
00 4657   52 4417            SLCL    BIT05
00 4660   61 4665            JPALZ   LCCHFL
00 4661   36 0020            ENTBK   0
00 4662   12 2304            ENTAL   MCNVLD
00 4663   52 4422            SLCL    BIT08
00 4664   63 4673            JPALNZ  XITLCH-1
00 4665   12 2476   LOCHFL   ENTAL   LOCBAD
00 4666   63 4674            JPALNZ  XITLCH
00 4667   70 0001            ENTALK  1
00 4670   44 2476            STRAL   LCCBAD
00 4671   50 6501            SETFL   1
00 4672   34 4674            JP      LCK+2
00 4673   40 2476            STRZ    LOCBAD
00 4674   55 4645   XITLCH   RETURN  LOCHCK
```

```
                                SECTOR
                         ************************************************************

                           CHECKS REQUIRED FOR
                           LATERAL LAND MCDES

                                REFER
                         BIT12
                         MONVLD
                         ROLENG

00 4675   00 0000   LATLND   SUBRTN
00 4676   50 5401            CLRFL   1
00 4677   12 0263            ENTAL   RCLENG
00 4700   71 7774            ADDALK  -3
00 4701   67 4712            JPALNG  XITLLN
00 4702   76 4622            CALL    HCGVLD
00 4703   50 5102            SKPNFL  2
00 4704   34 4711            JP      LATLFL
00 4705   36 0000            ENTBK   0
00 4706   12 2304            ENTAL   MCNVLD
00 4707   52 4426            SLCL    BIT12
00 4710   63 4712            JPALNZ  XITLLN
00 4711   50 6501   LATLFL   SETFL   1
00 4712   55 4675   XITLLN   RETURN  LATLND
```

```
                                SECTOR
                         ************************************************************

                           ACTICN FOR YAW DAMPER INVALID

                                MODIFY
                         MSPENG
                         YDENGF
```

```
  18198 SCAMP                          SECTION       52       PAGE       189
                                       -continued

                 ACTION FOR YAW DAMPER INVALID

00 4713   30 0000   YDFAIL   SUBRTN
00 4714   76 4733            CALL    CMFAIL
00 4715   40 0305            STRZ    YDENGF
00 4716   40 0257            STRZ    MSPENG
00 4717   55 4713            RETURN  YDFAIL

  18198 SCAMP                          SECTION       53       PAGE       190

                             SECTOR
                    ***************************************************

                             MODIFY
                    CMDNOT
                    CWSNOT
                    YDNOT

00 4720   00 0000   YOFFAL   SUBRTN
00 4721   70 0001            ENTALK  1
00 4722   44 0306            STRAL   YDNOT
00 4723   44 0307            STRAL   CWSNOT
00 4724   44 0276            STRAL   CMDNOT
00 4725   55 4720            RETURN  YOFFAL

  18198 SCAMP                          SECTION       54       PAGE       191

                             SECTOR
                    ******************************************************

                 ACTION FOR FLIGHT DIRECTOR INVALID

                             REFER
                    AUTENG

00 4726   00 0000   FDFAIL   SUBRTN
00 4727   12 0260            ENTAL   AUTENG
00 4730   63 4732            JPALNZ  LCK+2
00 4731   76 4755            CALL    ALLMOD
00 4732   55 4726            RETURN  FDFAIL

  18198 SCAMP                          SECTION       55       PAGE       192

                             SECTOR
                    ********************************************************

                 ACTION FOR COMMAND INVALID

                             MODIFY
                    DUALFG
                    LNDFLG

                             REFER
                    FLTDIR

00 4733   30 0000   CMFAIL   SUBRTN
00 4734   12 0261            ENTAL   FLTDIR
00 4735   63 4737            JPALNZ  LCK+2
00 4736   76 4755            CALL    ALLMOD
00 4737   40 0310            STRZ    DUALFG
00 4740   43 0275            STRZ    LNDFLG
00 4741   55 4733            RETURN  CMFAIL
```

```
18198 SCAMP                          SECTION        56        PAGE       193

                    SECTOR
                ****************************************************************

                 ACTION FOR LAND/ILS INVALID


                    MODIFY
                CMDNOT
                CWSNOT

                    REFER
                AUTENG
                GSBAD
                LOCBAD

20 4742   00 0000   LNDFAL   SUBRTN
20 4743   12 2477            ENTAL   GSBAD
20 4744   14 2476            ADDAL   LOCBAD
00 4745   63 4747            JPALNZ  LCK+2
20 4746   76 4755            CALL    ALLMOD
20 4747   12 0260            ENTAL   AUTENG
20 4750   61 4753            JPALZ   LCK+3
20 4751   70 0001            ENTALK  1
20 4752   44 0307            STRAL   CWSNOT
20 4753   44 0276            STRAL   CMDNOT
20 4754   55 4742            RETURN  LNDFAL

18198 SCAMP                          SECTION        57        PAGE       194

                    SECTOR
                ****************************************************************

                 ACTION :  TURN OFF ALL MODES


                    MODIFY
                DUALFG
                LNDFLG
                PLANDA
                PTAPS1
                RLANDA
                RLAPS1

20 4755   20 0000   ALLMOD   SUBRTN
20 4756   76 4767            CALL    POFFST
20 4757   76 5026            CALL    ROFFST
20 4760   40 0262            STRZ    RLANDA
20 4761   40 0264            STRZ    PLANDA
00 4762   40 0270            STRZ    RLAPS1
00 4763   40 0271            STRZ    PTAPS1
20 4764   40 0310            STRZ    DUALFG
00 4765   40 0275            STRZ    LNDFLG
20 4766   55 4755            RETURN  ALLMOD

18198 SCAMP                          SECTION        58        PAGE       195

                    SECTOR
                ****************************************************************


                    MODIFY
                PCPFLG
                PITENG
                PITFLG

00 4767   00 0000   POFFST   SUBRTN
20 4770   40 0265            STRZ    PITENG
20 4771   40 0267            STRZ    PITFLG
20 4772   40 0274            STRZ    PCPFLG
20 4773   55 4767            RETURN  POFFST
```

```
18198 SCAMP                                  SECTION       59       PAGE      196

                              SECTOR
                   **********************************************************
                     TURN OFF LAND/ILS ARMED


                              MODIFY
                   PLANDA
                   PTAPS1
                   RLANDA
                   RLAPS1

                              REFER
                   ROLENG

00 4774   00 0000  LNDAFL     SUBRTN
00 4775   40 0262             STRZ    RLANDA
00 4776   40 0264             STRZ    PLANDA
00 4777   40 0270             STRZ    RLAPS1
00 5000   40 0271             STRZ    PTAPS1
00 5001   12 0263             ENTAL   ROLENG
00 5002   71 7772             ADDALK  -5
00 5003   65 5005             JPALP   LCK+2
00 5004   76 4742             CALL    LNOFAL
00 5005   55 4774             RETURN  LNDAFL

18198 SCAMP                                  SECTION       60       PAGE      197

                              SECTOR
                   **********************************************************
                     TURN OFF ROLL MODE


                              MODIFY
                   RCPFLG
                   ROLENG
                   ROLFLG

00 5006   00 0000  ROFFST     SUBRTN
00 5007   40 0253             STRZ    ROLENG
00 5010   40 0266             STRZ    ROLFLG
00 5011   40 0273             STRZ    RCPFLG
00 5012   55 5006             RETURN  ROFFST

18198 SCAMP                                  SECTION       60       PAGE      198

                   ************************************

                   INDIRECT ADDRESSES

00 5013   00 4357  RENGTB     #NOPCHK          0
00 5014   00 4525             #GNRCHK          1
00 5015   00 4543             #LATCHK          2
00 5016   00 4543             #LATCHK          3
00 5017   00 4357             #NOPCHK          4  VORMODE
00 5020   00 4556             #HDGSCK          5
00 5021   00 4556             #HDGSCK          6
00 5022   00 4357  PARMTB     #NOPCHK          0
00 5023   00 4503             #FLACHK          1
00 5024   00 4513             #GSACHK          2
00 5025   00 4357             #NOPCHK          3  ALTSELECT
00 5026   00 4357  PENGTB     #NOPCHK          0
00 5027   00 4357             #NOPCHK          1
00 5030   00 4361             #GSECHK          2
00 5031   00 4410             #ALTCHK          3
00 5032   00 4443             #GAECHK          4
00 5033   00 4461             #TOECHK          5
00 5034   00 4357             #NOPCHK          6  FPA
```

-continued

```
                    INDIRECT ADDRESSES

00 5035  00 4357           #NOPCHK          7 CAS ON PITCH
00 5036  00 4357           #NOPCHK          8 MACH ON PITCH
00 5037  00 4357  AUTTBL   #NOPCHK          0. NONE
00 5040  00 5051           #TAKEOF          1. TAKE-OFF
00 5041  00 5072           #CLMOUT          2. CLIMB-OUT
00 5042  00 5367           #CRUISE          3. CRUISE
00 5043  00 5423           #ENRCLM          4. ENROUTE CLIMB
00 5044  00 5446           #DESCNT          5. ENROUTE DESCENT
00 5045  01 2000  SINCSN   #SINCOS
00 5046  04 2056  TABLES   #TABLE1
00 5047  04 2074  TABLED   #TABLE2
00 5050  04 0000  INDEXS   #FASTIX
```

```
                           SECTOR
                  ***************************************

                   TAKE-OFF AUTOMATIC SEQUENCING


                           MODIFY
                  ALTFLG
                  APRFLG
                  APTOGA
                  AUTMOD
                  AUTPS1
                  DELTAV
                  FLAPCM
                  MACHCM

                           REFER
                  DEG10
                  TENKTS
                  VORENF
                  WOW4


00 5051  00 0000  TAKEOF   SUBRTN
00 5052  12 4561           FLAPCM=DEG10
00 5053  44 2570
00 5054  12 4172           DELTAV=TENKTS
00 5055  44 2042
00 5056  12 0074           IF      VORENF:=10 THEN TOFXIT
00 5057  61 5071
00 5060  12 0350           IF      WOW4:/=10 THEN TOFXIT
00 5061  63 5071
00 5062  70 0002           AUTMOD=2
00 5063  44 2027
00 5064  44 2030           AUTPS1=L
00 5065  40 0521           APTOGA=0
00 5066  40 2031           MACHCM=0
00 5067  40 2041           APRFLG=0
00 5070  40 2040           ALTFLG=0
00 5071  55 5051  TOFXIT   RETURN TAKEOF
```

```
                           SECTOR
                  ***************************************

                   CLIMB-OUT AUTOMATIC SEQUENCING


                           MODIFY
                  ALTCMD
                  ALTCOR
```

```
                AUTMOD
                AUTPS1
                DELTAV
                FLAPCM
                GAMCMD
                HDTCKF
                MACHCM
                MACHRF
                MDPHAS
                MINTRM
                PHIMAX
                TEMP1
                THRTLM
                VCASRF

                       REFER
                ALTGND
                DEG10
                DEG15
                DEG25
                D1000
                D3000
                D10000
                FLAPOS
                GAMMA
                HDESRD
                KHEQUV
                KINTMC
                MACHAD
                MACHDS
                MP82
                ONEG
                PITENG
                PROFIL
                TENKTS
                VCASAD
                VDTTCF
                V45KTS
                V250KT
                V290KT

00 5072  00 0000  CLMOUT  SUBRTN
```

```
00 5073  61 5116          IF      L:=:0     THEN CLMPS2
00 5074  12 0433          L=ALTCON-ALTGND-1500
00 5075  16 0103
00 5076  71 5043
00 5077  67 5366          IF      L:<:0     THEN CLMXIT
00 5100  12 0201          IF      FLAPOS:>=:DEG10 THEN LOK+2
00 5101  02 4561
00 5102  65 5104
00 5103  12 4561          L=DEG10
00 5104  24 4172          DELTAV=L*TENKTS/DEG10
00 5105  26 4561
00 5106  44 2642
00 5107  40 2570          FLAPCM=0
00 5110  70 0005          L=5
00 5111  76 4155          CALL    RLESET    HEADING SELECT
00 5112  70 0004          L=4
00 5113  76 4175          CALL    RLASET    ARM VOR
00 5114  40 2043          MDPHAS=0
00 5115  40 2030          AUTPS1=0
00 5116  12 2043  CLMPS2  IF      MDPHAS:/=:0 THEN CLMPH1
00 5117  63 5153
00 5120  12 4562          PHIMAX=DEG15
00 5121  44 0466
00 5122  12 0201          L=FLAPOS-1.0DEG
```

-continued

```
00 5123  71 0447
00 5124  65 5366           IF     L:>=:0    THEN CLMXIT
00 5125  70 0024           THRTLM=20        MAX CLIMB
00 5126  44 2025
00 5127  12 0433           L=ALTCOR-ALTGND-D3000
00 5130  16 0103
00 5131  16 4523
00 5132  67 5366           IF     L:<:0     THEN CLMXIT
00 5133  12 4173           DELTAV=V45KTS
00 5134  44 2042
00 5135  12 4567           PHIMAX=DEG25
00 5136  44 0466
00 5137  70 0006           L=6
00 5140  76 4137           CALL   PTESET    GAMMA COMMAND
00 5141  12 2045           IF     PROFIL:/=:0 THEN CLMP10
00 5142  63 5147
00 5143  12 4177           VCASRF=V250KT
00 5144  44 0361
00 5145  70 0007           L=7              VCAS SELECT
00 5146  34 5151           GO     LOK+3
00 5147  76 5700  CLMP10   CALL   CLMACH
00 5150  70 0010           L=8              MACH SELECT
00 5151  76 4147           CALL   PTASET
00 5152  34 5355           GO     CPHSIN
00 5153  71 7776  CLMPH1   L=L-1
00 5154  63 5201           IF     L:/=:0    THEN CLMPH2
00 5155  70 0144           L=100            600 FT/MIN
00 5156  76 5673           CALL   FPAHOT    HDOT TO GAMMA
```

```
00 5157  12 2045           IF     PROFIL:=:0 THEN CLMP01
00 5160  61 5172
00 5161  76 5700           CALL   CLMACH
00 5162  12 0265           L=PITENG-8
00 5163  71 7767
00 5164  63 5356           IF     L:/=:0    THEN CLMXIT
00 5165  12 0072           ALTCMD=HDESRD
00 5166  44 2033
00 5167  70 0003           L=3
00 5170  76 4147           CALL   PTASET
00 5171  34 5175           GO     CLMP11
00 5172  12 0265  CLMP01   L=PITENG-7
00 5173  71 7770
00 5174  63 5366           IF     L:/=:0    THEN CLMXIT
00 5175  70 0050  CLMP11   THRTLM=40        MAX CRUISE
00 5176  44 2025
00 5177  40 2044           HDTCKF=0
00 5200  34 5355           GO     CPHSIN
00 5201  71 7776  CLMPH2   L=L-1
00 5202  63 5261           IF     L:/=:0    THEN CLMPH3
00 5203  76 6166           CALL   HDOTCK
00 5204  12 2045           IF     PROFIL:/=:0 THEN CLMP12
00 5205  63 5220
00 5206  12 0433           IF     ALTCOR:<:D10000 THEN CLMXIT
00 5207  02 4563
00 5210  67 5366
00 5211  70 0006           L=6
00 5212  76 4137           CALL   PTESET    GAMMA COMMAND
00 5213  12 4201           VCASRF=V290KT
00 5214  44 0361
00 5215  70 0007           L=7
00 5216  76 4147           CALL   PTASET
00 5217  34 5355           GO     CPHSIN
00 5220  12 0265  CLMP12   L=PITENG-3
00 5221  71 7774
00 5222  61 5353           IF     L:=:0     THEN CLMB6
00 5223  76 5700           CALL   CLMACH
00 5224  12 0433           TEMP1=ALTCOR
```

-continued

```
00 5225  44 1776
00 5226  12 0072          ALTCOR=HDESRD
00 5227  44 0433
00 5230  76 5722          CALL   CRSMAC
00 5231  12 1776          ALTCOR=TEMP1
00 5232  44 0433
00 5233  12 0211          L=MACHAD*MACHAD
00 5234  24 0211
00 5235  50 7400          T=A
00 5236  12 2031          L=MACHCM*MACHCM-T*2A-14
00 5237  24 2031
00 5240  50 0107
00 5241  50 4316
00 5242  24 5416          L=L*KHEQUV*2A-14
```

```
00 5243  50 4316
00 5244  14 0072          L=L+HDESRD-ALTCOR
00 5245  16 0433
00 5246  65 5366          IF     L:>=10   THEN CLMXIT
00 5247  12 2460          GAMCMD=GAMMA
00 5250  44 2032
00 5251  70 0006          L=6
00 5252  76 4137          CALL   PTESET
00 5253  12 0211          MACHCM=MACHAD
00 5254  44 2031
00 5255  70 0005          L=5
00 5256  76 4203          CALL   THRSET
00 5257  40 2047          MINTRM=0
00 5260  34 5355          GO     CPHSIN
00 5261  71 7776  CLMPH3  L=L-1
00 5262  63 5332          IF     L:/=10   THEN CLMPH4
00 5263  12 2045          IF     PROFIL:/=10 THEN CLMP13
00 5264  63 5314
00 5265  70 0170          L=120           800 FT/MIN
00 5266  76 5673          CALL   FPAHDT   HDOT TO GAMMA
00 5267  12 0265          L=PITENG-7
00 5270  71 7770
00 5271  63 5360          IF     L:/=10   THEN CLMPH5
00 5272  12 0072          ALTCMD=HDESRD
00 5273  44 2033
00 5274  70 0003          L=3
00 5275  76 4147          CALL   PTASET
00 5276  40 2044          HDTCKF=0
00 5277  50 5010          SKIP   010
00 5300  34 5355          GO     CPHSIN
00 5301  12 0433          TEMP1=ALTCOR
00 5302  44 1776
00 5303  12 0072          ALTCOR=HDESRD
00 5304  44 0433
00 5305  76 5722          CALL   CRSMAC
00 5306  44 0360          MACHRF=L
00 5307  12 1776          ALTCOR=TEMP1
00 5310  44 0433
00 5311  70 0010          L=8
00 5312  76 4147          CALL   PTASET
00 5313  34 5355          GO     CPHSIN
00 5314  76 6166  CLMP13  CALL   HDOTCK
00 5315  12 2460          L=GAMMA
00 5316  30 5045          ICALL  SINCSN
00 5317  50 0201          MACHCM=L,-U*ONEG/D1000+MINTRM+1/KINTMC+MACHCM
00 5320  50 6100
00 5321  24 4165
00 5322  26 4062
00 5323  14 2047
00 5324  50 0307
00 5325  26 5417
00 5326  14 2031
```

```
00 5123  71 6447
20 5124  65 5366            IF      L:>=:0    THEN CLMXIT
00 5125  70 0024            THRTLM=20         MAX CLIMB
00 5126  44 2025
00 5127  12 0433            L=ALTCOR-ALTGND-D3000
00 5130  16 0103
00 5131  16 4523
20 5132  67 5366            IF      L:<:0     THEN CLMXIT
20 5133  12 4173            DELTAV=V45KTS
20 5134  44 2042
20 5135  12 4567            PHIMAX=DEG25
00 5136  44 0466
20 5137  70 0006            L=6
00 5140  76 4137            CALL    PTESET    GAMMA COMMAND
00 5141  12 2045            IF      PROFIL:/=:0 THEN CLMP10
00 5142  63 5147
00 5143  12 4177            VCASRF=V250KT
00 5144  44 0361
00 5145  70 0007            L=7               VCAS SELECT
00 5146  34 5151            GO      LOK+3
00 5147  76 5700   CLMP10   CALL    CLMACH
00 5150  70 0010            L=8               MACH SELECT
00 5151  76 4147            CALL    PTASET
00 5152  34 5355            GO      CPHSIN
00 5153  71 7776   CLMPH1   L=L-1
20 5154  63 5201            IF      L:/=:0    THEN CLMPH2
20 5155  70 0144            L=100             600 FT/MIN
20 5156  76 5073            CALL    FPAHOT    HDOT TO GAMMA
```

```
00 5157  12 2045            IF      PROFIL:=:0 THEN CLMP01
20 5160  61 5172
20 5161  76 5700            CALL    CLMACH
20 5162  12 0265            L=PITENG-8
20 5163  71 7767
00 5164  63 5356            IF      L:/=:0    THEN CLMXIT
20 5165  12 0072            ALTCMD=HDESRD
20 5166  44 2033
20 5167  70 0003            L=3
20 5170  76 4147            CALL    PTASET
20 5171  34 5175            GO      CLMP11
20 5172  12 0265   CLMP01   L=PITENG-7
00 5173  71 7770
20 5174  63 5366            IF      L:/=:0    THEN CLMXIT
20 5175  70 0050   CLMP11   THRTLM=40         MAX CRUISE
00 5176  44 2025
00 5177  40 2044            HDTCKF=0
00 5200  34 5355            GO      CPHSIN
00 5201  71 7776   CLMPH2   L=L-1
30 5202  63 5261            IF      L:/=:0    THEN CLMPH3
20 5203  76 6166            CALL    HDOTCK
00 5204  12 2045            IF      PROFIL:/=:0 THEN CLPP12
20 5205  63 5220
20 5206  12 0433            IF      ALTCOR:<:D10000 THEN CLMXIT
20 5207  02 4563
20 5210  67 5366
20 5211  70 0006            L=6
00 5212  76 4137            CALL    PTESET    GAMMA COMMAND
00 5213  12 4201            VCASRF=V290KT
20 5214  44 0361
20 5215  70 0007            L=7
20 5216  76 4147            CALL    PTASET
20 5217  34 5355            GO      CPHSIN
20 5220  12 0265   CLMP12   L=PITENG-3
00 5221  71 7774
00 5222  61 5353            IF      L:=:0     THEN CLMB6
20 5223  76 5700            CALL    CLMACH
00 5224  12 0433            TEMP1=ALTCOR
```

```
 1R196 SCAMP                         SECTION      62      PAGE      202
                                     -continued

00 5225  44 1776
00 5226  12 0072          ALTCOR=HDESRD
00 5227  44 0433
00 5230  76 5722          CALL    CRSMAC
00 5231  12 1776          ALTCOR=TEMP1
00 5232  44 0433
00 5233  12 0211          L=MACHAD*MACHAD
00 5234  24 0211
00 5235  50 7400          T=A
00 5236  12 2031          L=MACHCM*MACHCM-T*2A-14
00 5237  24 2031
00 5240  50 0107
00 5241  50 4316
00 5242  24 5416          L=L*KHEQUV*2A-14


 1R196 SCAMP                         SECTION      62      PAGE      203

00 5243  50 4316
00 5244  14 0072          L=L+HDESRD-ALTCOR
00 5245  16 0433
00 5246  65 5366          IF      L:>=:0   THEN CLMXIT
00 5247  12 2460          GAMCMD=GAMMA
00 5250  44 2032
00 5251  70 0006          L=6
00 5252  76 4137          CALL    PTESET
00 5253  12 0211          MACHCM=MACHAD
00 5254  44 2031
00 5255  70 0005          L=5
00 5256  76 4203          CALL    THRSET
00 5257  40 2047          MINTRM=0
00 5260  34 5355          GO      CPHSIN
00 5261  71 7776  CLMPH3  L=L-1
00 5262  63 5332          IF      L:/=:0   THEN CLMPH4
00 5263  12 2045          IF      PROFIL:/=:0 THEN CLMP13
00 5264  63 5314
00 5265  70 0170          L=120           600 FT/MIN
00 5266  76 5673          CALL    FPAHDT  HDOT TO GAMMA
00 5267  12 0265          L=PITENG-7
00 5270  71 7770
00 5271  63 5360          IF      L:/=:0   THEN CLMPH5
00 5272  12 0072          ALTCMD=HDESRD
00 5273  44 2033
00 5274  70 0003          L=3
00 5275  76 4147          CALL    PTASET
00 5276  40 2044          HDTCKF=0
00 5277  50 5010          SKIP    010
00 5300  34 5355          GO      CPHSIN
00 5301  12 0433          TEMP1=ALTCOR
00 5302  44 1776
00 5303  12 0072          ALTCOR=HDESRD
00 5304  44 0433
00 5305  76 5722          CALL    CRSMAC
00 5306  44 0360          MACHRF=L
00 5307  12 1776          ALTCOR=TEMP1
00 5310  44 0433
00 5311  70 0010          L=8
00 5312  76 4147          CALL    PTASET
00 5313  34 5355          GO      CPHSIN
00 5314  76 6166  CLMP13  CALL    HDOTCK
00 5315  12 2460          L=GAMMA
00 5316  30 5045          ICALL   SINCSN
00 5317  50 0201          MACHCM=L,-U*ONEG/D1000+MINTRM+1/KINTMC+MACHCM
00 5320  50 6100
00 5321  24 4165
00 5322  26 4662
00 5323  14 2047
00 5324  50 0307
00 5325  26 5417
00 5326  14 2031
```

```
00 5327   44 2031
00 5330   45 2047            MINTRM=U
00 5331   34 5360            GO      CLMPH5
00 5332   71 7776   CLMPH4   L=L-1
00 5333   63 5360            IF      L:/=:0   THEN CLMPH5
00 5334   50 5010            SKIP    010
00 5335   34 5344            GO      CLMB5
00 5336   12 0265            L=PITENG-8
00 5337   71 7767
00 5340   63 5366            IF      L:/=:0   THEN CLMXIT
00 5341   70 0003            L=3
00 5342   76 4147            CALL    PTASET
00 5343   34 5355            GO      CPHSIN
00 5344   76 6166   CLMB5    CALL    MDOTCK
00 5345   12 0075            IF      MACHOS:<:MP82 THEN LOK+2
00 5346   02 4203
00 5347   67 5351
00 5350   12 4203            L=MP82
00 5351   02 0211            IF      L:>=:MACHAD THEN CLMPH5
00 5352   65 5360
00 5353   70 0010            L=8
00 5354   76 4137            CALL    PTESET   MACH HOLD
00 5355   12 2043   CPHSIN   MDPHAS=MDPHAS+1
00 5356   71 0001
00 5357   44 2043
00 5360   12 0265   CLMPH5   L=PITENG-3       ALT HOLD?
00 5361   71 7774
00 5362   63 5366            IF      L:/=:0   THEN CLMXIT
00 5363   70 0003   CLMB6    AUTMOD=3
00 5364   44 2027
00 5365   44 2030            AUTPS1=L
00 5366   55 5072   CLMXIT   RETURN CLMOUT

                    NO REF:      VDTTCF
                    NO REF:      VCASAD
```

```
                             SECTOR
                    **************************************

                     CRUISE AUTOMATIC SEQUENCING


                             MODIFY
                    AUTMOD
                    AUTPS1
                    MACHCM
                    THRTLM

                             REFER
                    ALTCMD
                    HDESRD
                    MACHDS
                    PROFIL


00 5367   00 0000   CRUISE   SUBRTN
00 5370   61 5376            IF      L:=:0    THEN CRSPS2
00 5371   70 0050   CRSPS1   THRTLM=40        CRUISE MODE
00 5372   44 2025
00 5373   40 2030            AUTPS1=0
00 5374   70 0005            L=5
00 5375   76 4203            CALL    THRSET
00 5376   12 2045   CRSPS2   IF      PROFIL:/=:0 THEN CRUIS1
00 5377   63 5406
00 5400   50 5010            SKIP    010      SKIP KEY 4
00 5401   34 5403            GO      LOK+2
00 5402   34 5406            GO      CRUIS1
00 5403   12 0075            MACHCM=MACHDS
```

```
                   CRUISE AUTOMATIC SEQUENCING
00 5404  44 2031
00 5405  34 5407           GO      CRUIS2
00 5406  76 5722   CRUIS1  CALL    CRSMAC
00 5407  12 2033   CRUIS2  L=ALTCMD-HDESRD
00 5410  16 0072
00 5411  61 5422           IF      LI=I0     THEN CRSXIT
00 5412  67 5417           IF      LI<I0     THEN CRUIS3
00 5413  70 0005           AUTMOD=5          DESCENT
00 5414  44 2027
00 5415  44 2030           AUTPS1=L
00 5416  34 5422           GO      CRSXIT
00 5417  70 0004   CRUIS3  AUTMOD=4          ENROUTE CLIMB
00 5420  44 2027
00 5421  44 2030           AUTPS1=L
00 5422  55 5367   CRSXIT  RETURN CRUISE
```

```
                           SECTOR
                   **********************************

                    ENROUTE CLIMB AUTOMATIC SEQUENCING

                           MODIFY
                   ALTCMD
                   AUTMOD
                   AUTPS1

                           REFER
                   HDESRD
                   PITENG


00 5423  00 0000   ENRCLM  SUBRTN
00 5424  61 5437           IF      LI=I0     THEN ENRCL1
00 5425  12 0072           ALTCMD=HDESRD
00 5426  44 2033
00 5427  70 0004           L=4
00 5430  76 4203           CALL    THRSET
00 5431  70 0010           L=8
00 5432  76 4137           CALL    PTESET
00 5433  40 2030           AUTPS1=0
00 5434  70 0003           L=3
00 5435  76 4147           CALL    PTASET
00 5436  34 5445           GO      ENRCLX
00 5437  12 0265   ENRCL1  L=PITENG-3
00 5440  71 7774
00 5441  63 5445           IF      LI/=I0    THEN ENRCLX
00 5442  70 0003           AUTMOD=3
00 5443  44 2027
00 5444  44 2030           AUTPS1=L
00 5445  55 5423   ENRCLX  RETURN ENRCLM
```

```
                           SECTOR
                   ***************************************

                    ENROUTE DESCENT AUTOMATIC SEQUENCING

                           MODIFY
                   ALTCMD
                   APRFLG
                   APTOGA
                   AUTPS1
```

```
                      ENROUTE DESCENT AUTOMATIC SEQUENCING

                        FLAPCM
                        GAMCMD
                        MDPHAS
                        VCASRF
                        VSELEC

                                 REFER
                        ALTCOR
                        ALTGND
                        BIT04
                        BIT05
                        DEG5
                        DEG15
                        DEG22
                        DEG35
                        DEG50
                        DISCH1
                        DISCH3
                        D3000
                        D12000
                        MACHAD
                        PITENG
                        PROFIL
                        VAPTOG
                        VCASAD
                        VORENF
                        V250KT
                        V340KT

00 5446   00 0000  DESCNT  SUBRTN
00 5447   61 5500          IF      L:=10     THEN DSNTP2
00 5450   40 2041          APRFLG=0
00 5451   40 2030          AUTPS1=0
00 5452   40 2043          MDPHAS=0
20 5453   70 0001          L=1
20 5454   76 4203          CALL    THRSET    RETARD MODE
00 5455   12 2045          IF      PROFIL:/=10 THEN DSNT10
00 5456   63 5464
20 5457   12 4202          VCASRF=V340KT
00 5460   44 0361
```

```
00 5461   10 0212          U=VCASAD
20 5462   36 0007          B=7
00 5463   34 5467          GO      LCK+4
00 5464   75 5711  DSNT10  CALL    DSMACH
00 5465   10 0211          U=MACHAD
20 5466   36 0010          B=8
00 5467   50 0006          IF      L:<:U     THEN SLOWDN
20 5470   67 5476
00 5471   12 4556          GAMCMD=-DEG5
00 5472   50 5100
00 5473   44 2032
30 5474   70 0006          L=6
20 5475   76 4137          CALL    PTESET
00 5476   50 0203  SLOWDN  L=8
00 5477   76 4147          CALL    PTASET
00 5500   12 2043  DSNTP2  IF      MDPHAS:/=10 THEN DSTPH1
00 5501   63 5514
00 5502   12 2045          IF      PROFIL:=10 THEN DSNT00
00 5503   61 5510
20 5504   76 5711          CALL    DSMACH
20 5505   12 0265          L=PITENG-8
00 5506   71 7767
20 5507   34 5512          GO      DSNT01
20 5510   12 0265  DSNT00  L=PITENG-7
20 5511   71 7770
```

-continued

```
00 5512  63 5651  DSNT01  IF      L:/=:0    THEN DESEXT
00 5513  34 5646          GO      DPHSIN
00 5514  71 7776  DSTPH1  L=L-1
00 5515  63 5534          IF      L:/=:0    THEN DSTPH2
00 5516  12 2045          IF      PROFIL:/=:0 THEN DSNT11
00 5517  63 5532
00 5520  12 0433          IF      ALTCOR:>=:D12000 THEN DESEXT
00 5521  02 4527
00 5522  65 5651
00 5523  70 0006          L=6
00 5524  76 4137          CALL    PTESET    GAMMA COMMAND
00 5525  12 4177          VCASRF=V252KT
00 5526  44 0361
00 5527  70 0007          L=7
00 5530  76 4147          CALL    PTASET
00 5531  34 5646          GO      DPHSIN
00 5532  76 5711  DSNT11  CALL    DSMACH
00 5533  34 5646          GO      DPHSIN
00 5534  71 7776  DSTPH2  L=L-1
00 5535  63 5565          IF      L:/=:0    THEN DSTPH3
00 5536  12 2045          IF      PROFIL:/=:0 THEN DSNT12
00 5537  63 5546
00 5540  70 7504          L=-187          700 FT/MIN
00 5541  76 5673          CALL    FPAHOT
00 5542  12 0265          L=PITENG-7
00 5543  71 7770
00 5544  63 5651          IF      L:/=:0    THEN DESEXT
```

```
00 5545  34 5547          GO      LCK+2
00 5546  76 5711  DSNT12  CALL    DSMACH
00 5547  50 5004          SKIP    4
00 5550  34 5557          GO      DSNT13
00 5551  70 0002          L=2
00 5552  76 4147          CALL    PTASET
00 5553  12 2043          MDPHAS=MDPHAS+2
00 5554  71 0002
00 5555  44 2043
00 5556  34 5646          GO      DPHSIN
00 5557  70 0003  DSNT13  L=3
00 5560  76 4147          CALL    PTASET    ALT SELECT ARM
00 5561  12 0103          ALTCMD=ALTGND+D3000
00 5562  14 4523
00 5563  44 2033
00 5564  34 5646          GO      DPHSIN
00 5565  71 7776  DSTPH3  L=L-1
00 5566  63 5600          IF      L:/=:0    THEN DSTPH4
00 5567  12 2045          IF      PROFIL:=:0 THEN LCK+2
00 5570  61 5572
00 5571  76 5711          CALL    DSMACH
00 5572  12 0265          L=PITENG-3
00 5573  71 7774
00 5574  63 5651          IF      L:/=:0    THEN DESEXT
00 5575  70 0002          L=2
00 5576  76 4147          CALL    PTASET    ARM GLIDE SLOPE
00 5577  34 5646          GO      DPHSIN
00 5600  71 7776  DSTPH4  L=L-1
00 5601  63 5613          IF      L:/=:0    THEN DSTPH5
00 5602  12 0446          IF      VAPTOG:<:VCASAD THEN DESEXT
00 5603  02 0212
00 5604  67 5651
00 5605  12 4562          FLAPCM=DEG15
00 5606  44 2570
00 5607  70 0003          APTOGA=3
00 5610  44 0521
00 5611  76 4203          CALL    THRSET
00 5612  34 5646          GO      DPHSIN
00 5613  71 7776  DSTPH5  L=L-1
00 5614  63 5632          IF      L:/=:0    THEN DSTPH6
```

```
00 5615  50 5004          SKIP   4
00 5616  50 5040          SKIP
00 5617  76 5711          CALL   DSMACH
00 5620  12 0265          L=PITENG-2
00 5621  71 7775
00 5622  63 5651          IF     L:/=:0   THEN DESEXT
00 5623  50 5004          SKIP   4
00 5624  34 5627          GO     DSNT14
00 5625  76 5734          CALL   FLPCMP
00 5626  34 5646          GO     DPHSIN
00 5627  12 4565  DSNT14  FLAPCM=DEG22
00 5630  44 2570
```

```
00 5631  34 5646          GO     DPHSIN
00 5632  71 7776  DSTPH8  L=L-1
00 5633  63 5651          IF     L:/=:0   THEN DESEXT
00 5634  50 5004          SKIP   4
00 5635  34 5640          GO     DSNT15
00 5636  76 5734          CALL   FLPCMP
00 5637  34 5651          GO     DESEXT
00 5640  12 0433  DSNT15  L=ALTCOR-ALTGND-1500
00 5641  16 0103
00 5642  71 5043
00 5643  65 5651          IF     L:>=:0   THEN DESEXT
00 5644  12 4574          FLAPCM=DEG50
00 5645  44 2570
00 5646  12 2043  DPHSIN  MDPHAS=MDPHAS+1
00 5647  71 0001
00 5650  44 2043
00 5651  12 2041  DESEXT  IF     APRFLG:/=:0 THEN DSXIT
00 5652  63 5670
00 5653  12 0074          IF     VORENF:/=:0 THEN DSXIT
00 5654  63 5670
00 5655  12 2151          L=DISCH3:AND:BIT05
00 5656  52 4417
00 5657  61 5670          IF     L:=:0    THEN DSXIT
00 5660  12 2147          L=DISCH1:AND:BIT04
00 5661  52 4416
00 5662  61 5670          IF     L:=:0    THEN DSXIT
00 5663  44 2041          APRFLG=L
00 5664  70 0003          L=3
00 5665  76 4175          CALL   RLASET
00 5666  70 0005          L=5
00 5667  76 4165          CALL   RLESET   HEADING SELECT
00 5670  12 0446  DSXIT   VSELEC=VAPTOG
00 5671  44 0506
00 5672  55 5446          RETURN DESCNT

                  NO REF:     DEG35
```

```
                          SECTOR
                  ***************************

                   CALCULATE GAMMA FROM HDOT

                          MODIFY
                  GAMCMD

                          REFER
                  SCD573
                  VTASCT

00 5673  00 0000  FPAHDT  SUBRTN
00 5674  24 4166          GAMCMD=L*SCD573/VTASCT
00 5675  26 0725
00 5676  44 2032
00 5677  55 5673          RETURN FPAHDT
```

```
                         SECTOR
                  **************************************
                   LOOK-UP CLIMB-OUT MACH NUMBER

                         MODIFY
                  MACHCM
                  MACHRF

                         REFER
                  ALT1IX
                  ALT5IX
                  ALT1IF
                  MACHCA
                  MACHDA
                  MACHEA
                  WTINDX

00 5700   00 0000 CLMACH SUBRTN
00 5701   30 5050        ICALL  INDEXS
00 5702   50 7344        SETSR  4
00 5703   12 4002        L=MACHCA+ALT1IX
00 5704   14 3004
00 5705   10 3011        U=ALT1IF
00 5706   30 5046        ICALL  TABLES
00 5707   44 0360        MACHRF=L
00 5710   55 5700        RETURN CLMACH

                  **********************************
                   LOOK-UP DESCENT MACH NUMBER

00 5711   00 0000 DSMACH SUBRTN
00 5712   30 5050        ICALL  INDEXS
00 5713   50 7344        SETSR  4
00 5714   12 4004        L=MACHDA+ALT1IX
00 5715   14 3004
00 5716   10 3011        U=ALT1IF
00 5717   30 5046        ICALL  TABLES
00 5720   44 0360        MACHRF=L
00 5721   55 5711        RETURN DSMACH

                  ************************************
                   LOOK-UP CRUISE MACH NUMBER
```

```
00 5722   00 0000 CRSMAC SUBRTN
00 5723   30 5050        ICALL  INDEXS
00 5724   70 3005        ENTALK WTINDX
00 5725   50 0200        U=L
00 5726   70 3003        ENTALK ALT5IX
00 5727   50 7344        SETSR  4
00 5730   32 4003        ENTB   MACHEA
00 5731   30 5047        ICALL  TABLED
00 5732   44 2031        MACHCM=L
00 5733   55 5722        RETURN CRSMAC
```

```
                              SECTOR
                         ********************************

                          DELAYED FLAP DEPLOYMENT ROUTINE


                              MODIFY
                         ALTF50
                         APTOGA
                         DALT50
                         DVH50F
                         DVPXFA
                         FLAPCM
                         FLCMIX
                         FLPCNT
                         FGAMAP
                         F50FLG
                         PLMFLG
                         TEMP1
                         VSELEC

                              REFER
                         ALTCOR
                         ALTGND
                         DEG50
                         DVDXAD
                         DVFLAP
                         D600
                         FLACIF
                         FLACIX
                         FLPSTP
                         FPSTNM
                         KGAMLG
                         KVX50F
                         MINFGM
                         VCASAD
                         V0FLAP
                         V50FLP
                         ZTF020
                         ZTW010

00 5734  00 0000   FLPCMP   SUBRTN
00 5735  12 2051            L=F50FLG
00 5736  63 6116            IF      L:/=:0    THEN NOCHNG
00 5737  30 5050            ICALL  INDEXS
00 5740  50 7344            SETSR  4
00 5741  12 4006            L=DVDXAD+FLACIX
00 5742  14 3007
00 5743  10 3014            U=FLACIF
00 5744  30 5046            ICALL  TABLES
00 5745  44 2052            DVPXFA=L          PRESENT DV/DX KTS/FT B23
```

```
00 5746  12 0563            L=ZTW010+FPSTNM*2A-3/ZTF020  B14
00 5747  24 5432
00 5750  50 4303
00 5751  26 0621
00 5752  50 0307            L=L+1*2A17/DVPXFA  B8
00 5753  50 4721
00 5754  26 2052
00 5755  10 5452            U=MINFGM
00 5756  50 0006            IF      L:>:U     THEN LOK+2
00 5757  61 5761
00 5760  65 5762
00 5761  50 0201            L=U
00 5762  44 1776            TEMP1=L
00 5763  16 2053            L=L-FGAMAP+KGAMLG*2A-17
00 5764  24 5433
00 5765  50 4321
```

18198 SCAMP SECTION 68 PAGE 215

-continued

```
00 5766  14 1776           FGAMAP=L+TEMP1  B8
00 5767  44 2053
00 5770  50 7202           B(2)=0
00 5771  36 0000
00 5772  12 2053  FLPCM1   L=FGAMAP*KVX50F(B)*2A-15  B15
00 5773  25 5434
00 5774  50 4317
00 5775  45 2056           DVH50F(B)=L
00 5776  56 2054           BSK     FLCMIX
00 5777  34 5772           GO      FLPCM1
00 6000  76 6121           CALL    PLACLM
00 6001  02 0212           IF      L:<:VCASAD THEN FLPCM2
00 6002  67 6006
00 6003  70 0001           PLMFLG=1
00 6004  44 2055
00 6005  12 0212           L=VCASAD
00 6006  17 5425  FLPCM2   L=L-V0FLAP(B)*FPSTNM
00 6007  24 5432
00 6010  50 4306           DALT50(B)=A*2A-6/DVH50F(B)  B0
00 6011  27 2056
00 6012  45 2063
00 6013  65 6024           IF      L:>=:0   THEN FLPCM3
00 6014  12 0212           L=VCASAD
00 6015  02 5453           IF      L:<=:V50FLP THEN SETF50
00 6016  61 6075
00 6017  67 6075
00 6020  12 0433           L=ALTCOR-ALTGND
00 6021  16 0103
00 6022  02 4517           IF      L:<:D600 THEN SETF50
00 6023  67 6075
00 6024  37 7776  FLPCM3   B=B-1
00 6025  50 0203           L=B
00 6026  61 6041           IF      L:=:0    THEN TOTAL
00 6027  61 6031           IF      L:>:0    THEN DALTLP
00 6030  65 6033
00 6031  37 0001           B=B+1
```

18198 SCAMP SECTION 68 PAGE 216

```
00 6032  34 6041           GO      TOTAL
00 6033  70 0000  DALTLP   L=0
00 6034  11 5420           U=DVFLAP(B)
00 6035  50 4303           DALT50(B)=A*2A-3/DVH50F(B)
00 6036  27 2056
00 6037  45 2063
00 6040  73 6033           BJP     DALTLP
00 6041  70 1274  TOTAL    L=700
00 6042  15 2063  TOTLOP   ALTF50(B)=L+DALT50(B)
00 6043  45 2070
00 6044  56 2054           BSK     FLCMIX
00 6045  34 6042           GO      TOTLOP
00 6046  44 1776           TEMP1=L
00 6047  57 2076           ISK     FLPCNT
00 6050  34 6116           GO      NOCHNG
00 6051  12 0433           L=ALTCOR-ALTGND
00 6052  16 0103
00 6053  02 1776           IF      L:>:TEMP1 THEN NOCHNG
00 6054  61 6056
00 6055  65 6116
00 6056  12 2055  FLPINC   L=PLMFLG
00 6057  61 6106           IF      L:=:0    THEN PLCFLP
00 6060  12 2054           FLCMIX=FLCMIX-1
00 6061  71 7776
00 6062  44 2054
00 6063  67 6075           IF      L:<:0    THEN SETF50
00 6064  50 0202           B=L
00 6065  13 5441           L=FLPSTP(B)
00 6066  02 2570           IF      L:<:FLAPCM THEN NOCHNG
00 6067  67 6116
00 6070  44 2570           FLAPCM=L
00 6071  34 6116           GO      NOCHNG
```

```
00 6072  70 0001  PLFINC  PLMFLG=1
00 6073  44 2055
00 6074  34 6056          GO      FLPINC
00 6075  12 4574  SETF50  FLAPCM=DEG50
00 6076  44 2570
00 6077  70 0001          F50FLG=1
00 6100  44 2051
00 6101  40 2506          VSELEC=0
00 6102  70 0003          APTOGA=3
00 6103  44 2521
00 6104  76 4203          CALL    THRSET
00 6105  34 6116          GO      NOCHNG
00 6106  76 6137  PLCFLP  CALL    FLPLIM
00 6107  02 2570          IF      L:<:FLAPCM THEN NOCHNG
00 6110  67 6116
00 6111  32 2054          B=FLCMIX-1
00 6112  37 7776
00 6113  03 5441          IF      L:>=:FLPSTP(B) THEN PLFINC
00 6114  65 6072
00 6115  44 2570          FLAPCM=L
```

```
00 6116  40 2055  NOCHNG  PLMFLG=0
00 6117  50 7201          ENTICR 1
00 6120  55 5734          RETURN FLPCMP
```

```
                          SECTOR
                  ***********************************
                  PLACARD LIMIT LOCK-UP ROUTINES

                          MODIFY
                  FLPOSP
                          REFER
                  BFLPLC
                  DEGONE
                  DEG3
                  DEG50
                  FLCMIX
                  FLPLIF
                  FLPLIX
                  FLPSTP
                  MFLPLC
                  PLACAD
                  VCASAD
                  V168KT
                  V171KT
                  V260KT

                  PLACARD LIMIT = F(FLAPS)

00 6121  00 0000  PLACLM  SUBRTN
00 6122  37 7776          B=B-1
00 6123  13 5441          FLPOSP=FLPSTP(B)
00 6124  44 2075
00 6125  30 5050          ICALL   INDEXS
00 6126  50 7344          SETSR   4
00 6127  12 4005          L=PLACAD+FLPLIX
00 6130  14 3006
00 6131  10 3013          U=FLPLIF
00 6132  30 5046          ICALL   TABLES
00 6133  50 7202          B(2)=FLCMIX
00 6134  50 7202
00 6135  32 2054
00 6136  55 6121          RETURN PLACLM
```

```
18198 SCAMP
                                    SECTION        69        PAGE     219

                        *****************************

                        FLAP POSITION = F(PLACARD SPEED - 5KTS)

00 6137   00 0000   FLPLIM   SUBRTN
00 6140   36 0000            B=0
00 6141   12 0212            L=VCASAD
00 6142   02 4175            IF       LI>IV168KT THEN FLPLC1
00 6143   61 6145
00 6144   65 6147
00 6145   12 4574            L=DEG50
00 6146   34 6165            GO       FLPLXT
00 6147   02 4176   FLPLC1   IF       LI>IV171KT THEN FLPLC2
00 6150   61 6152
00 6151   65 6154
00 6152   36 0001            B=1
00 6153   34 6160            GO       FLPLCM
00 6154   02 4200   FLPLC2   IF       LI<IV260KT THEN FLPLCM
00 6155   67 6160
00 6156   12 4554            L=DEG3
00 6157   34 6165            GO       FLPLXT
00 6160   25 5446   FLPLCM   L=L*MFLPLC(B)*2^-13+BFLPLC(B)
00 6161   50 4315
00 6162   21 5450
00 6163   24 4550            L=L*DEGONE*2^-7
00 6164   50 4307
00 6165   55 6137   FLPLXT   RETURN FLPLIM

18198 SCAMP
                                    SECTION        70        PAGE     220

                              SECTOR
                        ***************************

                        CHECK FOR HDOT<HDOTMIN


                              MODIFY
                        HDTCKF
                        HDTCNT
                        THRTLM

                              REFER
                        HDOTF
                        HDTMIN
                        ONEG
                        TWENTY
                        VDTTCF
                        VTASCF

00 6166   00 0000   HDOTCK   SUBRTN
00 6167   12 0435            L=VDTTCF*VTASCF*2^3/ONEG+HDOTF
00 6170   24 0714
00 6171   50 4703
00 6172   26 4165
00 6173   14 0711
00 6174   10 2044            IF       U,HDTCKFI/=I0 THEN HDOTC1
00 6175   62 6202
00 6176   02 4204            IF       LI<IHDTMIN THEN HDCKXT
00 6177   67 6210
00 6200   70 0001            HDTCKF=1
00 6201   44 2044
00 6202   10 4505   HDOTC1   U=TWENTY
00 6203   02 4204            IF       LI>=IHDTMIN THEN HDCKXT
00 6204   65 6210
00 6205   57 2046            ISK      HDTCNT
00 6206   34 6211            GO       HDCKXT+1
00 6207   46 2025            THRTLM=U          MAX CLIMB
00 6210   46 2046   HDCKXT   HDTCNT=U
00 6211   55 6166            RETURN HDOTCK
```

```
        START  020000
*********************************************
*********************************************
*********************************************

  PRE - FLIGHT  TEST


        MODIFY
ANSWER
CLOCK
DIAGND
DTOADT
DTOAD1
DTOAD2
DTOAD3
DTOAD4
DTOAD5
DTOAD6
DTOAD7
DTOAD8
DTOAD9
DTOA10
DTOA11
FAILNM
FAUPNM
FIRSTP
MSGCOD
MSGC01
MSGC02
MSGC03
MSGC04
MSGC08
MSGC09
MSGSAV
OFFPAS
OPTPFT
PFHLDB
PFSTRT

PFTFLG
PFTOGF
TEMPFT
TMPPF1
TMPPF2

        REFER
ACCLXA
ACCLXB
ACCLYA
```

```
ACCLYB
ACCLZA
ACCLZB
ADRMSK
ADR0
ALRAMA
ALRAMB
ALSADA
ALSADB
BIT10
BIT10N
BIT11
BIT11N
BIT12
BIT13
```

-continued

```
                    COLCAP
                    COL1ST
                    DEGM10
                    DEGP7
                    DEGP10
                    DEG5
                    DEG22
                    DEG35
                    D50
                    ELRAMA
                    ELRAMB
                    ELSADA
                    ELSADB
                    FAIADR
                    FCTR10
                    FLAPOS
                    KSFCOT
                    MEMALA
                    MEMALB
                    MEMELA
                    MEMELB
                    MEMRDA
                    MEMRDB
                    MSGMSK
                    NOMNUL
                    NULMSK
                    NUMDCK
                    OUTMSK
                    RDRAMA
                    RDRAMB
                    RDSADA
                    RDSADB
                    RDSERL
                    SCADTB
                    SENADR
                    SENSCL
                    STATE0
```

```
                    STATE3
                    STATE4
                    TSTACC
                    TSTYRT
                    WHLCAP
                    WHL1ST
                    YAWRTA
                    YAWRTB

02 0000   00 2000   PFT     SUBRTN
02 0001   50 7207           ENTICR 7
02 0002   40 2406           FAILNM=0        SET RECORD FAILURES=0
02 0003   70 7776           MSGSAV=-1
02 0004   44 2534
02 0005   76 1475           CALL   CLERDA
02 0006   12 0000           DTOADT=DTOADT+BIT12
02 0007   14 4426
02 0010   44 0000
02 0011   70 0001           DIAGNO=1
02 0012   44 2526
02 0013   70 0176           MSGCOD=126      PREFLIGHT MESSAGE
02 0014   44 3112
02 0015   70 0100           L=0100
02 0016   76 1265           CALL   TIMER
02 0017   70 0170           L=120           1, RETRACT FLAPS, V
02 0020   76 1236           CALL   VERIFY
02 0021   70 0360           CLOCK=240
02 0022   44 2522
02 0023   70 0171           L=121           2. A/P OFF, V
```

-continued

```
02 0024   76 1236          CALL    VERIFY
02 0025   70 0172          L=122           3. Y/D OFF, V
02 0026   76 1236          CALL    VERIFY
02 0027   70 0173          L=123           4. ILS NOT, V
02 0030   76 1236          CALL    VERIFY

            ***************************************************

                 PUSH BUTTON TESTS

02 0031   70 0201          MSGCOD=129      5. PUSH MAN TRIM
02 0032   44 3112
02 0033   70 7774          L=-3            NEGATIVE LOGIC, BIT 14
02 0034   36 0000          B=0             STATE0
02 0035   50 6401          CLRFL  1
02 0036   76 1130          CALL    BUTEST
02 0037   70 0202          MSGCOD=130      6. PUSH HEADING SELECT
02 0040   44 3112
02 0041   70 0006          L=6             BIT 11
02 0042   36 0001          B=1             STATE1
02 0043   76 1130          CALL    BUTEST
02 0044   70 0203          MSGCOD=131      7. PUSH ALT HOLD
```

```
02 0045   44 3112
02 0046   70 0011          L=9             BIT 8, STATE1
02 0047   76 1130          CALL    BUTEST
02 0050   70 0204          MSGCOD=132      8. PUSH ILS/LAND
02 0051   44 3112
02 0052   70 0001          L=1             BIT16, STATE1
02 0053   76 1130          CALL    BUTEST
02 0054   70 0205          MSGCOD=133      9. PUSH PITCH CWS
02 0055   44 3112
02 0056   70 0004          L=4             BIT 13, STATE1
02 0057   76 1130          CALL    BUTEST
02 0060   70 0206          MSGCOD=134      10. PUSH DIS-ARM
02 0061   44 3112
02 0062   70 0005          L=5             BIT12, STATE1
02 0063   76 1130          CALL    BUTEST
02 0064   70 0207          MSGCOD=135      11. PUSH TO/GA
02 0065   44 3112
02 0066   70 0010          L=8             BIT9
02 0067   36 0003          B=3             STATE3
02 0070   76 1130          CALL    BUTEST
02 0071   70 0210          MSGCOD=136      12. ENG 1ST F/D
02 0072   44 3112
02 0073   70 0013          L=11            BIT 6, STATE3
02 0074   76 1140          CALL    BITTST
02 0075   76 1165          CALL    ERRCR7
02 0076   70 0211          MSGCOD=137      13. DIS-ENG F/D
02 0077   44 3112
02 0100   70 7764          L=-11
02 0101   76 1140          CALL    BITTST
02 0102   76 1165          CALL    ERRCR7
02 0103   70 0212          MSGCOD=138      14. ENG CAPT F/D
02 0104   44 3112
02 0105   70 0010          L=8             BIT 9
02 0106   36 0004          B=4             STATE4
02 0107   76 1140          CALL    BITTST
02 0110   76 1165          CALL    ERRCR7
02 0111   70 0211          MSGCOD=137      15. DIS-ENG F/D
02 0112   44 3112
02 0113   70 7767          L=-8
02 0114   76 1140          CALL    BITTST
02 0115   76 1165          CALL    ERRCR7
```

FUNCTION BIT CHECKS (INPUT DISCRETE STATES)

DIAGNOSTIC NUMBERS 16 THRU 56

```
02 0116   40 3112            MSGCOD=0
02 0117   40 2534            MSGSAV=0
02 0120   76 1271            CALL    TIMERS
02 0121   36 0004            B=4
02 0122   11 0277   FUNCT2   U=STATE0(B)
02 0123   13 6113            L=SCADTB(B)
```

```
02 0124   50 7400            T=A
02 0125   42 2523            TEMPFT=B
02 0126   33 6120            B=NUMDCK(B)
02 0127   42 2525   FUNCT1   TMPPF2=B
02 0130   50 0102            B=B+L
02 0131   13 0000            IF      ADR0(B)!>=10 THEN LOK+2
02 0132   65 0134
02 0133   50 6300            A=-A
02 0134   50 0202            B=L
02 0135   34 0137            GO      LOK+2
02 0136   50 4501            LRTAU   1
02 0137   73 0136            BJP     LOK-1
02 0140   66 0142            IF      U!<10      THEN LOK+2
02 0141   76 1247            CALL    ERROR
02 0142   76 1326            CALL    INCDIA
02 0143   32 2525            B=TMPPF2
02 0144   50 7520            A=T
02 0145   73 0127            BJP     FUNCT1
02 0146   32 2523            B=TEMPFT
02 0147   73 0122            BJP     FUNCT2
02 0150   70 0252            MSGCOD=170
02 0151   44 3112
02 0152   36 0050            B=40
02 0153   42 2531   SYLOOP   PFHLDB=B
02 0154   36 0005            B=5
02 0155   76 4306            CALL    SYNCH
02 0156   73 3155            BJP     LOK-1
02 0157   12 2352            L=MEMRDA+KSFCOT
02 0160   24 5120
02 0161   50 0201            L=U
02 0162   76 1515            CALL    COMRDA
02 0163   12 2353            L=MEMRDB+KSFCOT
02 0164   24 5120
02 0165   50 0201            L=U
02 0166   76 1522            CALL    COMRDB
02 0167   12 2354            L=MEMALA+KSFCOT
02 0170   24 5120
02 0171   50 0201            L=U
02 0172   76 1527            CALL    COMALA
02 0173   12 2355            L=MEMALB+KSFCOT
02 0174   24 5120
02 0175   50 0201            L=U
02 0176   76 1534            CALL    COMALB
02 0177   12 2356            L=MEMELA+KSFCOT
02 0200   24 5120
02 0201   50 0201            L=U
02 0202   76 1541            CALL    COMELA
02 0203   12 2357            L=MEMELB+KSFCOT
02 0204   24 5120
02 0205   50 0201            L=U
02 0206   76 1546            CALL    COMELB
02 0207   70 0001            L=1
```

```
02 0210  76 1265         CALL   TIMER
02 0211  32 2531         A=PFHLOB
02 0212  73 0153         RJP    SYLOOP
         ******************************************************
          NULL CHECKS

          DIAGNOSTIC NUMBERS 57 THRU 107

02 0213  70 0174         MSGCOD=124      ALL NULLS V
02 0214  44 3112
02 0215  40 0076         ANSWER=0
02 0216  12 0076  NULCK1 IF     ANSWER:=:0 THEN NULCK1
02 0217  61 0216
02 0220  44 2533         DPTPFT=L
02 0221  76 1353         CALL   NULLCK

          DISCRETES ACTIVATED BY PILOT ACTION

02 0222  76 1326         CALL   INCDIA   SPARE
02 0223  70 0001         PFTOGF=1
02 0224  44 2532
02 0225  12 0002         DTOA02=DTOA02+BIT12  Y/D ENG. A
02 0226  14 4426
02 0227  44 2002
02 0230  12 0006         DTOA06=DTOA06+BIT13  Y/D ENG. B
02 0231  14 4427
02 0232  44 0006
02 0233  12 0010         DTOA08=DTOA08-BIT12  DELATCH
02 0234  16 4426
02 0235  44 0010
02 0236  70 7776         MSGSAV=-1
02 0237  44 2534
02 0240  12 0156         L=RDSADA
02 0241  76 1333         CALL   SERCHK
02 0242  12 0157         L=RDSADB
02 0243  76 1333         CALL   SERCHK
02 0244  12 0162         L=ELSADA
02 0245  76 1333         CALL   SERCHK
02 0246  12 0163         L=ELSADB
02 0247  76 1333         CALL   SERCHK
02 0250  12 0160         L=ALSADA
02 0251  76 1333         CALL   SERCHK
02 0252  12 0161         L=ALSADB
02 0253  76 1333         CALL   SERCHK
02 0254  70 0213         MSGCOD=139      SET FLP = 22 V
02 0255  44 3112
02 0256  76 1236         CALL   VERIFY
02 0257  70 0170         CLOCK=120       START 6 SECOND TIMER
02 0260  44 2522
02 0261  70 0214         MSGCOD=140      ENG Y/D - V
02 0262  44 3112
```

```
02 0263  76 1236         CALL   VERIFY
02 0264  12 0277         L=STATE0*2^4    YAW DAMPER B
02 0265  50 4604
02 0266  76 1173         CALL   ERRALP
02 0267  12 0277         L=STATE0*2^5
02 0270  50 4605
02 0271  76 1173         CALL   ERRALP
02 0272  70 0215         MSGCOD=141      ENG CWS V
02 0273  44 3112
02 0274  76 1236         CALL   VERIFY
02 0275  12 0302         L=STATE3*2^9    CMD SWITCH
02 0276  50 4611
02 0277  76 1200         CALL   ERRALN
02 0300  12 0303         L=STATE4*2^1    CWS SWITCH
02 0301  50 4601
02 0302  76 1173         CALL   ERRALP
```

-continued

```
02 0303   70 0216          MSGCOD=142      TUNE ILS -V
02 0304   44 3112
02 0305   76 1236          CALL   VERIFY
02 0306   12 0277          L=STATE0*2^8    ILS TUNED
02 0307   50 4610
02 0310   76 1200          CALL   ERRALN
02 0311   40 3112          MSGCOD=0
02 0312   76 1271          CALL   TIMERS
02 0313   12 0302          L=STATE3*2^4    FLAPS OUT OF DETENT
02 0314   50 4604
02 0315   76 1173          CALL   ERRALP
02 0316   12 0303          L=STATE4*2^4    FLAPS > 30 DEG
02 0317   50 4604
02 0320   76 1200          CALL   ERRALN
02 0321   12 0201          L=FLAPOS-DEG22
02 0322   16 4565
02 0323   50 0301          ABSVAL
02 0324   16 4556          L=L-DEG5
02 0325   76 1173          CALL   ERRALP
02 0326   12 0010          DTOA08=DTOA08-BIT11
02 0327   16 4425
02 0330   44 0010
02 0331   70 0217   PFT5   MSGCOD=143      ENGAGE COMMAND
02 0332   44 3112
02 0333   70 0310          CLOCK=200
02 0334   44 2522
02 0335   12 2522   PFT2   IF     CLOCK:=10 THEN PFT3
02 0336   61 0343
02 0337   12 0302          L=STATE3*2^9
02 0340   50 4611
02 0341   65 0335          IF     L:>=10   THEN PFT2
02 0342   34 0352          GO     PFT6
02 0343   70 0257   PFT3   MSGCOD=175      LAST TASK DONE?
02 0344   44 3112
02 0345   40 0076          ANSWER=0
02 0346   12 0076   PFT4   IF     ANSWER:=10 THEN PFT4
```

```
02 0347   61 0346
02 0350   67 0331          IF     L:<10    THEN PFT5
02 0351   76 1247          CALL   ERROR
02 0352   76 1326   PFT6   CALL   INCDIA
02 0353   70 7727          L=-40
02 0354   76 1515          CALL   COMRDA
02 0355   70 7727          L=-40           2 DEG. RUD
02 0356   76 1522          CALL   COMRDB
02 0357   70 0253          MSGCOD=171
02 0360   44 3112
02 0361   44 2534          MSGSAV=L
02 0362   70 0024          L=20
02 0363   76 1265          CALL   TIMER
02 0364   12 0164          L=RDRAMA-2.0DEG
02 0365   71 5117
02 0366   50 0301          ABSVAL
02 0367   71 6447          L=L-1.0DEG
02 0370   76 1173          CALL   ERRALP
02 0371   12 0165          L=RDRAMB-2.0DEG
02 0372   71 5117
02 0373   50 0301          ABSVAL
02 0374   71 6447          L=L-1.0DEG
02 0375   76 1173          CALL   ERRALP
02 0376   70 0050          L=40            -2 DEG RUD.
02 0377   76 1515          CALL   COMRDA
02 0400   70 0050          L=40            -2 DEG RUD
02 0401   76 1522          CALL   COMRDB
02 0402   70 0024          L=20
02 0403   76 1265          CALL   TIMER
02 0404   12 0164          L=RDRAMA+2.0DEG
02 0405   71 2660
```

-continued

```
02 0406  50 0301    ABSVAL
02 0407  71 6447    L=L-1.0DEG
02 0410  76 1173    CALL   ERRALP
02 0411  12 0165    L=RDRAMB+2.0DEG
02 0412  71 2660
02 0413  50 0301    ABSVAL
02 0414  71 6447    L=L-1.0DEG
02 0415  76 1173    CALL   ERRALP
02 0416  12 0004    DTOA04=DTOA04+BIT13  Y/D PAR. A
02 0417  14 4427
02 0420  44 0004
02 0421  12 0010    DTOA08=DTOA08-BIT10  Y/D PAR. B
02 0422  16 4424
02 0423  44 0010
02 0424  70 7467    L=-200           10 DEG RUD
02 0425  76 1515    CALL   CCMRDA
02 0426  70 7467    L=-200           10 DEG RUD
02 0427  76 1522    CALL   CCMRDB
02 0430  70 0050    L=40
02 0431  76 1265    CALL   TIMER
02 0432  12 0164    L=RDRAMA-DEGP10
```

```
02 0433  16 4561
02 0434  50 0301    ABSVAL
02 0435  71 6447    L=L-1.0DEG
02 0436  76 1173    CALL   ERRALP
02 0437  12 0165    L=RDRAMB-DEGP10
02 0440  16 4561
02 0441  50 0301    ABSVAL
02 0442  71 6447    L=L-1.0DEG
02 0443  76 1173    CALL   ERRALP
02 0444  70 0310    L=200
02 0445  76 1515    CALL   CCMRDA
02 0446  70 0310    L=200            -10 DEG RUD
02 0447  76 1522    CALL   CCMRDB
02 0450  70 0050    L=40
02 0451  76 1265    CALL   TIMER
02 0452  12 0164    L=RDRAMA-DEGM10
02 0453  16 4575
02 0454  50 0301    ABSVAL
02 0455  71 6447    L=L-1.0DEG
02 0456  76 1173    CALL   ERRALP
02 0457  12 0165    L=RDRAMB-DEGM10
02 0460  16 4575
02 0461  50 0301    ABSVAL
02 0462  71 6447    L=L-1.0DEG
02 0463  76 1173    CALL   ERRALP
02 0464  70 7777    L=-0
02 0465  76 1515    CALL   CCMRDA
02 0466  70 7777    L=-0
02 0467  76 1522    CALL   CCMRDB
02 0470  70 0050    L=40
02 0471  76 1265    CALL   TIMER
02 0472  12 0164    L=RDRAMA
02 0473  50 0301    ABSVAL
02 0474  71 6447    L=L-1.0DEG
02 0475  76 1173    CALL   ERRALP
02 0476  12 0165    L=RDRAMB
02 0477  50 0301    ABSVAL
02 0500  71 6447    L=L-1.0DEG
02 0501  76 1173    CALL   ERRALP
02 0502  70 0220    L=144            "SET FLP = 35 V"
02 0503  76 1236    CALL   VERIFY
02 0504  12 0011    DTOA09=DTOA09+BIT10  PIT LND ENG
02 0505  14 4424
02 0506  44 0011
02 0507  12 0010    DTOA08=DTOA08-BIT13  ROLL LND ENG
02 0510  16 4427
02 0511  44 0010
```

```
1F196 SCAMP                          SECTION      71       PAGE      229
                                     -continued

02 0512   70 0214         L=140
02 0513   76 1541         CALL    CCMELA
02 0514   70 0214         L=140
02 0515   76 1546         CALL    CCMELB
02 0516   70 0310         L=200

1F198 SCAMP                          SECTION      71       PAGE      230

02 0517   76 1527         CALL    COMALA
02 0520   70 7467         L=-200
02 0521   76 1534         CALL    CCMALB
02 0522   70 2253         MSGCOD=171
02 0523   44 3112
02 0524   70 0310         L=200
02 0525   76 1265         CALL    TIMER
02 0526   12 0166         L=ALRAMA-DEGP10
02 0527   16 4561
02 0530   50 0301         ABSVAL
02 0531   71 5117         L=L-2,0DEG
02 0532   76 1173         CALL    ERRALP
02 0533   12 0167         L=ALRAMB-DEGP10
02 0534   16 4561
02 0535   50 0301         ABSVAL
02 0536   71 5117         L=L-2,0DEG
02 0537   76 1173         CALL    ERRALP
02 0540   12 0170         L=ELRAMA-DEGP7
02 0541   16 6767
02 0542   50 0301         ABSVAL
02 0543   71 6447         L=L-1,0DEG
02 0544   76 1173         CALL    ERRALP
02 0545   12 0171         L=ELRAMB-DEGP7
02 0546   16 6767
02 0547   50 0301         ABSVAL
02 0550   71 6447         L=L-1,0DEG
02 0551   76 1173         CALL    ERRALP
02 0552   70 7563         L=-140
02 0553   76 1541         CALL    CCMELA
02 0554   70 7563         L=-140
02 0555   76 1546         CALL    COMELB
02 0556   70 7467         L=-200
02 0557   76 1527         CALL    CCMALA
02 0560   70 0310         L=200
02 0561   76 1534         CALL    CCMALB
02 0562   70 0310         L=200
02 0563   76 1265         CALL    TIMER
02 0564   12 0166         L=ALRAMA-DEGM10
02 0565   16 4575
02 0566   50 0301         ABSVAL
02 0567   71 5117         L=L-2,0DEG
02 0570   76 1173         CALL    ERRALP
02 0571   12 0167         L=ALRAMB-DEGM10
02 0572   16 4575
02 0573   50 0301         ABSVAL
02 0574   71 5117         L=L-2,0DEG
02 0575   76 1173         CALL    ERRALP
02 0576   12 0170         L=ELRAMA+DEGP7
02 0577   14 6767
02 0600   50 0301         ABSVAL
02 0601   71 6447         L=L-1,0DEG
02 0602   76 1173         CALL    ERRALP

1B196 SCAMP                          SECTION      71       PAGE      231

02 0603   12 0171         L=ELRAMB+DEGP7
02 0604   14 6767
02 0605   50 0301         ABSVAL
02 0606   71 6447         L=L-1,0DEG
02 0607   76 1173         CALL    ERRALP
02 0610   70 7777         L=-0
```

```
02 0611  76 1541    CALL   COMELA
02 0612  70 7777    L=-Ø
02 0613  76 1546    CALL   COMELB
02 0614  70 7777    L=-Ø
02 0615  76 1527    CALL   COMALA
02 0616  70 7777    L=-Ø
02 0617  76 1534    CALL   COMALB
02 0620  70 0144    L=10Ø
02 0621  76 1265    CALL   TIMER
02 0622  12 0166    L=ALRAMA
02 0623  50 0301    ABSVAL
02 0624  71 5117    L=L-2.ØDEG
02 0625  76 1173    CALL   ERRALP
02 0626  12 0167    L=ALRAMB
02 0627  50 0301    ABSVAL
02 0630  71 5117    L=L-2.ØDEG
02 0631  76 1173    CALL   ERRALP
02 0632  12 0170    L=ELRAMA
02 0633  50 0301    ABSVAL
02 0634  71 6447    L=L-1.ØDEG
02 0635  76 1173    CALL   ERRALP
02 0636  12 0171    L=ELRAMB
02 0637  50 0301    ABSVAL
02 0640  71 6447    L=L-1.ØDEG
02 0641  76 1173    CALL   ERRALP
02 0642  40 2532    PFTOGF=Ø
02 0643  76 1475    CALL   CLERDA
02 0644  70 0024    L=2Ø
02 0645  76 1265    CALL   TIMER
02 0646  70 7776    MSGSAV=-1
02 0647  44 2534
02 0650  70 0221    L=145
02 0651  76 1236    CALL   VERIFY
02 0652  70 0222    L=146
02 0653  76 1236    CALL   VERIFY
02 0654  70 0223    L=147
02 0655  76 1236    CALL   VERIFY
02 0656  12 0302    L=STATE3*2^9     CMD OFF
02 0657  50 4611
02 0660  76 1200    CALL   ERRALN
02 0661  12 0303    L=STATE4*2^1     CWS OFF
02 0662  50 4601
02 0663  76 1200    CALL   ERRALN
02 0664  12 0277    L=STATEØ*2^4     Y/D OFF
02 0665  50 4604
02 0666  76 1200    CALL   ERRALN
```

```
02 0667  12 0302    L=STATE3*2^4     FLAP O.D.
02 0670  50 4604
02 0671  76 1173    CALL   ERRALP
02 0672  12 0303    L=STATE4*2^4     FLAPS>3Ø
02 0673  50 4604
02 0674  76 1173    CALL   ERRALP
02 0675  12 0201    L=FLAPOS-DEG35
02 0676  16 4573
02 0677  50 0301    ABSVAL
02 0700  16 4556    L=L-DEG5
02 0701  76 1173    CALL   ERRALP
02 0702  70 2251    MSGCOD=169
02 0703  44 3112
02 0704  70 0062    L=5Ø
02 0705  76 1265    CALL   TIMER
02 0706  70 0231    L=153            NOM F/D V
02 0707  76 1236    CALL   VERIFY
02 0710  70 0175    L=125
02 0711  10 4476    U=OUTMSK
02 0712  50 6200    CPAU
02 0713  04 0005    SLSU   DTOAO5    CAPT. P.
```

```
02 0714   44 0005        DTOA05=L
02 0715   70 0175        L=125
02 0716   04 0010        SLSU   DTOA08
02 0717   44 0010        DTOA08=L          1ST OFC. P.
02 0720   70 0175        L=125
02 0721   04 0004        SLSU   DTOA04
02 0722   44 0004        DTOA04=L          CAPT. R.
02 0723   70 0175        L=125
02 0724   04 0011        SLSU   DTOA09
02 0725   44 0011        DTOA09=L          1ST OFC. R.
02 0726   70 0175        L=125
02 0727   04 0012        SLSU   DTOA10
02 0730   44 0012        DTOA10=L           CAPT. Y.
02 0731   70 0175        L=125
02 0732   04 0013        SLSU   DTOA11
02 0733   44 0013        DTOA11=L          1ST OFC Y.
02 0734   70 0232        L=154
02 0735   76 1236        CALL   VERIFY
02 0736   12 0003        DTOA03=DTOA03-BIT11-BIT12
02 0737   16 4425
02 0740   16 4426
02 0741   44 0003
02 0742   40 3112        MSGCOD=0
02 0743   40 2534        MSGSAV=0
02 0744   70 0012        L=10
02 0745   76 1265        CALL   TIMER
02 0746   12 0136        L=ACCLXA+TSTACC
02 0747   14 6777
02 0750   50 0301        ABSVAL
02 0751   71 7532        L=L-165           5 PERCENT
02 0752   76 1173        CALL   ERRALP
```

```
02 0753   12 0137        L=ACCLXB+TSTACC
02 0754   14 6777
02 0755   50 0301        ABSVAL
02 0756   71 7532        L=L-165
02 0757   76 1173        CALL   ERRALP
02 0760   12 0140        L=ACCLYA+TSTACC
02 0761   14 6777
02 0762   50 0301        ABSVAL
02 0763   71 7532        L=L-165
02 0764   76 1173        CALL   ERRALP
02 0765   12 0141        L=ACCLYB+TSTACC
02 0766   14 6777
02 0767   50 0301        ABSVAL
02 0770   71 7532        L=L-165
02 0771   76 1173        CALL   ERRALP
02 0772   12 0142        L=ACCLZA-TSTACC
02 0773   16 6777
02 0774   50 0301        ABSVAL
02 0775   71 7532        L=L-165
02 0776   76 1173        CALL   ERRALP
02 0777   12 0143        L=ACCLZB-TSTACC
02 1000   16 6777
02 1001   50 0301        ABSVAL
02 1002   71 7532        L=L-165
02 1003   76 1173        CALL   ERRALP
02 1004   12 0124        L=YAWRTA+TSTYRT
02 1005   14 7000
02 1006   50 0301        ABSVAL
02 1007   71 7445        L=L-218           10 PERCENT
02 1010   76 1173        CALL   ERRALP
02 1011   12 0125        L=YAWRTB+TSTYRT
02 1012   14 7000
02 1013   50 0301        ABSVAL
02 1014   71 7445        L=L-218
02 1015   76 1173        CALL   ERRALP
02 1016   70 0236        L=158
```

```
02 1017  36 0203          ENTBK  CCLCAP
02 1020  76 1206          CALL   CWSCKP
02 1021  70 0233          L=155
02 1022  76 1222          CALL   CWSCKN
02 1023  70 0234          L=156
02 1024  36 0202          ENTBK  WHLCAP
02 1025  76 1222          CALL   CWSCKN
02 1026  70 0235          L=157
02 1027  76 1206          CALL   CWSCKP
02 1030  70 0237          L=159
02 1031  36 0205          ENTBK  COLIST
02 1032  76 1206          CALL   CWSCKP
02 1033  70 0240          L=160
02 1034  76 1222          CALL   CWSCKN
02 1035  70 0242          L=162
02 1036  36 0204          ENTBK  WHLIST
```

```
02 1037  76 1222          CALL   CWSCKN
02 1040  70 0241          L=161
02 1041  76 1206          CALL   CWSCKP
02 1042  40 3112          MSGCOD=0
02 1043  76 1475          CALL   CLERDA
02 1044  12 0003          DTOA03=DTOA03-BIT10
02 1045  16 4424
02 1046  44 0003
02 1047  70 0005          L=5
02 1050  76 1265          CALL   TIMER
02 1051  76 1475          CALL   CLERDA
       *****************************************************

         END OF PREFLIGHT

02 1052  12 2406          IF     FAILNM:=10 THEN PFTOKL
02 1053  61 1110
02 1054  70 0255          MSGCOD=173      PRE-FLIGHT TEST COMP
02 1055  44 3112
02 1056  70 0144          L=100
02 1057  76 1265          CALL   TIMER
02 1060  70 0256  PFTLST  MSGCOD=174      LIST FAILURES?
02 1061  44 3112
02 1062  40 0076          ANSWER=0
02 1063  12 0076  PFTWT   IF     ANSWER:=10 THEN PFTWT
02 1064  61 1063
02 1065  67 1114          IF     L:<10    THEN FORGIT
02 1066  40 2405          FAUPNM=0
02 1067  40 2404          FIRSTP=0
02 1070  30 1555  LISTER  ICALL  REHASH
02 1071  40 0076          ANSWER=0
02 1072  12 2404          IF     FIRSTP:>=10 THEN PFTLST
02 1073  65 1060
02 1074  12 0076  PFTWT1  IF     ANSWER:=10 THEN PFTWT1
02 1075  61 1074
02 1076  67 1070          IF     L:<10    THEN LISTER
02 1077  12 2405          IF     FAUPNM:=10 THEN LISTER
02 1100  61 1070
02 1101  13 2406          L=FAILNM(B)+2A-9:AND:MSGMSK
02 1102  50 4211
02 1103  52 4477
02 1104  61 1070          IF     L:=10    THEN LISTER
02 1105  44 2526          DIAGNO=L
02 1106  76 1461          CALL   DISDIA
02 1107  34 1071          GO     LISTER+1
02 1110  70 0175  PFTOKL  MSGCOD=125      PRE-FLIGHT OK
02 1111  44 3112
02 1112  70 0144          L=100
02 1113  76 1265          CALL   TIMER
02 1114  70 7777  FORGIT  MSGCOD=-0
02 1115  44 3112
02 1116  70 0001          L=1
```

```
02 1117  76 1265           CALL   TIMER
02 1120  40 2406           FAILNM=0
02 1121  40 2405           FAUPNM=0
02 1122  40 2404           FIRSTP=0
02 1123  70 0024           OFFPAS=20
02 1124  44 2512
02 1125  40 2527           PFTFLG=0
02 1126  40 2530           PFSTRT=0
02 1127  55 0000           RETURN PFT
```

```
                  ***************************************

02 1130  00 0000  BUTEST   SUBRTN
02 1131  76 1140           CALL   BITTST
02 1132  76 1140           CALL   BITTST
02 1133  50 5101           SKPNFL 1
02 1134  76 1247           CALL   ERROR
02 1135  76 1326           CALL   INCDIA
02 1136  50 6401           CLRFL  1
02 1137  55 1130           RETURN BUTEST
                  *************************************

                   BIT TEST SUBROUTINE

                           ENTER WITH B=STATE NUMBER
                                  AND  AL=+(17-BIT NUMBER) FOR SET TEST
                                  OR   AL=-(17-BIT NUMBER) FOR CLEAR TEST

02 1140  00 0000  BITTST   SUBRTN
02 1141  44 2524           TMPPF1=L
02 1142  40 0076           ANSWER=0
02 1143  13 0277  BITST1   L=STATE0(B)
02 1144  10 2524           U=TMPPF1
02 1145  64 1147           IF     U:>=:0    THEN LOK+2
02 1146  50 6300           A=-A
02 1147  50 7206           ENTICR 6
02 1150  50 0204           B=U
02 1151  34 1153           GO     LOK+2
02 1152  50 4601           L=L*2^1
02 1153  73 1152           BJP    LOK-1
02 1154  50 7207           ENTICR 7
02 1155  10 0076           IF     U,ANSWER:<:0 THEN BITST2
02 1156  66 1162
02 1157  67 1162           IF     L:<:0     THEN BITST2
02 1160  60 1143           IF     U:=:0     THEN BITST1
02 1161  50 6501           SETFL  1
02 1162  12 2524  BITST2   L=-TMPPF1
02 1163  50 6100
02 1164  55 1140           RETURN BITTST

                  *************************************

                   ERROR CHECK ROUTINES

02 1165  00 0000  ERROR?   SUBRTN              FLAG 1 SET=ERROR
02 1166  50 5101           SKPNFL 1
02 1167  76 1247           CALL   ERROR
02 1170  76 1326           CALL   INCDIA
02 1171  50 6401           CLRFL  1
02 1172  55 1165           RETURN ERROR?
```

```
02 1173  00 0000  ERRALP   SUBRTN              AL POSITIVE = ERROR
02 1174  67 1176           IF     L:<:0     THEN LOK+2
02 1175  76 1247           CALL   ERROR
02 1176  76 1326           CALL   INCDIA
02 1177  55 1173           RETURN ERRALP
```

-continued

```
 18198 SCAMP                                 SECTION        71        PAGE        237

02 1200   00 0000   ERRALN   SUBRTN               AL NEGATIVE=ERROR
02 1201   65 1203            IF      L:>=:0    THEN LOK+2
02 1202   76 1247            CALL    ERROR
02 1203   76 1326            CALL    INCDIA
02 1204   55 1200            RETURN ERRALN
02 1205   55 1200            RETURN ERRALN

02 1206   00 0000   CWSCKP   SUBRTN               CWS CHECK FOR POSITIVE
02 1207   44 3112            MSGCOD=L
02 1210   40 0076            ANSWER=0
02 1211   10 0076   CWSCP1   IF      U,ANSWER:<:0 THEN CWSCP2
02 1212   66 1220
02 1213   13 0000            L=ADR0(B)-1280
02 1214   71 5377
02 1215   65 1220            IF      L:>=:0    THEN CWSCP2
02 1216   60 1211            IF      U:=:0     THEN CWSCP1
02 1217   76 1247            CALL    ERROR
02 1220   76 1326   CWSCP2   CALL    INCDIA
02 1221   55 1206            RETURN CWSCKP

02 1222   00 0000   CWSCKN   SUBRTN               CWS CHECK FOR NEGATIVE
02 1223   44 3112            MSGCOD=L
02 1224   40 0076            ANSWER=0
02 1225   10 0076   CWSCN1   IF      U,ANSWER:<:0 THEN CWSCN2
02 1226   66 1234
02 1227   13 0000            L=ADR0(B)+1280
02 1230   71 2400
02 1231   67 1234            IF      L:<:0     THEN CWSCN2
02 1232   60 1225            IF      U:=:0     THEN CWSCN1
02 1233   76 1247            CALL    ERROR
02 1234   76 1326   CWSCN2   CALL    INCDIA
02 1235   55 1222            RETURN CWSCKN

                    **************************************

02 1236   00 0000   VERIFY   SUBRTN
02 1237   44 3112            MSGCOD=L
02 1240   40 0076            ANSWER=0
02 1241   12 0076   VERIF1   IF      ANSWER:=:0 THEN VERIF1
02 1242   61 1241
02 1243   65 1245            IF      L:>=:0    THEN LOK+2
02 1244   76 1247            CALL    ERROR
 18198 SCAMP                                 SECTION        71        PAGE        238

02 1245   76 1326            CALL    INCDIA
02 1246   55 1236            RETURN VERIFY

 18198 SCAMP                                 SECTION        71        PAGE        239

                    **************************************

02 1247   00 0000   ERROR    SUBRTN
02 1250   76 1342            CALL    FAIPNT
02 1251   40 0076            ANSWER=0
02 1252   12 0076   ERROR1   IF      ANSWER:=:0 THEN ERROR1
02 1253   61 1252
02 1254   67 1257            IF      L:<:0     THEN ERROR2
02 1255   76 1461            CALL    DISDIA
02 1256   34 1251            GO      ERROR1-1
02 1257   12 2534   ERROR2   IF      MSGSAV:<:0 THEN ERROR3
02 1260   67 1264
02 1261   44 3112            MSGCOD=L
02 1262   70 0024            L=20
02 1263   76 1265            CALL    TIMER
02 1264   55 1247   ERROR3   RETURN ERROR
```

```
                    ****************************

02 1265   00 0000  TIMER    SUBRTN
02 1266   44 2522           CLOCK=L
02 1267   76 1271           CALL   TIMERS
02 1270   55 1265           RETURN TIMER

                    ****************************

02 1271   00 0000  TIMERS   SUBRTN
02 1272   12 2522  TIMRS1   IF     CLOCK:/=:0 THEN TIMRS1
02 1273   63 1272
02 1274   55 1271           RETURN TIMERS
                    ***************************************

02 1275   00 0000  TLOC     SUBRTN          CALLED EVERY 50 MS FROM EXEC
02 1276   57 2522           ISK    CLOCK
02 1277   50 0000           NOOP
02 1300   12 2532           IF     PFTOGF:=:0 THEN XITLOC
02 1301   61 1325
02 1302   12 0005           DTOA05=DTOA05:XOR:BIT10
02 1303   53 4424
02 1304   44 0005
02 1305   12 0303           L=STATE4+2A1
02 1306   50 4001
02 1307   65 1317           IF     L:>=:0   THEN TLOC1
02 1310   12 0002           DTOA02=DTOA02:OR:BIT10
02 1311   51 4424
02 1312   44 0002
02 1313   12 0006           DTOA06=DTOA06:OR:BIT11
02 1314   51 4425
02 1315   44 0006
02 1316   34 1325           GO     XITLOC
02 1317   12 0002  TLOC1    DTOA02=DTOA02:AND:BIT10N
02 1320   52 4446
02 1321   44 0002
02 1322   12 0006           DTOA06=DTOA06:AND:BIT11N
02 1323   52 4447
02 1324   44 0006
02 1325   55 1275  XITLOC   RETURN TLOC

                    *****************************************

02 1326   00 0000  INCDIA   SUBRTN
02 1327   12 2526           DIAGNO=DIAGNO+1
02 1330   71 0001
02 1331   44 2526
02 1332   55 1326           RETURN INCDIA
```

```
                    ***************************************

                      SERVC SYNCH CHECK

02 1333   00 0000  SERCHK   SUBRTN
02 1334   50 0301           ABSVAL
02 1335   16 4556           L=L-RDSERL
02 1336   67 1340           IF     L:<:0    THEN LOK+2
02 1337   76 1247           CALL   ERROR
02 1340   76 1326           CALL   INCDIA
02 1341   55 1333           RETURN SERCHK

                    ***********************************************

                      PRINTS FAILURE MESSAGES

02 1342   00 0000  FAIPNT   SUBRTN
02 1343   42 2531           PFHLDB=B
02 1344   32 2526           B=DIAGNO
```

-continued

```
                     PRINTS FAILURE MESSAGES

02 1345  13 6427          L=FAIADR(B)
02 1346  30 1554          ICALL  FAILRC
02 1347  52 4477          MSGCOD=L:AND:MSGMSK
02 1350  44 3112
02 1351  32 2531          B=PFHLDB
02 1352  55 1342          RETURN FAIPNT
                 ************************************************

                     SENSOR NULL CHECKS

02 1353  00 0000  NULLCK  SUBRTN
02 1354  36 0000          B=0
02 1355  13 6176          IF     SENADR(B):>=:0 THEN NULCK2
02 1356  65 1361
02 1357  10 2533          IF     U,OPTPFT:<:0 THEN NULREN
02 1360  66 1374
02 1361  52 7206  NULCK2  B(6)=L,L:AND:ADRMSK
02 1362  52 4210
02 1363  50 7206
02 1364  50 0202
02 1365  13 0000          L=ADR0(B)
02 1366  50 2200          U=L
02 1367  50 0301          ABSVAL
02 1370  50 7207          IF     L:<:NOMNUL(7) THEN LOK+2
02 1371  03 6344
02 1372  67 1374
02 1373  75 1400          CALL   NULDIS
02 1374  76 1326  NULREN  CALL   INCDIA
02 1375  56 4506          BSK    D50
02 1376  34 1355          GO     NULLCK+2
02 1377  55 1353          RETURN NULLCK
```

```
                 ****************************************

                     NULL VALUE DISPLAY

02 1400  00 0000  NULDIS  SUBRTN
02 1401  40 3112          MSGCOD=0
02 1402  13 6176          L=SENADR(B)*2A-15
02 1403  50 4217
02 1404  52 4501          L=L:AND:NULMSK
02 1405  50 7201          B(1)=L
02 1406  50 7202
02 1407  50 0201          L=U*FCTR10(B)
02 1410  25 4057
02 1411  50 7207          L=A/SENSCL(7)
02 1412  27 6201
02 1413  50 7201          ENTICR 1
02 1414  30 1553          ICALL  DISCE1
02 1415  50 7207          ENTICR 7
02 1416  50 0203          L=B-6          CHECK UNITS
02 1417  71 7771
02 1420  67 1435          IF     L:<:0    THEN DGPSEC
02 1421  71 7773          L=L-4
02 1422  67 1431          IF     L:<:0    THEN DEGRES
02 1423  71 7771          L=L-6
02 1424  67 1433          IF     L:<:0    THEN FPSEC2
02 1425  71 7773          L=L-4
02 1426  67 1431          IF     L:<:0    THEN DEGRES
02 1427  71 7773          L=L-4
02 1430  67 1437          IF     L:<:0    THEN FEET
02 1431  70 1513  DEGRES  L=01513
02 1432  34 1440          GO     FEET+1
02 1433  70 1523  FPSEC2  L=01523
02 1434  34 1440          GO     FEET+1
02 1435  70 1514  DGPSEC  L=01514
02 1436  34 1440          GO     FEET+1
```

```
                        NULL VALUE DISPLAY

02 1437  70 1324  FEET    L=01324
02 1440  44 3122          MSGC08=L
02 1441  70 1000          MSGC09=01000
02 1442  44 3123
02 1443  70 1777          MSGC01=01777
02 1444  44 3113
02 1445  50 0203          L=B
02 1446  71 3105          MSGCOD=L+03105
02 1447  44 3112
02 1450  40 0076          ANSWER=0
02 1451  12 0076  NULOS1  IF      ANSWER:=10 THEN NULOS1
02 1452  61 1451
02 1453  67 1456          IF      L:<10    THEN NULOS2
02 1454  76 1461          CALL    DISDIA
02 1455  34 1451          GO      NULOS1
02 1456  76 1342  NULOS2  CALL    FAIPNT
02 1457  40 3112          MSGCOD=0
```

```
02 1460  55 1400          RETURN NULDIS
```

```
                        ******************************************************

                          DISPLAYS DIAGNOSTIC
                              NUMBER

02 1461  00 0000  DISDIA  SUBRTN
02 1462  50 7206          ENTICR 6
02 1463  12 2526          L=DIAGNO
02 1464  30 1556          ICALL  INTGER
02 1465  70 3254          MSGCOD=03254
02 1466  44 3112
02 1467  50 7207          ENTICR 7
02 1470  55 1461          RETURN DISDIA
```

```
                        ******************************************************

                          PREFLIGHT SERVO OUTPUT
                               SET-UP

02 1471  00 0000  PFTSER  SUBRTN
02 1472  10 4476          U=OUTMSK
02 1473  50 6300          A=-A
02 1474  55 1471          RETURN PFTSER
                        ******************************************************

                          INITIALIZE D/AS AND OUTPUT
                          DISCRETES FOR PRE-FLIGHT

02 1475  00 0000  CLERDA  SUBRTN
02 1476  36 0013          B=11
02 1477  41 7000          DTDADT(B)=0
02 1500  73 1477          BJP     LCK=1
02 1501  12 0003          DTOA03=DTOA03+BIT10+BIT11+BIT12
02 1502  14 4424
02 1503  14 4425
02 1504  14 4426
02 1505  44 7003
02 1506  12 0010          DTOA08=DTOA08+BIT10+BIT11+BIT12+BIT13
02 1507  14 4424
```

```
                        INITIALIZE D/AS AND OUTPUT
                        DISCRETES FOR PRE-FLIGHT

02 1510  14 4425
02 1511  14 4426
02 1512  14 4427
02 1513  44 0010
02 1514  55 1475               RETURN CLERDA

                       ******************************

02 1515  00 0000  COMRDA  SUBRTN
02 1516  76 1471          CALL    PFTSER
02 1517  04 0000          SLSU    DTOA0T
02 1520  44 0000          DTOA0T=L
02 1521  55 1515          RETURN COMRDA

                       *****************************************

02 1522  00 0000  COMRDB  SUBRTN
02 1523  76 1471          CALL    PFTSER
02 1524  04 0003          SLSU    DTOA03
02 1525  44 0003          DTOA03=L
02 1526  55 1522          RETURN COMRDB

                       *****************************************

02 1527  00 0000  COMALA  SUBRTN
02 1530  76 1471          CALL    PFTSER
02 1531  04 0001          SLSU    DTOA01
```

```
02 1532  44 0001          DTOA01=L
02 1533  55 1527          RETURN COMALA

                       *****************************************

02 1534  00 0000  COMALB  SUBRTN
02 1535  76 1471          CALL    PFTSER
02 1536  04 0007          SLSU    DTOA07
02 1537  44 0007          DTOA07=L
02 1540  55 1534          RETURN COMALB

                       *****************************************

02 1541  00 0000  COMELA  SUBRTN
02 1542  76 1471          CALL    PFTSER
02 1543  04 0002          SLSU    DTOA02
02 1544  44 0002          DTOA02=L
02 1545  55 1541          RETURN COMELA

                       *****************************************

02 1546  00 0000  COMELB  SUBRTN
02 1547  76 1471          CALL    PFTSER
02 1550  04 0006          SLSU    DTOA06
02 1551  44 0006          DTOA06=L
02 1552  55 1546          RETURN COMELB

                       *****************************************************

                          ADDRESSES

02 1553  00 3272  DISDE1  #DISDEC
02 1554  20 4324  FAILRC  #FAILST
02 1555  00 4262  REHASH  #FAILUP
02 1556  00 3333  INTGER  #INTGR3

                  NO REF:      RDSERL
                  NO REF:      MSGC04
                  NO REF:      MSGC03
                  NO REF:      MSGC02
```

```
        START  024000
********************************************

  OUTPUT MONITORING AND CONVERSION


        MODIFY
ALEQ1A
AUTENG
DTOAOT
DTOA01
DTOA02
DTOA03
DTOA04
DTOA05
DTOA06
DTOA07
DTOA08
DTOA09
DTOA10
DTOA11
DUALFG
MAKEIT
MEMALB
MEMELB
MSPENG
RDEQ1B
SLNDTM
SYNTIM
TEMPB3
YDENGF
YDNOT

        REFER
AILAVA
AILC1A
AILC1B
AILLM
ALRAMA
ALSADA
ALSADB
BIT13
DEGONE
DEG1P5
DEG2
DEG2P5
DISA01
ELSADA
ELSADB
ELVC1A
ELVC1B
EQLDDZ
```

```
GSBAD
KEQULZ
KREQ1B
LNDFLG
LOCBAD
OUTMSK
PFDC1A
PFDC1B
PFTFLG
PITENG
RDMODA
RDMODB
RDSADA
RDSADB
RDSERL
RFDC1A
```

```
                    RFDC1B
                    ROLENG
                    RUDC1A
                    RUDC1B
                    STATE3

02 4000   00 0000   OUTSET  SUBRTN
02 4001   12 2527           IF      PFTFLG:/=:0 THEN BYPASS
02 4002   63 4273
                    ******************************************
                      RUDDER OUTPUTS - SERVO DRIVE

02 4003   36 0001           B=1
02 4004   12 2305           IF      YDENGF:>:0 THEN PARLEL
02 4005   61 4007
02 4006   65 4012
02 4007   76 4306           CALL    SYNCH
02 4010   73 4007           BJP     LOK-1
02 4011   34 4014           GO      RUDREN
02 4012   76 4322   PARLEL  CALL    SYNWOT
02 4013   73 4012           BJP     LOK-1
02 4014   10 0310   RUDREN  IF      U,DUALFG:=:0 THEN ALELSF
02 4015   60 4031
02 4016   12 0172           L=RDMODA-RDMODB
02 4017   16 0173
02 4020   10 4550           U=DEGONE
02 4021   30 4030           ICALL   LIMITB
02 4022   24 5123           L=L*KREQ1B*2A-16
02 4023   50 4320
02 4024   36 0007           B=7
02 4025   76 4277           CALL    INTGSR
02 4026   10 4551           U=DEG1P5
02 4027   30 4030           ICALL   LIMITB
02 4030   44 2331           RDEQ1B=L
```

```
                    ****************************
                    AILERON AND ELEVATOR OUTPUTS

02 4031   36 0002   ALELSF  B=2
02 4032   12 2257           IF      MSPENG:>:0 THEN SFDUAL
02 4033   61 4035
02 4034   65 4043
02 4035   70 0357           SYNTIM=239
02 4036   44 2360
02 4037   76 4306           CALL    SYNCH
02 4040   36 0004           B=4
02 4041   76 4306           CALL    SYNCH
02 4042   34 4046           GO      SFREN1
02 4043   76 4322   SFDUAL  CALL    SYNWOT
02 4044   36 0004           B=4
02 4045   76 4322           CALL    SYNWOT
02 4046   36 0003   SFREN1  B=3
02 4047   12 0310           IF      DUALFG:/=:0 THEN SFDUL1
02 4050   63 4061
02 4051   76 4306           CALL    SYNCH
02 4052   16 1111           MEMALB=L-AILC1B
02 4053   44 2355
02 4054   36 0005           B=5
02 4055   76 4306           CALL    SYNCH
02 4056   14 1110           MEMELB=L+ELVC1B
02 4057   44 2357
02 4060   34 4114           GO      SCHANA
02 4061   76 4322   SFDUL1  CALL    SYNWOT
02 4062   36 0005           B=5
02 4063   76 4322           CALL    SYNWOT
```

AILERON AND ELEVATOR OUTPUTS

```
02 4064  36 0003          B=3
02 4065  13 0166  EQULOP  L=ALRAMA(B)
02 4066  11 5112          U=AILLM(B)
02 4067  30 4630          ICALL  LIMITA
02 4070  44 2472          TEMPB3=L
02 4071  13 0174          L=AILAVA(B)
02 4072  11 5112          U=AILLM(B)
02 4073  30 4630          ICALL  LIMITA
02 4074  16 2472          L=L-TEMPB3
02 4075  10 5116          U=EQLDDZ
02 4076  30 4631          ICALL  DEDZNA
02 4077  10 4552          U=DEG2
02 4100  30 4630          ICALL  LIMITA
02 4101  57 2360          ISK    SYNTIM
02 4102  50 4602          L=L*2A2
02 4103  24 5117          L=L*KEQULZ
02 4104  50 0201          L=U
02 4105  37 0010          B=B+8
02 4106  76 4277          CALL   INTGSR
02 4107  37 7767          B=B-8
02 4110  10 4553          U=DEG2P5
```

```
02 4111  30 4630          ICALL  LIMITA
02 4112  45 2332          ALEQ1A(B)=L
02 4113  73 4065          BJP    EQULOP
02 4114  36 0000  SCHANA  B=0
02 4115  12 0220          L=RUDC1A
02 4116  76 4334          CALL   SFCSCL
02 4117  44 0000          DTOA0T=L
02 4120  12 1107          L=RUDC1B
02 4121  76 4334          CALL   SFCSCL
02 4122  44 0003          DTOA03=L
02 4123  12 0222          L=AILC1A
02 4124  76 4334          CALL   SFCSCL
02 4125  44 0001          DTOA01=L
02 4126  12 1111          L=-AILC1B
02 4127  50 0100
02 4130  76 4334          CALL   SFCSCL
02 4131  44 0007          DTOA07=L
02 4132  12 0221          L=ELVC1A
02 4133  76 4334          CALL   SFCSCL
02 4134  44 0002          DTOA02=L
02 4135  12 1110          L=ELVC1B
02 4136  76 4334          CALL   SFCSCL
02 4137  44 0006          DTOA06=L
                  ************************************************
```

CAPTAINS FLIGHT DIRECTOR

```
02 4140  12 0224          DTOA05=PFDC1A
02 4141  44 0005
02 4142  12 0223          DTOA04=RFDC1A
02 4143  44 0004
02 4144  70 0764          DTOA10=500
02 4145  44 0012
02 4146  12 1113          DTOA08=PFDC1B
02 4147  44 0010
02 4150  12 1112          DTOA09=RFDC1B
02 4151  44 0011
02 4152  70 0764          DTOA11=500
02 4153  44 0013
02 4154  12 2477          IF     GSBAD1/=10 THEN PFDFSC
02 4155  63 4160
02 4156  12 0265          IF     PITENG1/=10 THEN RFDCHK
02 4157  63 4163
02 4160  70 0764  PFDFSC  DTOA05=500
02 4161  44 0005
```

CAPTAINS FLIGHT DIRECTOR

```
02 4162  44 0010          DTOA08=L
02 4163  12 2476  RFDCHK  IF      LOCRAD1/=10 THEN RFDFSC
02 4164  63 4167
02 4165  12 0263          IF      ROLENG1/=10 THEN DTLOOP=1
02 4166  63 4172
02 4167  70 0754  RFDFSC  DTOA04=500
02 4170  44 0004
```

```
02 4171  44 0011          DTOA09=L
02 4172  36 0013          B=11
02 4173  10 4476  DTLOOP  U=OUTMSK
02 4174  13 0226          L=DISA01(B)
02 4175  05 0000          SLSUB  DTOADT
02 4176  45 0000          DTOADT(B)=L
02 4177  73 4173          BJP    DTLOOP
                  *****************************************
```

RUDDER ENGAGE LOGIC

```
02 4200  10 0305  RUDENG  IF      U,YDENGF1/=10 THEN SETYD1
02 4201  62 4216
02 4202  40 0306  RUDEN1  YDNOT=0
02 4203  12 0156          L=RDSADA
02 4204  50 0301          ABSVAL
02 4205  16 4556          L=L-RDSERL
02 4206  65 4213          IF      L1>=10    THEN NOTYD1
02 4207  12 0157          L=RDSADB
02 4210  50 0301          ABSVAL
02 4211  16 4556          L=L-RDSERL
02 4212  67 4222          IF      L1<10     THEN PTRLEN
02 4213  70 0001  NOTYD11 YDNOT=1
02 4214  44 0306
02 4215  34 4273          GO      BYPASS
02 4216  12 0306  SETYD1  IF      YDNOT1/=10 THEN RUDEN1
02 4217  63 4202
02 4220  50 0302          ABSVAU
02 4221  46 0305          YDENGF=U
                  *******************************************
```

ENGAGE LOGIC FOR
AILERON AND ELEVATOR

```
02 4222  10 0257  PTRLEN  IF      U,MSPENG1=10 THEN BYPASS
02 4223  60 4273
02 4224  64 4235          IF      U1>=10    THEN SETPR1
02 4225  12 0152          L=ELSADA
02 4226  50 0301          ABSVAL
02 4227  16 4556          L=L-RDSERL
02 4230  65 4273          IF      L1>=10    THEN BYPASS
02 4231  12 0160          L=ALSADA
02 4232  50 0301          ABSVAL
02 4233  16 4556          L=L-RDSERL
02 4234  65 4273          IF      L1>=10    THEN BYPASS
02 4235  50 0302  SETPR1  ABSVAU
02 4236  46 0257          MSPENG=U
02 4237  10 0260          U=AUTENG
02 4240  50 0302          ABSVAU
02 4241  46 0260          AUTENG=U
                  *******************************************
```

```
                    SINGLE LAND ARM?

02 4242  12 0310           IF      DUALFG:/=10 THEN BYPASS
02 4243  63 4273
02 4244  12 0275           IF      LNDFLG:/=10 THEN SNGARM
02 4245  63 4250
02 4246  70 0024           SLNDTM=20
02 4247  44 2361
02 4250  57 2361  SNGARM   ISK     SLNDTM
02 4251  34 4272           GO      DUALNT
02 4252  12 0260           IF      AUTENG:=10 THEN DUALNT
02 4253  61 4272
02 4254  12 0302           L=STATE3:AND:BIT13  FLAPS D.D.
02 4255  52 4427
02 4256  61 4272           IF      L:=10    THEN DUALNT
02 4257  12 2163           L=ELSADB
02 4260  50 0301           ABSVAL
02 4261  16 4556           L=L-RDSERL
02 4262  65 4272           IF      L:>=10   THEN DUALNT
02 4263  12 2161           L=ALSADB
02 4264  50 0301           ABSVAL
02 4265  16 4556           L=L-RDSERL
02 4266  65 4272           IF      L:>=10   THEN DUALNT
02 4267  70 0001           DUALFG=1
02 4270  44 2310
02 4271  34 4273           GO      BYPASS
02 4272  40 0310  DUALNT   DUALFG=0
                  ********************************************

                   CHECK - OFF TASK

02 4273  12 2511  BYPASS   MAKEIT=MAKEIT+0100
02 4274  71 0100
02 4275  44 2511
02 4276  55 4000           RETURN OUTSET
```

```
                        SECTOR

                   ********************************************

                    INTERATOR ROUTINE FOR
                   SERVC EQUALIZATION AND
                   SYNCHRONIZATION

                        MODIFY

                  RDSM1A
                  REMSER

02 4277  00 0000  INTGSR   SUBRTN
02 4300  15 2336           RDSM1A(B)=L+REMSER(B)/20+RDSM1A(B)
02 4301  50 7124
02 4302  15 2322
02 4303  45 2322
02 4304  47 2336           REMSER(B)=L
02 4305  55 4277           RETURN INTGSR
```

```
 18198 SCAMP                                     SECTION        74        PAGE       254

                             SECTOR
                      *******************************************
                         SERVO AMP
                        SYNCHRONIZATION

                             MODIFY
                      MEMRDA
                      RDEQ1A
                      RDSM1A
                             REFER
                      KSYNCH
                      RDRAMA
                      RDSADA
                      TRIMAX
 02 4306   00 0000    SYNCH   SUBRTN
 02 4307   13 0156            L=RDSADA(B)*KSYNCH
 02 4310   24 5122
 02 4311   50 0201            L=U
 02 4312   76 4277            CALL    INTGSR
 02 4313   10 4533            U=TRIMAX
 02 4314   30 4630            ICALL   LIMITA
 02 4315   45 2322            RDSM1A(B)=L
 02 4316   17 0164            MEMRDA(B)=L-RDRAMA(B)
 02 4317   45 2352
 02 4320   41 2330            RDEQ1A(B)=0
 02 4321   55 4306            RETURN SYNCH

 18198 SCAMP                                     SECTION        75        PAGE       255

                             SECTOR
                      *************************************
                             MODIFY
                      MEMRDA
                      RDSM1A
                             REFER
                      SYWORT
 02 4322   00 0000    SYNWCT  SUBRTN
 02 4323   13 2352            IF      MEMRDA(B)I=I0 THEN SYNWOX
 02 4324   61 4333
 02 4325   10 5121            U=SYWORT
 02 4326   30 4630            ICALL   LIMITA
 02 4327   50 0100            MEMRDA(B)=-L+MEMRDA(B)
 02 4330   15 2352
 02 4331   45 2352
 02 4332   41 2322            RDSM1A(B)=0
 02 4333   55 4322    SYNWOX  RETURN SYNWOT

 18198 SCAMP                                     SECTION        76        PAGE       256

                             SECTOR
                      *************************
                       SURFACE OUTPUTS AND SCALING
                             MODIFY
                      RUDDRA
                             REFER
                      KSFCOT
                      MEMRDA
                      RDEQ1A
 02 4334   00 0000    SFCSCL  SUBRTN
 02 4335   17 2352            RUDDRA(B)=L-MEMRDA(B)+RDEQ1A(B)
 02 4336   15 2330
 02 4337   45 2370
 02 4340   24 5120            L=L*KSFCOT
 02 4341   70 0764            L=500
 02 4342   50 0001            SWAP    L,U
 02 4343   30 4630            ICALL   LIMITA
 02 4344   37 0001            B=B+1
 02 4345   55 4334            RETURN SFCSCL
```

```
                          SECTOR
                    ****************************************************

                       SENSOR MONITORING & INPUTS


                          MODIFY
                    CRSERL
                    HRADCA
                    HRADCB
                    INFLAG
                    MAKEIT
                    TEMPB3

                          REFER
                    ADKFC1
                    ADR0
                    ATODA1
                    BIT01
                    BIT03
                    BIT04
                    BIT05
                    BIT08
                    BIT09
                    BIT10
                    BIT11
                    BIT12
                    BIT14
                    BIT17
                    D1275
                    DUALFG
                    MONVLD
                    MSPENG
                    STATE0
                    STATE1
                    STATE3
                    SYNTIM

02 4346   00 0000   SENSRM    SUBRTN
02 4347   36 0032             B=26
02 4350   42 2472   SENSRL    TEMPB3=B
02 4351   33 4256             B=ATODA1(B)
02 4352   13 0000             L=ADR0(B)
02 4353   32 2472             B=TEMPB3
02 4354   50 4606             L=L*2^5+ADKFC1(B)
02 4355   25 4341
02 4356   47 0154             CRSERL(B)=U
02 4357   73 4350             BJP     SENSRL
02 4360   12 0304             L=MONVLD*2^9
02 4361   50 4611
02 4362   50 7400             T=A
```

```
02 4363   36 0017             B=15
02 4364   73 4365   SENSR1    BJP     LCK+1
02 4365   50 7500             A=T
02 4366   50 4601             L=L*2^1
02 4367   50 7400             T=A
02 4370   65 4372             IF      L:>=10   THEN LOK+2
02 4371   76 4505             CALL    SENMON
02 4372   73 4364             BJP     SENSR1
                    ****************************************************

                       NON - FULL TIME MONITORING

02 4373   12 0277             L=STATE0:AND:BIT09  ILS TUNED
02 4374   52 4423
02 4375   63 4424             IF      L:/=10   THEN RAMONC
02 4376   12 0300             L=STATE1:AND:BIT04  LOC VAL A
```

NON - FULL TIME MONITORING

```
02 4377  52 4416
02 4400  63 4404          IF     LI/=I0    THEN MONCK1
02 4401  12 0302          L=STATE3IANDIBIT05  LOC VAL B
02 4402  52 4417
02 4403  61 4411          IF     LI=I0     THEN GSMONC
02 4404  12 0304  MONCK1  L=MONVLDIANDIBIT08  LOC DEV
02 4405  52 4422
02 4406  61 4411          IF     LI=I0     THEN GSMONC
02 4407  36 0020          B=16             LOCALIZER
02 4410  76 4505          CALL   SENMON
02 4411  12 0300  GSMONC  L=STATE1IANDIBIT05  G/S VAL A
02 4412  52 4417
02 4413  63 4417          IF     LI/=I0    THEN MONCK2
02 4414  12 0277          L=STATE0IANDIBIT03  G/S VAL B
02 4415  52 4415
02 4416  61 4424          IF     LI=I0     THEN RAMONC
02 4417  12 0304  MONCK2  L=MONVLDIANDIBIT09  G/S DEV
02 4420  52 4423
02 4421  61 4424          IF     LI=I0     THEN RAMONC
02 4422  36 0022          B=18             GLIDE SLOPE
02 4423  76 4505          CALL   SENMON
02 4424  12 0277  RAMONC  L=STATE0IANDIBIT04  R/A VAL A
02 4425  52 4416
02 4426  61 4445          IF     LI=I0     THEN CRSMON
02 4427  12 0300          L=STATE1IANDIBIT01  R/A VAL B
02 4430  52 4413
02 4431  61 4445          IF     LI=I0     THEN CRSMON
02 4432  12 0304  MONCK3  L=MONVLDIANDIBIT11  COARSE R/A
02 4433  52 4425
02 4434  61 4445          IF     LI=I0     THEN CRSMON
02 4435  36 0026          B=22             COARSE RADIO ALT.
02 4436  76 4505          CALL   SENMON
02 4437  12 0304          L=MONVLDIANDIBIT10  FINE R.A.
02 4440  52 4424
02 4441  61 4445          IF     LI=I0     THEN CRSMON
02 4442  36 0024          B=20             FINE RADIO ALT.
```

```
02 4443  76 4505          CALL   SENMON
02 4444  34 4450          GO     CRSMN1
02 4445  12 4520  CRSMON  HRADCA=D1275
02 4446  44 0152
02 4447  44 0153          HRADCB=L
02 4450  10 0310  CRSMN1  IF     U,DUALFGI=I0 THEN ENDSRM
02 4451  60 4477
02 4452  12 0304          L=MONVLDIANDIBIT12  CRS. SEL.
02 4453  52 4426
02 4454  61 4477          IF     LI=I0     THEN ENDSRM
02 4455  36 0030          B=24             COURSE SELECT ERROR
02 4456  76 4505          CALL   SENMON
02 4457  12 0257          IF     MSPENGI=I0 THEN ENDSRM
02 4460  61 4477
02 4461  12 2360          IF     SYNTIMI/=I0 THEN ENDSRM
02 4462  63 4477
02 4463  12 0304          L=MONVLDIANDIBIT17  ELV. DUAL
02 4464  52 4433
02 4465  61 4477          IF     LI=I0     THEN ENDSRM
02 4466  36 0044          B=36             ELV. RAM POSITION
02 4467  76 4505          CALL   SENMON
02 4470  12 2360          IF     SYNTIMI/=I0 THEN ENDSRM
02 4471  63 4477
02 4472  12 0304          L=MONVLDIANDIBIT14  AIL. DUAL
02 4473  52 4430
02 4474  61 4477          IF     LI=I0     THEN ENDSRM
02 4475  36 0042          B=34             AIL. RAM POSITION
02 4476  76 4505          CALL   SENMON
02 4477  76 4606  ENDSRM  CALL   DTDINC
```

```
02 4500  40 2516          INFLAG=0
02 4501  12 2511          MAKEIT=MAKEIT+030
02 4502  71 0030
02 4503  44 2511
02 4504  55 4346          RETURN SENSRM
```

```
                          SECTOR
                 **********************************************
                   INPUT MONITORING

                          MODIFY
                 INFLAG
                 INTOUT
                 LAGOUT
                 LAGOU1
                 REMINT
                 TEMPB3
                 TEMPB4
                 WORDNO
                 YAWRTA
                 YAWRTB

                          REFER
                 ADKFCT
                 ADKFC2
                 ADR0
                 ATODAD
                 ATODA2
                 KINMON
                 KLAG
                 KLAG1
                 MINTHR
                 TIMEMO
02 4505  00 0000 SENMON   SUBRTN
02 4506  42 2507          WORDNO=B
02 4507  33 4226          B=ATODAD(B)
02 4510  13 0000          L=ADR0(B)
02 4511  32 2507          B=WORDNO
02 4512  50 4606          L=L*2A6*ADKFCT(B)
02 4513  25 4311
02 4514  47 0124          YAWRTA(B)=U
02 4515  50 0201          L=U-LAGOUT(B)*KLAG(B)*2A-17
02 4516  17 2161
02 4517  25 5013
02 4520  50 4321
02 4521  44 2473          TEMPB4=L
02 4522  15 2161          LAGOUT(B)=L+LAGOUT(B)
02 4523  45 2161
02 4524  33 4227          B=ATODA2(B)
02 4525  13 0000          L=ADR0(B)
02 4526  32 2507          B=WORDNO
02 4527  50 4606          L=L*2A6*ADKFC2(B)
02 4530  25 4312
02 4531  47 0125          YAWRTB(B)=U
```

```
02 4532  50 0201          L=U-LAGOU1(B)*KLAG1(B)*2A1
02 4533  17 2162
02 4534  25 5014
02 4535  50 4701          LAGOU1(B)=L,U+LAGOU1(B)
02 4536  50 0201
02 4537  15 2162
```

```
02 4540   45 2162
02 4541   17 2161           L=L-LAGOUT(B)
02 4542   50 0301           ABSVAL
02 4543   44 2472           TEMPB3=L
02 4544   50 0201           L=U+TEMPB4*2^-1
02 4545   14 2473
02 4546   50 4201
02 4547   50 0301           ABSVAL
02 4550   44 2473           TEMPB4=L
02 4551   13 2162           L=LAGOUT(B)+LAGOUT(B)
02 4552   15 2161
02 4553   50 0002           SWAP   L,B
02 4554   50 4201           L=L*2^-1
02 4555   50 0002           SWAP   L,B
02 4556   50 0301           ABSVAL
02 4557   25 4741           L=L*KINMON(B)
02 4560   50 0201           L=U
02 4561   03 4766           IF     L:>=:MINTHR(B) THEN LOK+2
02 4562   65 4564
02 4563   13 4766           L=MINTHR(B)
02 4564   02 2472           IF     L:>=:TEMPB3 THEN GOODIN
02 4565   65 4600
02 4566   12 2472           INFLAG=TEMPB3
02 4567   44 2516
02 4570   15 2260           INTOUT(B)=L+REMINT(B)/20+INTOUT(B)
02 4571   50 7124
02 4572   15 2233
02 4573   45 2233
02 4574   47 2260           REMINT(B)=L
02 4575   03 5065           IF     L:>=:TIMEHO(B) THEN SNOTOK
02 4576   65 4603
02 4577   34 4604           GO     SNOTOK+1
02 4600   41 2260   GOODIN  REMINT(B)=0
02 4601   41 2233           INTOUT(B)=0
02 4602   34 4604           GO     LOK+2
02 4603   30 4632   SNOTOK  ICALL  INMON1
02 4604   32 2507           B=WORDNO
02 4605   55 4505           RETURN SENMON
```

```
                            SECTOR
                    ****************************************

                     O/D INPUT CONVERSION
                          (PSEUDO-INPUT CONVERSION)

                            MODIFY
                    ALTRNG
                    POWFLG
                    VORBET
                    VORRNG
                    VSELIN

                            REFER
                    DHDSRO
                    DTDINP
                    FTPNM
                    VORBTI
                    VORRGI

02 4606   00 0000   DTDINC  SUBRTN
02 4607   57 2500           ISK    POWFLG
02 4610   34 4627           GO     DTDIXT
02 4611   36 0037           B=31
02 4612   13 0024   DTDIN1  VSELIN(B)=DTDINP(B)
02 4613   45 0064
02 4614   73 4612           BJP    DTDIN1
02 4615   12 3067           VORBET=VORBTI
02 4616   44 0414
```

```
                     D/D INPUT CONVERSION
                          (PSEUDO-INPUT CONVERSION)

02 4617  12 0070            L=VORRGI+FTPNM+2^2
02 4620  24 4212
02 4621  50 4702
02 4622  46 0413            VORRNG=U
02 4623  12 0073            L=DHDSRD+FTPNM+2^2
02 4624  24 4212
02 4625  50 4702
02 4626  46 0425            ALTRNG=U
02 4627  55 4606  DTDIXT    RETURN DTDINC
```

```
                  ****************************************

                  INDIRECT ADDRESSES

02 4630  01 0115  LIMITA    @LIMT1A
                  LIMITB    EQUALS LIMITA
02 4631  01 0127  DEDZNA    @DEDZ1A
02 4632  00 2111  INMON1    @INMONF
```

```
                            SECTOR
                  ************************************************

                     START UP INITIALIZATION


                            MODIFY
                  ADFGCN
                  ADRSCN
                  AIRSV1
                  AIRSV2
                  ARGOOD
                  ARMMSG
                  EATHRF
                  FMABUF
                  FMABF1
                  INTOUT
                  LAGOUT
                  LAGOU2
                  LATMSG
                  MEMRDA
                  MODMSG
                  RDMDC1
                  ROSM1A
                  REMINT
                  SEAFLG
                  SERMD0
                  TEMP1
                  THRMSG
                  TOGCNT
                  VRTMSG

                            REFER
                  ADR0
                  AIRADD
                  BIT16
                  SERB2M

02 4633  00 0000  INZCLR    SUBRTN
02 4634  76 4722            CALL    CLEARM
02 4635  36 0005            B=5
02 4636  41 2352            MEMRDA(B)=0        SERVO SYNCH VAR.
02 4637  73 4636            BJP     LCK-1
```

START UP INITIALIZATION

```
02 4640  36 0023           B=19
02 4641  41 2322           RDSM1A(B)=0       SERVO INTEG.
02 4642  73 4641           BJP    LCK-1
02 4643  36 0024           B=20
02 4644  41 2161  MONCLR   LAGOUT(B)=0       SENSOR MONITORING VARIABLES
02 4645  41 2206           LAGOU2(B)=0
02 4646  41 2233           INTOUT(B)=0
02 4647  41 2260           REMINT(B)=0
02 4650  73 4644           BJP    MONCLR
```

```
02 4651  36 0005           B=5
02 4652  42 1776  INZCL1   TEMP1=B
02 4653  33 4700           B=AIRADD(B)       AIR DATA
02 4654  13 0000           L=ADR0(B)
02 4655  32 1776           B=TEMP1
02 4656  45 2110           ARGOOD(B)=L
02 4657  41 2116           AIRSV1(B)=0
02 4660  41 2124           AIRSV2(B)=0
02 4661  41 2132           ADRSCN(B)=0
02 4662  73 4652           BJP    INZCL1
02 4663  36 0013           B=11
02 4664  41 2306           EATHRF(B)=0       END AROUND FLAGS
02 4665  73 4664           BJP    LCK-1
02 4666  36 0010           B=8
02 4667  70 0024           L=20
02 4670  45 2077           ADFGCN(B)=L       AIR DATA FLAGS
02 4671  73 4670           BJP    LCK-1
02 4672  36 0057           B=47
02 4673  73 4674  INZCL2   BJP    LCK+1
02 4674  13 2576           FMABUF(B)=FMABUF(B):AND:SERB2M:OR:BIT16
02 4675  52 4410
02 4676  51 4432
02 4677  45 2576
02 4700  41 2577           FMABF1(B)=0
02 4701  73 4673           BJP    INZCL2
02 4702  70 0024           TOGCNT=20
02 4703  44 2305
02 4704  40 2543           ARMMSG=0
02 4705  40 2544           VRTMSG=0
02 4706  40 2545           LATMSG=0
02 4707  40 2542           THRMSG=0
02 4710  40 2546           MODMSG=0
02 4711  40 2501           SEAFLG=0
02 4712  36 0005           B=5
02 4713  41 2363           SERMD0(B)=0       SERVO MODEL
02 4714  73 4713           BJP    LCK-1
02 4715  70 0014           L=12
02 4716  36 0005           B=5
02 4717  45 2376           RDMDC1(B)=L
02 4720  73 4717           BJP    LCK-1
02 4721  55 4633           RETURN INZCLR
```

```
                           SECTOR
                  ****************************************

                           MODIFY
                  COUNH0
                  DISCT0
                  FLAPCM
                  MONVLD
                  MSPENG
                  THRMOD
                  THRTLM

02 4722  00 0000  CLEARM   SUBRTN
02 4723  36 0031           B=25
```

```
02 4724  41 2257          MSPENG(B)=0      CLEAR MODE LOGIC VARIABLES
02 4725  73 4724          BJP    LOK-1
02 4726  40 0520          THRMOD=0
02 4727  70 0050          THRTLM=40
02 4730  44 2025
02 4731  70 7776          FLAPCM=-1
02 4732  44 2570
02 4733  36 2004          B=4
02 4734  70 0012          L=10
02 4735  41 2140          DISCT0(B)=0      CLEAR DISCRETES
02 4736  45 2153          COUNH0(B)=L      INITIALIZE HALF SECOND COUNTERS
02 4737  73 4735          BJP    LOK-2
02 4740  70 7777          MONVLD=-0        INITIALIZE MONITOR VALID
02 4741  44 0304
02 4742  55 4722          RETURN CLEARM
```

```
          SECTOR
***************************************************

     SERVO MODELING -

       MONITORING

          MODIFY
ALMOC1
ALMOC2
CMONCT
CWSNCT
ELMOC1
ELMOC2
MAKEIT
RDMOC1
RDMOC2
SERMD0
SERMD2
TEMPB3
TEMP1
YDNOT

          REFER
AILRNA
AILRNB
ALRAMA
ALRAMB
BIT17
COLCAP
COL1ST
DUALFG
ELEVTA
ELEVTB
ELRAMA
ELRAMB
LATCHY
MSPENG
PFTFLG
RDMODA
RDMODB
RDRAMA
RDRAMB
RDSERL
RUDDRA
WHLCAP
WHL1ST
YDENGF
YDNOT
ZERO
```

```
02 4743   30 0020  SERMOD  SUBRTN
02 4744   12 2327          IF      PFTFLG:/=:0 THEN SERBYP
02 4745   63 5070
02 4746   12 0307          IF      CWSNOT:/=:0 THEN SERINZ
02 4747   63 4753
02 4750   12 0257          IF      MSPENG:>:0 THEN ALELMD
02 4751   61 4753
02 4752   65 4763
02 4753   70 0050  SERINZ  ELMDC1=40
02 4754   44 2402
02 4755   44 2400          ALMDC1=L
02 4756   12 2372          SERMD0=AILRNA
02 4757   44 2363
02 4760   12 2374          SERMD2=ELEVTA
02 4761   44 2365
02 4762   34 5003          GO      RDSRMD
                    AILERON AND ELEVATOR CHECKS
02 4763   50 7202  ALELMD  B(2)=3
02 4764   36 0003
02 4765   50 7201          B(1)=1
02 4766   36 0001
02 4767   13 0202  MODLOP  TEMP1=WHLCAP(B)+WHL1ST(B)
02 4770   15 0204
02 4771   44 1776
02 4772   10 0310          IF      U,DUALFG:/=:0 THEN LOK+2
02 4773   62 4775
02 4774   70 1201          L=641
02 4775   50 7202          ENTICR 2
02 4776   76 5074          CALL    MODLCK
02 4777   12 1776          L=TEMP1
02 5000   76 5074          CALL    MODLCK
02 5001   50 7201          ENTICR 1
02 5002   73 4767          BJP     MODLOP
                    RUDDER CHECKS
02 5003   12 2370  RDSRMD  L=RUDDRA
02 5004   36 0004          B=4
02 5005   76 5142          CALL    ZLGSER
02 5006   10 0306          IF      U,YDNOT:/=:0 THEN SERBYP
02 5007   62 5070
02 5010   10 0305          IF      U,YDENGF:=:0 THEN SERBYP
02 5011   60 5070
02 5012   16 0164          L=L-RDRAMA
02 5013   50 0301          ABSVAL
02 5014   71 5117          L=L-2.0DEG
02 5015   67 5040          IF      L:<:0    THEN RDML1P
02 5016   44 2472          TEMPB3=L
02 5017   12 0164          L=RDRAMA+2A-2
```

```
02 5020   50 4202
02 5021   50 0301          ABSVAL
02 5022   71 5117          L=L-2.0DEG
02 5023   67 5026          IF      L:<:0    THEN RD1FAL
02 5024   02 2472          IF      L:>=:TEMPB3 THEN RDML1P
02 5025   65 5040
02 5026   57 2376  RD1FAL  ISK     RDMDC1
02 5027   34 5042          GO      RDMDL2
02 5030   70 0246          L=166
02 5031   10 0310          IF      U,DUALFG:=:0 THEN SERBYP
02 5032   60 5070
02 5033   30 1554          ICALL   FAILRC
02 5034   44 0306          YDNOT=L
02 5035   44 0307          CWSNOT=L
02 5036   44 0276          CMDNOT=L
02 5037   34 5070          GO      SERBYP
```

```
02 5040  70 0024  ROML1P  ROMDC1=20
02 5041  44 2376
02 5042  12 2471  ROMOL2  IF     LATCHY:/=:0 THEN RD1FAL+2
02 5043  63 5030
02 5044  12 0172          L=RDMODA-ROMODB
02 5045  16 0173
02 5046  50 0301          ABSVAL
02 5047  71 6735          L=L-546
02 5050  67 5056          IF     L:<:0    THEN RDRMCK
02 5051  57 2377          ISK    RDMDC2
02 5052  34 5070          GO     SERBYP
02 5053  70 0001          LATCHY=1
02 5054  44 2471
02 5055  34 5030          GO     RD1FAL+2
02 5056  12 0164  RDRMCK  L=RDRAMA-RDRAMB
02 5057  16 0165
02 5060  50 0301          ABSVAL
02 5061  71 5117          L=L-1456
02 5062  67 5066          IF     L:<:0    THEN RDML2P
02 5063  57 2377          ISK    RDMDC2
02 5064  34 5070          GO     SERBYP
02 5065  34 5030          GO     RD1FAL+2
02 5066  70 0024  RDML2P  RDMDC2=20
02 5067  44 2377
02 5070  12 2511  SERBYP  MAKEIT=MAKEIT:XOR:BIT17
02 5071  53 4433
02 5072  44 2511
02 5073  55 4743          RETURN SERMOD

                  NO REF:      ZERC
                  NO REF:      RDSERL
                  NO REF:      ELRAMB
                  NO REF:      ELRAMA
                  NO REF:      ELEVTH
                  NO REF:      COL1ST
                  NO REF:      COLCAP
```

```
                  NO REF:      ALRAMB
                  NO REF:      ALRAMA
                  NO REF:      AILRNB
                  NO REF:      YDNCT
                  NO REF:      ELMDC2
                  NO REF:      ALMDC2
```

```
                          SECTOR
                  **************************

                   AILERON AND ELEVATOR SERVO MODEL CHECKS

                          MODIFY
                  ALMDC1
                  CMDNOT
                  CWSNOT

                          REFER
                  AILRNA
                  ALRAMA
                  DEGS
                  DUALFG
                  MODFCD
                  RAMSGN
                  SERMOD

02 5074  20 0000  MODLCK  SUBRTN
02 5075  50 2301          ABSVAL
02 5076  71 6577          L=L-640
```

5#

AILERON AND ELEVATOR SERVO MODEL CHECKS

```
02 5077  10 0310          IF      U,DUALFG:=10 THEN LOK+2
02 5100  60 5102
02 5101  71 6577          L=L-640          10#
02 5102  65 5134          IF      L:>=10   THEN MODLPS
02 5103  13 0166          L=ALRAMA(B)+RAMSGN(B)
02 5104  25 5124
02 5105  11 2363          U=SERMD0(B)+L
02 5106  50 0100
02 5107  52 0302          ABSVAU
02 5110  50 0301          ABSVAL
02 5111  02 4556          IF      L:<1DEG5 THEN LOK+2
02 5112  67 5114
02 5113  50 4102          RSHAU  2
02 5114  50 0201          L=U
02 5115  71 6447          L=L-1.0DEG
02 5116  67 5134          IF      L:<10     THEN MODLPS
02 5117  13 2400          IF      ALMDC1(B):=10 THEN MODLFL
02 5120  61 5124
02 5121  71 7776          ALMDC1(B)=L-1
02 5122  45 2400
02 5123  34 5136          GO      MODLCX
02 5124  13 5130 MODLFL   L=MODFCD(B)
02 5125  50 7203          ENTICR 3
02 5126  30 1554          ICALL  FAILRC
02 5127  50 7202          ENTICR 2
02 5130  70 0001          CWSNOT=1
02 5131  44 0307
02 5132  44 0276          CMDNOT=L
```

```
02 5133  34 5136          GO      MODLCX
02 5134  70 0012 MODLPS   ALMDC1(B)=10
02 5135  45 2400
02 5136  13 2372 MODLCX   L=AILRNA(B)
02 5137  76 5142          CALL   ZLGSER
02 5140  73 5141          BJP    LOK+1
02 5141  55 5074          RETURN MODLCK
```

```
                          SECTOR
                 ****************************************

                          MODIFY
                 LAGTMP
                 SERMD0

                          REFER
                 KSERMD

02 5142  00 0000 ZLGSER   SUBRTN           Z(A/S+A)
02 5143  44 2362          LAGTMP=L
02 5144  17 2363          L=L-SERMD0(B)+KSERMD(B)+2A-17
02 5145  25 4733
02 5146  50 4321
02 5147  14 2362          SERMD0(B)=L+LAGTMP
02 5150  45 2363
02 5151  55 5142          RETURN ZLGSER
```

```
18198 SCAMP                                SECTION        85        PAGE       274

                           START  010000
                      ***************************************************

                       ARITHMETIC SUBROUTINES


                           MODIFY
                      TPAB
                      TPA2
                      TPA3
                      TPA3A

                           REFER
                      ASIN0
                      ASIN01
                      BIT17N
                      COS0
                      COS01
                      SIN0
                      SIN01


                    **********************

                    SINE/COSINE SUBROUTINE

01 0000  00 0000  SINCOS   SUBRTN           2 **17 SINE/COS(BAMS)
01 0001  42 2006           TPAB=B
01 0002  50 6407           CLRFL  7
01 0003  50 6406           CLRFL  6
01 0004  50 6405           CLRFL  5
01 0005  65 0010           IF      L1>=10   THEN LOK+3
01 0006  50 6507           SETFL  7         SET NEG. FLAG
01 0007  50 6100           L=-L             ABSOLUTE VALUE
01 0010  50 4601           L=L*2^1
01 0011  65 0014           IF      L1>=10   THEN LOK+3  LESS THAN 90 DEG
01 0012  50 6100           L=-L
01 0013  50 6506           SETFL  6
01 0014  50 4601           L=L*2^1
01 0015  65 0020           IF      L1>=10   THEN LOK+3  LESS THAN 45 DEG
01 0016  50 6100           L=-L
01 0017  50 6505           SETFL  5
01 0020  50 0307           L=L+1*2^6        1.40625 DEG. INC.
01 0021  50 4706
01 0022  50 0204           B=U
01 0023  44 2013           TPA3=L
01 0024  13 5516           L=COS01(B)-COS0(B)*TPA3
01 0025  17 5515
01 0026  24 2013
01 0027  46 2014           TPA3A=U

18198 SCAMP                                SECTION        85        PAGE       275


01 0030  13 5455           L=SIN01(B)-SIN0(B)
01 0031  17 5454
01 0032  66 0034           IF      U1<10    THEN LOK+2
01 0033  37 0001           B=B+1
01 0034  24 2013           L=L*TPA3
01 0035  13 5454           L=SIN0(B)
01 0036  50 0100           U=U+L
01 0037  13 5515           L=COS0(B)+TPA3A
01 0040  14 2014
01 0041  50 5105           SKPNFL 5
01 0042  50 2001           SWAP   U,L
01 0043  50 5106           SKPNFL 6
01 0044  50 6100           L=-L             COS = -COS
01 0045  50 5107           SKPNFL 7
01 0046  50 6200           CPAU             SIN = -SIN
01 0047  32 2006           B=TPAB
01 0050  55 2000           RETURN SINCOS
```

```
                    ****************************************

                          ARC SINE SUBROUTINE

01 0051   00 0000  ASIN1A   SUBRTN               ARCSIN B.A.M.
01 0052   42 2036           TPAB=B
01 0053   50 6407           CLRFL   7
01 0054   50 6406           CLRFL   6
01 0055   65 0060           IF      L:>=:0     THEN LOK+3
01 0056   50 6100           L=-L                 ABSOLUTE VALUE
01 0057   50 6506           SETFL   6
01 0060   64 0063           IF      U:>=:0     THEN LOK+3
01 0061   50 6200           CPAU
01 0062   50 6507           SETFL   7
01 0063   44 2011           TPA2=L
01 0064   50 0006           IF      L:>=:U     THEN LOK+2
01 0065   65 0067
01 0066   50 0200           U=L
01 0067   70 0000           L=0
01 0070   50 4301           A=A*2^-1/TPA2
01 0071   26 2011
01 0072   50 0200           U=L
01 0073   70 0000           L=0
01 0074   50 4707           A=A*2^7
01 0075   50 0202           B=L
01 0076   60 0105           IF      U:=:0      THEN ASIN4
01 0077   46 2014           TPA3A=U
01 0100   13 5557           L=ASIN01(B)-ASIN0(B)*TPA3A
01 0101   17 5556
01 0102   24 2014
01 0103   64 0105           IF      U:>=:0     THEN LOK+2
01 0104   37 0001           B=B+1
01 0105   13 5556  ASIN4    L=ASIN0(B)+U
01 0106   50 0101
01 0107   50 5106           SKPNFL  6
01 0110   53 4455           L=L:XOR:BIT17N
01 0111   50 5107           SKPNFL  7
01 0112   50 6100           L=-L
01 0113   32 2006           B=TPAB
01 0114   55 0051           RETURN ASIN1A
```

```
                    ****************************************

01 0115   02 0030  LIMT1A   SUBRTN               MIN ("AL","AU")
01 0116   65 0124           IF      L:>=:0     THEN LIMT12
01 0117   50 6200           CPAU
01 0120   50 0006           IF      L:>=:U     THEN LOK+2
01 0121   65 0123
01 0122   50 0201  LIMT11   L=U
01 0123   55 0115           RETURN LIMT1A
01 0124   50 0006  LIMT12   IF      L:>=:U     THEN LIMT11
01 0125   65 0122
01 0126   55 0115           RETURN LIMT1A
                    ****************************************

01 0127   00 0000  DEDZ1A   SUBRTN               DEAD ZONE
01 0130   65 0135           IF      L:>=:0     THEN LOK+5
01 0131   50 0101           L=L+U
01 0132   67 0134           IF      L:<:0      THEN LOK+2
01 0133   70 0000           L=0
01 0134   55 0127           RETURN DEDZ1A
01 0135   50 6200           CPAU
01 0136   50 0101           L=L+U
01 0137   67 0133           IF      L:<:0      THEN LOK-4
01 0140   55 0127           RETURN DEDZ1A
```

```
                      SECTOR

                 **********************************

                 Z-TRANSFORM SUBROUTINES

                          MODIFY
                 INTO0A
                 INTO0B
                 TMPFIL
                 ZTFIPA
                 ZTFIPB
                 ZTFO0A
                 ZTFO0B
                 ZTRNRA
                 ZTRNRB
                 ZTWO0A
                 ZTWO0B

                          REFER
                 FREQSA
                 FREQSB
                 KFGEAA
                 KFGEAB
                 KWOEAA
                 KWOEAB
                 VARIDX

                 ****************************************

01 0141   00 0000  ZTFLAG  SUBRTN           Z(A/S+A)
01 0142   44 2004          TMPFIL=L
01 0143   50 5103          IF      F,3=1    THEN ZTFLG1
01 0144   34 0153
01 0145   17 0575          L=L-ZTFO0A(B)*KFGEAA(B)*2A-17
01 0146   25 1000
01 0147   50 4321
01 0150   14 2004          ZTFO0A(B)=L+TMPFIL
01 0151   45 0575
01 0152   34 0160          GO      ZTFLG2
01 0153   17 1464  ZTFLG1  L=L-ZTFO0B(B)*KFGEAB(B)*2A-17
01 0154   25 1667
01 0155   50 4321
01 0156   14 2004          ZTFO0B(B)=L+TMPFIL
01 0157   45 1464
01 0160   32 2517  ZTFLG2  B=VARIDX
01 0161   55 0141          RETURN ZTFLAG
```

```
                 ****************************************

01 0162   00 0000  ZTFWO   SUBRTN           Z(S/S+A)
01 0163   50 0200          U=L
01 0164   50 5103          IF      F,3=1    THEN ZTFWO1
01 0165   34 0175
01 0166   17 0525          L=L-ZTFIPA(B)
01 0167   47 0525          ZTFIPA(B)=U
01 0170   15 0551          L=L+ZTWO0A(B)*KWOEAA(B)*2A-17
01 0171   25 0754
01 0172   50 4321
01 0173   45 0551          ZTWO0A(B)=L
01 0174   34 0203          GO      ZTFWO2
01 0175   17 1414  ZTFWO1  L=L-ZTFIPB(B)
01 0176   47 1414          ZTFIPB(B)=U
01 0177   15 1440          L=L+ZTWO0B(B)*KWOEAB(B)*2A-17
```

```
01 0200  25 1643
01 0201  50 4321
01 0202  45 1440           ZTW00B(B)=L
01 0203  32 2517   ZTFW02  B=VARIDX
01 0204  55 0162           RETURN ZTFWD

                   ***************************************

01 0205  00 0000   INTEGT  SUBRTN            Z(1/S)
01 0206  50 5103           IF     F,3=1      THEN INTEG1
01 0207  34 0217
01 0210  15 0634           L=L+ZTRNRA(B)*1/FREQSA(B)
01 0211  50 0307
01 0212  27 1037
01 0213  47 0634           ZTRNRA(B)=U
01 0214  15 0704           INT00A(B)=L+INT00A(B)
01 0215  45 0704
01 0216  34 0225           GO      INTEG2
01 0217  15 1523   INTEG1  L=L+ZTRNRB(B)*1/FREQSB(B)
01 0220  50 0327
01 0221  27 1726
01 0222  47 1523           ZTRNRB(B)=U
01 0223  15 1573           INT00B(B)=L+INT00B(B)
01 0224  45 1573
01 0225  32 2517   INTEG2  B=VARIDX
01 0226  55 0205           RETURN INTEGT
```

```
                           SECTOR
                   ****************************************************

                   AUTO-PILOT AND AUTO-THROTTLE EXECUTIVE


                           MODIFY
                   DEGPMX
                   DISA01
                   DISA02
                   DISA03
                   DISA04
                   DISA05
                   DISA06
                   DISA07
                   DISA09
                   DISA10
                   DISB01
                   ENGOOD
                   HDGMDF
                   INTOT1
                   INT00A
                   LNDFGA
                   LNDTIM
                   LOCTIM
                   LOCVAL
                   MKIT1A
                   MKIT2A
                   PSYNFA
                   RALTFG
                   RSYNFA
                   SPDBRK
                   TDFLAG
                   TEMP1
                   THRCMD
                   THRCOM
                   TOGF1A
```

AUTO-PILOT AND AUTO-THROTTLE EXECUTIVE

```
WOW
ZTFIP4
ZTFIP7
ZTWO7

          REFER
APMKTM
AUTO1A
BETA1A
BIT1
BIT4
BIT5
```

```
BIT7
BIT8
BIT09
BIT10
BIT11
BIT12
BIT13
BIT14
BIT17
CMDNTA
CWSNOT
DEG22
DUALFG
ENG1A
HDGHDF
HRADIO
MKTMSK
NSWLMS
OCTL46
OFFPAS
ONE
PAPS1A
PCWSFG
PFTFLG
PHIC
PHICOM
PHIP
PITA1A
PITE1A
PMODCK
PMODPR
RAPS1A
RCWSFG
RCPFGA
RMODCK
RMODIV
ROLA1A
ROLE1A
STATE0
STATE1
STATE3
STATE4
THETAC
THETAL
THETAP
THET1A
THRLIM
THRMOD
THRPS1
THTCOM
VARIDX
WHLMSK
```

```
                 WOW4
                 YDENGF
                 YDNOT

01 0227  20 0000 EXEC1A  SUBRTN
01 0230  76 2333         CALL    CONVER    INPUT CONVERSION
01 0231  76 6424         CALL    THETLC    LIFT COMPENSATION
01 0232  36 0013         B=11
01 0233  50 5103         IF      F,3=1     THEN EXEC11
01 0234  34 0240
01 0235  41 0226         DISA01(B)=0       CLEAR OUTPUT DISCRETES A
01 0236  73 0235         RJP     LCK-1
01 0237  34 0242         GO      EXEC11+2
01 0240  41 1115 EXEC11  DISB01(B)=0       CLEAR OUTPUT DISCRETES B
01 0241  73 0240         RJP     LCK-1
01 0242  32 2517         B=VARIDX          INDEX A OR B VARIABLES
01 0243  12 2512         IF      OFFPAS:/=:0 THEN OFFCON
01 0244  63 0247
01 0245  12 2527         IF      PFTFLG:=:0 THEN ONCOND
01 0246  61 0253
01 0247  76 1023 OFFCON  CALL    OFFINZ
01 0250  70 0001         TOGF1A(B)=1
01 0251  45 0317
01 0252  34 0703         GO      ENDC1A
01 0253  50 6502 ONCOND  SETFL   2
01 0254  13 0257         IF      ENG1A(B):/=:0 THEN ONCON1
01 0255  63 0272
01 0256  13 0263         L=ROLE1A(B)+PITE1A(B)+ROLA1A(B)+PITA1A(B)
01 0257  15 0265
01 0260  15 0262
01 0261  15 0264
01 0262  63 0272         IF      L:/=:0    THEN ONCON1
01 0263  13 0305         IF      YDENGF(B):/=:0 THEN ONCON1
01 0264  63 0272
01 0265  50 6402         CLRFL   2
01 0266  13 2520         IF      THRMOD(B):/=:0 THEN ONCON1
01 0267  63 0272
01 0270  76 1023         CALL    OFFINZ
01 0271  34 0664         GO      TOGG1A
01 0272  50 6501 ONCON1  SETFL   1         AIR DATA FAILURE?
01 0273  50 5100         IF      F,0=1     THEN AIDAFL
01 0274  34 0302
01 0275  13 0277         L=STATE0(B):AND:OCTL46-046
01 0276  52 4411
01 0277  71 7731
01 0300  63 0302         IF      L:/=:0    THEN AIDAFL
01 0301  50 6401         CLRFL   1         NO FAILURE
01 0302  76 5373 AIDAFL  CALL    EUCFIL    EULER ANG. AND C.F.
01 0303  76 6022         CALL    AIRDAT    AIR DATA COMPUTATIONS

01 0304  50 5102         IF      F,2=1     THEN ATOPIL
```

```
01 0305  34 0315
01 0306  13 0311         MKIT1A(B)=MKIT1A(B):XOR:APMKTM
01 0307  53 4407
01 0310  45 0311
01 0311  13 0312         MKIT2A(B)=MKIT2A(B):XOR:APMKTM
01 0312  53 4407
01 0313  45 0312
01 0314  34 0664         GO      TOGG1A
                          IF LOC VALID, TAKE RATE

01 0315  13 2300 ATOPIL  L=STATE1(B):AND:BIT4
01 0316  52 4416
01 0317  61 0345         IF      L:=:0     THEN LOCNTV
01 0320  13 2302         L=STATE3(B):AND:BIT5
01 0321  52 4417
01 0322  61 0345         IF      L:=:0     THEN LOCNTV
```

```
18198 SCAMP                                   SECTION        87        PAGE       283
                                              -continued

01 0323  13 0252            L=BETA1A(B)
01 0324  11 0407            IF     U,LOCVAL(B):=:0 THEN LOCRTE
01 0325  60 0336
01 0326  50 0001            SWAP   U,L
01 0327  71 7776            LOCVAL(B)=L-1
01 0330  45 0407
01 0331  70 0024            LOCTIM(B)=20
01 0332  45 0403
01 0333  50 0201            L=U
01 0334  41 0560            ZTWO7(B)=0
01 0335  45 0534            ZTFIP7(B)=L
01 0336  36 0007   LOCRTE   B=7
01 0337  76 0162            CALL   ZTFWO    BETA RATE
01 0340  13 0403            IF     LOCTIM(B):=:0 THEN EXC11A
01 0341  61 0347
01 0342  71 7776            LOCTIM(B)=L-1
01 0343  45 0403
01 0344  34 0347            GO     EXC11A
01 0345  70 0024   LOCNTV   LOCVAL(B)=20
01 0346  45 0407
01 0347  12 4565   EXC11A   DEGPMX(B)=DEG22
01 0350  45 0463
01 0351  13 0263            L=ROLE1A(B)
01 0352  11 0260            IF     U,AUTO1A(B):>=:0 THEN EXEC13
01 0353  64 0361
01 0354  11 0265            IF     U,PITE1A(B):=:0 THEN EXEC12
01 0355  60 0357
01 0356  47 0267            PSYNFA(B)=U
01 0357  61 0361   EXEC12   IF     L:=:0     THEN EXEC13
01 0360  45 0266            RSYNFA(B)=L
01 0361  61 0405   EXEC13   IF     L:=:0     THEN NOTLND
01 0362  71 7772            L=L-5
01 0363  65 0405            IF     L:>=:0    THEN NOTLND
01 0364  71 0002            U=L,L+2
01 0365  50 0200
01 0366  13 0237            DISA10(B)=DISA10(B):OR:BIT11

18198 SCAMP                                   SECTION        87        PAGE       284

01 0367  51 4425
01 0370  45 0237
01 0371  62 0374            IF     U:/=:0    THEN EXEC14
01 0372  11 0273            IF     U,RCPFGA(B):/=:0 THEN NOTLND
01 0373  02 0405
01 0374  13 0265   EXEC14   IF     PITE1A(B):=:0 THEN NOTLND
01 0375  61 0405
01 0376  71 7774            L=L-3
01 0377  65 0405            IF     L:>=:0    THEN NOTLND
01 0400  13 0315            IF     LNDTIM(B):=:0 THEN EXEC15
01 0401  61 0410
01 0402  71 7776            LNDTIM(B)=L-1
01 0403  45 0315
01 0404  34 0410            GO     EXEC15
01 0405  41 0275   NOTLND   LNDFGA(B)=0
01 0406  70 0620            LNDTIM(B)=400
01 0407  45 0315
01 0410  13 0277   EXEC15   L=STATE0(B):AND:BIT4
01 0411  52 4416
01 0412  61 0416            IF     L:=:0     THEN RAINVD R.ALT.INVLD
01 0413  13 0300            L=STATE1(B):AND:BIT1
01 0414  52 4413
01 0415  63 0420            IF     L:/=:0    THEN EXEC16
01 0416  70 0620   RAINVD   RALTFG(B)=400
01 0417  45 0427
01 0420  13 0427   EXEC16   IF     RALTFG(B):=:0 THEN EXEC17
01 0421  61 0424
01 0422  71 7776            RALTFG(B)=L-1
01 0423  45 0427
01 0424  13 0315   EXEC17   L=LNDTIM(B)+RALTFG(B)
01 0425  15 0427
01 0426  63 0436            IF     L:/=:0    THEN RAINV1
```

```
01 0427  13 0226          DISA01(B)=DISA01(B):OR:BIT12
01 0430  51 4426
01 0431  45 0226
01 0432  13 0227          DISA02(B)=DISA02(B):OR:BIT10
01 0433  51 4424
01 0434  45 0227
01 0435  45 0276          LNDFGA(B)=L
01 0436  13 0302  RAINV1  L=STATE3(B):AND:NSWLMS NOSE WHEEL MASK
01 0437  52 4404
01 0440  61 0443          IF      L:=:0    THEN TDCHEK
01 0441  70 0074          WOW(B)=60
01 0442  45 0346
01 0443  13 0613  TDCHEK  L=HRADIO(B)-32
01 0444  71 7737
01 0445  65 0461          IF      L:>=:0   THEN TDNOT
01 0446  13 0302          L=STATE3(B):AND:BIT14 L.I.SPIN-UP
01 0447  52 4430
01 0450  63 0454          IF      L:/=:0   THEN TDCHK1
01 0451  13 0303          L=STATE4(B):AND:BIT11 R.O. SPIN-UP
01 0452  52 4425
```

```
01 0453  51 0461          IF      L:=:0    THEN TDNOT
01 0454  13 0303  TDCHK1  L=STATE4(B):AND:WHLMSK RI/LO SPIN-UP
01 0455  52 4405
01 0456  61 0461          IF      L:=:0    THEN TDNOT
01 0457  45 0316          TDFLAG(B)=L
01 0460  34 0462          GO      TDNOT+1
01 0461  41 0316  TDNOT   TDFLAG(B)=0
01 0462  13 0303          SPDBRK(B)=STATE4(B):AND:BIT17
01 0463  52 4433
01 0464  45 0313
01 0465  13 0303          ENGOOD(B)=STATE4(B):AND:BIT10
01 0466  52 4424
01 0467  45 0314
01 0470  13 0270          L=RAPS1A(B)
01 0471  33 0262          B=ROLA1A(B)
01 0472  31 0757          ICALLB AROL1A   "ARMED ROLL MODE"
                  ******************************************
                       CHECK OFF BIT 9 FOR ROLL ARMED

01 0473  32 2517          B=VARIDX
01 0474  03 0262          IF      L:/=:ROLA1A(B) THEN XRLACK
01 0475  63 0504
01 0476  13 0311          MKIT1A(B)=MKIT1A(B)+BIT09
01 0477  14 4423
01 0500  45 0311
01 0501  13 0312          MKIT2A(B)=MKIT2A(B)-BIT09
01 0502  16 4423
01 0503  45 0312
01 0504  13 0266  XRLACK  L=RSYNFA(B)
01 0505  33 0263          B=ROLE1A(B)
01 0506  31 0764          ICALLB EROL1A
                       CHECK OFF BIT 10 FOR ROLL ENGAGED

01 0507  42 1776          TEMP1=B
01 0510  32 2517          B=VARIDX
01 0511  13 0263          L=ROLE1A(B)+1
01 0512  71 0001
01 0513  50 0200          U=L
01 0514  70 0000          L=0
01 0515  32 1776          B=TEMP1
01 0516  27 6737          L=A/RMODCK(B)
01 0517  32 2517          B=VARIDX
01 0520  02 6736          IF      L:/=:RMODIV THEN XRLECK
01 0521  63 0536
01 0522  50 0201          TEMP1=L,U=1
01 0523  71 7776
01 0524  44 1776
01 0525  13 0263          L=ROLE1A(B):XOR:TEMP1
01 0526  53 1776
01 0527  63 0536          IF      L:/=:0   THEN XRLECK
```

```
01 0530  13 0311           MKIT1A(B)=MKIT1A(B):XOR:BIT10
01 0531  53 4424
01 0532  45 0311
01 0533  13 0312           MKIT2A(B)=MKIT2A(B):XOR:BIT10
01 0534  53 4424
01 0535  45 0312
                  *********************************

                     ROLL SYNCRONIZATION

01 0536  13 0266  XRLECK   IF     RSYNFA(B):=:0 THEN NXTCP0
01 0537  61 0551
01 0540  41 0266           RSYNFA(B)=0
01 0541  13 0260           IF     AUTO1A(B):=:0 THEN NXTCP0
01 0542  61 0551
01 0543  13 0353           IF     RCWSFG(B):/=:0 THEN NXTCP0
01 0544  63 0551
01 0545  13 0334           INTOT1(B)=PHICOM(B)-PHIP(B)-PHIC(B)
01 0546  17 0333
01 0547  17 0332
01 0550  45 0705
01 0551  76 1575  NXTCP0   CALL   ROLFD     ROLL FLIGHT DIR
01 0552  76 1733           CALL   RCLCWS
01 0553  76 1204           CALL   RCLCAS    ROLL CAS
01 0554  13 0271           L=PAPS1A(B)
01 0555  33 0264           B=PITA1A(B)
01 0556  31 0773           ICALLB APIT1A   "ARMED PITCH MODE"
                  **************************************

                     CHECK OFF BIT 7 FOR PITCH

                     ARMED OK!

01 0557  32 2517           B=VARIDX
01 0560  03 0264           IF     L:/=:PITA1A(B) THEN XPTACK
01 0561  63 0570
01 0562  13 0311           MKIT1A(B)=MKIT1A(B):XOR:BIT7
01 0563  53 4421
01 0564  45 0311
01 0565  13 0312           MKIT2A(B)=MKIT2A(B):XOR:BIT7
01 0566  53 4421
01 0567  45 0312
01 0570  13 0267  XPTACK   L=PSYNFA(B)
01 0571  33 0265           B=PITE1A(B)
01 0572  31 1004           ICALLB EPIT1A   "ENGAGED PITCH MODE"

                     CHECK OFF BIT8 FOR PITCH ENGAGED

01 0573  42 1776           TEMP1=B
01 0574  32 2517           B=VARIDX
01 0575  13 0265           L=PITE1A(B)+1
01 0576  71 0001
```

```
01 0577  32 1776           B=TEMP1
01 0600  25 0754           L=L+PMODCK(B)*2^10
01 0601  50 4712
01 0602  32 2517           B=VARIDX
01 0603  63 0615           IF     L:/=:0   THEN XPTECK
01 0604  50 0201           L=U
01 0605  02 0753           IF     L:/=:PMODPR THEN XPTECK
01 0606  63 0615
01 0607  13 0311           MKIT1A(B)=MKIT1A(B):XOR:BIT8
01 0610  53 4422
01 0611  45 0311
01 0612  13 0312           MKIT2A(B)=MKIT2A(B):XOR:BIT8
01 0613  53 4422
01 0614  45 0312
                  ****************************************
```

```
                          PITCH SYNCRONIZATION

01 0615  13 0267  XPTECK  IF      PSYNFA(B):=:0 THEN NXTCP1
01 0616  61 0635
01 0617  13 0341          ZTFIP4(B)=THETAP(B)+THETAL(B)-THET1A(B)
01 0620  15 0471
01 0621  17 0245
01 0622  45 0531
01 0623  41 0267          PSYNFA(B)=0
01 0624  13 0260          IF      AUTC1A(B):=:0 THEN NXTCP1
01 0625  61 0635
01 0626  13 0357          IF      PCWSFG(B):/=:0 THEN NXTCP1
01 0627  63 0635
01 0630  13 0342          INT00A(B)=THTCOM(B)-THETAP(B)-THETAC(B)-THETAL(B)
01 0631  17 0341
01 0632  17 0340
01 0633  17 0471
01 0634  45 0704
01 0635  76 1645  NXTCP1  CALL    PITFD     PITCH FLIGHT DIRECTOR
01 0636  76 2166          CALL    PITCWS
01 0637  76 1340          CALL    PITCAS    PITCH CAS
01 0640  76 1460          CALL    YAWSAS    YAW SAS
```

```
                          ******************************************************

                          ENGAGE DISCRETES

01 0641  13 0257          IF      ENG1A(B):<=:0 THEN TOGG1A
01 0642  61 0664
01 0643  67 0664
01 0644  13 0307          IF      CWSNOT(B):/=:0 THEN TOGG1A
01 0645  63 0664
                                            A/P ENGAGE A
01 0646  13 0230          DISA03(B)=DISA03(B):OR:BIT10
01 0647  51 4424
01 0650  45 0230
                                            A/P ENGAGE B
01 0651  13 0234          DISA07(B)=DISA07(B):OR:BIT11
01 0652  51 4425
01 0653  45 0234
01 0654  13 0310          IF      DUALFG(B):=:0 THEN TOGG1A
01 0655  61 0664
                                              YAW DAMPER PARALLEL A
01 0656  13 0232          DISA05(B)=DISA05(B):OR:BIT13
01 0657  51 4427
01 0660  45 0232
                                              PITCH LAND ENGAGE
01 0661  13 0237          DISA10(B)=DISA10(B):OR:BIT10
01 0662  51 4424
01 0663  45 0237
01 0664  13 0306  TOGG1A  IF      YDNOT(B):/=:0 THEN ENDC1A
01 0665  63 0703
01 0666  13 0317          L=TOGF1A(B)       SYSTEM VALID?
01 0667  41 0317          TOGF1A(B)=0
01 0670  63 0675          IF      L:/=:0    THEN TOGG11
                                              SYSTEM VALID
01 0671  13 0233          DISA06(B)=DISA06(B):OR:BIT10
01 0672  51 4424
01 0673  45 0233
01 0674  45 0317          TOGF1A(B)=L
                                              YAW DAMPER ENG. A
01 0675  13 0230  TOGG11  DISA03(B)=DISA03(B):OR:BIT12
01 0676  51 4426
01 0677  45 0230
                                              YAW DAMPER ENG. B
01 0700  13 0234          DISA07(B)=DISA07(B):OR:BIT13
01 0701  51 4427
```

```
                              ENGAGE DISCRETES
01 0702   45 0234
01 0703   13 0305  ENDC1A   IF      YDENGF(B):/=:0 THEN WOWCK1
01 0704   63 0710
                                             DELATCH
01 0705   13 0236           DISA09(B)=DISA09(B):OR:BIT12
01 0706   51 4426
01 0707   45 0236
                                             4 SEC AFTER MAIN GEAR CLEAR
```

```
01 0710   50 5002  WOWCK1   SKIP    2
01 0711   34 0713           GO      LOK+2
01 0712   34 0722           GO      WOWCK3
01 0713   13 2350           IF      WOW4(B):/=:0 THEN WOWCK2
01 0714   63 0717
01 0715   13 0276           IF      CMDNTA(B):=:0 THEN WOWCK3
01 0716   61 0722
                                             COMMAND HOLD NOT
01 0717   13 0236  WOWCK2   DISA09(B)=DISA09(B):OR:BIT11
01 0720   51 4425
01 0721   45 0236
01 0722   13 0316  WOWCK3   IF      DUALFG(B):/=:0 THEN WOWCK4
01 0723   63 0730
                                             YAW DAMPER PARALLEL B
01 0724   13 0236           L=DISA09(B):OR:BIT10
01 0725   51 4424
                                             ROLL LAND ENGAGE NOT
01 0726   51 4427           DISA09(B)=L:OR:BIT13
01 0727   45 0236
01 0730   13 0231  WOWCK4   L=DISA04(B)
01 0731   11 0401           IF      U,HOGHDF(B):/=:0 THEN TORQU1
01 0732   62 0734
01 0733   51 4427           L=L:OR:BIT13 HDG HOLD NOT
                                             TORQUER A,B NOT
01 0734   51 4426  TORQU1   L=L:OR:BIT12:OR:BIT11
01 0735   51 4425
                                             IND. RESET NOT
01 0736   51 4424           DISA04(B)=L:OR:BIT10
01 0737   45 0231
01 0740   41 0401           HOGHDF(B)=0
01 0741   13 0272           L=THRPS1(B)
01 0742   33 0520           B=THRMOD(B)
01 0743   31 1015           ICALLB ENGTHR   ENGAGED THROTTLE MODE
01 0744   12 5155           U=THRLIM        THROTTLE RATE LIMIT
01 0745   76 0115           CALL    LIMT1A
01 0746   45 0504           THRCMD(B)=L
01 0747   44 2567           THRCOM=L        SIMULATED OUTPUTS
01 0750   13 0311           MKIT1A(B)=MKIT1A(B):XOR:MKTMSK
01 0751   53 4406
01 0752   45 0311
01 0753   13 0312           MKIT2A(B)=MKIT2A(B):XOR:MKTMSK
01 0754   53 4406
01 0755   45 0312
01 0756   55 0227           RETURN EXEC1A

                   NO REF:      ONE
                   NO REF:      HOGHDF
```

```
                            SECTOR
                   ****************************************
                     MODE TABLES
01 0757   01 5033  AROL1A   #RLAOFF 0
01 0760   01 5007           #GRDRLA 1
01 0761   01 4761           #DECRBA 2
01 0762   01 4635           #LOCALA 3
01 0763   01 4705           #VORARM 4

                   ****************************************
```

```
21 0764  01 4623  FROL1A  #ROLOFF 0       OFF
01 0765  01 4543          #GRNROL 1       GROUND ROLL
01 0766  01 4461          #DECRAB 2       ALIGN
01 0767  01 4251          #LOCALR 3       LOCALIZER
01 0770  01 4362          #VOR    4       VOR
01 0771  01 4216          #HDGSEL 5       HEADING SELECT
01 0772  01 4224          #RLTOGA 6       T/O G/A

                  ******************************************

01 0773  01 4131  APIT1A  #PTAOFF 0
01 0774  01 4005          #FLAREA 1
01 0775  01 3710          #GSLOPA 2
01 0776  01 4022          #ALTARM 3
01 0777  00 0000          RESERV 3          SPARES
01 1002  01 4040          #VCASRM
21 1003  01 4074          #MACHRM 8

                  ******************************************

21 1004  01 3675  EPIT1A  #PITOFF 0
01 1005  01 3466          #FLARE 1
01 1006  01 3330          #GSLOPE 2
01 1007  01 2657          #ALTHLD 3
21 1010  01 2631          #GAMODE 4
01 1011  01 2604          #TOMODE 5
01 1012  01 3022          #FPAMOD 6
01 1013  01 3210          #ASPITC 7
21 1014  01 3260          #MSPITC 8

                  ******************************************

                   THROTTLE MODE TABLE

01 1015  01 5036  ENGTHR  #THROFF         0 OFF
01 1016  01 5054          #THRRTO         1 RETARD
01 1017  01 5074          #THRSPD         2 ALPHA SPEED CONTROL
01 1020  01 5074          #THRSPD         3 SPEED CONTROL
01 1021  01 5276          #THRN1L         4 N1 LIMIT CONTROL
```

```
01 1022  01 5353          #THRMAC         5 MACH CONTROL
```

```
                    SECTOR
          *************************************************

             AUTOPILOT OFF


                    MODIFY
          ALTITD
          APTOGA
          HDOTF
          INT00A
          INT00B
          LIFTOF
          LOCVAL
          MKIT1A
          MKIT2A
          PTOCWS
          RTOCWS
          RUDC1A
          RUDC1B
          TOFLAG
          VTASCF
          VTASCT
```

```
                     AUTOPILOT OFF

                 WEIGHT
                 WOW
                 WOW4
                 ZTFIPA
                 ZTFIPB
                 ZTFIP5
                 ZTFI14
                 ZTFO0A
                 ZTFO0B
                 ZTRNRA
                 ZTRNRB
                 ZTWO0A
                 ZTWO0B

                         REFER
                 ACCX1A
                 ALFAZ
                 ALTNCR
                 ALTRTE
                 BIT0
                 BIT12
                 ONEG
                 SINTHT
                 VARIDX
                 VCASAD
                 VTASAD
                 WGTNOM
```

```
01 1023  00 0000  OFFINZ  SUBRTN
01 1024  41 3316          TOFLAG(B)=0
01 1025  50 5103          IF      F,3=1      THEN OFFIN1
01 1026  34 1046
01 1027  36 0023          B=19               CLEAR WASHOUTS A
01 1030  41 0525          ZTFIPA(B)=0
01 1031  41 0551          ZTWO0A(B)=0
01 1032  73 1030          BJP     LCK-2
01 1033  36 0041          B=33               CLEAR INTEGRATORS A
01 1034  41 0634          ZTRNRA(B)=0
01 1035  41 0704          INTO0A(B)=0
01 1036  73 1034          BJP     LCK-2
01 1037  36 0036          B=30               CLEAR LAGS A
01 1040  41 0575          ZTFO0A(B)=0
01 1041  73 1040          BJP     LCK-1
01 1042  36 0005          B=5                CLEAR OUTPUTS A
01 1043  41 0220          RUDC1A(B)=0
01 1044  73 1043          BJP     LCK-1
01 1045  34 1064          GO      OFFIN2
01 1046  36 0023  OFFIN1  B=19               CLEAR WASHOUTS B
01 1047  41 1414          ZTFIPB(B)=0
01 1050  41 1440          ZTWO0B(B)=0
01 1051  73 1047          BJP     LCK-2
01 1052  36 0041          B=33               CLEAR INTEGRATORS
01 1053  41 1523          ZTRNRB(B)=0
01 1054  41 1573          INTO0B(B)=0
01 1055  73 1053          BJP     LCK-2
01 1056  36 0036          B=30               CLEAR LAGS B
01 1057  41 1464          ZTFO0B(B)=0
01 1060  73 1057          BJP     LCK-1
01 1061  36 0005          B=5                CLEAR OUTPUTS B
01 1062  41 1107          RUDC1B(B)=0
01 1063  73 1062          BJP     LCK-1
01 1064  32 2517  OFFIN2  B=VARIDX
01 1065  12 0207          ALTITD(B)=ALTNCR       INZ ALT C.F.
01 1066  45 0712
01 1067  12 0214          VTASCF(B)=VTASAD       INZ TAS C.F.
01 1070  45 0714
01 1071  45 0725          VTASCT(B)=L
```

```
18198 SCAMP                              SECTION        89        PAGE       293
                                         -continued

01 1072   12 0216          HOOTF(B)=ALTRTE     INZ ALT RATE C.F.
01 1073   45 0711
01 1074   13 0442          ZTFIP5(B)=ALFAZ(B)
01 1075   45 0532
01 1076   13 0475          L=SINTHT(B)*ONEG*2A-17
01 1077   24 4165
01 1100   50 4321
01 1101   10 0212          U=VCASAD
01 1102   50 4502          LRTAU  2
01 1103   50 6100          ZTFI14(B)=-L+ACCX1A(B)+U
01 1104   15 0247
01 1105   50 0101
```

```
18198 SCAMP                              SECTION        89        PAGE       294

01 1106   45 0543
01 1107   12 4155          WEIGHT(B)=WGTNOM
01 1110   45 0745
01 1111   76 1164          CALL    PITCOF
01 1112   76 1146          CALL    ROLCOF
01 1113   76 1174          CALL    YAWCOF
01 1114   76 1722          CALL    OFFPFD
01 1115   76 1641          CALL    OFFRFD
01 1116   70 0001          LIFTOF(B)=1
01 1117   45 0522
01 1120   41 0521          APTOGA(B)=0
01 1121   70 0024          LOCVAL(B)=20
01 1122   45 0407
01 1123   41 0350          WOW4(B)=0
01 1124   41 0346          WOW(B)=0
01 1125   41 0356          PTOCWS(B)=0
01 1126   41 0351          RTOCWS(B)=0
01 1127   13 0311          L=MKIT1A(B)
01 1130   36 0012          B=10
01 1131   15 4412          L=L+BIT0(B)
01 1132   73 1131          BJP     LCK-1
01 1133   32 2517          B=VARIDX
01 1134   14 4426          MKIT1A(B)=L+BIT12
01 1135   45 0311
01 1136   13 0312          L=MKIT2A(B)
01 1137   36 0012          B=10
01 1140   17 4412          L=L-BIT0(B)
01 1141   73 1140          BJP     LCK-1
01 1142   32 2517          B=VARIDX
01 1143   16 4426          MKIT2A(B)=L-BIT12
01 1144   45 0312
01 1145   55 1023          RETURN OFFINZ
```

```
18198 SCAMP                              SECTION        89        PAGE       295

                    *****************************************************

                      INNER LOOP OFF STATE

                      ROLL

                               MODIFY
                    AILC1A
                    INTOT1
                    INTO22
                    PHICOM
                    PHIP
                    PCWSFG

                               REFER
                    BIT7
                    PHI1A

01 1146   00 0000   ROLCOF     SUBRTN
01 1147   13 0246              PHICOM(B)=PHI1A(B)
01 1150   45 0334
01 1151   45 0705              INTOT1(B)=L
01 1152   13 0222              L=-AILC1A(B)
```

```
 1B19B SCAMP                              SECTION        89       PAGE       295
                                          -continued

01 1153  50 5100
01 1154  10 4421             U=BIT7
01 1155  76 0115             CALL    LIMT1A
01 1156  15 0222             AILC1A(B)=L+AILC1A(B)
01 1157  45 0222
01 1160  41 0732             INTO22(B)=0
01 1161  41 0333             PHIP(B)=0
01 1162  41 0353             RCWSFG(B)=0
01 1163  55 1146             RETURN RCLCOF


 1B19B SCAMP                              SECTION        90       PAGE       296

                             SECTOR

                     ******************************************

                       PITCH


                             MODIFY
                     ELVC1A
                     INTO0A
                     PCWSFG
                     THETAP
                     THTCOM

                             REFER
                     THET1A

01 1164  00 0000     PITCOF  SUBRTN
01 1165  13 0245             THTCOM(B)=THET1A(B)
01 1166  45 0342
01 1167  45 0704             INTO0A(B)=L
01 1170  41 0221             ELVC1A(B)=0
01 1171  41 0341             THETAP(B)=0
01 1172  41 0357             PCWSFG(B)=0
01 1173  55 1164             RETURN PITCOF


 1B19B SCAMP                              SECTION        91       PAGE       297

                             SECTOR

                     ******************************************

                       YAW


                             MODIFY
                     RUDC1A
                     ZTFIP2
                     ZTF018
                     ZTF019
                     ZTF023
                     ZTW02

01 1174  00 0000     YAWCOF  SUBRTN
01 1175  41 0624             ZTF023(B)=0
01 1176  41 2620             ZTF019(B)=0
01 1177  41 0617             ZTF018(B)=0
01 1200  41 0553             ZTW02(B)=0
01 1201  41 2527             ZTFIP2(B)=0
01 1202  41 0220             RUDC1A(B)=0
01 1203  55 1174             RETURN YAWCOF
```

```
                          SECTOR
                   *********************************

                     CONTROL LOOPS


                          MODIFY
                   AILCOM
                   AILC1A
                   DELAIL
                   INTOT1
                   INTO22
                   MKIT1A
                   MKIT2A
                   PHICOM
                   TEMP1

                          REFER
                   AUTO1A
                   BIT1
                   DEG1P5
                   DEG5
                   DEG18
                   DUALFG
                   ENGOOD
                   ENG1A
                   KAILI
                   KPHD1A
                   KPHI1A
                   KRDUAL
                   PHIC
                   PHIDLM
                   PHID1A
                   PHIIC
                   PHIMAX
                   PHIP
                   PHI1A
                   RCWSFG
                   ROLE1A
                   RTOCWS
                   RWHLCD
                   SPDBRK
                   WOW4

01 1204  00 0000   ROLCAS   SUBRTN
01 1205  13 0257            IF     ENG1A(B)I<=I0 THEN RLCOFE
01 1206  61 1327
01 1207  67 1327
01 1210  13 0263            L=ROLE1A(B)-1
01 1211  71 7776
01 1212  61 1327            IF     LI=I0    THEN RLCOFE
```

```
01 1213  13 0351            IF     RTOCWS(B)I=I0 THEN ROLCS1
01 1214  61 1220
01 1215  13 0246            INTOT1(B)=PHI1A(B)
01 1216  45 0705
01 1217  34 1223            GO     RCLCS2
01 1220  13 0331   ROLCS1   L=PHIIC(B)
01 1221  36 0001            B=1
01 1222  76 0205            CALL   INTEGT
01 1223  13 0332   ROLCS2   L=PHIC(B)+PHIP(B)
01 1224  15 0333
01 1225  11 0466            U=PHIMAX(B)
01 1226  76 0115            CALL   LIMT1A
01 1227  15 0705            TEMP1=L+INTOT1(B)
01 1230  44 1776
01 1231  11 0456            U=PHIMAX(B)
01 1232  76 0115            CALL   LIMT1A
```

```
18196 SCAMP                          SECTION    92      PAGE     299
                                     -continued

01 1233  02 1776           IF     L:=:TEMP1 THEN ROLCS3
01 1234  61 1241
01 1235  16 1776           INTOT1(B)=L-TEMP1+INTOT1(B)
01 1236  15 0705
01 1237  45 0705
01 1240  50 0201           L=U
01 1241  11 0353  ROLCS3   IF     U,RCWSFG(B):/=:0 THEN ROLCS4
01 1242  62 1247
01 1243  17 0334           L=L-PHICOM(B)
01 1244  11 0470           U=PHIDLM(B)
01 1245  76 0115           CALL   LIMT1A
01 1246  15 0334           L=L+PHICOM(B)
01 1247  45 0334  ROLCS4   PHICOM(B)=L
01 1250  17 0246           L=L-PHI1A(B)*KPHI1A*2A-14
01 1251  24 4001
01 1252  50 4316
01 1253  45 0441           AILCOM(B)=L
01 1254  11 0260           IF     U,AUTO1A(B):=:0 THEN NORINT
01 1255  60 1267
01 1256  11 0263           IF     U,ROLE1A(B):=:0 THEN NORINT
01 1257  50 1267
01 1260  11 0314           IF     U,ENGOOD(B):/=:0 THEN NORINT
01 1261  62 1267
01 1262  35 0026           B=22
01 1263  76 0205           CALL   INTEGT
01 1264  10 4556           U=DEG5
01 1265  76 0115           CALL   LIMT1A
01 1266  45 0732           INTO22(B)=L
01 1267  13 0732  NORINT   L=INTO22(B)*KAILI
01 1270  24 4003
01 1271  50 0201           AILCOM(B)=L,U+AILCOM(B)
01 1272  15 0441
01 1273  45 0441
01 1274  73 0000           L=0
01 1275  11 0350           IF     U,WCW4(B):/=:0 THEN ROLCS5
01 1276  62 1303
```

```
18196 SCAMP                          SECTION    92      PAGE     300

01 1277  13 0331           L=PHIIC(B)-PHID1A(B)*KPHD1A*2A-14
01 1300  17 0243
01 1301  24 4002
01 1302  50 4316
01 1303  15 0441  ROLCS5   L=L+AILCOM(B)
01 1304  11 0310           IF     U,DUALFG(B):=:0 THEN ROLCS6
01 1305  60 1310
01 1306  24 4000           L=L*KRDUAL*2A-16
01 1307  50 4320
01 1310  11 0313  ROLCS6   IF     U,SPDBRK(B):=:0 THEN ROLCS7
01 1311  60 1313
01 1312  50 4201           L=L*2A-1
01 1313  15 0335  ROLCS7   AILCOM(B)=L+RWHLCD(B)+DELAIL(B)
01 1314  15 0336
01 1315  45 0441
01 1316  50 6100           L=-L
01 1317  10 4563           U=DEG18
01 1320  76 0115           CALL   LIMT1A
01 1321  17 0222           L=L-AILC1A(B)
01 1322  10 4551           U=DEG1P5
01 1323  76 0115           CALL   LIMT1A
01 1324  15 0222           AILC1A(B)=L+AILC1A(B)
01 1325  45 0222
01 1326  34 1330           GO     RLCCFE+1
01 1327  76 1146  RLCOFE   CALL   RCLCOF
01 1330  41 0336           DELAIL(B)=0
01 1331  13 0311           MKIT1A(B)=MKIT1A(B)+2
01 1332  71 0002
01 1333  45 0311
01 1334  13 0312           MKIT2A(B)=MKIT2A(B):XOR:BIT1
01 1335  53 4413
01 1336  45 0312
01 1337  55 1204           RETURN ROLCAS
```

```
                         SECTOR
                    *****************************

                         MODIFY
                    ELVCOM
                    ELVC1A
                    INTO0A
                    MKIT1A
                    MKIT2A
                    TEMP1

                         REFER
                    BIT0
                    DEGONE
                    DEG24
                    DG15M
                    ENG1A
                    GNDYPR
                    KTHD1A
                    KTHT1A
                    PCWSFG
                    PTOCWS
                    PWHLCD
                    QZERO
                    THETAC
                    THETAL
                    THETAP
                    THETIC
                    THET1A
                    THTCOM
                    THTDLM
                    THTD1A
                    WOW4
01 1340   30 0000   PITCAS   SUBRTN
01 1341   13 0257            IF      ENG1A(B)I<=I0 THEN PTCOFE
01 1342   61 1440
01 1343   67 1440
01 1344   13 0356            IF      PTOCWS(B)I=I0 THEN PITCS1
01 1345   61 1351
01 1346   13 0245            INTO0A(B)=THET1A(B)
01 1347   45 0704
01 1350   34 1354            GO      PITCS2
01 1351   13 0337   PITCS1   L=THETIC(B)
01 1352   36 0000            B=0
01 1353   76 0205            CALL    INTEGT
01 1354   13 0340   PITCS2   L=THETAC(B)+THETAP(B)
01 1355   15 0341
01 1356   11 0357            IF      U,PCWSFG(B)I/=I0 THEN PITCS3
01 1357   62 1361
01 1360   15 0471            L=L+THETAL(B)
```

```
01 1361   76 1450   PITCS3   CALL    PITLIM
01 1362   15 0704            TEMP1=L+INTO0A(B)
01 1363   44 1776
01 1364   76 1450            CALL    PITLIM
01 1365   02 1776            IF      LI=ITEMP1 THEN PITCS4
01 1366   61 1375
01 1367   50 0200            U=L
01 1370   16 1776            INTO0A(B)=L-TEMP1+INTO0A(B)
01 1371   15 0704
01 1372   45 0704
01 1373   41 0337            THETIC(B)=0
01 1374   50 0201            L=U
01 1375   11 0357   PITCS4   IF      U,PCWSFG(B)I/=I0 THEN PITCS5
01 1376   62 1403
01 1377   17 0342            L=L-THTCOM(B)
01 1400   11 0465            U=THTDLM(B)
```

```
16196 SCAMP                               SECTION        93        PAGE       302
                                          -continued

01 1401   76 4115          CALL    LIMT1A
01 1402   15 0342          L=L+THTCOM(B)
01 1403   45 0342  PITCS5  THTCOM(B)=L
01 1404   17 0245          L=L-THET1A(B)*KTHT1A
01 1405   24 4005
01 1406   47 0440          ELVCOM(B)=U
01 1407   50 0201          L=U
01 1410   11 0350          IF      U,WCW4(B):/=:0 THEN PITCS6
01 1411   62 1417
01 1412   13 0337          L=THETIC(B)-THTD1A(B)*KTHD1A
01 1413   17 0244
01 1414   24 4006
01 1415   50 0201          L=U+ELVCOM(B)
01 1416   15 0440
01 1417   15 0343  PITCS6  ELVCOM(B)=L+PWHLCO(B)*QZERO/GNDYPR(B)
01 1420   24 4011
01 1421   27 0443
01 1422   45 0440
01 1423   50 4602          L=L*2^2
01 1424   02 4566          IF      L:<:DEG24 THEN PITCS7
01 1425   67 1427
01 1426   12 4566          L=DEG24
01 1427   02 4576  PITCS7  IF      L:>=:DG15M THEN PITCS8
01 1430   65 1432
01 1431   12 4576          L=DG15M
01 1432   17 0221  PITCS8  L=L-ELVC1A(B)
01 1433   10 4550          U=DEGONE
01 1434   76 4115          CALL    LIMT1A
01 1435   15 0221          ELVC1A(B)=L+ELVC1A(B)
01 1436   45 0221
01 1437   34 1441          GO      PTCCFE+1
01 1440   76 1164  PTCOFE  CALL    PITCOF
01 1441   13 0311          MKIT1A(B)=MKIT1A(B)+1
01 1442   71 0001
01 1443   45 0311
01 1444   13 0312          MKIT2A(B)=MKIT2A(B):XOR:BIT0


16196 SCAMP                               SECTION        93        PAGE       303

01 1445   53 4412
01 1446   45 0312
01 1447   55 1340          RETURN PITCAS


16196 SCAMP                               SECTION        94        PAGE       304

                           SECTOR
                   **************************************************

                     PITCH LIMITING

                           REFER
                   DEGPMX
                   DG10M

01 1450   00 0000  PITLIM  SUBRTN
01 1451   03 0463          IF      L:<:DEGPMX(B) THEN PITLM1
01 1452   67 1454
01 1453   13 0453          L=DEGPMX(B)
01 1454   02 4575  PITLM1  IF      L:>=:DG10M THEN PITLM2
01 1455   65 1457
01 1456   12 4575          L=DG10M
01 1457   55 1450  PITLM2  RETURN PITLIM
```

```
                              SECTOR
                    ******************************

                              MODIFY
                    DCRFLG
                    DELRUD
                    MKIT1A
                    MKIT2A
                    RUDC1A
                    TEMP1
                    ZTFIP2
                    ZTWO2

                              REFER
                    ACCY1A
                    BIT2
                    DEG2
                    DEG5
                    DEG20
                    DUALFG
                    GNDYPR
                    G573
                    KR1A
                    KYAWGR
                    KYAY
                    KYFF
                    QZERO
                    RULE1A
                    SINPHC
                    VARICX
                    VTASCF
                    WOW4
                    YAWR1A
                    YDENGF
                    ZTF018
                    ZTF019
                    ZTF023
01 1460  00 0000   YAWSAS  SUBRTN
01 1461  13 0335           IF      YDENGF(B):<=:0 THEN YWCOFE
01 1462  61 1563
01 1463  67 1563
01 1464  13 0242           L=YAWR1A(B)
01 1465  36 0027           B=23
01 1466  76 0141           CALL    ZTFLAG
01 1467  13 0345           L=DELRUD(B)
01 1470  36 0022           B=18
01 1471  76 0141           CALL    ZTFLAG
01 1472  70 0000           L=0
01 1473  11 0350           IF      U,WOW4(B):/=:0 THEN YAWSA1
01 1474  62 1502
```

```
01 1475  11 0421           IF      U,DCRFLG(B):/=:0 THEN YAWSA1
01 1476  62 1502
01 1477  13 0250           L=ACCY1A(B)*KYAY*2A-14
01 1500  24 4012
01 1501  50 4316
01 1502  36 0023   YAWSA1  B=19
01 1503  76 0141           CALL    ZTFLAG
01 1504  11 0350           IF      U,WOW4(B):/=:0 THEN YAWSA2
01 1505  62 1523
01 1506  11 0421           IF      U,DCRFLG(B):/=:0 THEN YAWSA2
01 1507  62 1523
01 1510  13 0473           L=SINPHC(B)*G573*2A-9/VTASCF(B)
01 1511  24 4163
01 1512  50 4311
01 1513  27 0714
01 1514  36 0002           B=2
```

```
18198 SCAMP                              SECTION       95        PAGE       306
-continued

01 1515  76 0162           CALL   ZTFWO
01 1516  15 0024           TEMP1=L+ZTFO23(B)*KYFF/VTASCF(B)
01 1517  24 4015
01 1520  27 0714
01 1521  44 1776
01 1522  34 1526           GO      YAWSA3
01 1523  41 0553  YAWSA2   ZTWO2(B)=0
01 1524  41 0527           ZTFIP2(B)=0
01 1525  40 1776           TEMP1=0
01 1526  13 0553  YAWSA3   L=ZTWO2(B)+ZTFO23(B)-YAWR1A(B)
01 1527  15 0024
01 1530  17 0242
01 1531  33 0263           B=ROLE1A(B)
01 1532  37 7776           B=B-1
01 1533  73 1536           BJP    YAWSA4
01 1534  24 4014           L=L+KYAWGR*2^-14
01 1535  50 4316
01 1536  32 2517  YAWSA4   B=VARIDX
01 1537  24 4013           L=L+KR1A*2^-14
01 1540  50 4316
01 1541  15 0620           L=L+ZTFO19(B)-ZTFO18(B)+OZERO/GNDYPR(B)+TEMP1
01 1542  17 0617
01 1543  24 4011
01 1544  27 0443
01 1545  14 1776
01 1546  11 0310           IF      U,DUALFG(B):/=10 THEN YAWSA5
01 1547  62 1552
01 1550  10 4556           U=DEG5
01 1551  34 1554           GO      YAWSA5+2
01 1552  50 4201  YAWSA5   L=L+2^-1
01 1553  10 4564           U=DEG20
01 1554  76 0115           CALL   LIMT1A
01 1555  17 0220           L=L-RUDC1A(B)
01 1556  10 4552           U=DEG2
01 1557  76 0115           CALL   LIMT1A
01 1560  15 0220           RUDC1A(B)=L+RUDC1A(B)

18198 SCAMP                              SECTION       95        PAGE       307

01 1561  45 0220
01 1562  34 1564           GO      YWCOFE+1
01 1563  76 1174  YWCOFE   CALL    YAWCOF
01 1564  41 0421           DCRFLG(B)=0
01 1565  41 0345           DELRUD(B)=0
01 1566  13 0311           MKIT1A(B)=MKIT1A(B)+4
01 1567  71 0004
01 1570  45 0311
01 1571  13 0312           MKIT2A(B)=MKIT2A(B):XOR:BIT2
01 1572  53 4414
01 1573  45 0312
01 1574  55 1460           RETURN YAWSAS

18198 SCAMP                              SECTION       96        PAGE       308

                  SECTOR
         *****************************

                  MODIFY
         MKIT1A
         MKIT2A
         PHICFD
         RFDC1A

                  REFER
         DUALFG
         D5P0
         KPHIFD
         PHIC
```

```
18198 SCAMP                              SECTION        96        PAGE       308
                                         -continued

                       PHIDLM
                       PHID1A
                       PHIIC
                       PHIMAX
                       PHIP
                       PHI1A
                       ROLE1A
                       WOW

01 1575  02 0000  ROLFD    SUBRTN
01 1576  13 0310           IF      DUALFG(B)$=10 THEN ROLFD1
01 1577  61 1602
01 1600  13 0346           IF      WOW(B)$/=10 THEN ROLFD2
01 1601  63 1604
21 1602  13 0263  ROLFD1   IF      ROLE1A(B)$/=10 THEN ROLFD3
01 1603  63 1606
01 1604  10 4516  ROLFD2   U=D500
01 1605  34 1631           GO      XITRFD
21 1606  13 0331  ROLFD3   L=PHIIC(B)+PHIC(B)+PHIP(B)-PHICFD(B)
01 1607  15 0332
01 1610  15 0333
01 1611  17 0445
01 1612  11 0470           U=PHIDLM(B)
01 1613  76 0115           CALL    LIMT1A
01 1614  15 0445           PHICFD(B)=L+PHICFD(B)
01 1615  45 0445
21 1616  11 0466           U=PHIMAX(B)
21 1617  76 0115           CALL    LIMT1A
01 1620  45 0445           PHICFD(B)=L
21 1621  13 0243           L=-PHID1A(B)+2A-1-PHI1A(B)+PHICFD(B)
01 1622  50 6100
01 1623  50 4221
01 1624  17 0246
21 1625  15 0445
21 1626  36 7003           P=3
21 1627  76 0141           CALL    ZTFLAG
21 1630  24 4016           L=L+KPHIFD


18198 SCAMP                              SECTION        96        PAGE       309

01 1631  47 0223  XITRFD   RFDC1A(B)=L
21 1632  13 0311           MKIT1A(B)=MKIT1A(B)+020
01 1633  71 0020
01 1634  45 0311
31 1635  13 0312           MKIT2A(B)=MKIT2A(B)-020
01 1636  71 7757
21 1637  45 0312
01 1640  55 1575           RETURN ROLFD


18198 SCAMP                              SECTION        97        PAGE       310

                           SECTOR
                  **************************************************
                   ROLL FLIGHT DIRECTOR OFF


                           MODIFY
                  PHICFD
                  ZTF03

01 1641  00 0000  OFFRFD   SUBRTN
01 1642  41 0000           ZTF03(B)=0
01 1643  41 0445           PHICFD(B)=0
21 1644  55 1641           RETURN OFFRFD
```

```
                          SECTOR
                *****************************

                          MODIFY
                KWOEA4
                MKIT1A
                MKIT2A
                PFDC1A
                TEMP1
                THTCFD

                          REFER
                AUTO1A
                BIT3
                DUALFG
                D500
                KPFDGN
                KTHTFD
                KWOPFD
                PITE1A
                THETAC
                THETAL
                THETAP
                THETIC
                THET1A
                THTD1A
                VARIDX
                WOW
                ZTWD4

01 1645  00 0000  PITFD    SUBRTN
01 1646  13 0310           IF      DUALFG(B)I=I0 THEN PITFD1
01 1647  61 1652
01 1650  13 0346           IF      WOW(B)I/=I0 THEN PITFD2
01 1651  63 1654
01 1652  13 0265  PITFD1   IF      PITE1A(B)I/=I0 THEN PITFD3
01 1653  63 1656
01 1654  10 4516  PITFD2   U=D500
01 1655  34 1712           GO      XITPFD
01 1656  71 7776  PITFD3   TEMP1=L-1
01 1657  44 1776
01 1660  13 0337           L=THETIC(B)+THETAC(B)
01 1661  15 0340
01 1662  11 2260           U=AUTO1A(B)
01 1663  32 1776           R=TEMP1
01 1664  62 1667           IF      UI/=I0   THEN PITFD4
01 1665  24 4213           L=L*KPFDGN*2**-17
01 1666  50 4321
01 1667  10 4220  PITFD4   U=KWOPFD
01 1670  32 2517           R=VARIDX
```

```
01 1671  47 0750           KWOEA4(B)=U
01 1672  15 0245           L=L+THET1A(B)+ZTWD4(B)
01 1673  15 0555
01 1674  76 1450           CALL    PITLIM
01 1675  17 0245           THTCFD(B)=L-THET1A(B)-ZTWD4(B)
01 1676  17 0555
01 1677  45 0444
01 1700  13 0341           L=THETAP(B)+THETAL(B)-THET1A(B)
01 1701  15 0471
01 1702  17 0245
01 1703  36 0004           B=4
01 1704  76 0162           CALL    ZTFWD
01 1705  17 0244           L=L-THTD1A(B)+THTCFD(B)
01 1706  15 0444
01 1707  36 0005           B=5
```

-continued

```
01 1710  76 0141           CALL   ZTFLAG
01 1711  24 4017           L=L*KTHTFD
01 1712  47 0224  XITPFD   PFDC1A(B)=L
01 1713  13 0311           MKIT1A(B)=MKIT1A(B):XOR:BIT3
01 1714  53 4415
01 1715  45 0311
01 1716  13 0312           MKIT2A(B)=MKIT2A(B)-010
01 1717  71 7767
01 1720  45 0312
01 1721  55 1645           RETURN PITFD
```

```
                           SECTOR

                  **************************************************

                     PITCH FLIGHT DIRECTOR OFF


                           MODIFY
                  THTCFD
                  ZTFIP4
                  ZTFD5
                  ZTWD4

                           REFER
                  THETAL
                  THETAP
                  THET1A

01 1722  00 0000  OFFPFD   SUBRTN
01 1723  13 0341           ZTFIP4(B)=THETAP(B)+THETAL(B)-THET1A(B)
01 1724  15 0471
01 1725  17 0245
01 1726  45 0531
01 1727  41 0555           ZTWD4(B)=0
01 1730  41 0602           ZTFD5(B)=0
01 1731  41 0444           THTCFD(B)=0
01 1732  55 1722           RETURN OFFPFD
```

```
                           SECTOR
                  ******************************


                           MODIFY
                  CMDNTA
                  COUNTR
                  DELAIL
                  FLAGCR
                  HDGHDF
                  INTOT1
                  KFGEA7
                  MKIT1A
                  MKIT2A
                  PHIC
                  PHIIC
                  PHIMAX
                  PHIP
                  PHIP1
                  RCPFGA
                  RCWS
                  RCWSFG
                  ROLA1A
                  ROLE1A
```

```
                  RSYNFA
                  RTOCWS
                  RWHLCD
                  TEMP1
                  WOW
                  WOW4
                  ZTFU7

                            REFER
                  AUTO1A
                  BIT6
                  DEG3
                  DEG5
                  DEG10
                  DEG30
                  DUALFG
                  ENG1A
                  FDIR1A
                  KONR1A
                  KRCW1A
                  KRFF1A
                  KRTKOF
                  KSCALE
                  KUPR1A
                  PHICOM
                  PHI1A
                  PSIHCL
                  PTOCWS
```

```
                  RCWSHO
                  RDEADZ
                  RDETNT
                  STATE0
                  THET1A
                  WHLCAP
                  WHLIST

01 1733  20 0000  ROLCWS  SUBRTN
01 1734  13 0310          IF      DUALFG(B):/=:0 THEN ROLCW4
01 1735  63 1757
01 1736  13 0346          IF      WCW(B):=:0 THEN ROLCW1
01 1737  61 1743
01 1740  71 7776          WOW(B)=L-1
01 1741  45 0346
01 1742  34 1751          GO      ROLCW2
01 1743  13 0351  ROLCW1  L=RTOCWS(B)+PTOCWS(B)
01 1744  15 0356
01 1745  61 1753          IF      L:=:0     THEN ROLCW3
01 1746  13 0245          IF      THET1A(B):>=:DEG5 THEN ROLCW3
01 1747  02 4556
01 1750  65 1753
01 1751  70 0050  ROLCW2  WOW4(B)=40
01 1752  45 0350
01 1753  13 0350  ROLCW3  IF      WCW4(B):=:0 THEN ROLCW4
01 1754  61 1757
01 1755  71 7776          WOW4(B)=L-1
01 1756  45 0350
01 1757  10 4021  ROLCW4  U=RDEADZ
01 1760  12 0202          L=WHLCAP+WHLIST
01 1761  14 0204
01 1762  76 3127          CALL    DEOZ1A
01 1763  45 0347          RCWS(B)=L
01 1764  50 0301          ABSVAL
01 1765  02 4022          IF      L:<:RCWSHO THEN ROLCW5
01 1766  67 1771
01 1767  41 0347          RCWS(B)=0
01 1770  70 0000          L=0
01 1771  11 0257  ROLCW5  IF      U,ENG1A(B):=:0 THEN RDSENG
01 1772  60 2146
01 1773  41 0335          RWHLCD(B)=0
```

```
18198 SCAMP                                  SECTION       100      PAGE      315
                                             -continued

01 1774   11 0260            IF      U,AUTO1A(B):=:0 THEN OUTDTR
01 1775   60 2016
01 1776   11 0263            IF      U,ROLE1A(B):=:0 THEN OUTDTR
01 1777   60 2016
01 2000   02 4023            IF      L:>=:RDETNT THEN OUTDR1
01 2001   65 2014
01 2002   41 0604            ZTF07(B)=0
01 2003   13 0353            IF      RCWSFG(B):=:0 THEN XITRCW
01 2004   61 2155
01 2005   13 0246            PHIP(B)=PHI1A(B)
01 2006   45 0333


18198 SCAMP                                  SECTION       100      PAGE      316


01 2007   45 0710            PHIP1(B)=L
01 2010   41 0705            INTOT1(B)=0
01 2011   41 0351            RTOCWS(B)=0
01 2012   41 0353            RCWSFG(B)=0
01 2013   34 2155            GO      XITRCW
01 2014   70 0001   OUTDR1   CMDNTA(B)=1
01 2015   45 0276
01 2016   13 0353   OUTDTR   IF      RCWSFG(B):/=:0 THEN RCWSCP
01 2017   63 2034
01 2020   13 0260            IF      AUTO1A(B):/=:0 THEN ROLCW6
01 2021   63 2030
01 2022   13 0261            IF      FDIR1A(B):/=:0 THEN ROLCW6
01 2023   63 2030
01 2024   41 0263            ROLE1A(B)=0
01 2025   41 0262            ROLA1A(B)=0
01 2026   41 0266            RSYNFA(B)=0
01 2027   41 0273            RCPFGA(B)=0
01 2030   13 0334   ROLCW6   INTOT1(B)=PHICOM(B)
01 2031   45 0705
01 2032   70 0001            RCWSFG(B)=1
01 2033   45 0353
01 2034   12 4571   RCWSCP   PHIMAX(B)=DEG30
01 2035   45 0466
01 2036   50 5002            SKIP    2
01 2037   34 2041            GO      LCK+2
01 2040   34 2043            GO      ROLC13
01 2041   13 0351            IF      RTOCWS(B):/=:0 THEN RCWSBY
01 2042   63 2104
01 2043   13 0346   ROLC13   IF      WOW(B):=:0 THEN ROLCW7
01 2044   61 2047
01 2045   45 0351            RTOCWS(B)=L
01 2046   34 2104            GO      RCWSBY
01 2047   13 0263   ROLCW7   IF      ROLE1A(B):/=:0 THEN RCWSBY
01 2050   63 2104
01 2051   13 0277            L=STATE0(B):AND:BIT6
01 2052   52 4420
01 2053   61 2104            IF      L:=:0     THEN RCWSBY
01 2054   13 0347            IF      RCWS(B):/=:0 THEN RCWSBY
01 2055   63 2104
01 2056   13 0246            L=PHI1A(B)
01 2057   50 0301            ABSVAL
01 2060   50 5002            SKIP    2
01 2061   34 2063            GO      LCK+2
01 2062   34 2065            GO      ROLC14
01 2063   02 4554            IF      L:>=:DEG3 THEN RCWSBY
01 2064   65 2104
01 2065   13 0352   ROLC14   IF      COUNTR(B):=:0 THEN ROLCW8
01 2066   61 2072
01 2067   71 7776            COUNTR(B)=L-1
01 2070   45 0352
01 2071   34 2106            GO      RCWSB1
01 2072   13 0354   ROLCW8   L=FLAGCR(B)
```

```
01 2073  10 0200          U=PSIHCL
01 2074  76 4134          CALL    SELHLD
01 2075  13 0332          INTOT1(B)=PHIC(B)+PHIP(B)
01 2076  15 0333
01 2077  45 0705
01 2100  70 0001          HOGHOF(B)=1
01 2101  45 0401
01 2102  41 0354          FLAGCH(B)=0
01 2103  34 2146          GO      RCSENG
01 2104  70 0074  RCWSBY  COUNTR(B)=60
01 2105  45 0352
01 2106  70 0001  RCWSB1  FLAGCR(B)=1
01 2107  45 0354
01 2110  13 0347          IF      RCWS(B)1=10 THEN ROLCW9
01 2111  61 2114
01 2112  10 4027          U=KUPR1A
01 2113  34 2120          GO      ROLC10+1
01 2114  11 0350  ROLCW9  IF      U,WOW4(B)1/=10 THEN ROLC10
01 2115  62 2117
01 2116  41 0351          RTOCWS(B)=0
01 2117  10 4026  ROLC10  U=KONR1A
01 2120  47 1007          KFGEA7(B)=U
01 2121  24 4024          L=L+KRCW1A+2A-11
01 2122  50 4313
01 2123  24 4110          L=L+KSCALE
01 2124  50 0201          L=U
01 2125  10 4561          U=DEG10
01 2126  76 0115          CALL    LIMT1A
01 2127  44 1776          TEMP1=L
01 2130  36 0007          B=7
01 2131  76 0141          CALL    ZTFLAG
01 2132  45 0331          PHIIC(B)=L
01 2133  12 1776          L=TEMP1
01 2134  36 0017          B=15
01 2135  76 0141          CALL    ZTFLAG
01 2136  11 0351          IF      U,RTOCWS(B)1=10 THEN ROLC11
01 2137  60 2143
01 2140  24 4020          L=L+KRTKOF+2A4
01 2141  50 4704
01 2142  34 2144          GO      ROLC11+1
01 2143  24 4025  ROLC11  L=L+KRFF1A
01 2144  47 0335          RWHLCD(B)=U
01 2145  34 2151          GO      ROLC12
01 2146  41 0331  RDSENG  PHIIC(B)=0
01 2147  41 0004          ZTF07(B)=0
01 2150  41 0351          RTOCWS(B)=0
01 2151  41 0332  ROLC12  PHIC(B)=0
01 2152  41 0333          PHIP(B)=0
01 2153  41 0336          DELAIL(B)=0
01 2154  34 2157          GO      XITRC1
01 2155  70 0001  XITRCW  FLAGCR(B)=1
01 2156  45 0354
```

```
01 2157  13 0311  XITRC1  MKIT1A(B)=MKIT1A(B)+BIT6
01 2160  14 4420
01 2161  45 0311
01 2162  13 0312          MKIT2A(B)=MKIT2A(B)-BIT6
01 2163  16 4420
01 2164  45 0312
01 2165  55 1733          RETURN ROLCWS
```

```
              SECTOR
              ******************************

                        MODIFY
              CMDNTA
              DEGPMX
              INTO0A
              KFGEAB
              MKIT1A
              MKIT2A
              PCWS
              PCWSFG
              PCPFGA
              PITA1A
              PITE1A
              PSYNFA
              PTOCWS
              PWHLCD
              TDFLAG
              TEMP1
              THETAC
              THETAP
              THETIC
              ZTF08

                        REFER
              AUTO1A
              BIT5
              COLCAP
              COL1ST
              DEG10
              DEG22
              DUALFG
              ENG1A
              FDIR1A
              G573
              KCWSPC
              KDNP1A
              KPCW1A
              KPFF1A
              KPTKOF
              KUPP1A
              PCWSHD
              PDEADZ
              PDETNT
              THETAL
              THET1A
              THTCOM
              VTASCF
              WOW4
```

```
01 2166   00 0000  PITCWS  SUBRTN
01 2167   13 0245          L=THET1A(B)*KCWSPC
01 2170   24 4035
01 2171   50 0201          L=U+COLCAP+COL1ST
01 2172   14 0203
01 2173   14 0205
01 2174   10 4031          U=PDEADZ
01 2175   76 0127          CALL    DEDZ1A
01 2176   45 0355          PCWS(B)=L
01 2177   50 0301          ABSVAL
01 2200   02 4032          IF      L:<:PCWSHD THEN PITCW1
01 2201   67 2204
01 2202   41 0355          PCWS(B)=0
01 2203   70 0000          L=0
01 2204   11 0310  PITCW1  IF      U,DUALFG(B):/=:0 THEN POTNTC
01 2205   62 2215
01 2206   11 0257          IF      U,ENG1A(B):=:0 THEN PDSENG
```

```
01 2207  60 2317
01 2210  41 0343           PWHLCD(B)=0
01 2211  11 0260           IF     U,AUTO1A(B):=:0 THEN OUTDP2
01 2212  60 2234
01 2213  11 0265           IF     U,PITE1A(B):=:0 THEN OUTDTP
01 2214  60 2235
01 2215  02 4033  POTNTC   IF     L:>=:PDETNT THEN OUTDP1
01 2216  65 2232
01 2217  41 0605           ZTF08(B)=0
01 2220  13 0357           IF     PCWSFG(B):=:0 THEN XITPCW
01 2221  61 2324
01 2222  13 0342           INTO0A(B)=THTCOM(B)-THETAP(B)-THETAL(B)-THETAC(B)
01 2223  17 0341
01 2224  17 0471
01 2225  17 0340
01 2226  45 0704
01 2227  41 0357           PCWSFG(B)=0
01 2230  41 0356           PTOCWS(B)=0
01 2231  34 2324           GO     XITPCW
01 2232  70 0001  OUTDP1   CMONTA(B)=1
01 2233  45 0276
01 2234  41 0316  OUTDP2   TDFLAG(B)=0
01 2235  13 0357  OUTDTP   IF     PCWSFG(B):/=:0 THEN PCWSCP
01 2236  63 2253
01 2237  13 0260           IF     AUTO1A(B):/=:0 THEN PITCW2
01 2240  63 2247
01 2241  13 0261           IF     FOIR1A(B):/=:0 THEN PITCW2
01 2242  63 2247
01 2243  41 0264           PITA1A(B)=0
01 2244  41 0265           PITE1A(B)=0
01 2245  41 0267           PSYNFA(B)=0
01 2246  41 0274           PCPFGA(B)=0
01 2247  13 0342  PITCW2   INTO0A(B)=THTCOM(B)
01 2250  45 0704
01 2251  70 0001           PCWSFG(B)=1
```

```
01 2252  45 0357
01 2253  12 4565  PCWSCP   DEGPMX(B)=DEG22
01 2254  45 0463
01 2255  13 0356           IF     PTOCWS(B):/=:0 THEN PITCW3
01 2256  63 2262
01 2257  13 0350           IF     WCW4(B):=:0 THEN PITCW3
01 2260  61 2262
01 2261  45 0356           PTOCWS(B)=L
01 2262  13 0355  PITCW3   IF     PCWS(B):/=:0 THEN PITCW5
01 2263  63 2271
01 2264  11 0350           IF     U,WOW4(B):/=:0 THEN PITCW4
01 2265  62 2267
01 2266  41 0356           PTOCWS(B)=0
01 2267  10 4037  PITCW4   U=KONP1A
01 2270  34 2272           GO     PITCW5+1
01 2271  10 4040  PITCW5   U=KUPP1A
01 2272  47 1010           KFGEA8(B)=U
01 2273  24 4034           L=L*KPCW1A/VTASCF(B)+G573
01 2274  27 0714
01 2275  24 4163
01 2276  50 0201           L=U
01 2277  10 4561           U=DEG10
01 2300  76 0115           CALL   LIMT1A
01 2301  44 1776           TEMP1=L
01 2302  36 0010           B=8
01 2303  76 0141           CALL   ZTFLAG
01 2304  45 0337           THETIC(B)=L
01 2305  12 1776           L=TEMP1
01 2306  36 0020           B=16
01 2307  76 0141           CALL   ZTFLAG
01 2310  11 0356           IF     U,PTOCWS(B):=:0 THEN PITCW6
01 2311  60 2314
```

```
01 2312  24 4030          L=L+KPTKCF
01 2313  34 2315          GO      PITCW6+1
01 2314  24 4036  PITCW6  L=L+KPFF1A
01 2315  47 0343          PWHLCD(B)=L
01 2316  34 2322          GO      PITCW7
01 2317  41 0337  PDSENG  THETIC(B)=0
01 2320  41 0605          ZTF08(B)=0
01 2321  41 0356          PTOCWS(B)=0
01 2322  41 0340  PITCW7  THETAC(B)=0
01 2323  41 0341          THETAP(B)=0
01 2324  13 0311  XITPCW  MKIT1A(B)=MKIT1A(B):XOR:BIT5
01 2325  53 4417
01 2326  45 0311
01 2327  13 0312          MKIT2A(B)=MKIT2A(B):XOR:BIT5
01 2330  53 4417
01 2331  45 0312
01 2332  55 2166          RETURN PITCWS
```

```
                          SECTOR
                  ***************************************************

                     INPUTS FOR THIS CHANNEL


                          MODIFY
                  COSPHI
                  COSPSI
                  COSTHT
                  CRSL1A
                  DMTX11
                  DMTX22
                  DMTX23
                  DMTX31
                  FLAPOS
                  HDGSER
                  HRDC1A
                  HRDF1A
                  INTOT2
                  MKIT1A
                  MKIT2A
                  PHI1A
                  PSIHCL
                  THET1A
                  VTASAD
                  YAWR1A
                  YAWR1B

                          REFER
                  BIT6
                  BIT11
                  DUALFG
                  FULL1A
                  FUL21A
                  HDGSDD
                  INTOUT
                  INTU12
                  KNT131
                  MACHAD
                  ROLE1A
                  SPDSND
                  STATE0
                  VARICX
                  VORHER
                  YAWRTA
                  YAWRTB
                  ZTFIP9
                  ZTWD9

01 2333  30 0000  CONVER  SUBRTN
```

```
01 2334  50 7202          ENTICR 2          DUAL SENSORS
01 2335  36 0014          B=12
01 2336  50 7201          ENTICR 1
01 2337  36 0031          B=25
01 2340  73 2341  NXTDUA  BJP     LCK+1
01 2341  13 0124          L=YAWRTA(B)-YAWRTB(B)*2A-1+YAWRTB(B)
01 2342  17 0125
01 2343  50 4201
01 2344  15 0125
01 2345  50 7202          IF      U,INTOUT(2)I/=10 THEN TRYNXT
01 2346  11 2233
01 2347  62 2355
01 2350  50 5103          IF      F,3=1     THEN CONVRB
01 2351  34 2354
01 2352  45 0242          YAWR1A(B)=L
01 2353  34 2355          GO      LCK+2
01 2354  45 1131  CONVRB  YAWR1B(B)=L
01 2355  73 2356  TRYNXT  BJP     LCK+1
01 2356  50 7201          ENTICR 1
01 2357  73 2340          BJP     NXTDUA

                  *************************************

                   SPECIAL SCALING

01 2360  32 2517          B=VARIOX
01 2361  11 0245          U=THET1A(B)       PITCH ANGLE
01 2362  12 4206          L=FUL21A
01 2363  76 0051          CALL    ASIN1A
01 2364  45 0245          THET1A(B)=L
01 2365  76 0000          CALL    SINCOS
01 2366  50 0700          COSTHT(B)=A
01 2367  03 0474
01 2370  45 0320          DMTX11(B)=L
01 2371  50 6200          DMTX31(B)=-U
01 2372  47 0326
01 2373  12 4206          L=FUL21A          BANK ANGLE
01 2374  11 0246          U=PHI1A(B)
01 2375  76 0051          CALL    ASIN1A
01 2376  45 0246          PHI1A(B)=L
01 2377  76 0000          CALL    SINCOS
01 2400  50 0700          COSPHI(B)=A
01 2401  03 0476
01 2402  45 0324          DMTX22(B)=L
01 2403  50 6200          DMTX23(B)=-U
01 2404  47 0325
01 2405  12 4205          L=FULL1A          COURSE SEL. ERROR
01 2406  11 0256          U=CRSL1A(B)
01 2407  76 0051          CALL    ASIN1A
01 2410  50 5002          SKIP    2
01 2411  34 2413          GO      LCK+2
```

```
01 2412  12 0101          L=VORHER
01 2413  45 0256          CRSL1A(B)=L
01 2414  76 0000  CRSLCC  CALL    SINCOS
01 2415  50 0700          COSPSI(B)=A
01 2416  03 0500
01 2417  50 5103          IF      F,3=1     THEN CONVR1
01 2420  34 2442
01 2421  12 4205          L=FULL1A          CLUTCHED HDG.
01 2422  10 0200          U=PSIHCL
01 2423  76 0051          CALL    ASIN1A
01 2424  44 0200          PSIHCL=L
01 2425  12 4205          L=FULL1A          HDG. SEL. ERROR
01 2426  10 0206          U=HDGSER
01 2427  76 0051          CALL    ASIN1A
01 2430  50 5002          SKIP    2
```

```
01 2431   34 2433          GO      LOK+2
01 2432   12 0071          L=HOGSDD
01 2433   44 0206          HOGSER=L
01 2434   10 0201          U=FLAPOS          FLAP POSITION
01 2435   12 4205          L=FULL1A
01 2436   76 0051          CALL    ASIN1A
01 2437   65 2441          IF      L:>=:0    THEN LOK+2
01 2440   70 0000          L=0
01 2441   44 0201          FLAPOS=L
01 2442   13 0255  CONVR1  HRDC1A(B)=HRDC1A(B)-20 HRADIO COARSE
01 2443   71 7753
01 2444   45 0255
01 2445   13 0254          HRDF1A(B)=HRDF1A(B)-80 HRADIO FINE
01 2446   71 7657
01 2447   45 0254
01 2450   12 0214          IF      VTASAD:>=:KNT131 THEN YAWRRV
01 2451   02 4174
01 2452   65 2457
01 2453   12 4167          L=SPDSNO*MACHAD*2A4
01 2454   24 0211
01 2455   56 4704
01 2456   46 0214          VTASAD=U

                   *************************************

                     YAW RATE REVERSION

01 2457   13 0263  YAWRRV  L=ROLE1A(B)-3
01 2460   71 7774
01 2461   67 2467          IF      L:<:0     THEN YAWRR1
01 2462   13 0242          L=YAWR1A(B)
01 2463   36 0011          B=9
01 2464   76 0162          CALL    ZTFWD
01 2465   13 0310          IF      DUALFG(B):=:0 THEN CONVEX
01 2466   61 2505
01 2467   13 0277  YAWRR1  L=STATE0(B):AND:BIT6
01 2470   52 4420
```

```
01 2471   61 2477          IF      L:=:0     THEN YAWREV
01 2472   12 2247          IF      INTU12:/=:0 THEN YAWREV
01 2473   63 2477
01 2474   13 0256          INTOT2(B)=CRSL1A(B)
01 2475   45 0706
01 2476   34 2505          GO      CONVEX
01 2477   13 0536  YAWREV  L=ZTFIP9(B)-YAWR1A(B)-ZTWO9(B)
01 2500   17 0242
01 2501   17 0562
01 2502   36 0002          B=2
01 2503   76 0205          CALL    INTEGT
01 2504   45 0256          CRSL1A(B)=L
01 2505   13 0311  CONVEX  MKIT1A(B)=MKIT1A(B)+BIT11
01 2506   14 4425
01 2507   45 0311
01 2510   13 0312          MKIT2A(B)=MKIT2A(B)-BIT11
01 2511   16 4425
01 2512   45 0312
01 2513   55 2333          RETURN CONVER
```

```
                   SECTOR
                   *************************************

                     PITCH GUIDANCE MODES

                   *************************************
```

TAKEOFF GO AROUND MODE COMPUTATION

```
                      MODIFY
          DISA02
          GAGFLG
          HDOTF
          NZMAX
          THETAC
          THETAP
          THETIC
          THETP1
          VDTTCF
          VTASCF

                      REFER
          BIT13
          HDOTF1
          INT032
          KCPGAG
          KGAGAM
          KTOGA
          KTOGAI
          KVDOTC
          NZP25
          PSYNFA
          TOGAB1
          VCASAD
          VDTLNG
          VTASAD

01 2514  00 0000  TOGA    SUBRTN
01 2515  13 0267          IF     PSYNFA(B):=:0 THEN TOPAS2
01 2516  61 2533
01 2517  45 0376          GAGFLG(B)=L
01 2520  12 4543          A=NZP25
01 2521  50 0700          NZMAX(B)=A
01 2522  03 0502
01 2523  12 0214          VTASCF(B)=VTASAD
01 2524  45 0714
01 2525  13 0434          VDTTCF(B)=VDTLNG(B)
01 2526  45 0435
01 2527  13 0717          HDOTF(B)=HDOTF1(B)
01 2530  45 0711
```

```
01 2531  45 0707          THETP1(B)=L
01 2532  41 0337          THETIC(B)=0
01 2533  13 0435  TOPAS2  L=VDTTCF(B)*KVDOTC
01 2534  24 4041
01 2535  50 0201          L=L,U+VCASAD-INT032(B)
01 2536  14 0212
01 2537  17 0744
01 2540  65 2545          IF     L:>=:0   THEN TOGA1
01 2541  11 0376          IF     U,GAGFLG(B):=:0 THEN TOGA2
01 2542  60 2546
01 2543  72 0000          L=0
01 2544  34 2546          GO     TOGA2
01 2545  41 0376  TOGA1   GAGFLG(B)=0
01 2546  24 4043  TOGA2   L=L*KTOGA*2A-12
01 2547  50 4314
01 2550  45 0342          THETAC(B)=L
01 2551  24 4044          L=L*KTOGAI
01 2552  47 0337          THETIC(B)=L
01 2553  13 0435          IF     VDTTCF(B):<:0 THEN TOGA3
01 2554  67 2560
01 2555  24 4045          L=L*KCPGAG*2A-16
01 2556  50 4320
01 2557  34 2561          GO     LCK+2
```

-continued

```
01 2560  70 0000  TOGA3   L=0
01 2561  15 0377          L=L+TOGABI(B)-THETP1(B)*2^-1
01 2562  17 0707
01 2563  50 4201
01 2564  36 0003          B=3
01 2565  76 0205          CALL    INTEGT
01 2566  24 4042          L=L+KGAGAM*2^3
01 2567  50 4703
01 2570  47 0341          THETAP(B)=U
01 2571  13 0707          L=THETP1(B)-HDOTF1(B)
01 2572  17 0717
01 2573  57 2603          IF      L1<10    THEN TOGA4
01 2574  24 4042          L=L+KGAGAM*2^-15
01 2575  50 4317
01 2576  15 0340          THETAC(B)=L+THETAC(B)
01 2577  45 0340
01 2600  13 0227          DISA02(B)=DISA02(B)1OR1BIT13
01 2601  51 4427
01 2602  45 0227
01 2603  55 2514  TOGA4   RETURN TOGA
```

```
                  SECTOR
                  ****************************************

                          MODIFY
                  INTO32
                  TOGABI

                          REFER
                  DELTAV
                  D270
                  ENGOOD
                  VAPTOG
                  VCASAD
                  WOW4

01 2604  00 0000  TOMODE  SUBRTN
01 2605  76 6670          CALL    TOGARF
01 2606  13 0350          IF      WOW4(B)1=10 THEN TOMOD1
01 2607  61 2612
01 2610  12 0212          INTO32(B)=VCASAD
01 2611  45 0744
01 2612  13 0446  TOMOD1  L=VAPTOG(B)+DELTAV-INTO32(B)
01 2613  14 2042
01 2614  17 0744
01 2615  10 4514          U=D270
01 2616  76 0115          CALL    LIMT1A
01 2617  11 0314          IF      U,ENGOOD(B)1/=10 THEN TOMOD2
01 2620  62 2622
01 2621  71 7361          L=L-270
01 2622  35 0040  TOMOD2  B=32
01 2623  76 0205          CALL    INTEGT
01 2624  70 3777          TOGABI(B)=2047
01 2625  45 0377
01 2626  76 2514          CALL    TOGA
01 2627  36 0005  TOMXIT  B=5
01 2630  55 2604          RETURN TOMODE
```

```
                          SECTOR
                  ****************************************

                          MODIFY
                  DEGPMX
                  DISA02
                  INTO32
                  TOGABI
```

```
                  REFER
               BIT11
               DEG15
               ENGOOD
               PSYNFA
               VAPTOG

01 2631  00 0000  GAMODE  SUBRTN
01 2632  76 6670          CALL    TOGARF
01 2633  13 0446          L=VAPTOG(B)
01 2634  11 0314          IF      U,ENGOOD(B)I/=I0 THEN GAMOD1
01 2635  62 2637
01 2636  71 7361          L=L-270
01 2637  11 0267  GAMOD1  IF      U,PSYNFA(B)I=I0 THEN GAMOD2
01 2640  60 2642
01 2641  45 0744          INT032(B)=L
01 2642  16 0744  GAMOD2  L=L-INT032
01 2643  36 0040          B=32
01 2644  76 2205          CALL    INTEGT
01 2645  70 1000          TOGABI(B)=512
01 2646  45 0377
01 2647  76 2514          CALL    TOGA
01 2650  13 0227          DISA02(B)=DISA02(B)IORIBIT11
01 2651  51 4425
01 2652  45 0227
01 2653  12 4562          DEGPMX(B)=DEG15
01 2654  45 0463
01 2655  36 0004          B=4
01 2656  55 2631          RETURN GAMODE
```

```
                  SECTOR
               ********************************

                  ALTITUDE HOLD & ALT PRE-SELECT

                MODE COMPUTATIONS

                  MODIFY
               ALTREF
               NZMAX
               PCPFGA
               TEMP1
               THETAC
               THETAP
               THETIC
               THETP1

                  REFER
               ALTBCR
               ALTCMD
               ALTITD
               ALTNCR
               AUTO1A
               DEG3
               D100
               D500
               GAMMA
               KALTHI
               KALT1A
               KGAMH
               NZP10
               THTDMX
               VARIDX
               VTASCF
               VT200
```

```
1H198 SCAMP                                  SECTION        106       PAGE       330
```

-continued

```
01 2657   30 0000  ALTHLD  SUBRTN
01 2660   32 2517          B=VARIDX
01 2661   61 2673          IF      L1=10     THEN AHPAS2
01 2662   41 0337          THETIC(B)=0
01 2663   41 0340          THETAC(B)=0
01 2664   12 4545          A=NZP10
01 2665   50 0700          NZMAX(B)=A
01 2666   03 0502
01 2667   13 0712          ALTREF(B)=ALTITO(B)
01 2670   45 0370
01 2671   13 0460          THETP1(B)=GAMMA(B)
01 2672   45 0707
01 2673   13 0274  AHPAS2  IF      PCPFGA(B)1=10 THEN ALTHD5
01 2674   61 2712
01 2675   12 2233          L=ALTCMD-ALTBCR+ALTNCR
```

```
1H198 SCAMP                                  SECTION        106       PAGE       331

01 2676   16 0210
01 2677   14 0207
01 2700   54 7200          U=L
01 2701   50 6100          L=-L+ALTITO(B)
01 2702   15 0712
01 2703   50 0301          ABSVAL
01 2704   71 7746          L=L-25           CAPTURE WITHIN 25FT
01 2705   65 2710          IF      L1>=10    THEN ALTHD6
01 2706   47 0370          ALTREF(B)=U
01 2707   41 0274          PCPFGA(B)=0
01 2710   75 2762  ALTHD6  CALL    ALTERR
01 2711   34 2734          GO      ALTHD7
01 2712   13 0370  ALTHD5  L=ALTREF(B)-ALTITO(B)
01 2713   17 0712
01 2714   11 0260          IF      U,ALTO1A(B)1/=10 THEN ALTHD1
01 2715   62 2720
01 2716   10 4516          U=D500
01 2717   34 2721          GO      ALTHD2
01 2720   10 4661  ALTHD1  U=D100
01 2721   76 0115  ALTHD2  CALL    LIMT1A
01 2722   24 4047          L=L*KALT1A/VTASCF(B)*VT200*2A-10
01 2723   27 0714
01 2724   24 4164
01 2725   50 4312
01 2726   44 1776          TEMP1=L
01 2727   13 0707          L=THETP1(B)-GAMMA(B)*KGAMH*2A-14
01 2730   17 0460
01 2731   24 4046
01 2732   50 4316
01 2733   14 1776          L=L+TEMP1
01 2734   45 0340  ALTHD7  THETAC(B)=L
01 2735   12 4554          U=L,DEG3*VT200/VTASCF(B)
01 2736   24 4164
01 2737   27 2714
01 2740   50 0200
01 2741   13 0340          L=THETAC(B)
01 2742   76 0127          CALL    DEDZ1A
01 2743   63 2746          IF      L1/=10    THEN ALTHD3
01 2744   12 1776          L=TEMP1
01 2745   34 2747          GO      ALTHD4
01 2746   13 0340  ALTHD3  L=THETAC(B)
01 2747   24 4050  ALTHD4  L=L*KALTHI
01 2750   47 0337          THETIC(B)=U
01 2751   13 0707          L=-THETP1(B)
01 2752   50 6100
01 2753   11 0464          U=THTDMX(B)
01 2754   76 0115          CALL    LIMT1A
01 2755   36 2003          B=3
01 2756   76 0225          CALL    INTEGT
01 2757   45 0341          THETAP(B)=L
01 2760   36 2003          B=3
01 2761   55 2657          RETURN ALTHLD
```

```
                           SECTOR
                   ***************************************

                    COMPUTES ALT ERROR AND COMMAND
                    FOR ALTITUDE PRE-SELECT

                           MODIFY
                   ALTERC
                   TEMP1

                           REFER
                   ALTCMD
                   ALTCOR
                   D1000
                   GAMMA
                   HDOTCG
                   HDOTF
                   KALTPR
                   KALTP2
                   KALT1A
                   KGAMH
                   VTASCF
                   VT200

01 2762   00 0000  ALTERR  SUBRTN
01 2763   12 2033          ALTERC(B)=ALTCMD-ALTCOR(B)
01 2764   17 0433
01 2765   45 0371
01 2766   50 0200          U=L
01 2767   13 0711          L=HDOTF(B)
01 2770   50 0301          ABSVAL
01 2771   02 4053          IF      L:>=:HDOTCG THEN ALTER1
01 2772   65 2775
01 2773   50 0201          L=U
01 2774   34 3005          GO      ALTER2
01 2775   50 0201  ALTER1  L=U
01 2776   50 0301          ABSVAL
01 2777   16 4051          L=SQR(L-KALTPR*KALTP2)
01 3000   24 4052
01 3001   50 7700
01 3002   11 0371          IF      U,ALTERC(B):>=:0 THEN LOK+2
01 3003   64 3005
01 3004   50 6100          L=-L
01 3005   24 4164  ALTER2  L=L*VT200/VTASCF(B)
01 3006   27 0714
01 3007   10 4662          U=D1000
01 3010   76 0115          CALL    LIMT1A
01 3011   24 4047          L=L*KALT1A*2^-10
01 3012   50 4312
01 3013   44 1776          TEMP1=L
```

```
01 3014   70 0000          L=0-GAMMA(B)*KGAMH*2^-14
01 3015   17 2400
01 3016   24 4040
01 3017   50 4310
01 3020   14 1776          L=L+TEMP1
01 3021   55 2762          RETURN ALTERR
```

```
                 SECTOR
          *************************************
           FLIGHT PATH ANGLE MODE COMPUTATIONS

                 MODIFY
          FPAIFG
          GAMCMD
          NZMAX
          THETAC
          THETAP
          THETIC
          THETP1

                 REFER
          GAMMA
          KGAMI
          KGMERR
          NZP10
          THTDMX
          VARIDX

01 3022  00 0000  FPAMOD  SUBRTN
01 3023  32 2517          B=VARIDX
01 3024  61 3033          IF     L:=10    THEN FPPAS2
01 3025  45 0344          FPAIFG(B)=L
01 3026  13 0460          THETP1(B)=GAMMA(B)
01 3027  45 0707
01 3030  12 4545          A=NZP10
01 3031  50 0700          NZMAX(B)=A
01 3032  03 0502
01 3033  41 0337  FPPAS2  THETIC(B)=0
01 3034  12 2032          L=GAMCMD-THETP1(B)
01 3035  17 0707
01 3036  11 2464          U=THTDMX(B)
01 3037  76 0115          CALL   LIMT1A
01 3040  36 0003          B=3
01 3041  76 0205          CALL   INTEGT   THETP1
01 3042  45 0341          THETAP(B)=L
01 3043  17 0460          L=L-GAMMA(B)
01 3044  24 4054          L=L*KGMERR*2*2
01 3045  50 4702
01 3046  47 0340          THETAC(B)=U
01 3047  13 0344          IF     FPAIFG(B):=10 THEN FPAINT
01 3050  61 3057
01 3051  13 0707          L=THETP1(B)-GAMCMD
01 3052  16 2032
01 3053  50 0301          ABSVAL
01 3054  71 7770          L=L-7
01 3055  65 3063          IF     L:>=10   THEN FPAXIT
01 3056  41 0344          FPAIFG(B)=0
```

```
01 3057  12 2032  FPAINT  L=GAMCMD-GAMMA(B)*KGAMI
01 3060  17 0460
01 3061  24 4055
01 3062  47 0337          THETIC(B)=U
01 3063  36 0006  FPAXIT  B=6
01 3064  55 3022          RETURN FPAMOD
```

```
                 SECTOR
          *************************************
           AIRSPEED HOLD COMPLEMENTARY FILTER


                 MODIFY
          TEMP1
```

AIRSPEED HOLD COMPLEMENTARY FILTER

```
                          REFER
                 INTO35
                 KSCALE
                 KVDSPT
                 KVERCF
                 KVSPIT
                 VDTLNG
                 VDTTCF
                 VERRCF

01 3065   00 0000  SPITCH  SUBRTN
01 3066   17 0750          TEMP1=L-VERRCF(B)
01 3067   44 1776
01 3070   36 0043          B=35
01 3071   76 0205          CALL    INTEGT
01 3072   12 1776          L=TEMP1*KVERCF*2^-15
01 3073   24 4062
01 3074   50 4317
01 3075   15 2747          L=L+INTO35(B)+VDTLNG(B)
01 3076   15 0434
01 3077   36 0044          B=36
01 3100   76 0205          CALL    INTEGT   VERRCF
01 3101   25 0362          T=L*KVSPIT(B)*2^3
01 3102   50 4703
01 3103   50 7400
01 3104   13 0435          L=VDTTCF(B)
01 3105   36 0032          B=26
01 3106   76 0141          CALL    ZTFLAG
01 3107   24 4060          L=L*KVDSPT+T*2^-14
01 3110   50 0106
01 3111   50 4316
01 3112   24 4110          L=L*KSCALE*2^-14
01 3113   50 4316
01 3114   55 3065          RETURN SPITCH
```

```
                          SECTOR
                 ********************************

                 MACH HOLD COMPLEMENTARY FILTER

                          MODIFY
                 TEMP1

                          REFER
                 INTO34
                 KSCALE
                 KVDSPT
                 KVERCF
                 KVMPIT
                 MERRCF
                 VDTLNG
                 VDTTCF

01 3115   00 0000  MPITCH  SUBRTN
01 3116   17 0751          TEMP1=L-MERRCF(B)
01 3117   44 1776
01 3120   36 0042          B=34
01 3121   76 0205          CALL    INTEGT
01 3122   12 1776          L=TEMP1*KVERCF*2^-15
01 3123   24 4062
01 3124   50 4317
01 3125   15 0746          L=L+INTO34(B)+VDTLNG(B)
```

```
                         MACH HOLD COMPLEMENTARY FILTER

01 3126  15 0434
01 3127  36 0045                B=37
01 3130  76 0205                CALL    INTEGT    MERRCF
01 3131  25 0363                T=L*KVMPIT(B)*2^3
01 3132  50 4703
01 3133  50 7400
01 3134  13 0435                L=VDTTCF(B)
01 3135  36 0033                B=27
01 3136  76 0141                CALL    ZTFLAG
01 3137  24 4060                L=L*KVDSPT+T*2^-14
01 3140  50 0106
01 3141  50 4316
01 3142  24 4110                L=L*KSCALE*2^-14
01 3143  50 4316
01 3144  55 3115                RETURN MPITCH
```

```
                                SECTOR
                         **************************************

                         MACH AND AIRSPEED ON PITCH CAPTURE AND TRACK.

                                MODIFY
                         PCPFGA
                         SPTCNT
                         TEMP1
                         THETAC
                         THETAP
                         THETIC

                                REFER
                         KSCALE
                         KVISPT
                         KVSPCP
                         KVSPTK
                         SERRCF
                         VOCFLG


01 3145  00 0000  SPDCMD  SUBRTN
01 3146  41 0337          THETIC(B)=0
01 3147  13 0274          IF      PCPFGA(B):=:0 THEN SPDTRK
01 3150  61 3162
01 3151  13 0366          TEMP1=VOCFLG(B)
01 3152  44 1776
01 3153  13 0365          L=SERRCF(B):XOR:TEMP1
01 3154  53 1776
01 3155  65 3162          IF      L:>=:0    THEN SPDTRK
01 3156  12 1776          L=TEMP1
01 3157  50 0301          ABSVAL
01 3160  71 7677          L=L-64            0.5 FT/SEC**2
01 3161  65 3171          IF      L:>=:0    THEN SPDCPT
01 3162  13 0365  SPDTRK  L=SERRCF(B)*KVSPDP(B)*2^-11
01 3163  25 0364
01 3164  50 4313
01 3165  24 4110          L=L*KSCALE*2^-14
01 3166  50 4316
01 3167  24 4061          L=L*KVISPT
01 3170  47 0337          THETIC(B)=U
01 3171  41 0341  SPDCPT  THETAP(B)=0
01 3172  13 0367          L=SPTCNT(B)
01 3173  61 3200          IF      L:=:0     THEN SPDCP1
01 3174  71 7776          SPTCNT(B)=L-1
01 3175  45 0367
01 3176  50 0200          U=L
01 3177  34 3207          GO      SPDCXT
01 3200  13 0365  SPDCP1  L=SERRCF(B)
01 3201  50 0301          ABSVAL
```

```
 1P19B SCAMP                              SECTION        111       PAGE       340

01 3202  71 7717              L=L-48          3 FT/SEC
01 3203  50 0200              U=L
01 3204  13 0366              L=VDCFLG(B)
01 3205  54 0301              ABSVAL
01 3206  71 7677              L=L-64          0.5 FT/SEC**2
01 3207  55 3145     SPDCXT   RETURN SPDCMO

                     NO REF:        KVSPTK
                     NO REF:        THETAC
 1P19B SCAMP                              SECTION        112       PAGE       341

                              SECTOR
                     ************************************

                      AIRSPEED SELECT AND HOLD ON PITCH MODE

                              MODIFY
                     INT035
                     KVSPDP
                     KVSPIT
                     NZMAX
                     SERRCF
                     THETAC
                     THETIC
                     THETP1
                     VCASRF
                     VDCFLG
                     VERRCF
                     ZTF026

                              REFER
                     KVSPTK
                     NZP10
                     PCPFGA
                     VARIDX
                     VCASAD
                     VDTTCF
                     VTASCF

01 3210  00 0000     ASPITC   SUBRTN
01 3211  32 2517              B=VARIDX
01 3212  61 3233              IF      L:=10     THEN ASPIT2
01 3213  41 0340              THETAC(B)=0
01 3214  41 0337              THETIC(B)=0
01 3215  41 0707              THETP1(B)=0
01 3216  12 4545              A=NZP10
01 3217  52 0700              NZMAX(B)=A
01 3220  03 0502
01 3221  13 0274              IF      PCPFGA(B):/=10 THEN ASPIT2
01 3222  63 3233
01 3223  41 0747              INT035(B)=0
01 3224  41 0750              VERRCF(B)=0
01 3225  12 4056              KVSPIT(B)=KVSPTK
01 3226  45 0362
01 3227  13 0435              ZTF026(B)=VDTTCF(B)
01 3230  45 0627
01 3231  12 0212              VCASRF(B)=VCASAD
01 3232  45 0361
01 3233  12 0212     ASPIT2   L=VCASAD-VCASRF(B)*VTASCF(B)/VCASAD
01 3234  17 0361
01 3235  25 0714
 1P19B SCAMP                              SECTION        112       PAGE       342

01 3236  26 0212
01 3237  76 3065              CALL   SPITCH
01 3240  45 0340              THETAC(B)=L
```

```
01 3241   13 0750          SERRCF(B)=VERRCF(B)
01 3242   45 0365
21 3243   13 2627          VDCFLG(B)=ZTF026(B)
01 3244   45 0356
21 3245   13 2362          KVSPDP(B)=KVSPIT(B)
01 3246   45 0364
01 3247   75 3145          CALL    SFDCMD
01 3250   64 3253          IF      U1>=10   THEN LOK+3
01 3251   65 3254          IF      L1>=10   THEN LOK+3
01 3252   41 0274          PCPFGA(B)=0
01 3253   65 3256          IF      L1>=10   THEN ASPIT1
01 3254   12 4056          KVSPIT(B)=KVSPTK
01 3255   45 0362
21 3256   36 0007  ASPIT1  B=7
01 3257   55 3210          RETURN ASPITC
```

```
                 SECTOR
         ***************************************

         MACH HOLD ON PITCH MODE


                 MODIFY
         INTO34
         KVMPIT
         KVSPDP
         MACHRF
         MERRCF
         NZMAX
         SERRCF
         THETAC
         THETIC
         THETP1
         VDCFLG
         ZTF027

                 REFER
         KVSPTK
         MACHAD
         NZP10
         PCPFGA
         VARIDX
         VDTTCF
         VTASCF


01 3260   00 0000  MSPITC  SUBRTN
01 3261   32 2517          B=VARIDX
01 3262   61 3303          IF      L1=10    THEN MSPIT2
01 3263   41 0340          THETAC(B)=0
01 3264   41 0337          THETIC(B)=0
01 3265   41 0707          THETP1(B)=0
01 3266   12 4545          A=NZP10
01 3267   50 0700          NZMAX(B)=A
01 3270   03 0502
01 3271   13 0274          IF      PCPFGA(B)1/=10 THEN MSPIT2
01 3272   63 3303
21 3273   13 0435          ZTF027(B)=VDTTCF(B)
01 3274   45 0630
21 3275   12 0211          MACHRF(B)=MACHAD
01 3276   45 0360
21 3277   41 0746          INTO34(B)=0
01 3300   41 0751          MERRCF(B)=0
01 3301   12 4056          KVMPIT(B)=KVSPTK
01 3302   45 0363
21 3303   12 0211  MSPIT2  L=MACHAD-MACHRF(B)*VTASCF(B)/MACHAD
01 3304   17 0350
21 3305   25 0714
```

```
3306   26 0211
3307   76 3115            CALL    MPITCH
3310   45 0340            THETAC(B)=L
3311   13 2751            SERRCF(B)=MERRCF(B)
3312   45 0365
3313   13 2630            VDCFLG(B)=ZTF027(B)
3314   45 0366
3315   13 0363            KVSPDP(B)=KVMPIT(B)
3316   45 0364
3317   76 3145            CALL    SPDCMD
3320   54 3323            IF      U:>=10    THEN LOK+3
3321   65 3324            IF      L:>=10    THEN LOK+3
3322   41 0274            PCPFGA(B)=0
3323   65 3326            IF      L:>=10    THEN MSPIT1
3324   12 4056            KVMPIT(B)=KVSPTK
3325   45 0363
3326   36 3010   MSPIT1   B=B
3327   55 3260            RETURN MSPITC
```

```
                          SECTOR
                 ********************************

                    GLIDE SLOPE CAPTURE/TRACK

                   MODE COMPUTATIONS


                          MODIFY
                 HERATL
                 INT016
                 NZMAX
                 PCPFGA
                 TEMP2
                 THETAC
                 THETAP
                 THETIC

                          REFER
                 D3200
                 HEDTGS
                 HERRGS
                 HFLRF1
                 KTHTGI
                 LNDTIM
                 NZP25
                 VARIDX

3330   00 0000   GSLOPE   SUBRTN
3331   32 2517            B=VARIDX
3332   61 3346            IF      L:=10     THEN GSPAS2
3333   45 0274            PCPFGA(B)=L
3334   41 0341            THETAP(B)=0
3335   40 2000            TEMP2=0
3336   12 4543            A=NZP25
3337   50 0700            NZMAX(B)=A
3340   03 0502
3341   76 3766            CALL    GSINIT
3342   41 0340            THETAC(B)=0
3343   12 4070            INT016(B)=HFLRF1
3344   45 0724
3345   34 3352            GO      GSLOP1
3346   76 3400   GSPAS2   CALL    GLSPCM
3347   45 0341            THETAP(B)=L
3350   12 2000            THETAC(B)=TEMP2
3351   45 0340
3352   76 3455   GSLOP1   CALL    ATTDEC
3353   41 0337            THETIC(B)=0
3354   13 0274            IF      PCPFGA(B):=10 THEN GSPAS3
3355   51 3367
3356   13 0452            L=HEDTGS(B)
3357   50 0301            ABSVAL
```

```
01 3360  71 6516          L=L-689
01 3361  65 3376          IF      L:>=:0   THEN GSEXIT
01 3362  13 0455          L=HERRGS(B)
01 3363  50 0301          ABSVAL
01 3364  16 4524          L=L-D3200
01 3365  65 3376          IF      L:>=:0   THEN GSEXIT
01 3366  41 0274          PCPFGA(B)=0
01 3367  13 0315  GSPAS3  IF      LNDTIM(B):/=:0 THEN GSEXIT
01 3370  63 3376
01 3371  70 0250          HERATL(B)=168
01 3372  45 0453
01 3373  13 0455          L=HERRGS(B)*KTHTGI
01 3374  24 4066
01 3375  47 0337          THETIC(B)=U
01 3376  36 0002  GSEXIT  B=2
01 3377  55 3330          RETURN GSLOPE
```

```
                          SECTOR
                  *************************************

                   GLIDE SLOPE DEVIATION
                   COMPLEMENTARY FILTER


                          MODIFY
                  HDGSRF
                  HEDTGS
                  HERRGS
                  TEMP2

                          REFER
                  D220
                  GAMGSN
                  HDDOT
                  HDGSRF
                  HDOTF
                  HERATL
                  HRADIO
                  KGGS1A
                  KHDDGS
                  KSCALE
                  KTGS1A
                  LAMD1A
                  SCD573
                  VTASCF


01 3400  00 0000  GLSPCM  SUBRTN
01 3401  12 4063          HDGSRF(B)=GAMGSN*VTASCF(B)*2^3/SCD573
01 3402  25 0714
01 3403  50 4703
01 3404  26 4156
01 3405  45 0454
01 3406  17 0711          HEDTGS(B)=L-HDOTF(B)
01 3407  45 0452
01 3410  13 0613          L=HRADIO(B)-220
01 3411  71 7443
01 3412  65 3414          IF      L:>=:0   THEN GLSPC1
01 3413  70 0000          L=0
01 3414  02 4513  GLSPC1  IF      L:>=:D220 THEN GLSPC2
01 3415  65 3420
01 3416  50 4001          L=L*2^1
01 3417  34 3421          GO      GLSPC3
01 3420  71 0334  GLSPC2  L=L+220
01 3421  25 0253  GLSPC3  L=L*LAMD1A(B)*2^5/GAMGSN
01 3422  50 4735
01 3423  26 4063
01 3424  50 6100          L=-L-HERRGS(B)
01 3425  17 0455
```

```
01 3426   11 0453           U=HERATL(B)
01 3427   76 0115           CALL    LIMT1A
01 3430   15 0455           HERRGS(B)=L+HERRGS(B)
01 3431   45 0455
01 3432   36 0004           B=4
01 3433   76 0141           CALL    ZTFLAG   HGSECF
01 3434   24 4055           L=L*KTGS1A*2A-16
01 3435   50 4320
01 3436   24 4110           L=L*KSCALE*2A4
01 3437   50 4704
01 3440   46 2000           TEMP2=U
01 3441   13 0452           L=HEDTGS(B)*KGGS1A
01 3442   24 4064
01 3443   50 7400           T=A
01 3444   13 0424           L=HDDOT(B)
01 3445   36 0011           B=9
01 3446   76 0141           CALL    ZTFLAG
01 3447   24 4067           L=L*KHDDGS+T*2A-16
01 3450   50 0106
01 3451   50 4320
01 3452   24 4110           L=L*KSCALE*2A-14
01 3453   50 4316
01 3454   55 3400           RETURN GLSPCM

                  NO REF1       HDGSRF
```

```
                            SECTOR
                  ****************************************

                     GLIDE SLOPE - FLARE
                    ATTITUDE DE-CLUTCH


                            MODIFY
                  THETAP

                            REFER
                  KTD21A
                  THETAL
                  THET1A
                  THTD1A

01 3455   00 0000 ATTDEC    SUBRTN
01 3456   13 0244           L=THTD1A(B)*KTD21A*2A-16
01 3457   24 4024
01 3460   50 4320
01 3461   17 0471           THETAP(B)=L-THETAL(B)+THET1A(B)+THETAP(B)
01 3462   15 0245
01 3463   15 0341
01 3464   45 0341
01 3465   55 3455           RETURN ATTDEC
```

```
                            SECTOR
                  ****************************************

                     FLARE GUIDANCE COMPUTATION


                            MODIFY
                  DISA02
                  FLINTT
                  FLRIGN
                  HDZERO
                  INT00A
                  NZMAX
```

```
                PITA1A
                PITDWN
                PITE1A
                TEMP2
                THETAC
                THETAP
                THETIC
                THETP1
                ZTFO9
                ZTFO10
                ZTFO11
                ZTFO12
                ZTFO21

                        REFER
                BIT12
                DEG2
                DEG4
                DEG5
                DG15M
                EIGHTY
                HDDTRD
                HDOTF
                HDTRAD
                KFLRIN
                KHDCMD
                KHDOFL
                KHDERR
                KINTPD
                KSCALE
                KTDFLR
                NZP5
                TDFLAG
                THETAL
                THET1A
                THTCOM
                THTD1A
                TLAPCN
```

```
                VARIDX
                WOW

01 3466  00 3000  FLARE   SUBRTN
01 3467  32 2517          B=VARIDX
01 3470  61 3521          IF      L:=:0     THEN FLPSS2
01 3471  41 0337          THETIC(B)=0
01 3472  41 0373          PITDWN(B)=0
01 3473  41 0340          THETAC(B)=0
01 3474  41 0611          ZTFO12(B)=0
01 3475  12 4541          A=NZP5
01 3476  50 0700          NZMAX(B)=A
01 3477  03 0522
01 3500  13 0244          ZTFO21(B)=THTD1A(B)
01 3501  45 0622
01 3502  41 0707          THETP1(B)=0
01 3503  41 0341          THETAP(B)=0
01 3504  41 0606          ZTFO9(B)=0
01 3505  41 0607          ZTFO10(B)=0
01 3506  41 0610          ZTFO11(B)=0
01 3507  13 0711          HDZERO(B)=HDOTF(B)
01 3510  45 0374
01 3511  70 0074          FLRIGN(B)=60
01 3512  45 0375
01 3513  50 0400          L=A,TLAPCN/HDTRAD(B)
01 3514  03 4537
01 3515  27 0716
01 3516  45 0372          FLINTT(B)=L
01 3517  41 0337          THETIC(B)=0
```

```
01 3520  34 3562           GO      FLACMP
01 3521  13 0373  FLPSS2   IF      PITDWN(B)I/=10 THEN PITON1
01 3522  63 3537
01 3523  13 0316           IF      TCFLAG(B)I=10 THEN FLACMP
01 3524  61 3562
01 3525  45 0373           PITDWN(B)=L
01 3526  13 0342           INTO0A(B)=THTCOM(B)-THET1A(B)-THETAL(B)
01 3527  17 0245
01 3530  17 0471
01 3531  45 0704
01 3532  13 0245           THETP1(B)=THET1A(B)-DEG4
01 3533  16 4555
01 3534  45 0707
01 3535  45 0341           THETAP(B)=L
01 3536  41 0340           THETAC(B)=0
01 3537  10 4552  PITON1   U=DEG2
01 3540  12 4576           L=DG15M-THETP1(B)
01 3541  17 0707
01 3542  76 0115           CALL    LIMT1A
01 3543  36 0003           B=3
01 3544  76 0205           CALL    INTEGT
01 3545  45 0341           THETAP(B)=L
```

```
01 3546  17 0245           L=L-THET1A(B)*KINTPO
01 3547  24 4101
01 3550  47 0337           THETIC(B)=U
01 3551  13 0346           IF      WCW(B)I=10 THEN FLPSS1
01 3552  61 3647
01 3553  13 0342           L=THTCOM(B)+DEG5
01 3554  14 4556
01 3555  65 3647           IF      LI>=I0   THEN FLPSS1
01 3556  41 0265           PITE1A(B)=0
01 3557  41 0264           PITA1A(B)=0
01 3560  36 0000           B=0
01 3561  34 3650           GO      FLPSS3
01 3562  36 0014  FLACMP   B=12
01 3563  70 0000           L=0
01 3564  76 0141           CALL    ZTFLAG
01 3565  76 3651           CALL    FLRFWD
01 3566  15 0611           L=L+ZTF012(B)
01 3567  36 0013           B=11
01 3570  76 0141           CALL    ZTFLAG
01 3571  17 0711           TEMP2=L-HDOTF(B)+HDZERO(B)
01 3572  15 0374
01 3573  44 2000
01 3574  24 4075           L=L*KHDERR
01 3575  50 7400           T=A
01 3576  13 0610           L=ZTF011(B)
01 3577  36 0012           B=10
01 3600  76 0141           CALL    ZTFLAG
01 3601  24 4076           L=L*KHDCMD+T
01 3602  50 0106
01 3603  50 7400           T=A
01 3604  13 0423           L=HDOTRD(B)
01 3605  36 0011           B=9
01 3606  76 0141           CALL    ZTFLAG
01 3607  24 4077           L=L*KHDDFL+T*2^-14
01 3610  50 0106
01 3611  50 4316
01 3612  24 4110           L=L*KSCALE*2^2
01 3613  50 4702
01 3614  47 0341           THETAP(B)=U
01 3615  13 0372           IF      FLINTT(B)I=10 THEN FLACM1
01 3616  61 3622
01 3617  71 7776           FLINTT(B)=L-1
01 3620  45 0372
01 3621  34 3633           GO      FLRNOI
01 3622  13 0375  FLACM1   IF      FLRIGN(B)I=10 THEN FLACM2
```

```
1E19B SCAMP                                   SECTION       117       PAGE      352
                                              -continued

01 3623   61 3626
01 3624   71 7776              FLRIGN(B)=L=1
01 3625   45 0375
01 3626   71 0120   FLACH2     L=L+80*TEMP2/EIGHTY*KFLRIN
01 3627   24 2000
01 3630   26 4510
01 3631   24 4073
```

```
1E19B SCAMP                                   SECTION       117       PAGE      353

01 3632   47 0337              THETIC(B)=U
01 3633   13 0244   FLRNCI     L=THTD1A(B)
01 3634   36 0025              B=21
01 3635   76 0141              CALL    ZTFLAG
01 3636   24 4100              L=L*KTDFLR
01 3637   50 0201              THETAP(B)=L,U+THETAP(B)
01 3640   15 0341
21 3641   45 0341
01 3642   76 3455              CALL    ATTCEC
21 3643   41 0340              THETAC(B)=0
21 3644   13 0227              DISA02(B)=DISA02(B):OR:BIT12
01 3645   51 4426
01 3646   45 0227
01 3647   36 0001   FLPSS1     B=1
01 3650   55 3466   FLPSS3     RETURN FLARE
```

```
1E19B SCAMP                                   SECTION       118       PAGE      354

                               SECTOR
                    ******************************************

                             FLARE PREDICT


                               MODIFY
                    TEMP1
                    TEMP2

                               REFER
                    HFLREF
                    HRADIO
                    INT016
                    KFLRH
                    KFLRWO

01 3651   00 0000   FLRFWD     SUBRTN
01 3652   13 0613              IF      HRADIO(B):<:HFLREF THEN FLRFW1
01 3653   02 4071
01 3654   67 3656
01 3655   12 4071              L=HFLREF
01 3656   50 6100   FLRFW1     TEMP2=-L*2A5
01 3657   50 4605
01 3660   44 2000
01 3661   24 4072              L=L*KFLRH
01 3662   46 1776              TEMP1=U
01 3663   12 2000              TEMP2=TEMP2-INT016(B)
01 3664   17 0724
01 3665   44 2000
21 3666   36 0020              B=16
01 3667   76 0205              CALL    INTEGT
01 3670   12 2000              L=TEMP2*KFLRWO
01 3671   24 4074
01 3672   50 0201              L=U+TEMP1
01 3673   14 1776
01 3674   55 3651              RETURN FLRFWD
```

```
                  SECTOR
               *****************************************
                 PITCH MODES OFF


                  MODIFY
               PCPFGA
               THETAC
               THETAP
               THETIC
               THETP1

                  REFER
               DUALFG
               VARIDX

01 3675  00 0000  PITOFF  SUBRTN
01 3676  32 2517          B=VARIDX
01 3677  13 0310          IF     DUALFG(B)I/=10 THEN PTOXIT
01 3700  63 3706
01 3701  41 0340          THETAC(B)=0
01 3702  41 0337          THETIC(B)=0
01 3703  41 0707          THETP1(B)=0
01 3704  41 0341          THETAP(B)=0
01 3705  41 0274          PCPFGA(B)=0
01 3706  36 0000  PTOXIT  B=0
01 3707  55 3675          RETURN PITOFF
```

```
                  SECTOR

               *************************************************

                 PITCH GUIDANCE ARMED MODE

               ****************************************

                GLIDE SLOPE ARM


                  MODIFY
               FLCMIX
               FLPCNT
               F50FLG
               PITA1A
               PITE1A
               PSYNFA
               TEMP1

                  REFER
               BIT3
               BIT5
               D3840
               HEDTGS
               HGSECF
               LAMD1A
               PAPS1A
               ROLE1A
               STATE0
               STATE1
               TEMP2
               VARIDX

01 3710  00 0000  GSLOPA  SUBRTN
01 3711  32 2517          B=VARIDX
```

```
                           GLIDE SLOPE ARM

01 3712  13 0263                 IF      ROLF1A(B):=:0 THEN XITGSA
01 3713  61 3764
01 3714  71 7771                 L=L-6
01 3715  65 3764                 IF      L:>=:0    THEN XITGSA
01 3716  13 0277                 L=STATE0(B):AND:BIT3
01 3717  52 4415
01 3720  61 3764                 IF      L:=:0     THEN XITGSA
01 3721  13 0300                 L=STATE1(B):AND:BIT5
01 3722  52 4417
01 3723  61 3764                 IF      L:=:0     THEN XITGSA
01 3724  13 0253                 L=LAMD1A(B)
01 3725  50 0301                 ABSVAL
01 3726  71 6735                 L=L-0.75DEG
01 3727  65 3764                 IF      L:>=:0    THEN XITGSA
```

```
01 3730  11 0271                 IF      U,PAPS1A(B):=:0 THEN GSLOP1
01 3731  50 3734
01 3732  41 0271                 PAPS1A(B)=0
01 3733  76 3766                 CALL    GSINIT
01 3734  76 3400        GSLOP1   CALL    GLSPCM
01 3735  14 2000                 TEMP1=L+TEMP2
01 3736  44 1776
01 3737  13 0601                 L=HGSECF(B):XOR:TEMP1
01 3740  53 1776
01 3741  67 3752        GSLOP2   IF      L:<:0     THEN GSCAPT
01 3742  13 0601                 L=HGSECF(B)
01 3743  50 0301                 ABSVAL
01 3744  16 4525                 L=L-03840
01 3745  65 3764                 IF      L:>=:0    THEN XITGSA
01 3746  13 0452                 L=HEDTGS(B)
01 3747  50 0301                 ABSVAL
01 3750  71 6516                 L=L-689
01 3751  65 3764                 IF      L:>=:0    THEN XITGSA
01 3752  13 0264        GSCAPT   PITE1A(B)=PITA1A(B)
01 3753  45 0265
01 3754  45 0267                 PSYNFA(B)=L
01 3755  71 7776                 PITA1A(B)=L-1
01 3756  45 0264
01 3757  40 2051                 F50FLG=0
01 3760  70 0004                 FLCMIX=4
01 3761  44 2054
01 3762  70 1130                 FLPCNT=600
01 3763  44 2076
01 3764  13 0264        XITGSA   L=PITA1A(B)
01 3765  55 3710                 RETURN GSLCPA
```

```
                              SECTOR
                  *********************************************

                     G/S INITIALIZATION


                              MODIFY
                  HERATL
                  HERHGS
                  HGSECF
                  LNOFGA
                  ZTFIP9
                  ZTF09
                  ZTW09
```

-continued

```
                G/S INITIALIZATION

                       REFER
               GAMGSN
               HRADIO
               LAMD1A

01 3766  00 0000  GSINIT  SUBRTN
01 3767  41 0562          ZTW09(B)=0
01 3770  41 0536          ZTFIP9(B)=0
01 3771  41 0606          ZTF09(B)=0
01 3772  70 0250          HERATL(B)=168
01 3773  45 0453
01 3774  13 0613          HERRGS(B)=-HRADIO(B)*LAMD1A(B)*2^5/GAMGSN
01 3775  50 6100
01 3776  25 0253
01 3777  50 4705
01 4000  26 4063
01 4001  45 0455
01 4002  45 0601          HGSECF(B)=L
01 4003  41 0275          LNDFGA(B)=0
01 4004  55 3766          RETURN GSINIT
```

```
                       SECTOR
               ****************************************

                 FLARE GUIDANCE ARMED


                       MODIFY
               PITA1A
               PITE1A
               PSYNFA

                       REFER
               DUALFG
               VARIDX

01 4005  00 0000  FLAREA  SUBRTN
01 4006  32 2517          B=VARIDX
01 4007  13 0310          IF     DUALFG(B)I=10 THEN XITFRA
01 4010  61 4020
01 4011  76 3651          CALL   FLRFWD
01 4012  67 4020          IF     LI<10    THEN XITFRA
01 4013  13 0264          PITE1A(B)=PITA1A(B)
01 4014  45 0265
01 4015  45 0257          PSYNFA(B)=L
01 4016  71 7776          PITA1A(B)=L-1
01 4017  45 0264
01 4020  13 0264  XITFRA  L=PITA1A(B)
01 4021  55 4005          RETURN FLAREA
```

```
                       SECTOR
               *************************************

               ALTITUDE PRE-SELECT ARM


                       MODIFY
               PCPFGA
               PITA1A
               PITE1A
               PSYNFA
               TEMP1
```

-continued

```
                    ALTITUDE PRE-SELECT ARM

                            REFER
                    ALTERC
                    VARIDX


01 4022   00 0000   ALTARM  SUBRTN
01 4023   32 2517           B=VARIDX
01 4024   76 2762           CALL    ALTERR
01 4025   44 1776           TEMP1=L
01 4026   13 0371           L=ALTERC(B):XOR:TEMP1
01 4027   53 1776
01 4030   65 4036           IF      L:>=:0   THEN XITALA
01 4031   13 0264           PITE1A(B)=PITA1A(B)
01 4032   45 0265
01 4033   45 0274           PCPFGA(B)=L
01 4034   45 0267           PSYNFA(B)=L
01 4035   41 0264           PITA1A(B)=0
01 4036   13 0264   XITALA  L=PITA1A(B)
01 4037   55 4022           RETURN ALTARM
```

```
                            SECTOR
                    **********************************

                     AIRSPEED SELECT ARM MODE


                            MODIFY
                    INT035
                    KVSPIT
                    PAPS1A
                    PCPFGA
                    PITA1A
                    PITE1A
                    PSYNFA
                    SPTCNT
                    TEMP1
                    VERRCF
                    ZTF026

                            REFER
                    KVSPCP
                    VARIDX
                    VCASAD
                    VCASRF
                    VDTTCF
                    VTASCF


01 4040   00 0000   VCASRM  SUBRTN
01 4041   32 2517           B=VARIDX
01 4042   12 0212           L=VCASAD-VCASRF(B)*VTASCF(B)/VCASAD
01 4043   17 0361
01 4044   25 0714
01 4045   26 0212
01 4046   11 0271           IF      U,PAPS1A(B):=:0 THEN VCASA1
01 4047   60 4057
01 4050   13 4057           KVSPIT(B)=U,KVSPCP
01 4051   47 0362
01 4052   11 0435           ZTF026(B)=U,VDTTCF(B)
01 4053   47 0627
01 4054   41 0747           INT035(B)=0
01 4055   41 0271           PAPS1A(B)=0
01 4056   45 0750           VERRCF(B)=L
01 4057   76 3065   VCASA1  CALL    SPITCH
01 4060   44 1776           TEMP1=L
01 4061   13 0750           L=VERRCF(B):XOR:TEMP1
```

```
 1E19B SCAMP                                  SECTION        124        PAGE       361
                                              -continued

                          AIRSPEED SELECT ARM MODE

01 4062   53 1776
01 4063   65 4072               IF      L:>=:0    THEN VCASA2
01 4064   13 0264               PITE1A(B)=PITA1A(B)
01 4065   45 0265
01 4066   45 0274               PCPFGA(B)=L
01 4067   45 0267               PSYNFA(B)=L

 1E19B SCAMP                                  SECTION        124        PAGE       362

01 4070   41 0264               PITA1A(B)=0
01 4071   41 0357               SPTCNT(B)=0
01 4072   13 0264   VCASA2      L=PITA1A(B)
01 4073   55 4040               RETURN VCASRM

 1E19B SCAMP                                  SECTION        125        PAGE       363

                              SECTOR
                         ***********************************

                          MACH SELECT ARM MODE

                              MODIFY
                         INT034
                         KVMPIT
                         MERRCF
                         PAPS1A
                         PCPFGA
                         PITA1A
                         PITE1A
                         PSYNFA
                         SPTCNT
                         TEMP1
                         ZTF027

                              REFER
                         KVSPCP
                         MACHAD
                         MACHRF
                         VARIDX
                         VDTTCF
                         VTASCF

01 4074   00 0000   MACHRM      SUBRTN
01 4075   32 2517               B=VARIDX
01 4076   12 0211               L=MACHAD-MACHRF(B)*VTASCF(B)/MACHAD
01 4077   17 0360
01 4100   25 0714
01 4101   26 0211
01 4102   11 0271               IF      U,PAPS1A(B):=:0 THEN MACHA1
01 4103   60 4113
01 4104   13 4057               KVMPIT(B)=U,KVSPCP
01 4105   47 0363
01 4106   11 0435               ZTF027(B)=U,VDTTCF(B)
01 4107   47 0630
01 4110   41 0746               INT034(B)=0
01 4111   41 0271               PAPS1A(B)=0
01 4112   45 0751               MERRCF(B)=L
01 4113   76 3115   MACHA1      CALL    MPITCH
01 4114   44 1776               TEMP1=L
01 4115   13 0751               L=MERRCF(B):XOR:TEMP1
01 4116   53 1776
01 4117   65 4127               IF      L:>=:0    THEN MACHA2
01 4120   13 0264               PITE1A(B)=PITA1A(B)
01 4121   45 0265
01 4122   45 0274               PCPFGA(B)=L
01 4123   45 0267               PSYNFA(B)=L
```

```
18198 SCAMP                          SECTION        125       PAGE       364

01 4124   41 0264              PITA1A(B)=0
01 4125   70 0047              SPTCNT(B)=39
01 4126   45 0367
01 4127   13 0264    MACHA2    L=PITA1A(B)
01 4130   55 4074              RETURN MACHRM
```

```
18198 SCAMP                          SECTION        126       PAGE       365

                               SECTOR
                     ****************************************

                        NO PITCH MODE ARMED

01 4131   00 0000    PTAOFF    SUBRTN
01 4132   70 0000              L=0
01 4133   55 4131              RETURN PTAOFF
```

```
18198 SCAMP                          SECTION        127       PAGE       366

                               SECTOR
                     ****************************************

                      HEADING SELECT-HEADING HOLD COMPUTATIONS

                               MODIFY
                     PHCOLD
                     PHIC
                     PHIDLM
                     PHIDMX
                     PHIIC
                     PHIMAX
                     PHIP
                     PHIP1
                     ZTF017

                               REFER
                     AUTO1A
                     DEG2P5
                     DEG25
                     DEG30
                     D25000
                     KPSI0
                     KROLRT
                     PHICOM
                     PHI1A
                     ROLE1A
                     VTASCF
                     VT200

01 4134   00 0000    SELHLD    SUBRTN
01 4135   61 4144              IF      L:=10     THEN HSPAS2
01 4136   13 0334              PHIP1(B)=PHICOM(B)
01 4137   45 0710
01 4140   41 0400              PHCOLD(B)=0
01 4141   41 0616              ZTF017(B)=0
01 4142   12 4567              PHIMAX(B)=DEG25
01 4143   45 0466
01 4144   50 0231    HSPAS2    L=U
01 4145   10 4531              U=D25000
01 4146   76 0115              CALL    LIMT1A
01 4147   25 0714              L=L*VTASCF(B)/VT200*KPSI0*2^-16
01 4150   26 4164
01 4151   24 4103
01 4152   50 4520
01 4153   11 0466              U=PHIMAX(B)
01 4154   76 0115              CALL    LIMT1A
01 4155   17 0400              L=L-PHCOLD(B)
01 4156   11 0470              U=PHIDLM(B)
01 4157   76 0115              CALL    LIMT1A
```

```
18196 SCAMP                               SECTION        128        PAGE        368

                        SECTOR
                 ********************************

                   HEADING SELECT


                        REFER
                 HDGSER
                 VARIDX

01 4216   00 0000  HDGSEL  SUBRTN
01 4217   32 2517          B=VARIDX
01 4220   10 0206          U=HDGSER
01 4221   76 4134          CALL    SELHLD
01 4222   36 0005          B=5
01 4223   55 4216          RETURN HDGSEL
```

```
18196 SCAMP                               SECTION        127        PAGE        367


01 4160   15 0400          PHCOLD(B)=L+PHCOLD(B)
01 4161   45 0400
01 4162   36 0021          B=17
01 4163   76 0141          CALL    ZTFLAG
01 4164   45 0332          PHIC(B)=L
01 4165   13 0246          L=PHI1A(B)
01 4166   50 0301          ABSVAL
01 4167   24 4102          L=L*KROLRT
01 4170   50 0201          L=U
01 4171   11 0260          IF      U,AUTO1A(B):/=:0 THEN SELHD1
01 4172   62 4177
01 4173   11 0263          IF      U,ROLE1A(B):=:0 THEN SELHD1
01 4174   60 4177
01 4175   12 4571          L=DEG30
01 4176   34 4202          GO      SELHD2
01 4177   02 4553  SELHD1  IF      L:>=:DEG2P5 THEN SELHD2
01 4200   65 4202
01 4201   12 4553          L=DEG2P5
01 4202   45 0467  SELHD2  PHIDMX(B)=L
01 4203   50 7124          PHIDLM(B)=L/20
01 4204   45 0470
01 4205   13 0710          L=-PHIP1(B)
01 4206   50 6100
01 4207   11 0467          U=PHIDMX(B)
01 4210   76 0115          CALL    LIMT1A
01 4211   36 0004          B=4
01 4212   76 0205          CALL    INTEGT
01 4213   45 0333          PHIP(B)=L
01 4214   41 0331          PHIIC(B)=0
01 4215   55 4134          RETURN SELHLD
```

```
18196 SCAMP                               SECTION        129        PAGE        369


                        SECTOR
                 **********************************

                   ROLL AXIS TOGA


                        MODIFY
                 HDGHDF
                 RTOGAF

                        REFER
                 DEG5
                 PHI1A
                 PSIHCL
                 VARIDX
                 WOW
```

ROLL AXIS TOGA

```
01 4224  00 0000  RLTOGA  SUBRTN
01 4225  32 2517          B=VARIDX
01 4226  50 0200          U=L
01 4227  61 4231          IF      L:=:0     THEN RTOGA1
01 4230  45 0402          RTOGAF(B)=L
01 4231  13 0402  RTOGA1  IF      RTOGAF(B):=:0 THEN RTOGA2
01 4232  61 4243
01 4233  13 0246          L=PHI1A(B)
01 4234  50 0301          ABSVAL
01 4235  02 4556          IF      L:>=:DEG5 THEN RTOGA3
01 4236  65 4244
01 4237  13 0346          IF      WOW(B):/=:0 THEN RTOGA3
01 4240  63 4244
01 4241  41 0402          RTOGAF(B)=0
01 4242  70 0001          L=1
01 4243  45 0401  RTOGA2  HDGHOF(B)=L
01 4244  50 0201  RTOGA3  L=U
01 4245  10 0200          U=PSIHCL
01 4246  76 4134          CALL    SELHLD
01 4247  35 0006          B=6
01 4250  55 4224          RETURN RLTOGA
```

```
                  SECTOR
          ************************************
            LOCALIZER CAPTURE/TRACK
           MODE COMPUTATIONS

                  MODIFY
          LOCTIM
          PHIC
          PHIOLM
          PHIDMX
          PHIIC
          PHIMAX
          PHIP
          PHIP1
          RCPFGA
          YDDTLM
          YDTLM1
                  REFER
          BETA1A
          DEG3
          DEG5
          DEG10
          DEG20
          D3200
          D3840
          HRADIO
          KYILOC
          KYLT1A
          PHICOM
          PHI1A
          ROLE1A
          VARIDX
          YDTLOC
          YLOC

01 4251  00 0000  LOCALR  SUBRTN
01 4252  32 2517          B=VARIDX
01 4253  61 4271          IF      L:=:0     THEN LCPAS2
01 4254  13 0334          PHIP1(B)=PHICOM(B)
01 4255  45 0710
01 4256  41 0332          PHIC(B)=0
```

-continued

LOCALIZER CAPTURE/TRACK

MODE COMPUTATIONS

```
01 4257   41 0331            PHIIC(B)=0
01 4260   70 0310            LOCTIM(B)=200
01 4261   45 0403
01 4262   76 4673            CALL    LCCINI
01 4263   12 4556            PHIDMX(B)=DEG5
01 4264   45 0467
01 4265   70 0266            PHIOLM(B)=.25DEG
```

```
01 4266   45 0470
01 4267   45 0273            RCPFGA(B)=L
01 4270   34 4346            GO      LCPAS1
01 4271   76 5637  LCPAS2    CALL    LCCERR
01 4272   45 0332            PHIC(B)=L
01 4273   41 0331            PHIIC(B)=0
01 4274   12 4570            PHIMAX(B)=DEG28
01 4275   45 0466
01 4276   13 0403            IF      LCCTIM(B):=:0 THEN LOCAL1
01 4277   61 4303
01 4300   71 7776            LOCTIM(B)=L-1
01 4301   45 0403
01 4302   34 4346            GO      LCPAS1
01 4303   13 0273  LOCAL1    IF      RCPFGA(B):=:0 THEN LOCTRK
01 4304   61 4332
01 4305   13 0334            L=PHICOM(B)
01 4306   50 0301            ABSVAL
01 4307   02 4554            IF      L:>=:DEG3 THEN LCPAS1
01 4310   65 4346
01 4311   13 0246            L=PHI1A(B)
01 4312   50 0301            ABSVAL
01 4313   02 4554            IF      L:>=:DEG3 THEN LCPAS1
01 4314   65 4346
01 4315   13 0404            L=YLOC(B)
01 4316   50 0301            ABSVAL
01 4317   16 4525            L=L-D3840
01 4320   65 4346            IF      L:>=:0    THEN LCPAS1
01 4321   13 0405            L=YDTLOC(B)
01 4322   50 0301            ABSVAL
01 4323   71 4777            L=L-1536
01 4324   65 4346            IF      L:>=:0    THEN LCPAS1
01 4325   41 0273            RCPFGA(B)=0
01 4326   12 4524            YDOTLM(B)=D3200
01 4327   45 0450
01 4330   70 0024            YDTLM1(B)=20
01 4331   45 0447
01 4332   13 0613  LOCTRK    L=HRADIO(B)-600
01 4333   71 6647
01 4334   10 4556            U=DEG5
01 4335   67 4337            IF      L:<:0     THEN LOCAL2
01 4336   10 4561            U=DEG10
01 4337   47 0466  LOCAL2    PHIMAX(B)=U
01 4340   12 4106            L=KYLT1A
01 4341   36 0006            B=0
01 4342   76 0141            CALL    ZTFLAG
01 4343   13 0252            L=BETA1A(B)*KYILOC
01 4344   24 4104
01 4345   47 0331            PHIIC(B)=U
01 4346   13 0710  LCPAS1    L=-PHIP1(B)
01 4347   50 0100
01 4350   11 0467            U=PHIDMX(B)
01 4351   76 0115            CALL    LIMT1A
```

```
01 4352  36 0004          B=4
01 4353  76 0205          CALL   INTEGT
01 4354  45 0333          PHIP(B)=L
01 4355  13 0263          L=ROLE1A(B)-2
01 4356  71 7775
01 4357  61 4361          IF     L:=0    THEN LOCLR2
01 4360  36 0003  LOCLR1  B=3
01 4361  55 4251  LOCLR2  RETURN LOCALR
```

```
                  SECTOR
                  ****************************************

                  VOR CAPTURE/TRACK MODE COMPUTATIONS


                          MODIFY
                  PHIC
                  PHIDLM
                  PHIDMX
                  PHIIC
                  PHIMAX
                  PHIP
                  PHIP1
                  RCPFGA
                  VORTIM

                          REFER
                  DEG3
                  DEG5
                  DEG10
                  DEG20
                  D50
                  KYIVOR
                  KYVORT
                  PHICOM
                  PHI1A
                  VARIDX
                  VORBET
                  YDTVOR
                  YVOR

01 4362  00 0000  VOR     SUBRTN
01 4363  32 2517          B=VARIDX
01 4364  61 4402          IF     L:=0    THEN VRPAS2
01 4365  13 0334          PHIP1(B)=PHICOM(B)
01 4366  45 0710
01 4367  41 0332          PHIC(B)=0
01 4370  41 0331          PHIIC(B)=0
01 4371  70 0310          VORTIM(B)=200
01 4372  45 0415
01 4373  76 4744          CALL   VCRINI
01 4374  12 4556          PHIDMX(B)=DEG5
01 4375  45 0467
01 4376  70 0266          PHIDLM(B)=.25DEG
01 4377  45 0470
01 4400  45 0273          RCPFGA(B)=L
01 4401  34 4450          GO     VRPAS1
01 4402  76 5747  VRPAS2  CALL   VCRERR
01 4403  45 0332          PHIC(B)=L
01 4404  41 0331          PHIIC(B)=0
01 4405  12 4570          PHIMAX(B)=DEG20
```

```
01 4406  45 0466
01 4407  13 0415          IF     VORTIM(B):=0 THEN VOR1
01 4410  61 4414
```

```
01 4411  71 7776          VORTIM(B)=L-1
01 4412  45 0415
01 4413  34 4450          GO      VRPAS1
01 4414  13 0273  VOR1    IF      RCPFGA(B)I=10 THEN VORTRK
01 4415  61 4440
01 4416  13 0334          L=PHICOM(B)
01 4417  50 0301          ABSVAL
01 4420  02 4554          IF      LI>=IDEG3 THEN VRPAS1
01 4421  65 4450
01 4422  13 0246          L=PHI1A(B)
01 4423  50 0301          ABSVAL
01 4424  02 4554          IF      LI>=IDEG3 THEN VRPAS1
01 4425  65 4450
01 4426  13 0410          L=YVOR(B)
01 4427  50 0301          ABSVAL
01 4430  13 0410          IF      YVOR(B)I>=ID50 THEN VRPAS1
01 4431  02 4506
01 4432  65 4450
                                          800 FEET
01 4433  13 0411          L=YDTVOR(B)
01 4434  50 0301          ABSVAL
01 4435  71 4777          L=L-1536        12 FT/SEC
01 4436  65 4450          IF      LI>=I0  THEN VRPAS1
01 4437  41 0273          RCPFGA(B)=0
01 4440  12 4561  VORTRK  PHIMAX(B)=DEG10
01 4441  45 0456
01 4442  12 4116          L=KYVORT
01 4443  36 0031          B=25
01 4444  76 0141          CALL    ZTFLAG
01 4445  13 0414          L=VORBET(B)*KYIVOR
01 4446  24 4117
01 4447  47 0331          PHIIC(B)=U
01 4450  13 0710  VRPAS1  L=-PHIP1(B)
01 4451  50 6100
01 4452  11 0467          U=PHIDMX(B)
01 4453  76 0115          CALL    LIMT1A
01 4454  36 0004          B=4
01 4455  76 0205          CALL    INTEGT
01 4456  45 0333          PHIP(B)=L
01 4457  36 0004          B=4
01 4460  55 4362          RETURN VOR
```

```
          SECTOR
******************************************
    ALIGN MODE COMPUTATIONS


          MODIFY
ALIN1
DCRFLG
DELAIL
DELPSI
DELRSS
DELRUD
INTO23
PHIP
PSIPRD

          REFER
CRSL1A
DEGHLF
DEG6P5
FRCDOU
KALR1A
KAPS1A
KDAP1A
```

```
                        ALIGN MODE COMPUTATIONS

                     KDRP1A
                     KPHPDR
                     VARIDX

01 4461  00 0000  DECRAB  SUBRTN
01 4462  32 2517          B=VARIDX
01 4463  61 4473          IF      L:=:0    THEN DCRPS2
01 4464  13 0256          PSIPRD(B)=CRSL1A(B)
01 4465  45 0731
01 4466  45 0417          DELPSI(B)=L
01 4467  24 4120          L=L*FRCDCU
01 4470  47 0456          ALIN1(B)=U
01 4471  41 0733          INTO23(B)=0
01 4472  34 4541          GO      XITDCB
01 4473  76 4251  DCRPS2  CALL    LCCALR
01 4474  13 0456          L=ALIN1(B)-PSIPRD(B)
01 4475  17 0731
01 4476  10 4547          U=DEGHLF
01 4477  47 0421          DCRFLG(B)=U
01 4500  76 0115          CALL    LIMT1A
01 4501  36 0025          B=21
01 4502  76 0205          CALL    INTEGT
01 4503  50 6100          L=-L+CRSL1A(B)*KALR1A*2^-14
01 4504  15 0256
01 4505  24 4121
01 4506  50 4316
```

```
01 4507  45 0345          DELRUD(B)=L
01 4510  24 4125          L=L*KAPS1A
01 4511  50 0201          L=U
01 4512  36 0027          B=23
01 4513  76 0205          CALL    INTEGT
01 4514  13 0417          L=DELPSI(B)-PSIPRD(B)
01 4515  17 0731
01 4516  10 4560          U=DEG6P5
01 4517  76 0115          CALL    LIMT1A
01 4520  15 0733          L=L+INTO23(B)
01 4521  10 4560          U=DEG6P5
01 4522  76 0115          CALL    LIMT1A
01 4523  45 0420          DELRSS(B)=L
01 4524  24 4122          L=L*KDRP1A*2^-14
01 4525  50 4316
01 4526  15 0345          DELRUD(B)=L+DELRUD(B)
01 4527  45 0345
01 4530  13 0420          L=DELRSS(B)*KPHPDR*2^-17
01 4531  24 4123
01 4532  50 4321
01 4533  15 0333          PHIP(B)=L+PHIP(B)
01 4534  45 0333
01 4535  13 0420          L=DELRSS(B)*KOAP1A*2^4
01 4536  24 4124
01 4537  50 4704
01 4540  47 0336          DELAIL(B)=U
01 4541  36 0002  XITDCB  B=2
01 4542  55 4461          RETURN DECRAB
```

```
                          SECTOR
                     ******************************************

                        GROUND ROLL STEERING


                          MODIFY
                     DCRFLG
                     DELRUD
```

-continued

```
                    GROUND ROLL STEERING

                  RNGGRL
                  VGRDRL
                  ZTFIP1
                  ZTW01

                          REFER
                  BETA1A
                  BIT9
                  CRSL1A
                  D2000
                  INVKDG
                  INVKRG
                  RSYNFA
                  VARIDX
                  VDTLNG
                  XLOCSN
                  ZTF018

01 4543   00 0000 GRNROL  SUBRTN
01 4544   32 2517         B=VARIDX
01 4545   70 0001         DCRFLG(B)=1
01 4546   45 0421
01 4547   13 0434         L=VDTLNG(B)
01 4550   36 0016         B=14
01 4551   76 0205         CALL   INTEGT   VGRDRL
01 4552   02 4423         IF     L1>=1BIT9 THEN GRNRL1
01 4553   65 4556
01 4554   12 4423         VGRDRL(B)=BIT9
01 4555   45 0722
01 4556   50 6100 GRNRL1  L=-L
01 4557   36 0034         B=28
01 4560   76 0205         CALL   INTEGT   RNGGRL
01 4561   02 4522         IF     L1>=1D2000 THEN GRNRL2
01 4562   65 4565
01 4563   12 4522         RNGGRL(B)=D2000
01 4564   45 0740
01 4565   25 0252 GRNRL2  L=L+BETA1A(B)
01 4566   50 7400         T=A
01 4567   13 0256         L=CRSL1A(B)
01 4570   36 0010         B=8
01 4571   76 0162         CALL   ZTFW0
01 4572   24 4126         L=L+XLOCSN+T+2A8
01 4573   50 0106
```

```
01 4574   50 4710
01 4575   50 7400         T=A
01 4576   13 0256         L=CRSL1A(B)+20   TAUWO
01 4577   50 7024
01 4600   25 0722         L=L+VGRDRL(B)+2A4+T/INVKRG
01 4601   50 4704
01 4602   50 0106
01 4603   26 4130
01 4604   36 0001         B=1
01 4605   76 0162         CALL   ZTFW0
01 4606   50 7500         A=T/INVKDG+ZTW01(B)
01 4607   26 4127
01 4610   15 0552
01 4611   45 0345         DELRUD(B)=L
01 4612   11 0266         IF     U,RSYNFA(B)1=10 THEN GRNRL3
01 4613   60 4621
01 4614   17 0617         ZTFIP1(B)=L-ZTF018(B)
01 4615   45 0526
01 4616   41 0552         ZTW01(B)=0
01 4617   13 0617         DELRUD(B)=ZTF018(B)
01 4620   45 0345
01 4621   36 0001 GRNRL3  B=1
01 4622   55 4543         RETURN GRNROL
```

```
                         SECTOR
                 ****************************************

                    ROLL MODES OFF


                         MODIFY
                 DELAIL
                 DELRUD
                 PHIC
                 PHIIC
                 PHIP
                 RCPFGA

                         REFER
                 VARIDX

01 4623   00 0000  ROLOFF  SUBRTN
01 4624   32 2517          B=VARIDX
01 4625   41 0332          PHIC(B)=0
01 4626   41 0331          PHIIC(B)=0
01 4627   41 0333          PHIP(B)=0
01 4630   41 0336          DELAIL(B)=0
01 4631   41 0345          DELRUD(B)=0
01 4632   41 0273          RCPFGA(B)=0
01 4633   36 0000          B=0
01 4634   55 4623          RETURN ROLOFF
```

```
                         SECTOR

                 ***********************************************

                    ROLL GUIDANCE ARMED MODE

                 ****************************************

                   LOCALIZER ARM


                         MODIFY
                 OCRFLG
                 ROLA1A
                 ROLE1A
                 RSYNFA
                 TEMP1

                         REFER
                 BETA1A
                 D3200
                 D5000
                 LOCTIM
                 VARIDX
                 YDTLOC
                 YLOC

01 4635   00 0000  LOCALA  SUBRTN
01 4636   32 2517          B=VARIDX
01 4637   13 0403          IF      LOCTIM(B):/=:0 THEN XITLC1
01 4640   63 4671
01 4641   13 0252          L=BETA1A(B)
01 4642   50 0301          ABSVAL
01 4643   71 5117          L=L-2.0DEG
01 4644   65 4671          IF      L:>=:0   THEN XITLC1
01 4645   76 4673          CALL    LOCINI
01 4646   76 5637          CALL    LOCERR
01 4647   44 1776          TEMP1=L
01 4650   13 0404          L=YLOC(B):XOR:TEMP1
```

```
18198 SCAMP                          SECTION        135      PAGE      380
                                     -continued

                        LOCALIZER ARM

01 4651   53 1776
01 4652   67 4663              IF      L:<:0     THEN LOCAPT
01 4653   13 0405              L=YDTLOC(B)
01 4654   50 0301              ABSVAL
01 4655   16 4524              L=L-D3200
01 4656   65 4671              IF      L:>=:0    THEN XITLC1
01 4657   13 0404              L=YLOC(B)
01 4660   50 0301              ABSVAL
01 4661   16 4526              L=L-D5000
01 4662   65 4671              IF      L:>=:0    THEN XITLC1
01 4663   13 0262    LOCAPT    ROLE1A(B)=ROLA1A(B)
01 4664   45 0263

 18198 SCAMP                         SECTION        135      PAGE      381

01 4665   41 0421              DCRFLG(B)=0
01 4666   45 0266              RSYNFA(B)=L
01 4667   71 7776              ROLA1A(B)=L-1
01 4670   45 0262
01 4671   13 0262    XITLC1    L=ROLA1A(B)
01 4672   55 4635              RETURN LOCALA

 18198 SCAMP                         SECTION        136      PAGE      382

                               SECTOR
                     ******************************************

                               MODIFY
                     BIT15
                     KYLOC
                     YDOTLM
                     YDTLM1

                               REFER
                     D54016
                     KYLC1A
                     RNGEST

01 4673   00 0000    LOCINI    SUBRTN
01 4674   12 4532              YDOTLM(B)=D54016
01 4675   45 0450
01 4676   70 0522              YDTLM1(B)=338
01 4677   45 0447
01 4700   12 4105              KYLOC(B)=KYLC1A
01 4701   45 0603
01 4702   12 4431              RNGEST(B)=BIT15
01 4703   45 0625
01 4704   55 4673              RETURN LOCINI

18198 SCAMP                          SECTION        137      PAGE      383

                               SECTOR
                     ************************************

                     VOR ARM

                               MODIFY
                     KYDVCR
                     ROLA1A
                     ROLE1A
                     RSYNFA
                     TEMP1
                     VORINF
```

-continued

```
                          REFER
                  BIT15
                  D3200
                  D12500
                  KYVORC
                  VARIDX
                  YDTVOR
                  YVORFL

01 4705  00 0000  VORARM  SUBRTN
01 4706  32 2517          B=VARIDX
01 4707  13 0416          IF     VCRINF(B):/=:0 THEN VARMX2
01 4710  63 4741
01 4711  76 4744          CALL   VCRINI
01 4712  13 0730          L=YVORFL(B)
01 4713  50 0301          ABSVAL
01 4714  02 4431          IF     L:>=:BIT15 THEN VARMXT
01 4715  65 4737
01 4716  76 5747          CALL   VCRERR
01 4717  44 1776          TEMP1=L
01 4720  13 0730          L=YVORFL(B):XOR:TEMP1
01 4721  53 1776
01 4722  67 4733          IF     L:<:0     THEN VORCAP
01 4723  13 0411          L=YDTVOR(B)
01 4724  50 0301          ABSVAL
01 4725  16 4524          L=L-D3200        25 FT/SEC
01 4726  65 4737          IF     L:>=:0    THEN VARMXT
01 4727  13 0730          L=YVORFL(B)
01 4730  50 0301          ABSVAL
01 4731  16 4530          L=L-D12500       1 N.M.
01 4732  65 4737          IF     L:>=:0    THEN VARMXT
01 4733  13 0262  VORCAP  ROLE1A(B)=ROLA1A(B)
01 4734  45 0263
01 4735  45 0266          RSYNFA(B)=L
01 4736  41 0262          ROLA1A(B)=0
01 4737  12 4115  VARMXT  KYDVOR(B)=KYVORC
01 4740  45 0626
01 4741  41 0416  VARMX2  VORINF(B)=0
```

```
01 4742  13 0262          L=ROLA1A(B)
01 4743  55 4705          RETURN VCRARM
```

```
                          SECTOR
                  *************************************

                          MODIFY
                  INT019
                  INT027
                  YVOR
                  YVORFL

                          REFER
                  SCD573
                  SINPSI
                  VORBET
                  VORRNG
                  VTASCF

01 4744  00 0000  VORINI  SUBRTN
01 4745  13 0413          YVORFL(B)=VORRNG(B)*VORBET(B)*2**5/SCD573
01 4746  25 0414
01 4747  50 4705
01 4750  26 4166
01 4751  45 0733
```

-continued

```
01 4752  45 0410            YVOR(B)=L
01 4753  41 0737            INT027(B)=0
01 4754  13 0714            L=VTASCF(B)*SINPSI*2^4
01 4755  24 0501
01 4756  50 4704
01 4757  47 0727            INT019(B)=U
01 4760  55 4744            RETURN VORINI
```

```
                            SECTOR
                    ******************************************

                       DECRAB ARMED

                            MODIFY
                    CMDNTA
                    PITA1A
                    ROLA1A
                    ROLE1A
                    RSYNFA

                            REFER
                    DUALFG
                    HRADIO
                    RALTFG
                    VARIDX

01 4761  00 0000    DECRBA  SUBRTN
01 4762  32 2517            B=VARIDX
01 4763  13 0427            IF      RALTFG(B):/=:0 THEN XITDCR
01 4764  63 5005
01 4765  13 0613            L=HRADIO(B)-572
01 4766  71 6703
01 4767  65 5005            IF      L:>=:0    THEN XITDCR
01 4770  13 0310            IF      DUALFG(B):/=:0 THEN DECRB1
01 4771  63 4776
01 4772  41 0262            ROLA1A(B)=0
01 4773  41 0264            PITA1A(B)=0
01 4774  45 0276            CMDNTA(B)=L
01 4775  34 5005            GO      XITDCR
01 4776  45 0266    DECRB1  RSYNFA(B)=L
01 4777  13 0263            ROLE1A(B)=ROLE1A(B)-1
01 5000  71 7776
01 5001  45 0263
01 5002  13 0262            ROLA1A(B)=ROLA1A(B)-1
01 5003  71 7776
01 5004  45 0262
01 5005  13 0262    XITDCR  L=ROLA1A(B)
01 5006  55 4761            RETURN DECRBA
```

```
                            SECTOR
                    ******************************************

                       GROUND ROLL STEERING ARM

                            MODIFY
                    RNGGRL
                    ROLA1A
                    ROLE1A
                    RSYNFA
                    VGRDRL
                    ZTFIP1
                    ZTFIP8
                    ZTWO1
                    ZTWO8
```

```
                          GROUND ROLL STEERING ARM

                               REFER
                        CRSL1A
                        012500
                        TDFLAG
                        VARIDX
                        VTASCT


01 5007  00 0000  GRDRLA   SUBRTN
01 5010  32 2517           B=VARIDX
01 5011  13 0316           IF      TDFLAG(B)!=!0 THEN XITGRL
01 5012  61 5031
01 5013  41 0262           ROLA1A(B)=0
01 5014  41 0552           ZTWO1(B)=0
01 5015  41 0526           ZTFIP1(B)=0
01 5016  45 0256           RSYNFA(B)=L
01 5017  13 0725           VGRDRL(B)=VTASCT(B)
01 5020  45 0722
01 5021  12 4530           RNGGRL(B)=D12500
01 5022  45 0740
01 5023  13 0256           ZTFIP8(B)=CRSL1A(B)
01 5024  45 0535
01 5025  41 0561           ZTWO8(B)=0
01 5026  13 0263           ROLE1A(B)=ROLE1A(B)-1
01 5027  71 7776
01 5030  45 0263
01 5031  13 0262  XITGRL   L=ROLA1A(B)
01 5032  55 5007           RETURN GRDRLA
```

```
                               SECTOR
                        ***************************************

                          NO MODE ARMED


01 5033  00 0000  RLAOFF   SUBRTN
01 5034  70 0000           L=0
01 5035  55 5033           RETURN RLAOFF
```

```
                               SECTOR
                        *************************************

                        AUTO-THROTTLE MODES

                        *************************************
                        *************************************

                        ********************************

                        THROTTLE OFF SUBROUTINE

                               MODIFY
                        N1TIMR
                        SPDFLG
                        THRTLM
                        THTFGS
                        VSELEC
                        ZTFI13
                        ZTWO13

                               REFER
                        THET1A
                        VARIDX
                        VCASAD
```

-continued

```
                   THROTTLE OFF SUBROUTINE

01 5036  00 0000  THROFF  SUBRTN
01 5037  32 2517          B=VARIDX
01 5040  13 0245          ZTFI13(B)=THET1A(B)
01 5041  45 0542
01 5042  41 0566          ZTWO13(B)=0
01 5043  41 0505          THTFGS(B)=0
01 5044  12 0212          VSELEC(B)=VCASAD
01 5045  45 0506
01 5046  70 0050          THRTLM=40
01 5047  44 2025
01 5050  41 0523          SPDFLG(B)=0
01 5051  41 2524          N1TIMR(B)=0
01 5052  70 0000          L=0
01 5053  55 5036          RETURN THROFF
```

```
                  SECTOR
          ************************************
          RETARD SUBROUTINE

                  MODIFY
          RTRDRM
          THRPS1

                  REFER
          DEGONE
          DEG6
          KRTRD
          VARIDX

01 5054  00 0000  THRRTD  SUBRTN
01 5055  32 2517          B=VARIDX
01 5056  61 5061          IF     L:=10    THEN RTDPS1
01 5057  41 0736          RTRDRM(B)=0
01 5060  41 0272          THRPS1(B)=0
01 5061  76 6512  RTDPS1  CALL   FGSPCM   THTFGS
01 5062  12 4550          L=DEGONE
01 5063  36 0032          B=26
01 5064  76 0205          CALL   INTEGT   RTRDRM
01 5065  02 4557          IF     L:<:DEG6 THEN THRRT1
01 5066  67 5071
01 5067  12 4557          RTRDRM(B)=DEG6
01 5070  45 0736
01 5071  50 6100  THRRT1  L=-L+KRTRD
01 5072  14 5154
01 5073  55 5054          RETURN THRRTD
```

```
                  SECTOR
          ************************************
          THROTTLE SPEED CONTROL SUBROUTINE

                  MODIFY
          INT029
          INT030
          INT031
          N1TIMR
          SPDFLG
          TEMP1
```

-continued

THROTTLE SPEED CONTROL SUBROUTINE

```
                  TEMP1A
                  TEMP2
                  TEMP2A
                  THRMOD
                  THRPS1
                  VASERR
                  VCOMND

                           REFER
                  APTOGA
                  BITN17
                  CASTHR
                  DEG3
                  DG34P5
                  DUALFG
                  FLAPOS
                  HDOTF
                  HDTHRS
                  HRADIO
                  KCASDT
                  KFOFAE
                  K0OFAE
                  KFOFAS
                  KFOFHD
                  KTHRCF
                  KTHRDS
                  KTHRTI
                  KTHTHR
                  K1PLIM
                  K2PLIM
                  K3PLIM
                  K4PLIM
                  K1VCMD
                  N1ACTL
                  N1LIMT
                  SINTHT
                  TENKTS
                  VAPTOG
```

```
                  VARIDX
                  VCASAD
                  VSELEC
                  VTCDOT

01 5074   00 0000  THRSPD  SUBRTN
01 5075   32 2517          B=VARIDX
01 5076   61 5117          IF      L:=:0    THEN SPDPS2
01 5077   12 0212          VCOMND(B)=VCASAD
01 5100   45 0735
01 5101   41 0272          THRPS1(B)=0
01 5102   13 0507          L=-VTCDOT(B)*KTHRDS*2^7
01 5103   50 6100
01 5104   24 5146
01 5105   50 4707
01 5106   47 0742          INT030(B)=U
01 5107   12 0212          L=VCASAD*KCASDT*2^4
01 5110   24 5147
01 5111   50 4704
01 5112   47 0741          INT029(B)=U
01 5113   13 0475          L=SINTHT(B)*KTHTHR*2^1
01 5114   24 5151
01 5115   50 4701
01 5116   47 0743          INT031(B)=U
01 5117   13 0310  SPDPS2  IF      DUALFG(B):=:0 THEN THRSP1
01 5120   61 5130
01 5121   13 0613          L=HRADIO(B)-200
```

-continued

```
01 5122  71 7467
01 5123  65 5130          IF      L:>=:0   THEN THRSP1
01 5124  70 0001          THRMOD(B)=1
01 5125  45 0520
01 5126  45 0272          THRPS1(B)=L
01 5127  34 5275          GO      THRCT5
01 5130  13 0523  THRSP1  IF      SPDFLG(B):/=:0 THEN THRSP2
01 5131  63 5146
01 5132  13 0524          IF      N1TIMR(B):=:0 THEN N1CHEK
01 5133  61 5137
01 5134  71 7776          N1TIMR(B)=L-1
01 5135  45 0524
01 5136  34 5146          GO      THRSP2
01 5137  12 0066  N1CHEK  L=N1ACTL-N1LIMT
01 5140  16 2026
01 5141  67 5146          IF      L:<:0    THEN THRSP2
01 5142  70 0004          THRMOD(B)=4
01 5143  45 0520
01 5144  45 0272          THRPS1(B)=L
01 5145  45 0523          SPDFLG(B)=L
01 5146  76 6512  THRSP2  CALL    FGSPCM   THTFGS
                  PLACARD LIMIT

01 5147  12 0201          L=FLAPOS-DEG3
01 5150  16 4554
```

```
01 5151  67 5164          IF      L:<:0    THEN PLACR2
01 5152  02 4572          IF      L:>=:DG34P5 THEN PLACR1
01 5153  65 5157
01 5154  24 5177          L=L*K1PLIM
01 5155  12 5200          L=K2PLIM
01 5156  34 5162          GO      PLACR2-2
01 5157  16 4572  PLACR1  L=L-DG34P5*K3PLIM
01 5160  24 5201
01 5161  12 5202          L=K4PLIM
01 5162  50 0100          U=U+L
01 5163  34 5165          GO      PLACR3
01 5164  10 4455  PLACR2  U=BITN17
01 5165  13 0506  PLACR3  L=VSELEC(B)
01 5166  76 0115          CALL    LIMT1A
01 5167  11 0521          IF      U,APTOGA(B):=:0 THEN VCMD1
01 5170  60 5176
01 5171  03 0446          IF      L:>=:VAPTOG(B)  THEN VCMD1
01 5172  65 5176
01 5173  70 0002          THRMOD(B)=2
01 5174  45 0520
01 5175  13 0446          L=VAPTOG(B)
01 5176  17 0735  VCMD1   L=L-VCOMND(B)
01 5177  10 5176          U=K1VCMD
01 5200  76 0115          CALL    LIMT1A
01 5201  36 0031  VCMD2   B=25
01 5202  76 0205          CALL    INTEGT    VCOMND

                          COMPUTE A/S ERROR GAIN

01 5203  16 0212          VASERR(B)=L-VCASAD
01 5204  45 0516
01 5205  50 0301          ABSVAL
01 5206  10 4172          U=TENKTS
01 5207  76 0115          CALL    LIMT1A
01 5210  24 5141          L=L*KFOFAE*2A-7
01 5211  50 4307
01 5212  14 5142          TEMP1=L+K0OFAE   MIN. GAIN
01 5213  44 1776
01 5214  13 0711          IF      HDOTF(B):<:HDTHRS THEN THROT1
01 5215  02 5134
01 5216  67 5220
01 5217  70 0000          L=0
01 5220  24 5143  THROT1  L=L*KFOFHD*2A-16
```

```
01 5221   50 4320          L=L+VCASAD-CASTHR
01 5222   14 0212
01 5223   16 5135
01 5224   65 5227          IF     L:>=:0   THEN THROT2
01 5225   12 4455          L=BITN17
01 5226   34 5234          GO     THROT3
01 5227   24 5144  THROT2  L=L*KFOFAS*2A-12
01 5230   50 4314
01 5231   14 4455          L=L+BITN17
```

```
01 5232   02 1776          IF     L:<:TEMP1 THEN THROT4
01 5233   67 5235
01 5234   44 1776  THROT3  TEMP1=L          A/S ERROR COMPUTED GAIN

01 5235   13 0516  THROT4  L=VASERR(B)*KTHRCF*2A-15
01 5236   24 5145
01 5237   50 4317
01 5240   17 0507          L=L-VTCDOT(B)*KTHROS*2A-11
01 5241   24 5146
01 5242   50 4313
01 5243   17 0742          TEMP2=L-INT030(B)
01 5244   44 2000
01 5245   36 0036          B=30
01 5246   76 0205          CALL   INTEGT
01 5247   12 0212          L=VCASAD*KCASDT*2A-14
01 5250   24 5147
01 5251   50 4316
01 5252   17 0741          TEMP2A=L-INT029(B)
01 5253   44 2001
01 5254   36 0035          B=29
01 5255   76 0205          CALL   INTEGT
01 5256   13 0475          L=SINTHT(B)*KTHTHR*2A-17
01 5257   24 5151
01 5260   50 4321
01 5261   17 0743          TEMP1A=L-INT031(B)
01 5262   44 1777
01 5263   36 0037          B=31
01 5264   76 0205          CALL   INTEGT
01 5265   13 0516          L=VASERR(B)*KTHRTI*2A-13
01 5266   24 5150
01 5267   50 4315
01 5270   14 1777          L=L+TEMP1A+TEMP2+TEMP2A+TEMP1*2A-17
01 5271   14 2000
01 5272   14 2001
01 5273   24 1776
01 5274   50 4321
01 5275   55 5074  THROT5  RETURN THRSPD
```

```
          SECTOR
**************************************
 N1 LIMIT SUBROUTINE

          MODIFY
N1TIMR
SPDFLG
TEMP1
THRMOD
THRPS1
ZTFI12
ZTWO12
```

-continued

```
                        N1 LIMIT SUBROUTINE

                                REFER
                      DEG3
                      KN1DTE
                      KN1ERR
                      N1ACTL
                      N1LIMT
                      VARIDX

01 5276   00 0000     THRN1L    SUBRTN
01 5277   32 2517               B=VARIDX
01 5300   61 5306               IF      L:=10     THEN THRNP2
01 5301   12 0066               ZTFI12(B)=N1ACTL-N1LIMT
01 5302   16 2026
01 5303   45 2541
01 5304   41 2565               ZTWO12(B)=0
01 5305   41 0272               THRPS1(B)=0
01 5306   13 0523     THRNP2    IF      SPDFLG(B):=10 THEN THRN12
01 5307   61 5332
01 5310   65 5313               IF      L:>=10    THEN THRN11
01 5311   76 5353               CALL    THRMAC
01 5312   34 5315               GO      LCK+3
01 5313   70 0000     THRN11    L=0
01 5314   76 5074               CALL    THRSPD
01 5315   65 5333               IF      L:>=10    THEN THRN12+1
01 5316   44 1776               TEMP1=L
01 5317   70 0003               L=3
01 5320   11 0523               IF      U,SPDFLG(B):>=10 THEN LOK+2
01 5321   64 5323
01 5322   70 0005               L=5
01 5323   45 0520               THRMOD(B)=L
01 5324   41 0272               THRPS1(B)=0
01 5325   41 0523               SPDFLG(B)=0
01 5326   70 0310               N1TIMR(B)=200
01 5327   45 0524
01 5330   12 1776               L=TEMP1
```

```
01 5331   34 5352               GO      THRNXT
01 5332   76 6512     THRN12    CALL    FGSPCM
01 5333   12 0066               TEMP1=N1ACTL-N1LIMT
01 5334   16 2026
01 5335   44 1776
01 5336   36 0014               B=12
01 5337   76 2152               CALL    ZTFWD
01 5340   24 5153               L=L*KN1DTE
01 5341   50 7400               T=A
01 5342   12 1776               L=TEMP1*KN1ERR*2A-8+T*2A-10
01 5343   24 5152
01 5344   50 4310
01 5345   50 0106
01 5346   50 4312
01 5347   02 4554               IF      L:<:DEG3 THEN LOK+2
01 5350   67 5352
01 5351   12 4554               L=DEG3
01 5352   55 5276     THRNXT    RETURN THRN1L
```

```
                                SECTOR
                      ***************************************

                       MACH SELECT AND HOLD - THROTTLE


                                MODIFY
                      SPDFLG
                      VSELEC
```

-continued

```
                    MACH SELECT AND HOLD = THROTTLE

                          REFER
                    MACHAD
                    MACHCM
                    THRPS1
                    VARIDX
                    VCASAD


01 5353   30 0000   THRMAC   SUBRTN
01 5354   32 2517            B=VARIDX
01 5355   12 2031            VSELEC(B)=MACHCM-MACHAD*VCASAD/MACHAD+VCASAD
01 5356   16 0211
01 5357   24 0212
01 5360   26 0211
01 5361   14 0212
01 5362   45 0506
01 5363   13 0272            L=THRPS1(B)
01 5364   76 5074            CALL    THRSPD
01 5365   11 0523            IF      U,SPDFLG(B)1<=10 THEN LOK+3
01 5366   60 5371
01 5367   66 5372
01 5370   50 5200            CPAU
01 5371   47 0523            SPDFLG(B)=U
01 5372   55 5353            RETURN THRMAC
```

```
                          SECTOR

                    ****************************************

                      EULER ANGLES AND ALTITUDE AND TRUE AIR SPEED
                     COMPLEMENTRY FILTER


                          MODIFY
                    ACCELZ
                    ALTCOR
                    ALTITD
                    APTOGA
                    DMTX12
                    DMTX13
                    DMTX32
                    DMTX33
                    HDDOT
                    HDTOLD
                    INTOT9
                    LATACC
                    MKIT1A
                    MKIT2A
                    TEMP1
                    TEMP1A
                    TEMP2
                    VDTLNG
                    VDTTCF
                    VTASCF
                    VTASHD

                          REFER
                    ACCX1A
                    ACCY1A
                    ACCZ1A
                    ALTBCR
                    ALTNCR
                    ALTRTE
                    BIT12
                    COSPHI
```

```
18198 SCAMP                                    SECTION      147      PAGE      398
```

-continued

```
                           EULER ANGLES AND ALTITUDE AND TRUE AIR SPEED
                          COMPLEMENTRY FILTER

                        COSTHT
                        DMTX11
                        DMTX22
                        DMTX23
                        DMTX31
                        DUALFG
                        D200
                        D3840
                        FLAPOS
                        HDOTF
                        HDOTF1
                        KHCF1

18198 SCAMP                                    SECTION      147      PAGE      399

                        KHCF2
                        KHCF3
                        KHCF4
                        KVCF1
                        KVCF2
                        ONEG
                        SINPHI
                        SINTHT
                        VAPPTA
                        VAPTOG
                        VTASAD
                        WOW
                        ZERO

01 5373   00 0000       EUCFIL   SUBRTN
01 5374   13 0251                ACCELZ(B)=ACCZ1A(B)-ONEG  2A7
01 5375   16 4165
01 5376   45 0457
01 5377   13 0326                L=DMTX31(B)*ACCX1A(B)   2A7
01 5400   25 0247
01 5401   50 7400                T=A
01 5402   13 0324                L=DMTX22(B)*COSTHT(B)*2A-17
01 5403   25 0474
01 5404   50 4321
01 5405   45 0330                DMTX33(B)=L

                        ******************************

                          ALTITUDE
                          COMPLEMENTARY FILTER
                          NORMAL FORM

01 5406   25 0457                L=L+ACCELZ(B)+T
01 5407   50 0106
01 5410   50 7400                T=A
01 5411   13 0477                L=SINPHI(B)*COSTHT(B)*2A-17
01 5412   25 0474
01 5413   50 4321
01 5414   45 0327                DMTX32(B)=L
01 5415   25 0250                L=L+ACCY1A(B)+T*2A-17   2A7
01 5416   50 0106
01 5417   50 4321
01 5420   50 6100                HDDOT(B)=-L-ONEG
01 5421   16 4165
01 5422   45 0424
                        **************************************

                        ALT RATE COMPLEMENTARY FILTER
                        FOR INITIALIZING GO AROUND MODE:

01 5423   36 0006                B=6
01 5424   76 0162                CALL    ZTFWO
```

```
01 5425  50 4603          L=L*2^3+ALTRTE-HDOTF1(B)
01 5426  14 0216
01 5427  17 0717
01 5430  36 0013          B=11
01 5431  76 0205          CALL    INTEGT
01 5432  50 5101          IF      F,1=0    THEN EUCFI2
01 5433  34 5435
01 5434  34 5437
01 5435  70 0000  EUCFI1  L=0
01 5436  34 5452          GO      STORDH
01 5437  12 0207  EUCFI2  U=L,ALTNCR-ALTITD(B)  1BIT/FT.
01 5440  17 0712
01 5441  50 0200
01 5442  50 0301          ABSVAL
01 5443  02 4512          IF      L:<:D200 THEN EUCFI3
01 5444  67 5450
01 5445  12 0207          ALTITD(B)=ALTNCR
01 5446  45 0712
01 5447  10 4500          U=ZERO
01 5450  50 0201  EUCFI3  L=U*2^7
01 5451  50 4607
01 5452  44 1776  STORDH  TEMP1=L
01 5453  36 0007          B=7
01 5454  76 0205          CALL    INTEGT    INTOT7 *2**-7 GAIN
01 5455  24 4133          L=L*KHCF3         K H C.F. 3*(2**25)
01 5456  46 2000          TEMP2=U
01 5457  12 1776          L=TEMP1*KHCF4     K H C.F. 4*(2**18)
01 5460  24 4134
01 5461  46 1777          TEMP1A=U
01 5462  50 5101          IF      F,1=0    THEN ALTCF1
01 5463  34 5465
01 5464  34 5471
01 5465  13 0426  EUCFI4  L=HDTOLD(B)-HDOTF(B)*2^-2
01 5466  17 0711
01 5467  50 4202
01 5470  34 5505          GO      ALTCF3
01 5471  13 0711  ALTCF1  HDTOLD(B)=HDOTF(B)
01 5472  45 0426
01 5473  12 0216          U=L,ALTRTE-HDOTF(B)
01 5474  17 0711
01 5475  50 0200
01 5476  50 0301          ABSVAL
01 5477  02 4525          IF      L:<:D3840 THEN ALTCF2
01 5500  67 5504
01 5501  12 0216          HDOTF(B)=ALTRTE
01 5502  45 0711
01 5503  17 4500          U=ZERO
01 5504  50 0201  ALTCF2  L=U
01 5505  24 4135  ALTCF3  L=L*KHCF2         KH C.F. 2*(2**18)
01 5506  50 0201          L=U+TEMP1A+TEMP2+HDDOT(B)
01 5507  14 1777
01 5510  14 2000
```

```
01 5511  15 0424
01 5512  36 0005          B=5
01 5513  76 0205          CALL    INTEGT    HDOTF
01 5514  12 1776          L=TEMP1*KHCF1     KH C.F.1*(2**18)
01 5515  24 4136
01 5516  50 0201          L=U+HDOTF(B)
01 5517  15 0711
01 5520  36 0006          B=6
01 5521  76 0205          CALL    INTEGT    ALTITD *2**-7 GAIN
01 5522  16 0207          ALTCOR(B)=L-ALTNCR+ALTBCR
01 5523  14 0210
01 5524  45 0433
```

********************************

T.A.S. FILTER

```
01 5525  13 0475          L=SINTHT(B)*COSPHI(B)*2A-17
01 5526  25 0476
01 5527  50 4321
01 5530  45 0322          DMTX13(B)=L
01 5531  25 0457          L=L+ACCELZ(B)
01 5532  50 7400          T=A
01 5533  13 0475          L=SINTHT(B)*SINPHI(B)*2A-17
01 5534  25 0477
01 5535  50 4321
01 5536  45 0321          DMTX12(B)=L
01 5537  25 0250          L=L+ACCY1A(B)+T
01 5540  50 0106
01 5541  50 7400          T=A
01 5542  13 0247          L=ACCX1A(B)+DMTX11(B)+T*2A1
01 5543  25 0320
01 5544  50 0106
01 5545  50 4701
01 5546  47 0434          VDTLNG(B)=U      *2A7
01 5547  36 0001          B=1
01 5550  76 6603          CALL   APLCOK
01 5551  11 0310          IF     U,DUALFG(B):=:0 THEN VTASC4
01 5552  60 5557
01 5553  70 0002          APTOGA(B)=2
01 5554  45 0321
01 5555  13 0446          L=VAPTOG(B)
01 5556  34 5575          GO     VTASC1
01 5557  50 5101  VTASC4  IF     F,1=0     THEN VTASC2
01 5560  34 5562
01 5561  34 5567
01 5562  13 0437          IF     VTASHD(B):/=:0 THEN VTASC1
01 5563  63 5575
01 5564  13 0714          VTASHD(B)=VTASCF(B)
01 5565  45 0437
01 5566  34 5575          GO     VTASC1
01 5567  41 0437  VTASC2  VTASHD(B)=0
```

```
01 5570  12 2214          L=VTASAD
01 5571  11 0346          IF     U,WCW(B):=:0 THEN VTASC1
01 5572  60 5575
01 5573  45 0714          VTASCF(B)=L
01 5574  41 0715          INTOT9(B)=0
01 5575  17 0714  VTASC1  TEMP1=L-VTASCF(B)*2A3
01 5576  50 4603
01 5577  44 1776
01 5600  36 0011          B=9
01 5601  76 0205          CALL   INTFGT   INTOT9
01 5602  24 4140          L=L*KVCF2       K V C.F. 2*(2**18)
01 5603  46 1777          TEMP1A=U
01 5604  12 1776          L=TEMP1*KVCF1   K V C.F. 1*(2**18)
01 5605  24 4137
01 5606  50 0201          VDTTCF(B)=L,U+TEMP1A+VDTLNG(B)
01 5607  14 1777
01 5610  15 0434
01 5611  45 0435
01 5612  36 0010          B=8
01 5613  76 0205          CALL   INTEGT   VTASCF*2**-3 GAIN
01 5614  02 4225          IF     L:>=:VAPPTA THEN VTASC3
01 5615  65 5620
01 5616  12 4225          VTASCF(B)=VAPPTA
01 5617  45 0714
```

******************************

LOCAL LATERAL ACCELERATION

```
01 5620  13 0250  VTASC3  L=ACCY1A(B)+DMTX22(B)
01 5621  25 0324
```

```
01 5622  50 7400       T=A
01 5623  13 0457       L=ACCELZ(B)*DMTX23(B)+T*2A1
01 5624  25 0325
01 5625  50 0106
01 5626  50 4701
01 5627  47 0436       LATACC(B)=U

                 ***********************

                  TASK CHECK OFF

01 5630  13 0311       MKIT1A(B)=MKIT1A(B):XOR:BIT12
01 5631  53 4426
01 5632  45 0311
01 5633  13 0312       MKIT2A(B)=MKIT2A(B):XOR:BIT12
01 5634  53 4426
01 5635  45 0312
01 5636  55 5373       RETURN EUCFIL

                 NO REF:      FLAPOS
```

```
                        SECTOR
                 ******************************************************

                  RANGE AND COMMAND COMPUTATION WITH

                  COMPLEMENTARY FILTER

                  FOR LOCALIZER


                        MODIFY
                 INT024
                 LOCOVF
                 RAPS1A
                 TEMP1
                 YDDLOC
                 YDTLOC
                 YLOC
                 YLOCFL

                        REFER
                 BETA1A
                 BIT15
                 COSPSI
                 D12500
                 HRADIO
                 KSCALE
                 KYDL1A
                 KYLOC
                 LATACC
                 PITE1A
                 RALTFG
                 RNGEST
                 SCD573
                 SINPSI
                 TANGSN
                 VDTLNG
                 YDDTLM
                 YDTLM1
                 ZTW07

01 5637  00 0000  LOCERR  SUBRTN
01 5640  13 0500          L=COSPSI(B)*LATACC(B)
01 5641  25 0436
01 5642  50 7400          T=A
01 5643  13 0521          L=SINPSI(B)*VDTLNG(B)-T*2A1
```

RANGE AND COMMAND COMPUTATION WITH
COMPLEMENTARY FILTER
FOR LOCALIZER

```
01 5644  25 0434
01 5645  50 0107
01 5646  50 4701
01 5647  47 0406           YDDLOC(B)=U
01 5650  13 0265           IF     PITE1A(B):=:0 THEN LOCRG1
```

```
01 5651  61 5665
01 5652  71 7774           L=L-3
01 5653  65 5665           IF     L:>=:0   THEN LOCRG1
01 5654  13 0427           IF     RALTFG(B):/=:0 THEN LOCRG1
01 5655  63 5665
01 5656  11 0013           U=HRADIO(B)
01 5657  70 0000           L=0
01 5660  50 4304           L=A*2^-4/TANGSN+D12500
01 5661  26 4111
01 5662  14 4530
01 5663  02 4431           IF     L:<:BIT15 THEN LOCER1
01 5664  67 5666
01 5665  12 4431  LOCRG1   L=BIT15
01 5666  36 0030  LOCER1   B=24
01 5667  76 0141           CALL   ZTFLAG   RNGEST
01 5670  13 0252           L=BETA1A(B)
01 5671  11 0270           IF     U,RAPS1A(B):=:0 THEN LOCER2
01 5672  60 5674
01 5673  45 0576           LOCDVF(B)=L
01 5674  36 0001  LOCER2   B=1
01 5675  76 0141           CALL   ZTFLAG
01 5676  25 0625           L=L*RNGEST(B)*2^5/SCD573
01 5677  50 4705
01 5700  26 4166
01 5701  11 0270           IF     U,RAPS1A(B):=:0 THEN NORMLC
01 5702  60 5713
01 5703  45 0404           YLOC(B)=L
01 5704  45 0723           YLOCFL(B)=L
01 5705  13 0560           INTO24(B)=ZTWO7(B)*RNGEST(B)*2^8/SCD573
01 5706  25 0625
01 5707  50 4710
01 5710  26 4166
01 5711  45 0734
01 5712  13 0404           L=YLOC(B)
01 5713  17 0404  NORMLC   L=L-YLOC(B)
01 5714  11 0447           U=YDTLM1(B)
01 5715  76 0115           CALL   LIMT1A
01 5716  15 0404           YLOC(B)=L+YLOC(B)
01 5717  45 0404
01 5720  17 0723           L=L-YLOCFL(B)
01 5721  44 1776           TEMP1=L
01 5722  50 4205           L=L*2^-5+YDDLOC(B)
01 5723  15 0406
01 5724  36 0030           B=24
01 5725  76 0205           CALL   INTEGT
01 5726  14 1776           L=L+TEMP1
01 5727  11 0450           U=YDOTLM(B)
01 5730  76 0115           CALL   LIMT1A
01 5731  45 0405           YDTLOC(B)=L
01 5732  36 0017           B=15
01 5733  76 0205           CALL   INTEGT   YLOCFL
01 5734  41 0270           RAPS1A(B)=0
```

```
01 5735  13 0405          L=YDTLOC(B)*KYDL1A
01 5736  24 4107
01 5737  50 7400          T=A
01 5740  13 0404          L=YLOC(B)*KYLOC(B)+T
01 5741  25 0603
01 5742  50 0106
01 5743  50 0201          L=U*KSCALE*2A-14
01 5744  24 4110
01 5745  50 4316
01 5746  55 5637          RETURN LOCERR
```

```
                          SECTOR
                 ***************************************

                  VOR COMPLEMENTARY FILTER
                  FOR COMMAND COMPUTATION!

                          MODIFY
                 TEMP1
                 YDDVOR
                 YDTVOR
                 YVOR

                          REFER
                 COSPSI
                 INT019
                 INT027
                 KSCALE
                 KYDVOR
                 KYVOR
                 K1VORF
                 K2VORF
                 LATACC
                 SCD573
                 SINPSI
                 VDTLNG
                 VORBET
                 VORRNG
                 YVORFL

01 5747  00 0000  VORERR  SUBRTN
01 5750  13 0500          L=COSPSI(B)*LATACC(B)
01 5751  25 0436
01 5752  50 7400          T=A
01 5753  13 0501          L=SINPSI(B)*VDTLNG(B)-T*2A1
01 5754  25 0434
01 5755  50 0107
01 5756  50 4701
01 5757  47 0412          YDDVOR(B)=U      2**7 BITS/FT/SEC**2
01 5760  13 0413          L=VORRNG(B)*VORBET(B)*2A5/SCD573
01 5761  25 0414
01 5762  50 4705
01 5763  26 4166
01 5764  45 0410          YVOR(B)=L
01 5765  17 0730          TEMP1=L-YVORFL(B)
01 5766  44 1776
01 5767  36 0033          B=27
01 5770  76 0205          CALL    INTEGT     *2**7 OUTPUT
01 5771  12 1776          L=TEMP1*K2VORF
01 5772  24 4113
01 5773  50 0201          L=U+INT027(B)+YDDVOR(B)
01 5774  15 0737
```

```
01 5775  15 0412
01 5776  36 0023        B=19
01 5777  76 0205        CALL   INTEGT
01 6000  12 1776        L=TEMP1*K1VORF*2A-14
01 6001  24 4112
01 6002  50 4316
01 6003  15 0727        YDTVOR(B)=L+INTD19(B)
01 6004  45 0411
01 6005  36 0024        B=20
01 6006  76 0205        CALL   INTEGT   YVORFL
01 6007  13 0411        L=YDTVOR(B)*KYDVOR(B)*2A-2
01 6010  25 0026
01 6011  50 4302
01 6012  50 7400        T=A
01 6013  13 0730        L=YVORFL(B)*KYVOR+T
01 6014  24 4114
01 6015  50 0106
01 6016  50 0201        L=U*KSCALE*2A-12
01 6017  24 4110
01 6020  50 4314
01 6021  55 5747        RETURN VORERR
```

```
        SECTOR

*****************************************

   AIRDATA AND OTHER NECESSARY
  COMPUTATIONS

        MODIFY
ALPHA
AZALPH
CL
CLREF
DLOVRW
DYNPRS
FLAPPW
GAMMA
GNDYPR
HDCONT
HDDTRD
HDTHLD
HRADIO
HRADRW
HRDRW1
TEMP1
TEMP2
THTDLM
THTDMX
TOVRW
VTCDOT
WEIGHT

        REFER
ACCELZ
ACCX1A
ACCZ1A
ALTBCR
ALTNCR
BIT16
CLAEXT
CLARET
CLDE
CLIH
CLREF0
COSPHI
DEGONE
DEG10
DEG30
DEG50
DUALFG
```

```
D400
D1800
D5000
EIGHTY
ELRAMA
ELRAMB
FLAPOS
FREQ
HDDOT
HDOTF
HDTLIM
HDTRAD
HRDC1A
HRDF1A
KACCX
KCLFLP
KTOVRW
KVCF1
KVCF2
K1AZAL
K2AZAL
K1CL
K2CL
K1CL0
K2CL0
K2HDRD
K1LOVW
K2LOVW
MAXDYN
MINDYN
NZMAX
ONEG
RALTFG
RHOTBL
RHOTB1
SCD573
SINTHT
STABPS
SWINGA
TEN
THET1A
THTO1A
TWOFST
VARIDX
VCASAD
VDTLNG
VTASCF
VTASCT
VTASAD
WGTNOM
WOW4
ZERO
```

```
                    ZTF02
                    ZTF022


01 6022   00 0000   AIRDAT   SUBRTN
01 6023   13 0255            L=HRDC1A(B)*2^2
01 6024   50 4602
01 6025   11 0427            IF      U,RALTFG(B):=:0 THEN AIRDT1
01 6026   60 6030
01 6027   45 0613            HRADIO(B)=L
01 6030   02 4521   AIRDT1   IF      L:>=:D1800 THEN STRADH
01 6031   65 6033
01 6032   13 0254            L=HRDF1A(B)
01 6033   45 0422   STRADH   HRADRW(B)=L

                    ***********************************************
```

RADIO ALTITUDE

COMPLEMENTARY FILTER

```
01 6034  50 4603           U=L,L*2A3
01 6035  52 0200
01 6036  13 0432           IF     HDCONT(B):=:FREQ THEN HRADC1
01 6037  02 4162
01 6040  61 6047
01 6041  71 0001           HDCONT(B)=L+1
01 6042  45 0432
01 6043  50 0201           L=U-HRDRW1(B)
01 6044  17 0430
01 6045  61 6061           IF     L:=0    THEN OLDHDT
01 6046  34 6051           GO     HRADC2
01 6047  50 0201   HRADC1  L=U-HRDRW1(B)    2A5
01 6050  17 0430
01 6051  47 0430   HRADC2  HRDRW1(B)=U
01 6052  10 4131           U=HDTLIM         2A5
01 6053  76 0115           CALL   LIMT1A
01 6054  24 4510           HDTHLD(B)=L*EIGHTY/HDCONT(B)
01 6055  27 0432
01 6056  45 0431
01 6057  41 0432           HDCONT(B)=0
01 6060  34 6062           GO     HRADC3
01 6061  13 0431   OLDHDT  L=HDTHLD(B)      2A7
01 6062  17 0716   HRADC3  L=L-HDTRAD(B)    2A7
01 6063  36 0002           B=2
01 6064  76 0141           CALL   ZTFLAG    ZTF02
01 6065  36 0014           B=12
01 6066  76 0205           CALL   INTEGT    INTDT12
01 6067  24 4132           L=L*K2HDRD       2**19
01 6070  50 0201           HDDTRD(B)=L,U+ZTF02(B)*2A-1+HDDOT(B)
01 6071  15 0577
```

```
01 6072  50 4201
01 6073  15 0424
01 6074  45 0423
01 6075  36 0012           B=10
01 6076  76 0205           CALL   INTEGT    HDTRAD
01 6077  50 4207           L=L*2A-7+HRADRW(B)
01 6100  15 0422
01 6101  36 0016           B=14
01 6102  76 0141           CALL   ZTFLAG    HRADIO
```

******************************************

FLIGHT PATH

ANGLE COMPUTATION

```
01 6103  11 0711           U=HDDTF(B)*2A-3
01 6104  53 4103
01 6105  13 0714           L=VTASCF(B)
01 6106  76 0051           CALL   ASIN1A
01 6107  45 0460           GAMMA(B)=L
01 6110  50 6100           ALPHA(B)=-L+THET1A(B)*1*2A17/COSPHI(B)
01 6111  15 0245
01 6112  50 0307
01 6113  50 4721
01 6114  27 0476
01 6115  45 0461
01 6116  12 0207           L=ALTNCR
01 6117  50 5101           IF     F,1=0    THEN AIRDT3
01 6120  34 6122
01 6121  34 6123
```

-continued

FLIGHT PATH

ANGLE COMPUTATION

```
01 6122  70 0000  AIRDT2  L=0
01 6123  50 0307  AIRDT3  L=L*1/D5000
01 6124  26 4526
01 6125  65 6127          IF      L:>=:0    THEN AIRDT4
01 6126  70 0000          L=0
01 6127  02 4660  AIRDT4  IF      L:<:TEN   THEN AIRDT5
01 6130  67 6132
01 6131  70 0011          L=9
01 6132  50 0202  AIRDT5  B=L
01 6133  13 4143          TEMP1=RHOT01(B)-RHOTBL(B)
01 6134  17 4142
01 6135  44 1776
01 6136  50 0201          L=U
01 6137  65 6141          IF      L:>=:0    THEN AIRDT6
01 6140  70 0000          L=0
01 6141  24 1776  AIRDT6  L=L*TEMP1/D5000+RHOTBL(B)
01 6142  26 4526
01 6143  15 4142          B=VARIDX
01 6144  32 2517          L=L+VTASCT(B)
01 6145  25 0725
```

```
01 6146  50 0201          DYNPRS(B)=L,U*VTASCT(B)/D400
01 6147  25 0725
01 6150  26 4515
01 6151  45 0462
01 6152  02 4007          IF      L:>=:MINDYN THEN AIRDT7
01 6153  65 6155
01 6154  12 4007          L=MINDYN
01 6155  02 4010  AIRDT7  IF      L:<:MAXDYN THEN AIRDT8
01 6156  67 6160
01 6157  12 4010          L=MAXDYN
01 6160  45 0443  AIRDT8  GNDYPR(B)=L
01 6161  13 2424          L=-HDDOT(B)*SCD573*2^-3/VTASCT(B)+THTD1A(B)
01 6162  50 6100
01 6163  24 4166
01 6164  50 4303
01 6165  27 0725
01 6166  15 0244
01 6167  50 0301          ABSVAL
01 6170  36 0026          B=22
01 6171  76 2141          CALL    ZTFLAG
01 6172  50 0500          L=A,NZMAX(B)/VTASCT(B)+ZTF022(B)
01 6173  03 0502
01 6174  27 0725
01 6175  15 0623
01 6176  45 0464          THTOMX(B)=L
01 6177  10 4500          U=ZERO
01 6200  26 4162          THTOLM(B)=A/FREQ
01 6201  45 0465
```

********************************

CALIBRATED A/S AND TRUE A/S RATES

```
01 6202  13 0475          L=SINTHT(B)*ONEG*2^-17
01 6203  24 4165
01 6204  50 4321
01 6205  10 0212          L=VCAS40
01 6206  50 4502          LRTAU   2
01 6207  50 6100          L=-L+ACCX1A(B)+U
01 6210  15 0247
01 6211  50 0101
01 6212  36 0016          B=14
```

```
1H196 SCAMP                          SECTION     150     PAGE     412
                                     -continued

                        CALIBRATED A/S AND TRUE A/S RATES

 01 6213   76 0162         CALL    ZTF+0     VCASOT
 01 6214   12 0214         TEMP1=VTASAD-VTASCT(B)*2A3
 01 6215   17 0725
 01 6216   50 4603
 01 6217   44 1776
 01 6220   36 0022         B=18
 01 6221   75 0205         CALL    INTEGT    INTU18
 01 6222   24 4140         L=L+KVCF2
 01 6223   46 2000         TEMP2=0


 16196 SCAMP                          SECTION     150     PAGE     413

 01 6224   12 1776         L=TEMP1+KVCF1
 01 6225   24 4137
 01 6226   50 0201         VTCDOT(B)=L,U+TEMP2+VDTLNG(B)
 01 6227   14 2000
 01 6230   15 0434
 01 6231   45 0507
 01 6232   36 0021         B=17
 01 6233   76 0205         CALL    INTEGT    VTASCT

                  *************************

                  DELTA LIFT/WEIGHT RATIO

 01 6234   13 0247         L=ACCX1A(B)*KACCX
 01 6235   24 5160
 01 6236   50 7400         T=A
 01 6237   13 0251         L=ACCZ1A(B)*1*2A16+T
 01 6240   50 0307
 01 6241   50 4720
 01 6242   50 0106
 01 6243   50 7400         T=A
 01 6244   13 0457         AZALPH(B)=ACCELZ(B)*ALPHA(B)/SCD573*2A1
 01 6245   25 0461
 01 6246   26 4166
 01 6247   50 4601
 01 6250   45 0517
 01 6251   12 0201         FLAPPW(B)=FLAPOS*1*2A17/DEG50
 01 6252   50 0307
 01 6253   50 4721
 01 6254   26 4574
 01 6255   45 0510
 01 6256   24 5156         L=L*K1AZAL*2A-17
 01 6257   50 4321
 01 6260   14 5157         L=L+K2AZAL*AZALPH(B)-T/ONEG
 01 6261   25 0517
 01 6262   50 0107
 01 6263   26 4165
 01 6264   10 4432         U=B1116
 01 6265   76 0115         CALL    LIFT1A
 01 6266   45 0511         DLOVRW(B)=L

                  ******************************

                  COEFFICIENT OF LIFT

 01 6267   12 0065         L=STABPS*CLIH
 01 6270   24 5205
 01 6271   50 7400         T=A
 01 6272   12 0170         L=ELRAMA+ELRAMB*2A-1*CLOE+T
 01 6273   14 0171
```

```
01 6274  50 4201
01 6275  24 5206
01 6276  50 0106
01 6277  50 7400          T=A
01 6300  10 5204          U=CLARET
01 6301  12 0201          IF      FLAPOS:<:DEGONE THEN LOK+2
01 6302  02 4550
01 6303  67 6305
01 6304  10 5203          U=CLAEXT
01 6305  50 0201          L=U*ALPHA(B)
01 6306  25 0401
01 6307  50 0106          T=A+T
01 6310  50 7400
01 6311  36 0000          B=0
01 6312  12 0201          IF      FLAPOS:<:DEG10 THEN CLIFT3
01 6313  02 4561
01 6314  67 6321
01 6315  02 4571          IF      L:<:DEG30 THEN CLIFT2
01 6316  67 6320
01 6317  36 0001          B=1
01 6320  37 0001  CLIFT2  B=B+1
01 6321  25 5207  CLIFT3  L=L*K1CL0(B)+T*2A-14
01 6322  50 0106
01 6323  50 4316
01 6324  15 5212          L=L+K2CL0(B)
01 6325  32 2517          B=VARIDX
01 6326  43 0515          CL(B)=L

                  *********************************

                  THRUST/WEIGHT RATIO ESTIMATION

01 6327  13 0510          L=FLAPPW(B)*2A-2+K1LOVW*K2LOVW
01 6330  50 4202
01 6331  14 5161
01 6332  24 5162
01 6333  50 0201          L=U*DLOVRW(B)
01 6334  25 0511
01 6335  50 7400          T=A
01 6336  13 0510          L=FLAPPW(B)*2A-2+K1CL*K2CL
01 6337  50 4202
01 6340  14 5163
01 6341  24 5164
01 6342  50 0201          L=U*CL(B)*2A1+T
01 6343  25 0515
01 6344  50 4701
01 6345  50 0106
01 6346  46 1776          TEMP1=U
01 6347  13 0247          TOVRW(B)=ACCX1A(B)-AZALPH(B)*1*2A18/ONEG+TEMP1
01 6350  17 0517
01 6351  50 2307
```

```
01 6352  50 4720
01 6353  26 4165
01 6354  14 1776
01 6355  45 0512

                  **********************************

                  WEIGHT APPROXIMATION

01 6356  13 0511          TEMP1=DLOVRW(B)+BIT16
01 6357  14 4432
01 6360  44 1776
01 6361  13 0515          L=CL(B)*DYNPRS(B)/TEMP1*SWINGA*2A-8
01 6362  25 0462
01 6363  26 1776
```

```
                WEIGHT APPROXIMATION

01 6364  24 4211
01 6365  50 4310
01 6366  11 0350        IF     U,WOW4(B)I=10 THEN LOK+2
01 6367  60 6371
01 6370  12 4155        L=WGTNOM
01 6371  17 0745        L=L-WEIGHT(B)
01 6372  36 0041        B=33
01 6373  76 0205        CALL   INTEGT

                 ***********************************

                 COEFFICIENT OF LIFT REFERENCE

01 6374  13 0512        L=TOVRW(B)-TWOFST
01 6375  16 5166
01 6376  67 6402        IF     L:<10    THEN CLREF1-1
01 6377  24 5167        L=L*KTOVRW*2^-17
01 6400  50 4321
01 6401  34 5403        GO     CLREF1
01 6402  70 0000        L=0
01 6403  14 5165 CLREF1 TEMP1=L+CLREF0
01 6404  44 1776
01 6405  12 4574        TEMP2=DEG50-FLAPOS
01 6406  16 0201
01 6407  44 2000
01 6410  24 2000        CLREF(B)=L+TEMP2/KCLFLP+TEMP1
01 6411  26 5170
01 6412  14 1776
01 6413  45 0513
                 *******************************

                 VCAS LAGGED RATE AND LAGGED HDOT FOR FLAP DEPLOYMENT

01 6414  12 0212        L=VCASAD*2^3
```

```
01 6415  50 4603
01 6416  36 0312        B=10
01 6417  76 0162        CALL   ZTFWO
01 6420  13 0711        L=HDOTF(B)
01 6421  36 0024        B=20
01 6422  76 0141        CALL   ZTFLAG
01 6423  55 6022        RETURN AIRCAT

                 NO REF:     DUALFG
                 NO REF:     ALTBCR
```

```
                     SECTOR
                 *********************************************

                   THETA LIFT COMPENSATION


                     MODIFY
                 ALFAZ
                 COSPHC
                 INTO13
                 TEMP1
                 THETAL
                 ZTFIP5
```

THETA LIFT COMPENSATION

```
                    REFER
ALPHA
COS0
DEG5
DEG20
DLOVRW
FLAPOS
INCPT1
KTKOFF
PHICOM
TDFLAG
VARIDX
VDTTCF
VTASCF
WOW
ZTWO5

01 6424  00 0000  THETLC  SUBRTN
01 6425  13 0316          IF     TDFLAG(B)$/=$10 THEN XITTLC
01 6426  63 6511
01 6427  13 3334          L=PHICOM(B)
01 6430  76 0000          CALL    SINCOS
01 6431  50 0700          COSPHC(B)=A
01 6432  03 0472
01 6433  36 0001          B=1
01 6434  12 0201          IF     FLAPOS$>=$DEG20 THEN LINE
01 6435  02 4564
01 6436  65 6442
01 6437  36 0000          B=0
01 6440  02 4556          IF     L$<$DEG5 THEN NOMINL
01 6441  67 5446
01 6442  25 4156  LINE    L=L*KTKOFF(B)
01 6443  50 0201          L=U+INCPT1(B)
01 6444  15 4160
01 6445  34 6447          GO     THETL1
01 6446  70 4426  NOMINL  L=-2.43DEG
01 6447  32 2517  THETL1  B=VARIDX
```

```
01 6450  45 0442          ALFAZ(B)=L
01 6451  11 0346          IF     U,WOW(B)$=$10 THEN THETL2
01 6452  60 6457
01 6453  45 3532          ZTFIP5(B)=L
01 6454  41 0721          INT013(B)=0
01 6455  41 0471          THETAL(B)=0
01 6456  34 6511          GO     XITTLC
01 6457  36 0005  THETL2  B=5
01 6460  76 0152          CALL   ZTFWO
01 6461  13 0472          L=COSPHC(B)-COS0*ALFAZ(B)*2A-17
01 6462  16 5515
01 6463  25 0442
01 6464  50 4321
01 6465  15 0556          THETAL(B)=L+ZTWO5(B)
01 6466  45 0471
01 6467  13 2442          TEMP1=ALFAZ(B)-ALPHA(B)+VDTTCF(B)*2A1/VTASCF(B)
01 6470  17 0461
01 6471  25 0435
01 6472  50 4701
01 6473  27 0714
01 6474  44 1776          L=L*DLOVRW(B)*2A-16
01 6475  25 0511
01 6476  50 4320          TEMP1=L+TEMP1
01 6477  14 1776
01 6500  44 1776          L=-INT013(B)*2A-4+TEMP1
01 6501  13 0721
01 6502  50 6100
```

```
 18196 SCAMP                          SECTION      151      PAGE      418
                                      -continued

 01 6503   50 4204
 01 6504   14 1776
 01 6505   36 0015            B=13
 01 6506   76 0205            CALL    INTEGT
 01 6507   15 0471            THETAL(B)=L+THETAL(B)
 01 6510   45 0471
 01 6511   55 6424   XITTLC   RETURN THETLC

 18196 SCAMP                          SECTION      152      PAGE      419

                              SECTOR

                     **********************************

                     AT/SC FGS PITCH COMMAND


                              MODIFY
                     KMDE13
                     TEMP1
                     THTFGS

                              REFER
                     APTOGA
                     AUTO1A
                     BITN17
                     CL
                     CLREF
                     DEG15
                     DEG22
                     KTCMCL
                     KTCMV
                     KTHTWO
                     LIFTOF
                     P15B15
                     P30B15
                     THET1A
                     THTMPL
                     THTWOF
                     VARIDX
                     VCASDT
                     VTCDOT

 01 6512   00 0300   FGSPCM   SUBRTN
 01 6513   13 0513            U=L,CLREF(H)-CL(B)
 01 6514   17 0515
 01 6515   50 0200
 01 6516   16 5136            L=L-P15B15
 01 6517   67 6532            IF     L:<10    THEN FGSPC1
 01 6520   50 4501            LRTAU  1
 01 6521   16 5137            L=L-P30B15
 01 6522   65 6532            IF     L:>=10   THEN FGSPC1
 01 6523   46 1776            TEMP1=U
 01 6524   50 0307            A=L-1*2A15/P30B15+BITN17*TEMP1*2A2
 01 6525   50 4717
 01 6526   26 5137
 01 6527   14 4455
 01 6530   24 1776
 01 6531   50 4702
 01 6532   50 0201   FGSPC1   L=U*KTCMCL*2A3
 01 6533   24 5171

 18196 SCAMP                          SECTION      152      PAGE      420

 01 6534   50 4703
 01 6535   46 1776            TEMP1=U
 01 6536   13 0567            L=VCASDT(B)+VTCDOT(B)*KTCMV*2A-16
 01 6537   15 0507
```

-continued

```
01 6540  24 5172
01 6541  50 4320
01 6542  14 1776          TEMP1=L+TEMP1
01 6543  44 1776
01 6544  13 0245          L=THET1A(B)-THTMPL(B)
01 6545  17 0514
01 6546  67 6550          IF      L:<:0     THEN FGSPC2
01 6547  70 0000          L=0
01 6550  15 0245  FGSPC2  TEMP1=L+THET1A(B)+TEMP1
01 6551  14 1776
01 6552  44 1776
01 6553  11 0260          IF      U,AUTO1A(B):=:0 THEN FGSPC4
01 6554  60 6567
01 6555  13 2522          IF      LIFTOF(B):/=:0 THEN FGSPC3
01 6556  63 6561
01 6557  12 5174          KWOE13(B)=THTWOF
01 6560  45 0771
01 6561  13 0245  FGSPC3  L=THET1A(B)
01 6562  36 0015          B=13
01 6563  75 0162          CALL    ZTFWO
01 6564  24 5173          L=L*KTHTWO*2A-17
01 6565  50 4321
01 6566  14 1776          L=L+TEMP1
01 6567  11 0521  FGSPC4  U=APTOGA(B)
01 6570  36 7776          B=-1
01 6571  50 0105          U=U+B
01 6572  62 6575          IF      U:/=:0    THEN FGSPC5
01 6573  10 4565          U=DEG22
01 6574  34 6576          GO      LCK+2
01 6575  10 4562  FGSPC5  U=DEG15
01 6576  32 2517          B=VARIDX
01 6577  76 0115          CALL    LIMT1A
01 6600  17 0245          THTFGS(B)=L-THET1A(B)
01 6601  45 0505
01 6602  55 6512          RETURN FGSPCM
```

```
                          SECTOR
                  ***********************************

                  APPROACH SPEED TABLE LOOKUP

                          ENTER WITH : U=FLAP POSITION
                                  AND B=0 FOR T/O OR G/A
                                 B=1 FOR APP/SLATS NORM:


                          MODIFY
                  TEMP1
                  TEMP1A
                  TEMP2
                  VAPTOG

                          REFER
                  ADR0
                  ADR1
                  FLAPIX
                  FLAPOS
                  K1INDX
                  K2INDX
                  VARIDX
                  WEIGHT

01 6603  00 0000  APLOOK  SUBRTN
01 6604  50 6507          SETFL   7
01 6605  13 4577          TEMP2=FLAPIX(B)
01 6606  44 2000
01 6607  50 7202          ENTICR 2
01 6610  50 0202          P=L+5
```

```
                         APPROACH SPEED TABLE LOOKUP

                                ENTER WITH : U=FLAP POSITION
                                       AND B=0 FOR T/O OR G/A
                                       B=1 FOR APP/SLATS NORM:

01 6611  37 0005
01 6612  12 0201          L=FLAPOS
01 6613  03 0000          CMALB  0
01 6614  64 6617          JPMLEQ LOK+3
01 6615  50 6407          CLRFL  7
01 6616  73 6613          BJP    LOK-3
01 6617  17 0000          U=L,L=ADR0(B)
01 6620  50 0200
01 6621  13 0001          TEMP1=ADR1(B)-ADR0(B)
01 6622  17 0000
01 6623  44 1776
01 6624  70 0000          L=0
01 6625  50 4301          TEMP1=A*2A-1/TEMP1
01 6626  26 1776
01 6627  44 1776
01 6630  50 0203          TEMP2=L,B=TEMP2
01 6631  16 2000
01 6632  44 2000
01 6633  50 7201          ENTICR 1
01 6634  15 4615          L=L+K1INDX(B)
```

```
01 6635  50 7202          ENTICR 2
01 6636  50 0202          B=L
01 6637  13 0001          L=ADR1(B)-ADR0(B)*TEMP1*2A-17
01 6640  17 0000
01 6641  24 1776
01 6642  50 4321
01 6643  50 5107          SKPNFL 7
01 6644  70 0000          L=0
01 6645  15 0000          TEMP1A=L+ADR0(B)
01 6646  44 1777
01 6647  50 7201          ENTICR 1
01 6650  13 4017          B=L,K2INDX(B)+TEMP2
01 6651  14 2000
01 6652  50 0202
01 6653  13 0001          L=ADR1(B)-ADR0(B)*TEMP1*2A-17
01 6654  17 0000
01 6655  24 1776
01 6656  50 4321
01 6657  50 5107          SKPNFL 7
01 6660  70 0000          L=0
01 6661  15 0000          L=L+ADR0(B)
01 6662  32 2517          B=VARIDX
01 6663  25 0745          L=L*WEIGHT(B)*2A-21
01 6664  50 4325
01 6665  14 1777          VAPTOG(B)=L+TEMP1A
01 6666  45 0446
01 6667  55 6003          RETURN APLOOK
```

```
                  SECTOR
          *****************************************

            TAKEOFF GO-AROUND AIRSPEED REFERENCE

                  MODIFY
          TEMP1
          VAPTOG
```

```
                    TAKEOFF GO-AROUND AIRSPEED REFERENCE

                            REFER
                    TEMP2
                    VARIDX
                    VMCGBI
                    VMCGB1
                    VMCGSL
                    WEIGHT
                    WGT260

01 6670  00 0000  TOGARF  SUBRTN
01 6671  36 0000          B=0
01 6672  76 6003          CALL    APLOOK
01 6673  12 2000          L=TEMP2-3
01 6674  71 7774
01 6675  67 6716          IF      L<=0     THEN TOGAR2
01 6676  50 0202          B=L
01 6677  13 4652          L=VMCGB1(B)-VMCGBI(B)*TEMP1*2A-17
01 6700  17 4651
01 6701  24 1776
01 6702  50 4321
01 6703  15 4651          TEMP1=L+VMCGBI(B)
01 6704  44 1776
01 6705  32 2517          B=VARIDX
01 6706  13 0745          L=WEIGHT(B)-WGT260*VMCGSL
01 6707  16 4655
01 6710  24 4654
01 6711  50 0201          L=U+TEMP1
01 6712  14 1776
01 6713  03 0446          IF      L<=VAPTOG(B) THEN LOK+2
01 6714  67 6716
01 6715  45 0446          VAPTOG(B)=L
01 6716  55 6670  TOGAR2  RETURN TOGARF
```

```
                            SECTOR
                    ***************************************

                    THRUST RATING SUBRTN

                            THRUST RATING LOGIC

                            MODIFY
                    N1LIMT
                    TEMP1
                    TEMP1A
                    TEMP2
                    TEMP2A

                            REFER
                    ABSTMP
                    ACPCK2
                    ACPCK3
                    ALTNCR
                    CBXY3
                    CNHX5
                    EAIFL
                    ISOV2
                    ISOV3
                    NACPKS
                    NBLSRC
                    THRTLM
                    TOTEMP
                    WAIFL

01 6717  30 0000  THRSTR  SUBRTN
```

THRUST RATING SUBRTN

BLEED AIR CORRECTION FACTOR COMPUTATION

```
01 6720   50 6407             CLRFL   7
01 6721   50 6406             CLRFL   6
01 6722   36 0000             B=0
01 6723   40 1777             TEMP1A=0
01 6724   12 2023             IF      EAIFL:/=:0 THEN THIRD8
01 6725   63 6727
01 6726   36 0024             B=20
01 6727   13 5215   THIRD8    L=CBXY3(B)+ALTNCR*2A-16
01 6730   24 0207
01 6731   50 4320
01 6732   37 0001             B=B+1
01 6733   15 5215             L=L+CBXY3(B)+ALTNCR*2A-16
01 6734   24 0207
01 6735   50 4320
01 6736   37 0001             B=B+1
01 6737   15 5215             L=L+CBXY3(B)+ALTNCR*2A-16
01 6740   24 0207
```

```
01 6741   50 4320
01 6742   37 0001             B=B+1
01 6743   15 5215             L=L+CBXY3(B)+TEMP1A
01 6744   14 1777
01 6745   50 5106             IF      F,6=1      THEN FINISH
01 6746   34 7021
01 6747   44 1777             TEMP1A=L
01 6750   50 5107             IF      F,7=1      THEN ACPACK
01 6751   34 6770
01 6752   50 6507             SETFL   7
01 6753   36 0000             B=0
01 6754   12 2024             IF      WAIFL:=:0 THEN THIRD8
01 6755   61 6727
01 6756   12 2016             IF      NBLSRC:=:0 THEN THIRD8
01 6757   61 6727
01 6760   36 0020             B=16
01 6761   71 7776             L=L-1
01 6762   61 6727             IF      L:=:0      THEN THIRD8
01 6763   71 7776             L=L-1+ISOV3
01 6764   14 2020
01 6765   61 6727             IF      L:=:0      THEN THIRD8
01 6766   36 0014             B=12
01 6767   34 6727             GO      THIRD8
01 6770   50 6506   ACPACK    SETFL   6
01 6771   36 0010             B=8
01 6772   10 2016             IF      U,NBLSRC:=:0 THEN THIRD8
01 6773   60 6727
01 6774   36 0000             B=0
01 6775   12 2015             L=NACPKS-2
01 6776   71 7775
01 6777   67 6727             IF      L:<:0      THEN THIRD8
01 7000   50 0001             SWAP    U,L
01 7001   71 7776             L=L-1
01 7002   61 7017             IF      L:=:0      THEN EQ8
01 7003   71 7776             L=L-1
01 7004   63 6727             IF      L:/=:0     THEN THIRD8
01 7005   62 7017             IF      U:/=:0     THEN EQ8
01 7006   12 2020             IF      ISOV3:/=:0 THEN ACPCK1
01 7007   63 7013
01 7010   12 2021             IF      ACPCK2:=:0 THEN THIRD8
01 7011   61 6727
01 7012   34 7017             GO      EQ8
01 7013   12 2017   ACPCK1    IF      ISOV2:/=:0 THEN THIRD8
01 7014   63 6727
01 7015   12 2022             IF      ACPCK3:=:0 THEN THIRD8
01 7016   61 6727
```

```
01 7017  36 0004  EQB     B=4
01 7020  34 6727          GO      THIRDB
01 7021  50 4203  FINISH  TEMP1A=L*2^-3
01 7022  44 1777
```

THRUST RATING CALCULATION

```
01 7023  50 6407          CLRFL  7
01 7024  12 0215          TEMP2=SQR(TOTEMP*1*2^14+ABSTMP)
01 7025  50 0307
01 7026  50 4716
01 7027  20 4170
01 7030  50 7700
01 7031  44 2000
01 7032  32 2025          B=THRTLM
01 7033  37 0020          B=B+16
01 7034  12 0207          L=ALTNCR
01 7035  03 5245          IF      L:<:CNHX5(B)  THEN HPX1
01 7036  67 7045
01 7037  37 0002          B=B+2
01 7040  15 5245          TEMP1=L+CNHX5(B)
01 7041  44 1776
01 7042  37 7763          B=B-12
01 7043  70 0000          L=0
01 7044  34 7061          GO      THIRD
01 7045  37 0001  HPX1    B=B+1
01 7046  15 5245          TEMP1=L+CNHX5(B)
01 7047  44 1776
01 7050  37 7756          B=B-17
01 7051  13 5245  FIFTH   L=CNHX5(B)*TEMP1*2^-15
01 7052  24 1776
01 7053  50 4317
01 7054  37 0001          B=B+1
01 7055  15 5245          L=L+CNHX5(B)*TEMP1*2^-15
01 7056  24 1776
01 7057  50 4317
01 7060  37 0001          B=B+1
01 7061  15 5245  THIRD   L=L+CNHX5(B)*TEMP1*2^-15
01 7062  24 1776
01 7063  50 4317
01 7064  37 0001          B=B+1
01 7065  15 5245          L=L+CNHX5(B)*TEMP1*2^-15
01 7066  24 1776
01 7067  50 4317
01 7070  37 0001          B=B+1
01 7071  15 5245          L=L+CNHX5(B)*TEMP1*2^-15
01 7072  24 1776
01 7073  50 4317
01 7074  37 0001          B=B+1
01 7075  15 5245          L=L+CNHX5(B)
01 7076  32 2025          B=THRTLM
01 7077  50 5107          IF      F,7=1     THEN FINAL
01 7100  34 7111
01 7101  44 2001          TEMP2A=L
01 7102  50 6507          SETFL  7
01 7103  12 0215          L=TOTEMP
01 7104  37 0023          B=B+19
01 7105  15 5245          TEMP1=L+CNHX5(B)
```

```
01 7106  44 1776
01 7107  37 7756          B=B-9
01 7110  34 7051          GO      FIFTH
01 7111  02 2001  FINAL   IF      L:<:TEMP2A THEN FINAL1
01 7112  67 7114
01 7113  12 2001          L=TEMP2A
01 7114  24 2000  FINAL1  L=L*TEMP2*2^-13
01 7115  50 4315
01 7116  14 1777          N1LIMT=L+TEMP1A
01 7117  44 2026
01 7120  55 6717          RETURN THRSTR
```

```
                          START  040000
                    ***********************************

                     GENERATES INDICES AND INTERPOLATION FACTORS

                          MODIFY
                    INCFST
                    IDXFST
                    TEMP41
                    TEMP42

                          REFER
                    ADR0
                    ADR1
                    ENDAFS
                    NOINDX
                    TABAFS
                    VARFST

04 0000   00 0000  FASTIX  SUBRTN
04 0001   50 7300          CLRSR
04 0002   32 4000          B=NOINDX-1        NUMBER OF INDICES
04 0003   37 7776
04 0004   13 4007  FASTX3  U=L,VARFST(B)-1   VARIABLE ADDRESS
04 0005   71 7776
04 0006   50 0200
04 0007   13 4021          TEMP41=ENDAFS(B)   TABLE END ADRS-1
04 0010   44 3000
04 0011   13 4014          TEMP42=TABAFS(B)   TABLE START ADRS
04 0012   44 3001
04 0013   15 3003          L=L+IDXFST(B)      INDEX
04 0014   50 7202          B(2)=L
04 0015   50 0202
04 0016   50 3003          SWAP    U,B
04 0017   13 0000  VAREFS  L=ADR0(B)
04 0020   50 0204          B=U
04 0021   03 0000          IF      L:>=:ADR0(B) THEN FASTX1
04 0022   65 0030
04 0023   56 3001          RSK     TEMP42
04 0024   34 0026          GO      LCK+2
04 0025   34 0035          GO      FASTX2
04 0026   37 7775          B=B-2
04 0027   34 0021          GO      VAREFS+2
04 0030   03 0001  FASTX1  IF      L:<=:ADR1(B) THEN FASTX2
04 0031   61 7035
04 0032   67 0035
04 0033   56 3000          RSK     TEMP41
04 0034   34 0030          GO      FASTX1
04 0035   17 0000  FASTX2  U=L,L-ADR0(B)
04 0036   50 0200
```

```
04 0037   13 3001          TEMP41=ADR1(B)-ADR0(B)
04 0040   17 0000
04 0041   44 3000
04 0042   70 0000          L=0
04 0043   50 4302          A=A*2A-2/TEMP41
04 0044   26 3000
04 0045   50 2202          U=L
04 0046   50 0203          L=L,B-TEMP42
04 0047   16 3001
04 0050   50 7201          IDXFST(1)=L
04 0051   45 3003
04 0052   47 3010          INCFST(B)=U
04 0053   73 0004          BJP     FASTX3
04 0054   50 7343          SETSR   3
04 0055   55 0000          RETURN  FASTIX
```

```
                SECTOR
            ***********************************

             SINGLE TABLE LOCK UP

                       AL=12 BIT START ADRS+INDEX
                       AU=INTERPOLATION FRACTION*2^16


                       MODIFY
            TEMP41

                       REFER
            ADRMS4
            ADRØ
            ADR1


Ø4 ØØ56  ØØ ØØØØ  TABLE1  SUBRTN
Ø4 ØØ57  5Ø 73ØØ          CLRSR
Ø4 ØØ6Ø  52 4ØØ1          L=L:AND:ADRMS4
Ø4 ØØ61  5Ø 72Ø2          B(2)=L
Ø4 ØØ62  5Ø Ø2Ø2
Ø4 ØØ63  46 3ØØØ          TEMP41=U
Ø4 ØØ64  13 ØØØ1          L=ADR1(B)-ADRØ(B)*TEMP41*2^-16
Ø4 ØØ65  17 ØØØØ
Ø4 ØØ66  24 3ØØØ
Ø4 ØØ67  5Ø 432Ø
Ø4 ØØ7Ø  15 ØØØØ          L=L+ADRØ(B)
Ø4 ØØ71  5Ø 72Ø1          ENTICR 1
Ø4 ØØ72  5Ø 7343          SETSR  3
Ø4 ØØ73  55 ØØ56          RETURN TABLE1
```

```
                SECTOR
            ***********************************

             DOUBLE TABLE LOCK-UP

                       AL=12 BIT ADRS OF MOST COMMON INDEX
                       AU=12 BIT ADRS OF LEAST COMMON INDEX
                       B=12 BIT START ADRS OF TABLE


                       MODIFY
            TEMP41
            TEMP42
            TEMP43

                       REFER
            ADRMS4
            ADRØ
            ADR1
            ADR2
            NOINDX


Ø4 ØØ74  ØØ ØØØØ  TABLE2  SUBRTN
Ø4 ØØ75  5Ø 73ØØ          CLRSR
Ø4 ØØ76  52 4ØØ1          L=L:AND:ADRMS4
Ø4 ØØ77  5Ø 72Ø2          B(2)=L            MC INDEX
Ø4 Ø1ØØ  5Ø Ø2Ø2
Ø4 Ø1Ø1  5Ø 72Ø3          B(3)=L,L+NOINDX   MC IF
Ø4 Ø1Ø2  14 4ØØØ
Ø4 Ø1Ø3  5Ø 72Ø3
Ø4 Ø1Ø4  5Ø Ø2Ø2
Ø4 Ø1Ø5  5Ø Ø2Ø1          L=U:AND:ADRMS4
Ø4 Ø1Ø6  52 4ØØ1
```

18196 SCAMP SECTION 158 PAGE 431

-continued

DOUBLE TABLE LOCK-UP

```
04 0107  50 7204         B(4)=L           LC INDEX
04 0110  50 0202
04 0111  50 7205         B(5)=L,U+NOINDX LC IF
04 0112  50 0201
04 0113  14 4000
04 0114  50 7205
04 0115  50 0202
04 0116  50 7201         TEMP41=ADR0(1)   NUMBER OF MC/LC
04 0117  13 0000
04 0120  44 3000
04 0121  50 7204         L=L+ADR0(4)
04 0122  25 0200
04 0123  50 7202         L=L+ADR0(2)
04 0124  15 0000
04 0125  50 7201         B=B(1)+L
04 0126  50 0102
04 0127  70 0001         TEMP42=1
```

18196 SCAMP SECTION 158 PAGE 432

```
04 0130  44 3001
04 0131  34 0135         GO      TABL22
04 0132  44 3002 TABL21  TEMP43=L
04 0133  12 3000         L=TEMP41
04 0134  50 0102         B=B+L
04 0135  13 0002 TABL22  L=ADR2(B)-ADR1(B)*ADR0(3)*2A-16
04 0136  17 0001
04 0137  50 7203
04 0140  25 0000
04 0141  50 4320
04 0142  50 7201         L=L+ADR1(1)
04 0143  15 0001
04 0144  57 3001         ISK     TEMP42
04 0145  34 0132         GO      TABL21
04 0146  16 3002         L=L-TEMP43*ADR0(5)*2A-16
04 0147  50 7205
04 0150  25 0000
04 0151  50 4320
04 0152  14 3002         L=L+TEMP43
04 0153  50 7201         ENTICR 1
04 0154  50 7343         SETSR  3
04 0155  55 0074         RETURN TABLE2
```

18196 SCAMP SECTION 159 PAGE 433

```
                 LIMMOD 043000
                 ***********************************
                 BANK 4 VARIABLES
                 ***********************************
                 TEMPORARIES
04 3000  00 0000 TEMP41  0
04 3001  00 0000 TEMP42  0
04 3002  00 0000 TEMP43  0
                 ***********************************
```

```
18196 SCAMP                              SECTION        159       PAGE       433
```

-continued

```
                         INDICES AND INTERPOLATION FACTORS

04 3003   00 0000   ALT5IX   0                      ALTITUDE INDEX 5K STEPS
04 3004   00 0000   ALT1IX   0                      ALTITUDE INDEX 1K STEPS
04 3005   00 0000   WTINDX   0
04 3006   00 0000   FLPLIX   0                      FLAP POSITION INDEX - 10 DEG STEPS
04 3007   00 0000   FLACIX   0                      FLAP POSITION INDEX - ACTUAL
                    IDXFST   EQUALS ALT5IX

04 3010   00 0000   ALT5IF   0                      ALTITUDE INTERPOLATION FACTOR
04 3011   00 0000   ALT1IF   0                      ALTITUDE INTERPOLATION FACTOR 1K
04 3012   00 0000   WTIFTR   0
04 3013   00 0000   FLPLIF   0                      FLAP POSITION I.F. 10 DEG STEPS
04 3014   00 0000   FLACIF   0                      FLAP POSITION I.F. ACTUAL
                    INCFST   EQUALS ALT5IF
```

```
18196 SCAMP                              SECTION        160       PAGE       434

                              LIMREF 044000
                    ***********************************

                     BANK 4 CONSTANTS

                    ***********************************


                              REFER
                    ALTCOR
                    ALT1TB
                    ALT5TB
                    AL1TBE
                    AL5TBE
                    DLVOLX
                    FLAPOS
                    FLAPTB
                    FLPOSP
                    FLPTBE
                    MACHCT
                    MACHDT
                    MACHET
                    PLACRD
                    WEIGHT
                    WTTABL
                    WTTBLE


                    ***********************************

                     MISCELLANEOUS CONSTANTS

04 4000   00 0005   NOINDX   5                      NUMBER OF INDICES
04 4001   00 7777   ADRMS4   07777                  ADDRESS MASK
04 4002   00 4127   MACHCA   00,MACHCT              MACH CLIMB TABLE
04 4003   00 4273   MACHEA   00,MACHET
04 4004   00 4176   MACHDA   00,MACHDT              MACH DESCENT TABLE
04 4005   00 4245   PLACAD   00,PLACRD              PLACARD LIMIT
04 4006   00 4260   DVDXAD   00,DLVOLX              DELTA V OVER DELTA X


                    *************************************

                     FASTIX VARIABLE ADDRESSES

04 4007   77 2433   VARFST   077,ALTCOR
04 4010   77 2433            077,ALTCOR
04 4011   77 0745            077,WEIGHT
04 4012   77 2075            077,FLPOSP
04 4013   77 0201            077,FLAPOS
```

```
                    ****************************************

                    FASTIX TABLE START ADDRESSES

04 4014  00 4026  TABAFS  00     ALT5TB
04 4015  00 4037          00     ALT1TB
04 4016  00 4106          00     WTTABL
04 4017  00 4114          00     FLAPTB
04 4020  00 4114          00     FLAPTB

                    ****************************************

                    FASTIX TABLE END ADDRESSES -1

04 4021  00 4035  ENDAFS  00     AL5TBE
04 4022  00 4104          00     AL1TBE
04 4023  00 4112          00     WTTBLE
04 4024  00 4125          00     FLPTBE
04 4025  00 4125          00     FLPTBE

                    ****************************************

                    FASTIX TABLES

04 4026  00 0000  ALT5TB  DATA   0,5000,10000,15000,20000
04 4027  01 1610
04 4030  02 3420
04 4031  03 5230
04 4032  04 7040
04 4033  06 0650          DATA   25000,30000,
04 4034  07 2460
04 4035  10 4270  AL5TBE  DATA   35000,40000
04 4036  11 6100

04 4037  00 0000  ALT1TB  DATA   0,3000,4000,5000,6000,7000
04 4040  00 5670
04 4041  00 7640
04 4042  01 1610
04 4043  01 3560
04 4044  01 5530
04 4045  01 7500          DATA   8000,9000,10000,11000,12000
04 4046  02 1450
04 4047  02 3420
04 4050  02 5370
04 4051  02 7340
04 4052  03 1310          DATA   13000,14000,15000,16000,17000
04 4053  03 3260
04 4054  03 5230
04 4055  03 7200
```

```
04 4056  04 1150
04 4057  04 3120          DATA   18000,19000,20000,21000,22000
04 4060  04 5070
04 4061  04 7040
04 4062  05 1010
04 4063  05 2760
04 4064  05 4730          DATA   23000,24000,25000,26000,27000
04 4065  05 6700
04 4066  06 0650
04 4067  06 2620
04 4070  06 4570
04 4071  06 6540          DATA   28000,29000,30000,31000,32000
04 4072  07 0510
04 4073  07 2460
04 4074  07 4430
```

```
04 4075  07 6400
04 4076  10 0350         DATA    33000,34000,35000,36000
04 4077  10 2320
04 4100  10 4270
04 4101  10 6240
04 4102  11 0210         DATA    37000,38000
04 4103  11 2160
04 4104  11 4130  ALITBE DATA    39000,40000
04 4105  11 6100
04 4106  20 5216  WTTABL DATA    275000.0B-2,300000.0B-2
04 4107  22 2370
04 4110  23 6542         DATA    325000.0B-2,350000.0B-2
04 4111  25 2714
04 4112  26 7066  WTTBLE DATA    375000.0B-2,400000.0B-2
04 4113  30 3240
04 4114  00 0000  FLAPTB DATDEG 0.5.0,10.0,15.0,20.0
04 4115  00 7071
04 4116  01 6162
04 4117  02 5253
04 4120  03 4344
04 4121  04 3434         DATDEG 25.0,30.0,35.0,40.0
04 4122  05 2525
04 4123  06 1616
04 4124  07 0707
04 4125  10 0000  FLPTBE DATDEG 45.0,50.0
04 4126  10 7071

                  *************************************

                   SINGLE TABLE LOCK-UP TABLES

                  *************************************
```

```
                   CLIMB MACH NUMBER = F(ALTITUDE)

                   ALT=0,3000,4000,5000,.....40000

04 4127  00 0000  MACHCT  RESERV 39

                  ******************************

                   DESCENT MACH NUMBER=F(ALTITUDE)

                  ALT=0,3000,4000,5000,......40000

04 4176  04 0000  MACHCT  RESERV 39
                  *********************************

                  *********************************

                   PLACARD LIMIT = F(FLAPS)

                  FLAPS=0,5,10,......45,50

04 4245  02 2354  PLACRD  DATA    590.7384,430.3984,408.4584
04 4246  01 5346
04 4247  01 4607
04 4250  01 4143          DATA    388.284,366.2684,346.084
04 4251  01 3344
04 4252  01 2640
04 4253  01 2134          DATA    325.7584,307.1884,288.6284
04 4254  01 1463
04 4255  01 1012
04 4256  01 0724          DATA    285.2484,283.5584
04 4257  01 0071
                  ******************************
```

```
18190 SCAMP                             SECTION        160       PAGE      437
```

-continued

```
                       DELTA V/DELTA X = F(FLAPS)

                       NOMINAL GAMMA=-2.7 DEGREES
                       FLAPS = 0,5,10.......,45,50

04 4260   01 4360   DLVDLX  DATA   0.000761B23,0.00114B23
04 4261   02 2533
04 4262   02 7262           DATA   0.001425B23,0.001662B23
04 4263   03 3166
04 4264   04 7535           DATA   0.002422B23,0.003369B23
04 4265   06 7145
04 4266   13 7474           DATA   0.005836B23,0.009053B23
04 4267   22 4246
04 4270   25 6005           DATA   0.011109B23,0.011409B23


18190 SCAMP                             SECTION        160       PAGE      438

04 4271   27 2732
04 4272   27 7656           DATA   0.011709B23


18190 SCAMP                             SECTION        160       PAGE      439


                       ************************************
                       DOUBLE TABLE LOOK-UP TABLES
                       ************************************
                       ************************************
                       CRUISE MACH = F(ALTITUDE,WEIGHT)

                       ALT = 0,5000,15000,20000,25000
                             30000,35000,40000

                       WEIGHT = 275,000 LB.

04 4273   00 0011   MACHET  9
04 4274   01 3015           DATA   0.368B14,0.400B14,0.443B14
04 4275   01 4632
04 4276   01 6132
04 4277   01 7555           DATA   0.491B14,0.536B14,0.592B14
04 4300   02 1110
04 4301   02 2743
04 4302   02 4754           DATA   0.655B14,0.715B14,0.770B14
04 4303   02 6703
04 4304   03 0510

                       WEIGHT = 300,000 LB

04 4305   01 4203           DATA   0.383B14,0.416B14,0.461B14
04 4306   01 5240
04 4307   01 6601
04 4310   02 2142           DATA   0.526B14,0.558B14,0.613B14
04 4311   02 1666
04 4312   02 3473
04 4313   02 5565           DATA   0.679B14,0.736B14,0.783B14
04 4314   02 7433
04 4315   03 1035
```

```
18196 SCAMP                          SECTION      160      PAGE      439
```

-continued

```
                        WEIGHT = 325000 LB

04 4316   01 4571          DATA    0.398814,0.432814,0.479814
04 4317   01 5646
04 4320   01 7250
04 4321   02 0652          DATA    0.526814,0.580814,0.635814
04 4322   02 2437
04 4323   02 4244
04 4324   02 6315          DATA    0.720814,0.753814,0.793814
04 4325   03 0061
```

```
18196 SCAMP                          SECTION      160      PAGE      440

04 4326   03 1371

                        WEIGHT = 350,000 LB

04 4327   01 3014          DATA    0.407814,0.447814,0.496814
04 4330   01 6234
04 4331   01 7076
04 4332   02 1321          DATA    0.544814,0.600814,0.656814
04 4333   02 3146
04 4334   02 4774
04 4335   02 5754          DATA    0.718814,0.767814,0.800814
04 4336   03 0427
04 4337   03 1463

                        WEIGHT = 375,000 LB

04 4340   01 5341          DATA    0.420814,0.461814,0.513814
04 4341   01 5601
04 4342   02 0325
04 4343   02 1776          DATA    0.562814,0.615814,0.675814
04 4344   02 3534
04 4345   02 5463
04 4346   02 7412          DATA    0.735814,0.778814,0.802814
04 4347   03 0713
04 4350   03 1524

                        WEIGHT = 400,000 LB

04 4351   01 3066          DATA    0.433814,0.476814,0.529814
04 4352   01 7167
04 4353   02 0733
04 4354   02 2416          DATA    0.579814,0.632814,0.692814
04 4355   02 4163
04 4356   02 6112
04 4357   02 7750          DATA    0.749814,0.787814,0.807814
04 4360   03 1136
04 4361   03 1646
                           END
```

```
18196 SCAMP                          SECTION      2        PAGE      441
LIMITED ACCESS

03 4176  ABSIMP     03 0457  ACCELZ   S 03 0136  ACCLXA   S 03 0137  ACCLXB   S
03 0140  ACCLYA   S 03 0141  ACCLYB   S 03 0142  ACCLZA   S 03 0143  ACCLZB   S
03 0247  ACCX1A   S 03 0250  ACCY1A   S 03 0251  ACCZ1A   S 03 2021  ACPCK2   S
03 2022  ACPCK3   S 03 4456  ADADOT     03 2077  ADFGCN   S 03 4311  ADKFCT
03 4341  ADKFC1     03 4312  ADKFC2     00 0000  ADR0     S 00 0001  ADR1     S
00 0002  ADR2     S 03 4210  ADRMSK     04 4001  ADRMS4     03 2132  ADRSCN   S
03 4722  ADRSGN   N 03 4732  ADRSMX   N 03 4714  ADRSTL   N 03 4706  ADRTAD   N
03 4067  AIDCON     03 0174  AILAVA   S 03 0175  AILAVB   S 03 0441  AILCOM   S
03 0222  AILC1A   S 03 1111  AILC1B   S 03 5112  AILLM      03 2372  AILRNA   S
03 2373  AILRNB   S 03 4700  AIRADD     03 4376  AIRDCD     03 4504  AIRMSK
03 2110  AIRSV1   S 03 2124  AIRSV2   S 03 2332  ALEQ1A   S 03 2333  ALEQ1B   NS
03 0442  ALFAZ    S 03 0456  ALIN1    S 03 2400  ALMDC1   S 03 2401  ALMDC2   S
03 1461  ALPHA    S 03 5657  ALPHBT     00 1372  ALPOWR   S 03 0166  ALRAMA   S
03 0167  ALRAMB   S 03 0160  ALSADA   S 03 0161  ALSADB   S 03 2324  ALSM1A   NS
```

1819b SCAMP SECTION 2 PAGE 441
LIMITED ACCESS

-continued

| | | | | | | | | | | | | | | | |
|---|---|---|---|---|---|---|---|---|---|---|---|---|---|---|---|
| 03 | 2325 | ALSM10 | NS | 04 | 3011 | ALT1IF | S | 04 | 3004 | ALT1IX | S | 04 | 4037 | ALT1TB | |
| 04 | 3012 | ALT5IF | S | 04 | 3003 | ALT5IX | S | 04 | 4026 | ALT5TB | | 03 | 0210 | ALTBCR | S |
| 03 | 2033 | ALTCMO | S | 03 | 0433 | ALTCOR | S | 03 | 0371 | ALTERC | S | 03 | 2040 | ALTFLG | S |
| 03 | 2074 | ALTF10 | NS | 03 | 2073 | ALTF20 | NS | 03 | 2072 | ALTF30 | NS | 03 | 2071 | ALTF40 | NS |
| 03 | 2070 | ALTF50 | S | 03 | 0103 | ALTGND | S | 03 | 0712 | ALTITD | S | 03 | 0207 | ALTNCR | S |
| 03 | 0370 | ALTREF | S | 03 | 0425 | ALTRNG | S | 03 | 0216 | ALTRTE | S | 04 | 4104 | AL1TBE | |
| 04 | 4035 | AL5TBE | | 03 | 2536 | ANSCK? | S | 03 | 0076 | ANSWER | S | 03 | 4407 | APMKTM | |
| 03 | 2041 | APRFLG | S | 03 | 0521 | APTOGA | S | 03 | 2110 | ARGOOD | S | 03 | 6025 | ARMMES | |
| 03 | 2543 | ARMMSG | S | 00 | 1376 | ASAVE | S | 03 | 5556 | ASIN0 | | 03 | 5557 | ASIN01 | |
| 03 | 4226 | ATODAD | | 03 | 4256 | ATODA1 | | 03 | 4227 | ATODA2 | | 00 | 1414 | ATODIN | S |
| 00 | 1415 | ATODI1 | S | 00 | 1416 | ATODI2 | S | 00 | 1417 | ATODI3 | S | 00 | 1420 | ATODI4 | S |
| 00 | 1421 | ATODI5 | S | 00 | 1422 | ATODI6 | S | 00 | 1423 | ATODI7 | S | 00 | 1424 | ATODI8 | S |
| 00 | 1425 | ATODI9 | S | 00 | 1413 | ATODM1 | S | 00 | 1426 | ATOD10 | S | 00 | 1427 | ATOD11 | S |
| 00 | 1430 | ATOD12 | S | 00 | 1431 | ATOD13 | S | 00 | 1432 | ATOD14 | S | 00 | 1433 | ATOD15 | S |
| 00 | 1434 | ATOD16 | S | 00 | 1435 | ATOD17 | S | 00 | 1436 | ATOD18 | S | 00 | 1437 | ATOD19 | S |
| 00 | 1440 | ATOD20 | S | 00 | 1441 | ATOD21 | S | 00 | 1442 | ATOD22 | S | 00 | 1443 | ATOD23 | S |
| 00 | 1444 | ATOD24 | S | 00 | 1445 | ATOD25 | S | 00 | 1445 | ATOD26 | S | 00 | 1447 | ATOD27 | S |
| 00 | 1450 | ATOD28 | S | 00 | 1451 | ATOD29 | S | 00 | 1452 | ATOD30 | S | 00 | 1453 | ATOD31 | S |
| 00 | 1454 | ATOD32 | S | 00 | 1455 | ATOD33 | S | 00 | 1456 | ATOD34 | S | 00 | 1457 | ATOD35 | S |
| 00 | 1460 | ATOD36 | S | 00 | 1461 | ATOD37 | S | 00 | 1462 | ATOD38 | S | 00 | 1463 | ATOD39 | S |
| 00 | 1464 | ATOD40 | S | 00 | 1465 | ATOD41 | S | 00 | 1466 | ATOD42 | S | 00 | 1467 | ATOD43 | S |
| 00 | 1470 | ATOD44 | S | 00 | 1471 | ATOD45 | S | 00 | 1472 | ATOD46 | S | 00 | 1473 | ATOD47 | S |
| 00 | 1474 | ATOD48 | S | 00 | 1475 | ATOD49 | S | 00 | 1476 | ATOD50 | S | 00 | 1477 | ATOD51 | S |
| 00 | 1500 | ATOD52 | S | 00 | 1501 | ATOD53 | S | 00 | 1502 | ATOD54 | S | 00 | 1503 | ATOD55 | S |
| 00 | 1504 | ATOD56 | S | 00 | 1505 | ATOD57 | S | 00 | 1506 | ATOD58 | S | 00 | 1507 | ATOD59 | S |
| 00 | 1510 | ATOD60 | S | 00 | 1511 | ATOD61 | S | 00 | 1512 | ATOD62 | S | 00 | 1513 | ATOD63 | S |
| 00 | 1514 | ATOD64 | S | 00 | 1515 | ATOD65 | S | 00 | 1516 | ATOD66 | S | 00 | 1517 | ATOD67 | S |
| 00 | 1520 | ATOD68 | S | 00 | 1521 | ATOD69 | S | 00 | 1522 | ATOD70 | S | 00 | 1523 | ATOD71 | S |
| 00 | 1524 | ATOD72 | S | 00 | 1525 | ATOD73 | S | 00 | 1526 | ATOD74 | S | 00 | 1527 | ATOD75 | S |
| 00 | 1530 | ATOD76 | S | 00 | 1531 | ATOD77 | S | 03 | 0260 | AUTENG | S | 03 | 2027 | AUTMOD | S |
| 03 | 0260 | AUT01A | S | 03 | 2030 | AUTPS1 | S | 03 | 0517 | AZALPH | S | 03 | 0252 | BETA1A | S |
| 03 | 0144 | BETLCA | S | 03 | 0145 | BETLCB | S | 03 | 5450 | BFLPLC | | 03 | 4412 | BIT0 | |
| 03 | 4412 | BIT00 | | 03 | 4434 | BIT00N | | 03 | 4413 | BIT01 | | 03 | 4435 | BIT01N | |
| 03 | 4414 | BIT02 | | 03 | 4436 | BIT02N | N | 03 | 4415 | BIT03 | | 03 | 4437 | BIT03N | N |
| 03 | 4416 | BIT04 | | 03 | 4440 | BIT04N | N | 03 | 4417 | BIT05 | | 03 | 4441 | BIT05N | N |
| 03 | 4420 | BIT06 | | 03 | 4442 | BIT06N | N | 03 | 4421 | BIT07 | | 03 | 4443 | BIT07N | N |
| 03 | 4422 | BIT08 | | 03 | 4444 | BIT08N | N | 03 | 4423 | BIT09 | | 03 | 4445 | BIT09N | N |
| 03 | 4413 | BIT1 | | 03 | 4424 | BIT10 | | 03 | 4446 | BIT10N | | 03 | 4425 | BIT11 | |

1819b SCAMP SECTION 2 PAGE 442
LIMITED ACCESS

| | | | | | | | | | | | | | | | |
|---|---|---|---|---|---|---|---|---|---|---|---|---|---|---|---|
| 03 | 4447 | BIT11N | | 03 | 4426 | BIT12 | | 03 | 4450 | BIT12N | N | 03 | 4427 | BIT13 | |
| 03 | 4451 | BIT13N | N | 03 | 4430 | BIT14 | | 03 | 4452 | BIT14N | N | 03 | 4431 | BIT15 | |
| 03 | 4453 | BIT15N | N | 03 | 4432 | BIT16 | | 03 | 4454 | BIT16N | N | 03 | 4433 | BIT17 | |
| 03 | 4455 | BIT17N | | 03 | 4414 | BIT2 | | 03 | 4415 | BIT3 | | 03 | 4416 | BIT4 | |
| 03 | 4417 | BIT5 | | 03 | 4420 | BIT6 | | 03 | 4421 | BIT7 | | 03 | 4422 | BIT8 | |
| 03 | 4423 | BIT9 | | 00 | 0006 | BITEPS | S | 03 | 4455 | BITN17 | | 03 | 4207 | BITSET | |
| 03 | 5757 | BLANKS | | 03 | 4536 | BLKMSK | | 00 | 1402 | B0SAVE | S | 00 | 1403 | B1SAVE | S |
| 00 | 1404 | B2SAVE | S | 00 | 1405 | B3SAVE | S | 00 | 1406 | B4SAVE | S | 00 | 1407 | B5SAVE | S |
| 00 | 1410 | B6SAVE | S | 00 | 1411 | B7SAVE | S | 03 | 2656 | CABBUF | S | 00 | 1362 | CALPIN | |
| 03 | 5135 | CASTHR | | 03 | 5215 | CBXY3 | | 00 | 1364 | CH7INT | | 03 | 2515 | CKSUMF | S |
| 03 | 0515 | CL | S | 03 | 5203 | CLAEXT | | 03 | 5204 | CLARET | | 03 | 5206 | CLDE | |
| 03 | 5205 | CLIH | | 00 | 0016 | CLKINT | S | 03 | 2522 | CLOCK | S | 03 | 0513 | CLREF | S |
| 03 | 5165 | CLREF0 | | 03 | 6110 | CMD | | 03 | 0276 | CMDNOT | S | 03 | 0276 | CMDNTA | S |
| 03 | 5245 | CNHX5 | | 03 | 0205 | COL1ST | S | 03 | 0203 | COLCAP | S | 03 | 5515 | COS0 | |
| 03 | 5516 | COS01 | | 03 | 0472 | COSPHC | S | 03 | 0476 | COSPHI | S | 03 | 0500 | COSPSI | S |
| 03 | 0474 | COSTHT | S | 03 | 2153 | COUNH0 | S | 03 | 2154 | COUNH1 | S | 03 | 2155 | COUNH2 | S |
| 03 | 2156 | COUNH3 | S | 03 | 2157 | COUNH4 | S | 03 | 0352 | COUNTR | S | 03 | 0154 | CRSERL | S |
| 03 | 0155 | CRSERR | S | 03 | 0256 | CRSL1A | S | 03 | 6112 | CWS | | 03 | 2160 | CWSCNT | S |
| 03 | 0307 | CWSNOT | S | 03 | 4535 | CWSPHO | | 03 | 4534 | CWSRHO | | 03 | 2067 | DALT10 | NS |
| 03 | 2066 | DALT20 | NS | 03 | 2065 | DALT30 | NS | 03 | 2064 | DALT40 | NS | 03 | 2063 | DALT50 | S |
| 03 | 0421 | DCRFLG | S | 03 | 4551 | DEG1P5 | | 03 | 4561 | DEG10 | | 03 | 4562 | DEG15 | |
| 03 | 4563 | DEG18 | | 03 | 4455 | DEG180 | N | 03 | 4552 | DEG2 | | 03 | 4553 | DEG2P5 | |
| 03 | 4564 | DEG20 | | 03 | 4565 | DEG22 | | 03 | 4566 | DEG24 | | 03 | 4567 | DEG25 | |
| 03 | 4570 | DEG28 | | 03 | 4554 | DEG3 | | 03 | 4571 | DEG30 | | 03 | 4573 | DEG35 | |
| 03 | 4555 | DEG4 | | 03 | 4431 | DEG45 | N | 03 | 4556 | DEG5 | | 03 | 4574 | DEG50 | |
| 03 | 4557 | DEG6 | | 03 | 4560 | DEG6P5 | | 03 | 5656 | DEG90 | N | 03 | 4547 | DEGHLF | |
| 03 | 4575 | DEGM10 | | 03 | 4550 | DEGONE | | 03 | 0463 | DEGPMX | S | 03 | 4561 | DEGP10 | |
| 03 | 6767 | DEGP7 | | 03 | 0336 | DELAIL | S | 03 | 0417 | DELPSI | S | 03 | 0420 | DELRSS | S |

-continued

| | | | | | | | | | | | | | | | |
|---|---|---|---|---|---|---|---|---|---|---|---|---|---|---|---|
| 03 | 0345 | DELRUD | S | 03 | 2042 | DELTAV | S | 03 | 4575 | DG10M | | 03 | 4576 | DG15M | |
| 03 | 4572 | DG34P5 | | 03 | 0073 | DHDSRD | S | 03 | 2526 | DIAGNO | S | 00 | 1365 | DIGIN7 | |
| 03 | 0226 | DISA01 | S | 03 | 0227 | DISA02 | S | 03 | 0230 | DISA03 | S | 03 | 0231 | DISA04 | S |
| 03 | 0232 | DISA05 | S | 03 | 0233 | DISA06 | S | 03 | 0234 | DISA07 | S | 03 | 0235 | DISA08 | NS |
| 03 | 0236 | DISA09 | S | 03 | 0237 | DISA10 | S | 03 | 0240 | DISA11 | NS | 03 | 0241 | DISA12 | NS |
| 03 | 1115 | DISB01 | S | 03 | 1116 | DISB02 | NS | 03 | 1117 | DISB03 | NS | 03 | 1120 | DISB04 | NS |
| 03 | 1121 | DISB05 | NS | 03 | 1122 | DISB06 | NS | 03 | 1123 | DISB07 | NS | 03 | 1124 | DISB08 | NS |
| 03 | 1125 | DISB09 | NS | 03 | 1126 | DISB10 | NS | 03 | 1127 | DISB11 | NS | 03 | 1130 | DISB12 | NS |
| 03 | 2146 | DISCH0 | S | 03 | 2147 | DISCH1 | S | 03 | 2150 | DISCH2 | S | 03 | 2151 | DISCH3 | S |
| 03 | 2152 | DISCH4 | S | 03 | 2140 | DISCT0 | S | 03 | 2141 | DISCT1 | S | 03 | 2142 | DISCT2 | S |
| 03 | 2143 | DISCT3 | S | 03 | 2144 | DISCT4 | S | 03 | 2506 | DISOKF | S | 03 | 0511 | DLOVRW | S |
| 04 | 4265 | DLVDLX | | 03 | 0320 | DMTX11 | S | 03 | 0321 | DMTX12 | S | 03 | 0322 | DMTX13 | S |
| 03 | 0323 | DMTX21 | NS | 03 | 0324 | DMTX22 | S | 03 | 0325 | DMTX23 | S | 03 | 0326 | DMTX31 | S |
| 03 | 0327 | DMTX32 | S | 03 | 0330 | DMTX33 | S | 03 | 2145 | DSCTOG | S | 03 | 0024 | DTDINP | S |
| 03 | 0000 | DTOADT | S | 03 | 0001 | DTOA01 | S | 03 | 0002 | DTOA02 | S | 03 | 0003 | DTOA03 | S |
| 03 | 0004 | DTOA04 | S | 03 | 0005 | DTOA05 | S | 03 | 0006 | DTOA06 | S | 03 | 0007 | DTOA07 | S |
| 03 | 0010 | DTOA08 | S | 03 | 0011 | DTOA09 | S | 03 | 0012 | DTOA10 | S | 03 | 0013 | DTOA11 | S |
| 03 | 0310 | DUALFG | S | 03 | 2520 | DUOFFS | S | 03 | 2521 | DUOFF1 | S | 04 | 4006 | DVDXAD | |
| 03 | 5420 | DVFLAP | | 03 | 2062 | DVH10F | NS | 03 | 2061 | DVH20F | NS | 03 | 2060 | DVH30F | NS |
| 03 | 2057 | DVH40F | NS | 03 | 2056 | DVH50F | S | 03 | 2052 | DVPXFA | S | 03 | 0462 | DYNPRS | S |
| 03 | 4661 | D100 | | 03 | 4662 | D1000 | | 03 | 4663 | D10000 | | 03 | 4664 | D10E5 | N |
| 03 | 4527 | D12000 | | 03 | 4530 | D12500 | | 03 | 4520 | D1275 | | 03 | 4511 | D149 | |
| 03 | 4504 | D15 | | 03 | 4521 | D1800 | | 03 | 4512 | D200 | | 03 | 4522 | D2000 | |
| 03 | 4513 | D220 | | 03 | 4531 | D25000 | | 03 | 4514 | D270 | | 03 | 4523 | D3000 | |

| | | | | | | | | | | | | | | | |
|---|---|---|---|---|---|---|---|---|---|---|---|---|---|---|---|
| 03 | 4524 | D3200 | | 03 | 4525 | D3840 | | 03 | 4515 | D400 | | 03 | 4516 | D500 | |
| 03 | 4526 | D5000 | | 03 | 4506 | D50 | | 03 | 4507 | D51 | N | 03 | 4532 | D54016 | |
| 03 | 4517 | D600 | | 03 | 2475 | EAFLAG | S | 03 | 2023 | EAIFL | S | 03 | 2306 | EATHRF | S |
| 03 | 4510 | EIGHTY | | 03 | 2334 | ELEQ1A | NS | 03 | 2335 | ELEQ1B | NS | 03 | 2374 | ELEVTA | S |
| 03 | 2375 | ELEVTB | S | 03 | 2402 | ELMDC1 | S | 03 | 2403 | ELMDC2 | S | 03 | 0170 | ELRAMA | S |
| 03 | 0171 | ELRAMB | S | 03 | 0162 | ELSADA | S | 03 | 0163 | ELSADB | S | 03 | 2326 | ELSM1A | NS |
| 03 | 2327 | ELSM1B | NS | 03 | 0176 | ELVAVA | S | 03 | 0177 | ELVAVB | S | 03 | 0440 | ELVCOM | S |
| 03 | 0221 | ELVC1A | S | 03 | 1110 | ELVC1B | S | 04 | 4021 | ENDAFS | | 03 | 0257 | ENG1A | S |
| 03 | 1140 | ENG1B | NS | 03 | 0314 | ENGOOD | S | 03 | 5116 | EQLDOZ | | 00 | 0116 | EXTIN7 | S |
| 03 | 6427 | FAIAUK | | 00 | 1356 | FAILJP | | 03 | 2406 | FAILNM | S | 03 | 2407 | FAILSV | NS |
| 00 | 1357 | FAIL? | | 03 | 2405 | FAUPNM | S | 03 | 4657 | FCTR10 | | 03 | 0261 | FDIR1A | S |
| 03 | 2053 | FGAMAP | S | 03 | 4000 | FIRSTK | | 03 | 2404 | FIRSTP | S | 03 | 4502 | FIVE | N |
| 04 | 3014 | FLACIF | S | 04 | 3007 | FLACIX | S | 03 | 0354 | FLAGCR | S | 03 | 2570 | FLAPCM | S |
| 03 | 4577 | FLAPIX | | 03 | 0201 | FLAPOS | S | 03 | 0510 | FLAPPW | S | 04 | 4114 | FLAPTB | |
| 03 | 4601 | FLAP1 | | 03 | 4607 | FLAP2 | | 03 | 2054 | FLCMIX | S | 03 | 0372 | FLINTT | S |
| 03 | 2076 | FLPCNT | S | 04 | 3013 | FLPLIF | S | 04 | 3006 | FLPLIX | S | 03 | 2075 | FLPOSP | S |
| 03 | 5441 | FLPSTP | | 04 | 4125 | FLPTBE | | 03 | 0375 | FLRIGN | S | 00 | 1412 | FLSAVE | S |
| 03 | 0261 | FLTDIR | S | 03 | 2577 | FMABF1 | S | 03 | 2576 | FMABUF | S | 03 | 2555 | FMAFLG | S |
| 03 | 4414 | FOUR | | 03 | 0344 | FPAIFG | S | 03 | 5432 | FPSTNM | | 03 | 4120 | FRCODU | |
| 03 | 4162 | FREQ | | 03 | 1037 | FREQSA | S | 03 | 1726 | FREQSB | S | 03 | 4212 | FTPNM | |
| 03 | 4206 | FUL21A | | 03 | 4205 | FULL1A | | 03 | 2051 | F50FLG | S | 03 | 0376 | GAGFLG | S |
| 03 | 2032 | GAMCMU | S | 03 | 4063 | GAMGSN | | 03 | 0460 | GAMMA | S | 03 | 0443 | GNDYPR | S |
| 00 | 1366 | GOBTRT | | 03 | 2477 | GSBAD | S | 03 | 4163 | G573 | | 03 | 0432 | HDCONT | S |
| 03 | 0424 | HDDOT | S | 03 | 0423 | HDDTRD | S | 03 | 0072 | HDESRD | S | 03 | 0401 | HDGHDF | S |
| 03 | 0671 | HDGSDD | S | 03 | 0206 | HDGSER | S | 03 | 0454 | HDGSRF | S | 03 | 4053 | HDOTCG | |
| 03 | 0711 | HDOTF | S | 03 | 0717 | HDOTF1 | S | 03 | 2044 | HDTCKF | S | 03 | 2046 | HDTCNT | S |
| 03 | 0431 | HDTHLD | S | 03 | 5134 | HDTHRS | | 03 | 4131 | HDTLIM | | 03 | 4204 | HDTMIN | |
| 03 | 0426 | HDTOLD | S | 03 | 0716 | HDTRAD | S | 03 | 0374 | HDZERO | S | 03 | 0452 | HEDTGS | S |
| 03 | 0453 | HERATL | S | 03 | 0455 | HERRGS | S | 03 | 4071 | HFLREF | | 03 | 4070 | HFLRF1 | |
| 03 | 0601 | HGSECF | S | 03 | 0152 | HRADCA | S | 03 | 0153 | HRADCB | S | 03 | 0150 | HRADFA | S |
| 03 | 0151 | HRADFB | S | 03 | 0613 | HRADIO | S | 03 | 0422 | HRADRW | S | 03 | 0255 | HRDC1A | S |
| 03 | 0254 | HRDF1A | S | 03 | 0430 | HRDRW1 | S | 03 | 2036 | HSPDCR | NS | 04 | 3003 | IDXFST | S |
| 03 | 2510 | IDXTMP | S | 04 | 3010 | INCFST | S | 03 | 4160 | INCPT1 | | 03 | 2551 | INDXMS | S |
| 03 | 2516 | INFLAG | S | 03 | 2474 | INFLG | S | 03 | 6735 | INPCOD | | 03 | 0705 | INTOT1 | S |
| 03 | 0706 | INTOT2 | S | 03 | 0713 | INTOT7 | NS | 03 | 0715 | INTOT9 | S | 03 | 2233 | INTOUT | S |
| 03 | 2253 | INTOU2 | NS | 03 | 2243 | INTOU8 | NS | 03 | 0704 | INTO0A | S | 03 | 1573 | INTO0B | S |
| 03 | 0720 | INTO12 | NS | 03 | 0721 | INTO13 | S | 03 | 0724 | INTO16 | S | 03 | 0726 | INTO18 | NS |
| 03 | 0727 | INTO19 | S | 03 | 0732 | INTO22 | S | 03 | 0733 | INTO23 | S | 03 | 0734 | INTO24 | S |
| 03 | 0737 | INTO27 | S | 03 | 0741 | INTO29 | S | 03 | 0742 | INTO30 | S | 03 | 0743 | INTO31 | S |
| 03 | 0744 | INTO32 | S | 03 | 0746 | INTO34 | S | 03 | 0747 | INTO35 | S | 03 | 2247 | INTU12 | S |
| 03 | 4127 | INVKUG | | 03 | 4130 | INVKRG | | 03 | 2017 | ISOV2 | S | 03 | 2020 | ISOV3 | S |
| 03 | 5160 | KACCX | | 03 | 4023 | KAILI | | 03 | 4121 | KALR1A | | 03 | 4050 | KALTHI | |

-continued

```
03 4051  KALTPR      03 4052  KALTP2      03 4047  KALT1A      03 4125  KAPS1A
03 5147  KCASUT      03 5170  KCLFLP      03 4045  KCPGAG      03 4035  KCWSPC
03 4124  KDAP1A      03 4037  KDNP1A      03 4026  KDNR1A      03 4122  KDRP1A
03 5117  KEQULZ      03 1000  KFGEAA    S 03 1667  KFGEAB    S 03 1007  KFGEA7    S
03 1010  KFGEA8    S 03 4072  KFLRH       03 4073  KFLRIN      03 4074  KFLRWO
03 5141  KFOFAE      03 5144  KFOFAS      03 5143  KFOFHO      03 4042  KGAGAM
03 4046  KGAMH       03 4055  KGAMI       03 5433  KGAMLG      03 4064  KGGS1A
03 4054  KGMERR      03 4136  KHCF1       03 4135  KHCF2       03 4133  KHCF3
03 4134  KHCF4       03 4076  KHDCMO      03 4077  KHDDFL      03 4067  KHDDGS
03 4075  KHDERR      03 5416  KHEQUV      03 4741  KINMON      03 5417  KINTMC
```

```
03 4101  KINTPU      03 5013  KLAG        03 5014  KLAG1       03 4174  KNT131
03 5153  KN1DIE      03 5152  KN1ERR      03 4034  KPCW1A      03 4213  KPFDGN
03 4036  KPFF1A      03 4002  KPHD1A      03 4016  KPHIFD      03 4001  KPHI1A
03 4123  KPHPDR      03 4103  KPSI0       03 4030  KPTKOF      03 4024  KRCW1A
03 4006  KRDUAL      03 5123  KREQ1B      03 4025  KRFF1A      03 4102  KRDLRT
03 4020  KRTKOF      03 5154  KRTRD       03 4013  KR1A        03 4110  KSCALE
03 4733  KSERMD      03 5120  KSFCOT      03 5122  KSYNCH      03 5171  KTCMCL
03 5172  KTCMV       03 4004  KTD21A      03 4100  KTDFLR      03 4065  KTGS1A
03 4006  KTHD1A      03 5145  KTHRCF      03 5146  KTHROS      03 5150  KTHRTI
03 4017  KTHTFD      03 4066  KTHTGI      03 5151  KTHTHR      03 5173  KTHTWO
03 4005  KTHT1A      03 4156  KTKOFF      03 4043  KTOGA       03 4044  KTOGAI
03 5167  KTDVRW      03 4040  KUPP1A      03 4027  KUPR1A      03 4137  KVCF1
03 4140  KVCF2       03 4041  KVDOTC      03 4060  KVDSPT      03 4062  KVERCF
03 4061  KVISPT      03 0363  KVMPIT    S 03 4057  KVSPCP      03 0364  KVSPDP    S
03 0362  KVSPIT    S 03 4056  KVSPTK      03 5434  KVX50F      03 0754  KWOEAA    S
03 1643  KWOEAB    S 03 0760  KWOEA4    S 03 0771  KWOE13    S 03 4220  KWOPFO
03 4014  KYAWGR      03 4012  KYAY        03 4107  KYDL1A      03 0626  KYDVOR    S
03 4015  KYFF        03 4104  KYILOC      03 4117  KYIVOR      03 4105  KYLC1A
03 0603  KYLOC     S 03 4106  KYLT1A      03 4114  KYVOR       03 4115  KYVORC
03 4116  KYVORT      03 5142  K0OFAE      03 5156  K1AZAL      03 5163  K1CL
03 5207  K1CLM       03 4615  K1INDX      03 5161  K1LOVW      03 5177  K1PLIM
03 5176  K1VCMD      03 4112  K1VORF      03 4621  K11         03 4627  K12
03 5157  K2AZAL      03 5164  K2CL        03 5212  K2CL0       03 4132  K2HDRD
03 4617  K2INDX      03 5162  K2LOVW      03 5200  K2PLIM      03 4113  K2VORF
03 4635  K21         03 4643  K22         03 5201  K3PLIM      03 5202  K4PLIM
03 2161  LAGOUT    S 03 2162  LAGOU1    S 03 2206  LAGOU2    S 03 2362  LAGTMP    S
03 0253  LAMD1A    S 03 0146  LAMGSA    S 03 0147  LAMGSB    S 03 7002  LASTK
03 0436  LATACC    S 03 2471  LATCHY    S 03 2626  LATFLD    S 03 6007  LATMES
03 2545  LATMSG    S 03 0522  LIFTOF    S 03 0275  LNDFGA    S 03 0275  LNDFLG    S
03 0315  LNDTIM    S 03 2476  LOCBAO    S 03 0576  LOCOVF    S 03 0403  LOCTIM    S
03 0407  LOCVAL    S 03 4375  LSB8        03 0211  MACHAD    S 04 4002  MACHCA
03 2031  MACHCM    S 04 4127  MACHCT      04 4004  MACHDA      03 0075  MACHDS    S
04 4176  MACHDT      04 4003  MACHEA      04 4273  MACHET      03 0360  MACHRF    S
03 2511  MAKEIT    S 03 6111  MAN         03 5763  MAPMES      03 4010  MAXDYN
03 2043  MDPHAS    S 03 2354  MEMALA    S 03 2355  MEMALB    S 03 2356  MEMELA    S
03 2357  MEMELB    S 03 2352  MEMRDA    S 03 2353  MEMRDB    S 03 0751  MERRCF    S
03 2552  MESFLG    S 03 5446  MFLPLC      03 4007  MINDYN      03 5452  MINFGM
03 4766  MINTHR      03 2047  MINTRM    S 03 0311  MKIT1A    S 03 1200  MKIT1B    S
03 0312  MKIT2A    S 03 1201  MKIT2B    S 03 4406  MKTMSK      03 0077  MODE      S
03 5130  MODFCD      03 2546  MODMSG    S 03 0304  MONVLD    S 03 4203  MP82
03 3112  MSGCOD    S 03 3113  MSGC01    S 03 3114  MSGC02    S 03 3115  MSGC03    S
03 3116  MSGC04    S 03 3117  MSGC05   NS 03 3120  MSGC06   NS 03 3121  MSGC07   NS
03 3122  MSGC08    S 03 3123  MSGC09    S 03 3124  MSGC10   NS 03 3125  MSGC11   NS
03 3126  MSGC12   NS 03 3127  MSGC13   NS 03 3130  MSGC14   NS 03 3131  MSGC15   NS
03 3132  MSGC16   NS 03 3133  MSGC17   NS 03 3134  MSGC18   NS 03 3135  MSGC19   NS
03 3136  MSGC20   NS 03 3137  MSGC21   NS 03 3140  MSGC22   NS 03 3141  MSGC23   NS
03 3142  MSGC24   NS 03 3143  MSGC25   NS 03 3144  MSGC26   NS 03 3145  MSGC27   NS
03 3146  MSGC28   NS 03 3147  MSGC29   NS 03 3150  MSGC30   NS 03 3151  MSGC31   NS
03 4477  MSGMSK      03 2534  MSGSAV    S 03 2535  MSGTIM    S 03 0257  MSPENG    S
03 5411  MTRXCD      03 2015  NACPKS    S 03 2016  NBLSRC    S 04 4000  NOINDX
03 6344  NOMNUL      03 2514  NOTICK    S 03 2541  NPINOS    S 00 1375  NPOWIN    S
03 4404  NSWLFS      03 4501  NULMSK      03 7001  NUMCON      03 6120  NUMDCK
```

18196 SCAMP SECTION 2 PAGE 445
LIMITED ACCESS

| | | | | | | | | | | | | | | | |
|---|---|---|---|---|---|---|---|---|---|---|---|---|---|---|---|
| 03 | 0502 | NZMAX | S | 03 | 4545 | NZP10 | | 03 | 4543 | NZP25 | | 03 | 4541 | NZP5 | |
| 03 | 0066 | N1ACTL | S | 03 | 2026 | N1LIMT | S | 03 | 0524 | N1TIMR | S | 03 | 4411 | OCTL46 | |
| 03 | 6074 | OFFLAT | | 03 | 2512 | OFFPAS | S | 03 | 6005 | OFFPIT | | 03 | 4412 | ONE | |
| 03 | 4165 | ONEG | | 03 | 2533 | OPTPFT | S | 03 | 4476 | OUTMSK | | 03 | 0271 | PAPS1A | S |
| 03 | 2550 | PBLINK | S | 03 | 2553 | PBLKTI | S | 03 | 0274 | PCPFGA | S | 03 | 0274 | PCPFLG | S |
| 03 | 0355 | PCWS | S | 03 | 0357 | PCWSFG | S | 03 | 4032 | PCWSHO | | 03 | 4031 | PDEADZ | |
| 03 | 4033 | PDETNT | | 03 | 0224 | PFDC1A | S | 03 | 1113 | PFDC1B | S | 03 | 2531 | PFHLDB | S |
| 03 | 2530 | PFSTRT | S | 03 | 2527 | PFTFLG | S | 03 | 2532 | PFTOGF | S | 03 | 0400 | PHCOLD | S |
| 03 | 0246 | PHI1A | S | 03 | 0134 | PHIA | S | 03 | 0135 | PHIB | S | 03 | 0332 | PHIC | S |
| 03 | 0445 | PHICFD | S | 03 | 0334 | PHICOM | S | 03 | 0470 | PHIDLM | S | 03 | 0467 | PHIDMX | S |
| 03 | 0126 | PHIDTA | S | 03 | 0127 | PHIDTB | S | 03 | 0243 | PHID1A | S | 03 | 0331 | PHIIC | S |
| 03 | 0466 | PHIMAX | S | 03 | 0333 | PHIP | S | 03 | 0710 | PHIP1 | S | 03 | 0264 | PITA1A | S |
| 03 | 0373 | PITDWN | S | 03 | 0265 | PITENG | S | 03 | 0265 | PITE1A | S | 03 | 0267 | PITFLG | S |
| 04 | 4005 | PLACAD | | 04 | 4245 | PLACRD | | 03 | 0264 | PLANDA | S | 00 | 1370 | PLIM1 | |
| 03 | 2055 | PLMFLG | S | 03 | 2556 | PLOTER | S | 03 | 0014 | PLTADR | S | 03 | 2540 | PLTMSG | S |
| 03 | 6754 | PMODCK | | 03 | 6753 | PMODPR | | 00 | 0012 | POWERI | S | 03 | 2500 | POWFLG | S |
| 00 | 1363 | POWIAD | | 00 | 1373 | POWIFL | S | 03 | 2045 | PROFIL | S | 00 | 1374 | PSAVE | S |
| 03 | 0200 | PSIHCL | S | 03 | 0731 | PSIPRD | S | 03 | 0267 | PSYNFA | S | 03 | 0271 | PTAPS1 | S |
| 03 | 0356 | PTOCWS | S | 03 | 0343 | PWHLCD | S | 03 | 5136 | P15815 | | 03 | 5137 | P30815 | |
| 03 | 4011 | QZERO | | 03 | 0427 | RALTFG | S | 03 | 5124 | RAMSGN | | 03 | 0270 | RAPS1A | S |
| 03 | 2547 | RBLINK | S | 03 | 2554 | RBLKTI | S | 03 | 0273 | RCPFGA | S | 03 | 0273 | RCPFLG | S |
| 03 | 0347 | RCWS | S | 03 | 0353 | RCWSFG | S | 03 | 4022 | RCWSHO | | 03 | 4021 | RDEADZ | |
| 03 | 2330 | RDEQ1A | S | 03 | 2331 | RDEQ1B | S | 03 | 4023 | RDETNT | | 03 | 2376 | RDMDC1 | S |
| 03 | 2377 | RDMDC2 | S | 03 | 0172 | RDMODA | S | 03 | 0173 | RDMODB | S | 03 | 0164 | RDRAMA | S |
| 03 | 0165 | RDRAMB | S | 03 | 0156 | RDSADA | S | 03 | 0157 | RDSADB | S | 03 | 4556 | RDSERL | |
| 03 | 2322 | RDSM1A | S | 03 | 2323 | RDSM1B | NS | 03 | 2260 | REMINT | S | 03 | 2336 | REMSER | S |
| 03 | 0223 | RFDC1A | S | 03 | 1112 | RFDC1B | S | 03 | 4142 | RHOTBL | | 03 | 4143 | RHOTB1 | |
| 03 | 0262 | RLANDA | S | 03 | 0270 | RLAPS1 | S | 03 | 6737 | RMODCK | | 03 | 6736 | RMODIV | |
| 03 | 0625 | RNGEST | S | 03 | 0740 | RNGGRL | S | 03 | 0451 | RNGRAW | NS | 03 | 0262 | ROLA1A | S |
| 03 | 0263 | ROLENG | S | 03 | 0263 | ROLE1A | S | 03 | 0266 | ROLFLG | S | 03 | 0266 | RSYNFA | S |
| 00 | 1361 | RTINAD | | 03 | 0351 | RTOCWS | S | 03 | 0402 | RTOGAF | S | 03 | 5140 | RTRALT | N |
| 03 | 0736 | RTRDRM | S | 03 | 0220 | RUDC1A | S | 03 | 1107 | RUDC1B | S | 03 | 2370 | RUDDRA | S |
| 03 | 2371 | RUDDRB | NS | 03 | 0335 | RWHLCD | S | 03 | 6113 | SCADTB | | 03 | 4166 | SCD573 | |
| 03 | 6157 | SCLTB0 | | 03 | 6151 | SCLTB1 | | 03 | 6145 | SCLTB2 | | 03 | 6135 | SCLTB3 | |
| 03 | 6125 | SCLTB4 | | 03 | 2503 | SEACNT | S | 03 | 2504 | SEAFCT | S | 03 | 2501 | SEAFLG | S |
| 03 | 2502 | SEAPNT | S | 03 | 6176 | SENADR | | 03 | 6261 | SENSCL | | 03 | 4740 | SERBFA | |
| 00 | 1532 | SERBUF | S | 03 | 4410 | SERB2M | | 03 | 4477 | SERIAM | | 03 | 2363 | SERMD0 | S |
| 03 | 2364 | SERMD1 | NS | 03 | 2365 | SERMD2 | S | 03 | 2366 | SERMD3 | NS | 03 | 2367 | SERMD4 | NS |
| 03 | 0365 | SERRCF | S | 03 | 4463 | SEVEN | | 03 | 4463 | SEVEN1 | | 03 | 5454 | SIN0 | |
| 03 | 5455 | SIN01 | | 03 | 0473 | SINPHC | S | 03 | 0477 | SINPHI | S | 03 | 0501 | SINPSI | S |
| 03 | 0475 | SINTHT | S | 03 | 4503 | SIX | N | 03 | 2361 | SLNDTM | S | 03 | 0313 | SPDBRK | S |
| 03 | 0523 | SPDFLG | S | 03 | 4167 | SPDSND | | 03 | 0367 | SPTCNT | S | 00 | 1371 | SRPOWR | S |
| 03 | 0065 | STABPS | S | 03 | 3152 | STACK | S | 00 | 1413 | STACK1 | S | 00 | 1367 | STACK2 | |
| 03 | 0277 | STATE0 | S | 03 | 0300 | STATE1 | S | 03 | 0301 | STATE2 | S | 03 | 0302 | STATE3 | S |
| 03 | 0303 | STATE4 | S | 03 | 0217 | STATMP | NS | 03 | 4377 | ST0MSK | | 03 | 4400 | ST1MSK | |
| 03 | 4401 | ST2MSK | | 03 | 4402 | ST3MSK | | 03 | 4403 | ST4MSK | | 03 | 2513 | SUMTIM | S |
| 03 | 4211 | SWINGA | | 03 | 2360 | SYNTIM | S | 03 | 5121 | SYWORT | | 04 | 4014 | TABAFS | |
| 03 | 4111 | TANGSN | | 03 | 0316 | TDFLAG | S | 03 | 2472 | TEMPB3 | S | 03 | 2473 | TEMPB4 | S |
| 03 | 2537 | TEMPDC | S | 03 | 2523 | TEMPFT | S | 03 | 1776 | TEMP1 | S | 03 | 1777 | TEMP1A | S |
| 03 | 2000 | TEMP2 | S | 03 | 2001 | TEMP2A | S | 03 | 2002 | TEMP3 | NS | 03 | 2003 | TEMP3A | NS |
| 04 | 3000 | TEMP41 | S | 04 | 3001 | TEMP42 | S | 04 | 3002 | TEMP43 | S | 03 | 4660 | TEN | |
| 03 | 4172 | TENKTS | | 03 | 0132 | THETAA | S | 03 | 0133 | THETAB | S | 03 | 0340 | THETAC | S |

18196 SCAMP SECTION 2 PAGE 446
LIMITED ACCESS

| | | | | | | | | | | | | | | | |
|---|---|---|---|---|---|---|---|---|---|---|---|---|---|---|---|
| 03 | 0471 | THETAL | S | 03 | 0341 | THETAP | S | 03 | 0337 | THETIC | S | 03 | 0707 | THETP1 | S |
| 03 | 0245 | THET1A | S | 03 | 0504 | THRCMD | S | 03 | 2567 | THRCOM | S | 03 | 4501 | THREE | |
| 03 | 0100 | THRENG | S | 03 | 5155 | THRLIM | | 03 | 0520 | THRMOD | S | 03 | 2542 | THRMSG | S |
| 03 | 6074 | THROTL | | 03 | 0272 | THRPS1 | S | 03 | 2025 | THRTLM | S | 03 | 0444 | THTCFD | S |
| 03 | 0342 | THTCOM | S | 03 | 0465 | THTDLM | S | 03 | 0464 | THTDMX | S | 03 | 0130 | THTDTA | S |
| 03 | 0131 | THTDTB | S | 03 | 0244 | THTD1A | S | 03 | 0505 | THTFGS | S | 03 | 0514 | THTMPL | S |
| 03 | 5174 | THTWOF | | 03 | 5175 | THTWOP | N | 03 | 6765 | TICKET | | 00 | 1360 | TIMECA | |
| 03 | 5065 | TIMEHG | | 03 | 4537 | TLAPCN | | 03 | 2004 | TMPFIL | S | 03 | 2524 | TMPPF1 | S |
| 03 | 2525 | TMPPF2 | S | 03 | 0377 | TOGAHI | S | 03 | 6756 | TOGBIT | | 03 | 2305 | TOGCNT | S |
| 03 | 0317 | TOGF1A | S | 03 | 0215 | TOTEMP | S | 03 | 0512 | TOVRW | S | 03 | 2007 | TPA1 | NS |
| 03 | 2011 | TPA2 | S | 03 | 2013 | TPA3 | S | 03 | 2014 | TPA3A | S | 03 | 2006 | TPAB | S |
| 03 | 4533 | TRIMAX | | 03 | 2505 | TRYCNT | S | 00 | 1400 | TSAVE | S | 03 | 6777 | TSTACC | |
| 03 | 6772 | TSTALT | N | 03 | 2566 | TSTDAT | S | 03 | 6771 | TSTGS | N | 03 | 6774 | TSTHOT | N |
| 03 | 6773 | TSTIAS | N | 03 | 6770 | TSTLOC | N | 03 | 6776 | TSTMCH | N | 03 | 6775 | TSTTAS | N |
| 03 | 7000 | TSTYRT | | 03 | 4505 | TWENTY | | 03 | 4413 | TWO | | 03 | 5166 | TWOFST | |

18198 SCAMP SECTION 2 PAGE 446
LIMITED ACCESS

-continued

| | | | | | | | | | | | | | | | |
|---|---|---|---|---|---|---|---|---|---|---|---|---|---|---|---|
| 03 | 0711 | VALMSG | | 03 | 2037 | VAPPRC | NS | 03 | 4225 | VAPPTA | | 03 | 0446 | VAPTOG | S |
| 04 | 4007 | VARFST | | 03 | 2517 | VARIDX | S | 03 | 0516 | VASERR | S | 03 | 0212 | VCASAD | S |
| 03 | 2034 | VCASCL | NS | 03 | 0567 | VCASDT | S | 03 | 0361 | VCASRF | S | 03 | 4141 | VCFLIM | N |
| 03 | 0735 | VCOMND | S | 03 | 0366 | VDCFLG | S | 03 | 0434 | VDTLNG | S | 03 | 0435 | VDTTCF | S |
| 03 | 0750 | VERRCF | S | 03 | 2035 | VFLPDP | NS | 03 | 0722 | VGRDRL | S | 03 | 4651 | VMCGSI | |
| 03 | 4652 | VMCGB1 | | 03 | 4654 | VMCGSL | | 03 | 0213 | VMDAID | NS | 03 | 0414 | VORBET | S |
| 03 | 0067 | VORBT1 | S | 03 | 0074 | VORENF | S | 03 | 0102 | VORFLG | S | 03 | 2050 | VORFSV | S |
| 03 | 0101 | VORHER | S | 03 | 0416 | VORINF | S | 03 | 0070 | VORRGI | S | 03 | 0413 | VORRNG | S |
| 03 | 0415 | VORTIM | S | 03 | 2646 | VRTFLD | S | 03 | 2544 | VRTMSG | S | 03 | 0506 | VSELEC | S |
| 03 | 0064 | VSELIN | S | 03 | 0214 | VTASAD | S | 03 | 0714 | VTASCF | S | 03 | 0725 | VTASCT | S |
| 03 | 0437 | VTASHD | S | 03 | 0507 | VTCDOT | S | 03 | 4164 | VT200 | | 03 | 5425 | V0FLAP | |
| 03 | 5426 | V0FLP1 | N | 03 | 4175 | V168KT | | 03 | 4176 | V171KT | | 03 | 4177 | V250KT | |
| 03 | 4200 | V260KT | | 03 | 4201 | V290KT | | 03 | 4202 | V340KT | | 03 | 4173 | V45KTS | |
| 03 | 5453 | V50FLP | | 03 | 2024 | WAIFL | S | 03 | 0745 | WEIGHT | S | 03 | 4655 | WGT260 | |
| 03 | 4656 | WGT300 | N | 03 | 4155 | WGTNOM | | 03 | 0204 | WHL1ST | S | 03 | 0202 | WHLCAP | S |
| 03 | 4405 | WHLMSK | | 03 | 2507 | WORDNO | S | 03 | 0350 | WOW4 | S | 03 | 0346 | WOW | S |
| 04 | 3012 | WTIFTR | NS | 04 | 3005 | WTINDX | S | 04 | 4106 | WTTABL | | 04 | 4112 | WTTBLE | |
| 03 | 4126 | XLOCSN | | 03 | 0124 | YAWRTA | S | 03 | 0125 | YAWRTB | S | 03 | 0242 | YAWR1A | S |
| 03 | 1131 | YAWR1B | S | 03 | 0406 | YDDLOC | S | 03 | 0412 | YDDVOR | S | 03 | 0305 | YDENGF | S |
| 03 | 0306 | YDNOT | S | 03 | 0450 | YDOTLM | S | 03 | 0447 | YDTLM1 | S | 03 | 0405 | YDTLOC | S |
| 03 | 0411 | YDTVOR | S | 03 | 0225 | YFDC1A | NS | 03 | 1114 | YFDC1B | NS | 03 | 0404 | YLOC | S |
| 03 | 0723 | YLOCFL | S | 03 | 0410 | YVOR | S | 03 | 0730 | YVORFL | S | 03 | 4500 | ZERO | |
| 03 | 4374 | ZERON | N | 03 | 4730 | ZTFAD1 | N | 03 | 4731 | ZTFAD2 | N | 03 | 0525 | ZTFIPA | S |
| 03 | 1414 | ZTFIPB | S | 03 | 0526 | ZTFIP1 | S | 03 | 0527 | ZTFIP2 | S | 03 | 0530 | ZTFIP3 | NS |
| 03 | 0531 | ZTFIP4 | S | 03 | 0532 | ZTFIP5 | S | 03 | 0533 | ZTFIP6 | NS | 03 | 0534 | ZTFIP7 | S |
| 03 | 0535 | ZTFIP8 | S | 03 | 0536 | ZTFIP9 | S | 03 | 0537 | ZTFI10 | NS | 03 | 0540 | ZTFI11 | NS |
| 03 | 0541 | ZTFI12 | S | 03 | 0542 | ZTFI13 | S | 03 | 0543 | ZTFI14 | S | 03 | 0575 | ZTFO0A | S |
| 03 | 1464 | ZTFO0B | S | 03 | 0607 | ZTFO10 | S | 03 | 0610 | ZTFO11 | S | 03 | 0611 | ZTFO12 | S |
| 03 | 0612 | ZTFO13 | NS | 03 | 0614 | ZTFO15 | NS | 03 | 0615 | ZTFO16 | NS | 03 | 0616 | ZTFO17 | S |
| 03 | 0617 | ZTFO18 | S | 03 | 0620 | ZTFO19 | S | 03 | 0577 | ZTFO2 | S | 03 | 0621 | ZTFO20 | S |
| 03 | 0622 | ZTFO21 | S | 03 | 0623 | ZTFO22 | S | 03 | 0624 | ZTFO23 | S | 03 | 0627 | ZTFO26 | S |
| 03 | 0630 | ZTFO27 | S | 03 | 0600 | ZTFO3 | S | 03 | 0602 | ZTFO5 | S | 03 | 0604 | ZTFO7 | S |
| 03 | 0605 | ZTFO8 | S | 03 | 0606 | ZTFO9 | S | 03 | 0634 | ZTRNRA | S | 03 | 1523 | ZTRNRB | S |
| 03 | 0551 | ZTWO0A | S | 03 | 1440 | ZTWO0B | S | 03 | 0552 | ZTWO1 | S | 03 | 0563 | ZTWO10 | S |
| 03 | 0564 | ZTWO11 | NS | 03 | 0565 | ZTWO12 | S | 03 | 0566 | ZTWO13 | S | 03 | 0553 | ZTWO2 | S |
| 03 | 0554 | ZTWO3 | NS | 03 | 0555 | ZTWO4 | S | 03 | 0556 | ZTWO5 | S | 03 | 0557 | ZTWO6 | NS |
| 03 | 0560 | ZTWO7 | S | 03 | 0561 | ZTWO8 | S | 03 | 0562 | ZTWO9 | S | | | | |

18198 SCAMP SECTION 2 PAGE 447
LIMITED ACCESS

SECTION 5

| | | | | | | | | | | | | | | | |
|---|---|---|---|---|---|---|---|---|---|---|---|---|---|---|---|
| 00 | 0360 | ANSCLK | | 00 | 0522 | BITADD | N | 00 | 0640 | BITERT | N | 00 | 0514 | CHKPFT | |
| 00 | 0525 | CLKOUT | | 00 | 1351 | CLRCOM | | 00 | 0265 | CWSTST | | 00 | 1014 | DADUTP | |
| 00 | 1151 | DIGINT | | 00 | 1346 | EXC1A | | 00 | 1346 | EXC1B | | 00 | 0673 | EXFDV1 | |
| 00 | 0755 | FAIL1C | | 00 | 1335 | ICRSAV | N | 00 | 0620 | INKEEP | | 00 | 1075 | LSTFAL | |
| 00 | 1024 | MAPCNT | | 00 | 1040 | MAPCN1 | | 00 | 1056 | MAPCN2 | | 00 | 1060 | MAPCN3 | N |
| 00 | 1070 | MAPCN4 | | 00 | 1072 | MAPCN5 | | 00 | 1077 | MAPCN6 | | 00 | 1105 | MAPCN7 | |
| 00 | 1120 | MAPCN8 | | 00 | 1146 | MAPCN9 | | 00 | 1150 | MAPCXT | | 00 | 1137 | MAPC10 | |
| 00 | 1110 | MONFAL | | 00 | 0274 | NORSTT | | 00 | 1350 | OUTRDY | | 00 | 0247 | PFTCHK | |
| 00 | 0523 | PFTSTR | | 00 | 1162 | POWINT | | 00 | 1252 | POWRST | | 00 | 1352 | PREFLT | |
| 00 | 1347 | SENMNA | | 00 | 0662 | SERINP | | 00 | 0674 | SERIN1 | | 00 | 1250 | SKPSAV | |
| 00 | 0771 | SNGLCH | N | 00 | 1353 | SRMODL | | 00 | 1343 | SRSAVE | N | 00 | 1004 | STATCK | |
| 00 | 1006 | STATC1 | | 00 | 1012 | STATC2 | | 00 | 0703 | STATIN | | 00 | 0705 | STATI1 | |
| 00 | 0205 | STRTP1 | | 00 | 0200 | STRTUP | | 00 | 1355 | THRUST | | 00 | 0711 | TKCHEK | |
| 00 | 0352 | TKILL | | 00 | 1354 | TLOCIN | | | | | | | | | |

SECTION 9

| | | | | | | | | | | | | | | | |
|---|---|---|---|---|---|---|---|---|---|---|---|---|---|---|---|
| 00 | 2057 | CHKNXT | | 00 | 2033 | CLROUT | N | 00 | 2011 | COMPTR | | 00 | 2054 | FAILEA | |
| 00 | 2000 | FAILIT | | 00 | 2005 | FAISEN | | 00 | 2066 | FALCHK | | 00 | 2076 | FALCH1 | |
| 00 | 2105 | FALCH2 | N | 00 | 2012 | PRNTFL | | 00 | 2021 | PRNTF1 | | | | | |

-continued

SECTION 10

| | |
|---|---|
| 00 2111 | INMONF |

SECTION 11

| | | | |
|---|---|---|---|
| 00 2140 | SUMCHK | 00 2152 | SUMFAI |

SECTION 12

| | | | |
|---|---|---|---|
| 00 2157 | DIGBF1 | 00 2155 | DIGBUF |

SECTION 13

| | | | | | | | |
|---|---|---|---|---|---|---|---|
| 00 2305 | ADCK1 | 00 2255 | CHKNAD | 00 2332 | ENDACK | 00 2321 | FAIRDT |
| 00 2216 | GOWORD | 00 2252 | INPSKP | 00 2245 | INPUT | 00 2173 | LOPAIR |
| 00 2234 | NXTWAD | 00 2275 | SEAOK | 00 2166 | SERINC | 00 2214 | SERIN1 |
| 00 2315 | XITARN | | | | | | |

| | | | | | | | |
|---|---|---|---|---|---|---|---|
| 00 2400 | EAFAIL | 00 2345 | EAMONT | 00 2401 | EAMON1 | 00 2371 | EAMON2 |
| 00 2347 | EANXT1 | | | | | | |

SECTION 15

| | | | | | | | |
|---|---|---|---|---|---|---|---|
| 00 3175 | ARMDIS | 00 2557 | CWSFLG | 00 2710 | MANCK1 | 00 2714 | MANCK2 |
| 00 2410 | MODISC | 00 2410 | MOOSC1 | 00 2703 | MPDISP | 00 2770 | MPDIS1 |
| 00 3042 | MPDIS2 | 00 3053 | MPDIS3 | 00 3060 | MPDIS4 | 00 3064 | MPDIS5 |
| 00 3076 | MPDIS6 | 00 3026 | ONPITC | 00 2754 | ONROLL | 00 3000 | PBLANK |
| 00 3032 | PBLNKT | 00 3015 | PBLNK? | 00 3004 | PMSGCK | 00 3002 | PMSGCP |
| 00 3040 | POFFCK | 00 2760 | RBLNKT | 00 2743 | RBLNK? | 00 2732 | RMSGCK |
| 00 2730 | RMSGCP | 00 2766 | ROFFCK | 00 2722 | ROLCK1 | 00 3114 | THRMCK |
| 00 2424 | VALCK1 | 00 2471 | VALCK2 | 00 2515 | VALCK3 | 00 2526 | VALCK4 |
| 00 2615 | VALCK5 | 00 2641 | VALCK6 | 00 2666 | VALCK7 | 00 2700 | VALCK8 |
| 00 2702 | VALCK9 | 00 2565 | VALC4P | 00 2660 | VALC6P | 00 2464 | VALFL1 |
| 00 2512 | VALFL2 | 00 2524 | VALFL3 | 00 2611 | VALFL4 | 00 2637 | VALFL5 |
| 00 2664 | VALFL6 | 00 3125 | XITMPU | | | | |

SECTION 16

| | | | | | | | |
|---|---|---|---|---|---|---|---|
| 00 3174 | N1EXIT | 00 3133 | TSTFMT | 00 3142 | TSTFM1 | 00 3145 | TSTFM2 |
| 00 3150 | TSTFM3 | | | | | | |

SECTION 17

| | | | | | | | |
|---|---|---|---|---|---|---|---|
| 00 3212 | FMABLN | 00 3214 | FMACN1 | 00 3216 | FMACN2 | 00 3175 | FMATRN |

SECTION 18

| | | | | | |
|---|---|---|---|---|---|
| 00 3237 | ANMESS | 00 3245 | NEXT3 | 00 3247 | REPETE |

SECTION 19

| | | | | | | | |
|---|---|---|---|---|---|---|---|
| 00 3300 | DISDC1 | 00 3305 | DISDC2 | 00 3312 | DISDC3 | 00 3317 | DISDC4 |
| 00 3322 | DISDC5 | 00 3331 | DISDC6 | 00 3272 | DISDEC | | |

SECTION 20

| | | | | | |
|---|---|---|---|---|---|
| 00 3347 | DISDI1 | 00 3352 | DISDI2 | 00 3333 | INTGR3 |

SECTION 21

| | | | | | | | |
|---|---|---|---|---|---|---|---|
| 00 3716 | ALTXIT | 00 3737 | AUTOCH | 00 3426 | DISCIN | 00 3360 | DSCRET |
| 00 3372 | DSCRT1 | 00 3431 | DSCRT2 | 00 3444 | DSCRT3 | 00 3457 | DSCRT4 |
| 00 3513 | DSCRT5 | 00 3531 | DSCRXT | 00 3537 | DSCRX1 | 00 3541 | DSCRX2 |
| 00 4075 | DSCTIM | 00 4131 | DSCTMX | 00 4106 | DSCTM1 | 00 4111 | DSCTM2 |
| 00 4116 | DSCTM3 | 00 3422 | DSRT1B | 00 3670 | HDGXIT | 00 3646 | ILDXIT |
| 00 3617 | ILSXIT | 00 3634 | PCWXIT | 00 3542 | STT0CK | 00 3560 | STT1CK |
| 00 3621 | STT1C2 | 00 3636 | STT1C3 | 00 3650 | STT1C4 | 00 3672 | STT1C6 |
| 00 3720 | STT2CK | 00 3721 | STT3CK | 00 4010 | STT3C2 | 00 4030 | STT3C3 |
| 00 4025 | STT3OF | 00 4040 | STT4CK | 00 4050 | STT4C1 | 00 4054 | STT4C2 |
| 00 4065 | STT4C3 | 00 4132 | ST0CHK | 00 3551 | ST0XIT | 00 3717 | ST1XIT |

```
  1819B SCAMP                                   SECTION      21      PAGE     449
LABEL TABLE

00 4037  ST3XIT     00 4074  ST4XIT     00 3757  TOCHEK     00 3744  TOGACH
00 3767  TOGAST     00 3774  TOGAS1     00 4006  TOGXIT

                                        SECTION      22

00 4137  PTESET     00 4145  PTEST1

                                        SECTION      23

00 4147  PTASET     00 4154  PTAST1

                                        SECTION      24

00 4155  ACONGD     00 4164  ACOXIT

                                        SECTION      25

00 4165  RLESET     00 4174  RLEST1

                                        SECTION      26

00 4175  RLASET     00 4202  RLAST1

                                        SECTION      27

00 4203  THRSET

                                        SECTION      28

00 4211  FPACMP

                                        SECTION      29

00 4226  LNDRGN     00 4243  XITLRG

                                        SECTION      30

00 4244  LNDPGN     00 4255  XITLPG

                                        SECTION      31

00 4274  FAILP1     00 4303  FAILP2     00 4307  FAILP3   N  00 4262  FAILUP
00 4322  FAILXT     00 4317  NXTFP1     00 4312  NXTFUP

                                        SECTION      32

00 4324  FAILST     00 4327  FAILS1     00 4334  FAILS2     00 4346  FAILXT

  1819B SCAMP                                   SECTION      33      PAGE     450
LABEL TABLE

00 4347  VALFAL     00 4356  VALXIT

                                        SECTION      34

00 4357  NOPCHK

                                        SECTION      35

00 4361  GSECHK     00 4377  GSEFAL     00 4407  GSEXIT

                                        SECTION      36

00 4410  ALTCHK

                                        SECTION      37

00 4420  AIRDCK     00 4442  AIRDFC     00 4440  AIRDOK

                                        SECTION      38

00 4443  GAECHK     00 4453  GAEFAL
```

1R198 SCAMP SECTION PAGE 450
LABEL TABLE

-continued

SECTION 39

00 4461 TOECHK 00 4500 TOEFAL

SECTION 40

00 4503 FLACHK

SECTION 41

00 4513 GSACHK 00 4522 GSAFAL

SECTION 42

00 4525 GNRCHK 00 4540 GNRFAL

SECTION 43

00 4543 LATCHK 00 4553 LATFAL

SECTION 44

00 4556 HDGSCK

SECTION 45

00 4572 ILSTUN 00 4601 XITILV

1R198 SCAMP SECTION 46 PAGE 451
LABEL TABLE 00 4602 GSMCHK 00 4611 XITGSV

SECTION 47

00 4612 TOGAVA 00 4621 XITTGA

SECTION 48

00 4622 HDGVLD 00 4631 XITHVD

SECTION 49

00 4632 RAMCHK 00 4644 XITRAV

SECTION 50

00 4645 LOCHCK 00 4665 LOCHFL 00 4674 XITLCH

SECTION 51

00 4711 LATLFL 00 4675 LATLND 00 4712 XITLLN

SECTION 52

00 4713 YDFAIL

SECTION 53

00 4720 YDFFAL

SECTION 54

00 4726 FDFAIL

SECTION 55

00 4733 CMFAIL

SECTION 56

00 4742 LNDFAL

1819B SCAMP SECTION PAGE 451
LABEL TABLE

-continued

SECTION 57

00 4755 ALLMOD

SECTION 58

00 4767 POFFST

1819B SCAMP SECTION 59 PAGE 452
LABEL TABLE 00 4774 LNDAFL

SECTION 60

| | | | | | | | |
|---|---|---|---|---|---|---|---|
| 00 5037 | AUTTBL | 00 5050 | INDEXS | 00 5022 | PARMTB | 00 5026 | PENGTB |
| 00 5013 | RENGTB | 00 5006 | ROFFST | 00 5045 | SINCSN | 00 5047 | TABLED |
| 00 5046 | TABLES | | | | | | |

SECTION 61

| | | | |
|---|---|---|---|
| 00 5051 | TAKEOF | 00 5071 | TOFXIT |

SECTION 62

| | | | | | | | |
|---|---|---|---|---|---|---|---|
| 00 5344 | CLMB5 | 00 5363 | CLMB6 | 00 5072 | CLMOUT | 00 5153 | CLMPH1 |
| 00 5201 | CLMPH2 | 00 5261 | CLMPH3 | 00 5332 | CLMPH4 | 00 5360 | CLMPH5 |
| 00 5116 | CLMPS2 | 00 5172 | CLMP01 | 00 5147 | CLMP10 | 00 5175 | CLMP11 |
| 00 5220 | CLMP12 | 00 5314 | CLMP13 | 00 5366 | CLMXIT | 00 5355 | CPHSIN |

SECTION 63

| | | | | | | | |
|---|---|---|---|---|---|---|---|
| 00 5371 | CRSPS1 N | 00 5376 | CRSPS2 | 00 5422 | CRSXIT | 00 5367 | CRUISE |
| 00 5406 | CRUIS1 | 00 5407 | CRUIS2 | 00 5417 | CRUIS3 | | |

SECTION 64

| | | | | | |
|---|---|---|---|---|---|
| 00 5423 | ENRCLM | 00 5445 | ENRCLX | 00 5437 | ENRCL1 |

SECTION 65

| | | | | | | | |
|---|---|---|---|---|---|---|---|
| 00 5446 | DESCNT | 00 5651 | DESEXT | 00 5646 | DPHSIN | 00 5500 | DSNTP2 |
| 00 5510 | DSNT00 | 00 5512 | DSNT01 | 00 5464 | DSNT10 | 00 5532 | DSNT11 |
| 00 5546 | DSNT12 | 00 5557 | DSNT13 | 00 5627 | DSNT14 | 00 5640 | DSNT15 |
| 00 5514 | DSTPH1 | 00 5534 | DSTPH2 | 00 5565 | DSTPH3 | 00 5600 | DSTPH4 |
| 00 5613 | DSTPH5 | 00 5632 | DSTPH6 | 00 5670 | DSXIT | 00 5476 | SLOWDN |

SECTION 66

00 5673 FPAHD1

SECTION 67

| | | | | | |
|---|---|---|---|---|---|
| 00 5700 | CLMACH | 00 5722 | CRSMAC | 00 5711 | DSMACH |

SECTION 68

| | | | | | | | |
|---|---|---|---|---|---|---|---|
| 00 6033 | DALTLP | 00 5734 | FLPCMP | 00 5772 | FLPCM1 | 00 6006 | FLPCM2 |
| 00 6024 | FLPCM3 | 00 6056 | FLPINC | 00 6116 | NOCHNG | 00 6106 | PLCFLP |
| 00 6072 | PLFINC | 00 6075 | SETF50 | 00 6041 | TOTAL | 00 6042 | TOTLOP |

1819B SCAMP SECTION 69 PAGE 453
LABEL TABLE

| | | | | | | | |
|---|---|---|---|---|---|---|---|
| 00 6160 | FLPLCM | 00 6147 | FLPLC1 | 00 6154 | FLPLC2 | 00 6137 | FLPLIM |
| 00 6165 | FLPLXT | 00 6121 | PLACLM | | | | |

SECTION 70

| | | | | | |
|---|---|---|---|---|---|
| 00 6210 | HDCKXT | 00 6166 | HDDTCK | 00 6202 | HDDTC1 |

-continued

SECTION 71

| | | | | | | | | | | | |
|---|---|---|---|---|---|---|---|---|---|---|---|
| 02 | 1143 | BITST1 | 02 | 1162 | BITST2 | 02 | 1140 | BITTST | 02 | 1130 | BUTEST |
| 02 | 1475 | CLERDA | 02 | 1527 | COMALA | 02 | 1534 | COMALB | 02 | 1541 | COMELA |
| 02 | 1546 | COMELB | 02 | 1515 | COMRDA | 02 | 1522 | COMRDB | 02 | 1222 | CWSCKN |
| 02 | 1206 | CWSCKP | 02 | 1225 | CWSCN1 | 02 | 1234 | CWSCN2 | 02 | 1211 | CWSCP1 |
| 02 | 1220 | CWSCP2 | 02 | 1431 | DEGRES | 02 | 1435 | DGPSEC | 02 | 1553 | DISDE1 |
| 02 | 1461 | DISDIA | 02 | 1200 | ERRALN | 02 | 1173 | ERRALP | 02 | 1247 | ERROR |
| 02 | 1252 | ERROR1 | 02 | 1257 | ERROR2 | 02 | 1264 | ERROR3 | 02 | 1165 | ERROR? |
| 02 | 1554 | FAILRC | 02 | 1342 | FAIPNT | 02 | 1437 | FEET | 02 | 1114 | FORGIT |
| 02 | 1433 | FPSEC2 | 02 | 0127 | FUNCT1 | 02 | 0122 | FUNCT2 | 02 | 1326 | INCDIA |
| 02 | 1556 | INTGER | 02 | 1070 | LISTER | 02 | 0216 | NULCK1 | 02 | 1361 | NULCK2 |
| 02 | 1400 | NULDIS | 02 | 1451 | NULDS1 | 02 | 1456 | NULDS2 | 02 | 1353 | NULLCK |
| 02 | 1374 | NULREN | 02 | 0335 | PFT2 | 02 | 0343 | PFT3 | 02 | 0346 | PFT4 |
| 02 | 0331 | PFT5 | 02 | 0352 | PFT6 | 02 | 0000 | PFT | 02 | 1060 | PFTLST |
| 02 | 1110 | PFTOKL | 02 | 1471 | PFTSER | 02 | 1063 | PFTWT | 02 | 1074 | PFTWT1 |
| 02 | 1555 | REHASH | 02 | 1333 | SERCHK | 02 | 0153 | SYLOOP | 02 | 1265 | TIMER |
| 02 | 1271 | TIMERS | 02 | 1272 | TIMRS1 | 02 | 1275 | TLOC | 02 | 1317 | TLOC1 |
| 02 | 1236 | VERIFY | 02 | 1241 | VERIF1 | 02 | 1325 | XITLOC | | | |

SECTION 72

| | | | | | | | | | | | |
|---|---|---|---|---|---|---|---|---|---|---|---|
| 02 | 4031 | ALELSF | 02 | 4273 | BYPASS | 02 | 4272 | DUALNT | 02 | 4065 | EQULOP |
| 02 | 4213 | NOTYO1 | 02 | 4173 | OTLOOP | 02 | 4000 | OUTSET | 02 | 4012 | PARLEL |
| 02 | 4160 | PFDFSC | 02 | 4222 | PTRLEN | 02 | 4163 | RFDCHK | 02 | 4167 | RFDFSC |
| 02 | 4200 | RUDENG | 02 | 4202 | RUDEN1 | 02 | 4014 | RUDREN | 02 | 4114 | SCHANA |
| 02 | 4235 | SETPR1 | 02 | 4216 | SETYD1 | 02 | 4043 | SFDUAL | 02 | 4061 | SFDUL1 |
| 02 | 4046 | SFREN1 | 02 | 4250 | SNGARM | | | | | | |

SECTION 73

02 4277 INTGSR

SECTION 74

02 4306 SYNCH

SECTION 75

02 4322 SYNWOT 02 4333 SYNWOX 02 4334 SFCSCL

SECTION 77

| | | | | | | | | | | | |
|---|---|---|---|---|---|---|---|---|---|---|---|
| 02 | 4450 | CRSMN1 | 02 | 4445 | CRSMON | 02 | 4477 | ENDSRM | 02 | 4411 | GSMONC |
| 02 | 4404 | MONCK1 | 02 | 4417 | MONCK2 | 02 | 4432 | MONCK3 | 02 | 4424 | RAMONC |
| 02 | 4350 | SENSRL | 02 | 4346 | SENSRM | 02 | 4364 | SENSR1 | | | |

SECTION 78

| | | | | | | | | |
|---|---|---|---|---|---|---|---|---|
| 02 | 4600 | GOOUIN | 02 | 4505 | SENMON | 02 | 4603 | SNOTOK |

SECTION 79

| | | | | | | | | | | | |
|---|---|---|---|---|---|---|---|---|---|---|---|
| 02 | 4631 | DEDZNA | 02 | 4626 | DTOINC | 02 | 4612 | DTDIN1 | 02 | 4627 | DTOIXT |
| 02 | 4632 | INMON1 | 02 | 4630 | LIMITA | 02 | 4630 | LIMITB | | | |

SECTION 80

| | | | | | | | | | | | |
|---|---|---|---|---|---|---|---|---|---|---|---|
| 02 | 4633 | INZCLR | 02 | 4652 | INZCL1 | 02 | 4673 | INZCL2 | 02 | 4644 | MONCLR |

SECTION 81

02 4722 CLEARM

SECTION 82

| | | | | | | | | | | | |
|---|---|---|---|---|---|---|---|---|---|---|---|
| 02 | 4763 | ALELMD | 02 | 4767 | MODLOP | 02 | 5042 | ROMDL2 | 02 | 5040 | RDML1P |
| 02 | 5066 | RUML2P | 02 | 5056 | RDRMCK | 02 | 5003 | RDSRMD | 02 | 5026 | RO1FAL |
| 02 | 5070 | SERBYP | 02 | 4753 | SERINZ | 02 | 4743 | SERMOD | | | |

-continued

SECTION 83

| | | | | | | | |
|---|---|---|---|---|---|---|---|
| 02 5074 | MODLCK | 02 5136 | MODLCX | 02 5124 | MODLFL | 02 5134 | MODLPS |

SECTION 84

| | |
|---|---|
| 02 5142 | ZLGSER |

SECTION 85

| | | | | | | | |
|---|---|---|---|---|---|---|---|
| 01 0051 | ASIN1A | 01 0105 | ASIN4 | 01 0127 | DEDZ1A | 01 0115 | LIMT1A |
| 01 0122 | LIMT11 | 01 0124 | LIMT12 | 01 0000 | SINCOS | | |

SECTION 86

| | | | | | | | |
|---|---|---|---|---|---|---|---|
| 01 0205 | INTEGT | 01 0217 | INTEG1 | 01 0225 | INTEG2 | 01 0141 | ZTFLAG |
| 01 0153 | ZTFLG1 | 01 0160 | ZTFLG2 | 01 0162 | ZTFWO | 01 0175 | ZTFWO1 |
| 01 0203 | ZTFWO2 | | | | | | |

| | | | | | | | |
|---|---|---|---|---|---|---|---|
| 01 0302 | AIDAFL | 01 0315 | ATOPIL | 01 0703 | ENDC1A | 01 0347 | EXC11A |
| 01 0227 | EXEC1A | 01 0240 | EXEC11 | 01 0357 | EXEC12 | 01 0361 | EXEC13 |
| 01 0374 | EXEC14 | 01 0410 | EXEC15 | 01 0420 | EXEC16 | 01 0424 | EXEC17 |
| 01 0345 | LOCNTV | 01 0336 | LOCRTE | 01 0405 | NOTLND | 01 0551 | NXTCP0 |
| 01 0035 | NXTCP1 | 01 0247 | OFFCON | 01 0253 | ONCOND | 01 0272 | ONCON1 |
| 01 0416 | RAINV0 | 01 0436 | RAINV1 | 01 0443 | TOCHEK | 01 0454 | TOCHK1 |
| 01 0461 | TONOT | 01 0664 | TOGG1A | 01 0675 | TOGG11 | 01 0734 | TORQU1 |
| 01 0716 | WOWCK1 | 01 0717 | WOWCK2 | 01 0722 | WOWCK3 | 01 0730 | WOWCK4 |
| 01 0576 | XPTACK | 01 0615 | XPTECK | 01 0504 | XRLACK | 01 0536 | XRLECK |

SECTION 88

| | | | | | | | |
|---|---|---|---|---|---|---|---|
| 01 0773 | APIT1A | 01 0757 | AROL1A | 01 1015 | ENGTHR | 01 1004 | EPIT1A |
| 01 0764 | EROL1A | | | | | | |

SECTION 89

| | | | | | | | |
|---|---|---|---|---|---|---|---|
| 01 1023 | OFFINZ | 01 1046 | OFFIN1 | 01 1064 | OFFIN2 | 01 1146 | ROLCOF |

SECTION 90

| | |
|---|---|
| 01 1164 | PITCOF |

SECTION 91

| | |
|---|---|
| 01 1174 | YAWCOF |

SECTION 92

| | | | | | | | |
|---|---|---|---|---|---|---|---|
| 01 1267 | NORINT | 01 1327 | RLCOFE | 01 1204 | ROLCAS | 01 1220 | ROLCS1 |
| 01 1223 | ROLCS2 | 01 1241 | ROLCS3 | 01 1247 | ROLCS4 | 01 1303 | ROLCS5 |
| 01 1310 | ROLCS6 | 01 1313 | ROLCS7 | | | | |

SECTION 93

| | | | | | | | |
|---|---|---|---|---|---|---|---|
| 01 1340 | PITCAS | 01 1351 | PITCS1 | 01 1354 | PITCS2 | 01 1361 | PITCS3 |
| 01 1375 | PITCS4 | 01 1403 | PITCS5 | 01 1417 | PITCS6 | 01 1427 | PITCS7 |
| 01 1432 | PITCS8 | 01 1440 | PTCOFE | | | | |

SECTION 94

| | | | | | |
|---|---|---|---|---|---|
| 01 1450 | PITLIM | 01 1454 | PITLM1 | 01 1457 | PITLM2 |

SECTION 95

| | | | | | | | |
|---|---|---|---|---|---|---|---|
| 01 1460 | YAWSAS | 01 1502 | YAWSA1 | 01 1523 | YAWSA2 | 01 1526 | YAWSA3 |
| 01 1536 | YAWSA4 | 01 1552 | YAWSA5 | 01 1563 | YWCOFE | | |

18196 SCAMP SECTION 96 PAGE 456
LABEL TABLE 01 1575 ROLFD 01 1602 ROLFD1 01 1604 ROLFD2 01 1606 ROLFD3
01 1631 XITRFD

SECTION 97

01 1641 OFFRFD

SECTION 98

01 1645 PITFD 01 1652 PITFD1 01 1654 PITFD2 01 1656 PITFD3
01 1667 PITFD4 01 1712 XITPFD

SECTION 99

01 1722 OFFPFD

SECTION 100

01 2014 OUTDR1 01 2016 OUTDTR 01 2104 RCWSBY 01 2106 RCWSB1
01 2034 RCWSCP 01 2146 RDSENG 01 1733 ROLCWS 01 1743 ROLCW1
01 1751 ROLCW2 01 1753 ROLCW3 01 1757 ROLCW4 01 1771 ROLCW5
01 2030 ROLCW6 01 2047 ROLCW7 01 2072 ROLCW8 01 2114 ROLCW9
01 2117 ROLC10 01 2143 ROLC11 01 2151 ROLC12 01 2043 ROLC13
01 2065 ROLC14 01 2155 XITRCW 01 2157 XITRC1

SECTION 101

01 2232 OUTDP1 01 2234 OUTDP2 01 2235 OUTDTP 01 2253 PCWSCP
01 2317 PUSENG 01 2215 PDTNTC 01 2166 PITCWS 01 2204 PITCW1
01 2247 PITCW2 01 2262 PITCW3 01 2267 PITCW4 01 2271 PITCW5
01 2314 PITCW6 01 2322 PITCW7 01 2324 XITPCW

SECTION 102

01 2333 CONVEN 01 2505 CONVEX 01 2354 CONVRB 01 2442 CONVR1
01 2414 CRSLOC N 01 2340 NXTDUA 01 2355 TRYNXT 01 2477 YAWREV
01 2457 YAWRRV 01 2467 YAWRR1

SECTION 103

01 2514 TOGA 01 2545 TOGA1 01 2546 TOGA2 01 2560 TOGA3
01 2603 TOGA4 01 2533 TOPAS2

SECTION 104

01 2604 TOMODE 01 2612 TOMOD1 01 2622 TOMOD2 01 2627 TOMXIT N

18196 SCAMP SECTION 105 PAGE 457
LABEL TABLE 01 2631 GAMODE 01 2637 GAMOD1 01 2642 GAMOD2

SECTION 106

01 2673 AHPAS2 01 2720 ALTHD1 01 2721 ALTHD2 01 2746 ALTHD3
01 2747 ALTHD4 01 2712 ALTHD5 01 2710 ALTHD6 01 2734 ALTHD7
01 2657 ALTHLD

SECTION 107

01 2762 ALTERR 01 2775 ALTER1 01 3005 ALTER2

SECTION 108

01 3057 FPAINT 01 3022 FPAMOD 01 3063 FPAXIT 01 3033 FPPAS2

SECTION 109

01 3065 SPITCH

SECTION 110

01 3115 MPITCH

```
  1F196 SCAMP                              SECTION                  PAGE      457
LABEL TABLE

                                  -continued

                                           SECTION      111

01 3145  SPDCMD    01 3171  SPDCPT    01 3200  SPDCP1    01 3207  SPDCXT
01 3162  SPDTRK

                                           SECTION      112

01 3210  ASPITC    01 3256  ASPIT1    01 3233  ASPIT2

                                           SECTION      113

01 3260  MSPITC    01 3326  MSPIT1    01 3303  MSPIT2

                                           SECTION      114

01 3376  GSEXIT    01 3330  GSLOPE    01 3352  GSLOP1    01 3346  GSPAS2
01 3367  GSPAS3

                                           SECTION      115

01 3400  GLSPCM    01 3414  GLSPC1    01 3420  GLSPC2    01 3421  GLSPC3

                                           SECTION      116

01 3455  ATTDEC

  1F196 SCAMP                              SECTION      117     PAGE      458
LABEL TABLE

01 3562  FLACMP    01 3622  FLACM1    01 3626  FLACM2    01 3466  FLARE
01 3647  FLPSS1    01 3521  FLPSS2    01 3650  FLPSS3    01 3633  FLRNOI
01 3537  PITON1

                                           SECTION      118

01 3651  FLRFW0    01 3656  FLRFW1

                                           SECTION      119

01 3675  PITOFF    01 3706  PTOXIT

                                           SECTION      120

01 3752  GSCAPT    01 3710  GSLOPA    01 3734  GSLOP1    01 3741  GSLOP2  N
01 3764  XITGSA

                                           SECTION      121

01 3766  GSINIT

                                           SECTION      122

01 4005  FLAREA    01 4020  XITFRA

                                           SECTION      123

01 4022  ALTARM    01 4036  XITALA

                                           SECTION      124

01 4057  VCASA1    01 4072  VCASA2    01 4040  VCASRM

                                           SECTION      125

01 4113  MACHA1    01 4127  MACHA2    01 4074  MACHRM

                                           SECTION      126

01 4131  PTAOFF
```

1819B SCAMP SECTION PAGE 458
LABEL TABLE

-continued

SECTION 127

01 4144 HSPAS2    01 4177 SELHD1    01 4202 SELHD2    01 4134 SELHLD

SECTION 128

01 4216 HOGSEL

1819B SCAMP SECTION 129 PAGE 459
LABEL TABLE 01 4224 RLTOGA    01 4231 RTOGA1    01 4243 RTOGA2    01 4244 RTOGA3

SECTION 130

01 4346 LCPAS1    01 4271 LCPAS2    01 4251 LOCALR    01 4303 LOCAL1
01 4337 LOCAL2    01 4360 LOCLR1    01 4361 LOCLR2    01 4332 LOCTRK

SECTION 131

01 4414 VOR1    01 4362 VOR    01 4440 VORTRK    01 4450 VRPAS1
01 4402 VRPAS2

SECTION 132

01 4473 DCRPS2    01 4461 DECRAB    01 4541 XITOCB

SECTION 133

01 4556 GRNRL1    01 4565 GRNRL2    01 4621 GRNRL3    01 4543 GRNROL

SECTION 134

01 4623 ROLOFF

SECTION 135

01 4635 LOCALA    01 4663 LOCAPT    01 4671 XITLC1

SECTION 136

01 4673 LOCINI

SECTION 137

01 4737 VARMXT    01 4741 VARMX2    01 4705 VORARM    01 4733 VORCAP

SECTION 138

01 4744 VORINI

SECTION 139

01 4761 DECRBA    01 4776 DECRB1    01 5005 XITDCR

SECTION 140

01 5007 GRDRLA    01 5031 XITGRL

1819B SCAMP SECTION 141 PAGE 460
LABEL TABLE 01 5033 RLAOFF

SECTION 142

01 5036 THROFF

SECTION 143

01 5041 RTDPS1    01 5054 THRRTD    01 5071 THRRT1

-continued

SECTION 144

| | | | | | | | | | | | |
|---|---|---|---|---|---|---|---|---|---|---|---|
| 01 | 5137 | KICHEK | 01 | 5157 | PLACR1 | 01 | 5164 | PLACR2 | 01 | 5165 | PLACR3 |
| 01 | 5117 | SPDPS2 | 01 | 5220 | THROT1 | 01 | 5227 | THROT2 | 01 | 5234 | THROT3 |
| 01 | 5235 | THROT4 | 01 | 5275 | THROT5 | 01 | 5074 | THRSPD | 01 | 5130 | THRSP1 |
| 01 | 5146 | THRSP2 | 01 | 5176 | VCMD1 | 01 | 5201 | VCMD2 N | | | |

SECTION 145

| | | | | | | | | | | | |
|---|---|---|---|---|---|---|---|---|---|---|---|
| 01 | 5306 | THRNP2 | 01 | 5352 | THRNXT | 01 | 5276 | THRN1L | 01 | 5313 | THRN11 |
| 01 | 5332 | THRN12 | | | | | | | | | |

SECTION 146

| | | |
|---|---|---|
| 01 | 5353 | THRMAC |

SECTION 147

| | | | | | | | | | | | |
|---|---|---|---|---|---|---|---|---|---|---|---|
| 01 | 5471 | ALTCF1 | 01 | 5504 | ALTCF2 | 01 | 5505 | ALTCF3 | 01 | 5373 | EUCFIL |
| 01 | 5435 | EUCFI1 N | 01 | 5437 | EUCFI2 | 01 | 5450 | EUCFI3 | 01 | 5465 | EUCFI4 N |
| 01 | 5452 | STOROH | 01 | 5575 | VTASC1 | 01 | 5567 | VTASC2 | 01 | 5620 | VTASC3 |
| 01 | 5557 | VTASC4 | | | | | | | | | |

SECTION 148

| | | | | | | | | | | | |
|---|---|---|---|---|---|---|---|---|---|---|---|
| 01 | 5637 | LOCERR | 01 | 5666 | LOCER1 | 01 | 5674 | LOCER2 | 01 | 5665 | LOCRG1 |
| 01 | 5713 | NORMLC | | | | | | | | | |

SECTION 149

| | | |
|---|---|---|
| 01 | 5747 | VORERR |

SECTION 150

| | | | | | | | | | | | |
|---|---|---|---|---|---|---|---|---|---|---|---|
| 01 | 6022 | AIRDAT | 01 | 6030 | AIRDT1 | 01 | 6122 | AIRDT2 N | 01 | 6123 | AIRDT3 |
| 01 | 6127 | AIRDT4 | 01 | 6132 | AIRDT5 | 01 | 6141 | AIRDT6 | 01 | 6155 | AIRDT7 |
| 01 | 6160 | AIRDT8 | 01 | 6320 | CLIFT2 | 01 | 6321 | CLIFT3 | 01 | 6403 | CLREF1 |
| 01 | 6047 | HRADC1 | 01 | 6051 | HRADC2 | 01 | 6052 | HRADC3 | 01 | 6061 | OLDHDT |
| 01 | 6033 | STRADH | | | | | | | | | |

| | | | | | | | | | | | |
|---|---|---|---|---|---|---|---|---|---|---|---|
| 01 | 6442 | LINE | 01 | 6446 | NOMINL | 01 | 6424 | THETLC | 01 | 6447 | THETL1 |
| 01 | 6457 | THETL2 | 01 | 6511 | XITTLC | | | | | | |

SECTION 152

| | | | | | | | | | | | |
|---|---|---|---|---|---|---|---|---|---|---|---|
| 01 | 6512 | FGSPCM | 01 | 6532 | FGSPC1 | 01 | 6550 | FGSPC2 | 01 | 6561 | FGSPC3 |
| 01 | 6567 | FGSPC4 | 01 | 6575 | FGSPC5 | | | | | | |

SECTION 153

| | | |
|---|---|---|
| 01 | 6603 | APLOCK |

SECTION 154

| | | | | | |
|---|---|---|---|---|---|
| 01 | 6670 | TOGARF | 01 | 6716 | TOGAR2 |

SECTION 155

| | | | | | | | | | | | |
|---|---|---|---|---|---|---|---|---|---|---|---|
| 01 | 6770 | ACPACK | 01 | 7013 | ACPCK1 | 01 | 7017 | EQB | 01 | 7051 | FIFTH |
| 01 | 7111 | FINAL | 01 | 7114 | FINAL1 | 01 | 7021 | FINISH | 01 | 7045 | HPX1 |
| 01 | 7061 | THIRD | 01 | 6727 | THIRDB | 01 | 6717 | THRSTR | | | |

SECTION 156

| | | | | | | | | | | | |
|---|---|---|---|---|---|---|---|---|---|---|---|
| 04 | 0000 | FASTIX | 04 | 0030 | FASTX1 | 04 | 0035 | FASTX2 | 04 | 0004 | FASTX3 |
| 04 | 0017 | VAREFS | | | | | | | | | |

18198 SCAMP SECTION PAGE 461
LABEL TABLE

-continued

SECTION 157

| | |
|---|---|
| 04 0056 | TABLE1 |

SECTION 158

| | | | | | |
|---|---|---|---|---|---|
| 04 0074 | TABLE2 | 04 0132 | TABL21 | 04 0135 | TABL22 |

18198 SCAMP SECTION 161 PAGE 462
SUBROUTINE TABLE:

| | | | | | | | | | | | |
|---|---|---|---|---|---|---|---|---|---|---|---|
| 02 4155 | ACONGD | N | 01 6022 | AIRDAT | N | 00 4420 | AIRDCK | N | 00 4755 | ALLMOD | N |
| 01 4022 | ALTARM | N | 00 4410 | ALTCHK | N | 01 2762 | ALTERR | N | 01 2657 | ALTHLD | N |
| 02 3237 | ANMESS | N | 00 0360 | ANSCLK | N | 01 6603 | APLOOK | N | 01 0051 | ASIN1A | N |
| 01 3210 | ASPITC | N | 01 3455 | ATTDEC | N | 02 1140 | BITTST | N | 02 1130 | BUTEST | N |
| 02 4722 | CLEARM | N | 02 1475 | CLERDA | N | 00 5700 | CLMACH | N | 00 5072 | CLMOUT | N |
| 02 4733 | CMFAIL | N | 02 1527 | COMALA | N | 02 1534 | COMALB | N | 02 1541 | COMELA | N |
| 02 1546 | COMELB | N | 02 1515 | COMRDA | N | 02 1522 | COMRDB | N | 01 2333 | CONVER | N |
| 00 5722 | CRSMAC | N | 00 5367 | CRUISE | N | 02 1222 | CWSCKN | N | 02 1206 | CWSCKP | N |
| 00 1014 | DAOUTP | N | 01 4461 | DECRAB | N | 01 4761 | DECRBA | N | 01 0127 | DEDZ1A | N |
| 02 5446 | DESCNT | N | 00 2155 | DIGBUF | N | 00 1151 | DIGINT | N | 00 3272 | DISDEC | N |
| 02 1461 | DISDIA | N | 00 3360 | DSCRET | N | 00 4075 | DSCTIM | N | 00 5711 | DSMACH | N |
| 02 4606 | DTDINC | N | 00 2345 | EAMONT | N | 00 5423 | ENRCLM | N | 02 1200 | ERRALN | N |
| 02 1173 | ERRALP | N | 02 1247 | ERROR | N | 02 1165 | ERROR7 | N | 01 5373 | EUCFIL | N |
| 01 0227 | EXEC1A | N | 00 2000 | FAILIT | N | 00 4324 | FAILST | N | 00 4262 | FAILUP | N |
| 02 1342 | FAIPNT | N | 00 2005 | FAISEN | N | 04 0000 | FASTIX | N | 00 4726 | FDFAIL | N |
| 01 6512 | FGSPCM | N | 00 4503 | FLACHK | N | 01 3466 | FLARE | N | 01 4005 | FLAREA | N |
| 00 5734 | FLPCMP | N | 00 6137 | FLPLIM | N | 01 3651 | FLRFWD | N | 00 3175 | FMATRN | N |
| 02 4211 | FPACMP | N | 00 5673 | FPAHOT | N | 01 3022 | FPAMOD | N | 00 4443 | GAECHK | N |
| 01 2631 | GAMODE | N | 01 3400 | GLSPCM | N | 00 4525 | GNRCHK | N | 01 5007 | GRDRLA | N |
| 01 4543 | GRNROL | N | 00 4513 | GSACHK | N | 00 4361 | GSECHK | N | 01 3766 | GSINIT | N |
| 01 3710 | GSLOPA | N | 01 3330 | GSLOPE | N | 00 4602 | GSMCHK | N | 00 4556 | HDGSCK | N |
| 01 4216 | HDGSEL | N | 00 4622 | HDGVLD | N | 00 6166 | HDOTCK | N | 00 4572 | ILSTUN | N |
| 02 1326 | INCDIA | N | 00 2111 | INMONF | N | 01 0205 | INTEGT | N | 00 3333 | INTGR3 | N |
| 02 4277 | INTGSR | N | 02 4633 | INZCLR | N | 00 4543 | LATCHK | N | 00 4675 | LATLND | N |
| 01 0115 | LIMT1A | N | 00 4774 | LNDAFL | N | 00 4742 | LNDFAL | N | 00 4244 | LNDPGN | N |
| 00 4226 | LNDRGN | N | 01 4635 | LOCALA | N | 01 4251 | LOCALR | N | 01 5637 | LOCERR | N |
| 00 4645 | LOCHCK | N | 01 4673 | LOCINI | N | 01 4074 | MACHRM | N | 00 1024 | MAPCNT | N |
| 02 5074 | MODLCK | N | 00 2410 | MODSC1 | N | 01 3115 | MPITCH | N | 01 3260 | MSPITC | N |
| 00 4357 | NOPCHK | N | 02 1400 | NULDIS | N | 02 1353 | NULLCK | N | 01 1023 | OFFINZ | N |
| 01 1722 | OFFPFD | N | 01 1641 | OFFRFD | N | 02 4000 | OUTSET | N | 02 0000 | PFT | N |
| 02 1471 | PFTSER | N | 01 1340 | PITCAS | N | 01 1164 | PITCOF | N | 01 2166 | PITCWS | N |
| 01 1645 | PITFD | N | 01 1450 | PITLIM | N | 01 3675 | PITOFF | N | 00 6121 | PLACLM | N |
| 00 4767 | POFFST | N | 00 1162 | POWINT | | 01 4131 | PTAOFF | N | 00 4147 | PTASET | N |
| 02 4137 | PTESET | N | 00 4632 | RAMCHK | N | 01 5033 | RLAOFF | N | 00 4175 | RLASET | N |
| 02 4165 | RLESET | N | 01 4224 | RLTOGA | N | 00 5206 | ROFFST | N | 01 1204 | ROLCAS | N |
| 01 1146 | ROLCOF | N | 01 1733 | ROLCWS | N | 01 1575 | ROLFD | N | 01 4623 | ROLOFF | N |
| 01 4134 | SELHLD | N | 02 4505 | SENMON | N | 02 4346 | SENSRM | N | 02 1333 | SERCHK | N |
| 02 2166 | SERINC | N | 00 0662 | SERINP | N | 02 4743 | SERMOD | N | 02 4334 | SFCSCL | N |
| 01 0000 | SINCOS | N | 01 3145 | SPDCMD | N | 01 3065 | SPITCH | N | 00 1004 | STATCK | N |
| 00 0703 | STATIN | N | 00 2140 | SUMCHK | N | 02 4306 | SYNCH | N | 02 4322 | SYNWOT | N |
| 04 0056 | TABLE1 | N | 04 0074 | TABLE2 | N | 00 5051 | TAKEOF | N | 01 6424 | THETLC | N |
| 01 5353 | THRMAC | N | 01 5276 | THRN1L | N | 01 5036 | THROFF | N | 01 5054 | THRRTD | N |
| 02 4203 | THRSET | N | 01 5074 | THRSPD | N | 01 6717 | THRSTR | N | 02 1265 | TIMER | N |
| 02 1271 | TIMERS | N | 00 0711 | TKCHEK | N | 02 1275 | TLOC | N | 00 4461 | TOECHK | N |
| 01 2514 | TOGA | N | 01 6670 | TOGARF | N | 00 4612 | TOGAVA | N | 01 2604 | TOMODE | N |
| 00 3133 | TSTFMT | N | 00 4347 | VALFAL | N | 01 4040 | VCASRM | N | 02 1236 | VERIFY | N |
| 01 4362 | VOR | N | 01 4705 | VORARM | N | 01 5747 | VORERR | N | 01 4744 | VORINI | N |
| 01 1174 | YAWCOF | N | 01 1460 | YAWSAS | N | 00 4713 | YOFAIL | N | 00 4720 | YOFFAL | N |
| 02 5142 | ZLGSER | N | 01 0141 | ZTFLAG | N | 01 0162 | ZTFWD | N | | | |

18198 SCAMP SECTION 162 PAGE 463
INDIRECT TABLE

| | | | | | | | |
|---|---|---|---|---|---|---|---|
| 01 0773 | APIT1A | 01 0757 | AROL1A | 00 5037 | AUTTBL | 00 1351 | CLRCOM |
| 02 4631 | DEDZNA | 00 1365 | DIGIN7 | 02 1553 | DISDE1 | 01 1015 | ENGTHR |
| 01 1004 | EPIT1A | 01 0764 | EROL1A | 00 1346 | EXC1A | 02 1554 | FAILRC |
| 02 1357 | FAIL? | 00 5050 | INDEXS | 02 4632 | INMON1 | 02 1556 | INTGER |
| 02 4630 | LIMI1A | 00 1350 | OUTRDY | 00 5022 | PARMTB | 00 5026 | PENGTB |
| 02 1363 | POWIAD | 00 1352 | PREFLT | 02 1555 | REHASH | 00 5013 | RENGTB |
| 00 1361 | RTINAD | 00 1347 | SENMNA | 00 5045 | SINCSN | 00 1353 | SRMODL |
| 02 5047 | TABLED | 00 5046 | TABLES | 00 1355 | THRUST | 00 1354 | TLOCIN |

18198 SCAMP SECTION 206 PAGE 464
INDIRECT TABLE

10196 SCAMP
TABLE OF CONTENTS

SECTION 254 PAGE 1

| ADDRESS | PAGE | TITLE |
|---|---|---|
| 03 0124 | 9 | |
| 03 0220 | 11 | |
| 03 0257 | 12 | |
| 03 0504 | 18 | |
| 03 0525 | 19 | |
| 03 1000 | 22 | |
| 03 1107 | 24 | |
| 03 1776 | 26 | |
| 03 2051 | 28 | |
| 03 2077 | 29 | |
| 03 2161 | 31 | |
| 03 2322 | 32 | |
| 03 2404 | 34 | |
| 03 2471 | 35 | |
| 03 2522 | 36 | |
| 03 2535 | 37 | |
| 03 2576 | 38 | |
| 03 3112 | 40 | |
| 03 4000 | 41 | |
| 03 4030 | 47 | |
| 03 4063 | 49 | |
| 03 4226 | 53 | |
| 03 4311 | 55 | |
| 03 4374 | 57 | |
| 03 4657 | 62 | |
| 03 4667 | 63 | |
| 03 4741 | 65 | |
| 03 4766 | 66 | |
| 03 5013 | 67 | |
| 03 5065 | 68 | |
| 03 5112 | 69 | |
| 03 5215 | 71 | |
| 03 5420 | 74 | |
| 03 5454 | 75 | |
| 03 5556 | 77 | |
| 03 5657 | 79 | |
| 03 5763 | 81 | |
| 03 6113 | 83 | |
| 03 6170 | 85 | |
| 03 6261 | 87 | |
| 03 6735 | 94 | |
| 00 0360 | 99 | |
| 00 1252 | 109 | INTERRUPT RESTART |
| 00 1346 | 111 | INDIRECTS |
| 00 3542 | 148 | |
| 00 3560 | 149 | |
| 00 3720 | 152 | |
| 00 3721 | 153 | |

18198 SCAMP
TABLE OF CONTENTS

SECTION 254 PAGE 2

| ADDRESS | PAGE | TITLE |
|---|---|---|
| 00 4040 | 155 | |
| 00 4075 | 156 | |
| 02 5013 | 198 | |
| 00 6137 | 219 | |
| 02 1130 | 236 | |
| 02 1247 | 239 | |
| 02 1265 | 240 | |
| 02 1333 | 241 | |
| 02 1400 | 242 | |
| 02 1461 | 244 | |
| 02 1471 | 245 | |
| 02 4031 | 250 | |
| 02 4630 | 263 | |
| 01 0051 | 276 | |
| 01 0115 | 277 | |
| 01 0641 | 288 | |
| 01 1145 | 295 | |
| 04 4273 | 439 | |

HHHH